Figure 1:
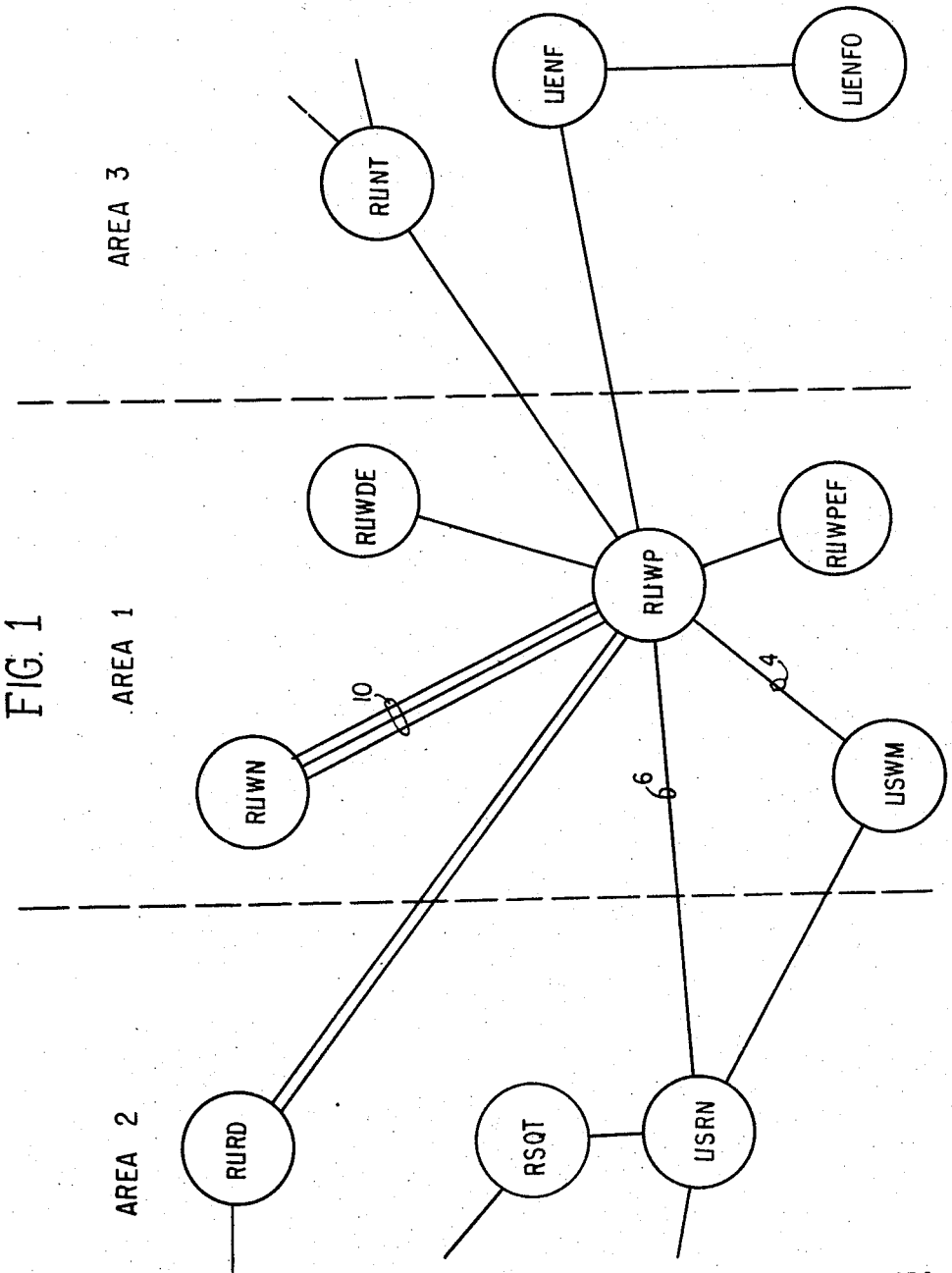

July 26, 1960  R. C. STILES ET AL  2,946,844
AUTOMATIC TELEGRAPH SWITCHING SYSTEM
Filed Nov. 29, 1956  115 Sheets-Sheet 1

INVENTORS
R. C. Stiles
R. E. Staffeld
R. A. Kolpek
BY
C. A. Gulbransen
atty

July 26, 1960

R. C. STILES ET AL 2,946,844

AUTOMATIC TELEGRAPH SWITCHING SYSTEM

Filed Nov. 29, 1956

115 Sheets-Sheet 7

INVENTORS
R. C. Stiles
R. E. Stoffel
R. A. Kolpek
BY
C. A. Gulbrandsen atty.

July 26, 1960 R. C. STILES ET AL 2,946,844
AUTOMATIC TELEGRAPH SWITCHING SYSTEM
Filed Nov. 29, 1956 115 Sheets-Sheet 11
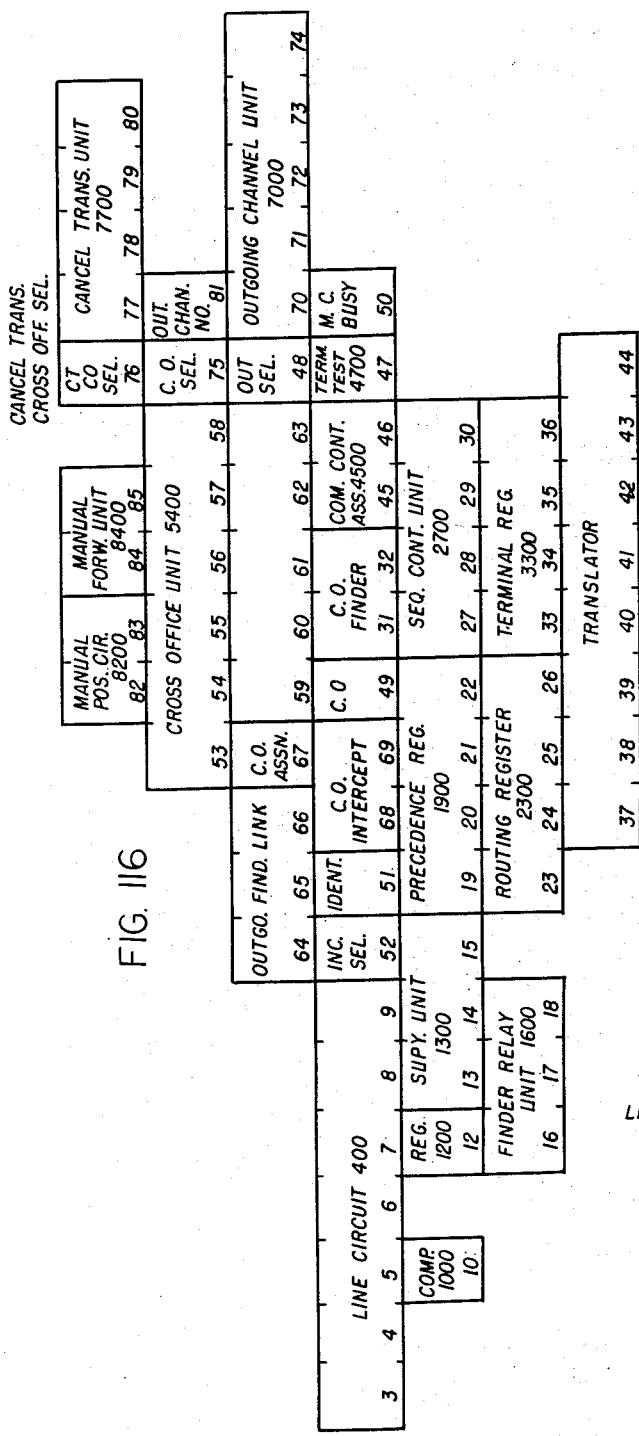
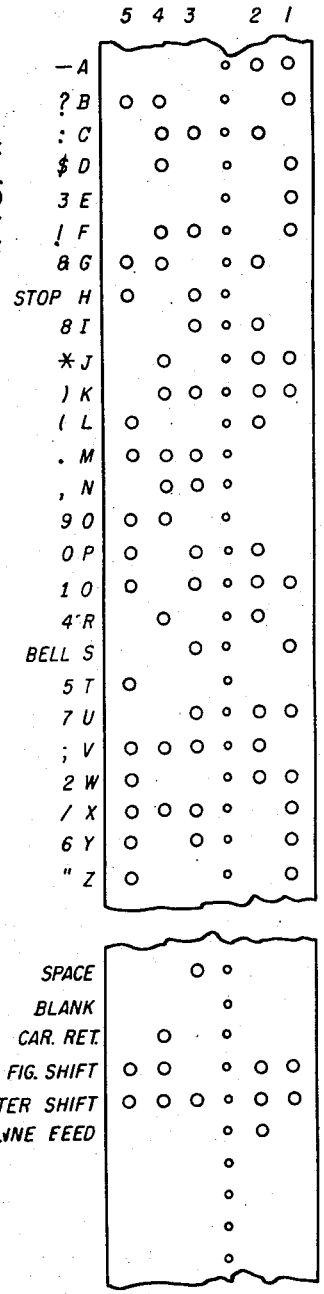
INVENTORS
R.C. Stiles
R.E. Steffen
R.A. Koefer
BY
C.A. Gulbrandsen
atty.

PRECEDENCE REGISTER 1900

July 26, 1960

R. C. STILES ET AL 2,946,844

AUTOMATIC TELEGRAPH SWITCHING SYSTEM

Filed Nov. 29, 1956

115 Sheets-Sheet 23

July 26, 1960

R. C. STILES ET AL 2,946,844

AUTOMATIC TELEGRAPH SWITCHING SYSTEM

Filed Nov. 29, 1956

115 Sheets-Sheet 33

INVENTORS
R. C. Stiles
R. E. Stoffels
R. A. Koepke
BY
C. A. Gulbrandsen  atty

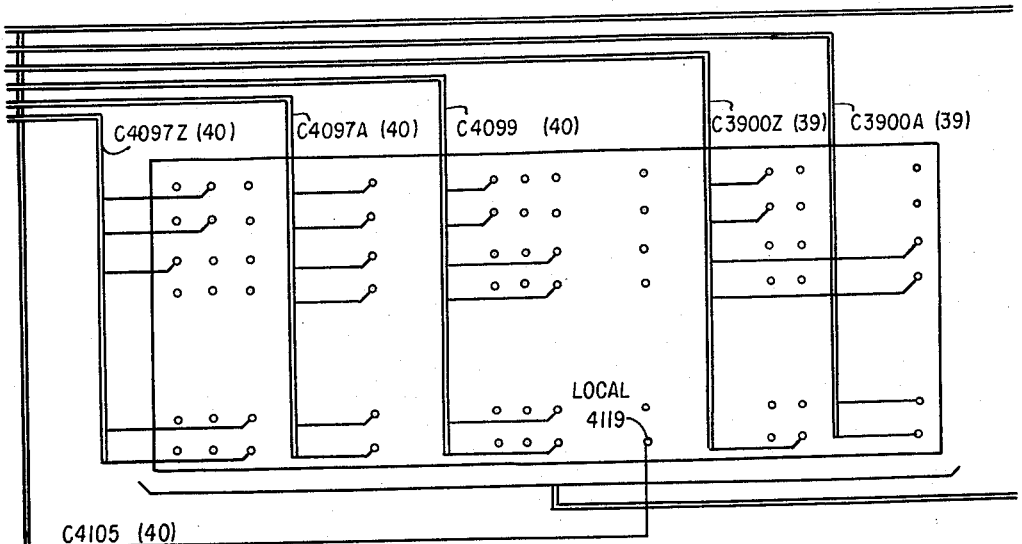
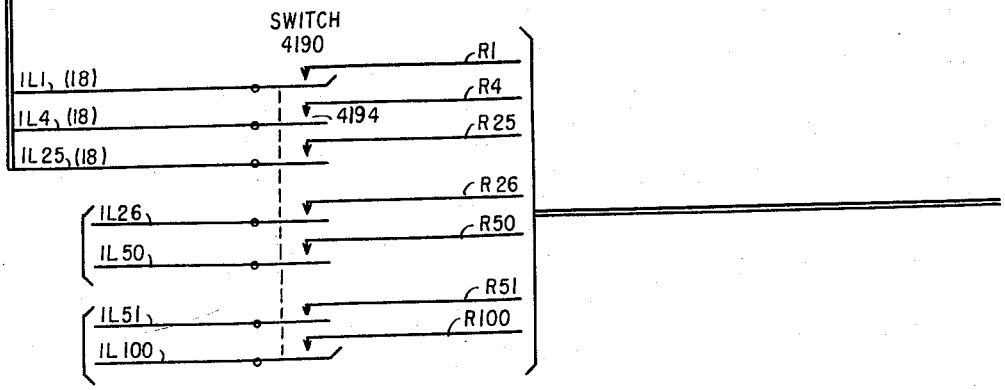
FIG. 41

July 26, 1960

R. C. STILES ET AL 2,946,844

AUTOMATIC TELEGRAPH SWITCHING SYSTEM

Filed Nov. 29, 1956

115 Sheets-Sheet 45

FIG. 45

INVENTORS
R.C. Stiles
R.E. Stoffels
R.A. Koepsel
BY
C.A. Gulbrandsen
atty.

July 26, 1960 R. C. STILES ET AL 2,946,844
AUTOMATIC TELEGRAPH SWITCHING SYSTEM
Filed Nov. 29, 1956 115 Sheets-Sheet 49

INVENTORS
R. C. Stiles
R. E. Stoffels
R. A. Kalfek
BY
C. A. Gulbrandsen
atty

INVENTORS
R. C. Stiles
R. E. Stoffels
R. A. Kozisek
BY
C. A. Gulbrandsen
atty

July 26, 1960 R. C. STILES ET AL 2,946,844
AUTOMATIC TELEGRAPH SWITCHING SYSTEM
Filed Nov. 29, 1956 115 Sheets-Sheet 72

INVENTORS
R.C. Stiles
R.E. Stoffels
BY R.A. Kaefer
C.A. Gulbrandsen
atty.

July 26, 1960 R. C. STILES ET AL 2,946,844
AUTOMATIC TELEGRAPH SWITCHING SYSTEM
Filed Nov. 29, 1956 115 Sheets-Sheet 83

FIG. III

July 26, 1960

R. C. STILES ET AL 2,946,844

AUTOMATIC TELEGRAPH SWITCHING SYSTEM

Filed Nov. 29, 1956

115 Sheets-Sheet 113

INVENTORS
R.C. Stiles
R.E. Steffels
BY P.A. Koepek

C. A. Gulbrandsen
atty.

July 26, 1960

R. C. STILES ET AL 2,946,844

AUTOMATIC TELEGRAPH SWITCHING SYSTEM

Filed Nov. 29, 1956

115 Sheets-Sheet 115

INVENTORS
R.C. Stiles
R.E. Stoffels
R.A. Koepke

BY
C. A. Gulbrandsen
atty.

United States Patent Office 2,946,844
Patented July 26, 1960

2,946,844
AUTOMATIC TELEGRAPH SWITCHING SYSTEM

Richard C. Stiles, La Grange, Robert E. Stoffels, Park Ridge, and Robert A. Kolpek, Libertyville, Ill., assignors to Automatic Electric Laboratories, Inc., a corporation of Delaware Filed Nov. 29, 1956, Ser. No. 625,004

49 Claims. (Cl. 178—2)

INDEX

| | Column |
|---|---|
| General description | 4 |
| Receipt of telegraph message | 14 |
| Register seizure | 21 |
| Precedence registration | 24 |
| Routing indicator registration | 26 |
| Translator seizure | 29 |
| Translator operation | 31 |
| Register translator disconnect | 37 |
| Routing indicator termination indication | 40 |
| Preset cross office test | 41 |
| Setting preset cross office unit | 48 |
| Register preset cross office test termination | 50 |
| Empty cross office unit test and setting | 51 |
| Cross office intercept | 56 |
| Cross office intercept unavailable | 58 |
| Finish cross office seizure | 58 |
| Register release | 62 |
| SOM cross office transmission | 64 |
| Outgoing channel seizure | 67 |
| Cross office unit identification | 75 |
| Transmission of an outgoing SOM and message number | 77 |
| Elimination of excess channel numbers | 80 |
| EOM transmission | 82 |
| EOM cross office and outgoing transmission | 87 |
| Cross office release | 93 |
| Cross office cancel transmission | 95 |
| Manual forwarding | 101 |
| Multiple routing translation | 106 |
| Multiple call cross office unit seizure | 108 |
| Receipt of message at multiple cross office unit | 111 |
| Multiple call register operation | 114 |
| Transmission of message information | 123 |
| Partial release of multiple call register | 131 |
| Pretest | 133 |
| Multiple call cross office unit test | 139 |
| Cancellation | 143 |
| Register release | 145 |
| EOM multiple call cross office transmission | 150 |
| Identification | 153 |

The present invention relates in general to automatic telegraph communication systems of a type generally disclosed in applications filed December 10, 1951, by Stiles, Serial No. 260,854, and filed October 21, 1953, by Stiles, Serial No. 387,354, wherein storage units being either cross office units, multiple call cross office units or intercept positions are used for routing message cross office, and more particularly relates to an improved automatic telegraph switching system, wherein the apparatus for routing telegraph messages is arranged in a manner permitting improved control of both single and multi-destination messages and the identification of apparatus being used therefor.

The present invention is described in conjunction with a relay switching center or central office, which is part of a telegraph switching system comprising a number of switching centers, stations or central offices located in the same and different geographical areas in a manner similar to that described in the above applications. In the switching system a number of such relay switching centers or central offices are provided and identified by a three character code, each character of which may be any one of 26 letters in the alphabet. In addition, each switching center may have tributary stations, which are identified by the relay switching center address code and by one or two additional letters. In the switching system a telegraph message originating at one station in the system, and intended to be processed at a relay switching center of the type described herein, includes in sequence the following codes: a start of message indicator; a message number; one of six possible precedence designations; and a routing indicator. This is then followed by the body of the message, and an end of message indicator. The routing indicator or address code includes the identifying characters of the station to which the message is to be sent. In the case of a multi-destination message otherwise called a multiple route or commonly called a multiple call message, a routing indicator or address code individual to each of a plurality of destinations of the message is provided in the message.

To process the message received at the relay switching center, the apparatus associated with the incoming line over which the message is received, first checks the start of message indicator code of an incoming message and then checks the message number code assigned to the incoming message. A register is then selected and associated with the incoming line over which the message is received. It records or registers the precedence designation of the incoming message and the routing indicator. After securing this information a translator is associated with the register for the purpose of routing the message to an outgoing channel or terminal corresponding to the routing indicator in the message. If the mesage is intended for the processing switching center, the translator routes the message to an intercept position. The translator compares the outgoing channel destination indicated by the registered routing indicator with the incoming line or channel, and if the two extend to the same station, it provides an intercept routing. In the case where a number of channels are connected over respective outgoing lines to the same station known as a multi-channel circuit, the translator distributes the traffic thereover evenly so that the message to the station is routed through an empty cross office unit, if there is an idle outgoing line in the group.

After the translator has performed its function, it signals the register and records the selected outgoing channel or routing therein. If several routing indicators are included in the message, the translator is called for repeatedly and a comparison is made between the channel corresponding to each successive indicator and a previously registered indicator respectively. It will be noted that a special multiple call indicator in the message is not needed. If all channels or terminals correspond, the message is treated as a single route or destination message.

If the message is of low precedence and is single route, the register selects a cross office unit, which has been previously set to the outgoing channel and has a message of the proper precedence stored therein, otherwise known as preset cross office unit. It then controls an incoming selector switch associated with the cross office unit to select the incoming line. If the message is high precedence, the register selects an empty cross office unit. In the event a preset cross office unit is not available in the case of a low precedence message, an empty cross office unit is selected. On selection of an empty cross office unit respective switches associated therewith are set to the incoming line, the outgoing channel and to the proper precedence. If an empty cross office unit is not available, in the case of either a high or low precedence message, the message is routed to a cross office intercept position. In the event an intercept position is not available, the register locks out the incoming line.

In the event the respective outgoing channels or terminals of different routing indicators do not correspond, a multiple call cross office unit is selected by the register. This eliminates the need for a special multiple call code in a received message containing normal routing indicators or address codes. The multiple call cross office unit may be either empty or preset depending on the precedence of the message, and an incoming selector switch associated therewith, is set to the incoming line.

The message, less unneeded or excess channel designations and message numbers, is thereafter transmitted from the incoming line to the multiple call cross office unit, to the cross office unit, or to the intercept position, respectively, which stores the message. The cross office unit seizes the outgoing channel as soon as it becomes available and then transmits the message to the outgoing line. It will be noted that several outgoing channels may be patched together to permit an alternate channel to be substituted for an out-of-service channel, while permitting a cross office unit to be set to the out-of-service channel. Transmission then takes place over the alternate channel. In the event the message is high precedence and the outgoing channel is busy transmitting a message of lower precedence, a cancel transmission unit is made effective for the purpose of cancelling the lower precedence message being transmitted and for permitting the cross office unit having the higher precedence message to seize the desired outgoing channel.

After a low precedence message is stored in a cross office unit, the unit may again be set to any incoming line for the purpose of receiving messages of a corresponding low precedence, which are destined for the same outgoing channel.

In the event that a message is to be forwarded from an intercept position, apparatus is provided, which automatically operates in response to the operator setting certain switches, corresponding to the precedence designation and the routing indicator of the message to be transmitted, for controlling a cross office unit associated therewith to select the desired outgoing channel and for transmitting the message. This may be done without the use of the start of message indicator perforated in the tape and generally used for message processing.

A multiple call cross office unit on receiving a message demands a register for the purpose of registering the channel number, precedence designation and routing indicators of the message therein. One routing indicator is registered at a time, and a new cross office unit is selected each time a routing indicator conforming to a new channel or outgoing line is processed. The switches associated with each selected cross office unit are set to the multiple call unit, the selected outgoing channel and the message precedence respectively, as on a single route message. Multiple call processing equipment associated with the register causes a start of message indicator, channel number, precedence designation and routing indicator to be transmitted to each newly selected cross office unit. After a predetermined number of cross office units are selected, another or the same multiple call cross office unit, is selected by the register, if a subsequently processed routing indicator requires a channel not previously selected. The selected multiple call unit processes the message in the same manner. In addition, messages from a multiple call cross office unit may be transmitted to an intercept position. After all receiving units and positions are connected to the multiple call unit, the body of the message is transmitted to all simultaneously. It may thus be seen that many messages may be created from an original received message. After one unit or position has been selected, a pretest is performed each time a routing indicator is processed to determine if one of the already selected units or positions may be used for the last processed routing indicator. In this event a previously selected unit is used and only the routing indicator is transmitted thereto. In addition, when a particular receiving station is arranged so that not more than a predetermined number of routing indicators may be included in one message, the register associated with the multiple call unit is controlled by the multiple call processing equipment to prevent more than the predetermined number of routing indicators from being sent in one message to that station.

In addition, the apparatus of the present invention is arranged to permit an operator to identify which unit or position is connected to a multiple call unit, an incoming line or to an outgoing channel or vice versa.

Generally therefore the improvements of the present system over previous systems is in the arrangement of the equipment at the switching center so that:

A. The incoming line equipment is locked out, if the register cannot complete a connection to a cross office unit intercept position.

B. Cross office units are controlled by a register to connect to an incoming line; to an outgoing line or channel, and a cross office unit can be connected successively to different incoming lines while it remains connected to the same outgoing line.

C. The translator prevents transmission of a message back to a station from which the message was sent.

D. A message intended for a particular station connected to the switching center by means of several lines or a multi-channel circuit is routed through an empty cross office unit, if an idle line in the multi-channel circuit is available and if an idle line is not available it may be routed to a preset unit.

E. A cross office unit having equipment with a particular transmission speed is allowed to transmit only to corresponding apparatus.

F. Certain unnecessary message information is eliminated, when a message is created from an incoming message.

G. Sensing relay arrangements are operated only on predetermined portions of a message.

H. Particular equipment being used for processing of a message may be identified.

I. Many messages may be created from one message containing several routing indicators conforming to different destinations.

J. A determination is made as to a multiple call routing without the need of a special multiple call code in a received message.

K. When creating additional messages the apparatus is arranged to pretest units or intercept positions so that message processing is simplified.

L. A message intended for a predetermined type of station does not contain more than a predetermined number of routing indicators.

M. Each multiple call unit is arranged to enable the transmission of a message from itself to itself or to other multiple call units.

N. And messages may be transmitted without a start message indicator under certain conditions.

The manner of accomplishing these improvements together with certain other improvements, which will become apparent on reading of the specification, will now be described.

GENERAL DESCRIPTION

The invention, both as to its organization and method of operation will be best understood by reference to the following specification taken in conjunction with the accompanying drawings in which:

Figure 1 is a schematic diagram of a portion of the geographical area served by the automatic telegraph switching center RUWP embodying the concepts of the present invention. In this connection it will be noted that a line 4 extends between centers RUWP and USWM and a line 6 extends between centers USRN and RUWP. These lines are each taken to represent a two conductor incoming line and a two conductor outgoing line, but will be generally referred to in the specification as incoming line 4 and as outgoing line 6 respectively. In those cases the reference character is intended to refer to the two conductor incoming line and to the two conductor outgoing line respectively. The lines show a continuous physical transmission circuit between stations, however it should be understood that repeaters, radio and carrier may be used in transmission. The letters RUWP and USRN respectively for example correspond to the respective routing indicators or address codes of respective switching centers and include a first letter R or U respectively which does not identify the center or station, but is merely used for routing indicator identification during message processing.

Figure 2:
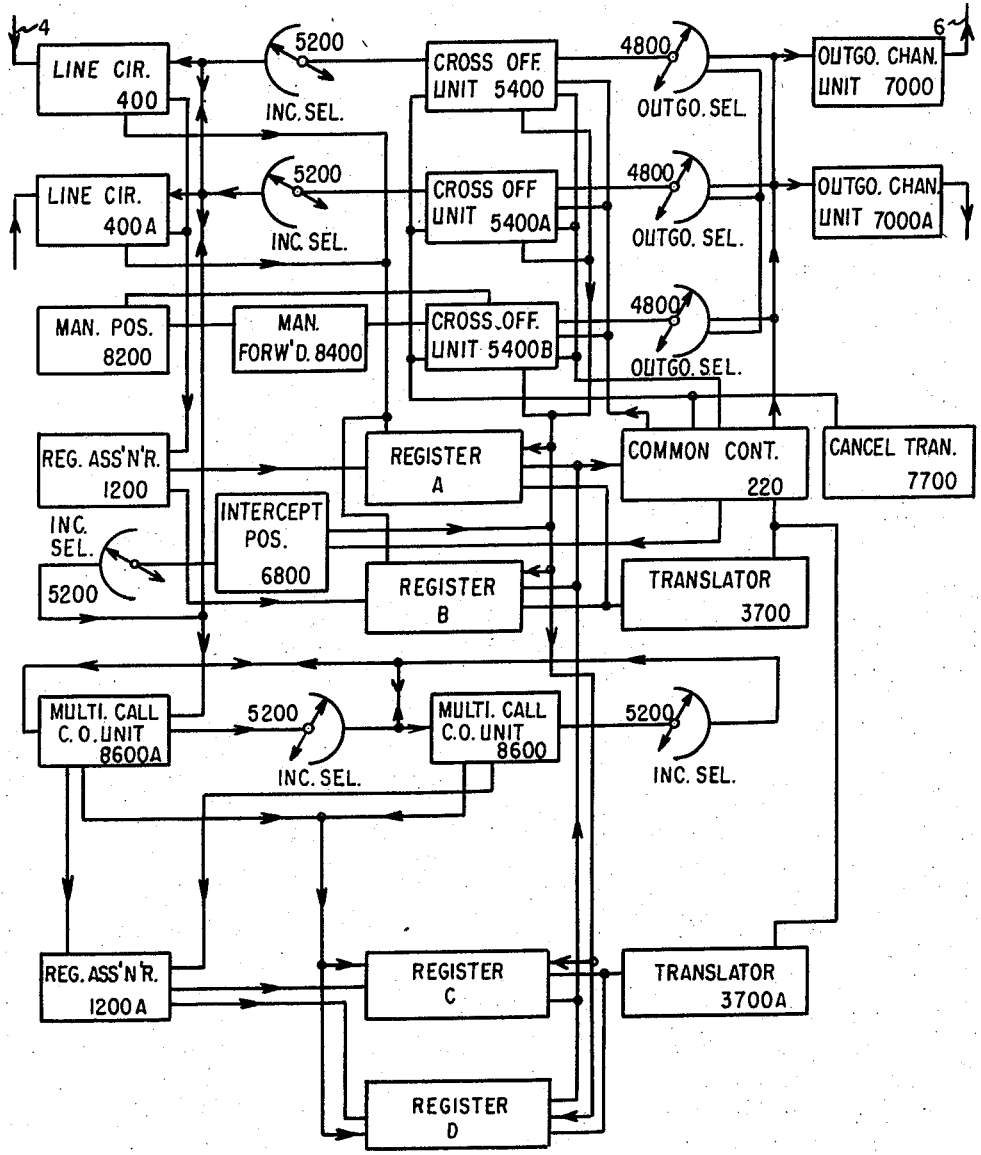
Figure 3:
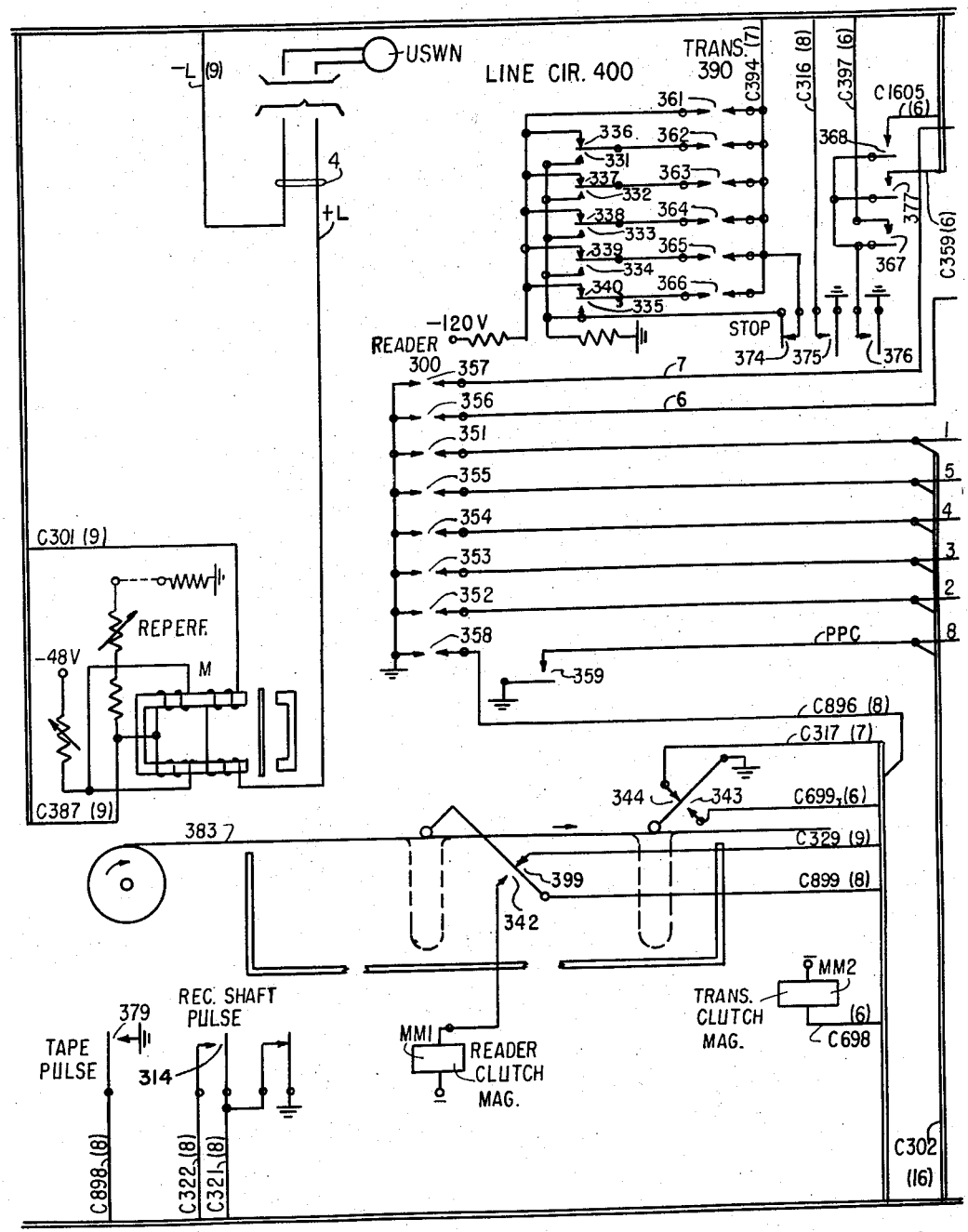
Figure 4:
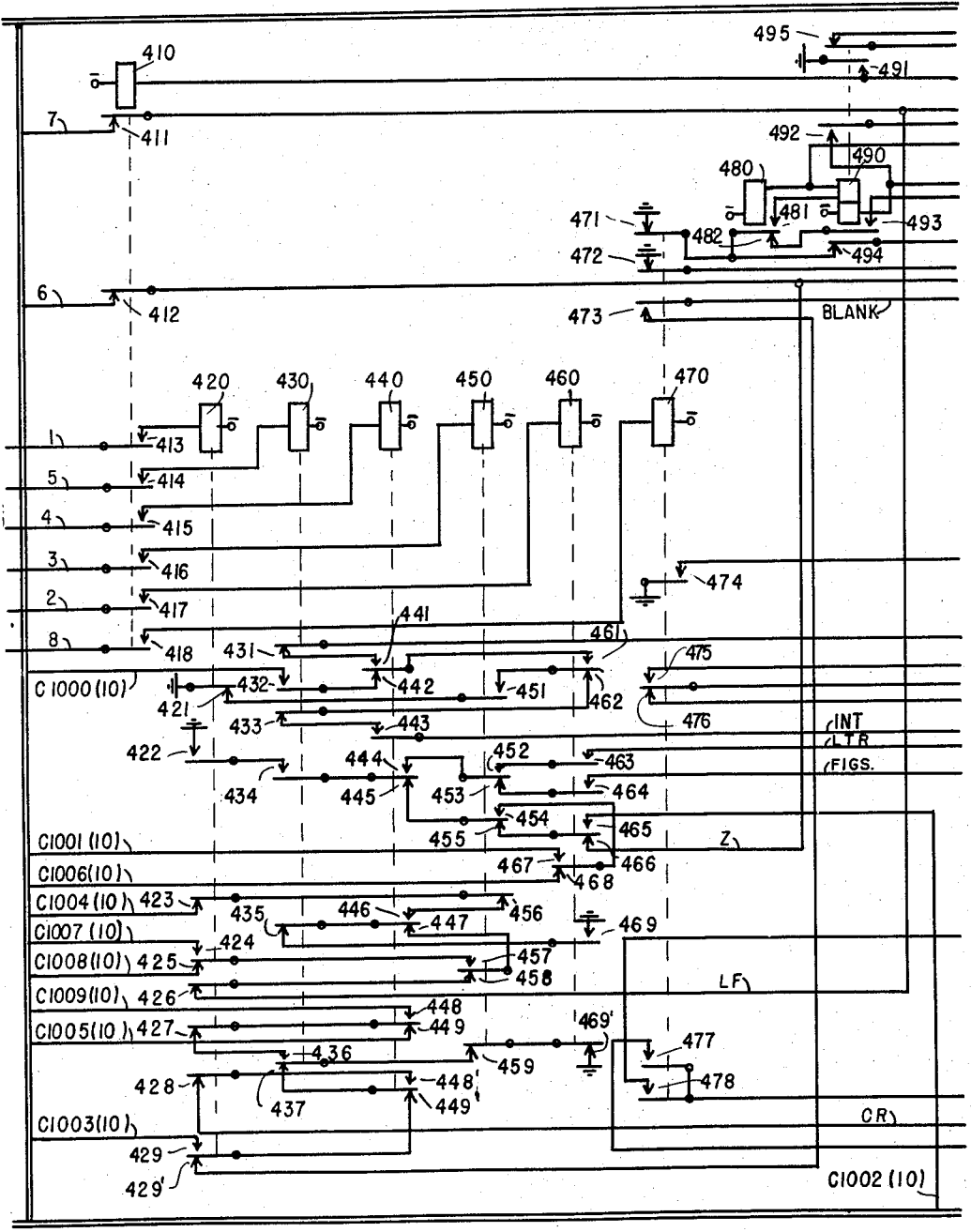
Figure 5:
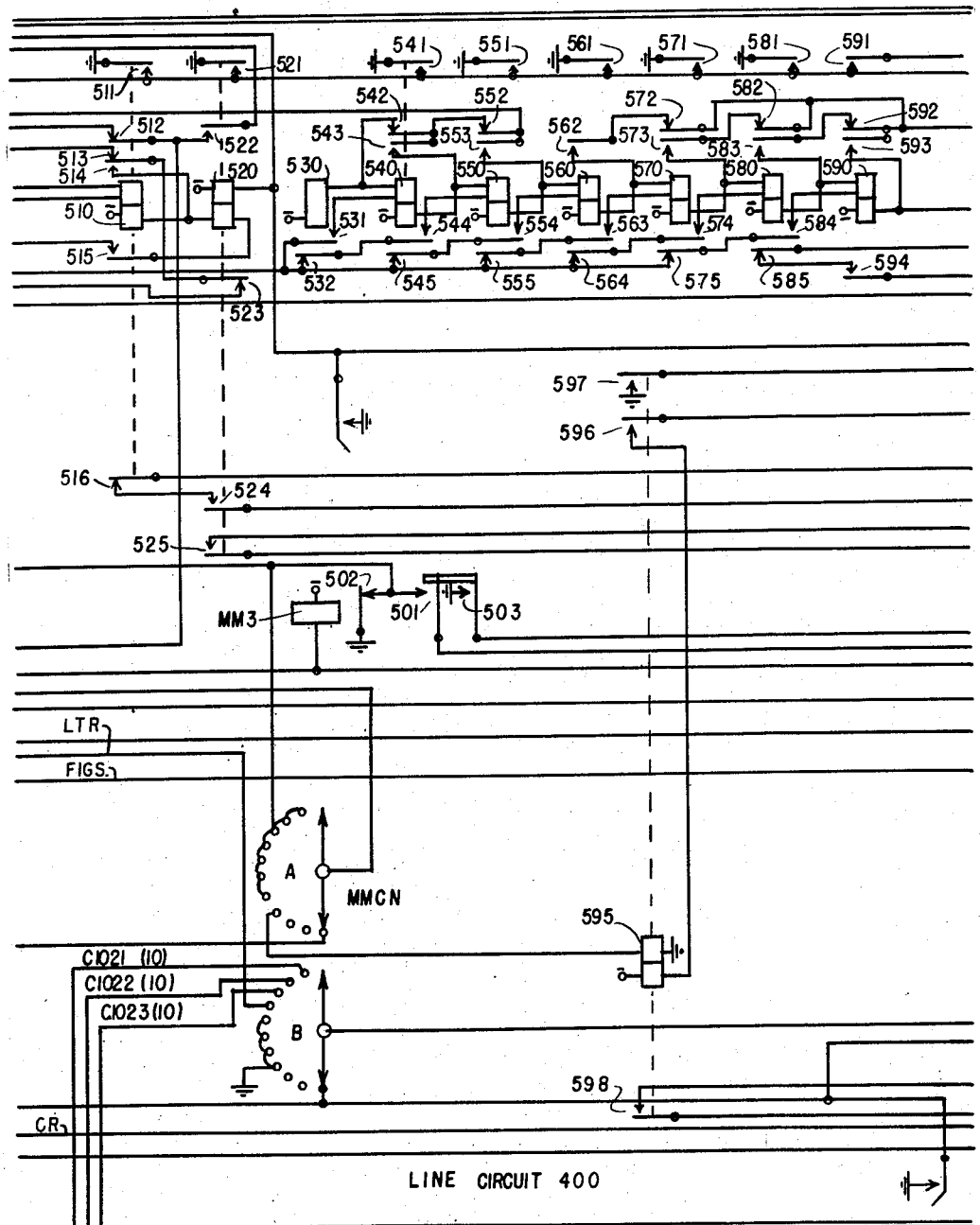

Figure 2 illustrates the general trunking arrangement of the switching apparatus incorporated in the relay switching center RUWP. Figures 3–10 and 12–115, inclusive, illustrate the details of the circuit details of the switching apparatus included in the switching center RUWP, which apparatus has incorporated therein the features of the invention outlined above. Referring generally to Figure 2 it will be noted that line circuits, cross office units, register assigners, translators, multiple call cross office units and outgoing channel units indicated by blocks therein, are each provided with different reference characters. In the detailed description, however register assigners will be generally referred to by the reference characters 1200; translators by the reference characters 3700; cross office units will generally be referred to by the reference characters 5400; multiple call units by characters 8600; line circuits by characters 400 and outgoing channel units by characters 7000.

Figure 11 illustrates the manner in which a tape such as 383 is perforated by a reperforator to signify various characters.

Figure 117:
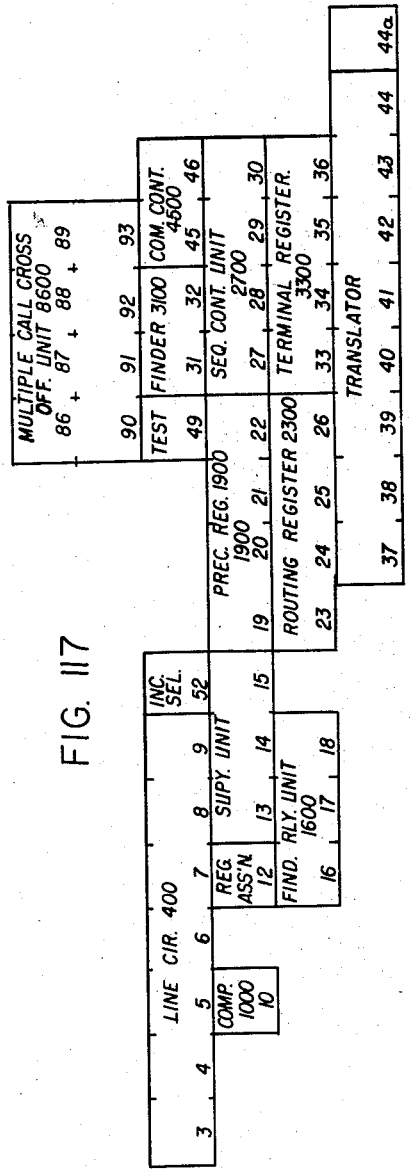
Figure 118:
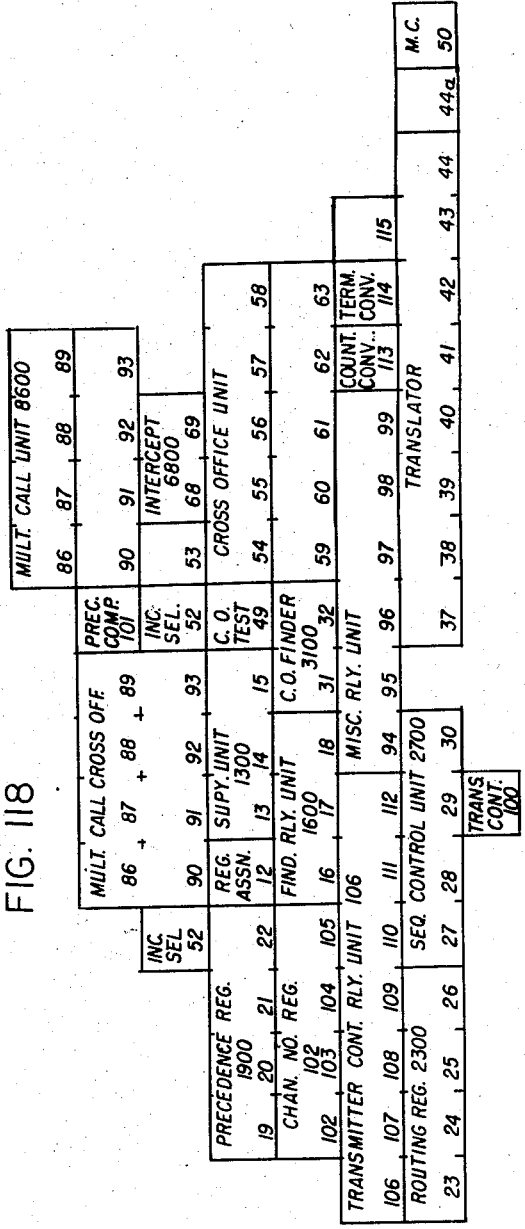

Figures 116, 117 and 118 disclose the manner in which the various drawings should be arranged to enable the invention to be comprehended most easily, when reading the specification. Figure 116 is intended to show the best arrangement for distributing the various figures when a cross office unit or intercept position is associated with an incoming line circuit. Figure 117 is intended to show the arrangement of the figures, when a multiple call unit is connected to a line circuit, and Figure 118 is intended to show the arrangement for distributing the figures when a cross office unit and/or intercept position and/or multiple call cross office unit are connected to a multiple call cross office unit.

More specifically, Figures 3 to 10, inclusive, illustrate the details of one of a plurality of incoming line circuits such as 400 and 400A provided at the relay switching center RUWP.

Figures 12, 13:
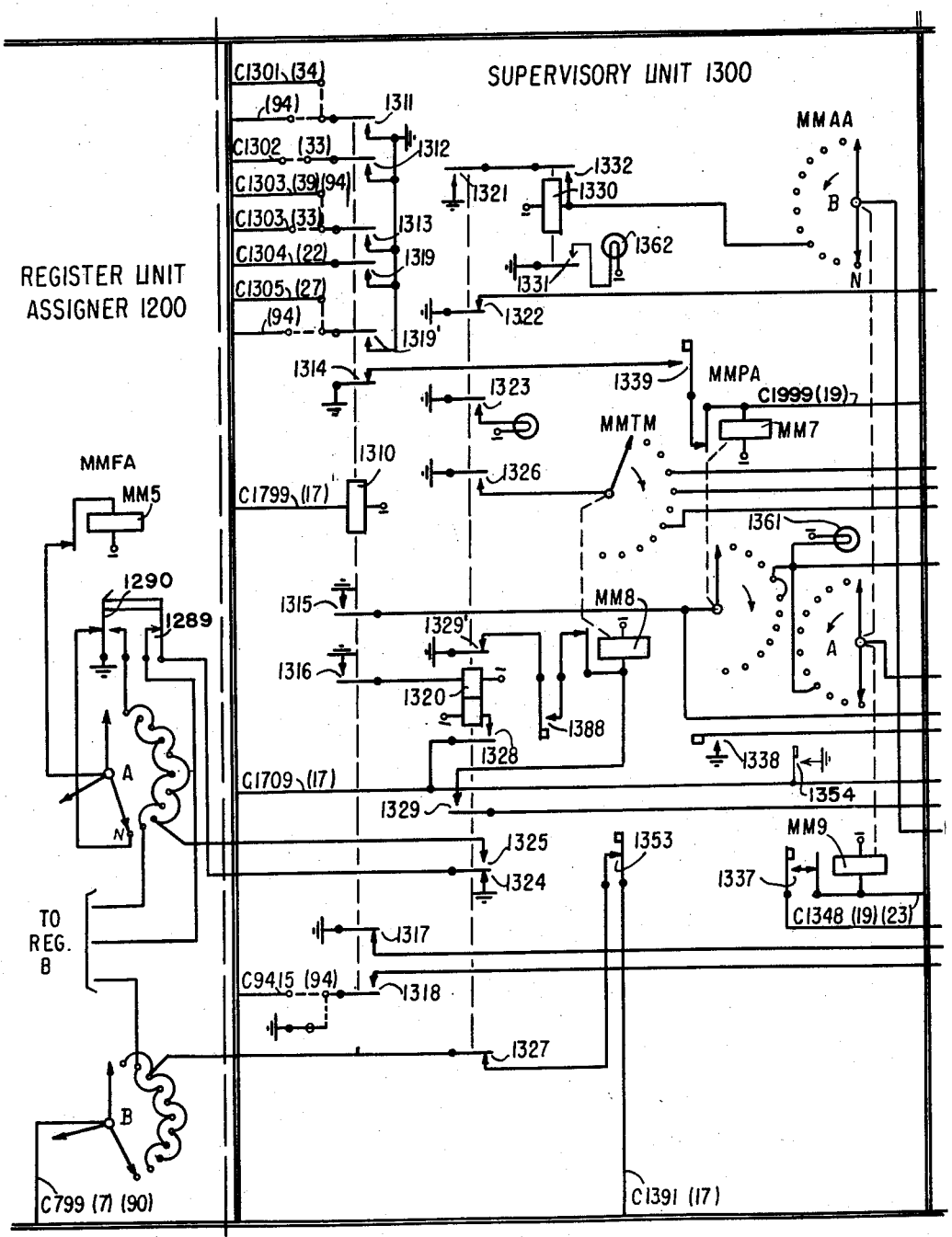

Figure 12 illustrates the details of a register assigner, such as 1200, used for assigning one of a plurality of registers (A and B) to an incoming line. One register assigner 1200 is used for registers A and B, and one, such as 1200A, is used for registers C and D although it will be understood that, if desired, assignment may be made from a group comprising more than two registers.

Figure 14:
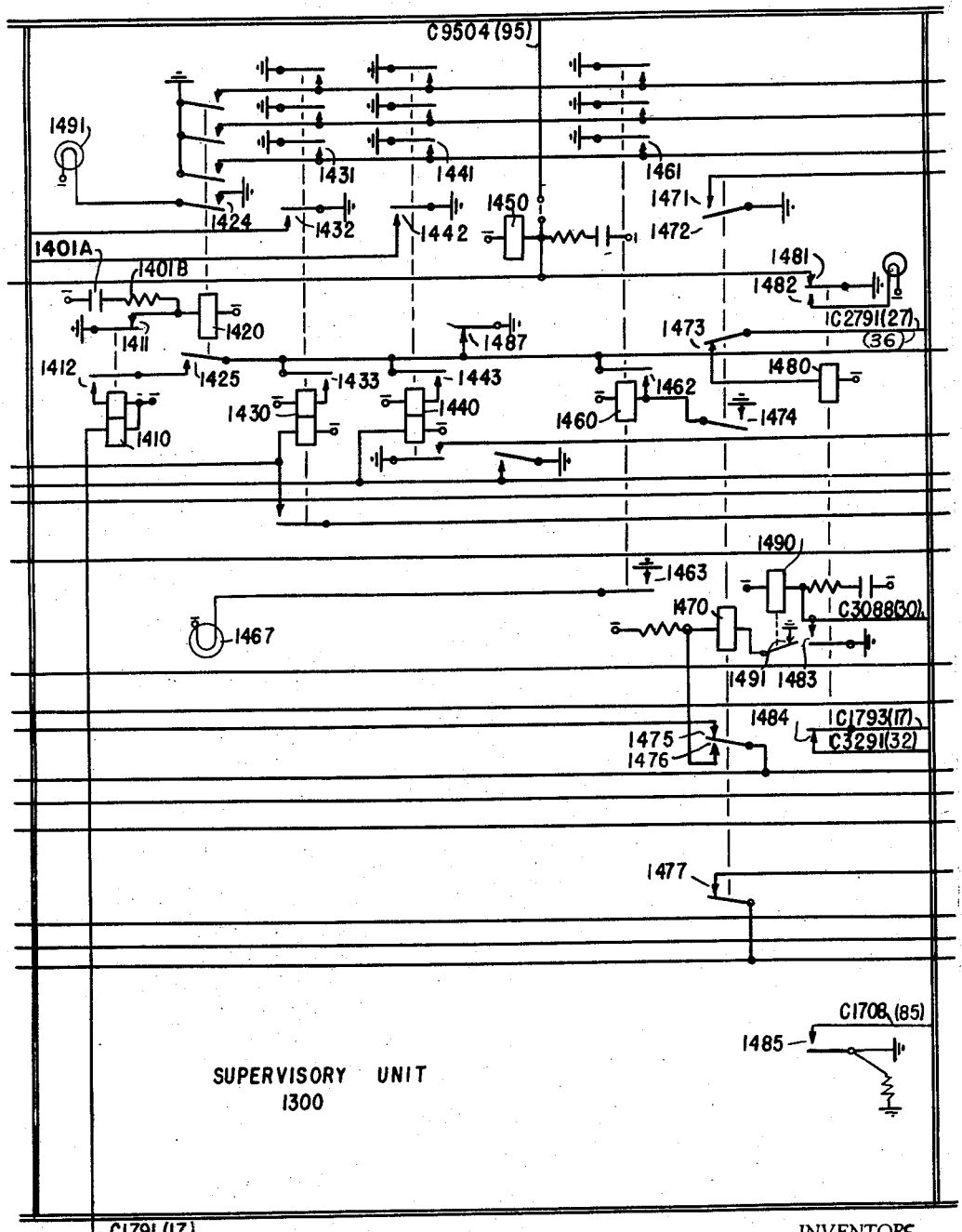
Figure 15:
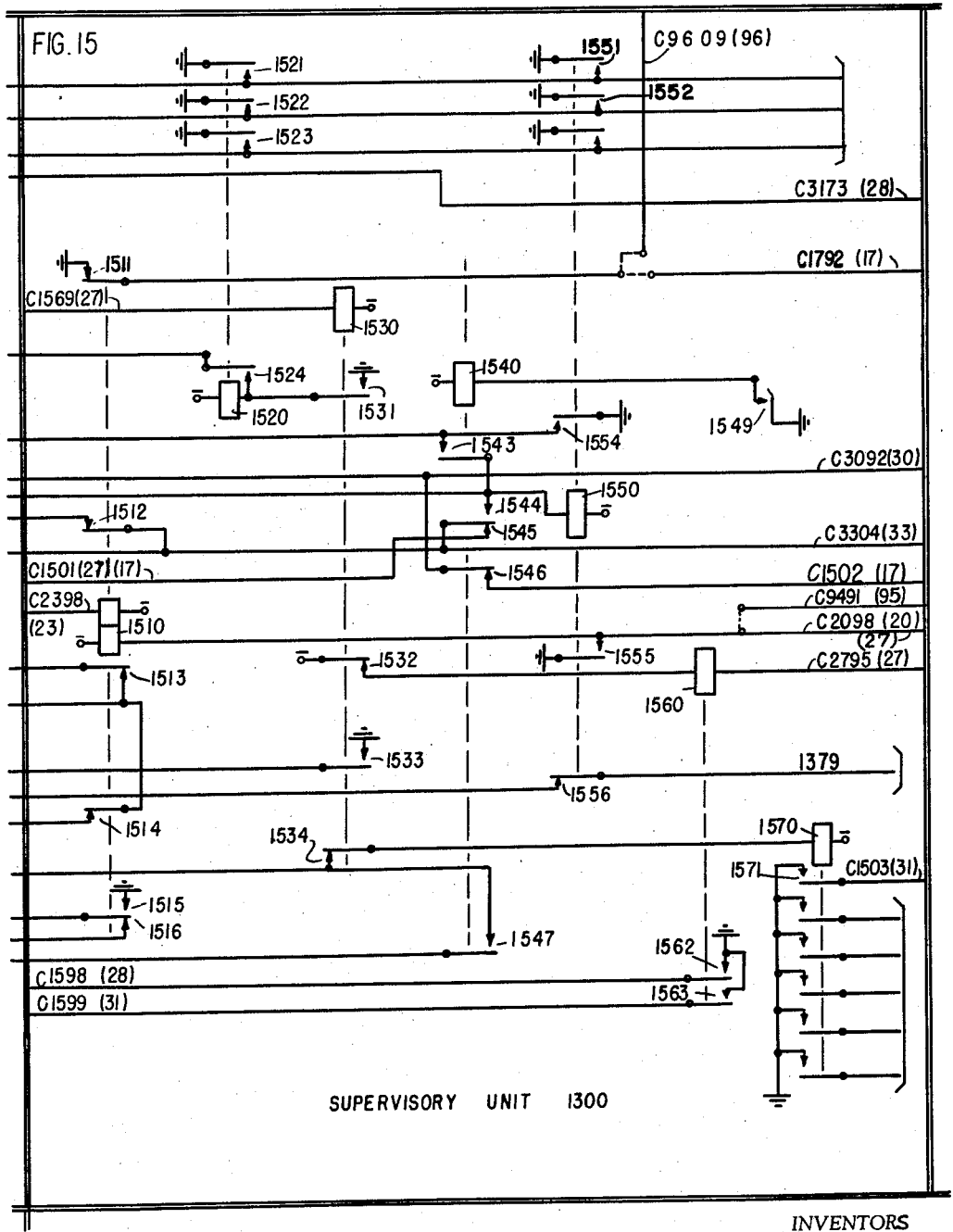
Figure 16:
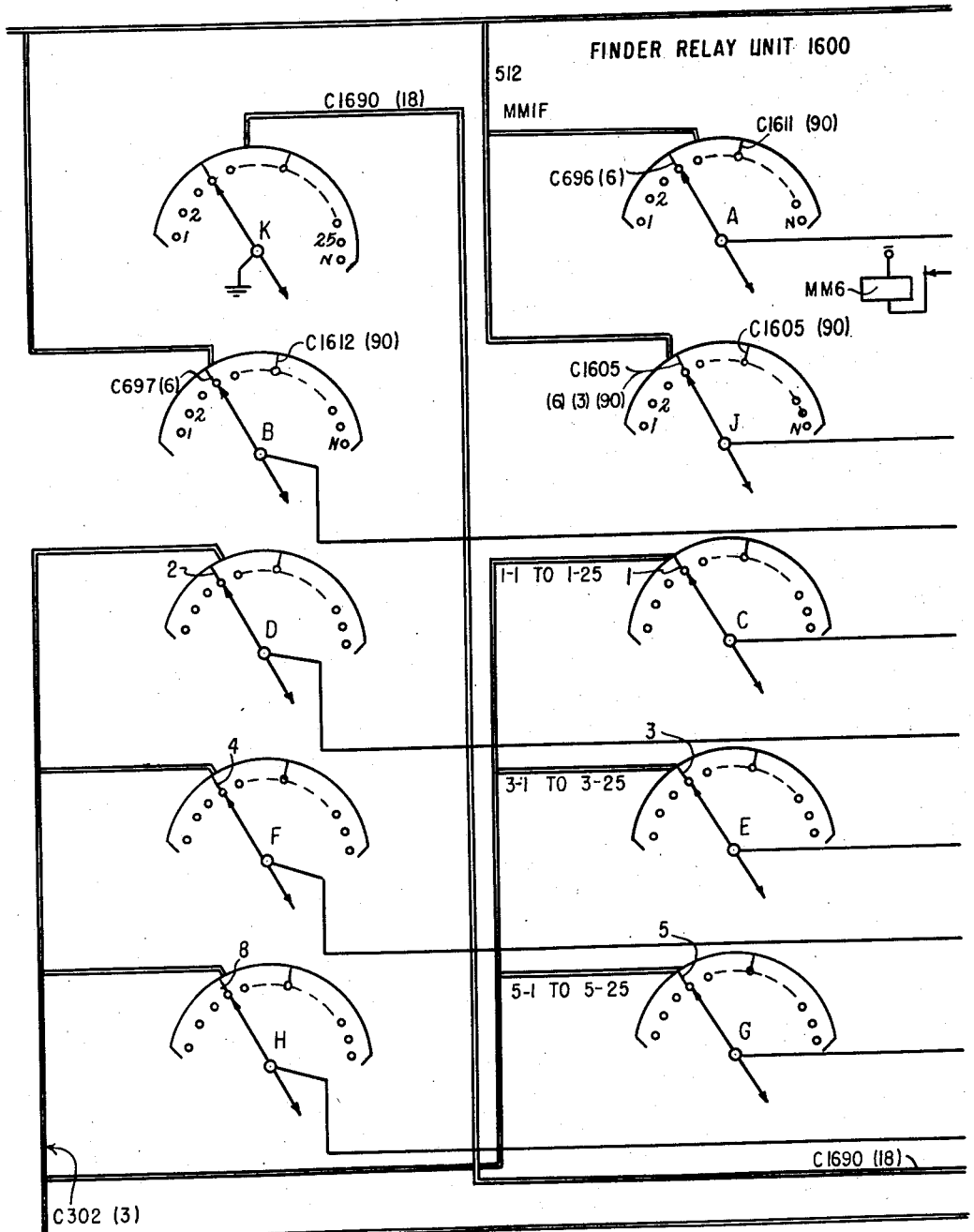
Figure 17:
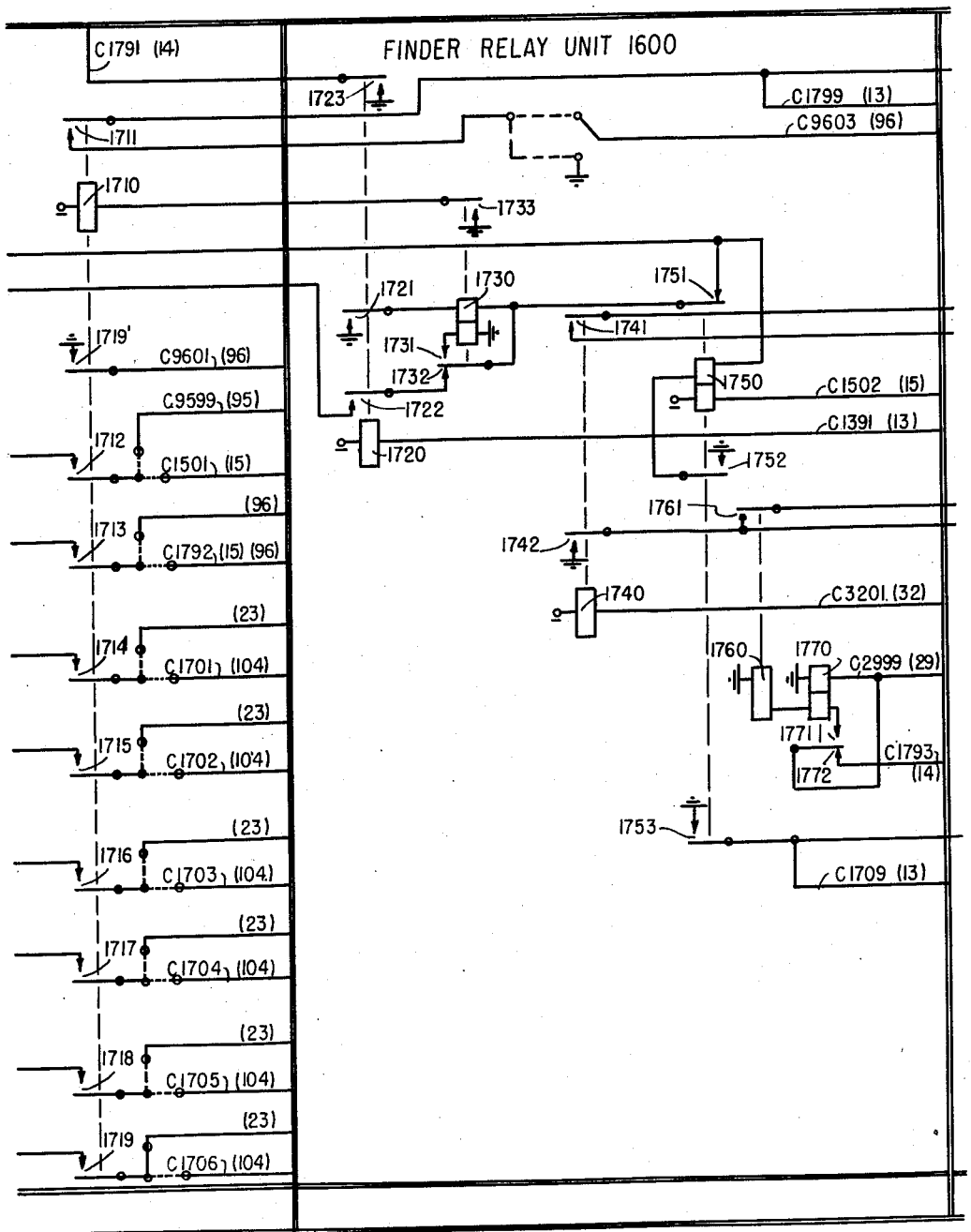
Figure 18:
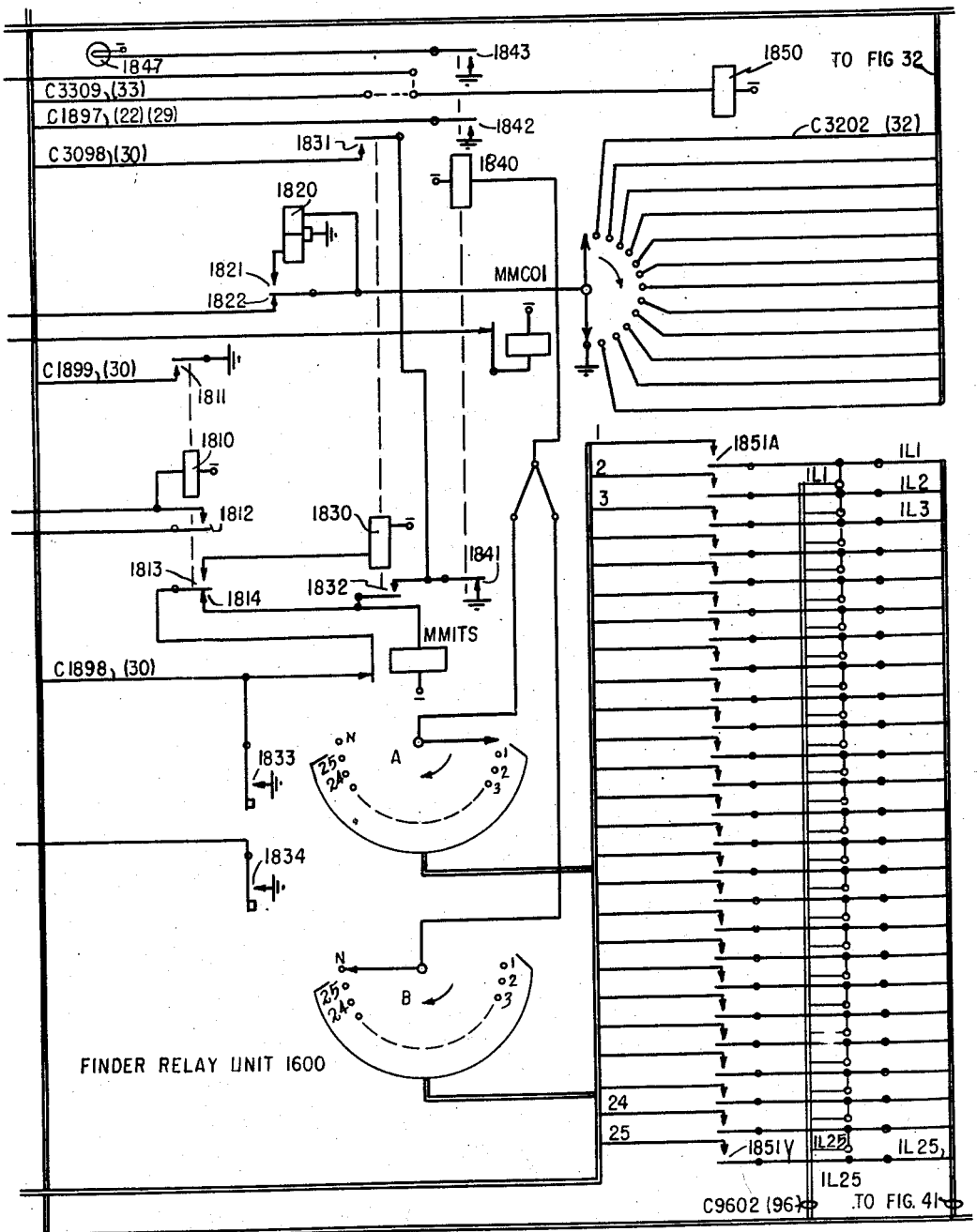
Figure 19:
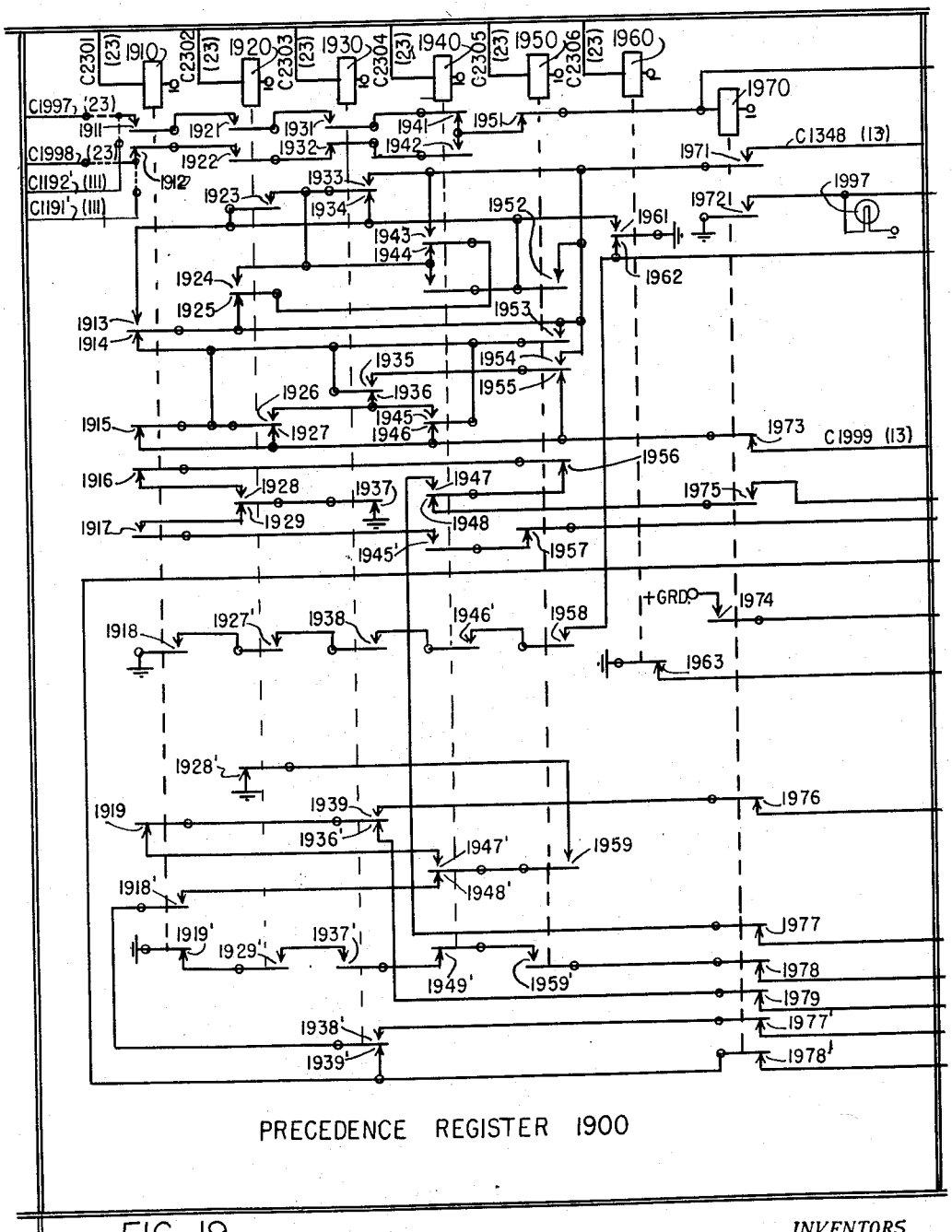
Figure 20:
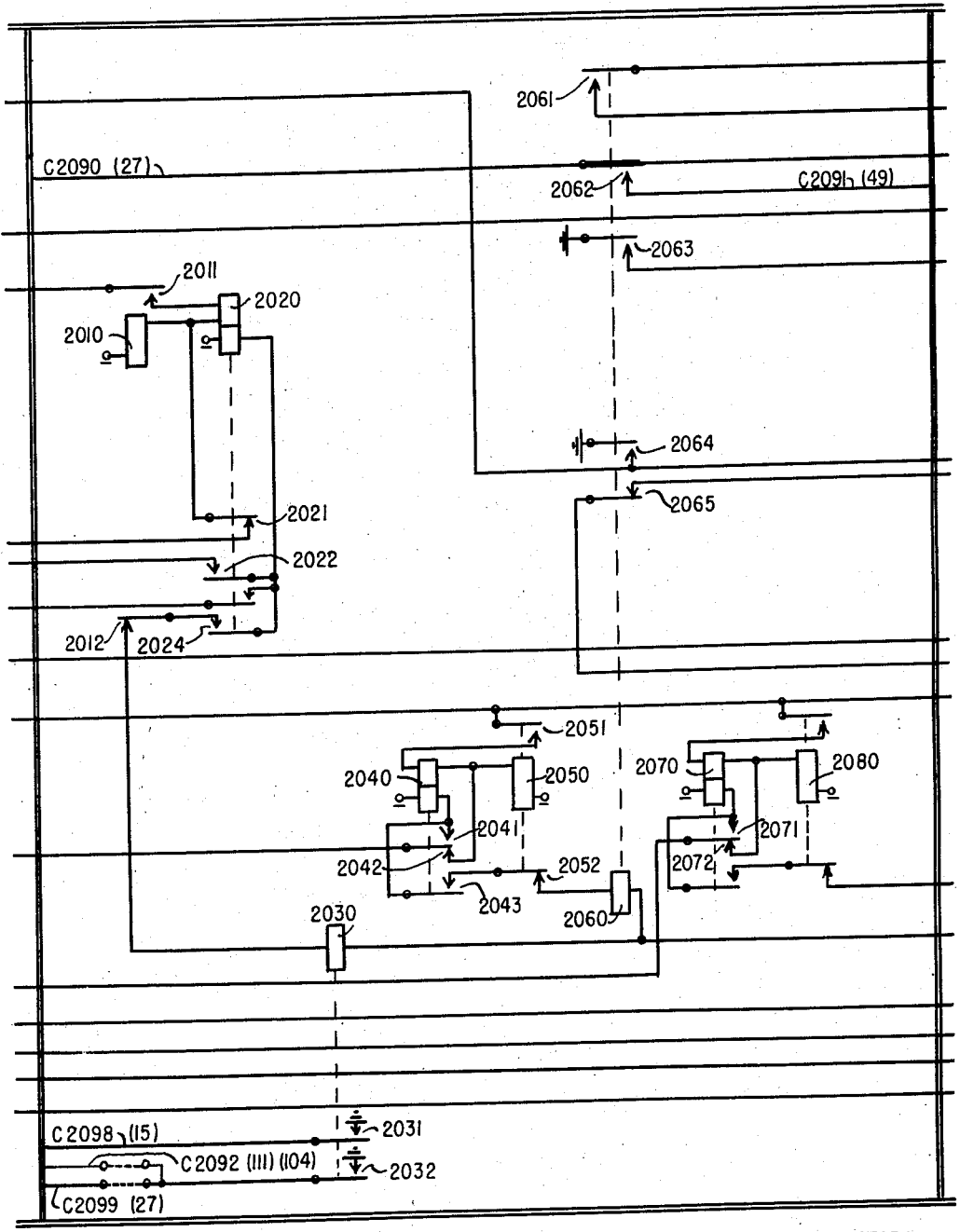
Figure 21:
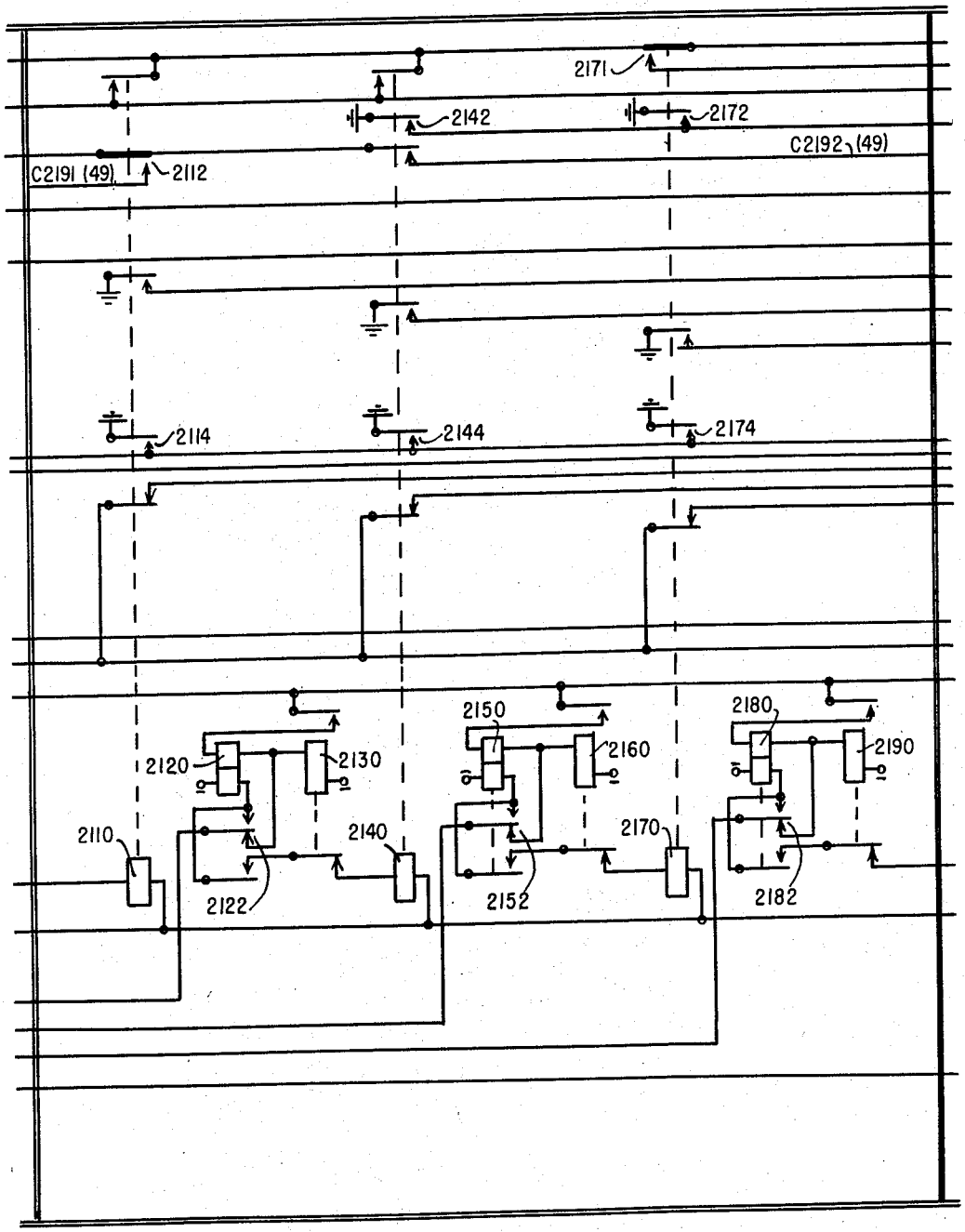
Figure 22:
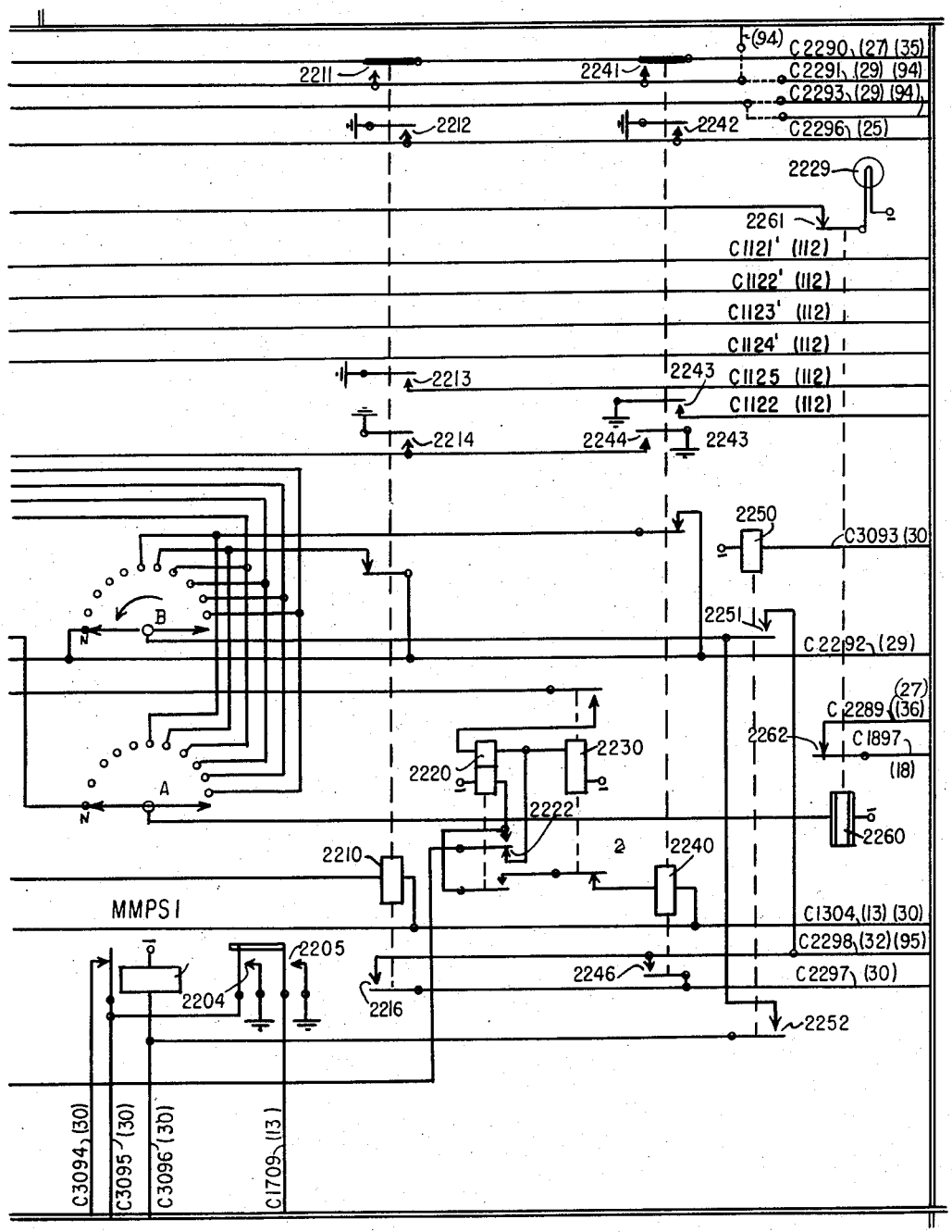
Figure 23:
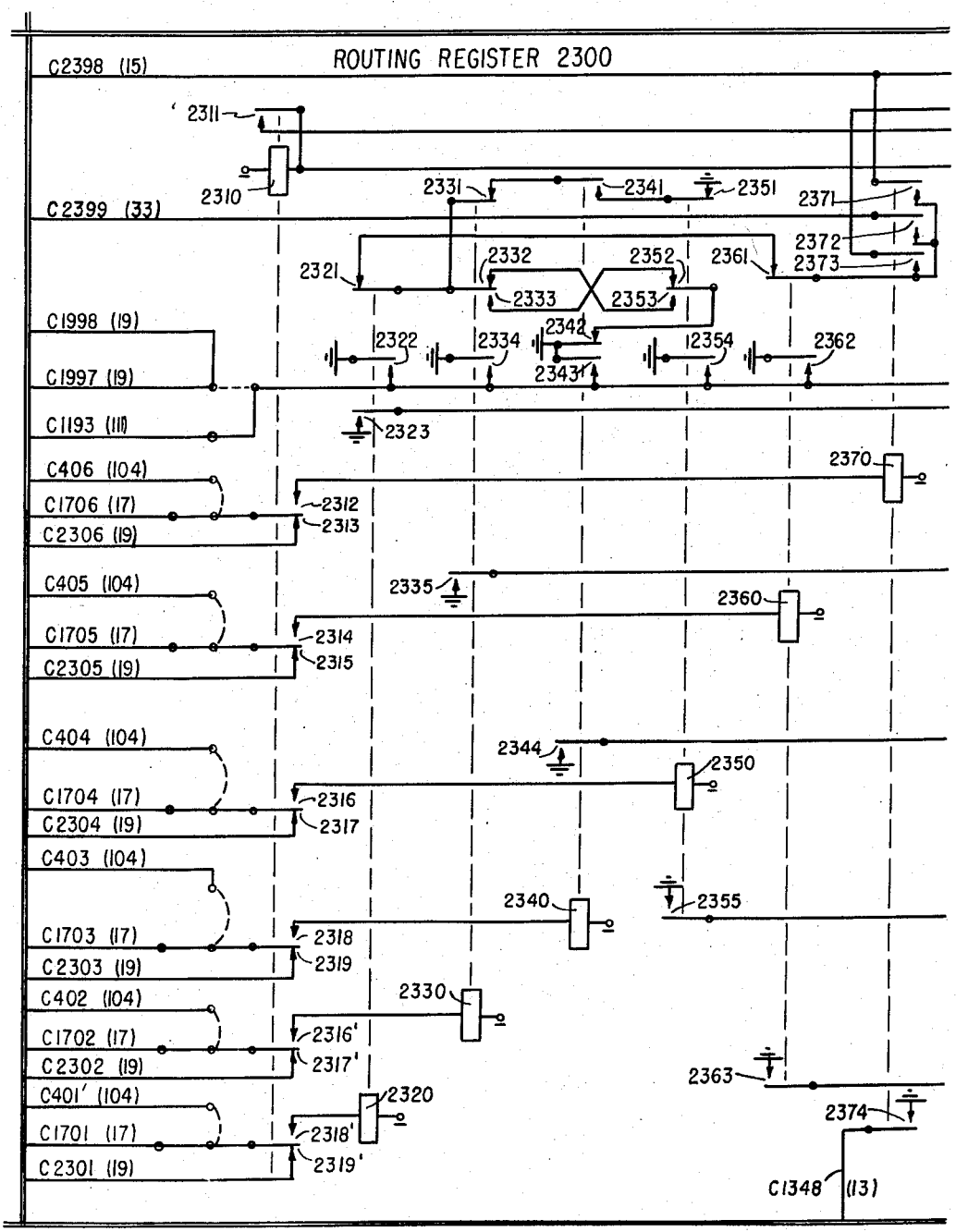
Figure 24:
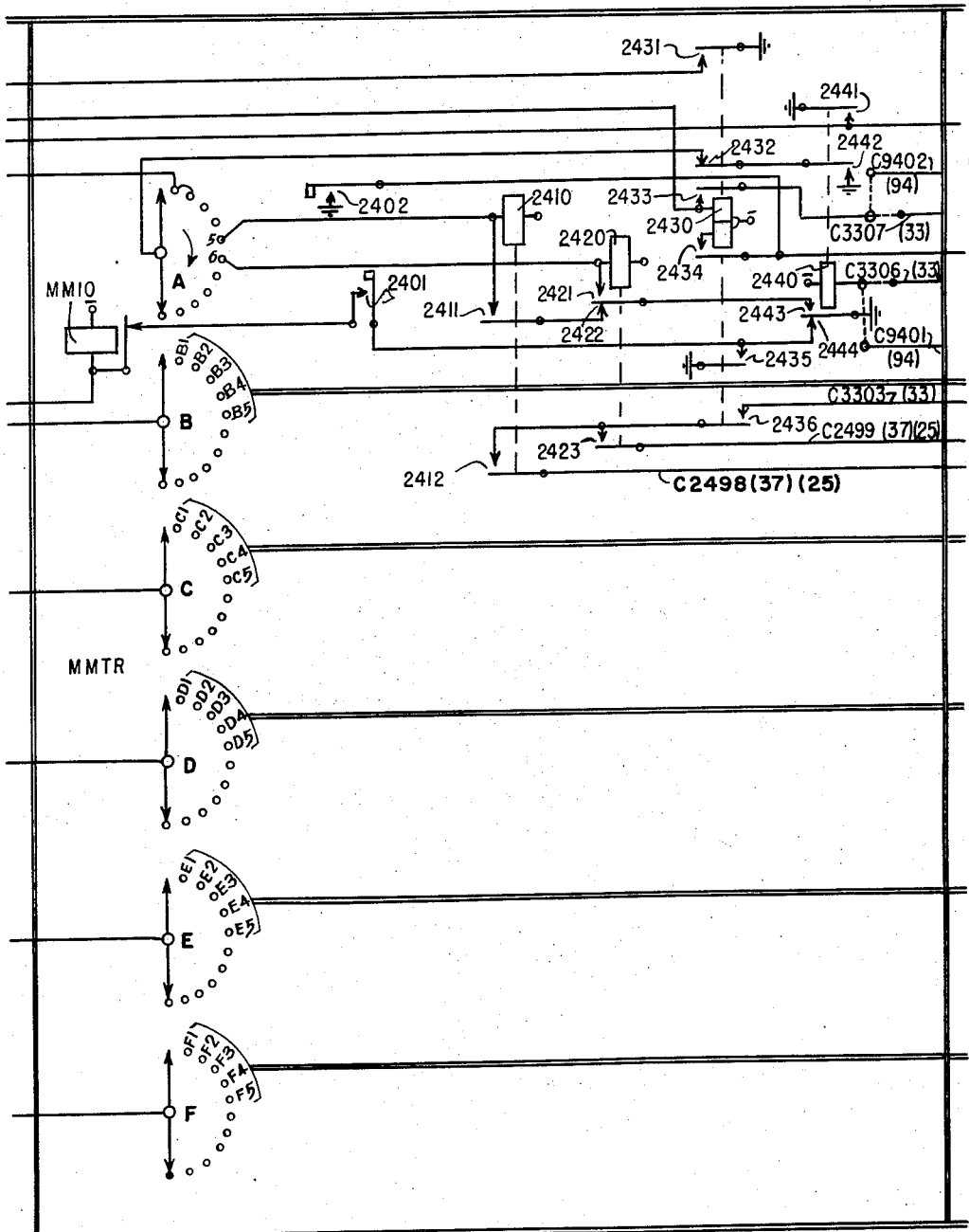
Figure 25:
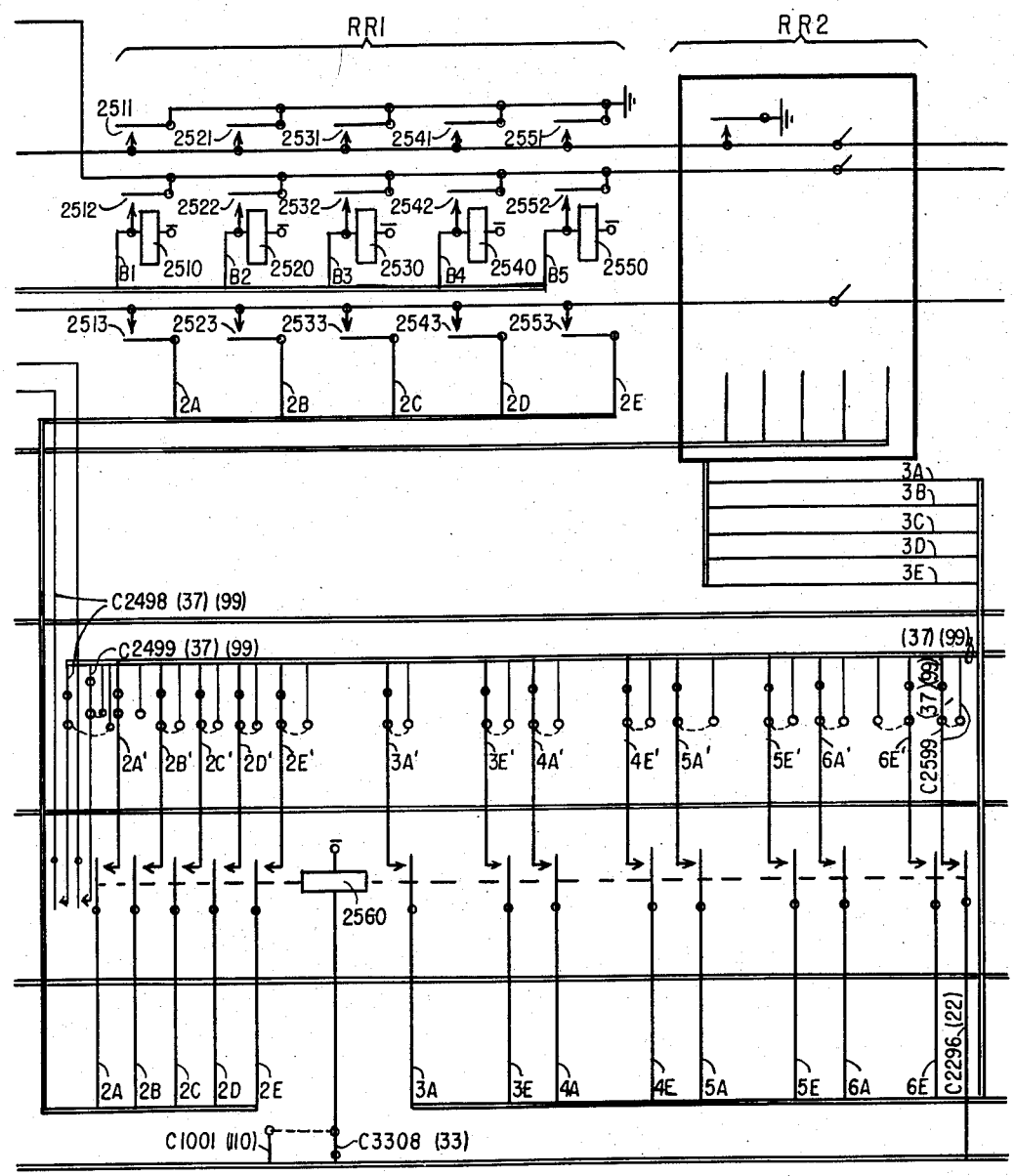
Figure 26:
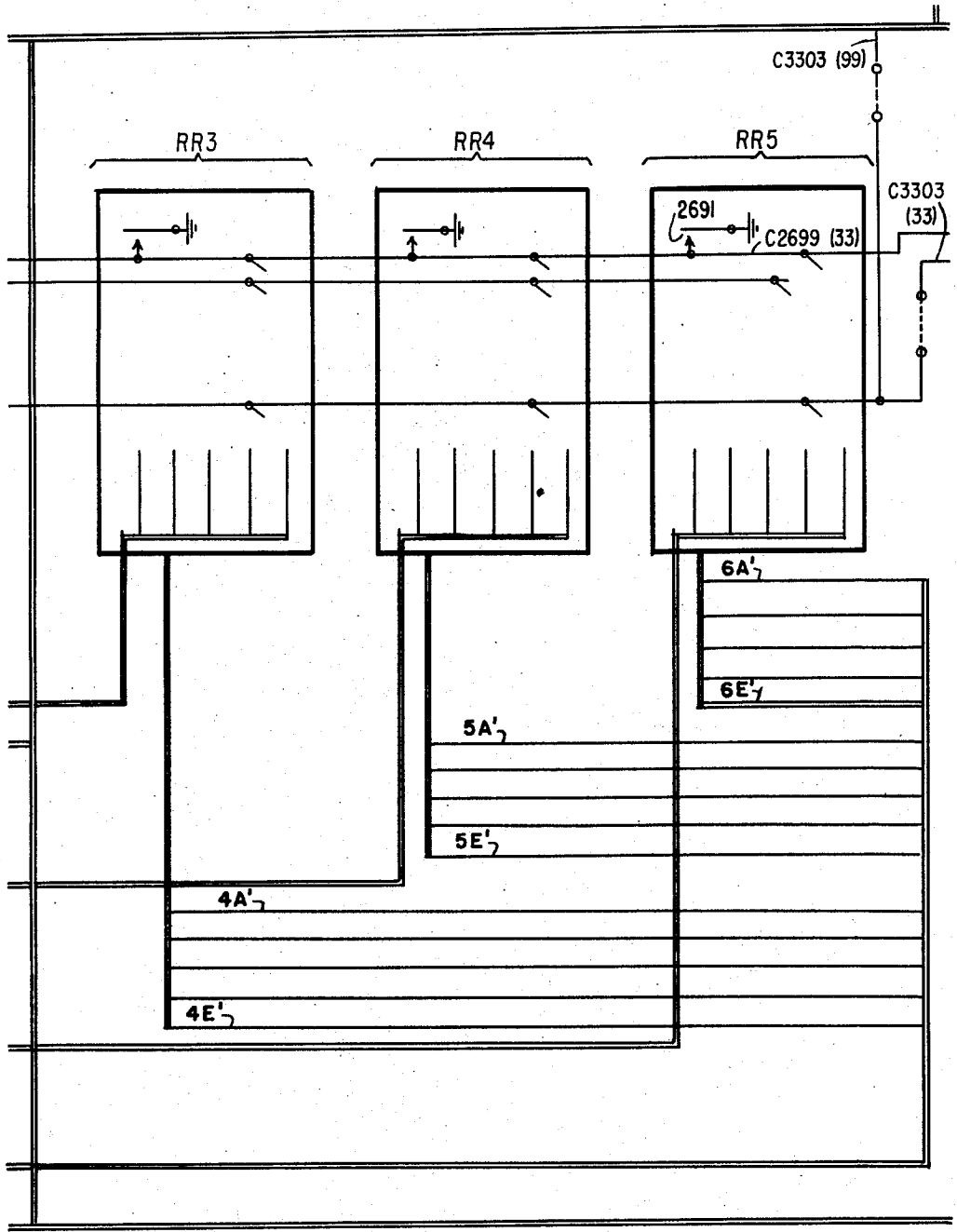
Figure 27:
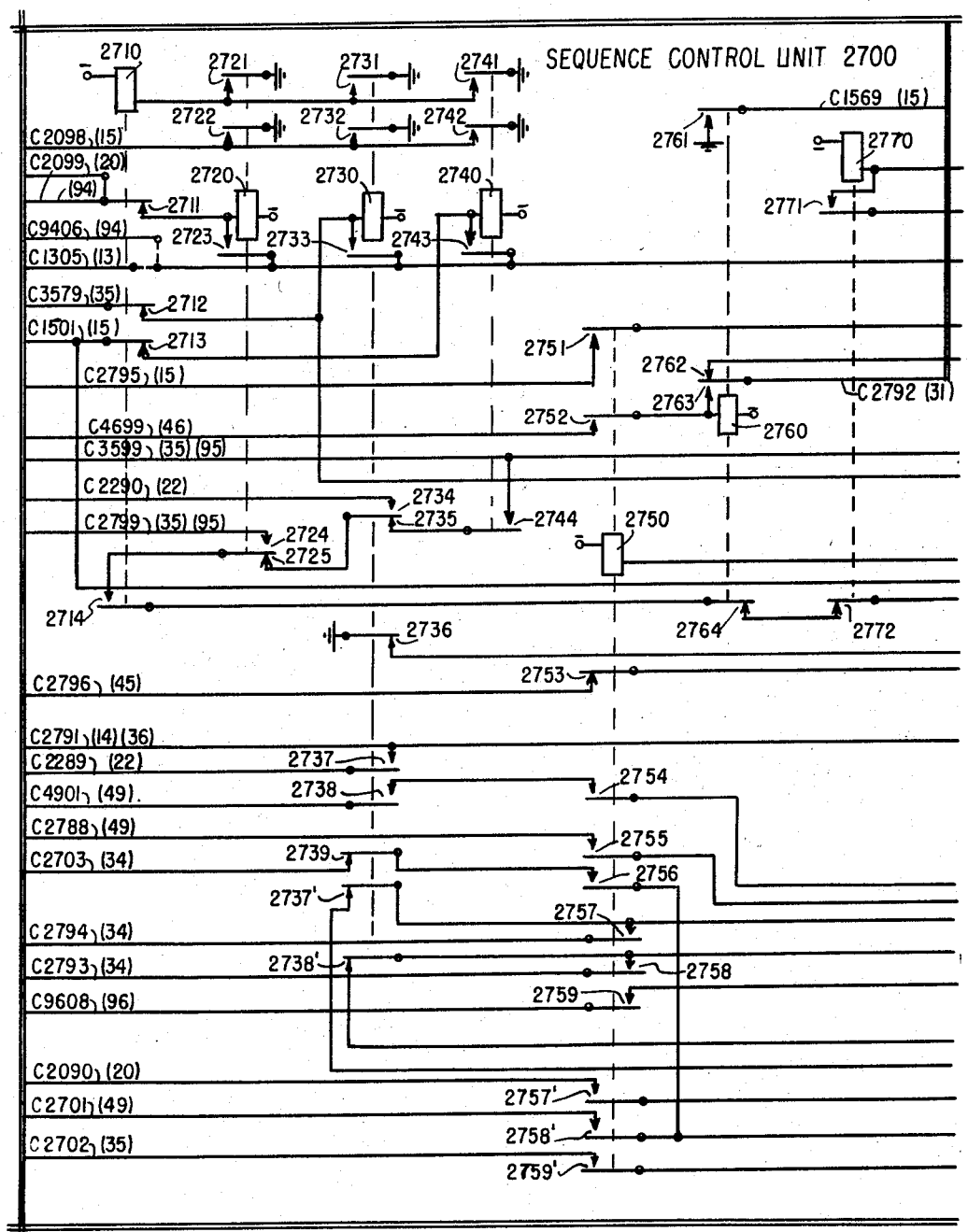
Figure 28:
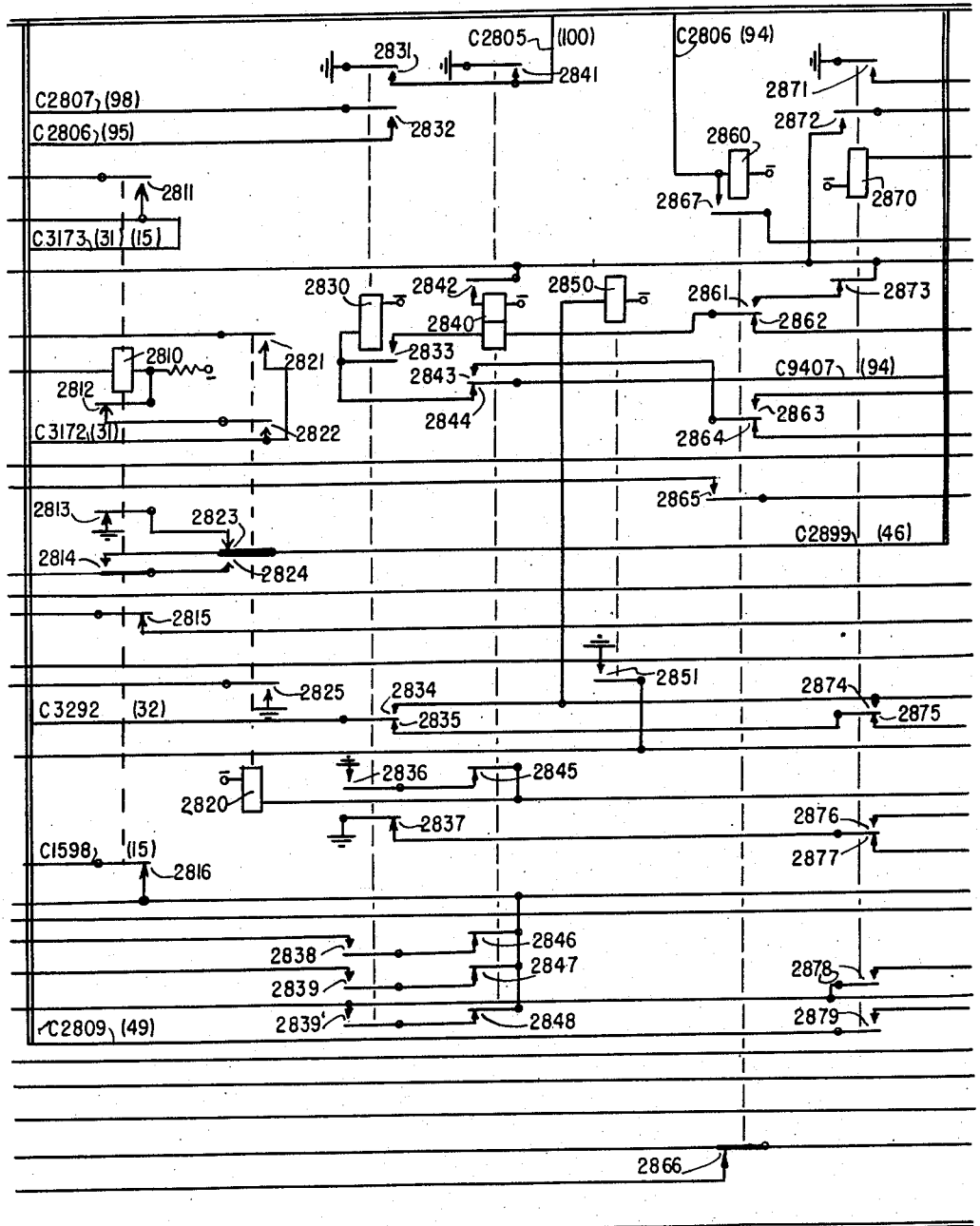
Figure 29:
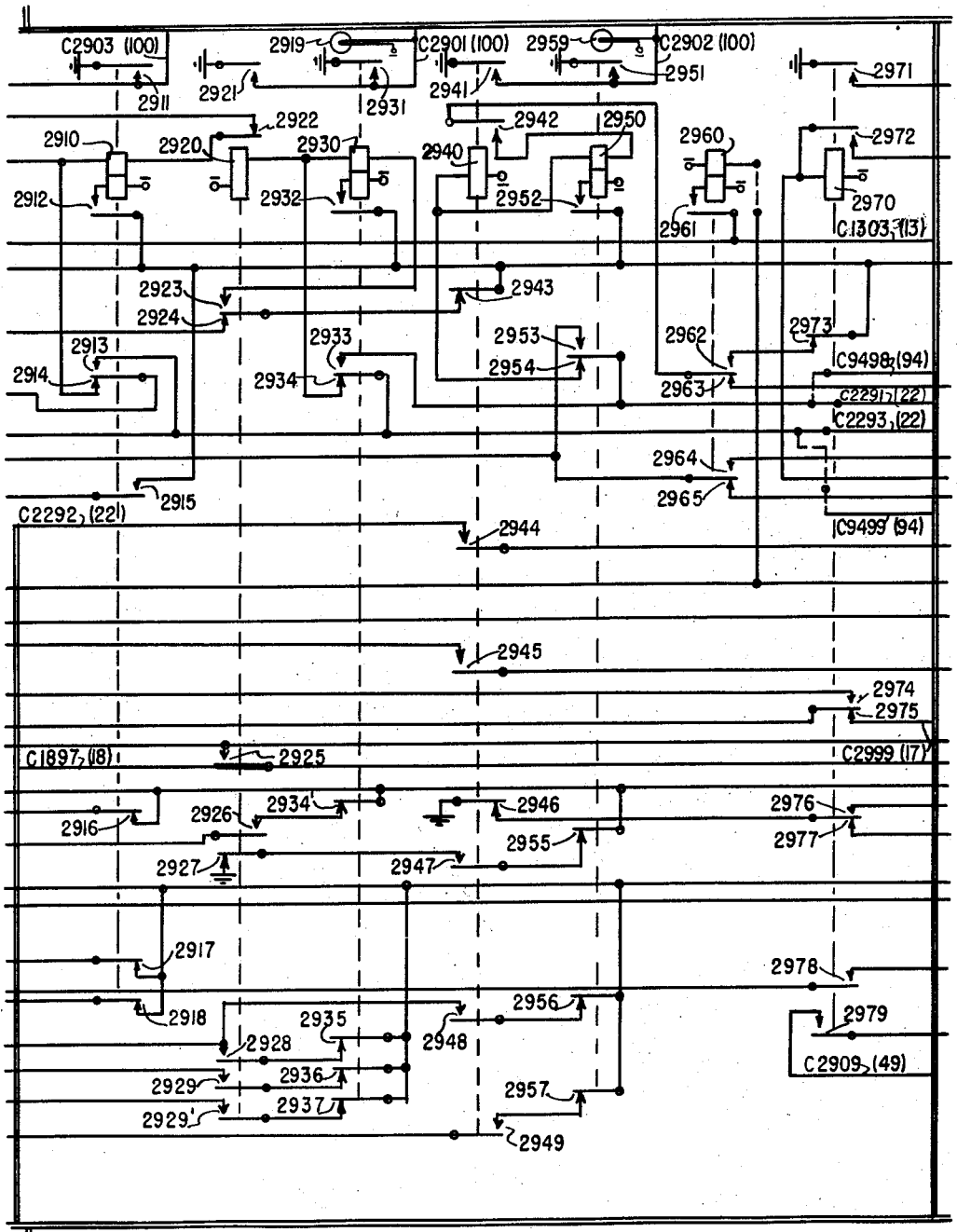
Figure 30:
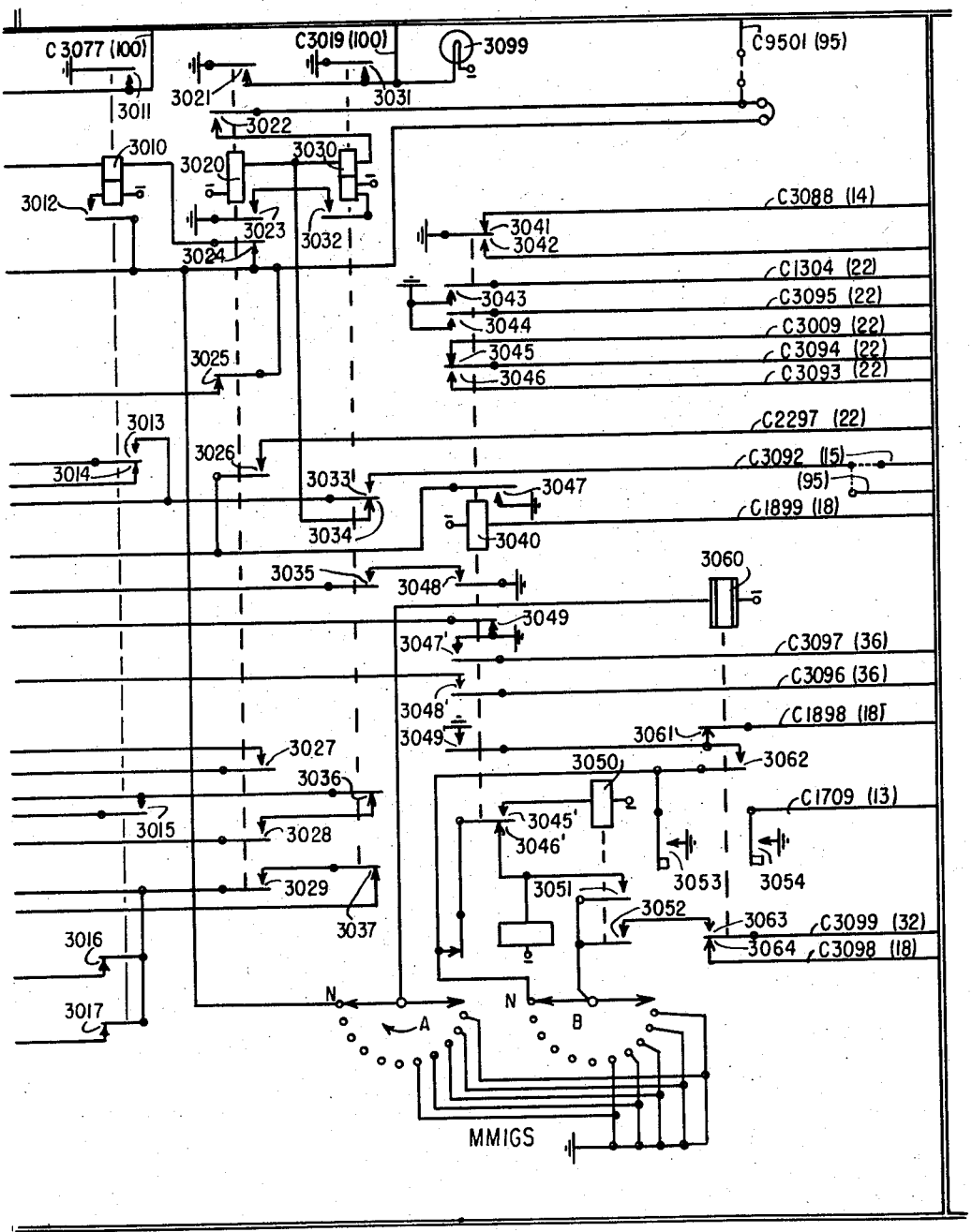
Figure 31:
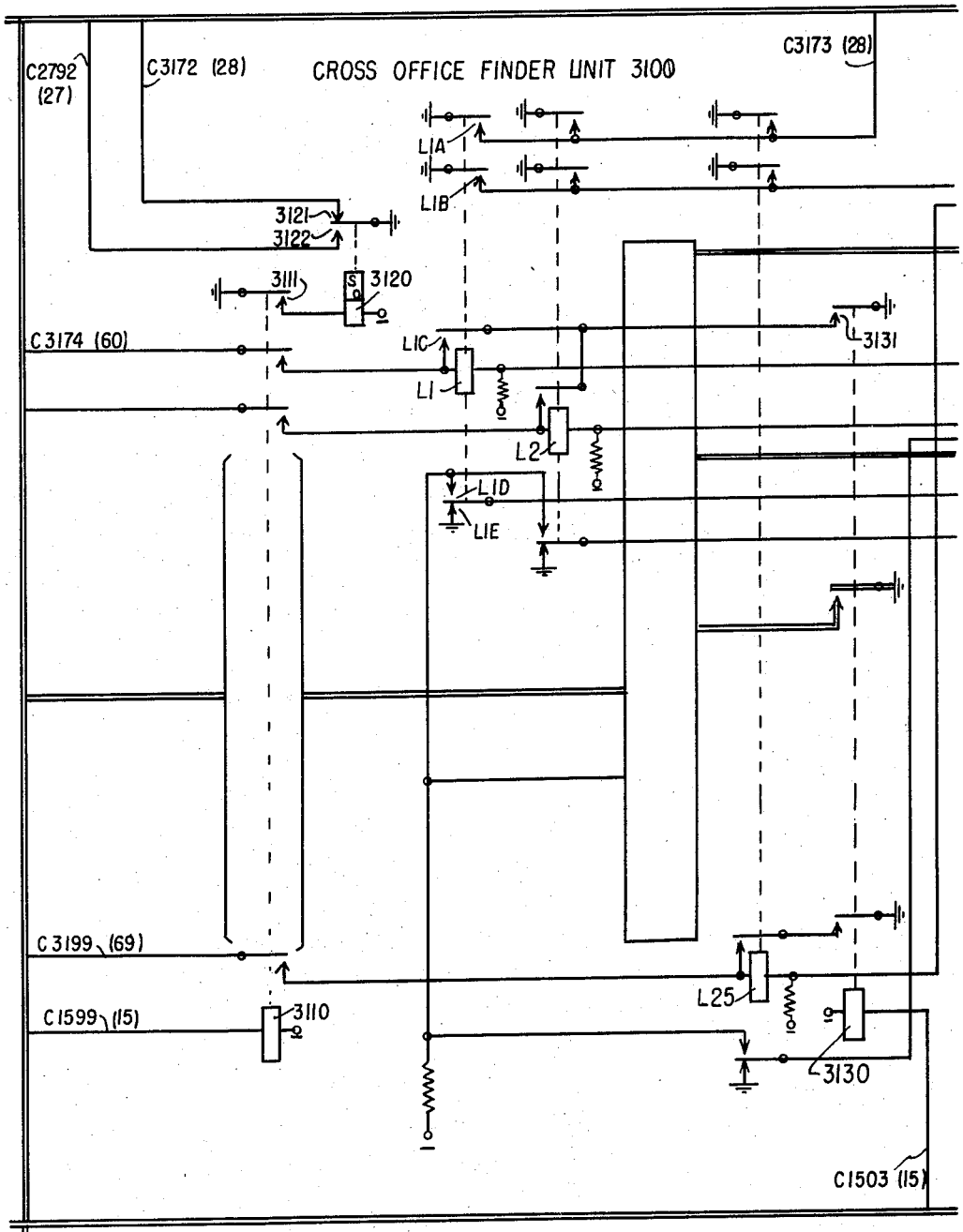
Figure 32:
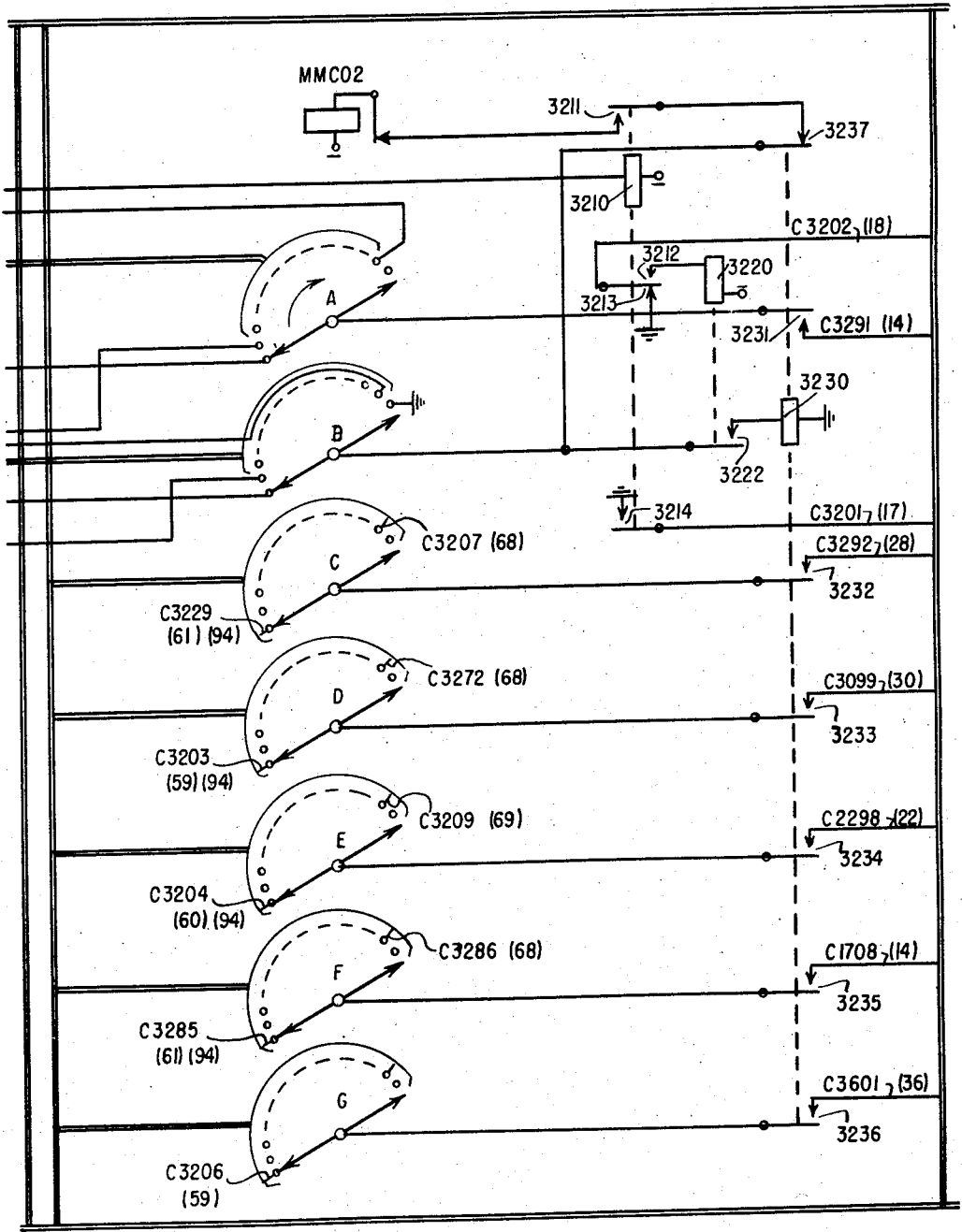
Figure 33:
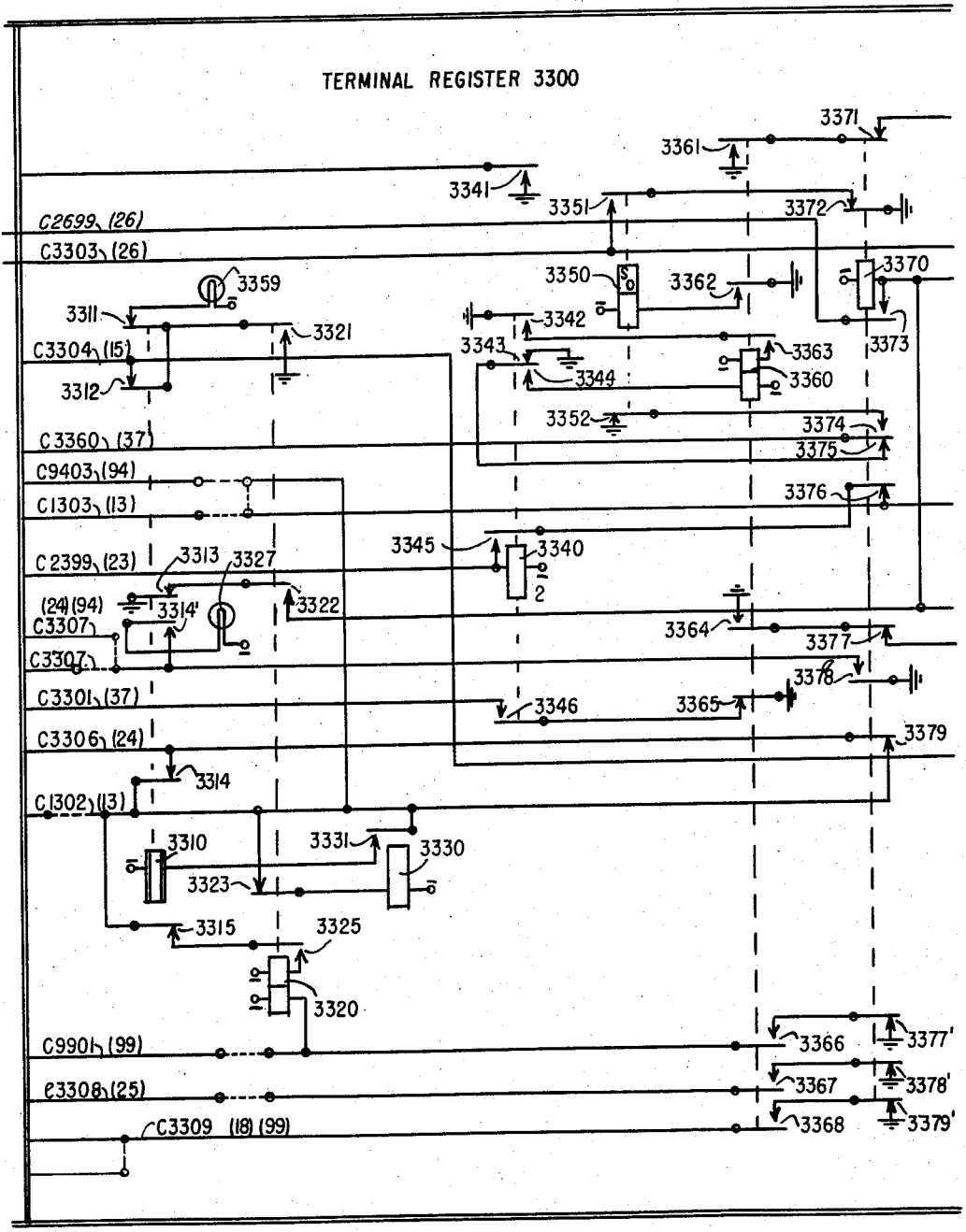
Figure 34:
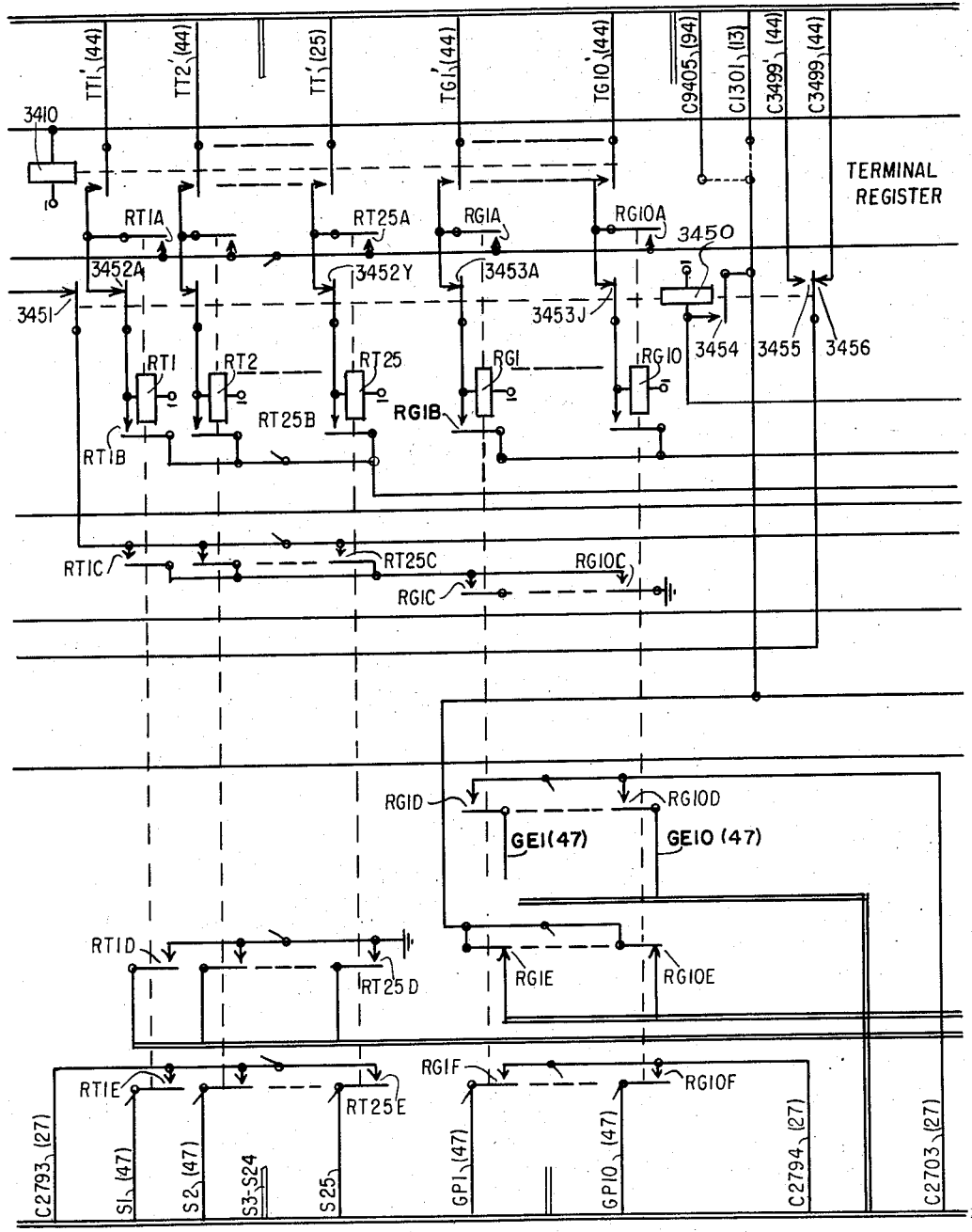
Figure 35:
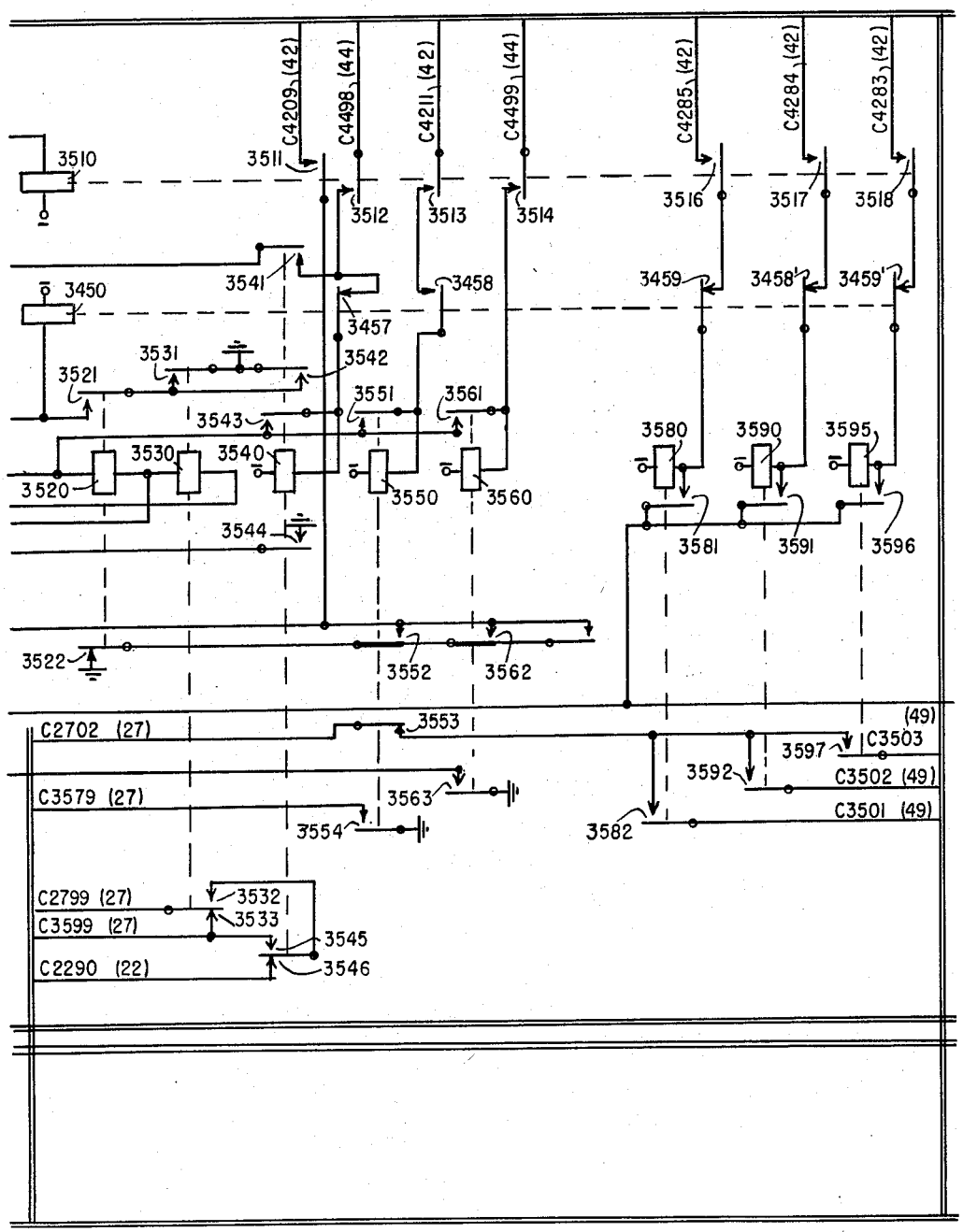
Figure 36:
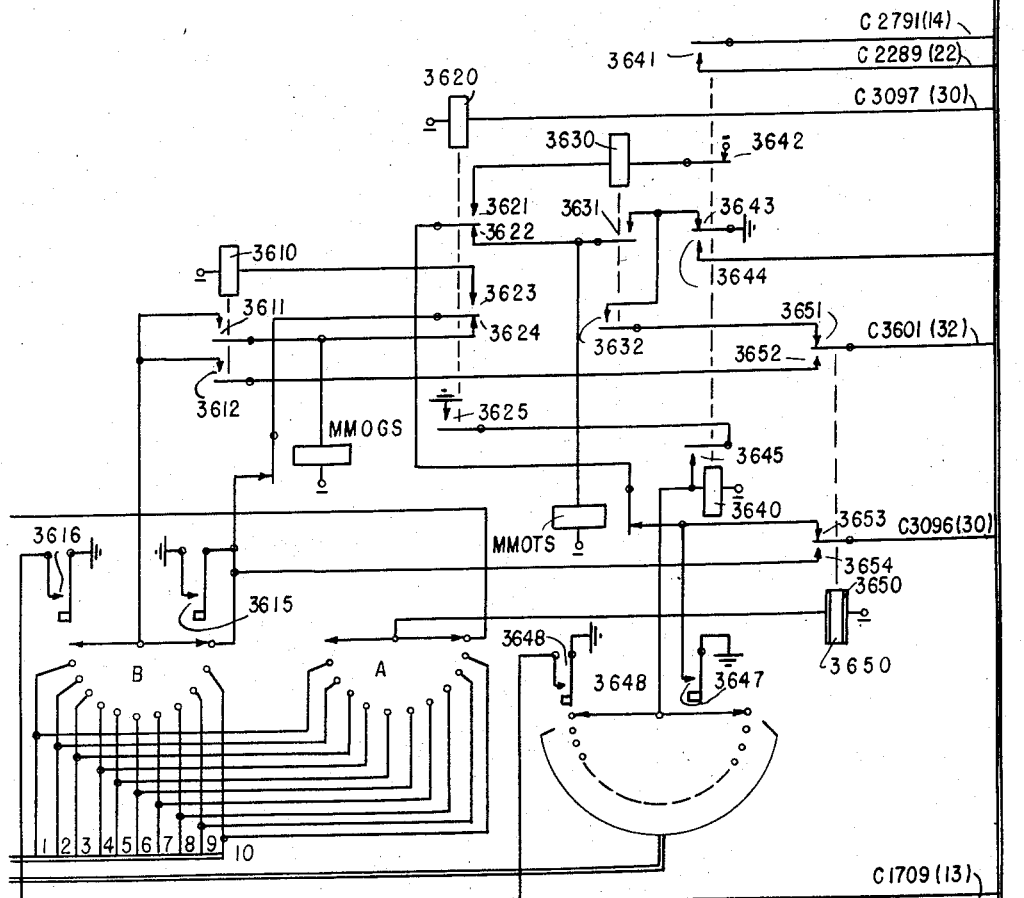
Figure 37:
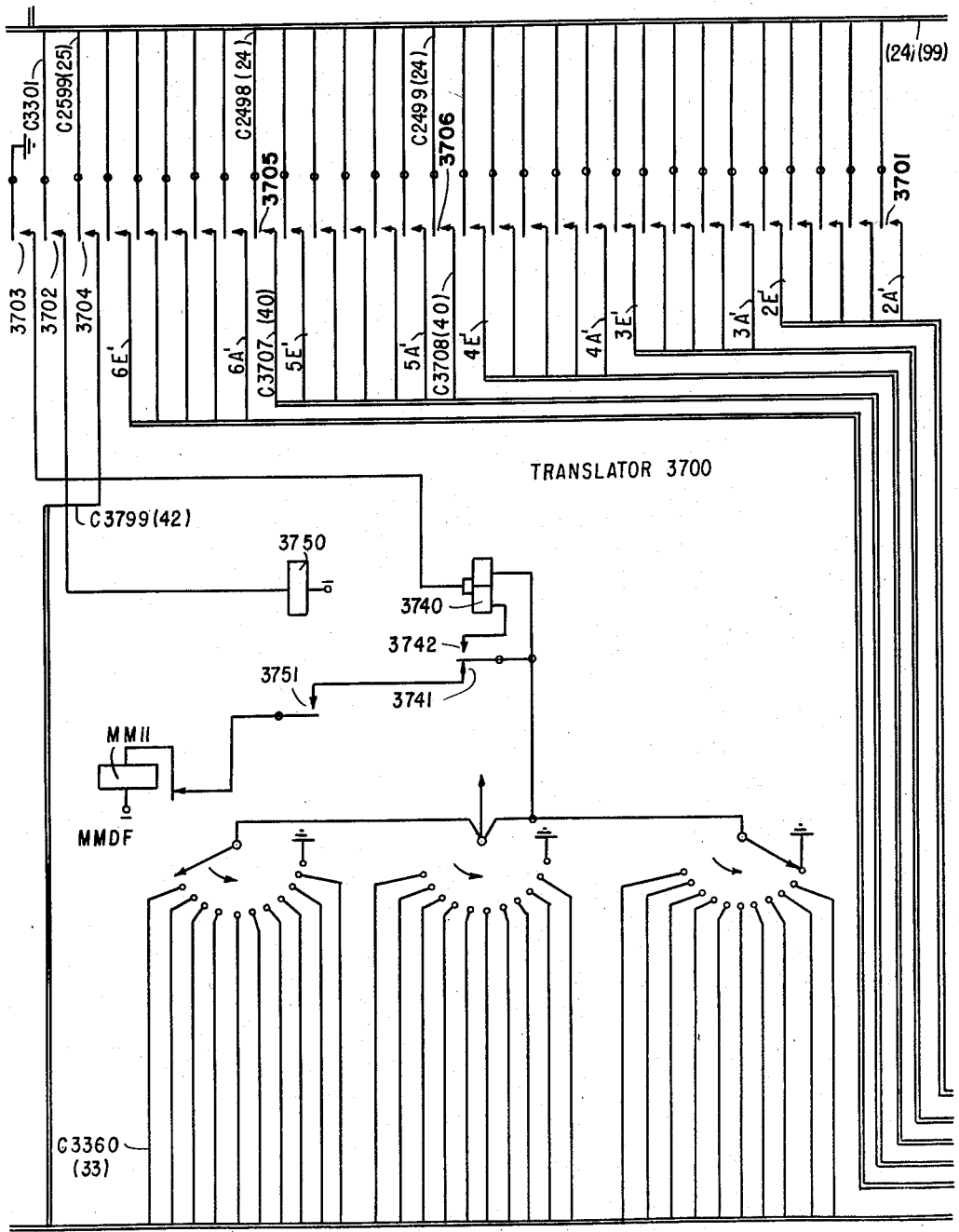
Figure 38:
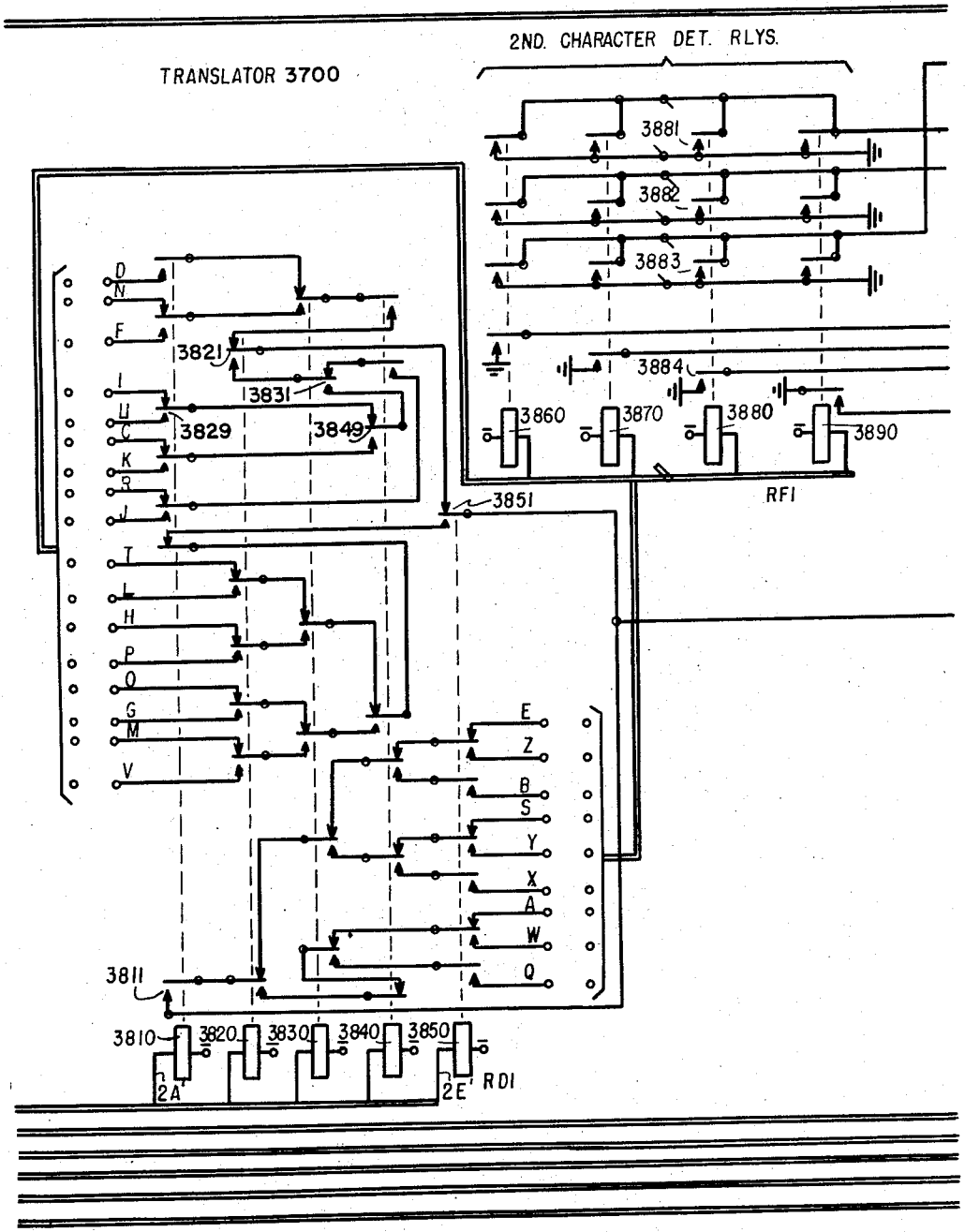
Figure 39:
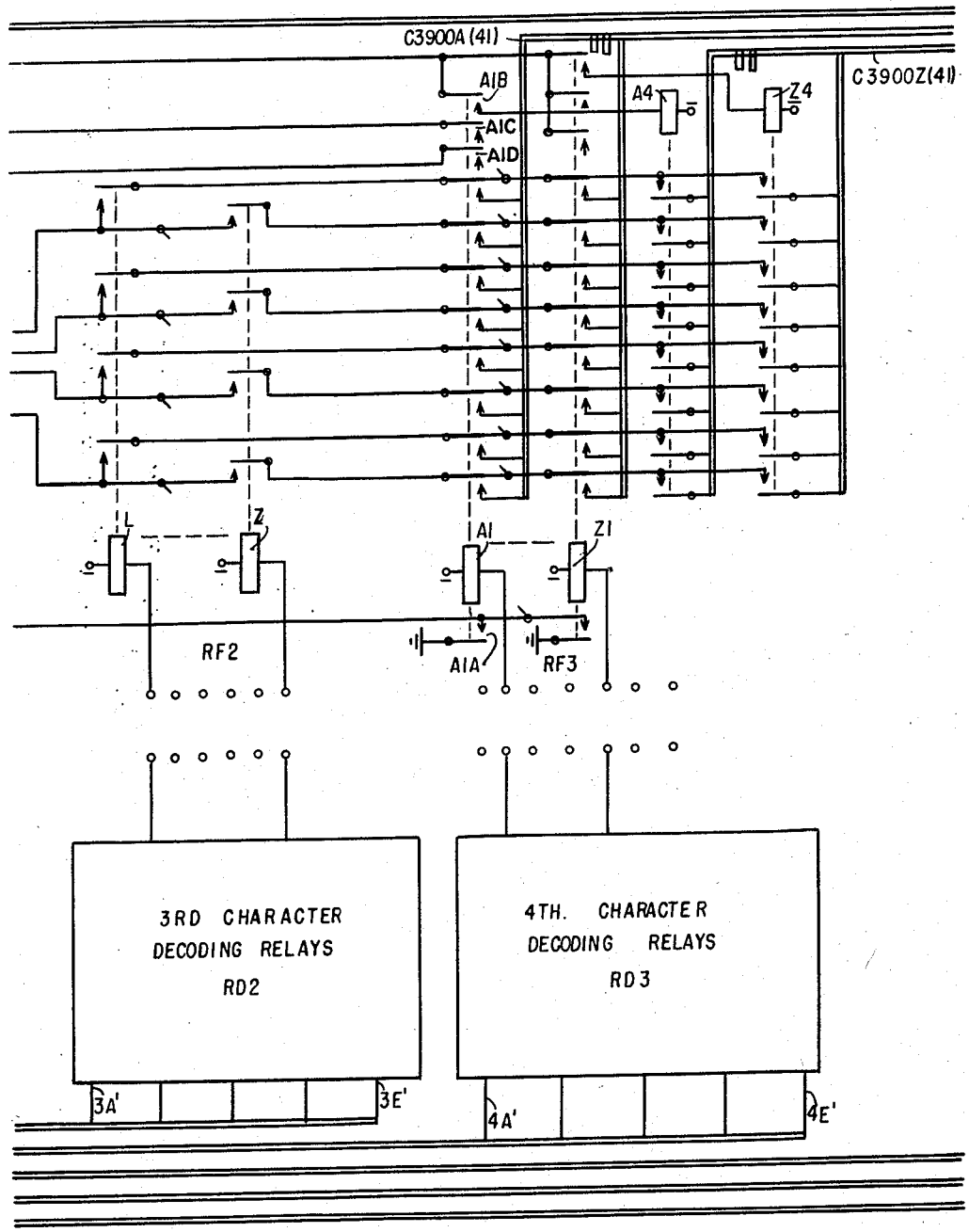
Figure 40:
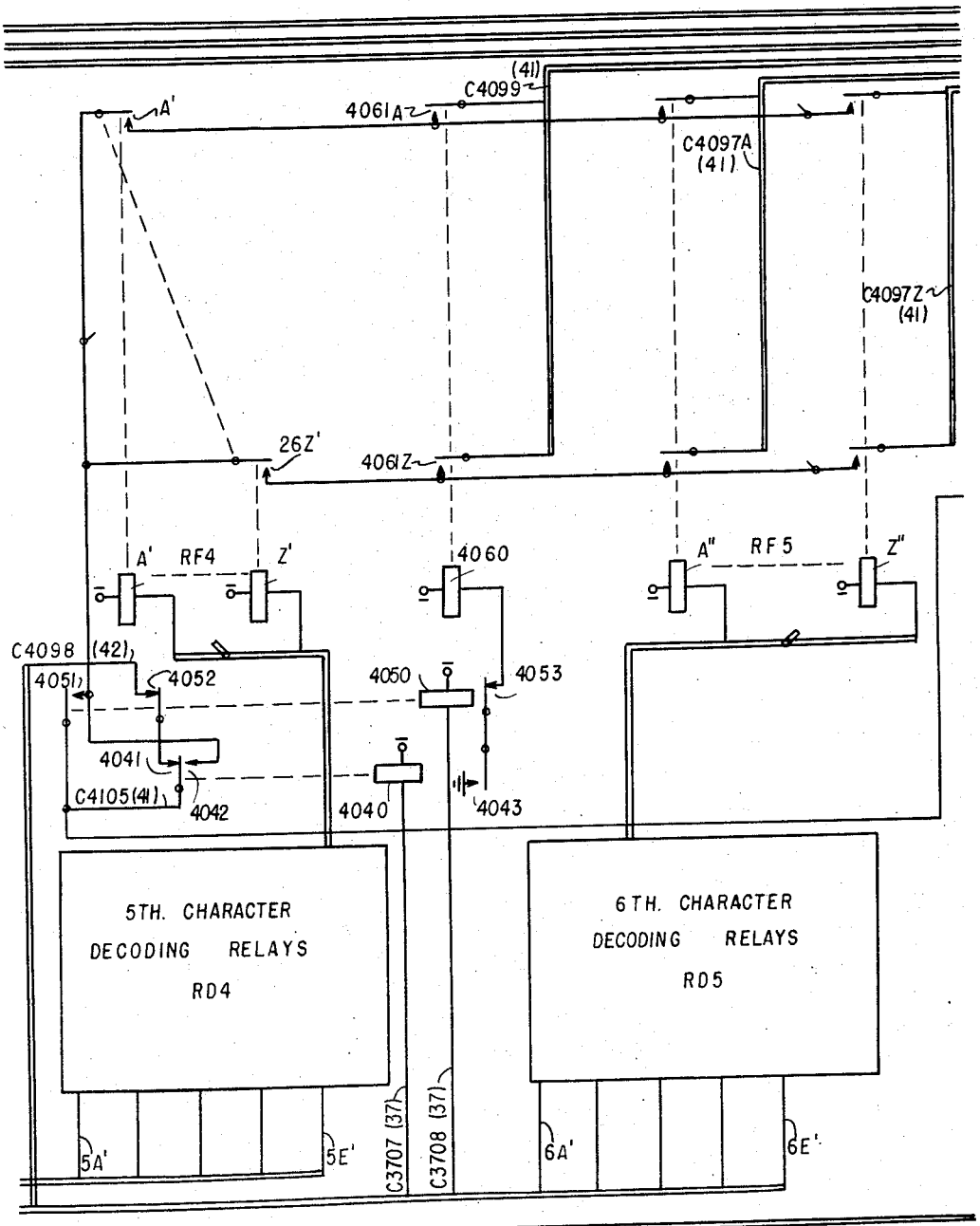
Figure 42:
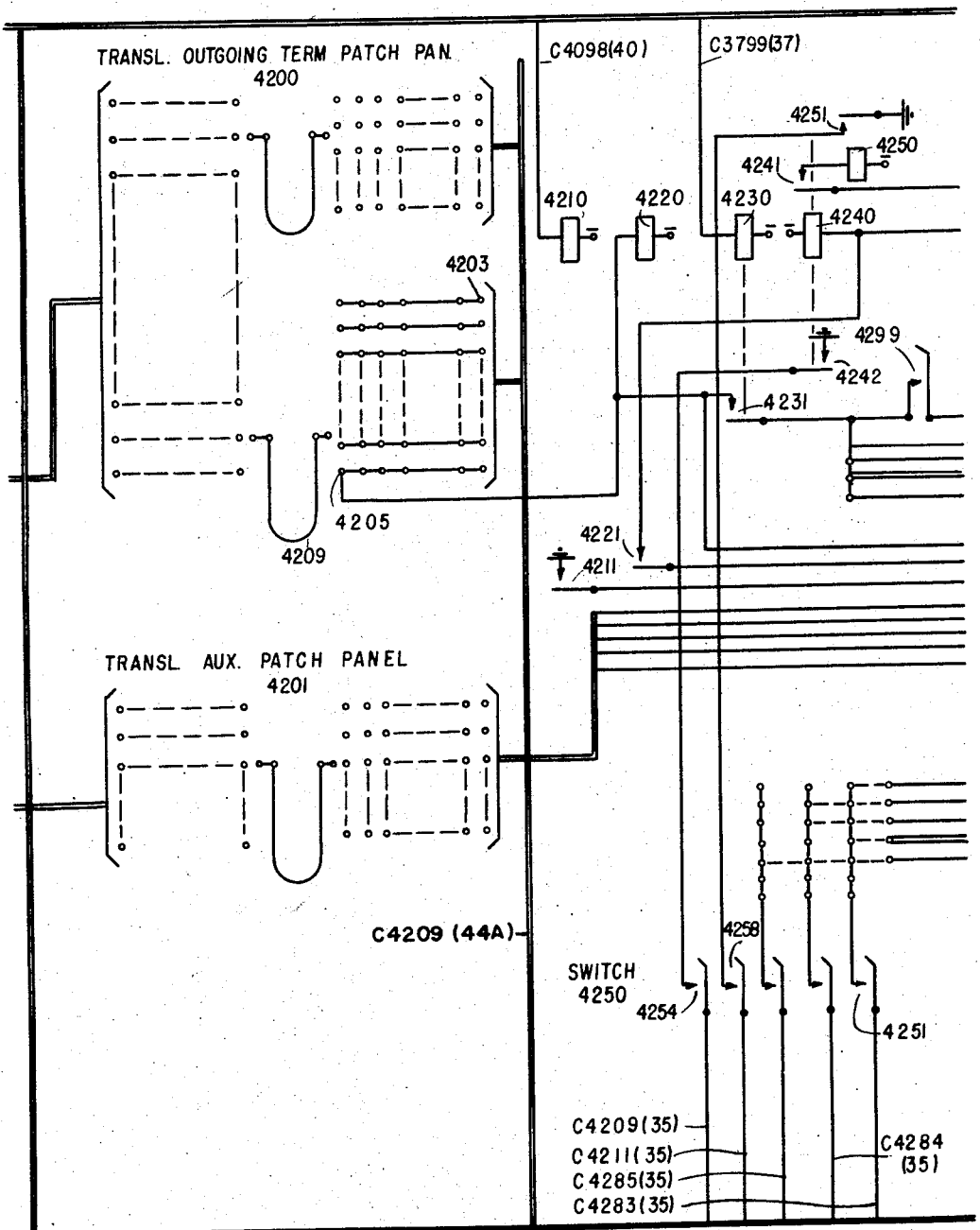
Figure 43:
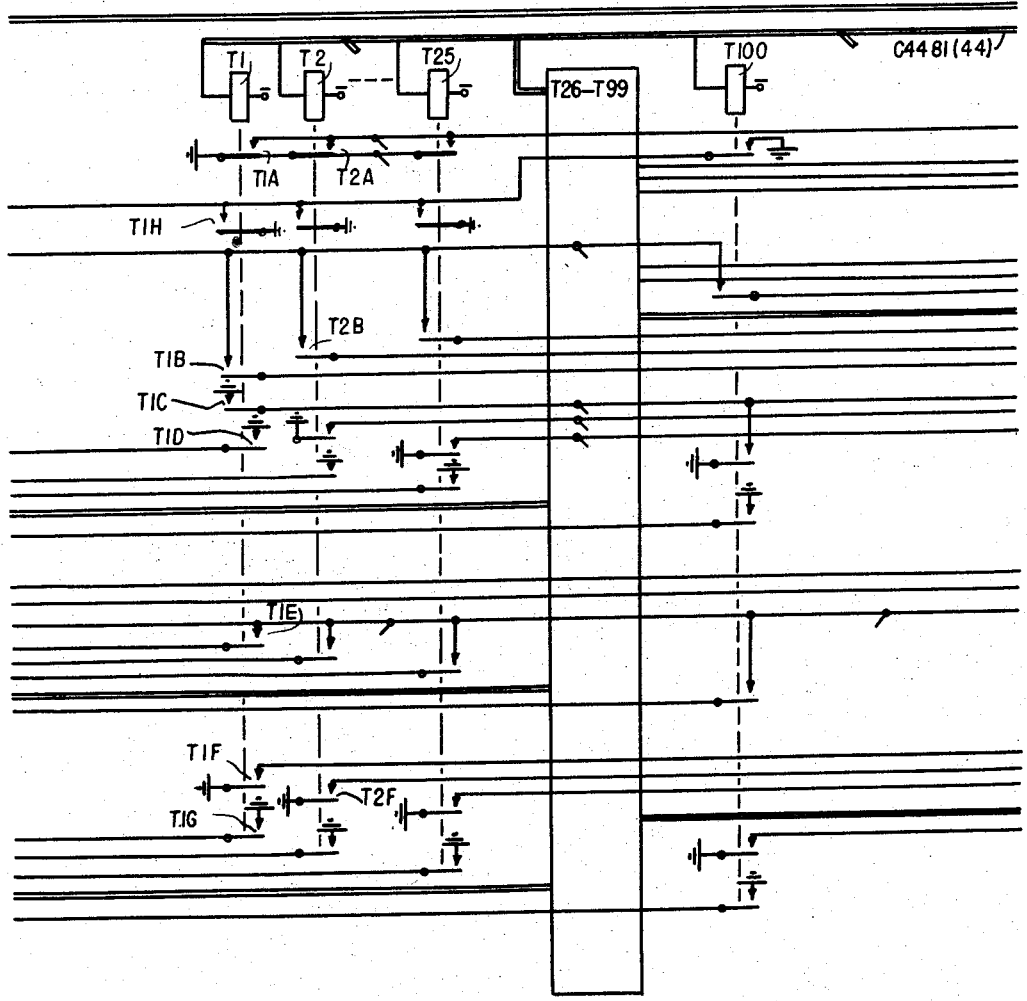
Figure 44:
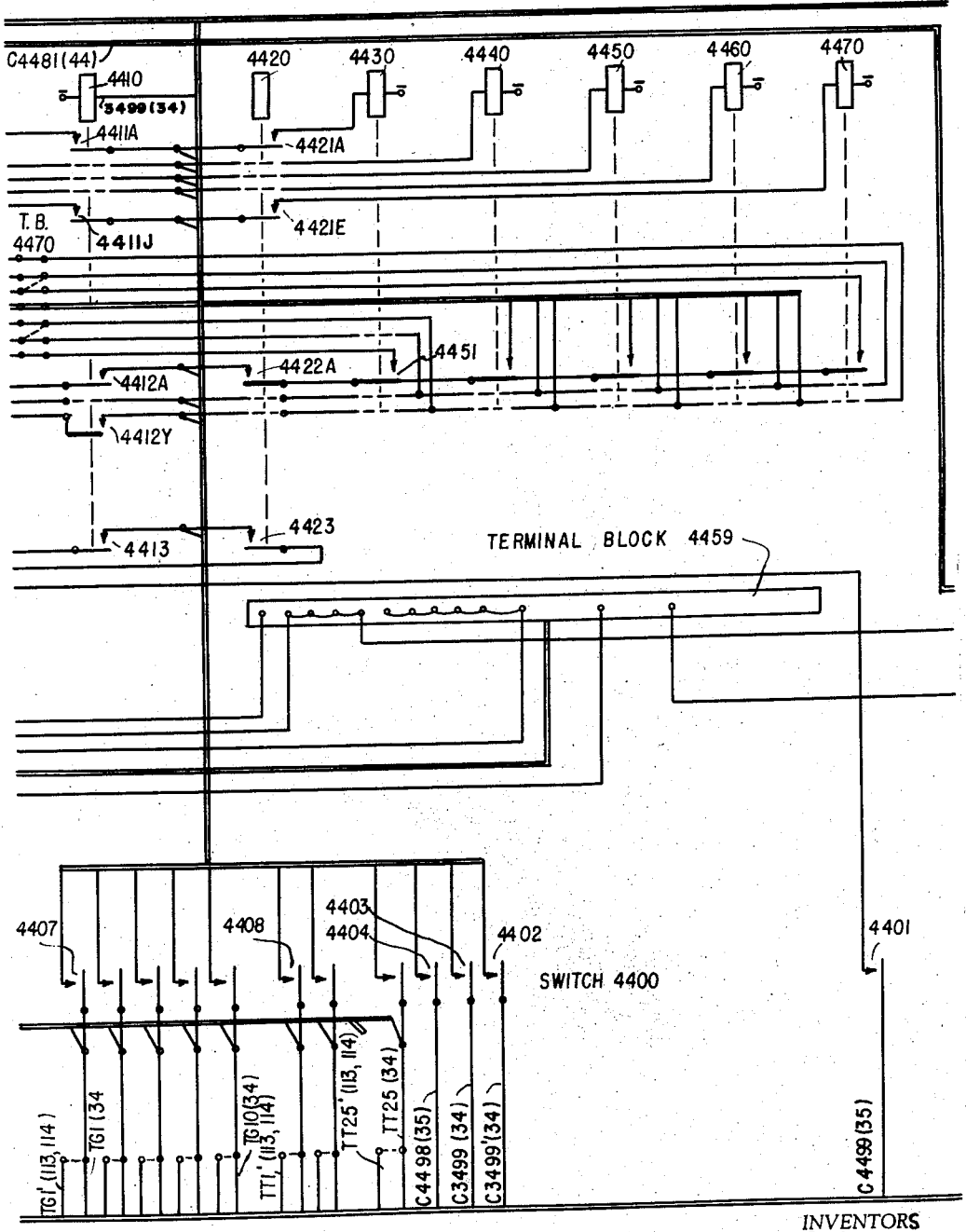
Figure 44:
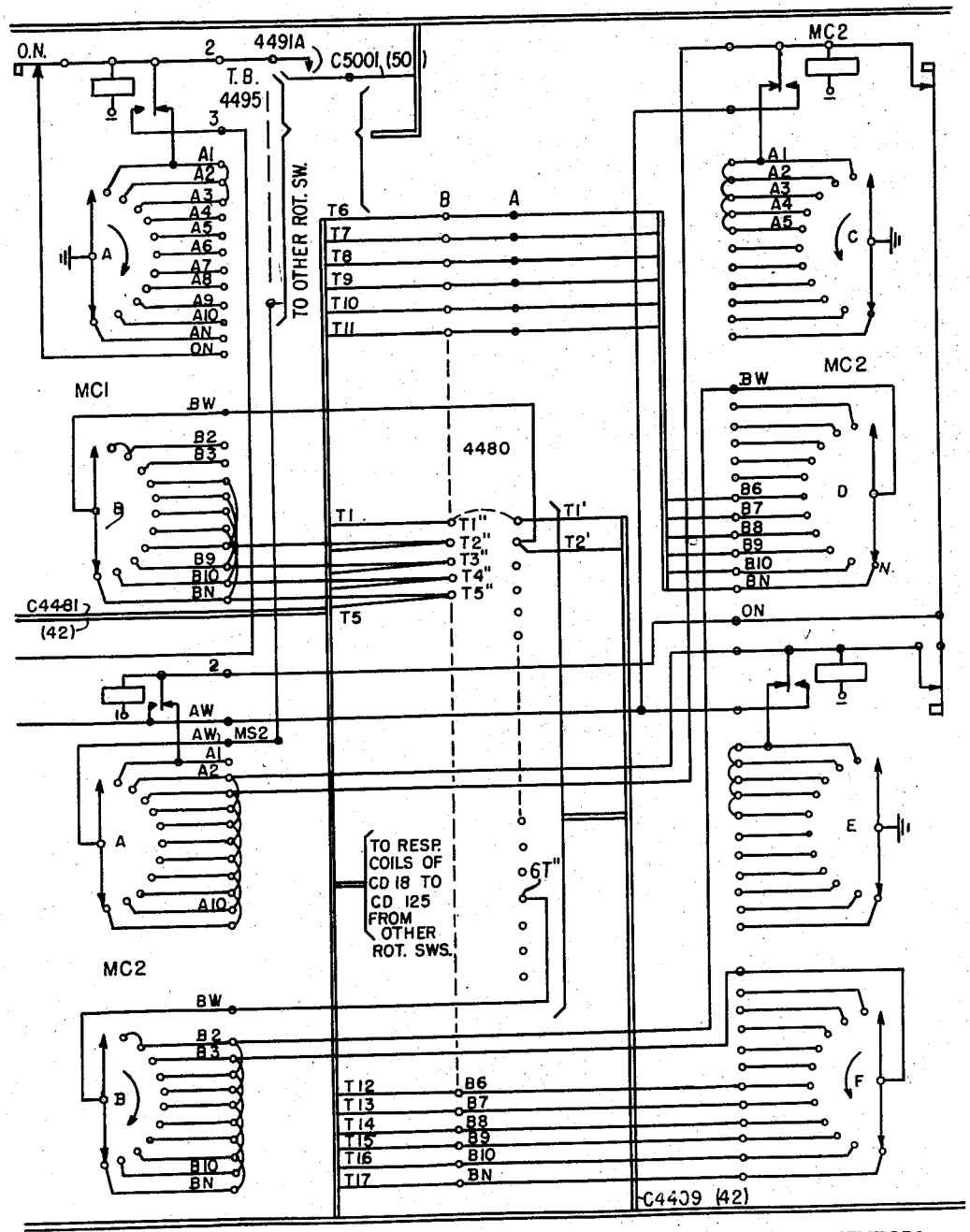

The registers A, B, C and D each includes a supervisory unit 1300 shown in Figures 13–15, inclusive; a finder relay unit shown in Figures 16–18, inclusive; a precedence register 1900 shown in Figures 19–22, inclusive; a routing register 2300 shown in Figures 23–26, inclusive; a cross office finder 3100 shown in Figures 31 and 32; a sequence control unit 2700 shown in Figures 27–30, inclusive; and a terminal register 3300 shown in Figures 33–36, inclusive.

In this system two registers such as A and B are used with each group of twenty-five incoming line circuits such as 400, while registers such as C and D are used with each group of twenty-five multiple call cross office units such as 8600 and 8600A. In the sequence control unit 2700, relays 2830, 2840, 2850, 2860, 2870, 2910, 2960, 2970, and 3010 are used only when the associated register is used with a multiple call unit. In addition, certain other changes are made in the register, when used with a multiple call unit, which will become apparent in reading the specification. Multiple call processing equipment shown in Figs. 94–100 and 102–115 is associated with the register C and similar equipment is associated with other multiple call registers.

A translator 3700 shown in Figs. 37–44A, inclusive, serves all the incoming line circuit registers at station RUWP and another similar translator such as 3700A serves the registers associated with the multiple call units.

Figure 46:
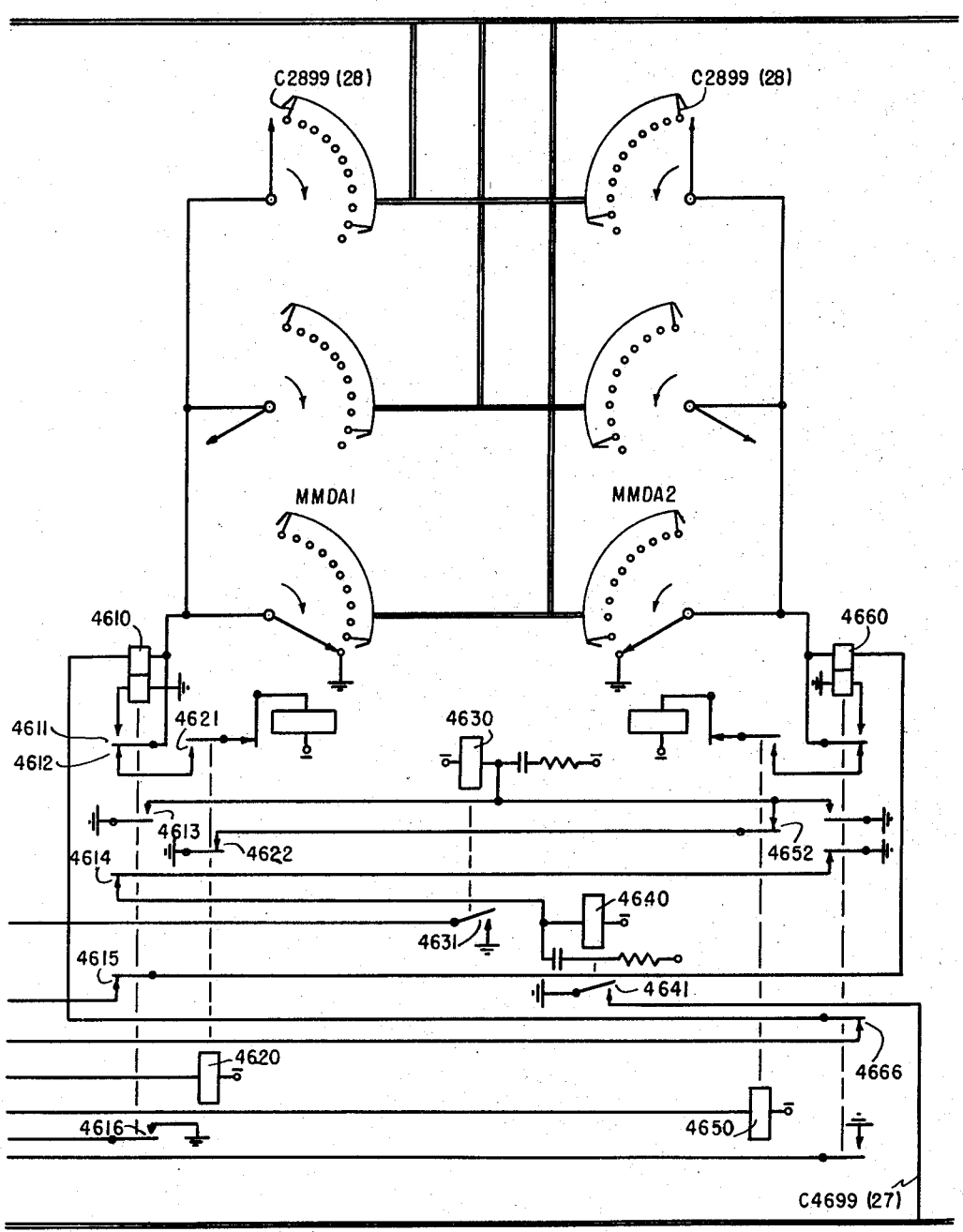
Figure 47:
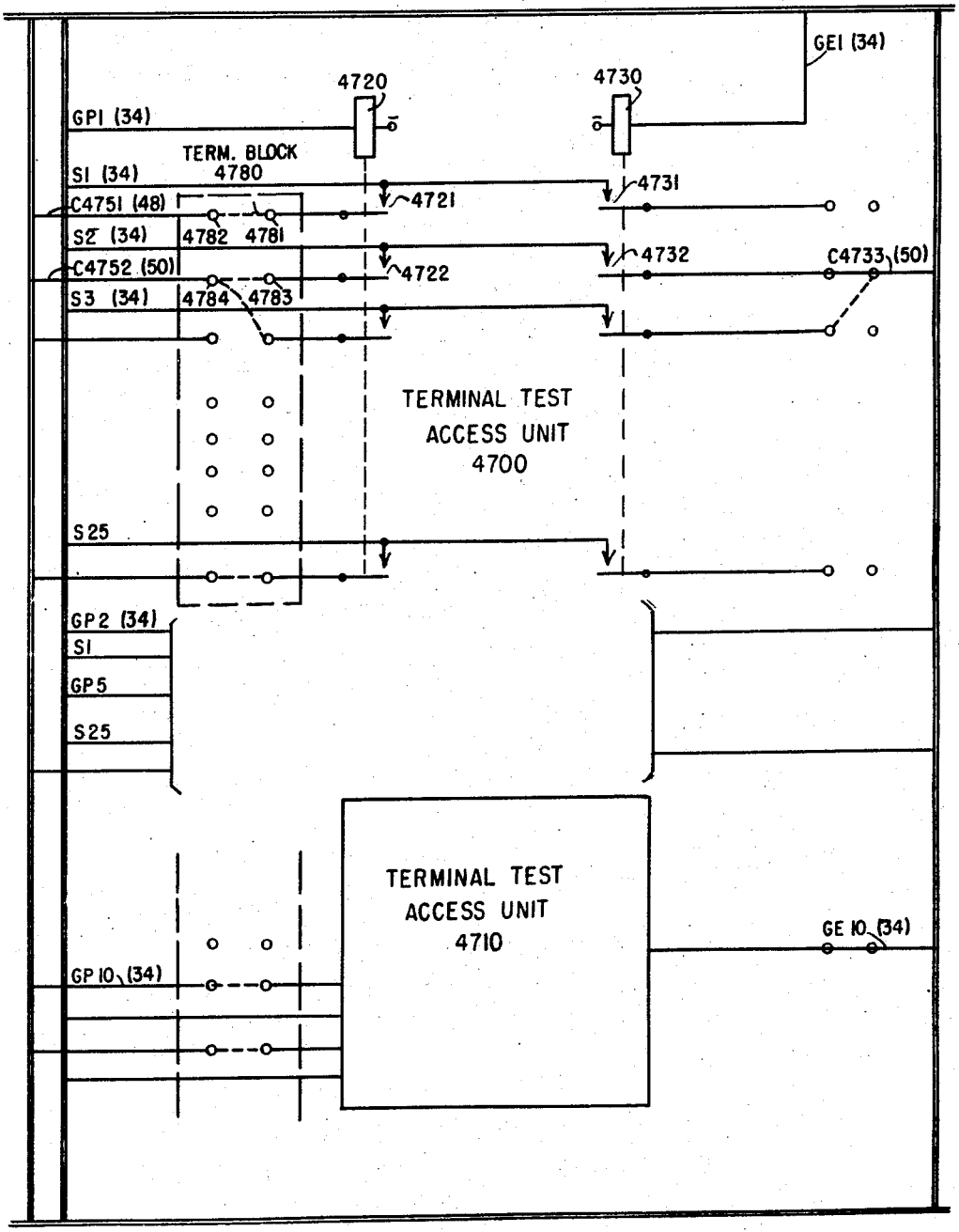
Figure 48:
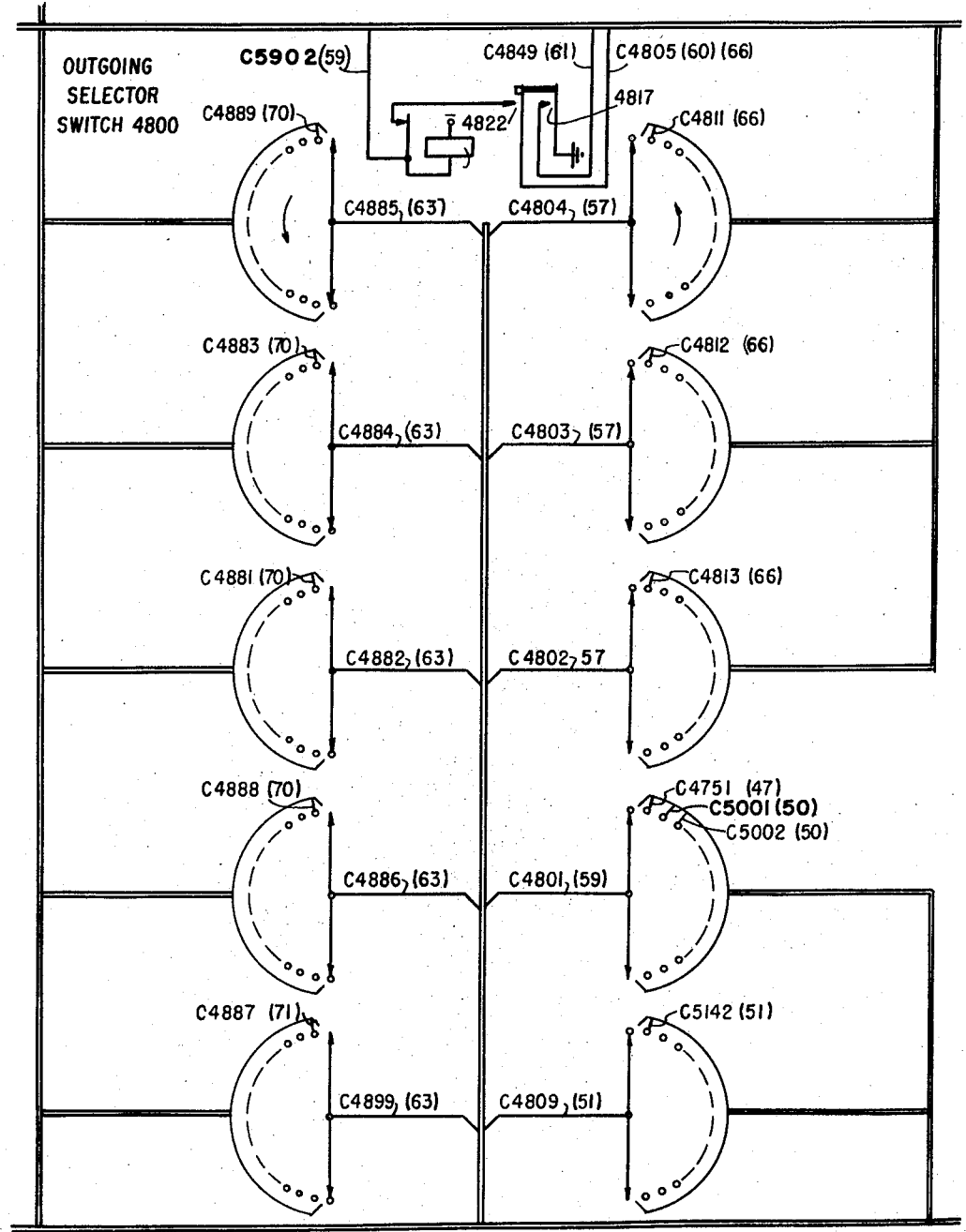
Figure 49:
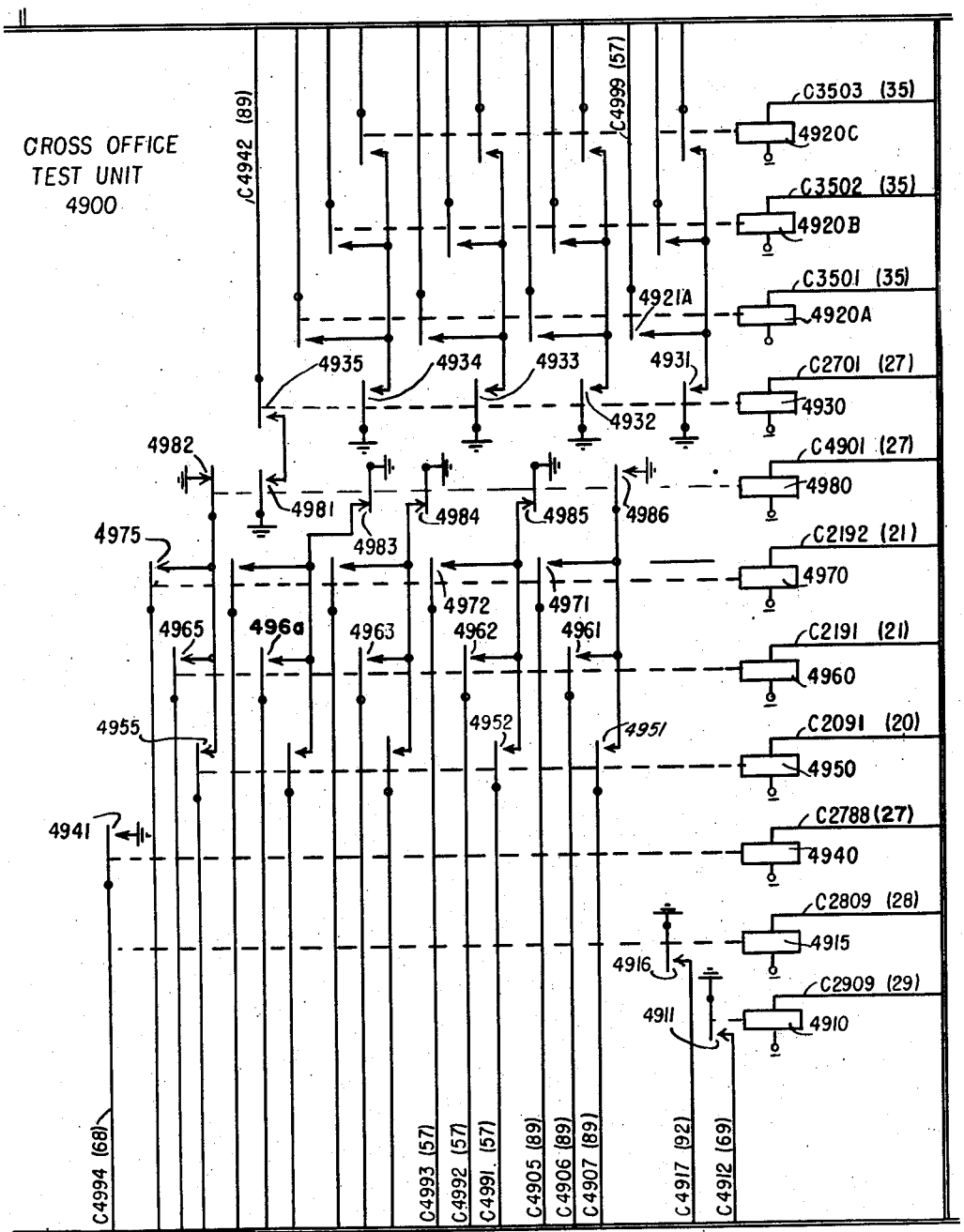
Figure 50:
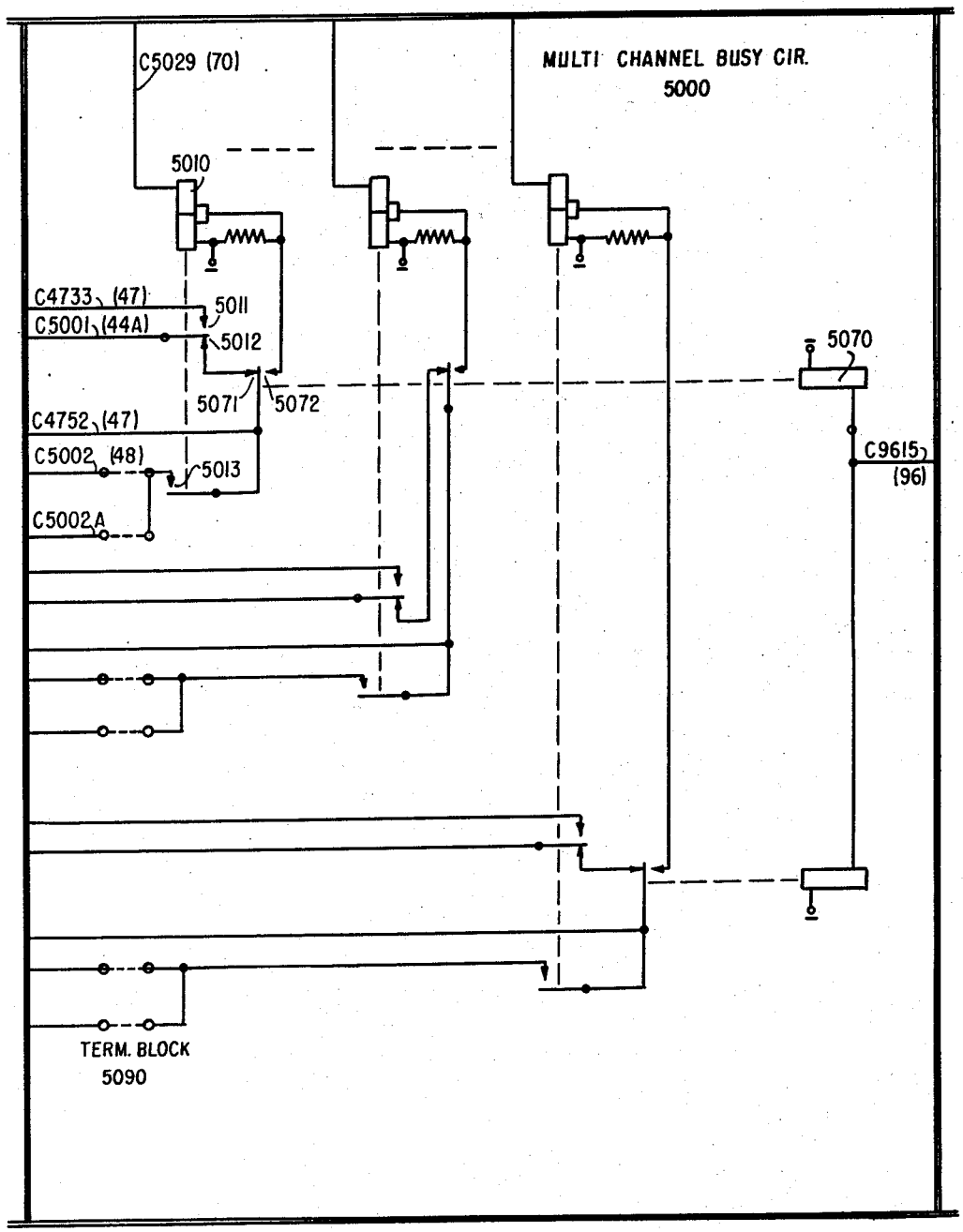
Figure 64:
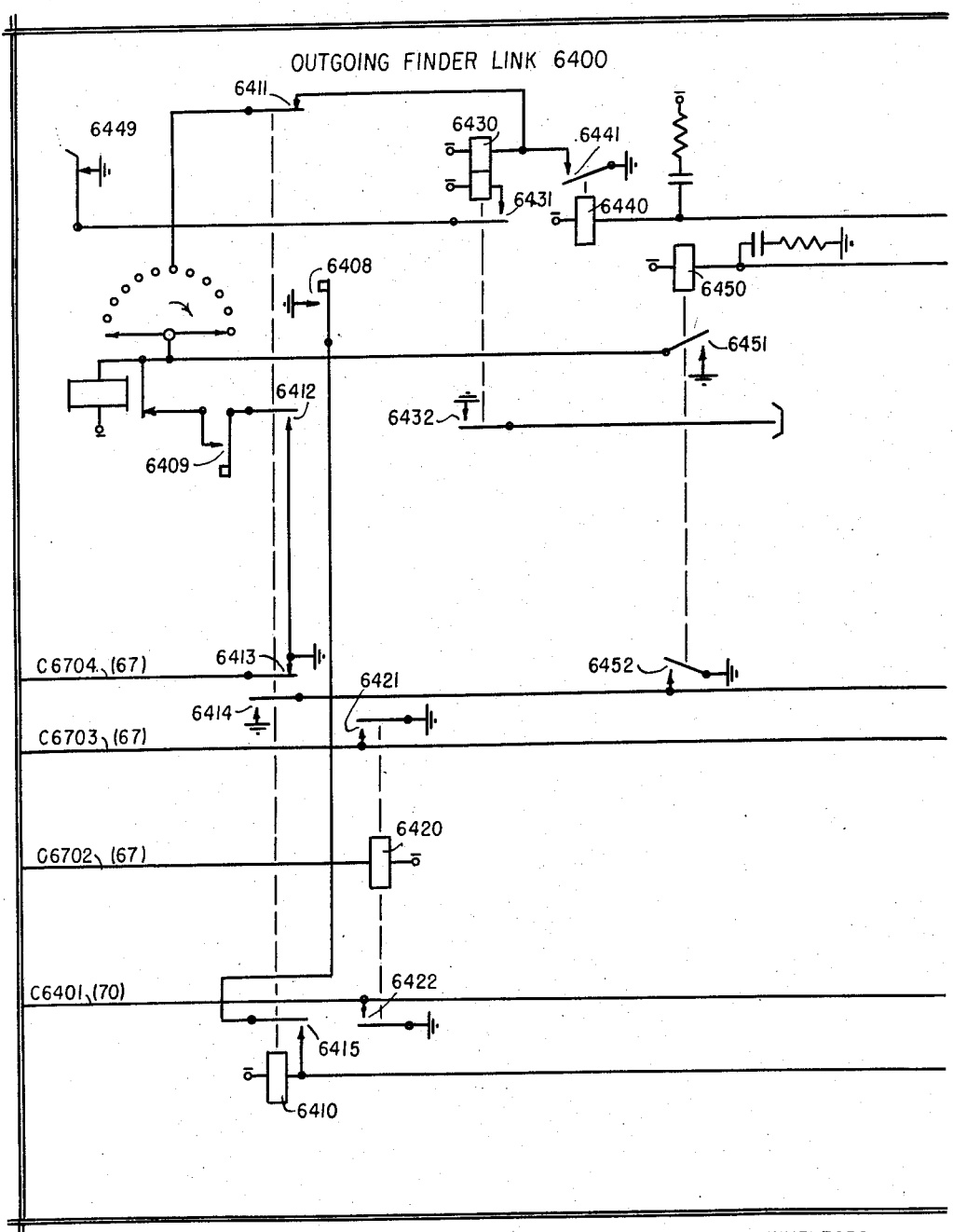
Figure 65:
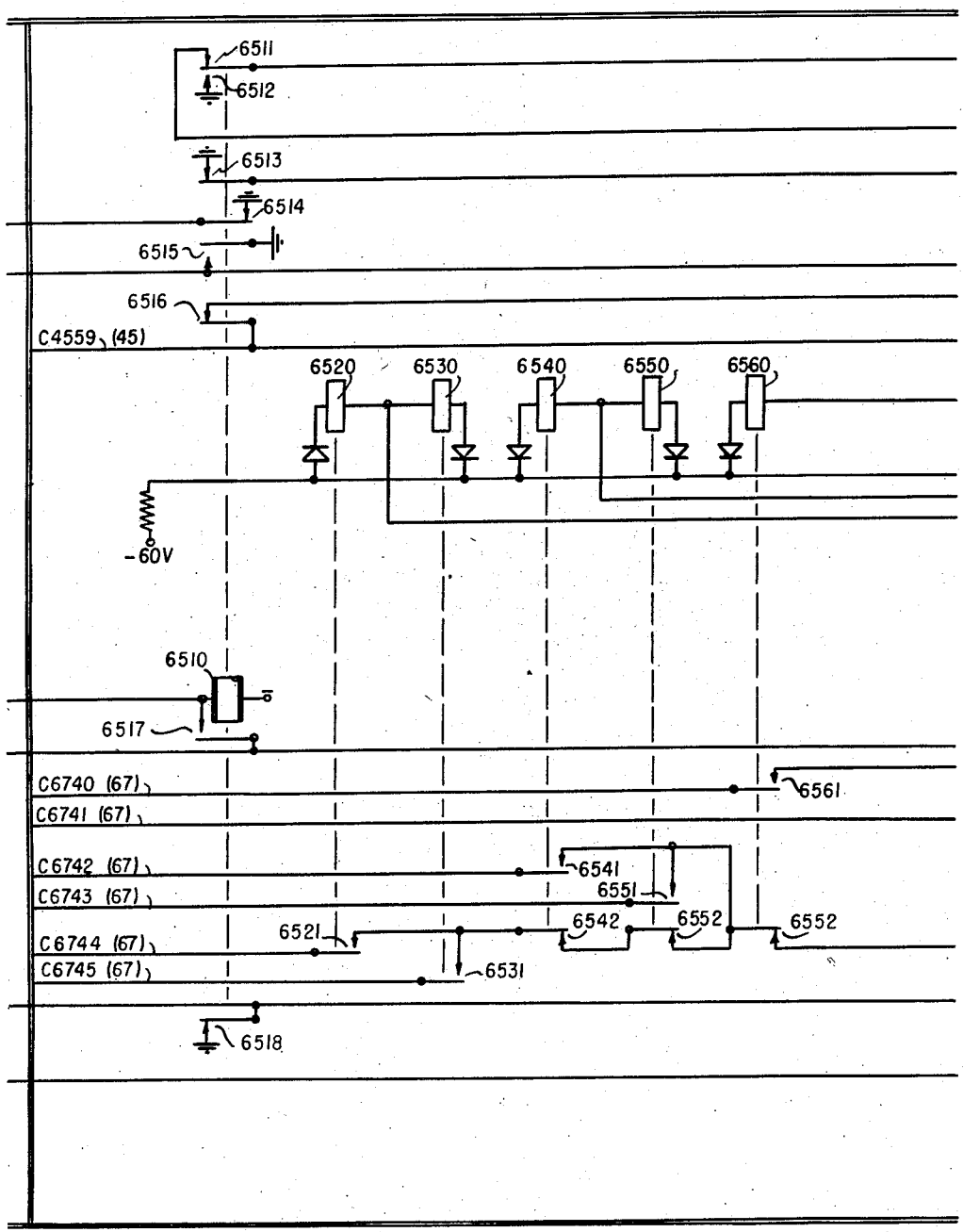
Figure 66:
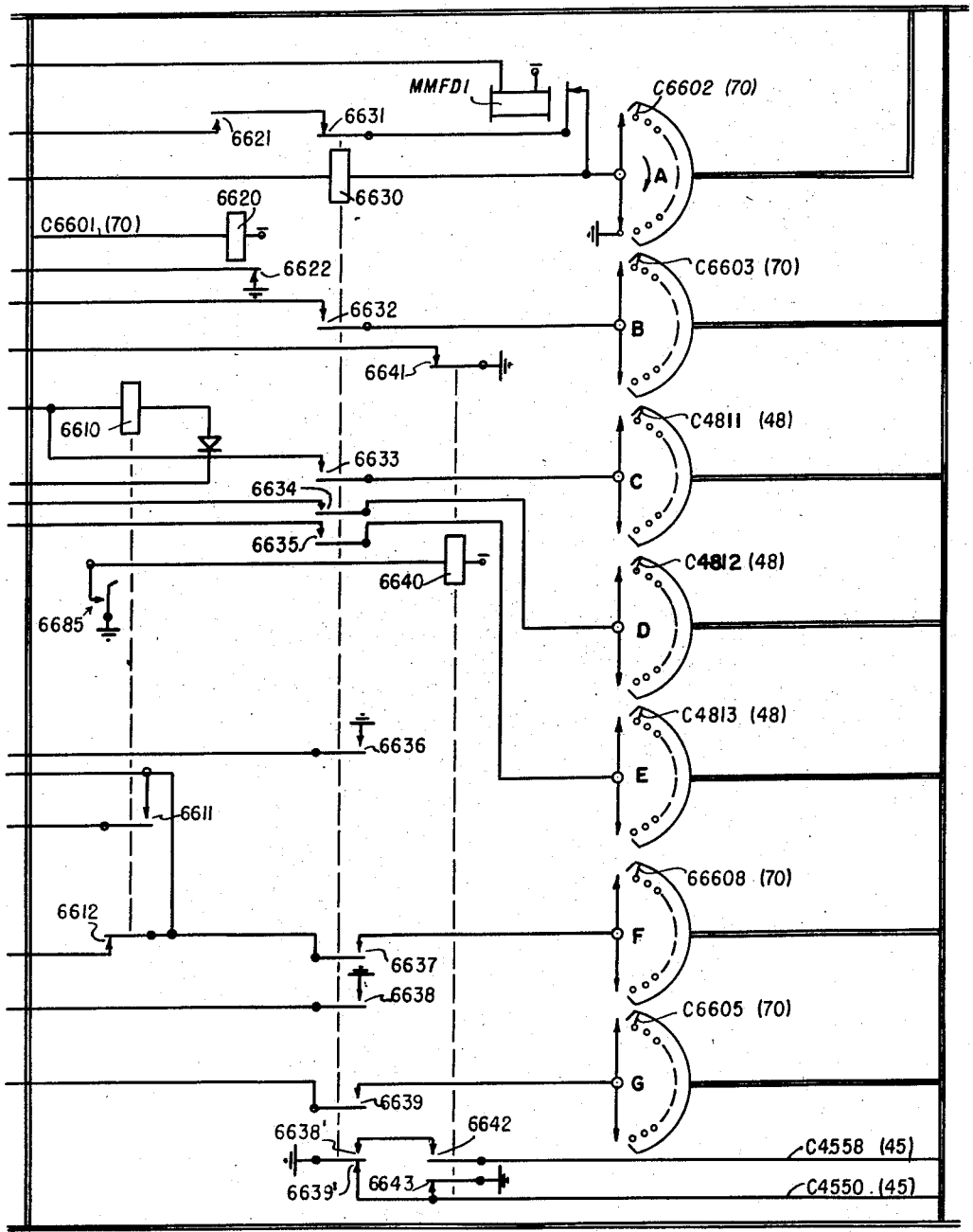
Figure 67:
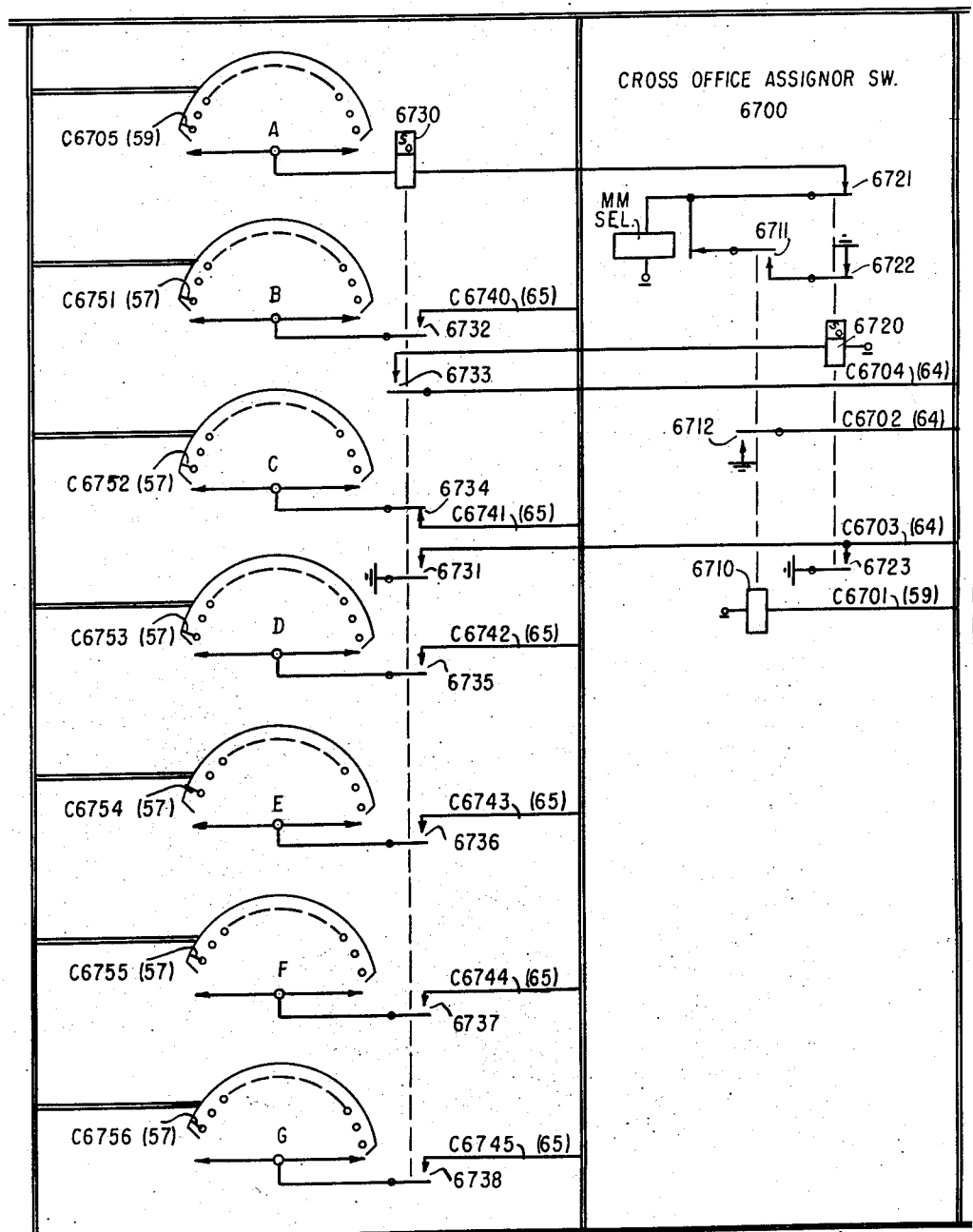
Figure 75:
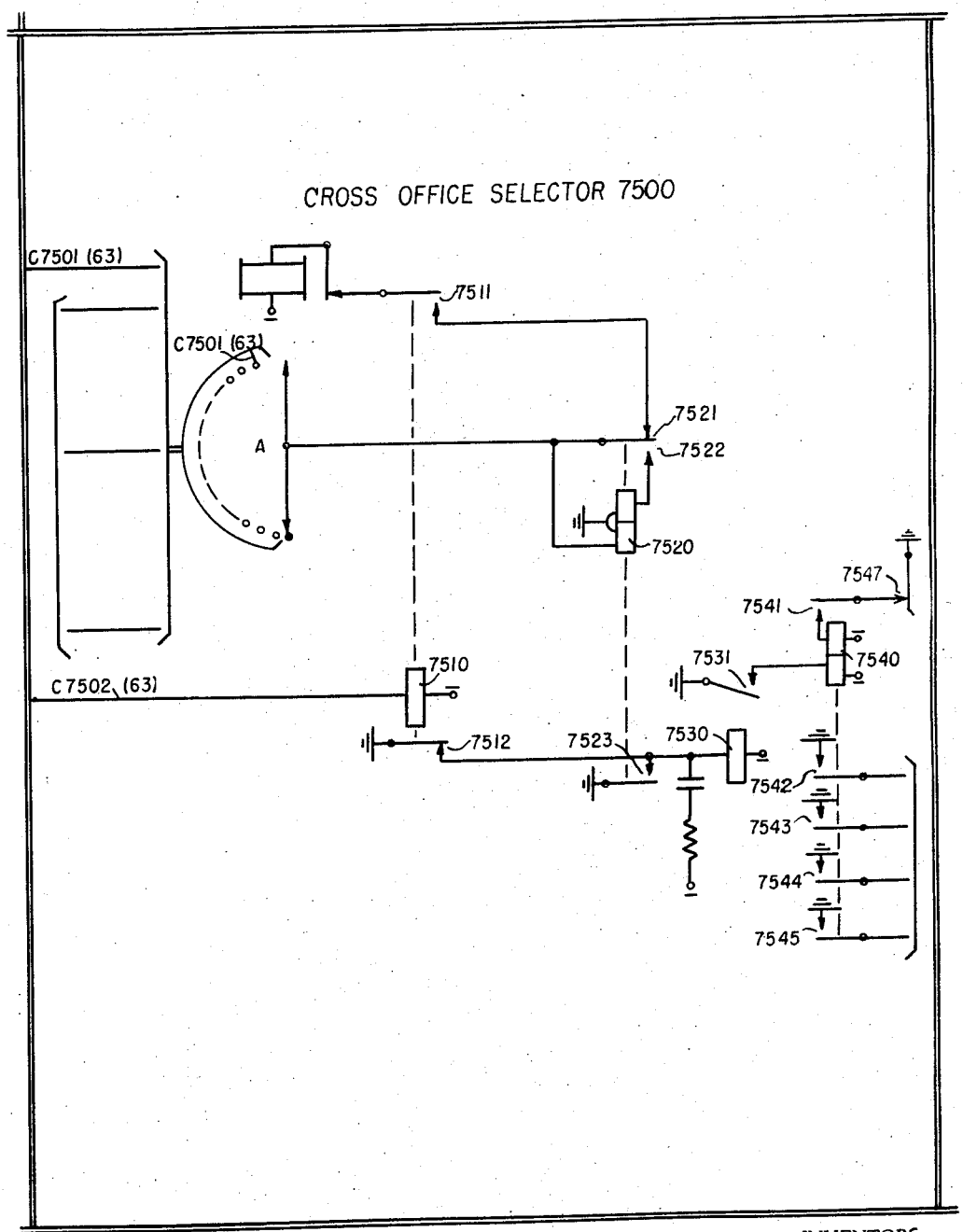
Figure 76:
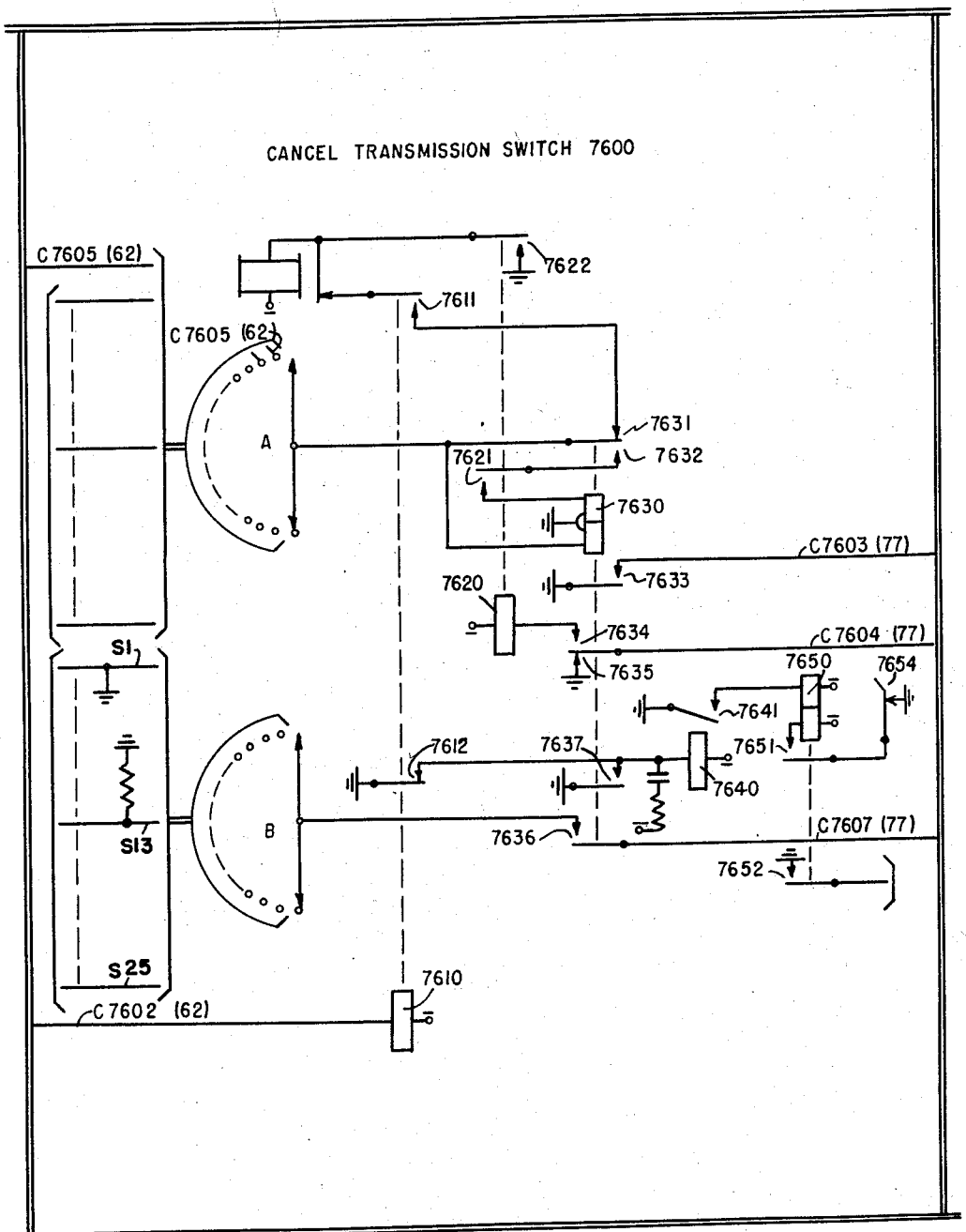
Figure 77:
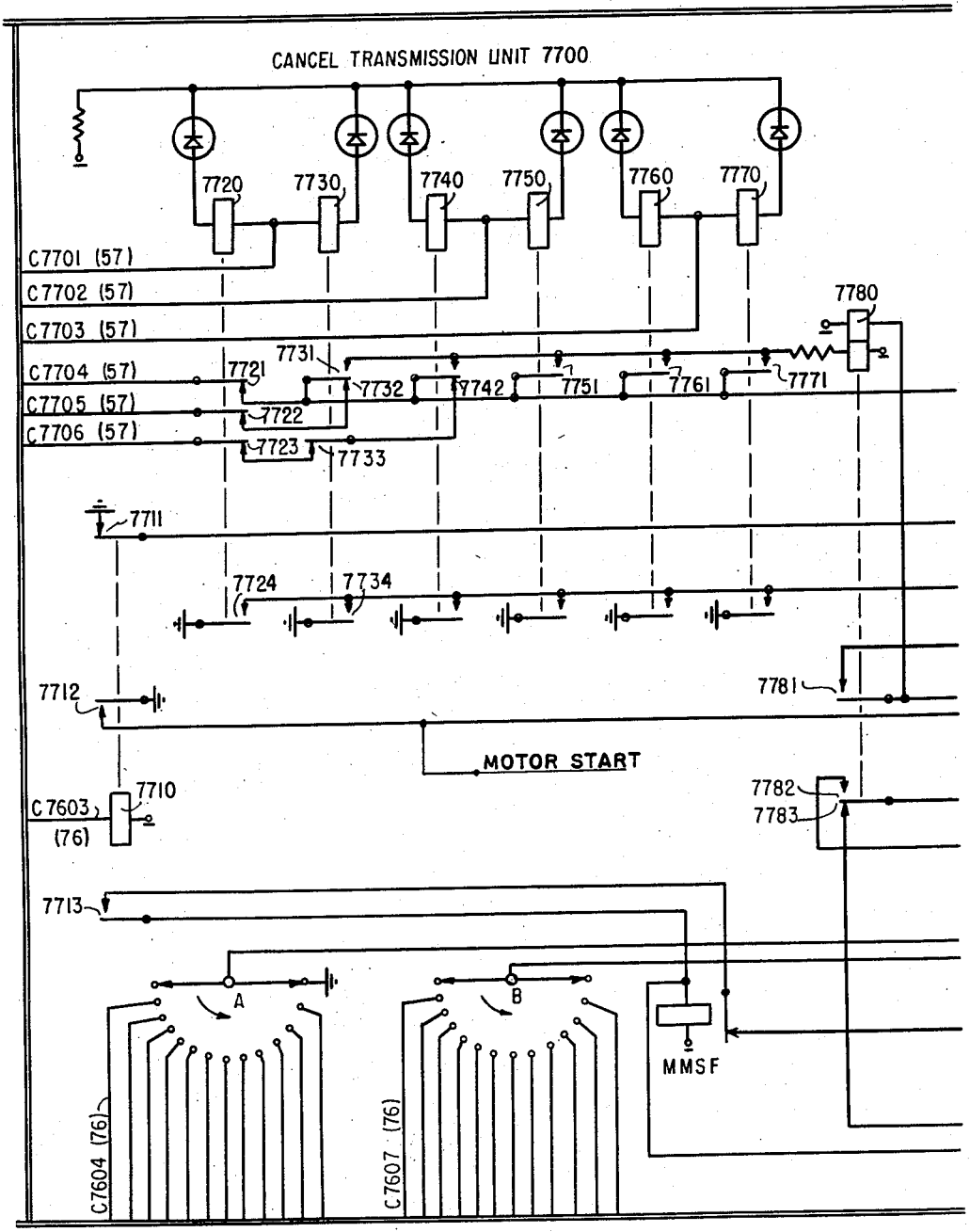
Figure 78:
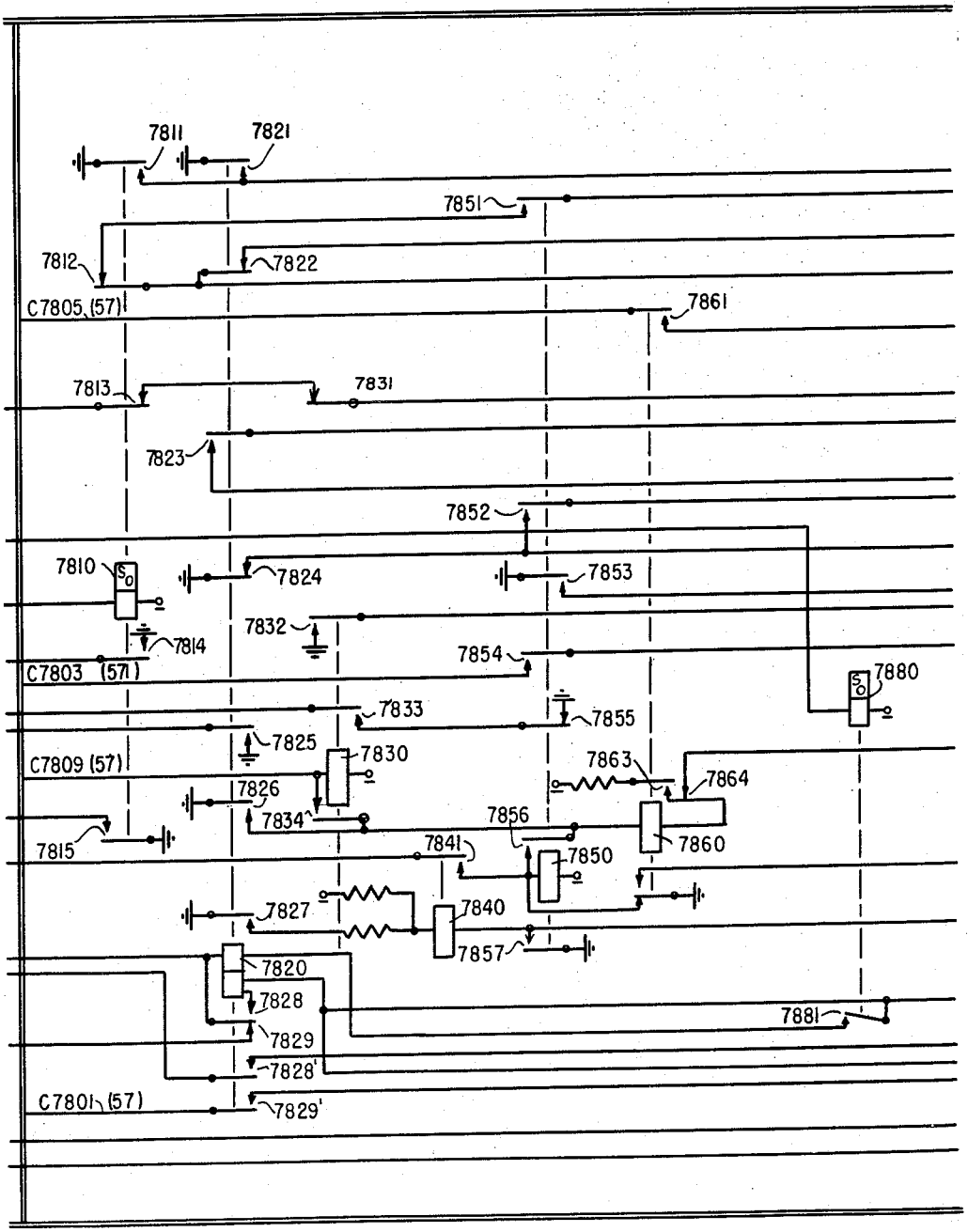
Figure 79:
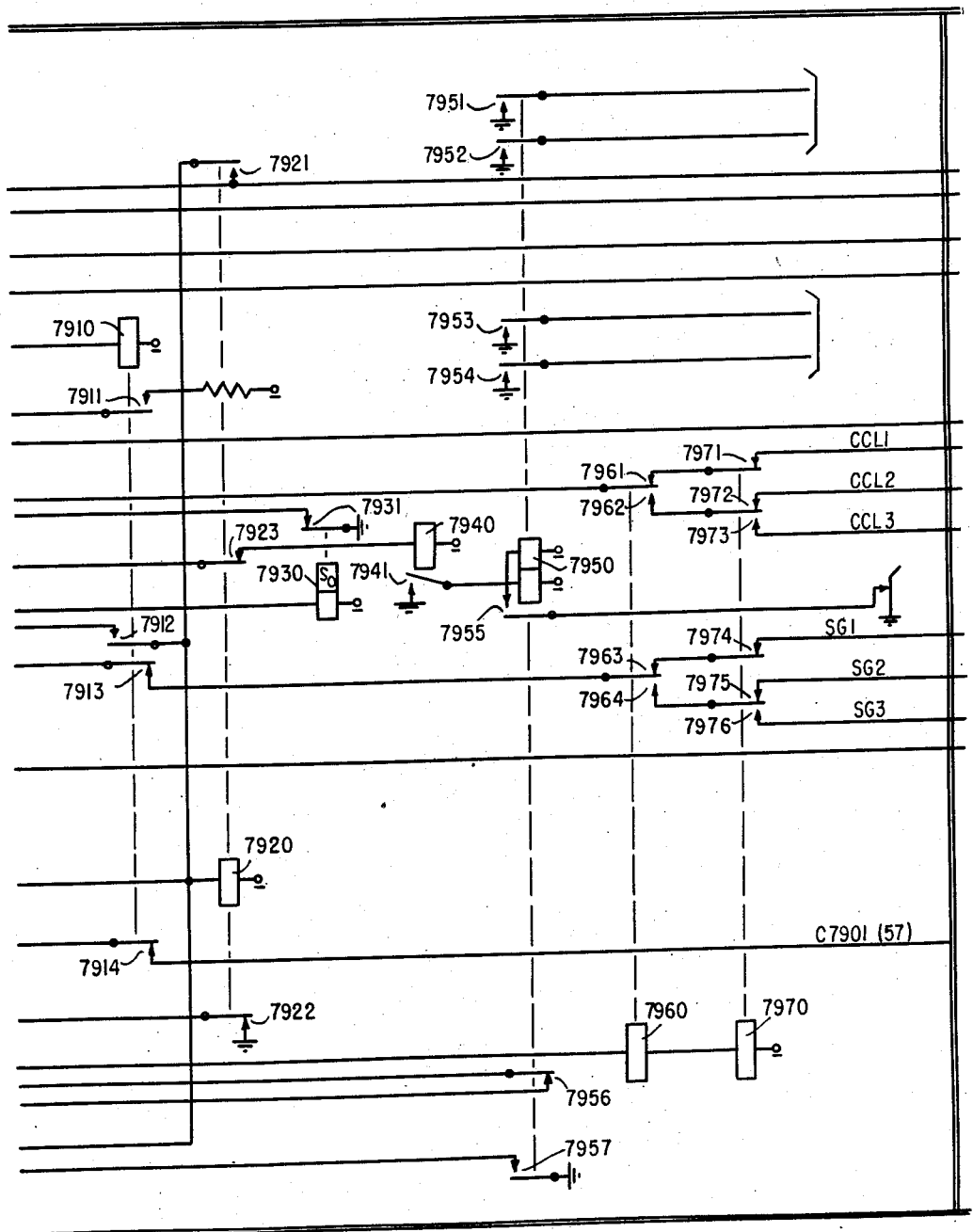
Figure 80:
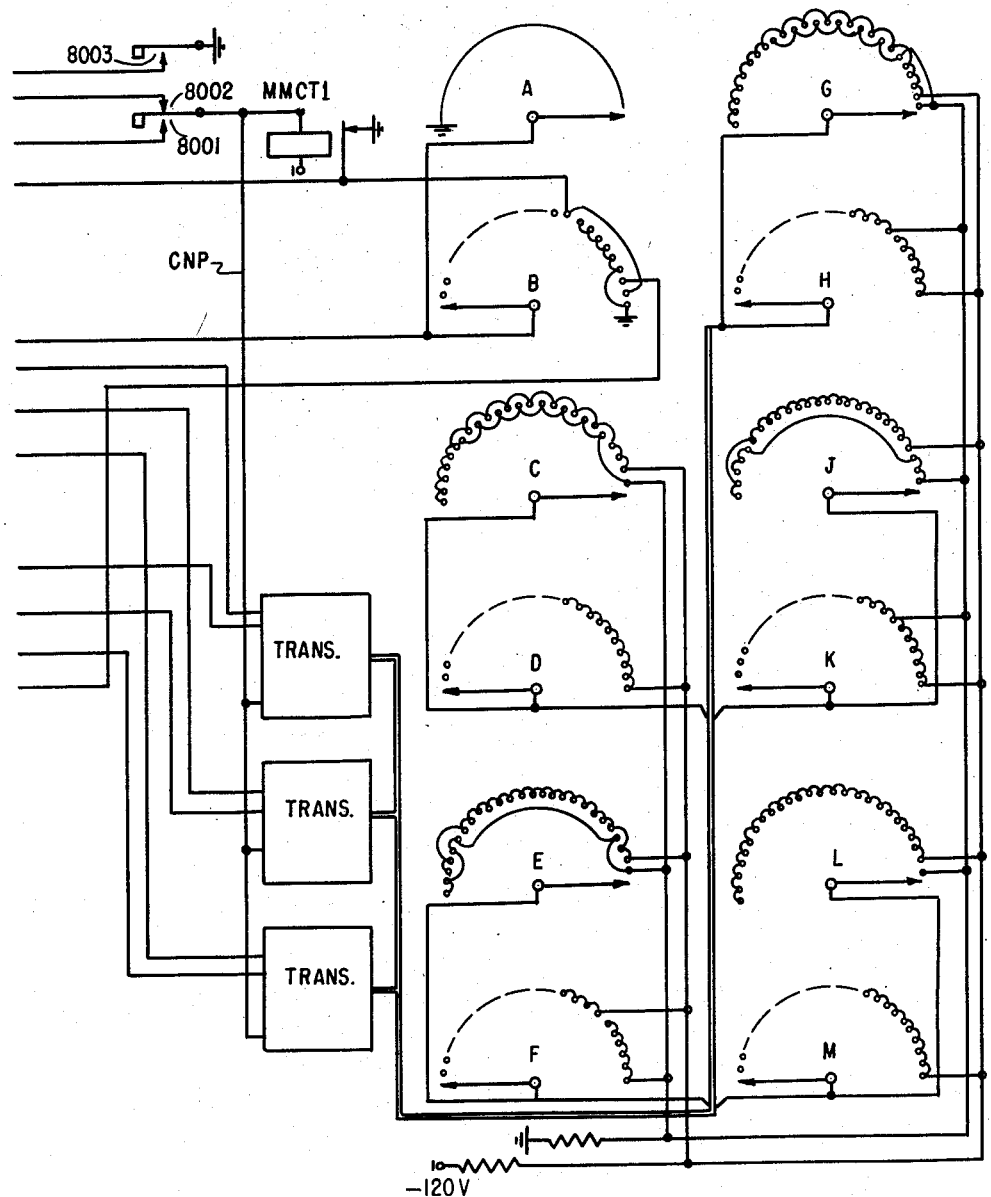
Figure 81:
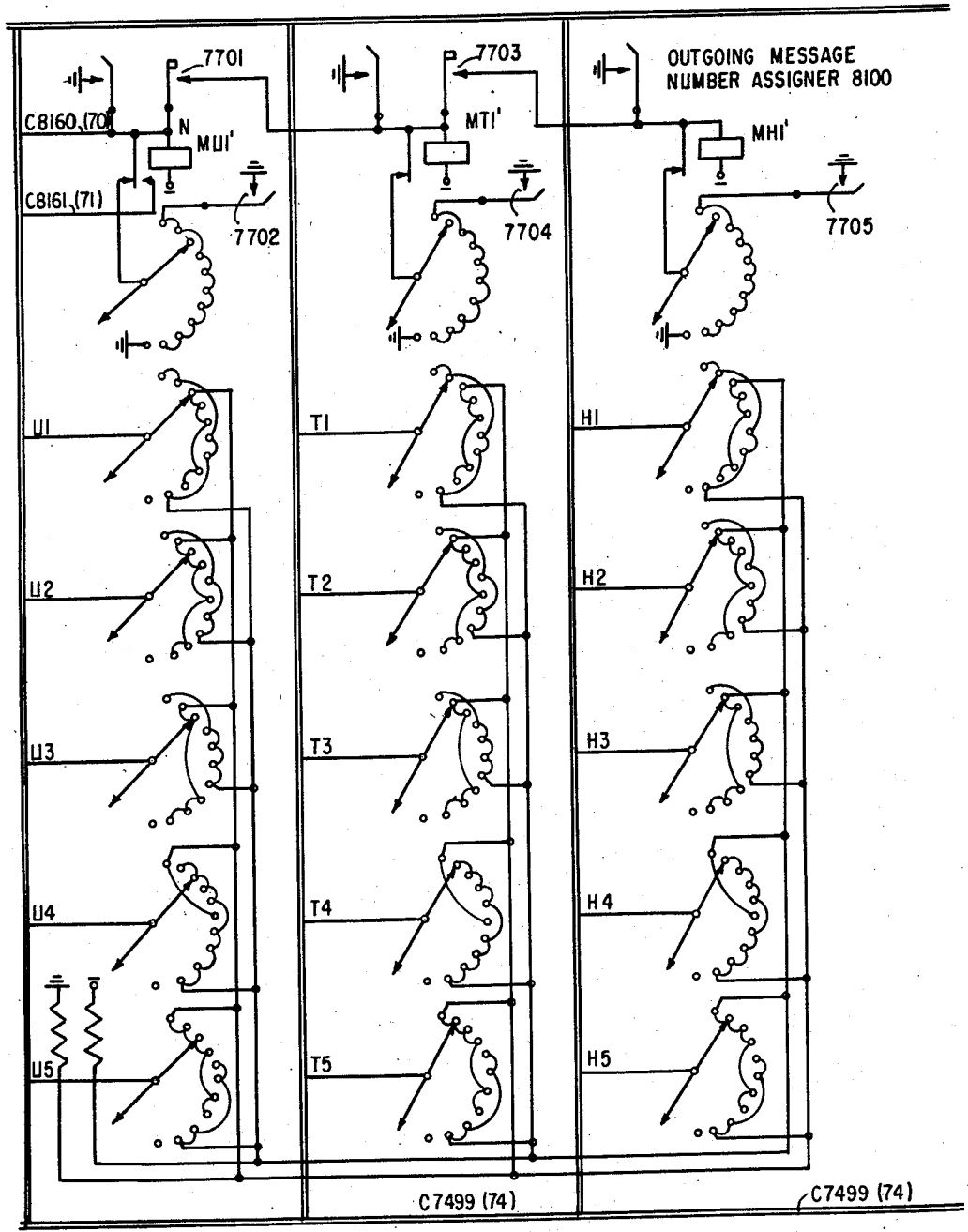

The common control 220 includes a cross office test access unit 4900 shown in Fig. 49 for each group of twenty-five cross office units, a terminal test access 4700 shown in Fig. 47 for each group of twenty-five outgoing channels or terminals, and a common control register assigner 4500 shown in Figs. 45 and 46 for assigning the above common control equipment to a register. In addition, the common control includes a cross office selector switch 7500 shown in Fig. 75; a cancel transmission cross office selector switch 7600 shown in Fig. 76; cancel transmission unit 7700 shown in Figs. 77–80, inclusive, a multi-channel busy circuit 5000 shown in Fig. 50 and an outgoing finder link 6400 shown in Figs. 64–66, inclusive, and having a number of cross office assigner switches such as 6700 shown in Fig. 67 associated therewith.

Figs. 53–63, inclusive, show the circuit details of the cross office units such as 5400, 5400A and 5400B and Figs. 70–74, inclusive, show the details of the outgoing channel units such as 7000 and 7000A.

Figure 51:
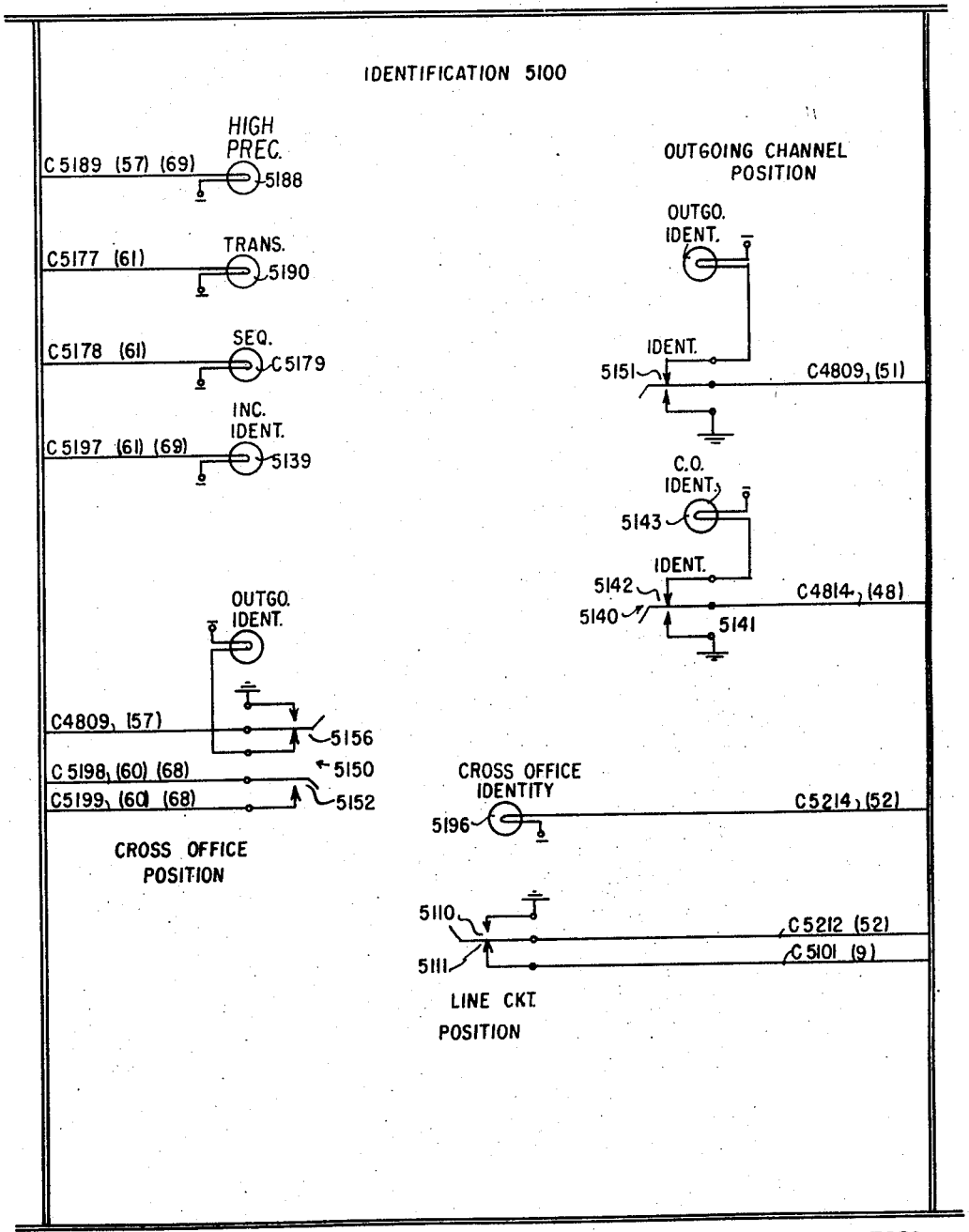
Figure 52:
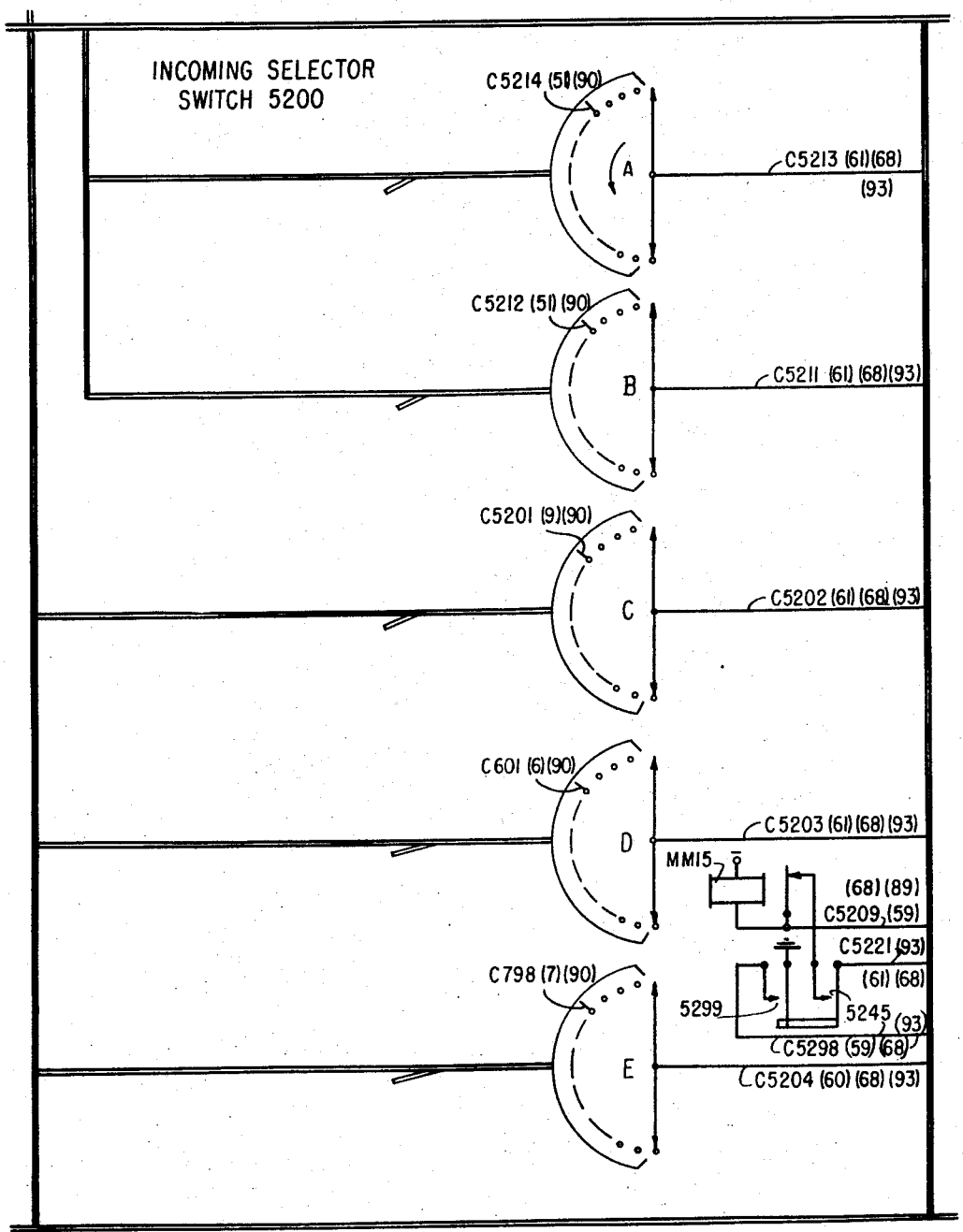
Figure 53:
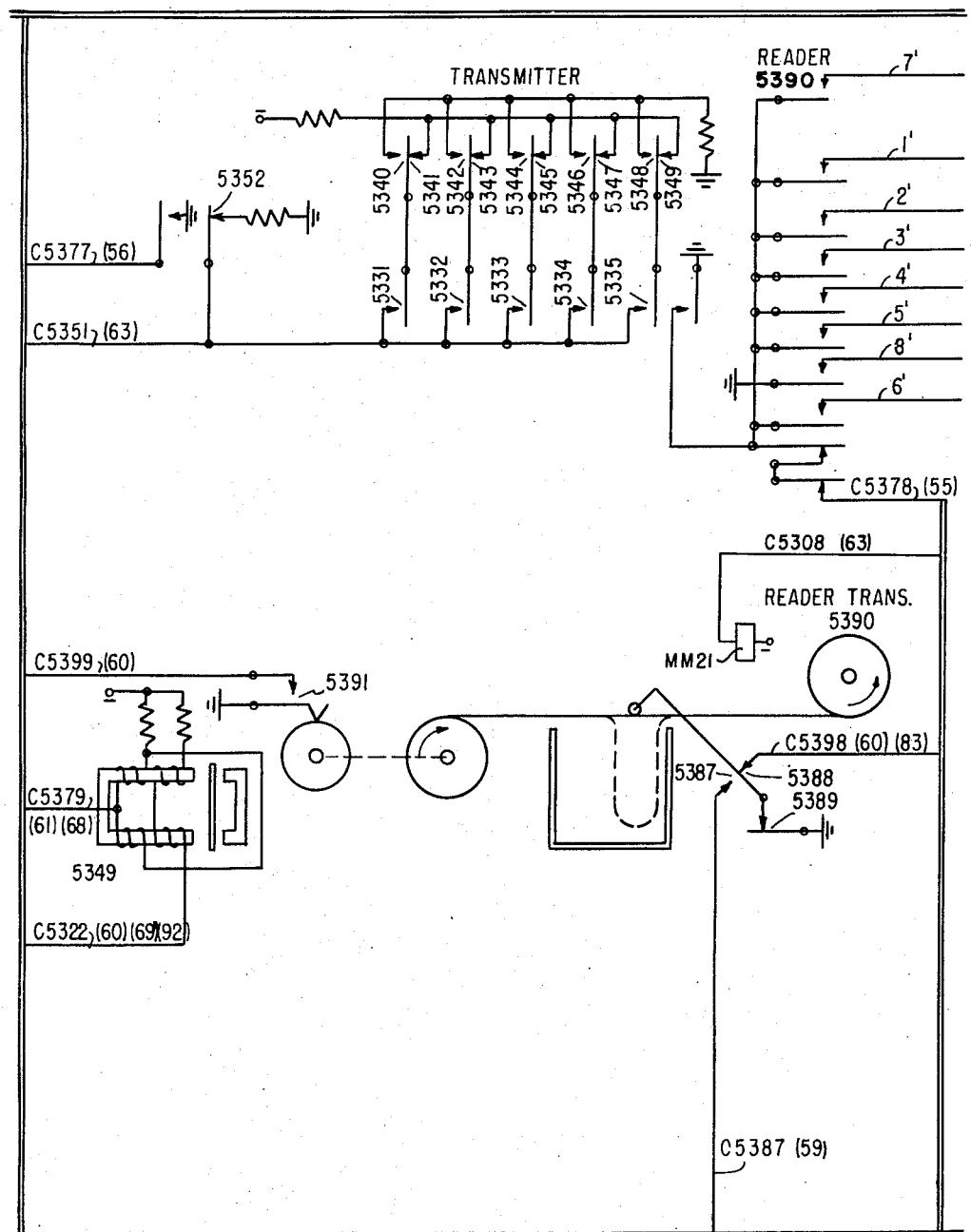
Figure 54:
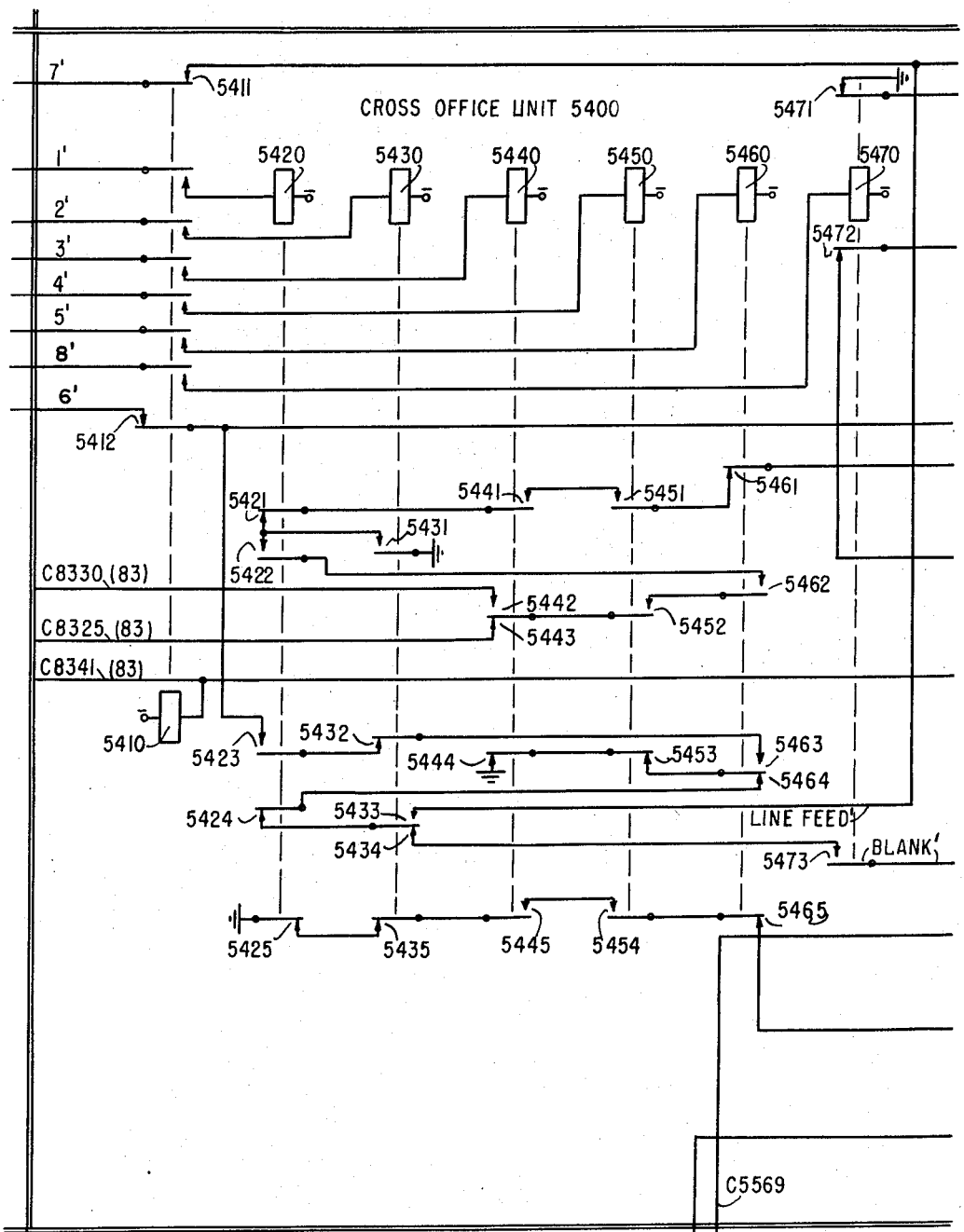
Figure 55:
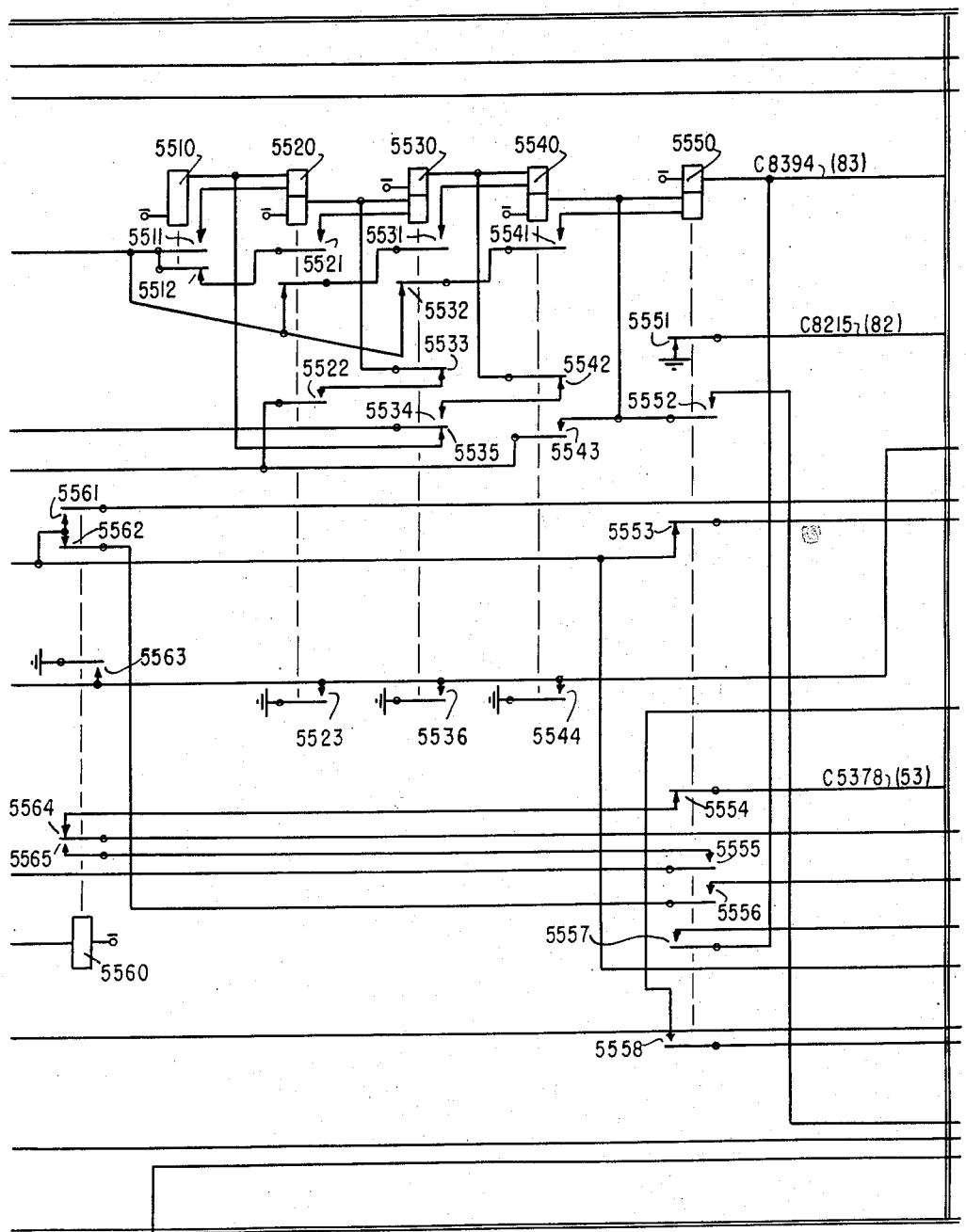
Figure 56:
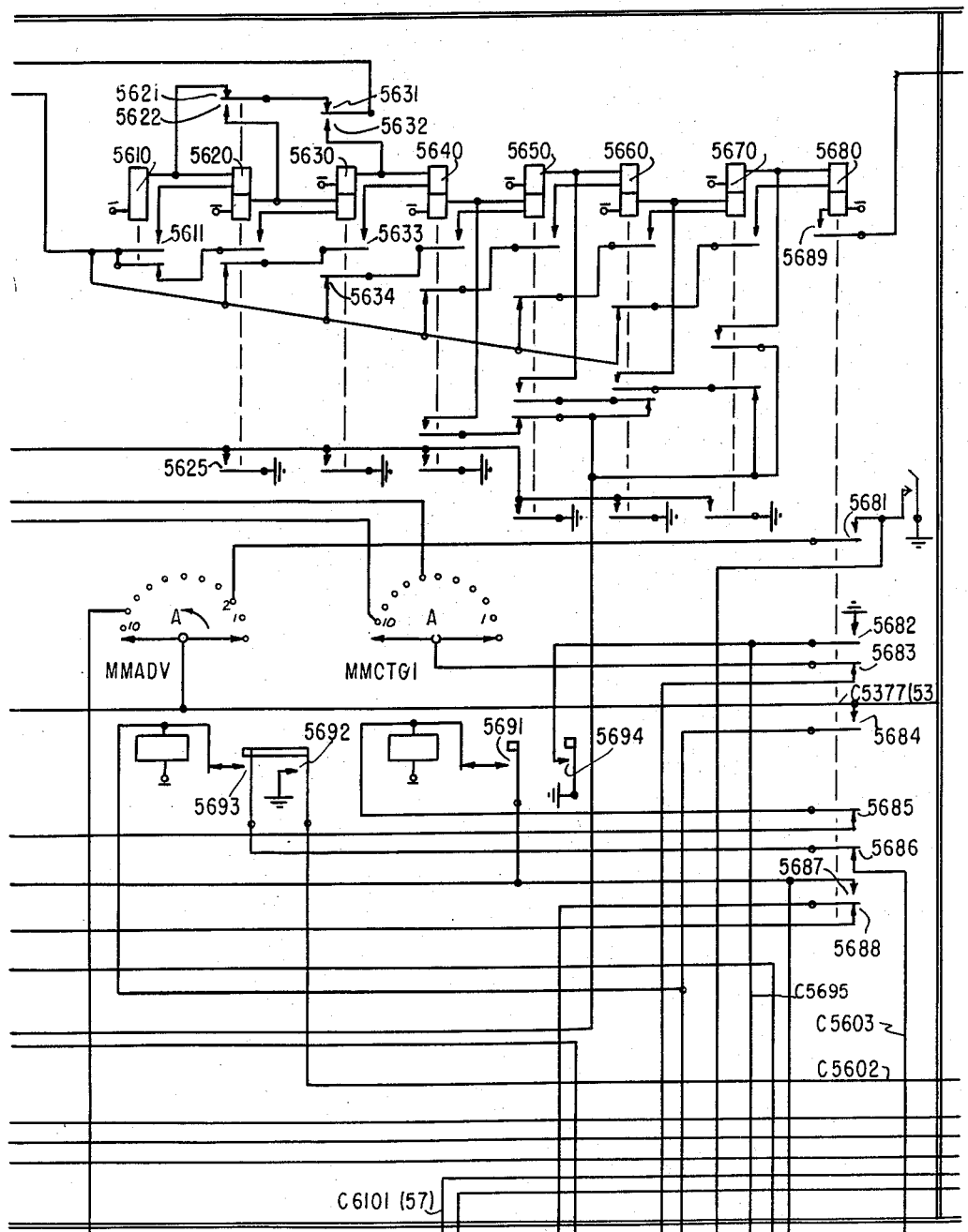
Figure 57:
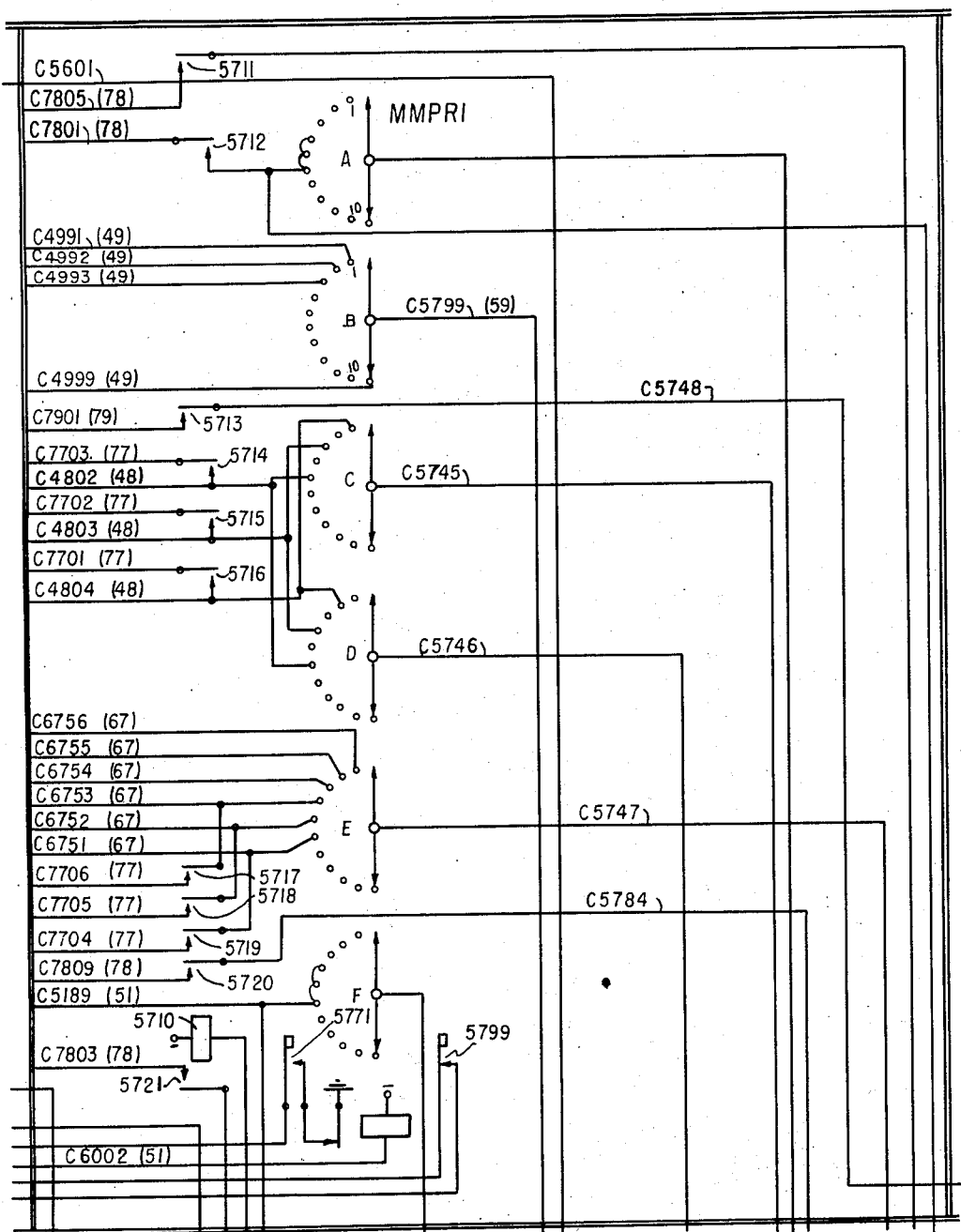
Figure 58:
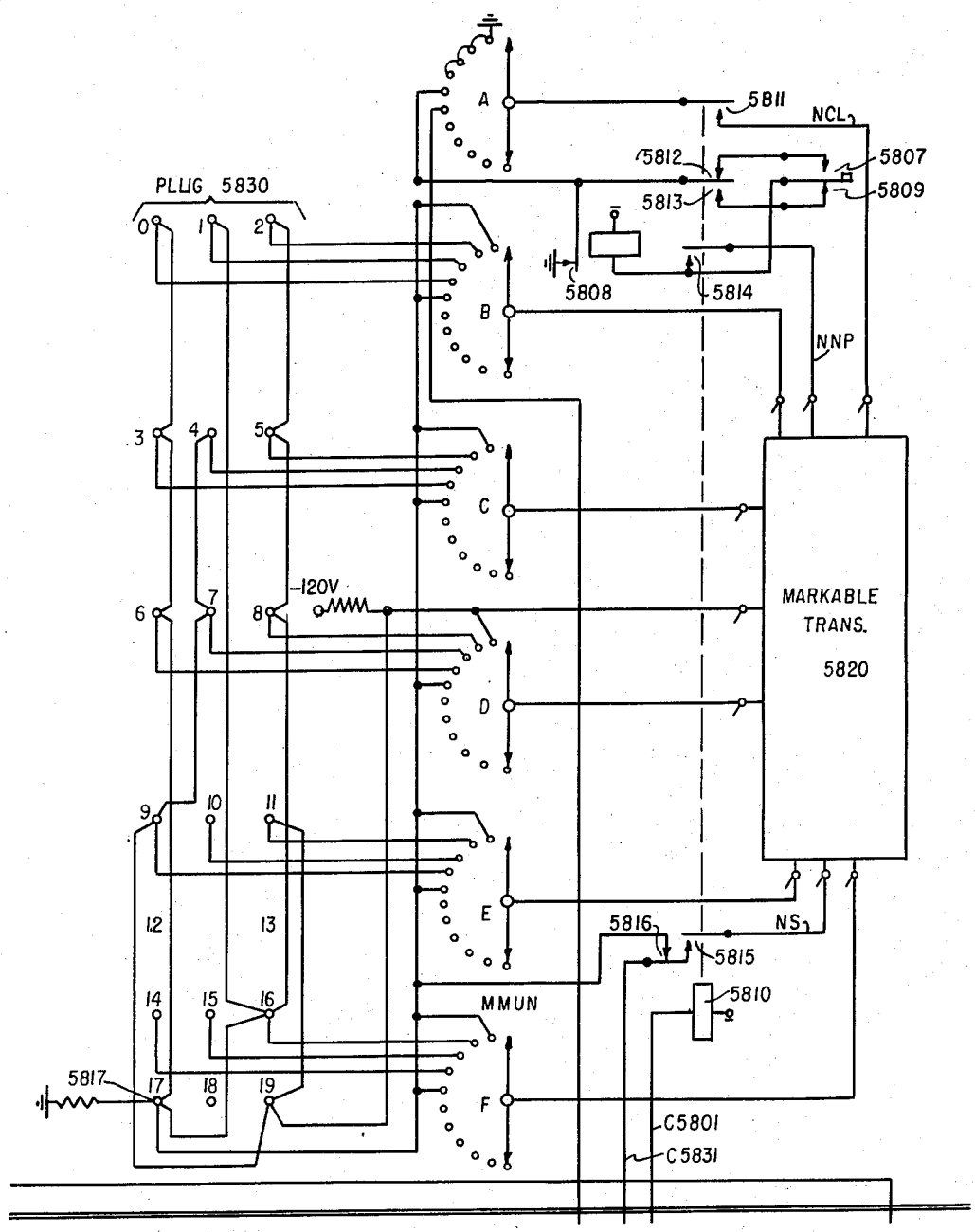
Figure 59:
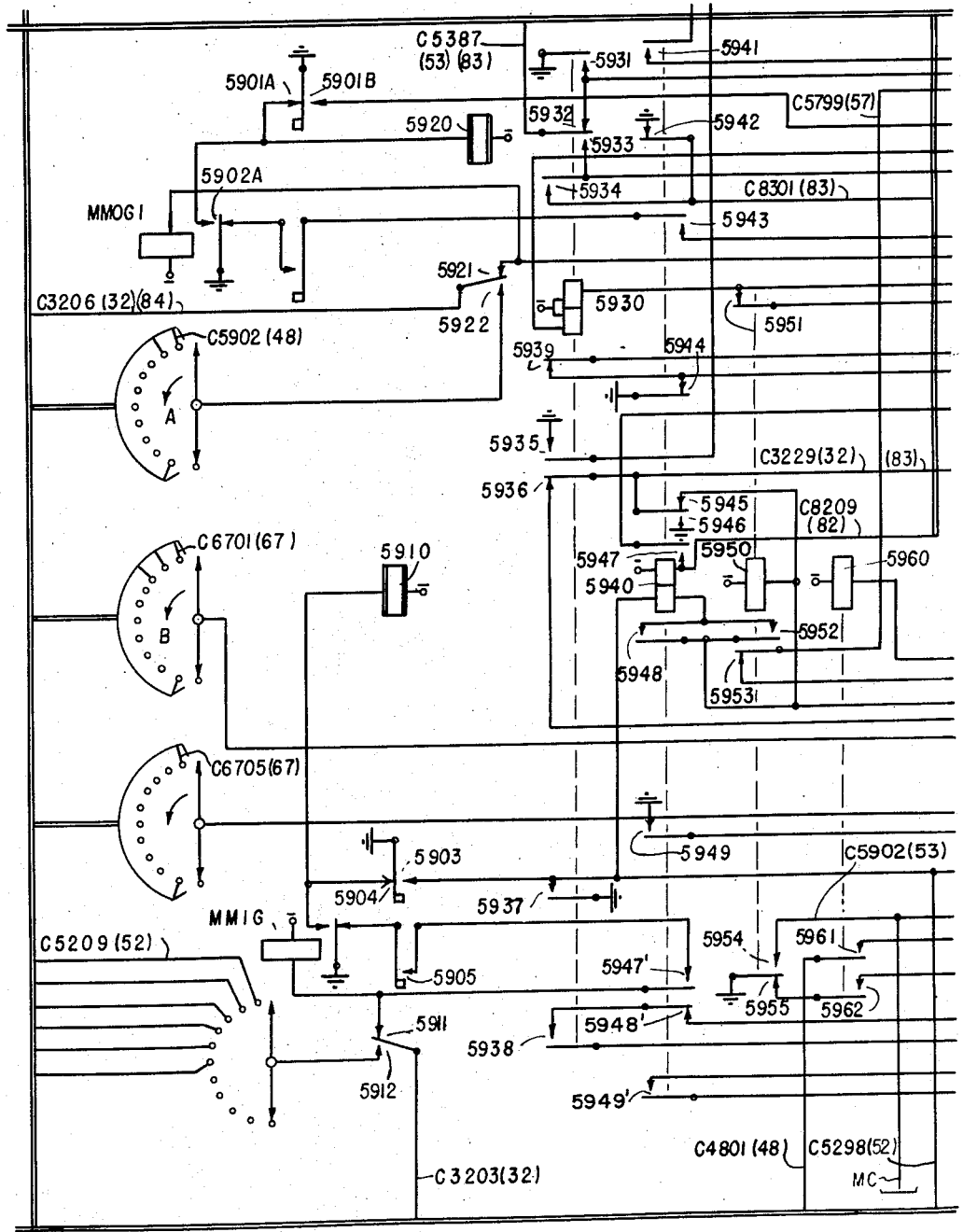
Figure 60:
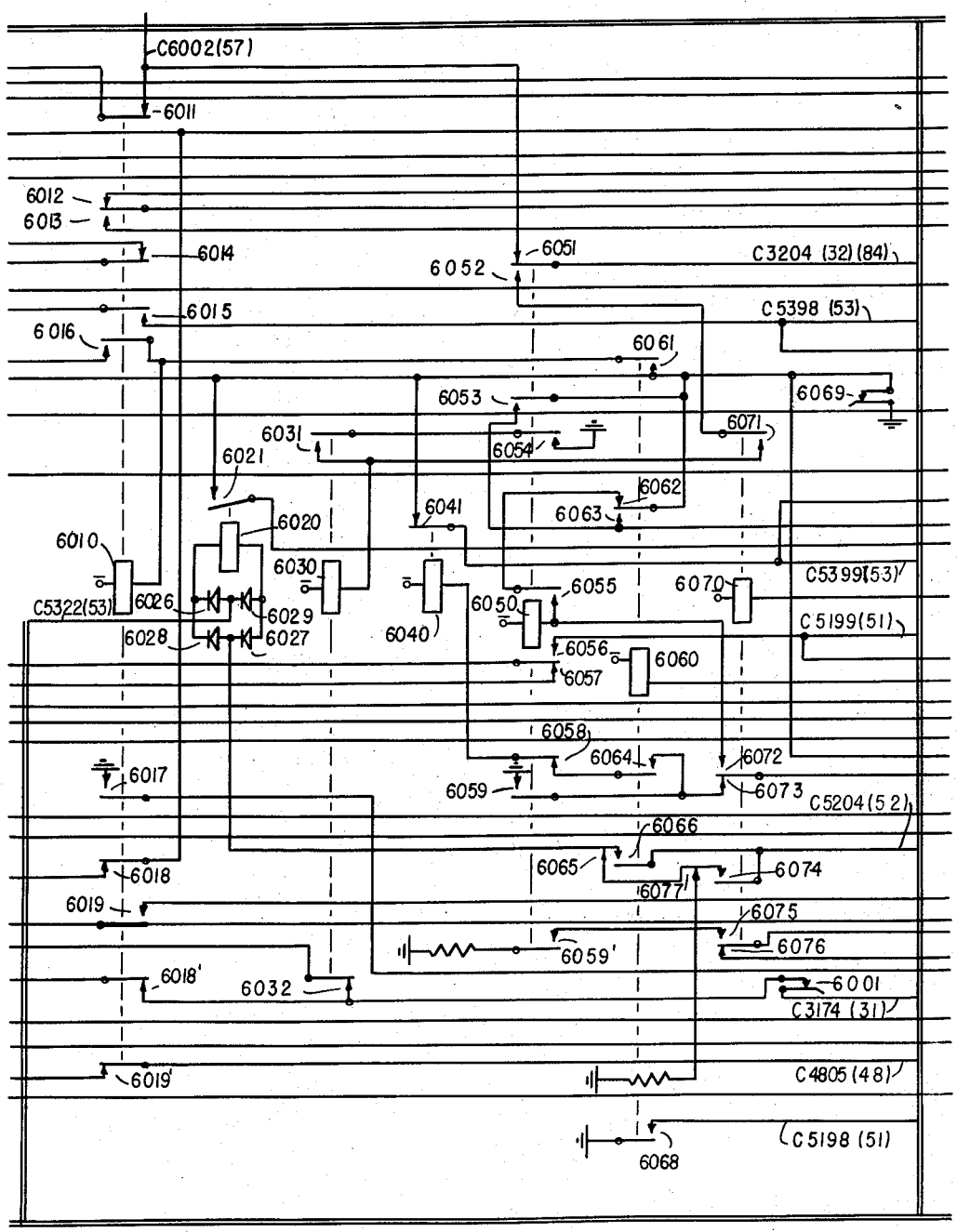
Figure 61:
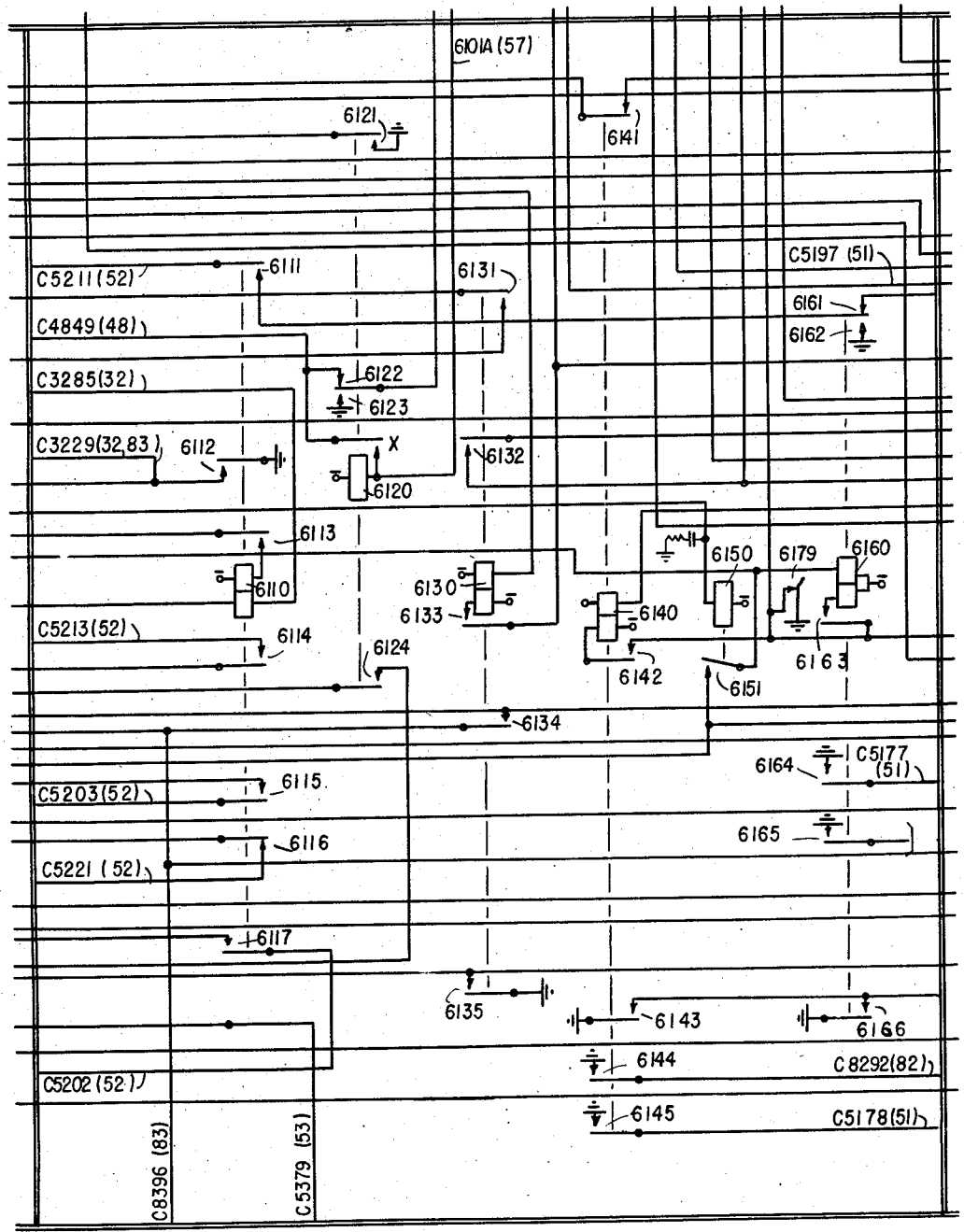
Figure 62:
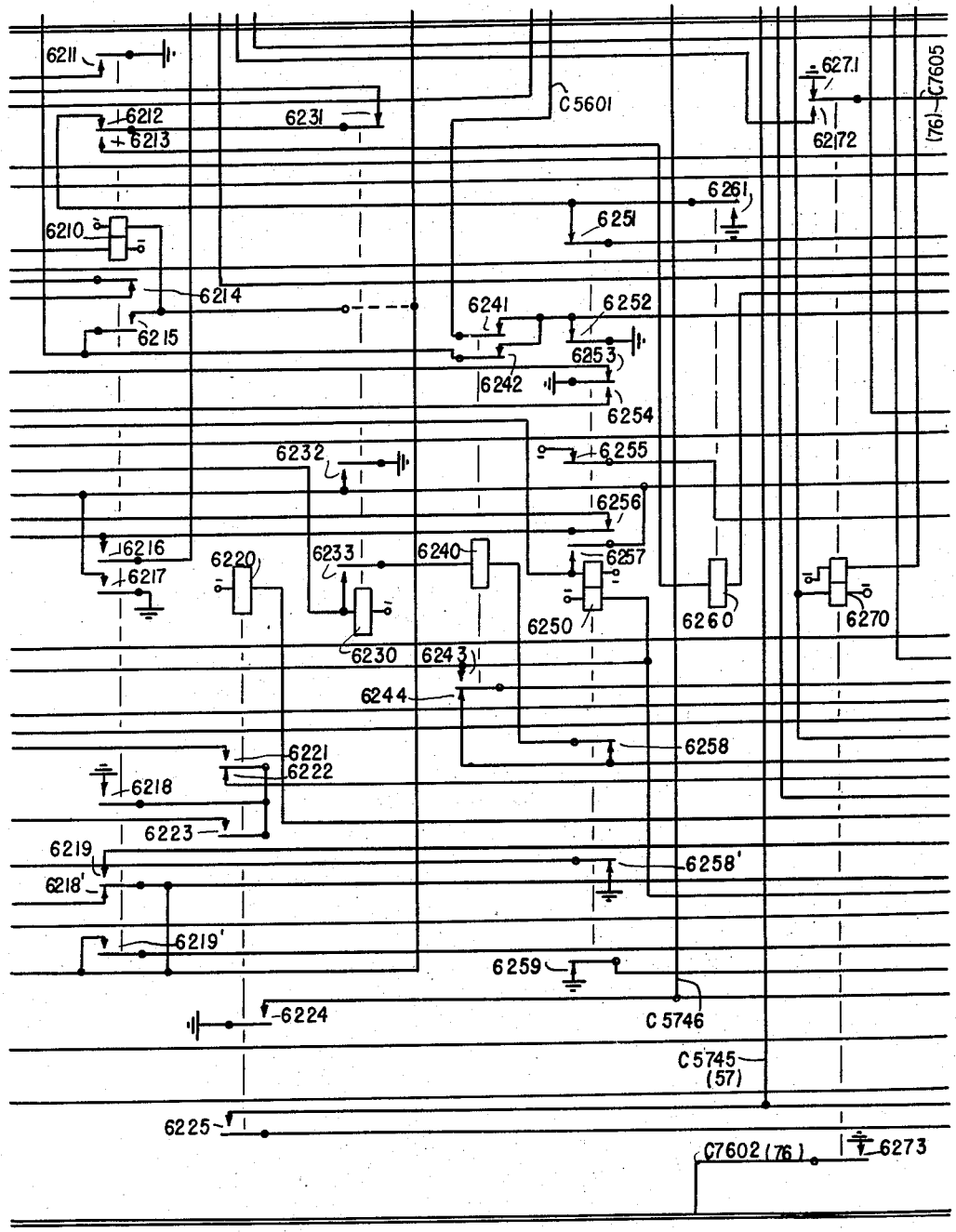
Figure 63:
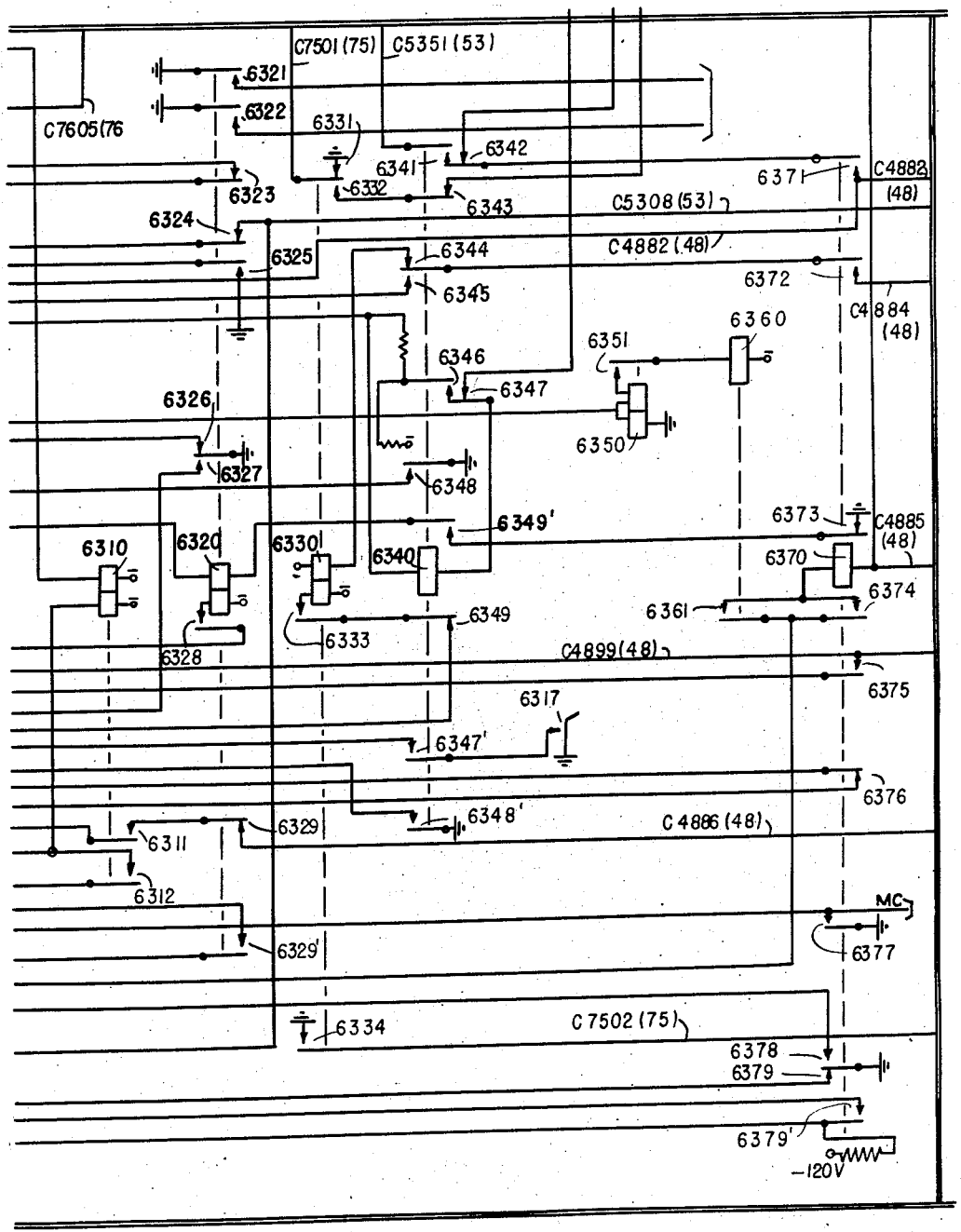

Fig. 51 shows various key and signal lamp arrangements used for identifying various apparatus during message processing.

Figure 68:
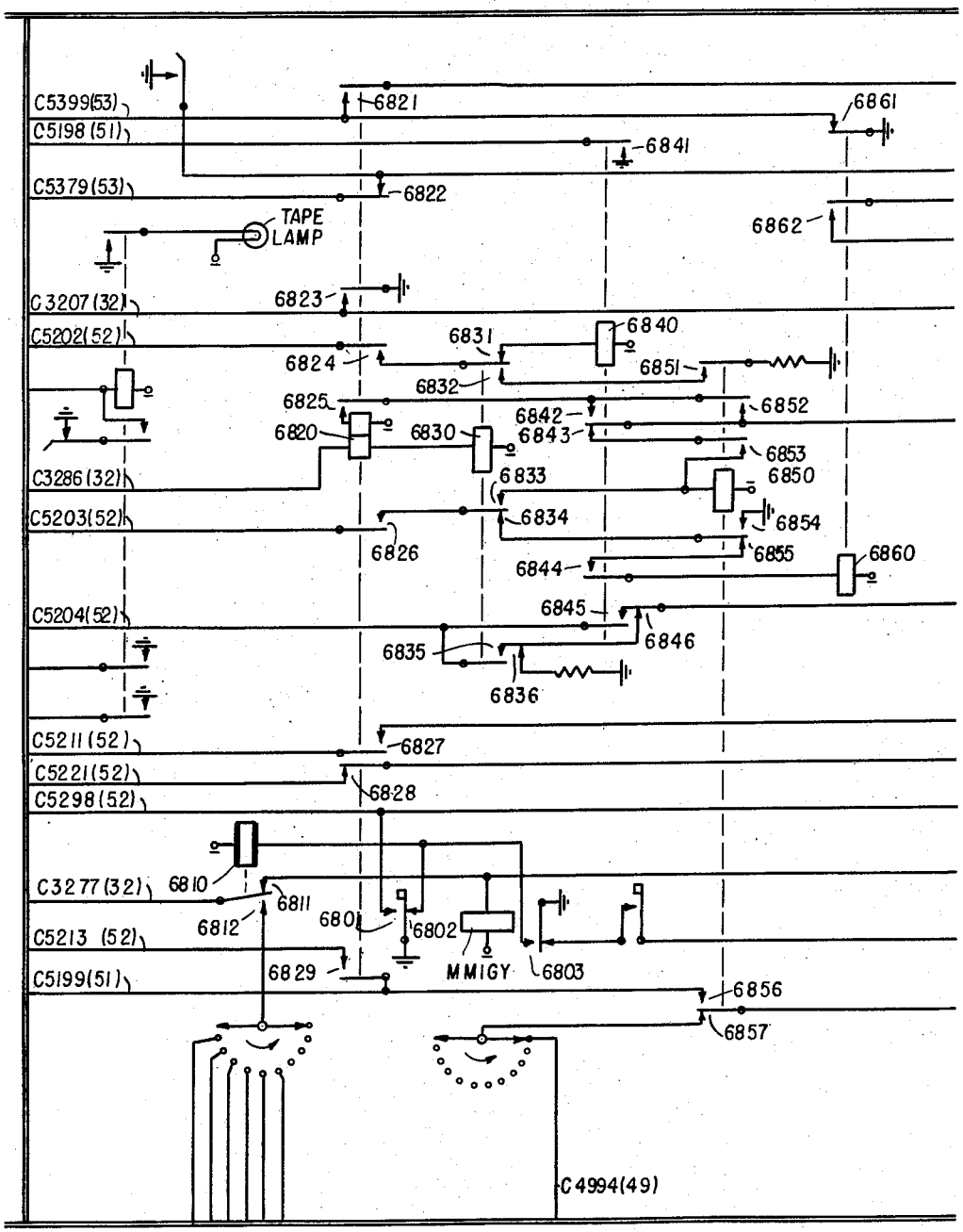
Figure 69:
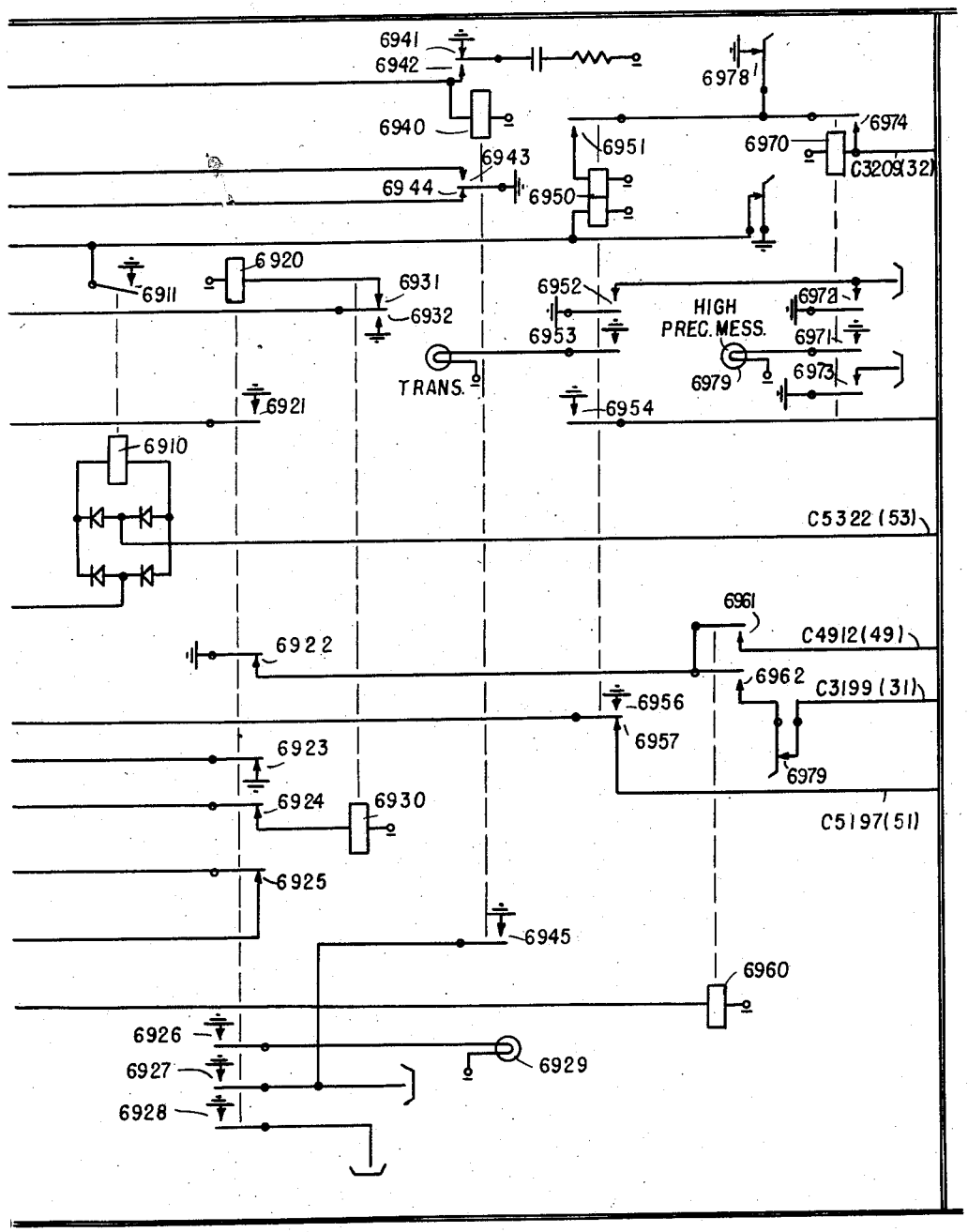
Figure 70:
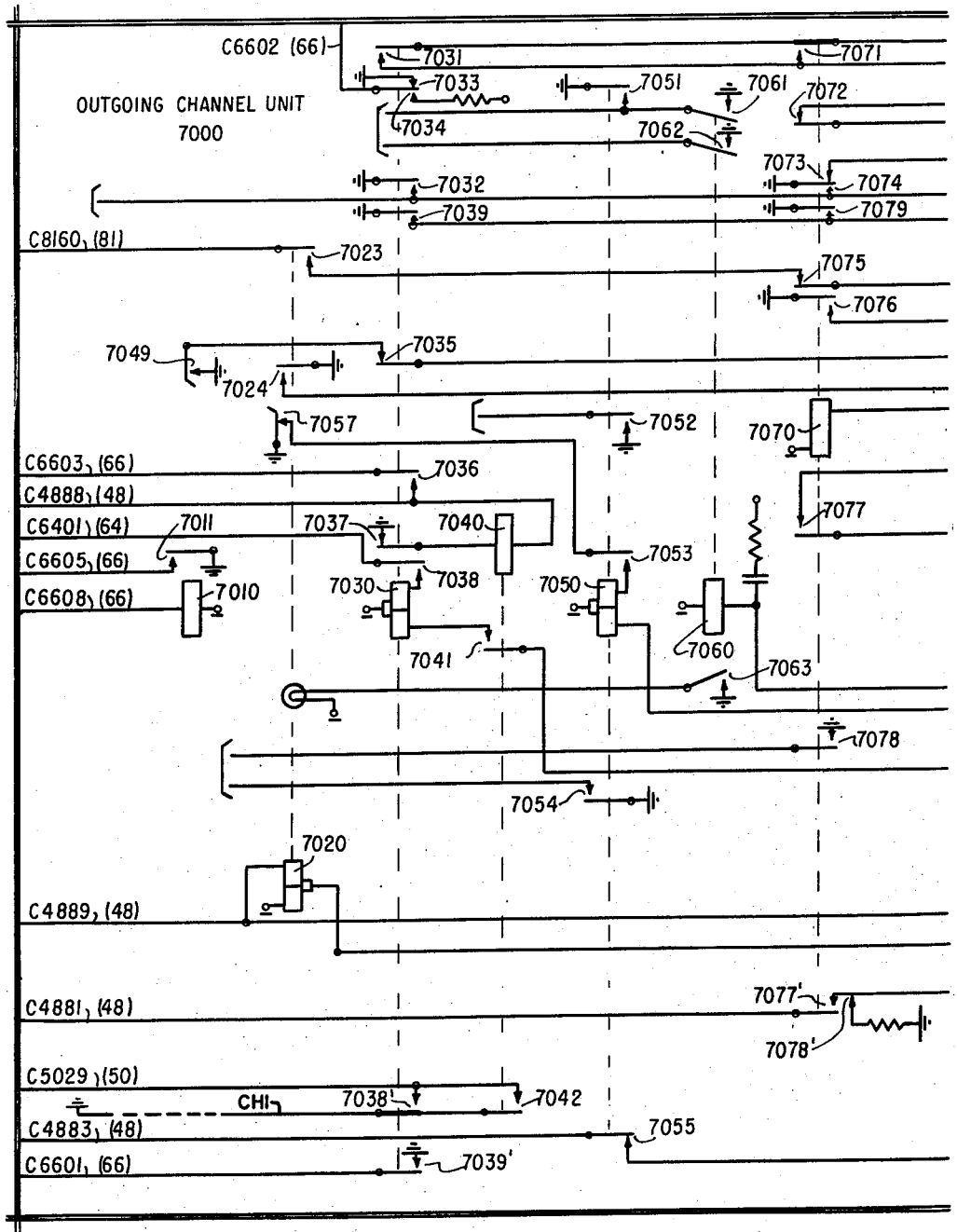
Figure 71:
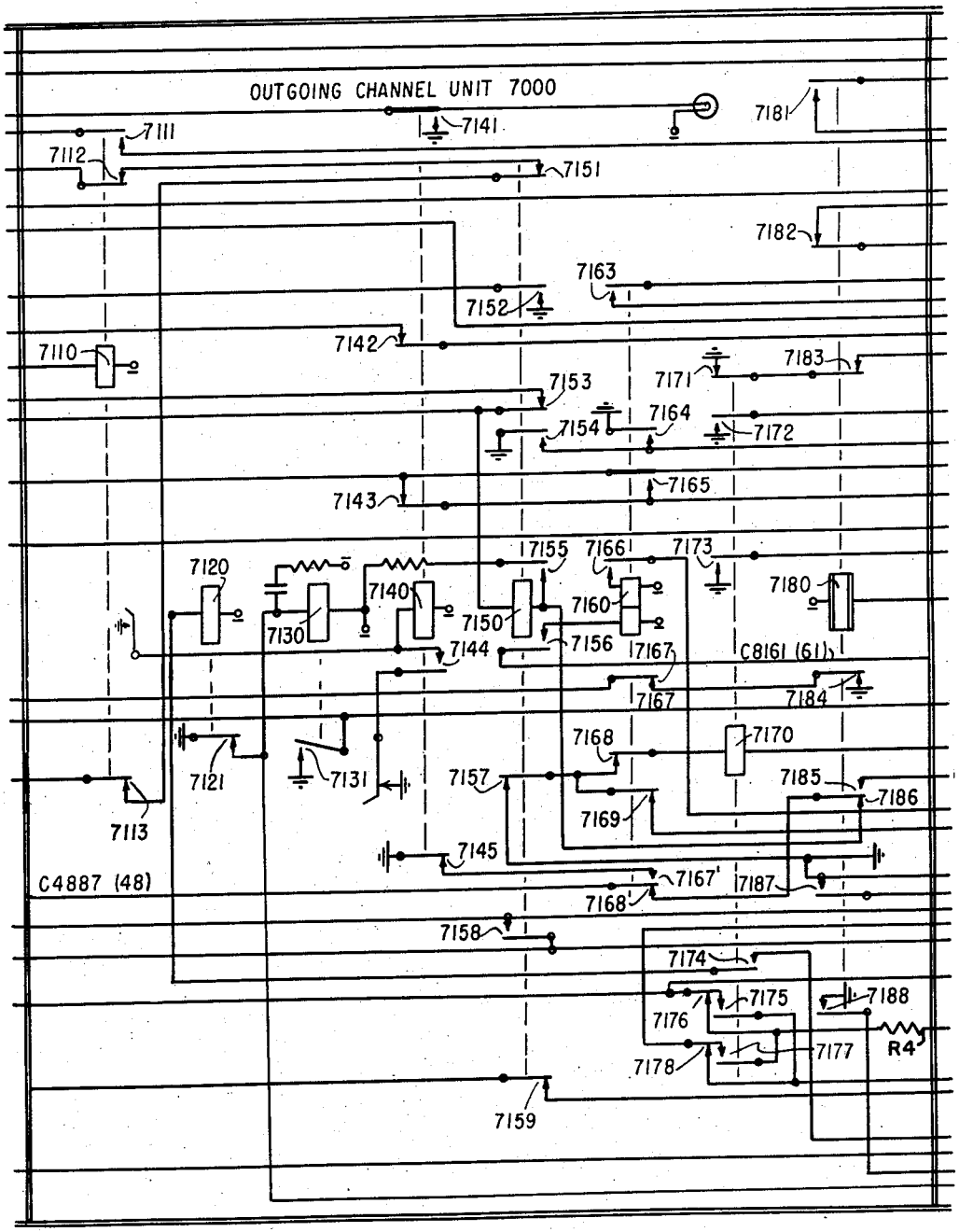
Figure 72:
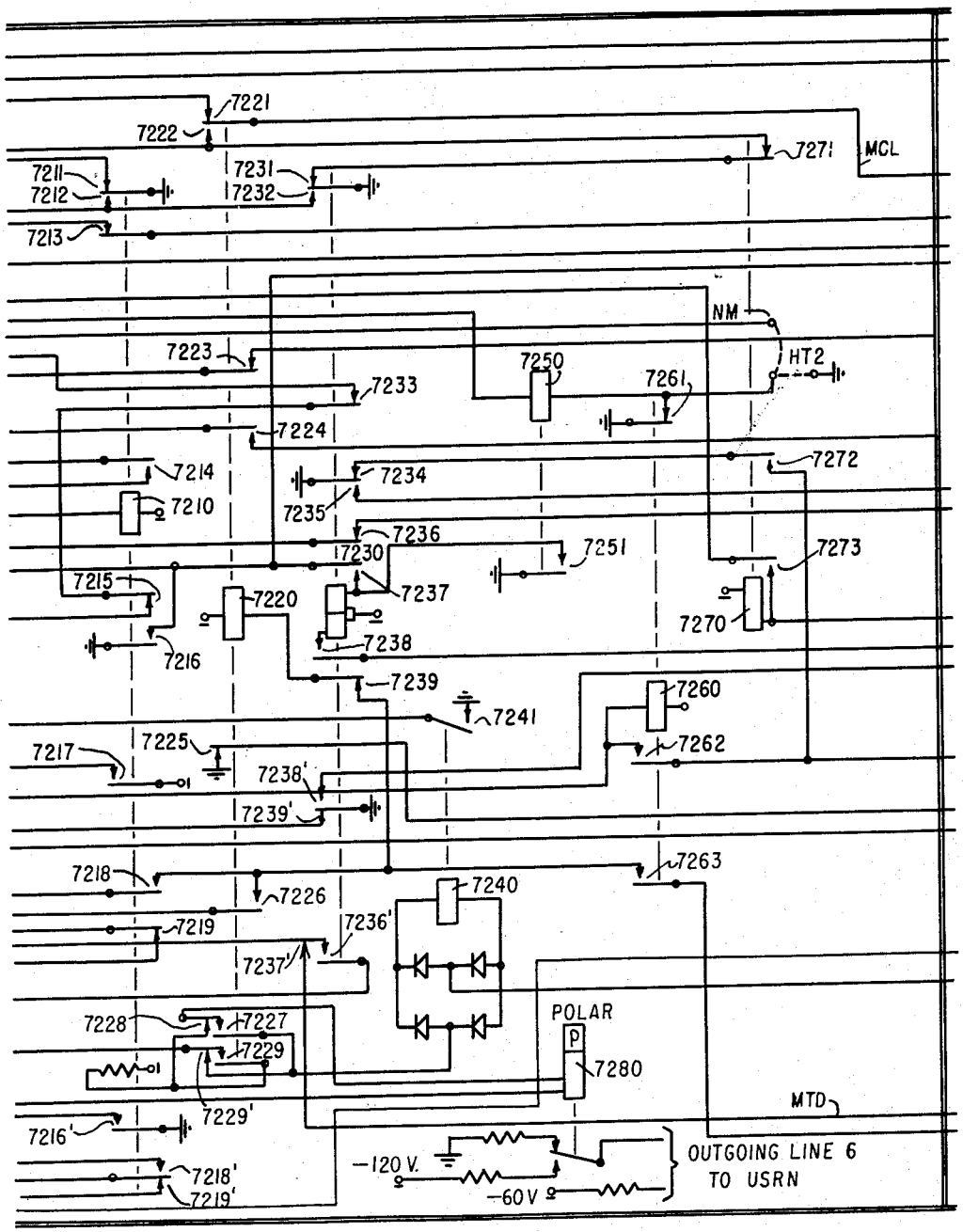
Figure 73:
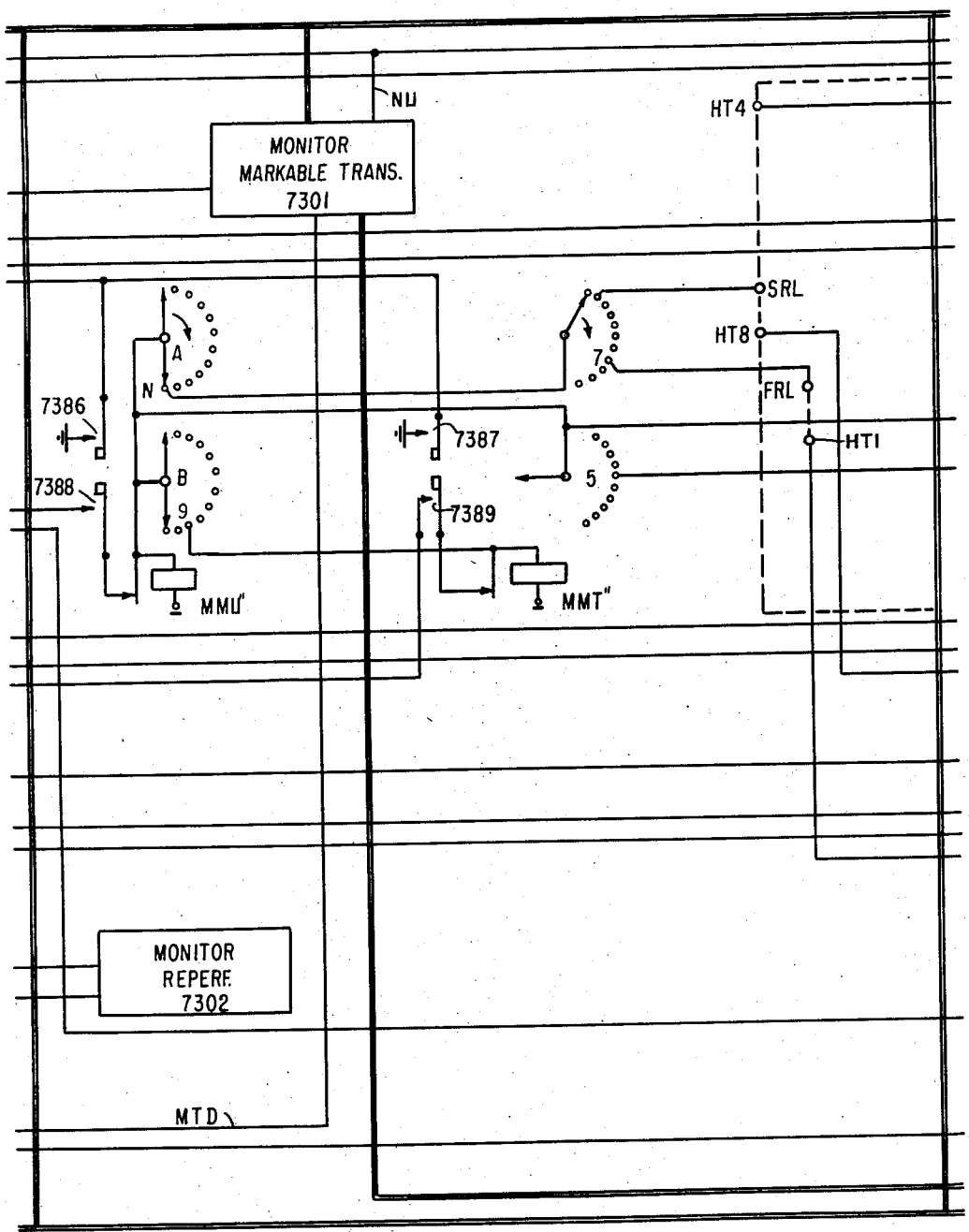
Figure 74:
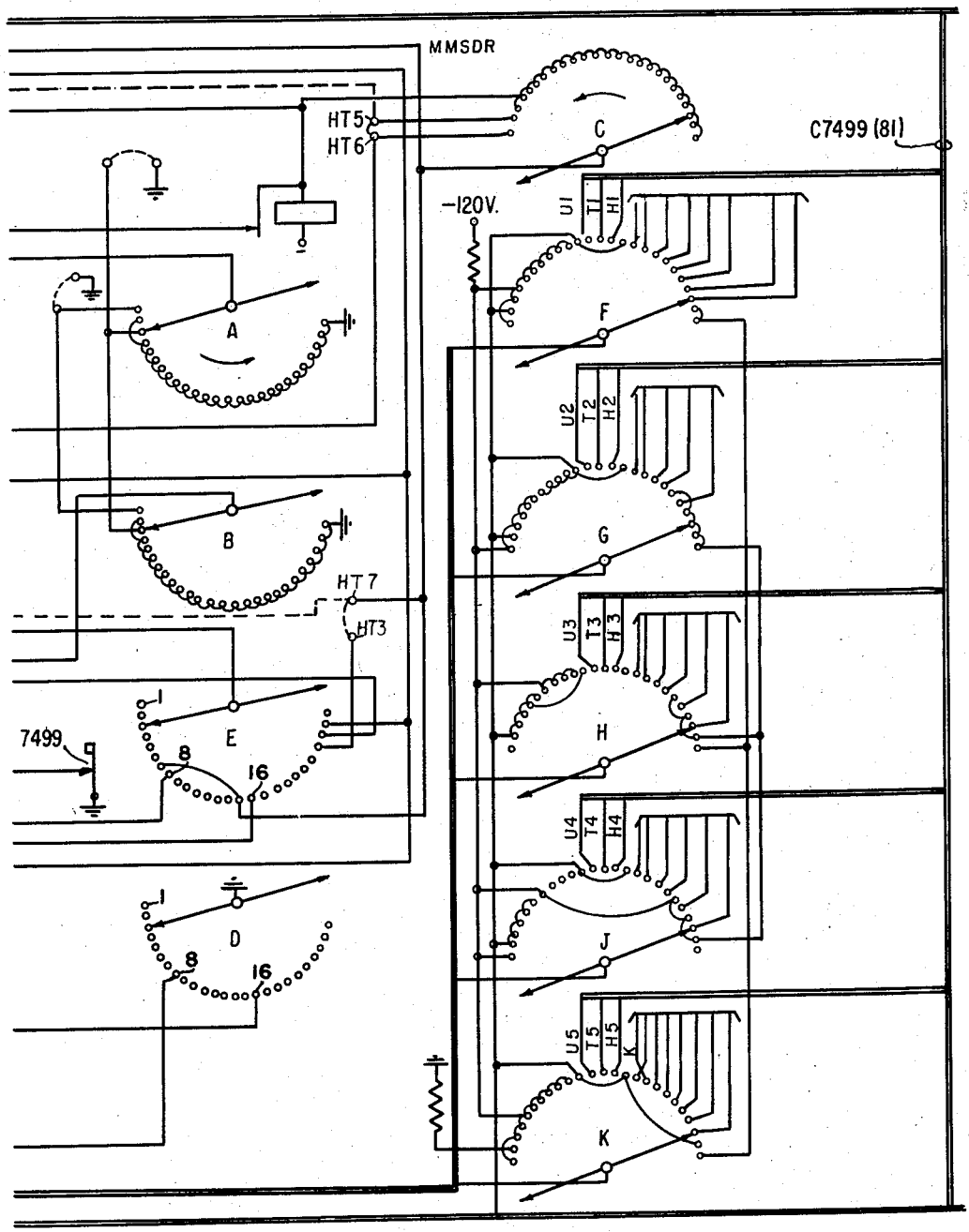
Figure 82:
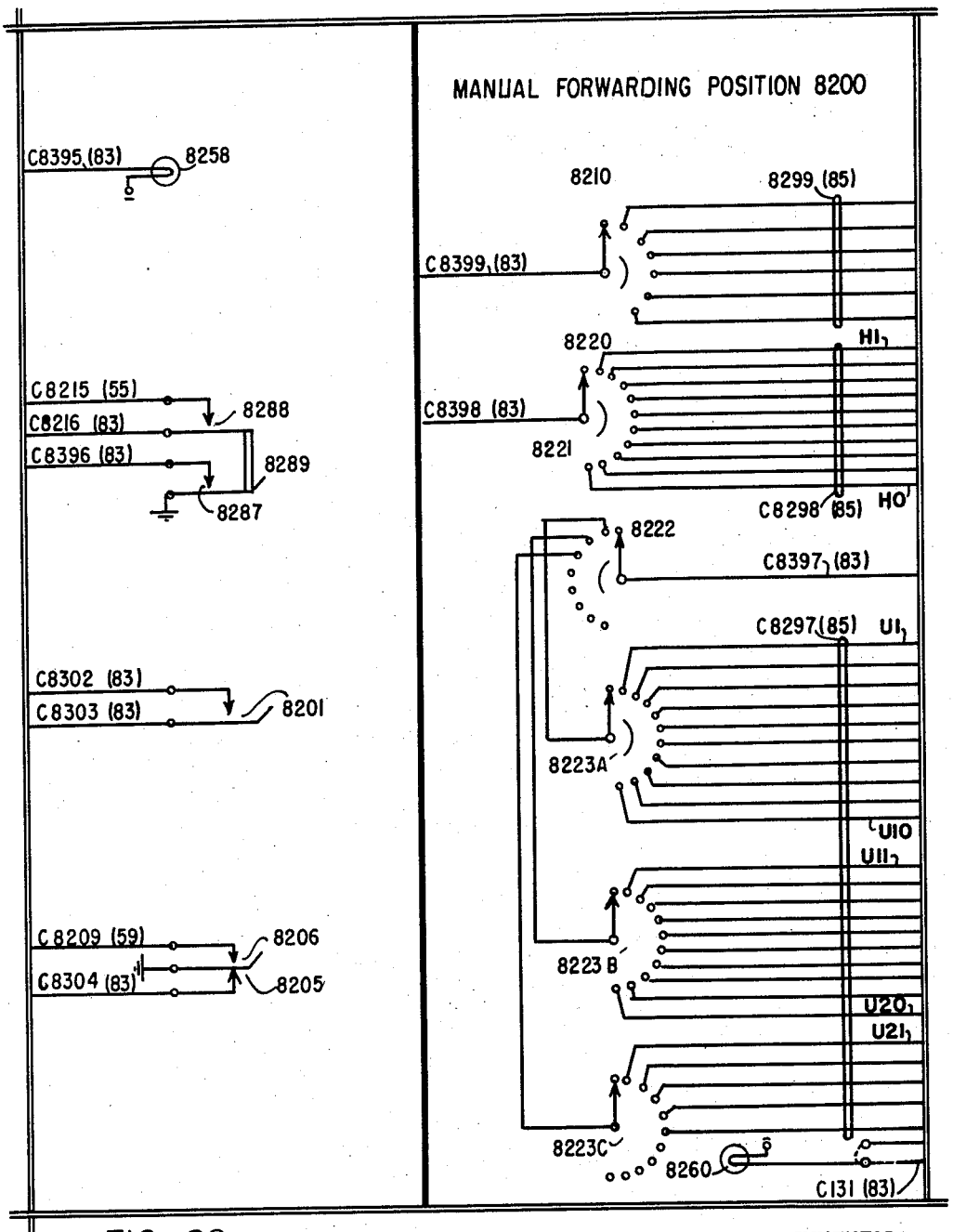
Figure 83:
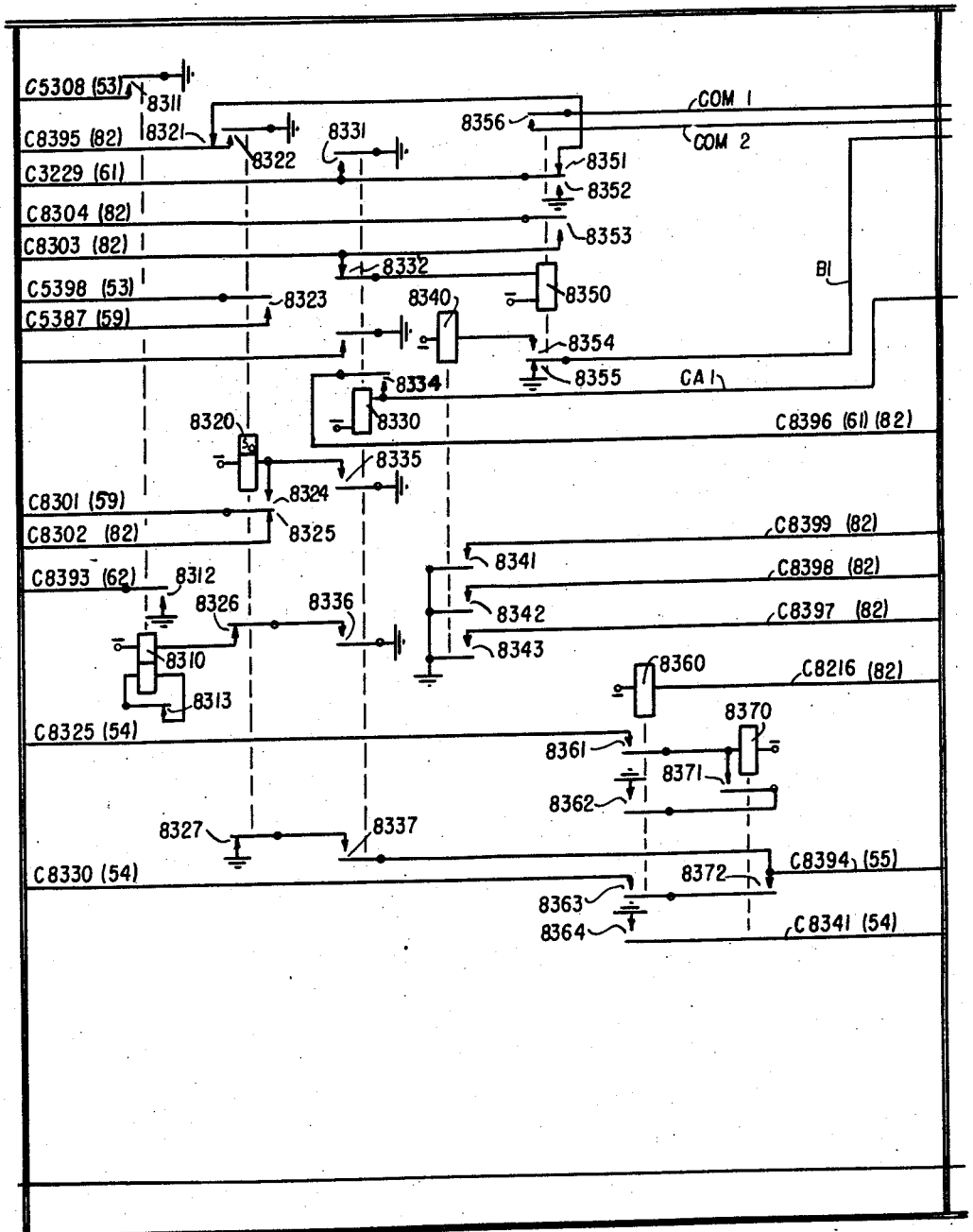
Figure 84:
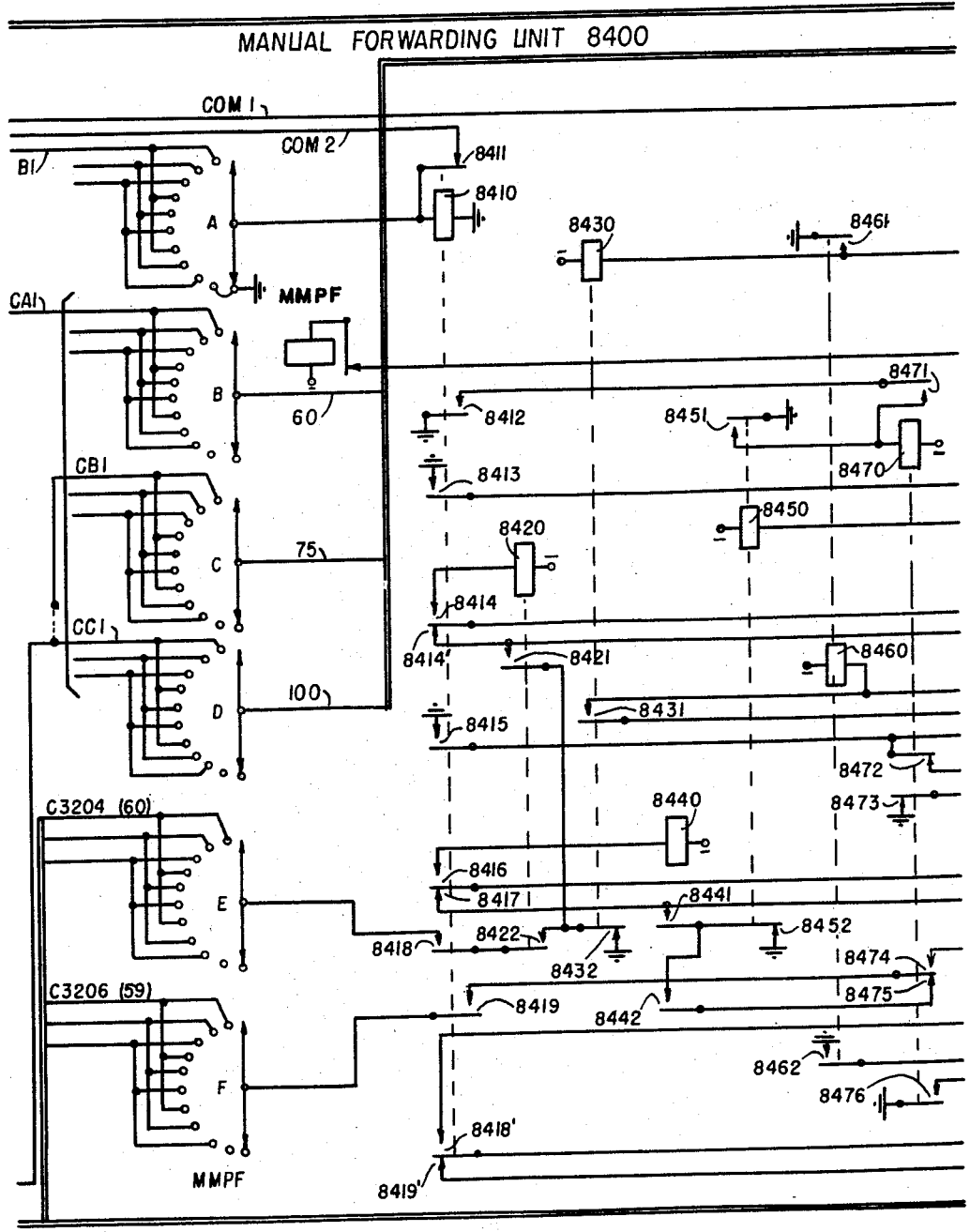
Figure 85:
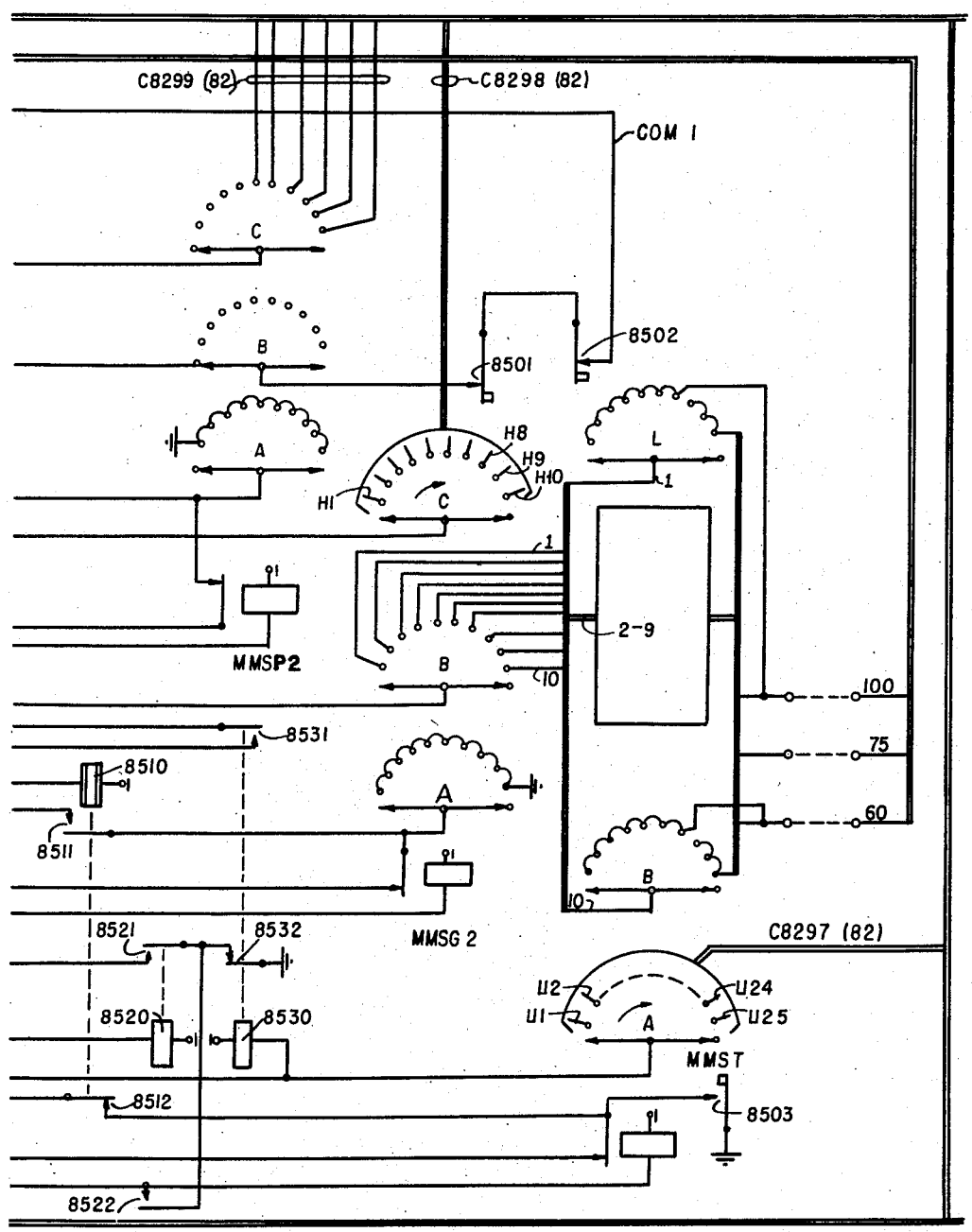
Figure 86:
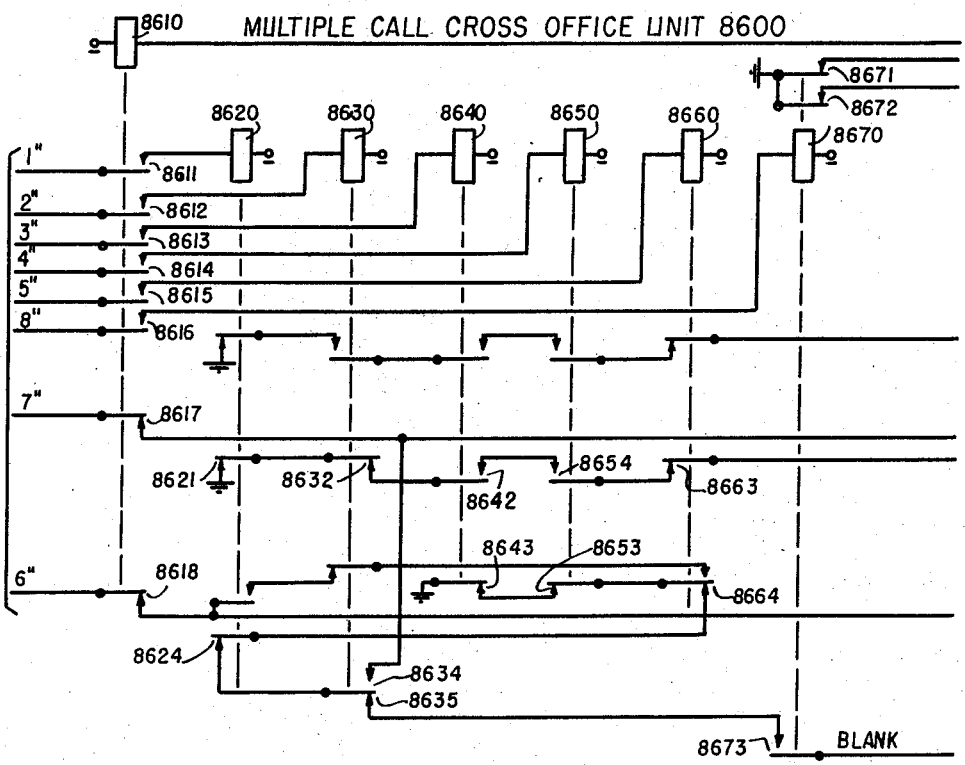
Figure 87:
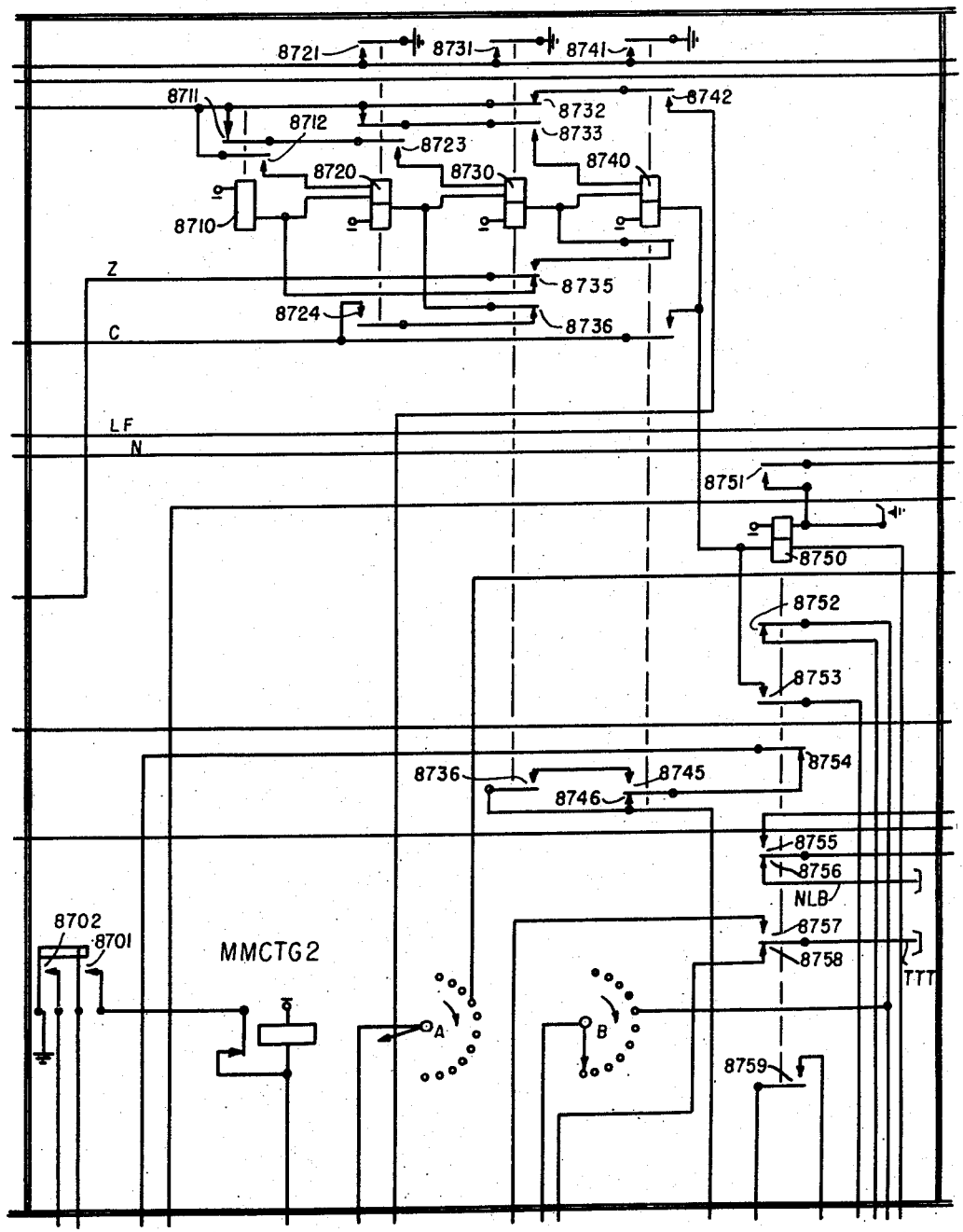
Figure 88:
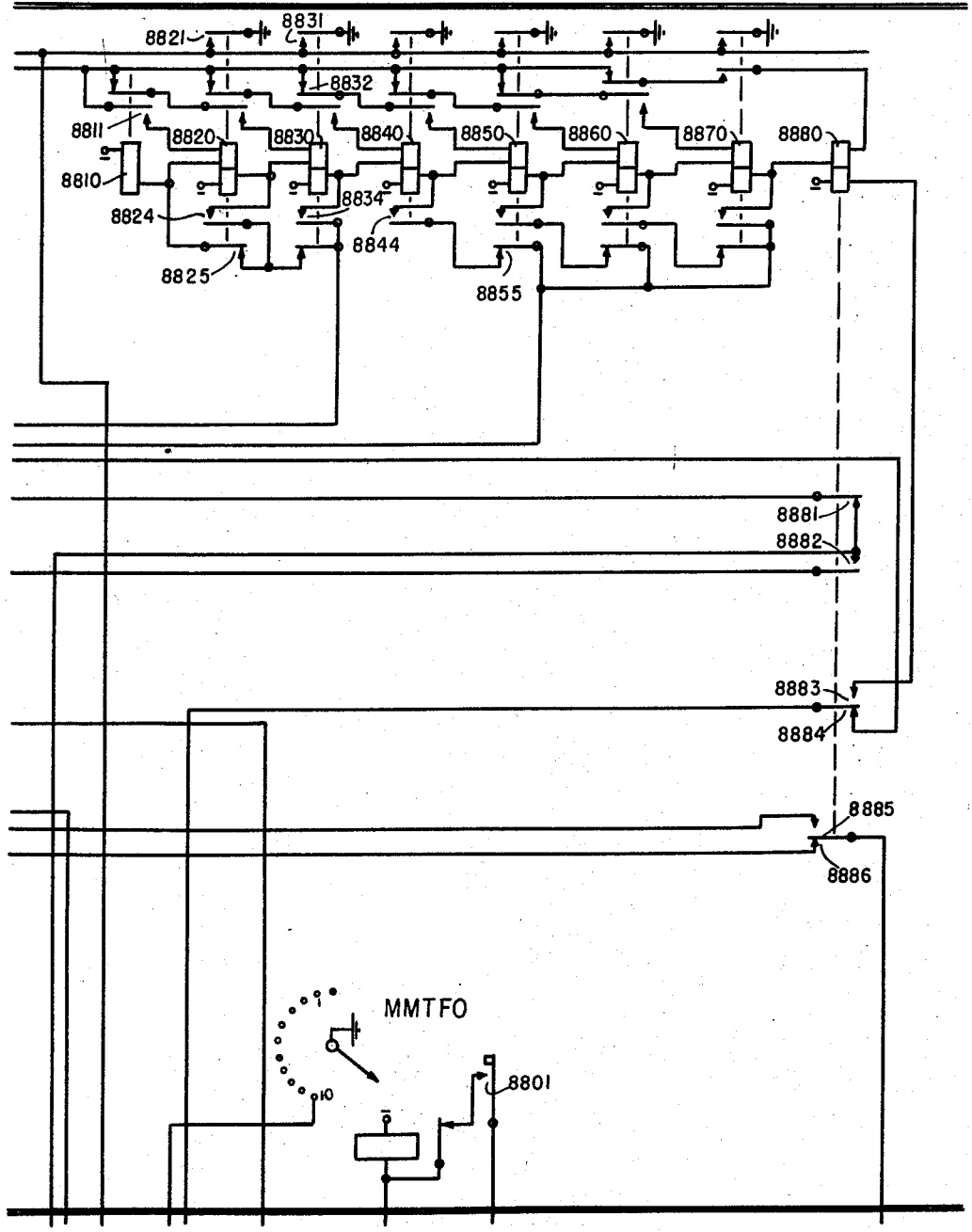
Figure 89:
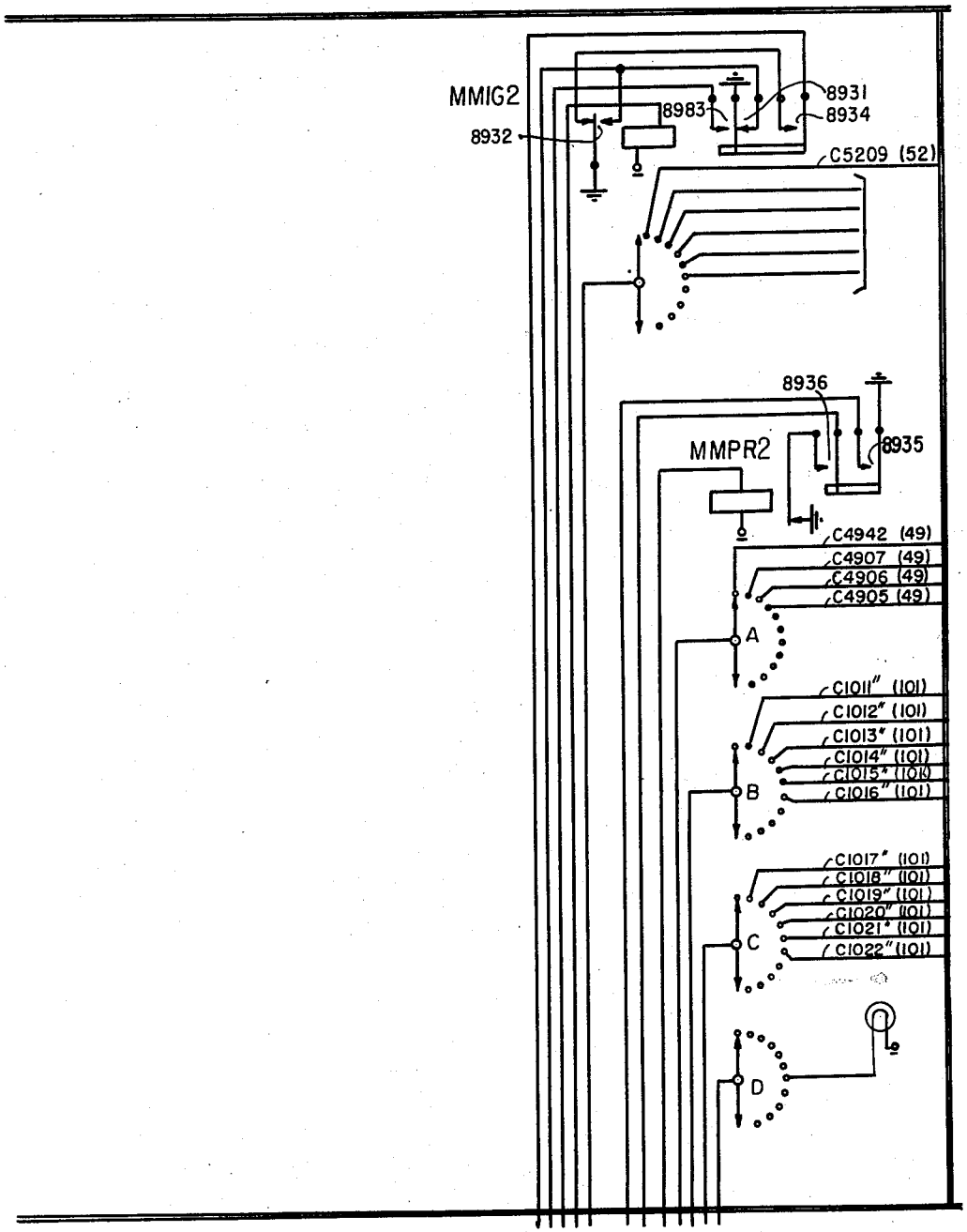
Figure 90:
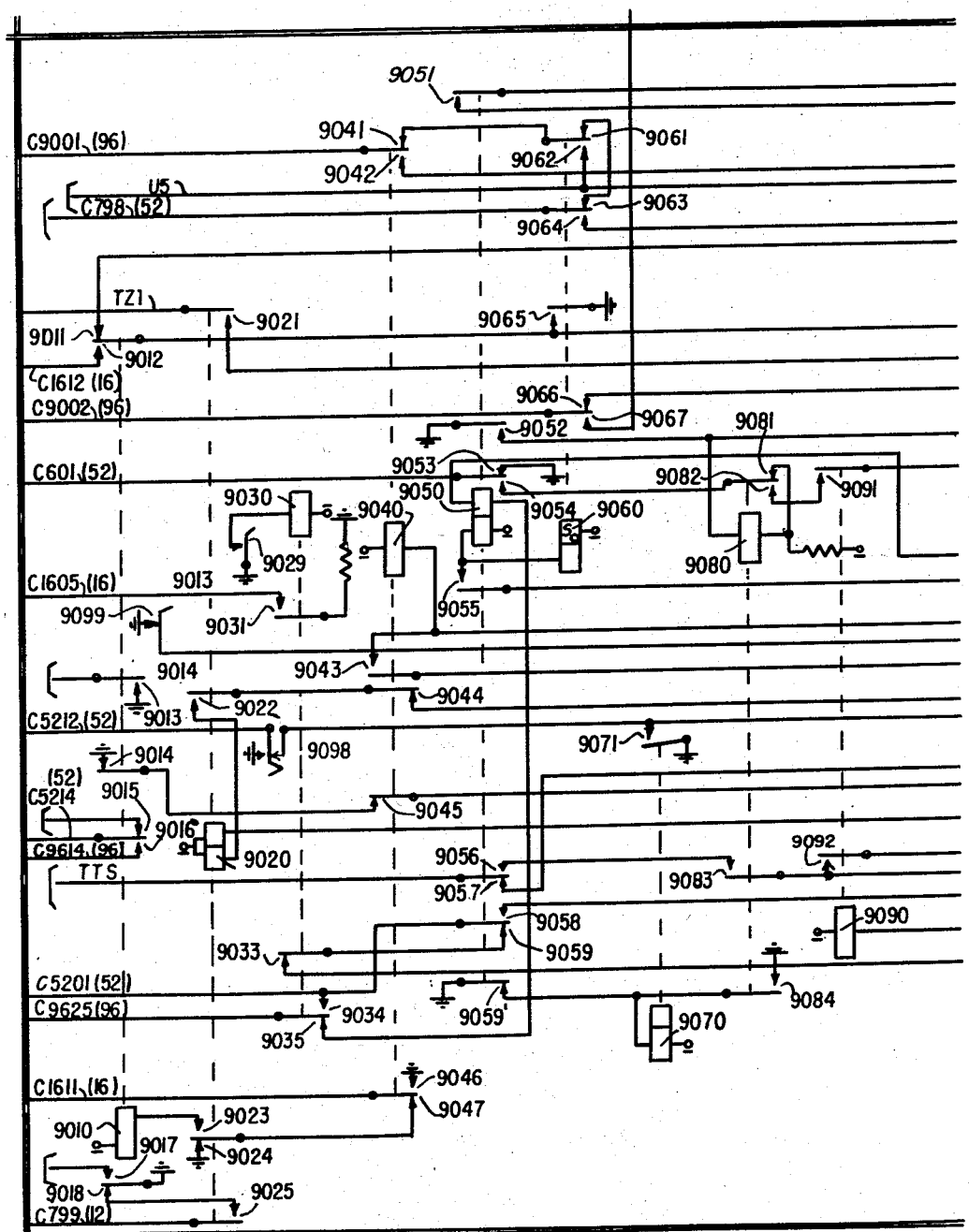
Figure 91:
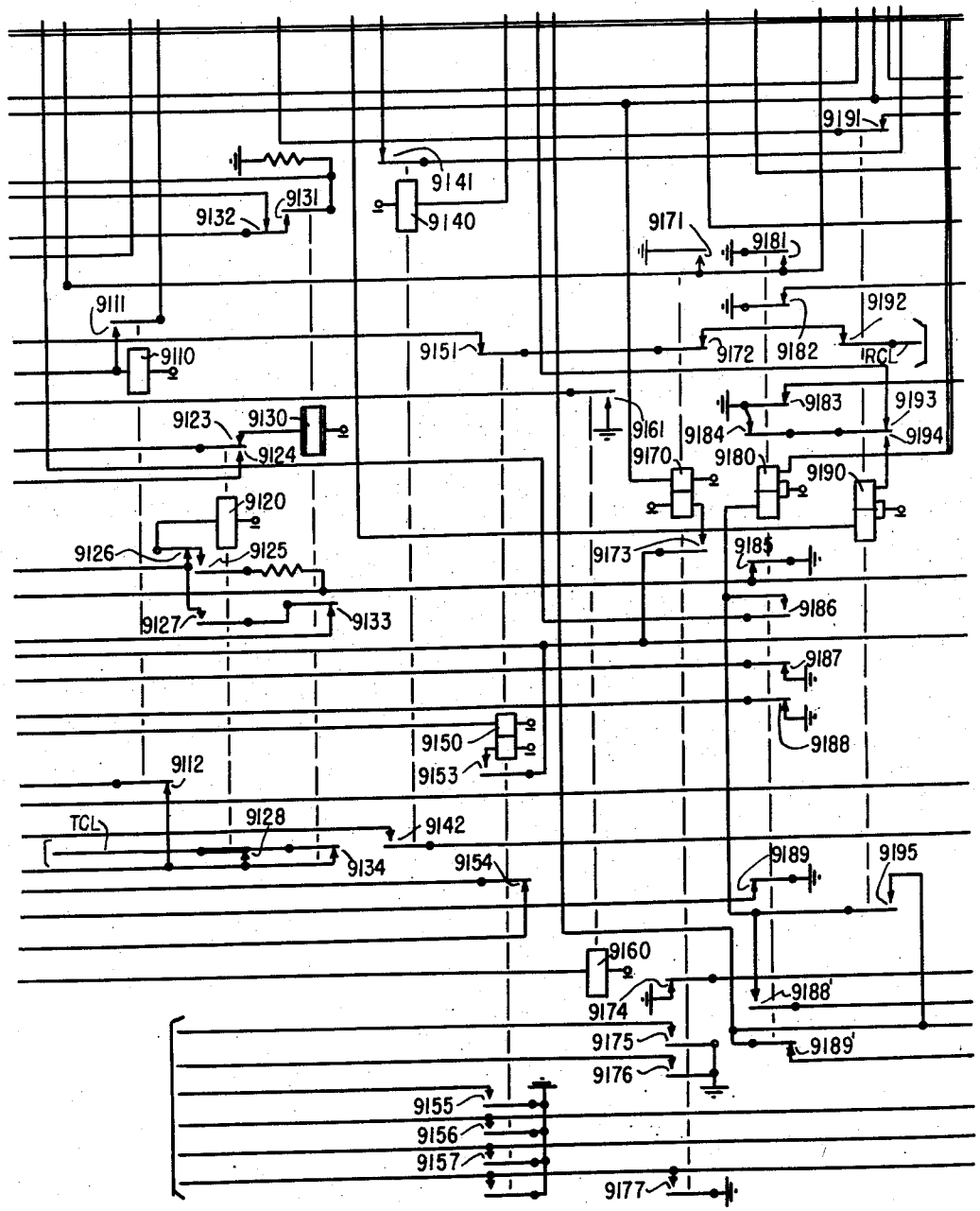
Figure 92:
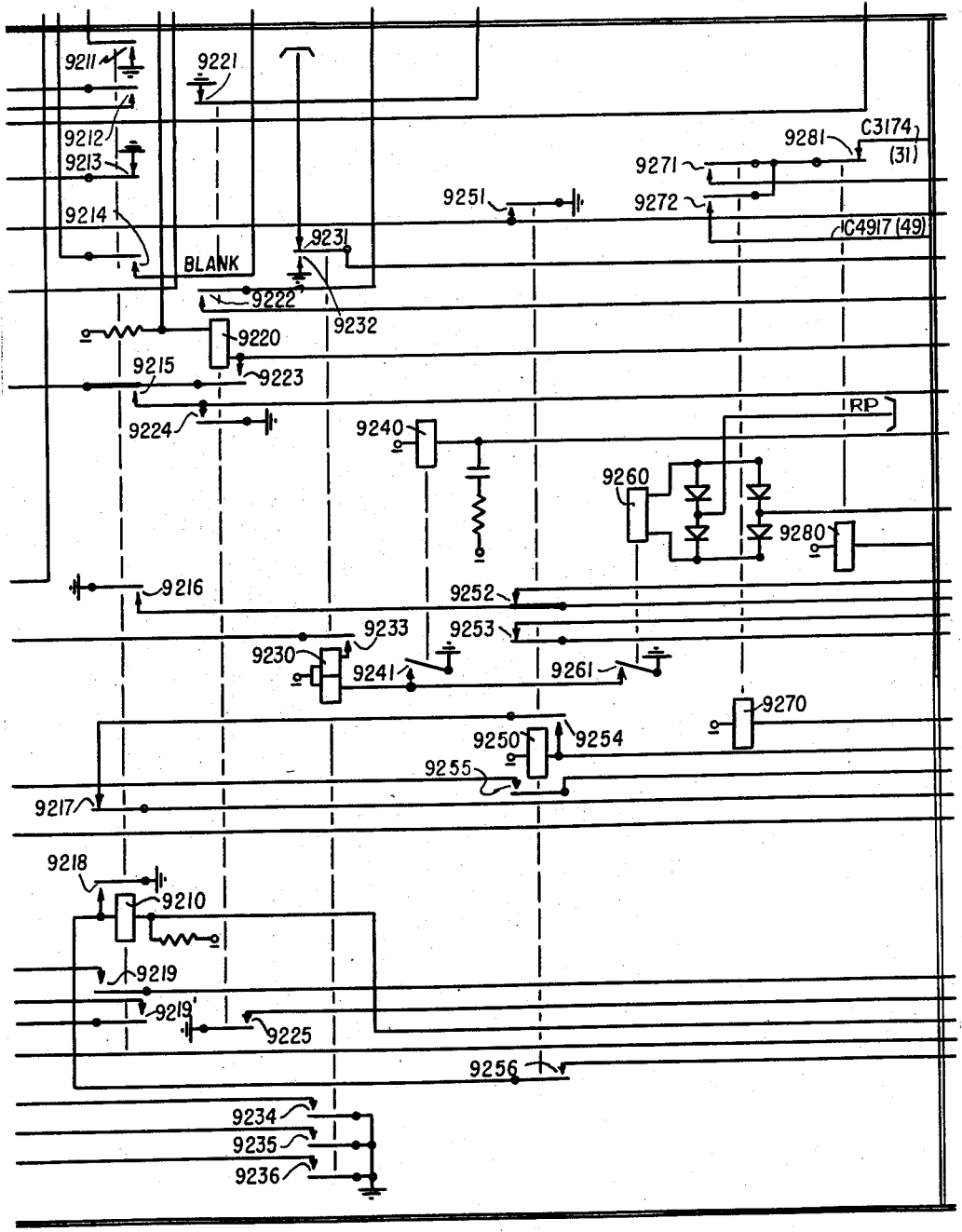
Figure 93:
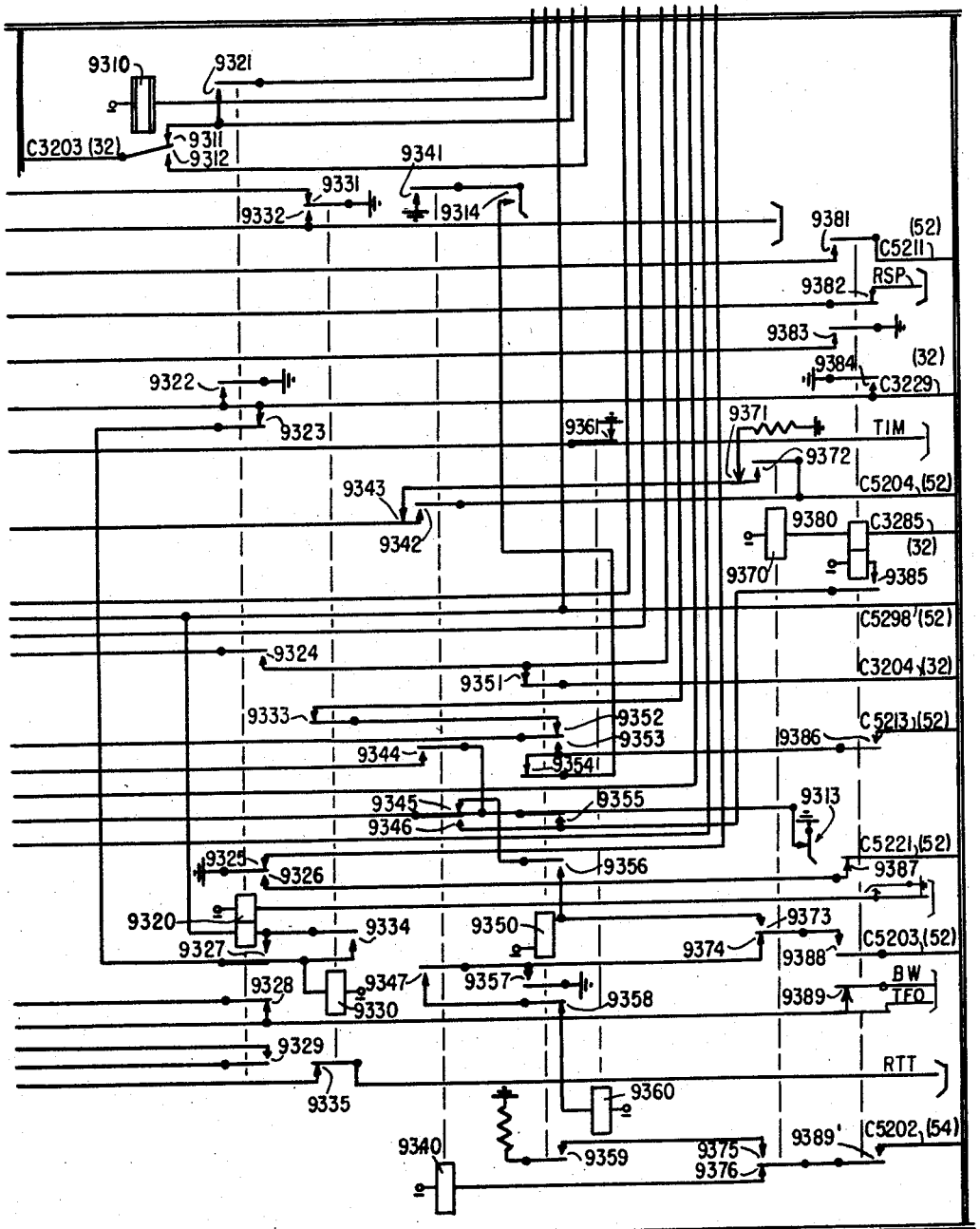
Figure 94:
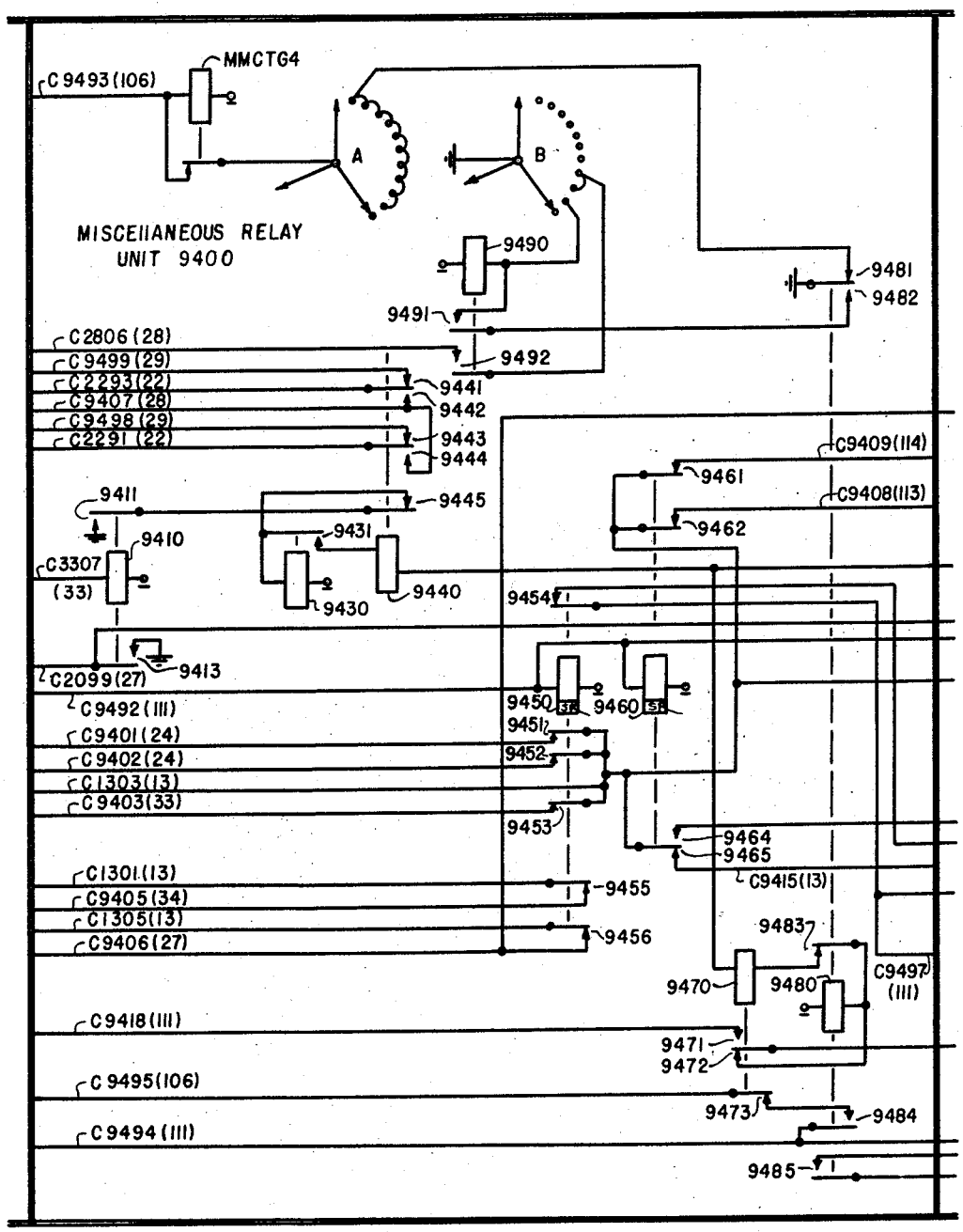
Figure 95:
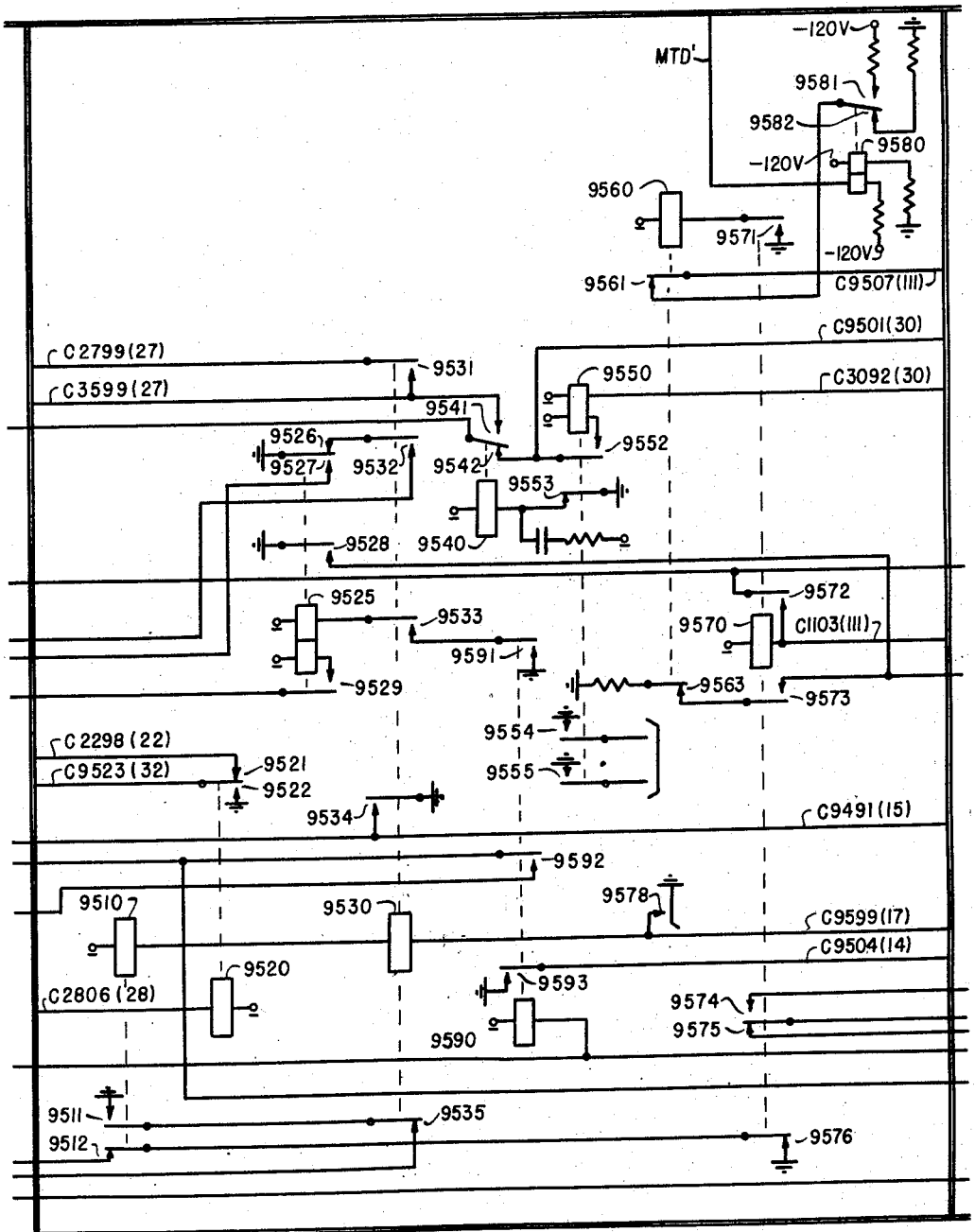
Figure 96:
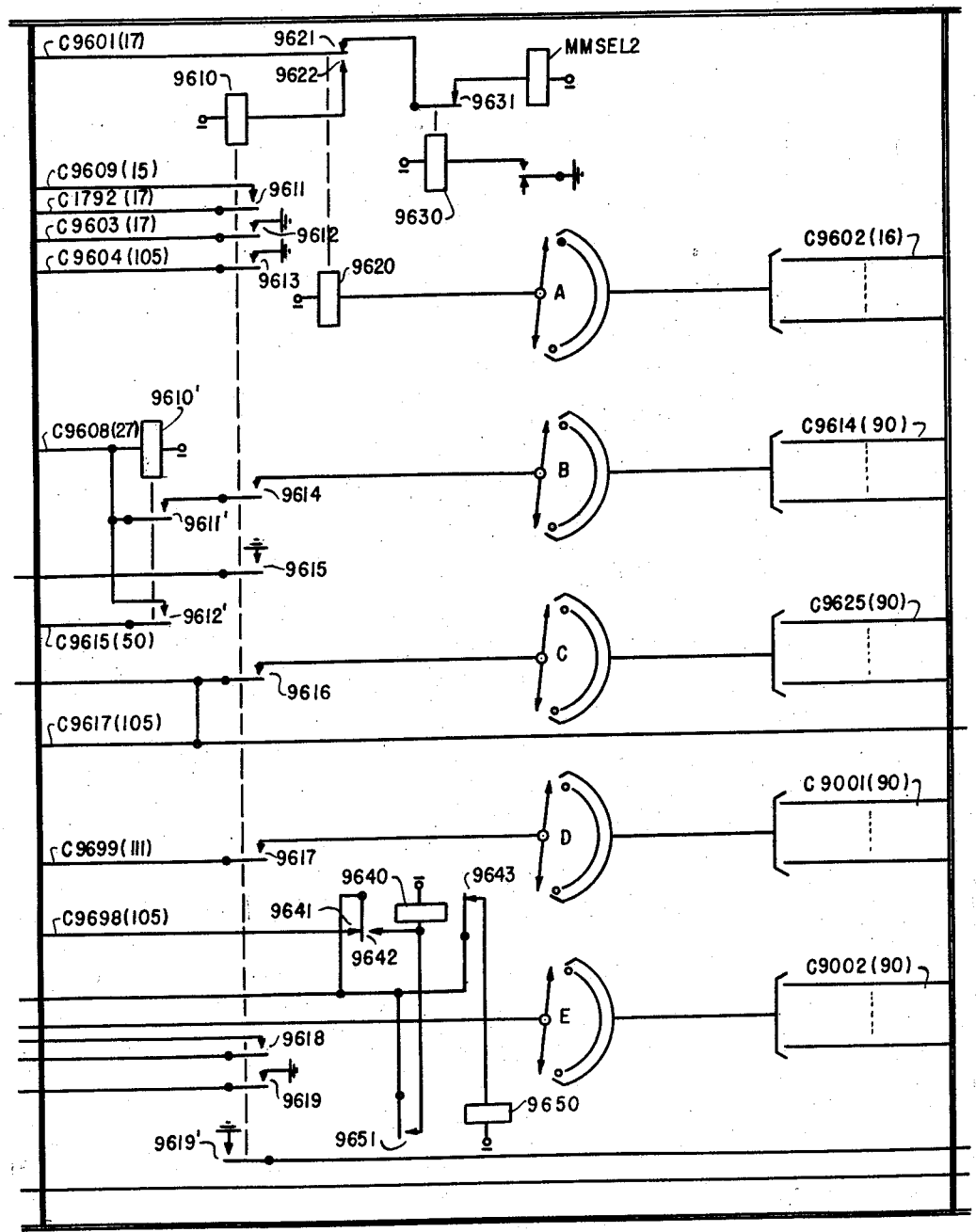
Figure 97:
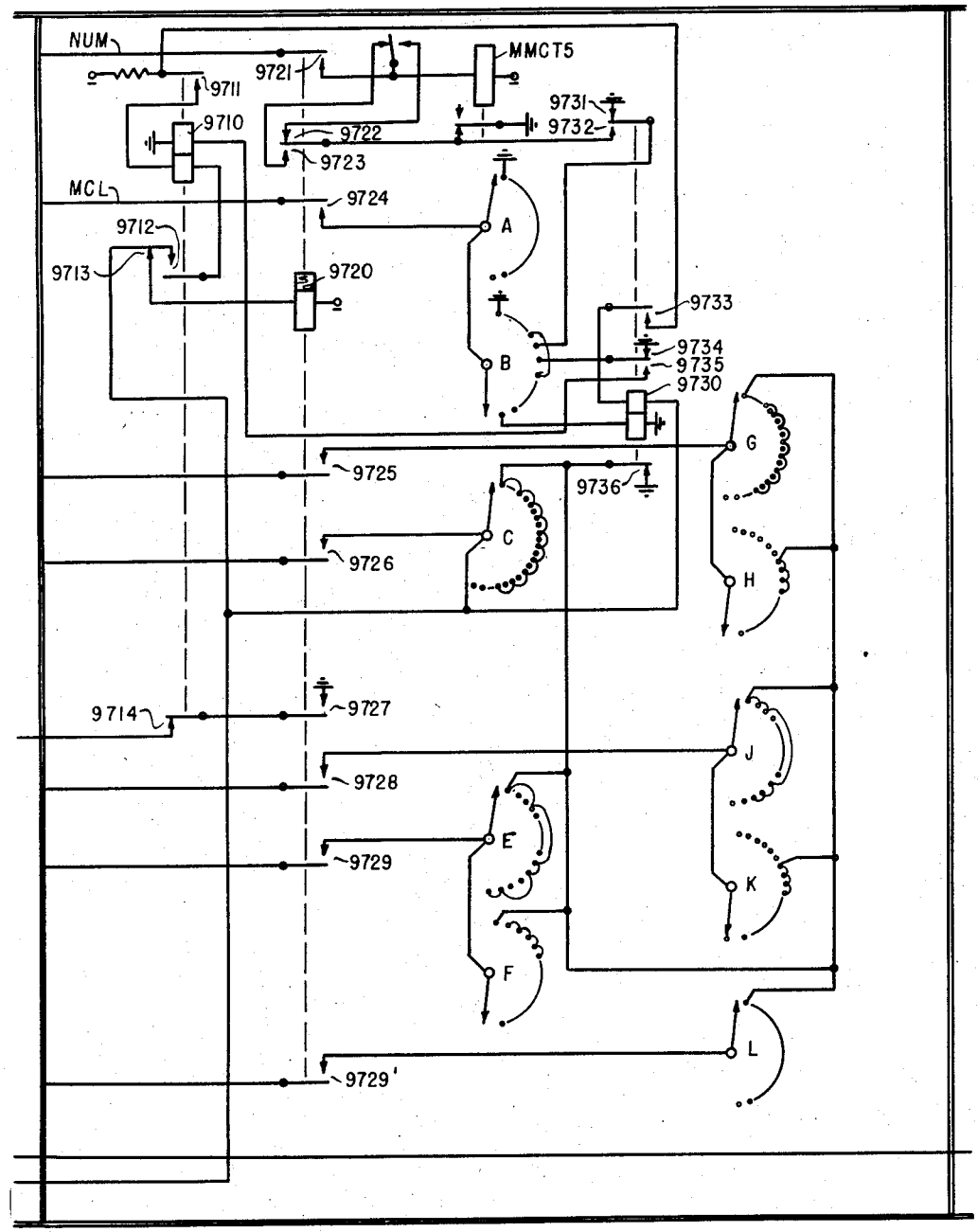
Figure 98:
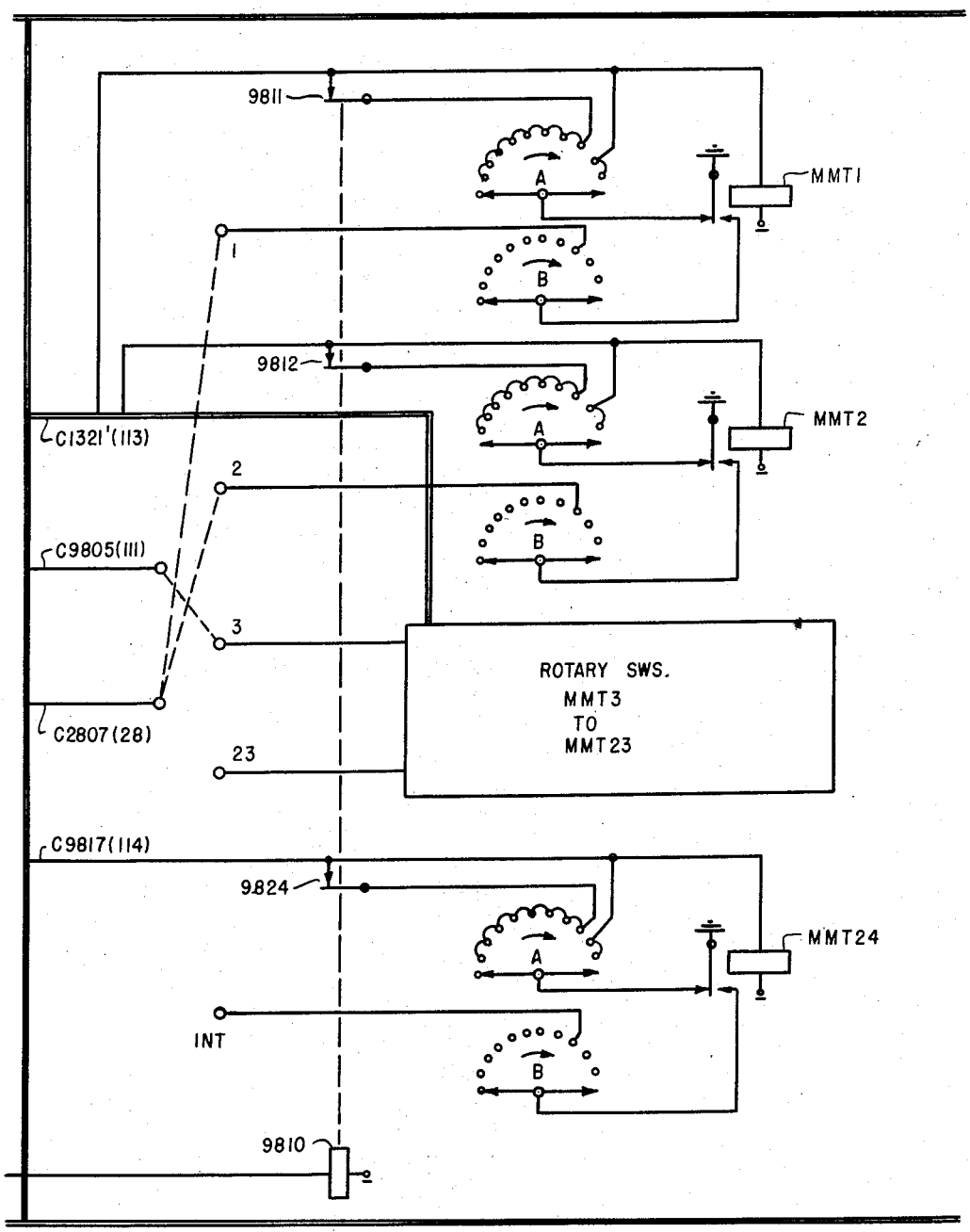
Figure 99:
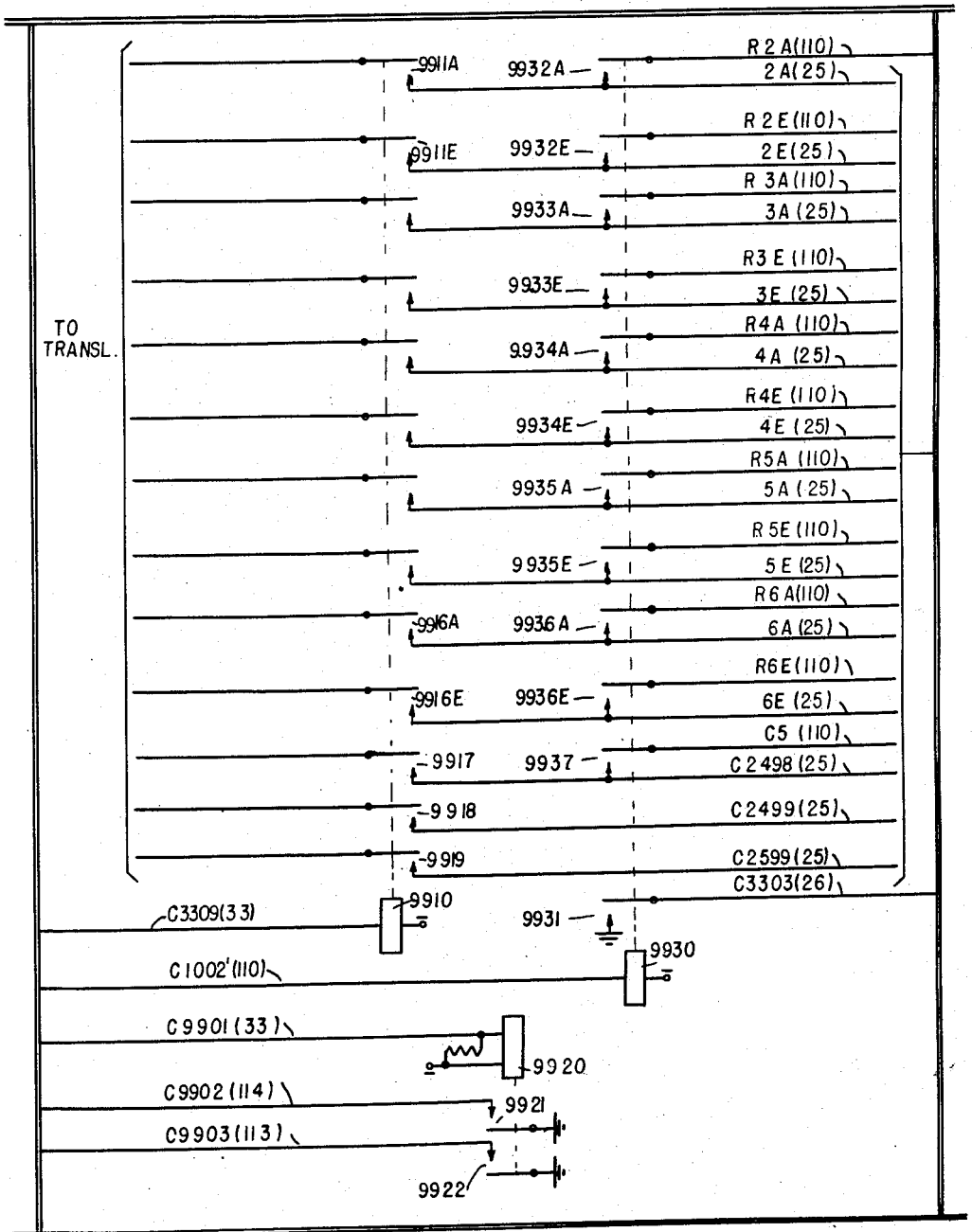
Figure 100:
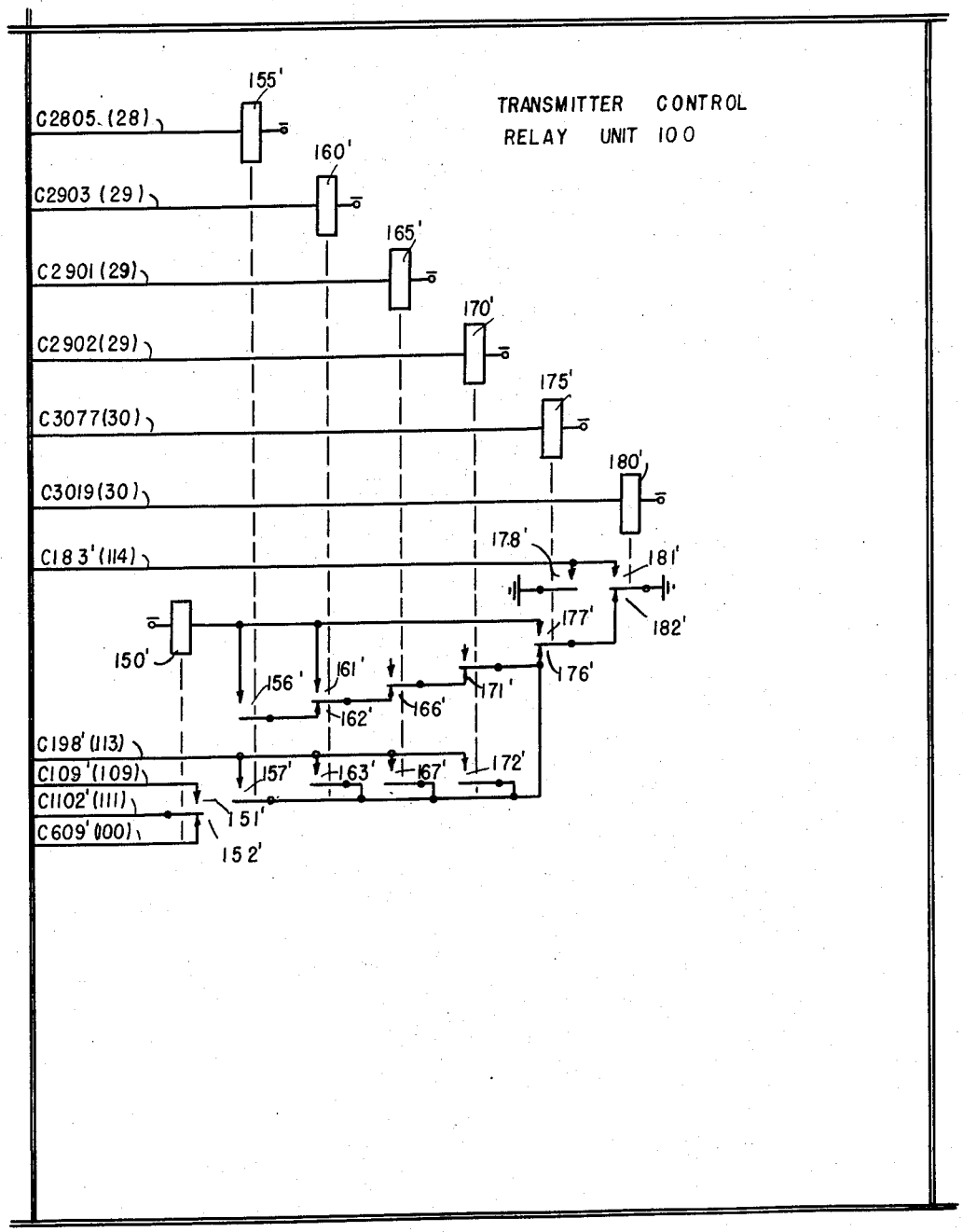

Also provided are manual position circuits such as 8200 shown in Figs. 82 and 83 for each message transmission speed; a manual forwarding unit 8400 shown in Figs. 84 and 85 associated with three position circuits of different message transmission speeds and a cross office intercept 6800 shown in Figs. 68 and 69. Each position circuit has a cross office unit containing a transmitter of a corresponding speed. The cross office unit is similar to cross office unit 5400 with certain minor exceptions, which will become apparent on reading the specification.

Figure 101:
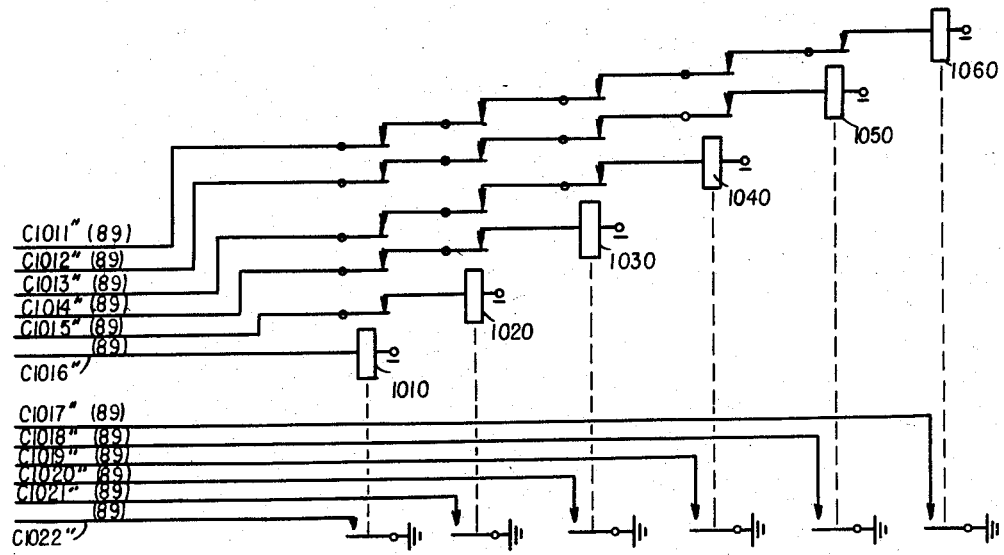
Figure 102:
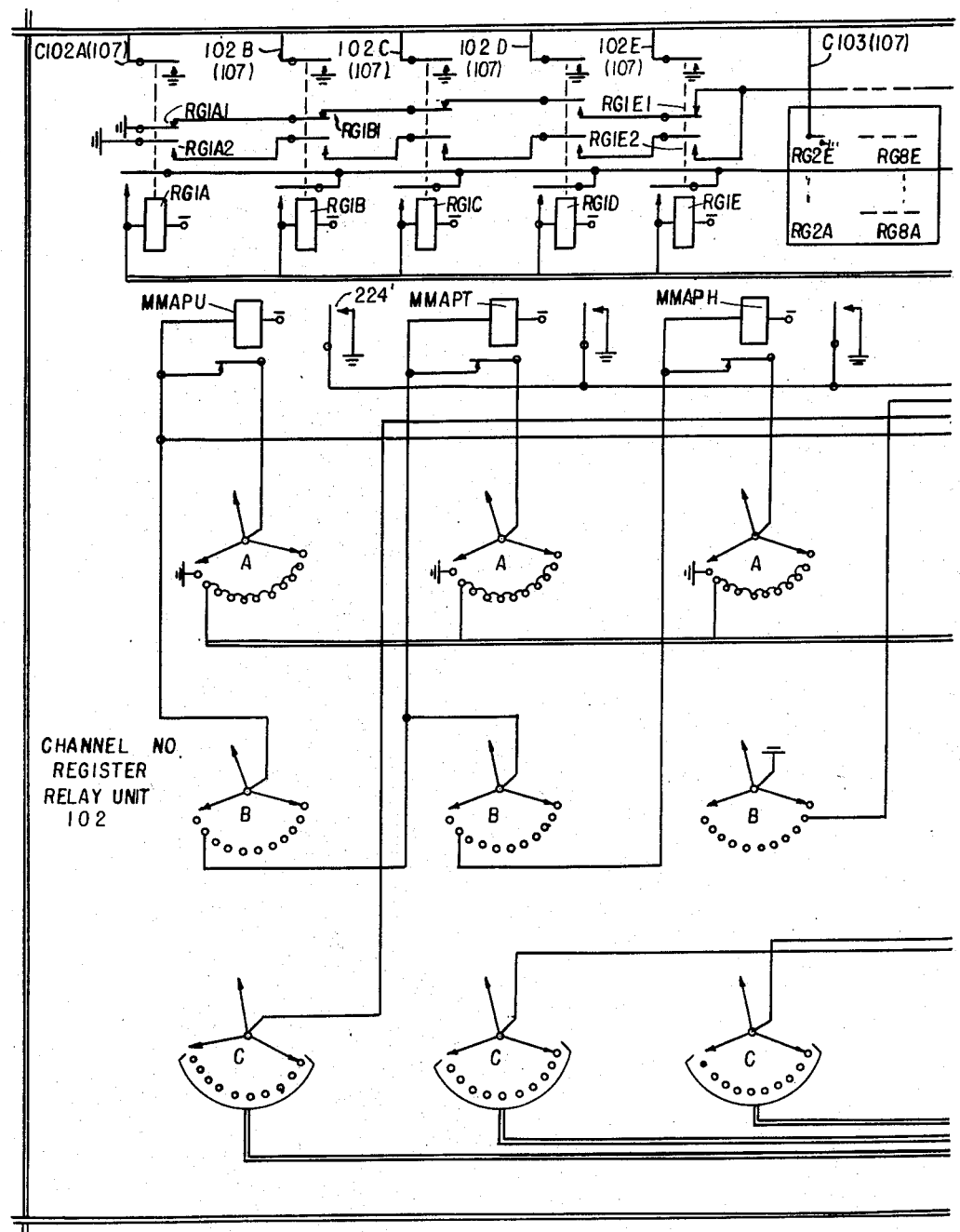
Figure 103:
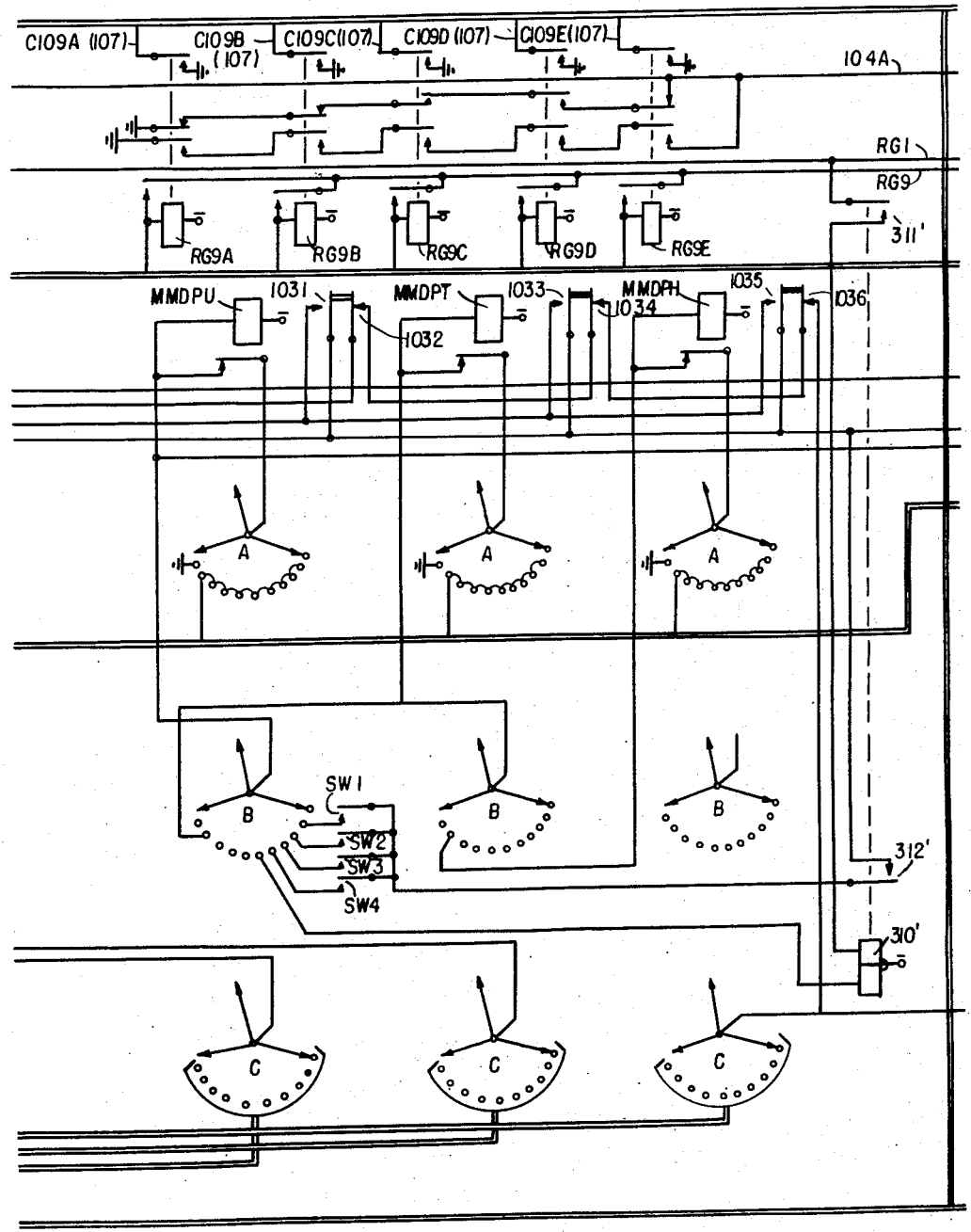
Figure 104:
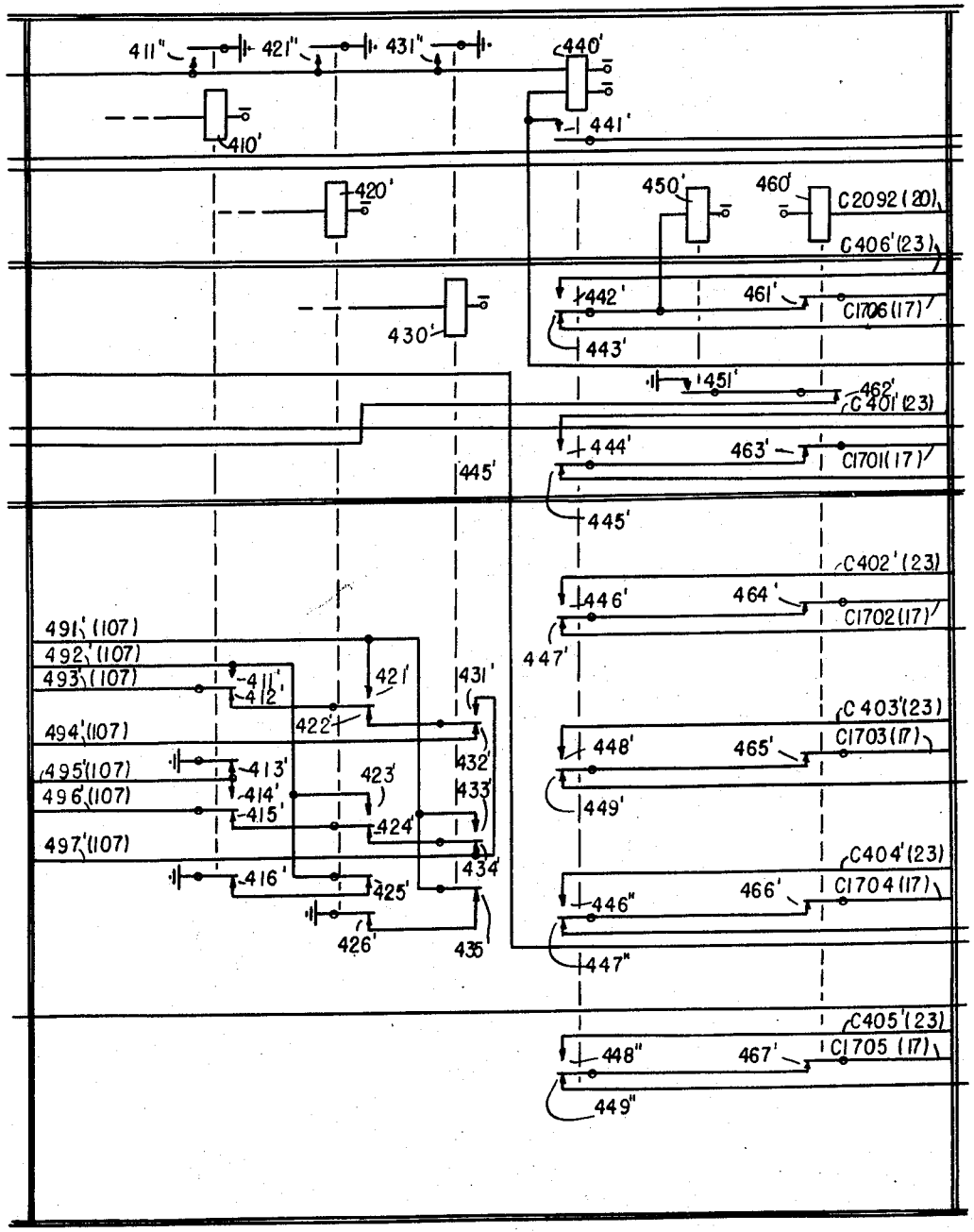
Figure 105:
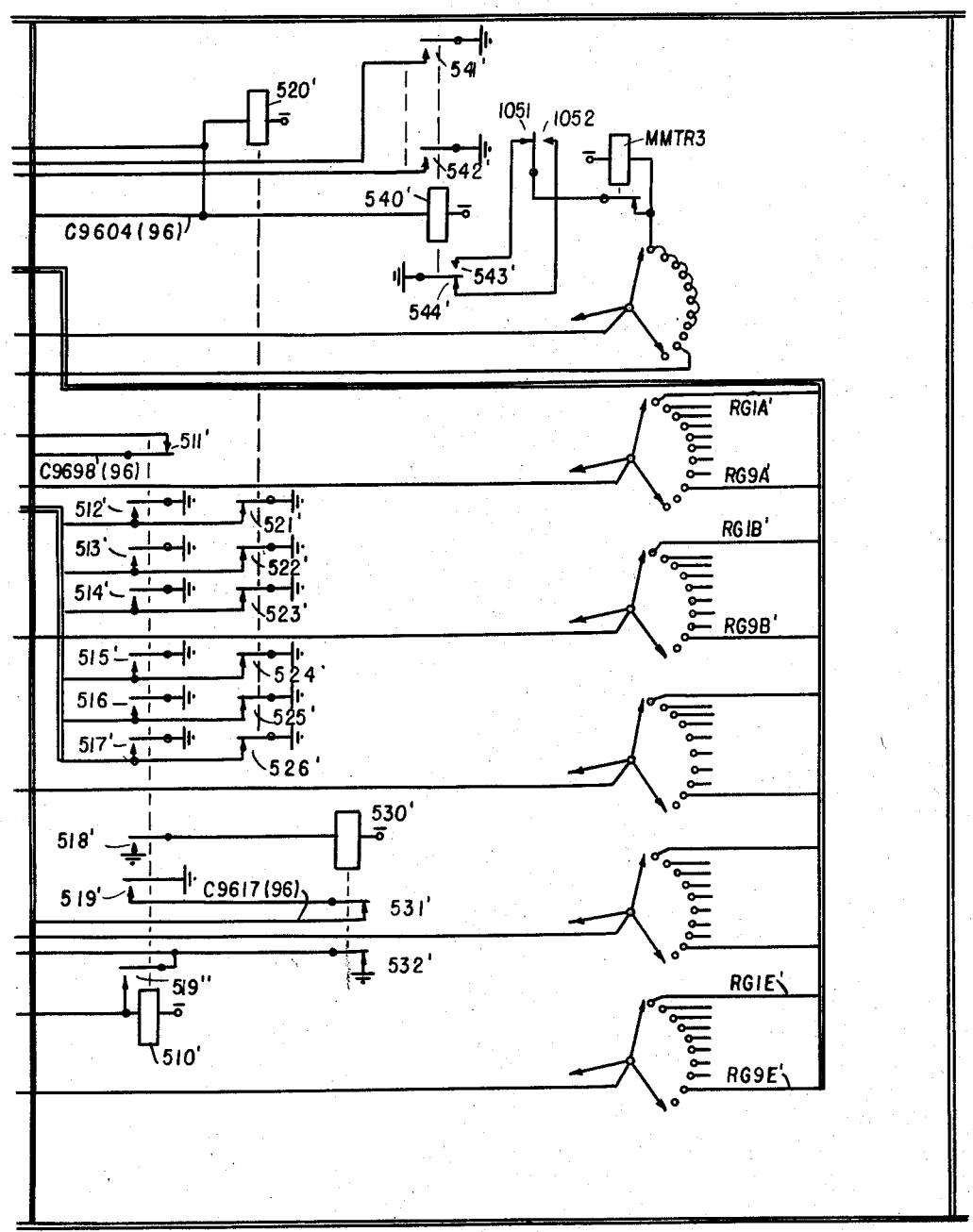
Figure 106:
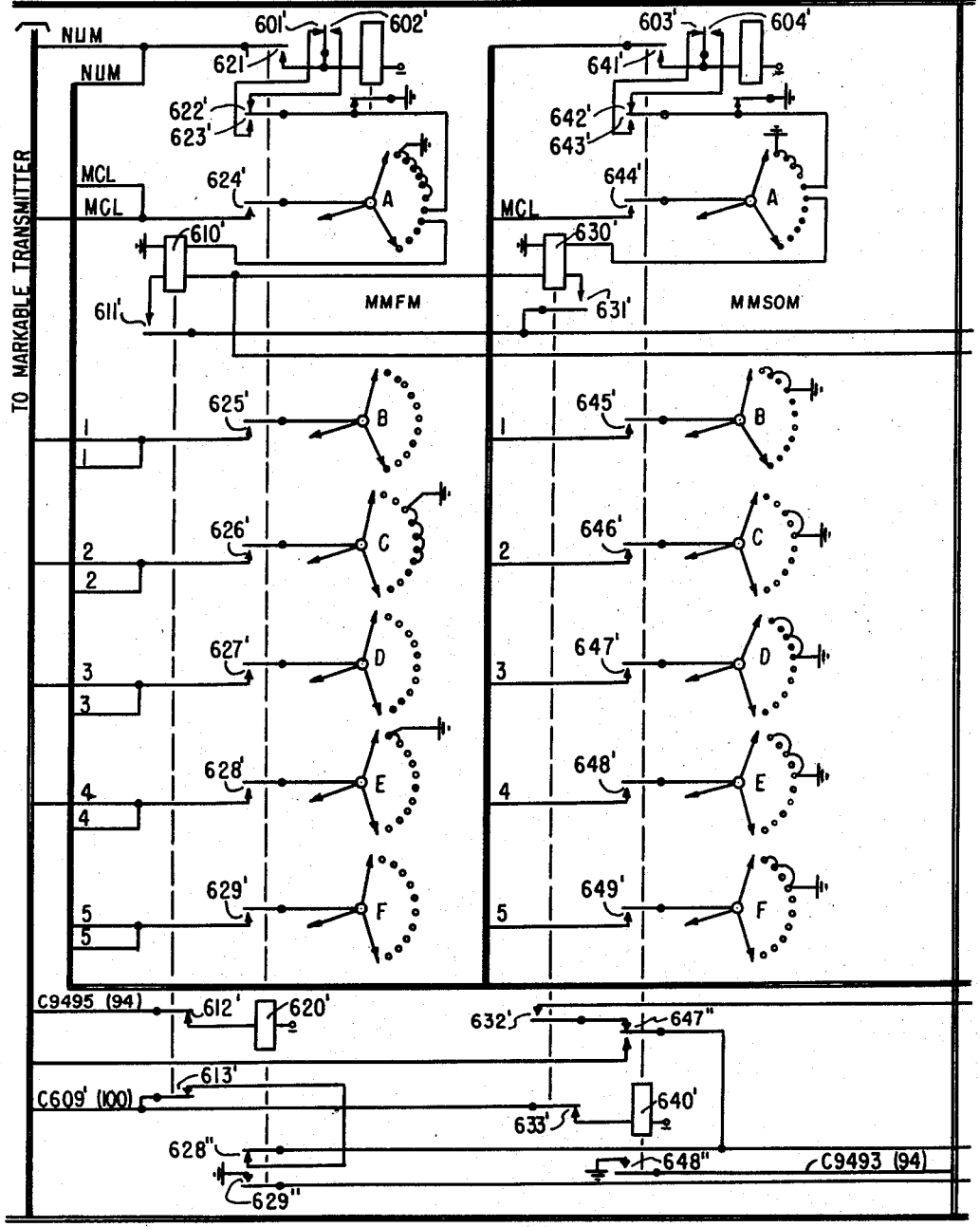
Figure 107:
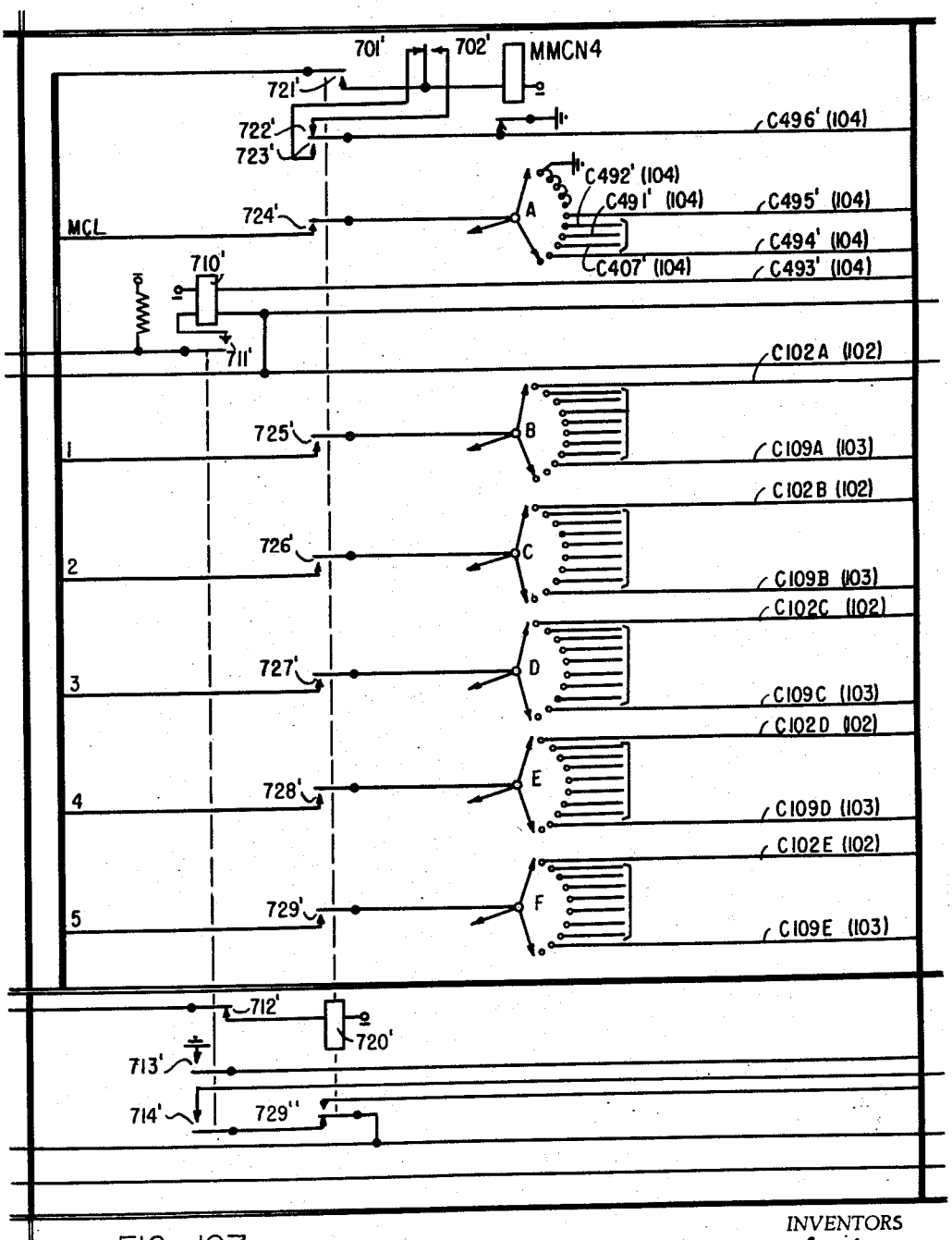
Figure 108:
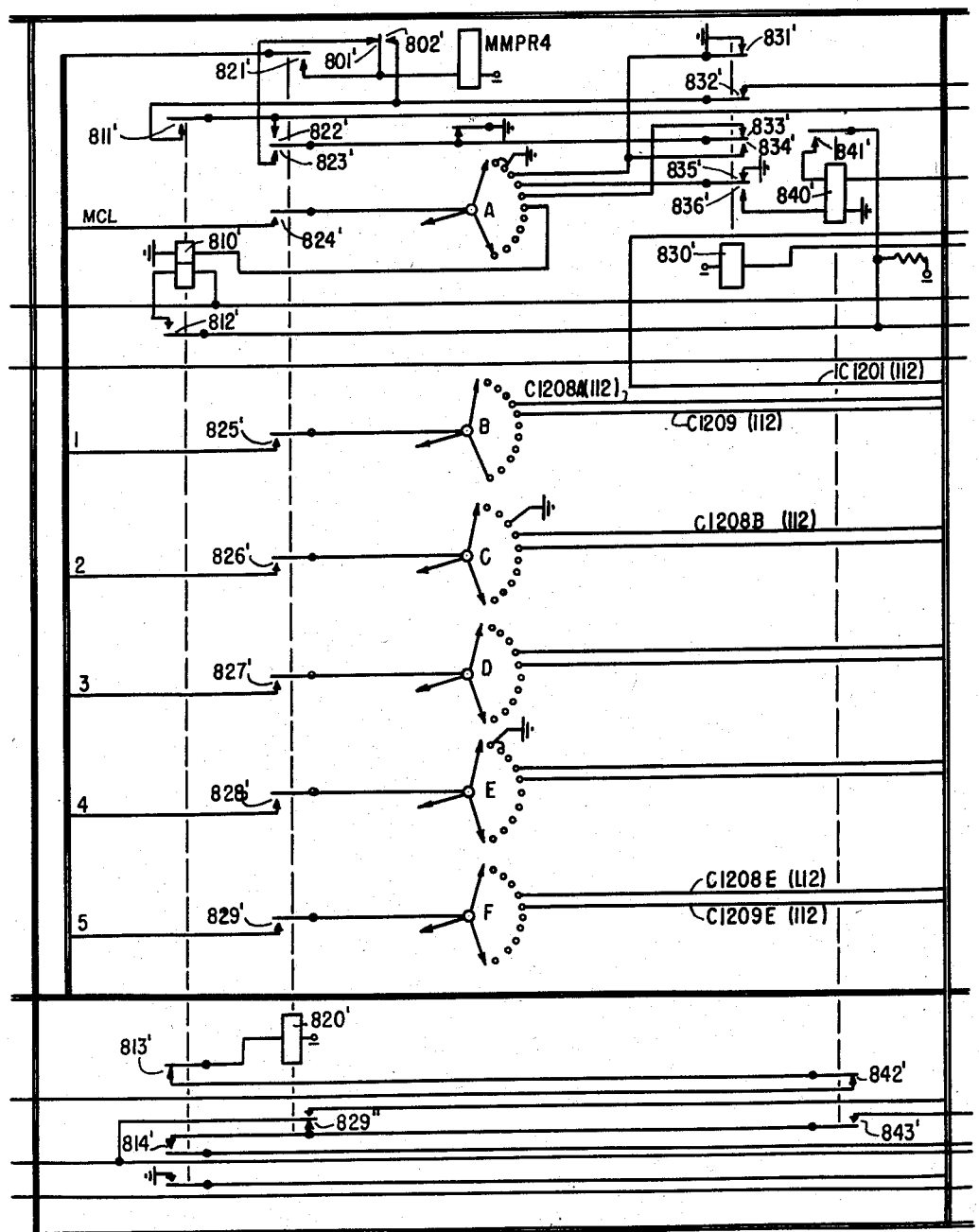
Figure 109:
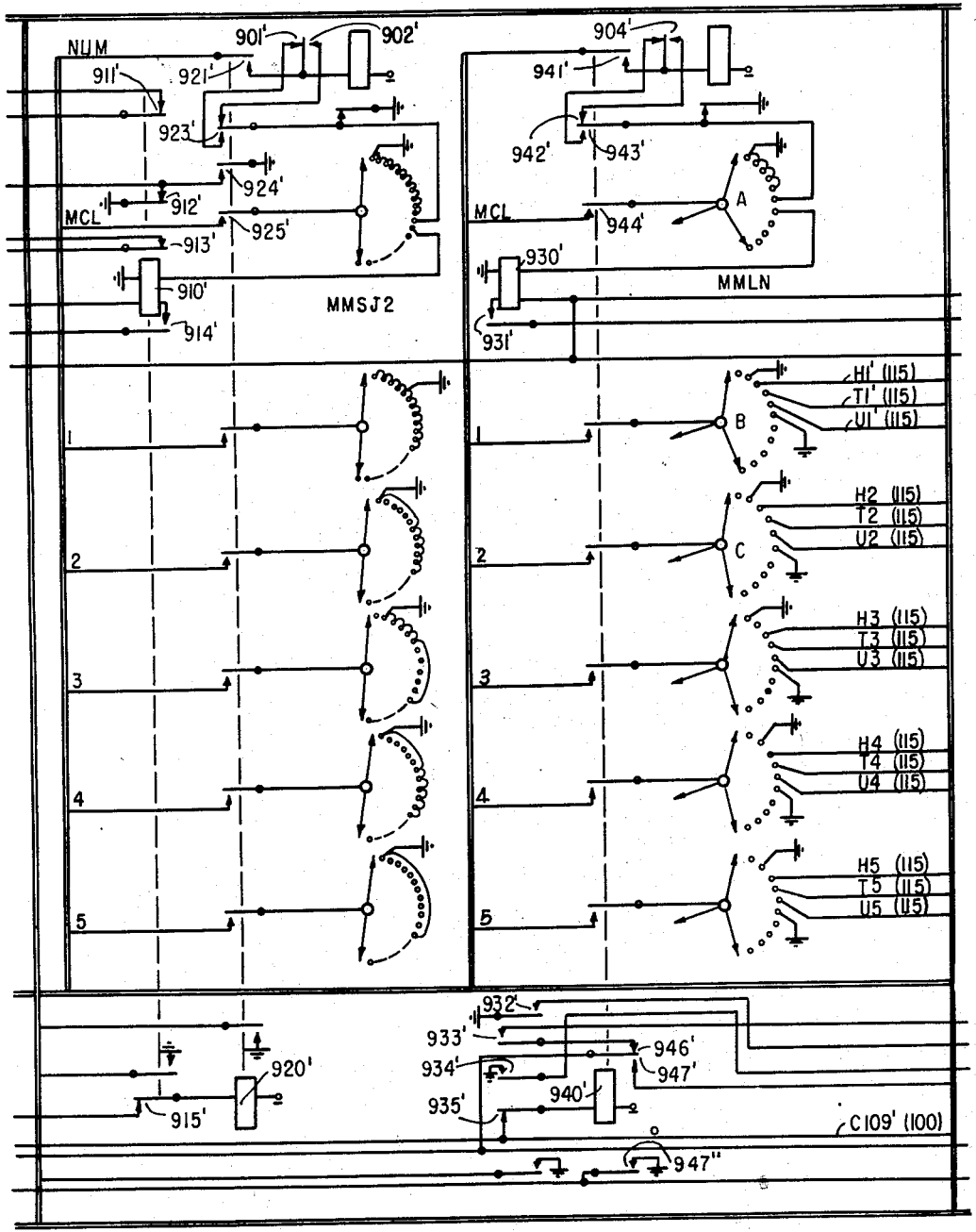
Figure 110:
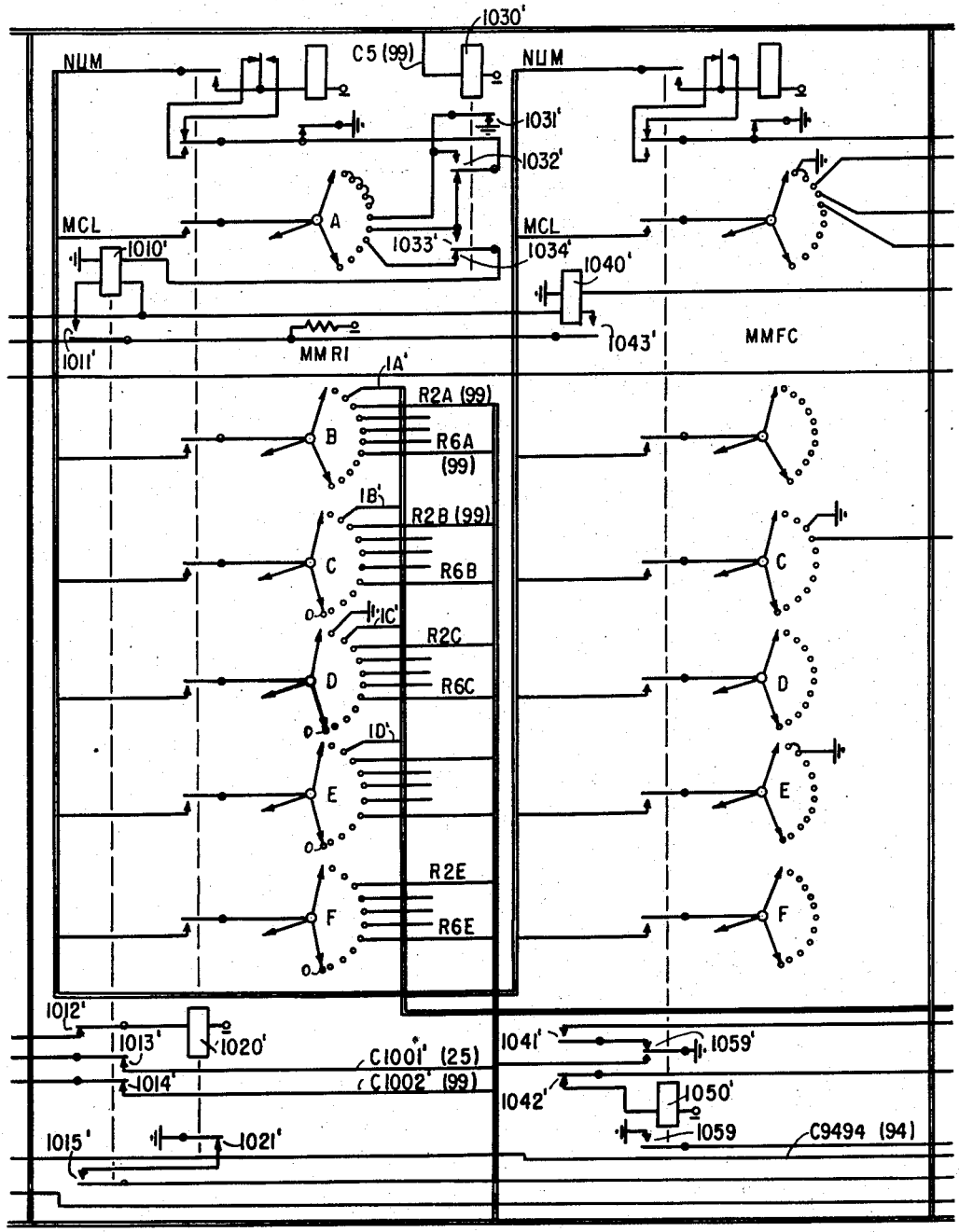
Figure 111:
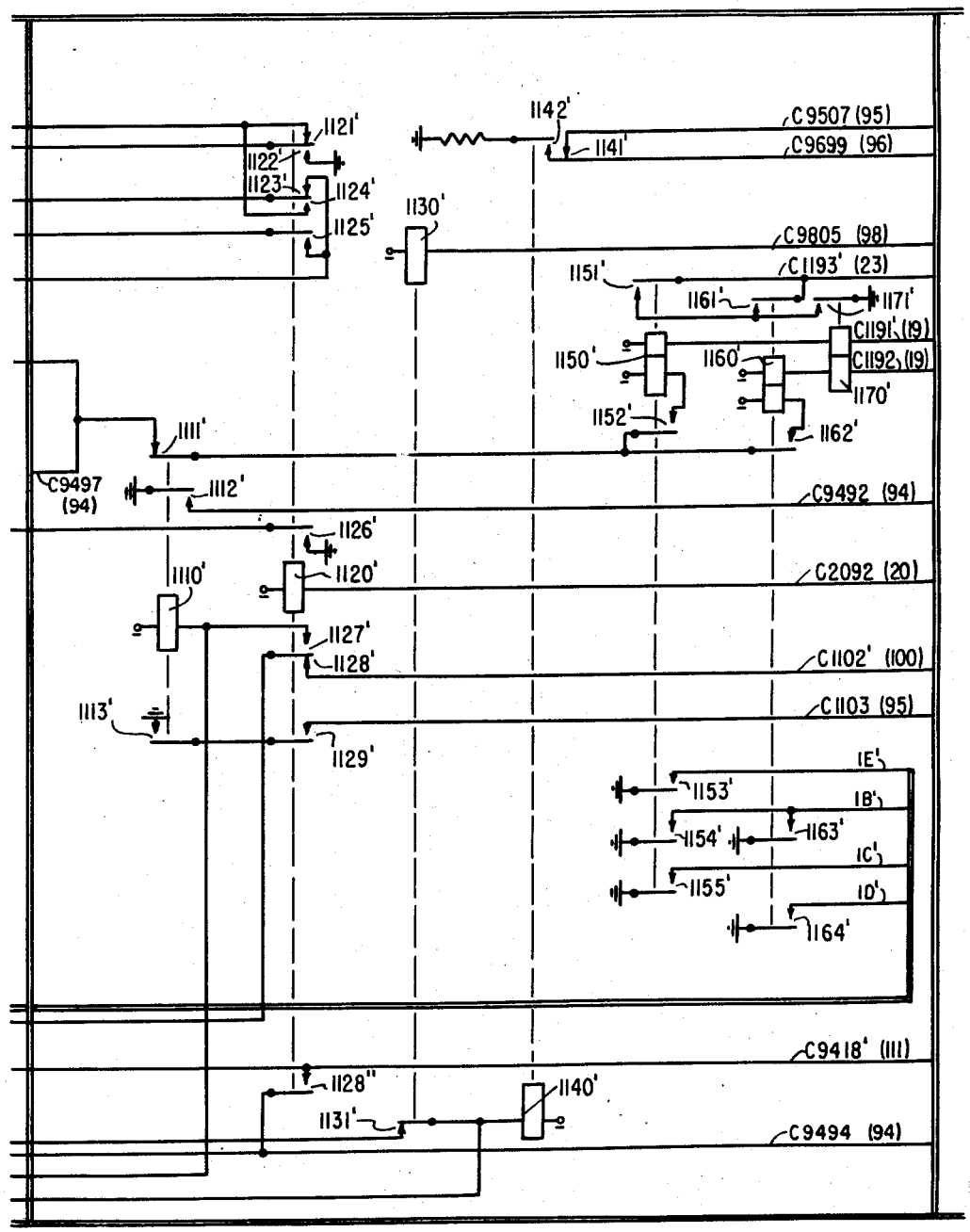
Figure 112:
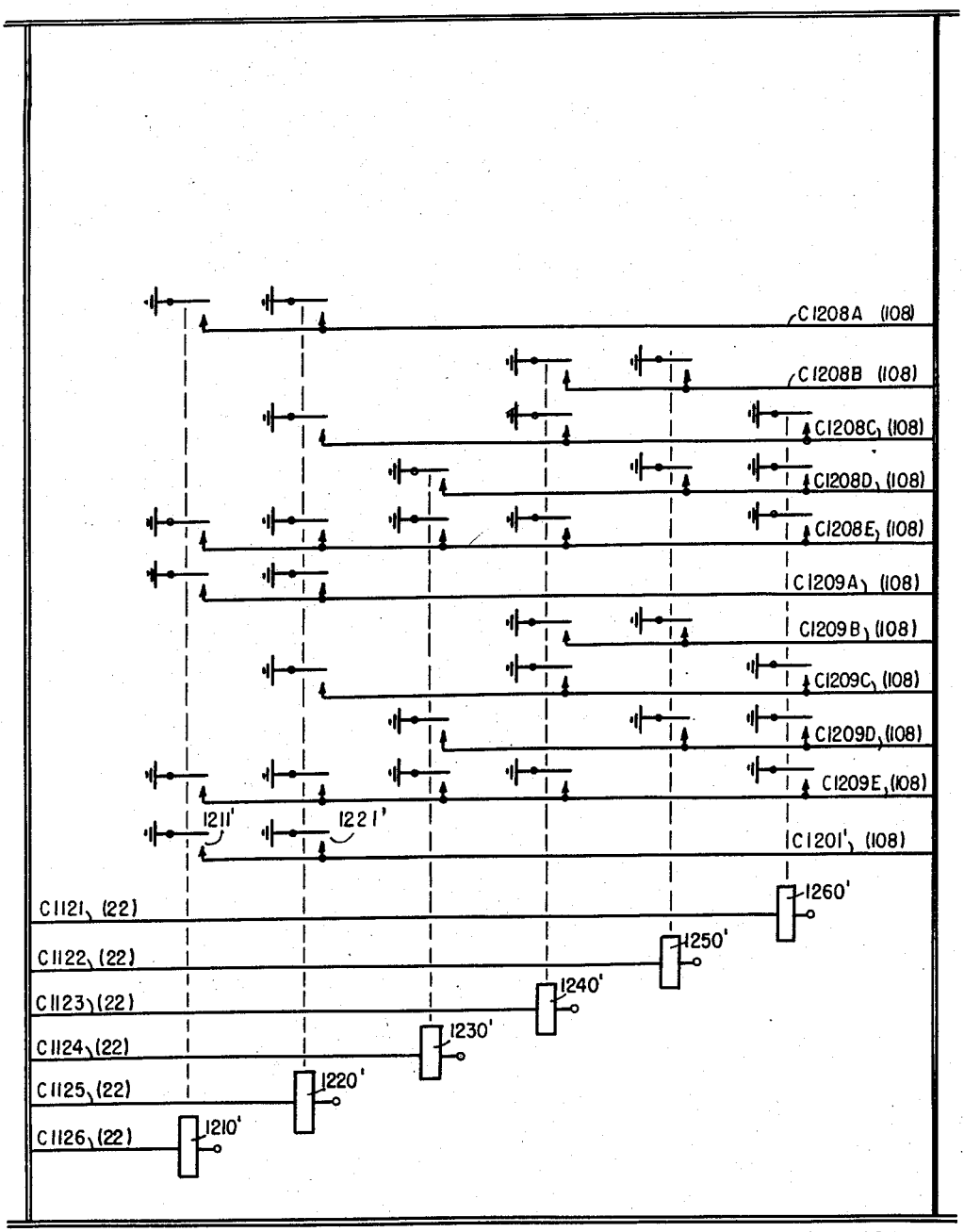
Figure 113:
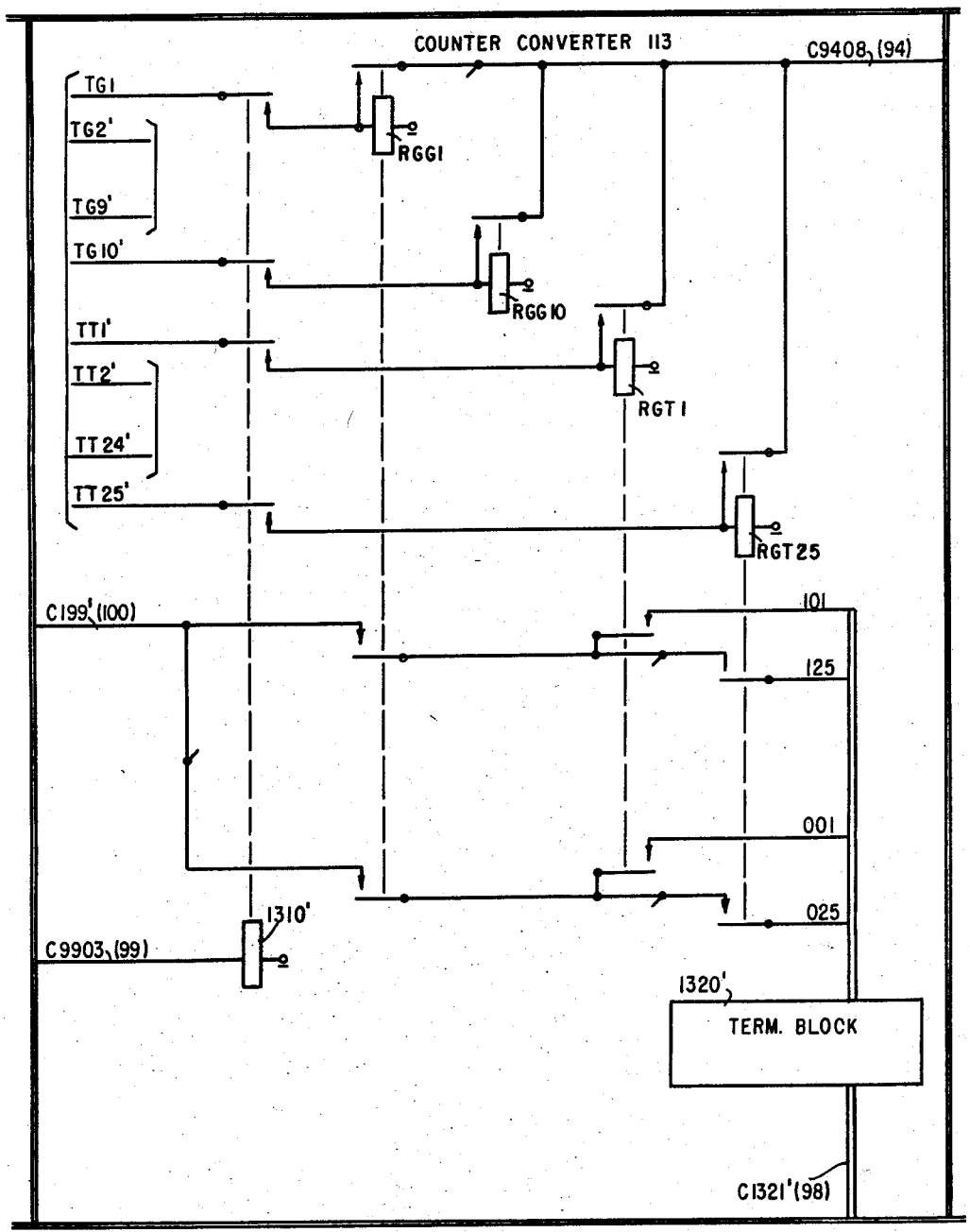
Figure 114:
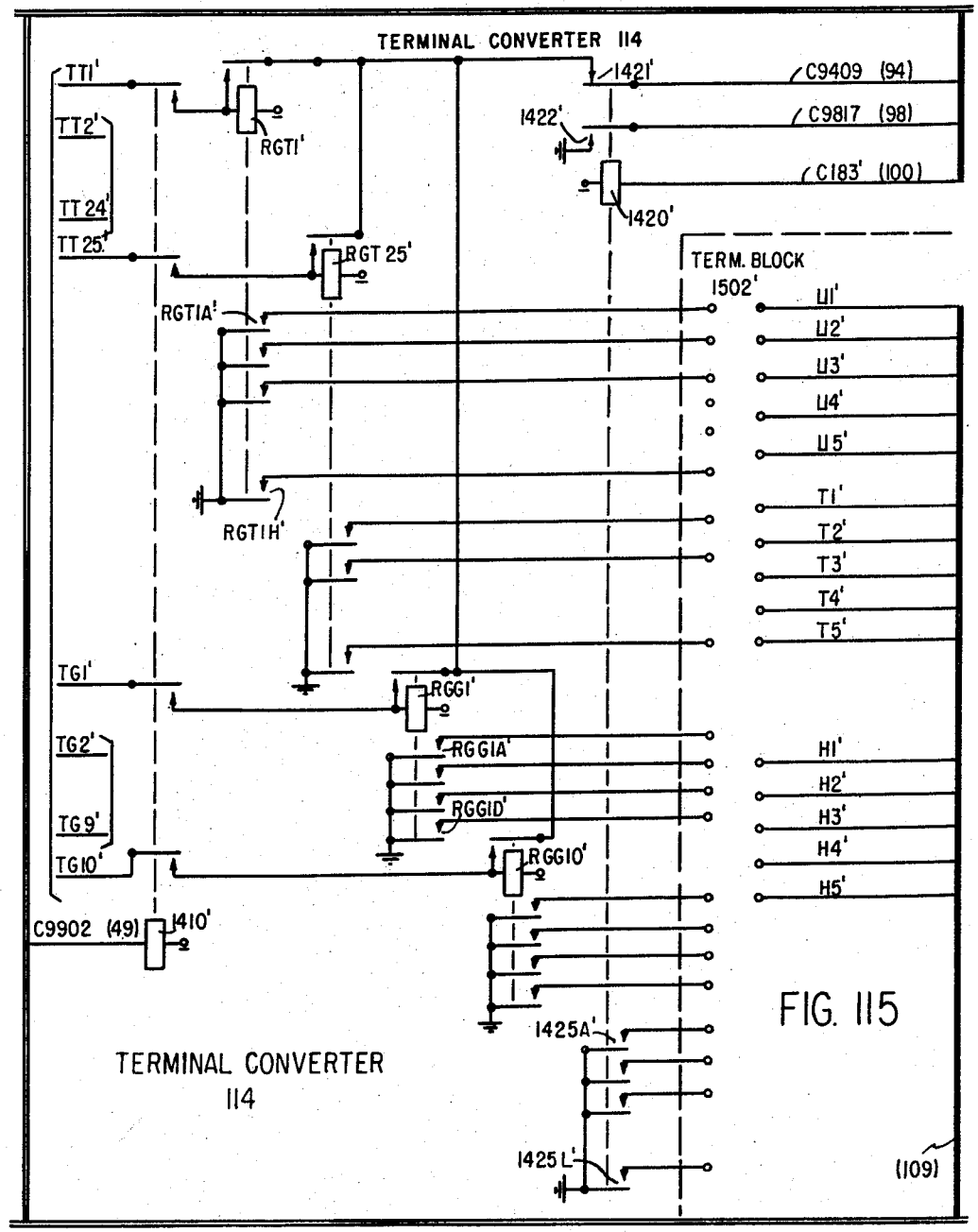

Figs. 86–93 show the details of a multiple call cross office units such as 8600 and 8600A, and Fig. 101 shows the precedence comparison circuit 1001 used to determine which multiple call cross office unit is first allowed to process a message.

Referring now to Fig. 1 of the drawings, it will be observed that the automatic switching system is designed to serve many stations which are classified by their geographical location into area 1, area 2 or area 3, etc. More specifically, the three areas illustrated in Fig. 1 are respectively provided with relay switching centers RUWP, USRN and UENF. Each relay switching center may be of the same or different networks such as Army, Navy, Weather Bureau or Air Force, respectively. Thus the switching center RUWP connects to relay switching centers RUNT and UENF in area 3, relay switching centers RURD and USRN in area 2 and to switching centers RUWN and USWM in area 1. A message from switching center RUNT destined for switching center RUWN is routed to center RUWP and from there over one of a number of channels or outgoing two conductor lines indicated by the reference character 10, and known as multi-channel circuit, to RUWN. If destined for center RURD the message is routed from center RUWP over one channel of a similar multi-channel circuit to switching center RURD. Likewise, the message may be routed to switching center USRN or USWM if directed thereto. If one of the channels extending thereto should be out-of-service, the switching center RUWP may route the message over a line such as 4 to center USWM and that station routes the message to center USRN. If line 4 should be out of service the message is routed over line 6 to USRN and from there to USWM. In the case of a message originating at one center such as RUNT and destined for several centers such as RURD, USRN and RUWN respectively, the equipment at RUWP automatically forms a separate message from the original for each route, and routes each message to the respective destinations. This is known as a multiple call message. In addition, RUWP may route a message to any one of its tributary stations RUWPE or RUWPEF, if a message is intended for those stations. If necessary the tributary stations RUWPE and RUWPEF are also provided with equipment such as at station RUWP so that they may serve as sub-switching centers. Likewise, switching center UENF may route incoming messages from RUWP to its tributary station UENFO. Although it should be understood that the functions of switching centers are different from those of stations, such differences are of little concern in the functioning of the invention described herein, and therefore the words switching center and station may often be used interchangeably herein.

As mentioned previously the first letter in the address code or routing indicator RUWP serves merely to indicate that it is a station or center code designation or routing indicator. The second letter which is the first letter of the identifying indicators designates the network. Thus it may be seen that switching centers RUWN, RUWP, RUNT and RURD belong to the same network. Switching centers UENF, USWM and USRM belong to other networks. The second and third letters of the identifying routing indicator serve to identify the geographical location of a relay center and these may each be one of twenty-six letters of the alphabet. Finally, in the case of tributary stations such as RUWPE, RUWPEF or UENFO, the additional letters E, EF and O respectively are added to the routing indicator of the associated switching center. It may thus be understood that a message from station USRN intended for the station UENFO is first routed to RUWP, which responds to the three identifying letters ENF of the routing indicator to forward the message to switching center UENF which in turn forwards the message to station UENFO.

Preferably, each relay switching center in a telegraph switching system comprises automatic switching apparatus substantially similar to the switching apparatus provided at station RUWP. This apparatus is schematically illustrated in Figure 2 and shown in detail in Figures 3–10 and 12–115. The apparatus serves the incoming lines terminating at the relay switching center RUWP to route telegraph messages received thereover to appropriate outgoing lines extending in the direction of a called relay switching center or tributary station. If necessary it routes the incoming message to an intercept position. The switching apparatus schematically illustrated in Figure 2 illustrates incoming line circuits 400 and 400A and outgoing channel units 7000 and 7000A, each connected over an individual two conductor line to a sending station and to a receiving station respectively. It will therefore be understood that a line circuit 400 and an outgoing channel unit 7000 is provided for each incoming line and each outgoing line respectively.

An incoming message received over line 4 includes a start of message indicator called SOM and containing the characters ZCZC; a channel designation and message number; a procedence designation; a routing indicator; the body of the message and an end of message indicator including the characters NNNN called an EOM. In addition such information as the originating station designation may be inserted between the routing indicator and the body of the message, but serves no purpose in processing the message at the station. As signals are received over line 4, a typing reperforator indicated by the magnet M is operated in accordance with the signals to perforate and feed out a tape 383 to a tape reader 300, which in turn transmits signals, corresponding to the perforations of the tape, to sensing relays in the line circuit 400. The sensing relays control a start of message detector in the line circuit. It reacts to the start of message indicator to permit a channel number check by the comparator 1000 and then a signal is extended to the register assigner 1200. The register assigner 1200 then selects one of the two associated registers such as register A or register B depending on which is idle.

Motors (not shown) are provided for driving the reperforators, readers and transmitters used in this system. The typing reperforator is of the type disclosed in application Serial No. 472,076, entitled Printer and Reperforator, filed January 21, 1955, by E. F. Kleinschmidt et al. It produces perforations in the tape 383 so that the symbols or characters corresponding to the perforator lateral five channel codes of the type illustrated in Figure 11 may be simultaneously typed or printed by a printer, in a manner not shown, behind each of the lateral code perforations therein made by the reperforator. Each typing reperforator is provided with a tape storage reel suporting a supply of unperforated tape which is fed out as the reperforator operates, for use by the printer and tape reader 300.

The tape reader includes a clutch magnet MM1 and cam control contacts 359, which are closed each time the tape reader pulls the tape 383 an additional step, equal to the longitudinal distance between the equally spaced small feed holes perforated in the central portion of the tape by the reperforator as shown in Figure 11. As the reader pulls the tape, it becomes slack between the reader 300 and the transmitter 390, and the transmitter can then operate. Cam controlled contacts 356–358 inclusive, are closed in a to be described predetermined code combination, as the tape reader pins, which close contacts 351–355 inclusive, in accordance with the tape perforations, sense or read the character code perforations appearing in each lateral row on the tape.

In the case of blank tape, contacts 351–357 remain open during each sensing cycle of the tape reader, but the contacts 359 are closed so that each cyclic step of the tape reader in advancing the tape may be counted and registered with the certain exceptions. The contacts 359 close a short time after the beginning of each sensing cycle and they open a short time before the end of each sensing cycle, while contacts 351–355 inclusive, are arranged to read the tape perforations for the full sensing cycle.

The incoming line circuit transmitter 390 includes a clutch magnet MM2 for pulling the tape between the reader and transmitter and cam controlled contacts which are substantially the same as those explained for tape reader 300. The transmitter is arranged so that it transmits code signals corresponding to the code perforations on the tape over a single signalling conductor to a cross office unit, multiple call unit or intercept unit reperforator instead of over the separate conductors as is shown in the circuits for the tape reader. At the beginning of a transmitter sensing cycle the contacts 374 open and thereafter the contacts 361 close and open. Contacts 362–366 are closed and opened in sequence thereafter during each sensing cycle to forward either resistance battery or resistance ground to conductor C394(7) in accordance with the code on the perforated tape, which controls which of each respective pair of associated contacts 336 or 331, 337 or 332, 338 or 333, 339 or 334 and 340 or 335 are closed. The transmitter numbering contacts 375 close after the start of a transmitter sensing cycle, and open simultaneously with the end of the sensing cycle, while contacts 376 close after contact 375, and open at the end of the transmitter and sensing cycle. The end of each particular transmitter sensing cycle occurs at the end of the period for operating contacts 366. In addition the transmitter is provided with presensing contacts whereby certain characters such as Z may be sensed one transmitter cyclic step before the character is actually sensed during closure of contacts 361—366.

The selected register finder relay unit 1600 under the control of supervisory unit 1300, searches for the demanding line circuit 400 among the twenty-five line circuits it has access to. On finding the same it connects the reader 300 to the procedure register 1900 and signals the reader to begin reading the tape. The precedence register 1900 registers the precedence designation and thereafter the reader is connected to the routing register 2300. It registers the routing indicator of the message. After registering the routing indicator, the reader is halted. The translator 3700, common to all the incoming line circuit registers at the station RUWP, is then associated with the selected register such as A for the purpose of performing a translation. The routing indicator registered in routing register 2300 controls the translator to select a terminal or outgoing channel unit such as 7000 over which the message may be extended to the receiving station. That terminal is then registered in a terminal register 3300. The sequence control unit 2700 is then operated to initiate a search for a preset cross office unit, empty cross office unit or an intercept position if no other routing indicators are present in the message. If other routing indicators are present each is registered and translated until one is found that does not compare with a terminal selected as a result of the first translation. The sequence control unit is then operated to search for a preset multiple call cross office unit, empty multiple call cross office unit or an intercept position.

The translator is arranged to perform several functions in addition to selecting the proper outgoing terminal. It makes a comparison between the outgoing terminal corresponding to the routing indicator and the incoming terminal over which the message was received to determine that they are not the same and if it is, it signals the register A that they are the same so that the message is routed to an intercept position. For certain out-of-service channels and for channels which are closed for the evening it causes the message to be routed to intercept and in the case of multi-channel circuits it provides an even distribution of messages over the various channels of the multi-channel circuit.

A sequence control unit 2700 calls for a common control register assigner 4500, which in turn finds the demanding register, and permits it to extend a test for a multiple call cross office unit such as 8600, a cross office unit such as 5400 or a cross office intercept such as 6800 depending on the results of the translation. If the message is any one of the three lowest precedences, it may be assigned to a preset cross office unit or a preset multiple call cross office unit respectively. This is a unit, which already has a message in storage of the same precedence, and in the case of a cross office unit such as 5400 has been set to the outgoing channel to which the message being processed is intended for. In the case of high precedence messages, the register A initiates a search for an empty cross office unit or empty multiple call cross office unit respectively so that these messages are sent with a minimum of delay. In the event of failure to find either a preset unit and an empty unit and under certain other conditions as mentioned above, the message is routed to an intercept.

In testing for a preset cross office unit a marking is extended from the register A to a terminal test access unit 4700 in the common control unit 200, which in turn extends the marking to the bank contacts corresponding to the desired outgoing channel on each outgoing selector switch such as 4800 having access to the outgoing channel such as 7000. This marking is returned through each cross office unit having an outgoing selector switch 4800 associated with the selected channel bank contact. If the cross office unit precedence switch is set to the same precedence as the message now sought to be forwarded, a relay in the unit is operated under control of a marking forwarded from the common control cross office test unit 4900 to return the first marking to operate a register relay in the cross office finder 3100. It will be understood that the cross office finder has twenty-five register relays, and that therefore as many cross office finders are provided as are necessary to accommodate all the apparatus to which register A has access to. The register A then selects one of the cross-office units, which has operated its register relay in the finder unit and extends a marking thereto for the purpose of seizing the cross office unit. The register A then selects one of the incoming selector switches such as 5200 associated with the cross office unit and sets that incoming selector switch to the incoming line circuit 400. In the case of a preset multiple call cross office unit a test is simply made by the cross office test unit 4900 to determine if the precedence switch in the unit is set to the same precedence as the message, and if so a register relay in the cross office finder is operated. The multiple call unit is seized and an incoming selector switch such as 5200 thereat is set to line circuit 400. At this point it will be noted that although the trunking diagram indicates all incoming selector switches by the reference character 5200 and all outgoing selector switches by the reference character 4800 that these are each separate switches, and that as many are provided for each associated unit as necessary to give access to required apparatus.

When testing for an empty cross office unit, markings are extended from the cross office test unit 4900 under control of the register to all the cross office units, and each that is available, returns a signal for operating its corresponding register relay in the cross office finder unit 3100. The register then selects an operated one of these relays and extends a marking to its associated cross office unit. Thereafter it selects an incoming selector switch having access to the incoming line circuit and an outgoing selector switch such as 4800 having access to the outgoing line and sets each switch to the required position. It also sets a precedence switch in the cross office unit in accordance with the message precedence registered in precedence register 1900. In the case of an empty multiple call cross office unit a test is also conducted under control of the cross office test unit 4900, and an incoming selector switch and precedence switch at a seized empty unit are set accordingly.

In the event that the register A is not successful in finding a preset unit or an empty unit it searches for a cross office intercept position 6800 by extending markings to each cross office intercept under control of the cross office test unit 4900, and those that are available return a marking to operate a register relay in the cross office finder 3100. The register A then selects one of the cross office intercept positions and sets an incoming selector switch associated therewith to the incoming line. In the event the register A is not successful in finding a cross office intercept it locks out the incoming line circuit 400 and releases itself.

The selected unit or cross office intercept having its incoming selector switch set to the incoming line circuit extends a marking thereto for the purpose of initiating cross office transmission from the incoming line circuit transmitter 390. The line circuit signals the register A, and the register then releases. The line circuit transmitter 390 is started and it transmits the message to the reperforator at the unit or position. It will be noted at this time that an arrangement is provided whereby excess channel designations and message numbers are not transmitted. The line circuit sensing relays are effective, when the end of message indicator or EOM is read by the reader, to control an end of message detector in the line circuit, which permits the line circuit and receiving unit to be disassociated. In this connection it will be noted that the line circuit sensing relays are operated only during periods, when predetermined portions of the message are read.

The units are equipped with individually associated reperforators, tape readers and transmitters and motors for driving the same. In the case of the cross office units, the reader and transmitter are made to operate as one unit, and as these are of a set speed not suitable to the arrangement used on certain channels, the units are permitted to be associated only with those channels for which its equipment corresponds. The multiple call cross office units are equipped with reperforators, tape readers and transmitters of a type similar to that used at the incoming line circuit. The intercept position 6300 has a reperforator and motor for driving the same, but does not have a reader or transmitter, however the cross office unit used with the position is equipped with a reader and transmitter. In addition the units are equipped with sensing relays, which operate only when predetermined portions of the message are being read and with respective start of message detectors and end of message detectors.

A cross office unit, after reading the SOM of the message, attempts to seize an outgoing channel unit 7000. The outgoing channel unit signals an outgoing finder link 6400 in the common control 220. Each outgoing finder link 6400 has access to twenty-five outgoing channel units such as 7000 and 7000A. On being signalled it searches for, and finds the signalling outgoing channel unit. A number of cross office assigner switches such as 6700 associated with the outgoing finder link and each having access to twenty-five cross units such as 5400, then operates to find each cross office unit seeking to seize the outgoing channel unit 7000. On finding the same a precedence comparison test is performed by the outgoing finder link 6400 to determine, which cross office unit has the highest precedence message. It permits only that unit to seize the outgoing channel 7000.

When the outgoing channel unit 7000 is seized, it starts a markable transmitter associated therewith to send a start of message indicator to the receiving station. Simultaneously the cross office unit calls for a cross office selector 7500 having access to twenty-five cross office units and when that selector finds the cross office unit it associates a markable transmitter therewith for the purpose of transmitting a cross office identifying number to a monitor reperforator associated with the outgoing channel unit 7000. The markable transmitters are similar to the other transmitters except that they transmit markings furnished thereto over electrical circuits instead of those resulting from the sensing of tape perforations. The identifying number is sent to the reperforator, while an SOM is transmitted under control of the outgoing channel unit to the reperforator at the receiving station. An outgoing channel message number switch 8100 associated with unit 7000 assigns a message number to the message and this number is transmitted to the receiving station and to the monitor reperforator, after the SOM. The unit 7000 then signals the cross office unit that the body of the message may be transmitted. The cross office unit transmits the body of the message to the monitor reperforator and the outgoing channel through the outgoing channel unit 7000. When the cross office unit reader senses an end of message indicator, the cross office unit 5400 signals the outgoing channel unit 7000 accordingly. The outgoing channel unit 7000 then transmits an end of message indicator to the receiving station.

In the event the cross office unit 5400 has been unsuccessful in seizing an outgoing channel unit, due to the fact that it is busy transmitting another message, the cross office unit 5400 demands a cancel transmission cross office selector switch 7600. It has access to twenty-five cross office units. The cancel transmission selector switch on finding the cross office unit extends a signal to the cancel transmission unit 7700, which then finds the cross office selector switch. The cancel transmission unit 7700 then permits a precedence comparison test between the message being transmitted and the message in the cross office unit 5400. If the message in the cross office unit 5400 is of higher precedence than the message being transmitted, the cancel transmission unit causes the cross office unit having the lower precedence message to be disassociated from the outgoing channel unit and permits the cross office unit 5400 to seize the outgoing channel unit. The cancel transmission equipment sends a cancel transmission signal to the outgoing channel unit and to the receiving station, and then causes the outgoing channel unit to transmit an end of message indicator, after which the cross office unit having the high precedence message may transmit.

When a message is received at cross office intercept 6800 and stored on a tape thereat or when the automatic equipment has failed to properly process a message, the operator must initiate a transmission sequence. She selects a manual forwarding position circuit 8200 which has a cross office unit associated therewith and sets terminal and precedence switches thereat. She then operates a start key which causes a manual forwarding unit 8400 to select the position circuit and control the precedence and outgoing selector switches respectively of the cross office unit in accordance with the terminal and precedence settings at the manual position circuit respectively. The cross office unit associated with the manual position circuit 8200 can react to the message for transmitting it through an outgoing channel unit to the receiving station without using the original tape perforations of the start of message indicator.

A multiple call unit receives a message from the incoming line circuit in a manner similar to that of a cross office unit. The reperforator at the multiple call unit is operated and it perforates the tape, which is then read by a reader. When the SOM is read the multiple call cross office unit demands a register such as C having access to twenty-five multiple call cross office units. A precedence comparison test using precedence comparison circuit 101 is performed to determine which multiple call unit has the message of the highest precedence, and that multiple call unit is permitted to seize a register first. Registers C and D have access to multiple call cross office unit 8600 and one of them is selected by a register assigner such as 1200A corresponding to 1200. As previously mentioned these registers contain similar apparatus to those contained in registers A and B and in addition contain multiple call processing equipment comprising a miscellaneous relay unit 9400, a channel number register relay unit 102, a transmitter control relay unit 106, a counter converter 113, a terminal converter 114 and a markable transmitter.

When the register C for example finds the multiple call cross office unit 8600, the multiple call reader is connected to the channel number register relay unit 102. This unit registers the message number comprising the channel designation and message number and certain machine functions. Thereafter the precedence designation is registered in the precedence register 1900 and the first routing indicator is registered in routing register 2300. The translator associated with the multiple call registers C and D corresponding to translator 3700 is then associated with the routing register and a terminal corresponding to the outgoing channel is registered in the terminal register 3300, counter converter 113 and in the terminal converter 114.

The sequence control unit 2700 is then operated to select a cross office unit or intercept position as the situation demands. The counter converter 113 is used to control a switch individual to the destination whereby the number of routing indicators contained in one message to that destination are counted. The terminal converter 114 is used to mark a switch in the transmitter control relay unit 106 in accordance with the routing indicator. When the unit is selected, an incoming selector switch such as 5200 is associated with the multiple call cross office unit 8600 in a manner similar to that for associating the switch with an incoming line circuit. The precedence switch and outgoing selector switch at the cross office unit are set in the event an empty cross office unit was selected. When the unit is associated with the multiple call unit, the transmitter control relay unit 112 controls the multiple call processing markable transmitter to transmit an SOM to the cross office reperforator and then the transmitter is controlled in accordance with the registered channel designation, message number and machine functions to transmit the corresponding characters to the unit reperforator. The markable transmitter is associated successively with switches in the transmitter control relay unit to transmit the characters registered in the channel number register relay unit. In addition the registration made in the precedence register 1900 is also extended to the transmitter control relay unit for transmission to the cross office unit reperforator as is the terminal or routing indicator registration in the terminal converter 114.

When the above information has been transmitted to the unit reperforator, the register C is partially released by the multiple call processing equipment to permit a new routing indicator to be registered and translated. The multiple call cross office reader is again effective to transmit the characters corresponding to the next routing indicator for registration in the routing register 2300. The sequence control unit on operating this time performs a pretest for either a cross office unit or intercept position depending on the results of the first translation to extend a marking back through the multiple call cross office unit to determine whether any unit connected to the multiple call cross office unit may also handle the following routing indicator. In the event the pretest is unsuccessful a test is performed for a preset and an empty cross office unit respectively, as the situation demands or for an intercept position. In the event a pretest is successful only the new routing indicator is transmitted under control of the transmitter control relay unit to the cross office unit or intercept position, while if a new cross office unit is selected as a result of the translation an SOM, channel designation, channel number, precedence designation, and the routing indicator characters must be transmitted to the newly selected cross office unit or intercept position. Succeeding routing indicators are processed, and the apparatus controlled in one of the above manners for each of the indicators.

The counter converter 113 in the meantime is effective to advance switches corresponding to certain destinations for each routing indicator translation. If a certain destination is limited to receiving messages having no more than a predetermined number of routing indicators, the switch corresponding to that destination is effective to prevent further routing indicators from being transmitted to the cross office unit handling the message intended for that destination, and a new cross office unit must be selected for message transmission to that destination on succeeding routing indicators.

After a predetermined number of routing indicators are processed, a test is made for a multiple call cross office unit. A multiple call cross office unit is tested for in a manner similar to that described, and if the test is a failure, an intercept position is selected. The selected multiple call unit may be the same unit now processing the message, assuming that the message is completely received at its reperforator. Each newly selected multiple call unit receives an SOM, channel number, precedence designation and routing indicator. On processing succeeding routing indicators pretests are made for cross office units, multiple call cross office units or intercept positions respectively and the apparatus is controlled accordingly.

After all routing indicators are processed, the multiple call cross office unit transmitter, is allowed to operate without transmitting to the associated units. A character count is performed to allow the characters, which already have been registered and transmitted to the various units from the multiple call processing equipment to pass the transmitter without being transmitted to the connected units. Then the cross office units reperforators are connected to the transmitter of the multiple call cross office unit and the body of the message is transmitted thereto. At this time the register C together with the multiple call processing equipment are completely released from the transmitting multiple call unit. The body of the message and an EOM indication is transmitted to the connected units and positions, and they proceed to handle the message either as described for a cross office unit, intercept position or as described for a multiple call cross office unit respectively.

The foregoing brief outline of various functions of the equipment incorporated in the present invention has been inserted for the purpose of enabling the reader to gain some familiarity with the invention, before reading the following detailed description of the invention.

*Receipt of telegraph message*

Referring to the Line Circuit 400, it will be seen that the —L conductor portion of incoming line 4 from switching center USWM extends through Fig. 3 to Fig. 9, and is passed through contacts 887 and 952 in shunt to lead C301(3) so that the line 4 is bridged by right winding of the perforator magnet M in the relay switching center RUWP. When a message is received over the incoming line, perforator magnet M is normally controlled by the potentials placed on line 4 from the transmitting equipment provided at the switching center USWM to perforate the tape in code form in accordance with the various items of information in an incoming message. The tape is normally held taut between the reperforator storage reel and the take up reel but as the tape is perforated it becomes slack between the typing reperforator and the tape reader. In order to detect the slack condition of the tape between the units, a tight tape switch is provided having a testing element, which is tensioned to rotate, and close the contacts 342 as soon as the slack tape condition between the perforator and the reader is encountered. Since the tape reader may not be immediately controlled by a character perforation in the tape, a tape storage bin is provided to store the accumulated tape between the typing reperforator and the tape reader 300. It should be noted at this time that the tape storage bin also provides the storage space for slack tape which may be accumulated between the tape reader and the incoming line transmitter.

For the purpose of description it will be assumed that all messages received over the incoming line include the following items of information in the order shown:

(1) A start of message indicator.
(2) A channel number indicator which may also include a line or trunk identification code.
(3) A precedence designation.
(4) A routing indicator.
(5) The body of the message.
(6) An end of message indicator.

Each of the above-mentioned items will now be explained in more detail.

Item 1 is the start of message indicator which is generally referred to hereinafter as the SOM. In all cases the SOM received at this station comprises the 4 characters ZCZC, and unless these characters precede each received message, an alarm signal is transmitted to indicate that an improper SOM has been detected by the incoming line equipment.

Item 2 which is the channel number indicator comprises a figure shift character followed by three digits. The first message of each 24 hour day transmitted over the illustrated incoming line 4 to the switching center RUWP is given the channel number 001, and each succeeding incoming message is automatically given a succeeding number. It may be well to mention that an incoming channel or line designation of two of three letters precedes the channel number to identify the incoming line over which the message is received, but this designation is disregarded in processing a message. In the present arrangement as illustrated 999 messages may be transmitted in a 24 hour period, over the illustrated incoming line. It should be understood that if more than 999 messages are required to handle the traffic a four digit channel number indicator may be provided. At the beginning of each day the attendant in the switching center controls the channel number indicator apparatus thereat to be restored to normal so that the first message transmitted each day will be given the channel number indicator 001. By this arrangement an automatic check is made to determine whether the number of messages received compares identically with the number stored in the channel number comparator 1000 illustrated in Fig. 10. If a message is lost, the number received and number registered in the channel number comparator do not check resulting in an alarm to signal the attendant.

Item 3 is the precedence designation of the message and indicates its importance. In the present arrangement 6 degrees of precedence are provided, indicated by tape perforation conforming to the following:

A. Flash precedence, which is the highest order is indicated by the letters ZZ.

B. Emergency precedence which is the second highest is indicated by the letters YY.

C. Operational immediate precedence which is the third highest order is indicated by the characters OO.

D. Priority precedence which is the fourth highest order is indicated by the characters PP.

E. Routine precedence which is the fifth highest order is indicated by the characters RR.

F. Deferred precedence which is the lowest order or precedence is indicated by the characters MM. The flash and emergency precedence are also preceded by a number of characters which have no significance as far as message processing is concerned.

Item 4 noted previously is a routing indicator and it comprises either 3, 4 or 5 identifying characters indicative of the message destination or address of the received message in addition to the routing indicator R or U. In the present system each register is provided with routing indicator registers which are controlled to register each routing indicator character, which is then translated by the Translator 3700 to control the register to find a proper outlet or outgoing channel therefor. In the case of multiple call or multiple route messages additional routing indicators follow the first indicator.

Item 5 which is the body of the message is automatically transferred to a cross office unit where it is again perforated on a tape for subsequent transmission over a selected outgoing line. Preceding the body of the message as mentioned before may be some additional information such as the originating station designation, but this plays no part in controlling message processings.

Item 6 which is the end of the message indicator is referred to hereinafter as EOM and it comprises characters NNNN preceded by a number of line feed characters. The various operations of the switching apparatus in response to the various items noted above will now be described for both single and multiple call or route messages.

Figure 8:
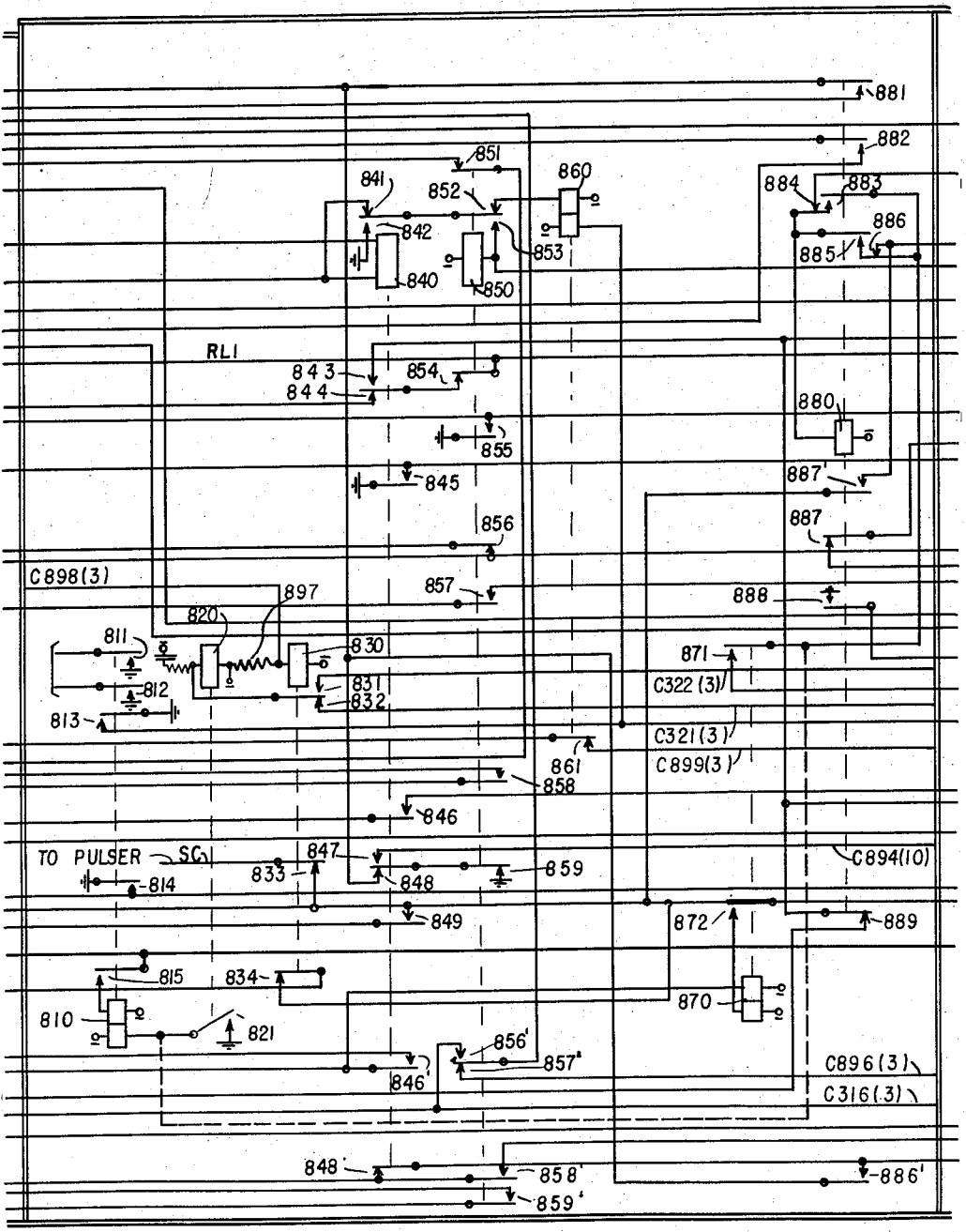
Figure 9:
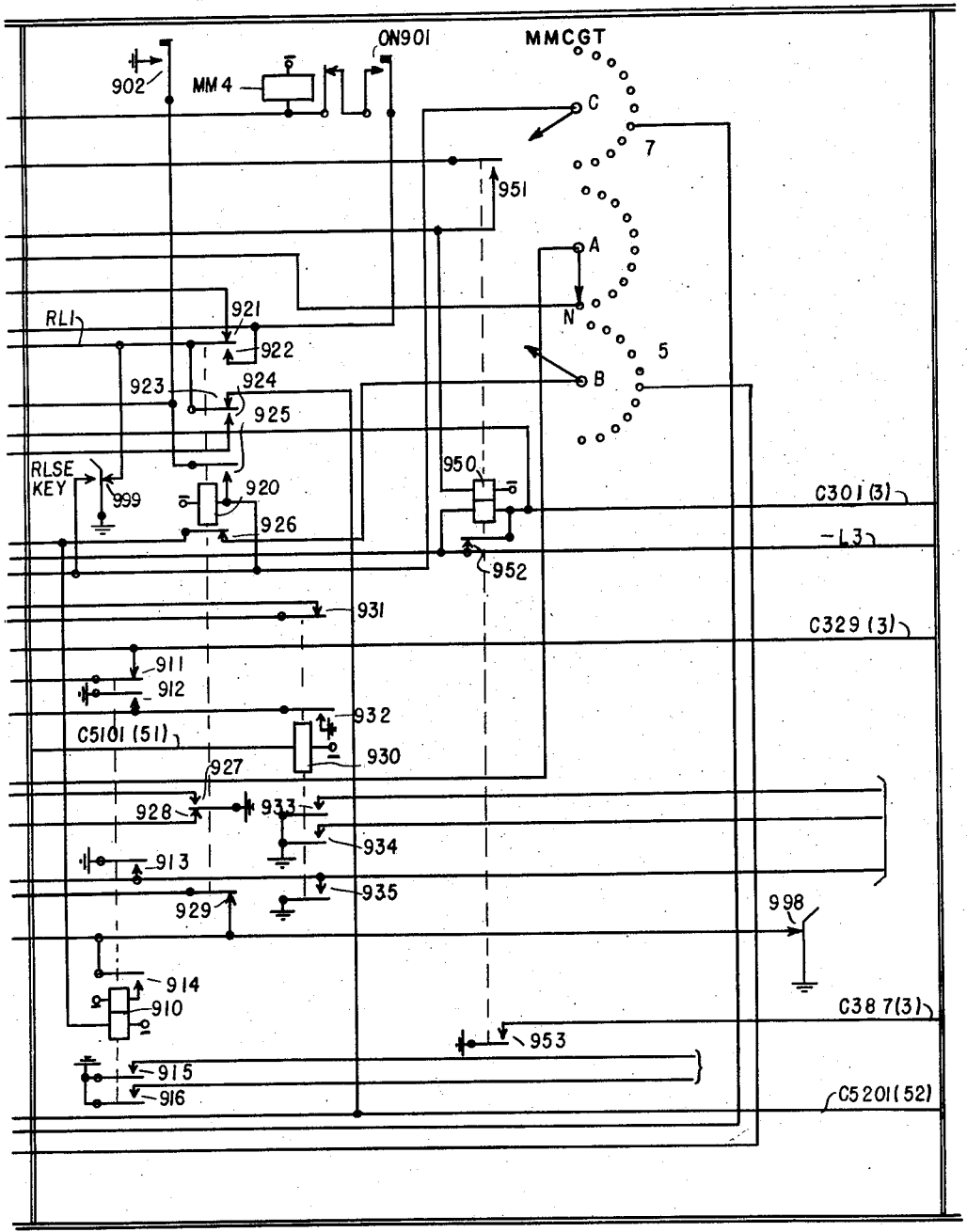
Figure 10:
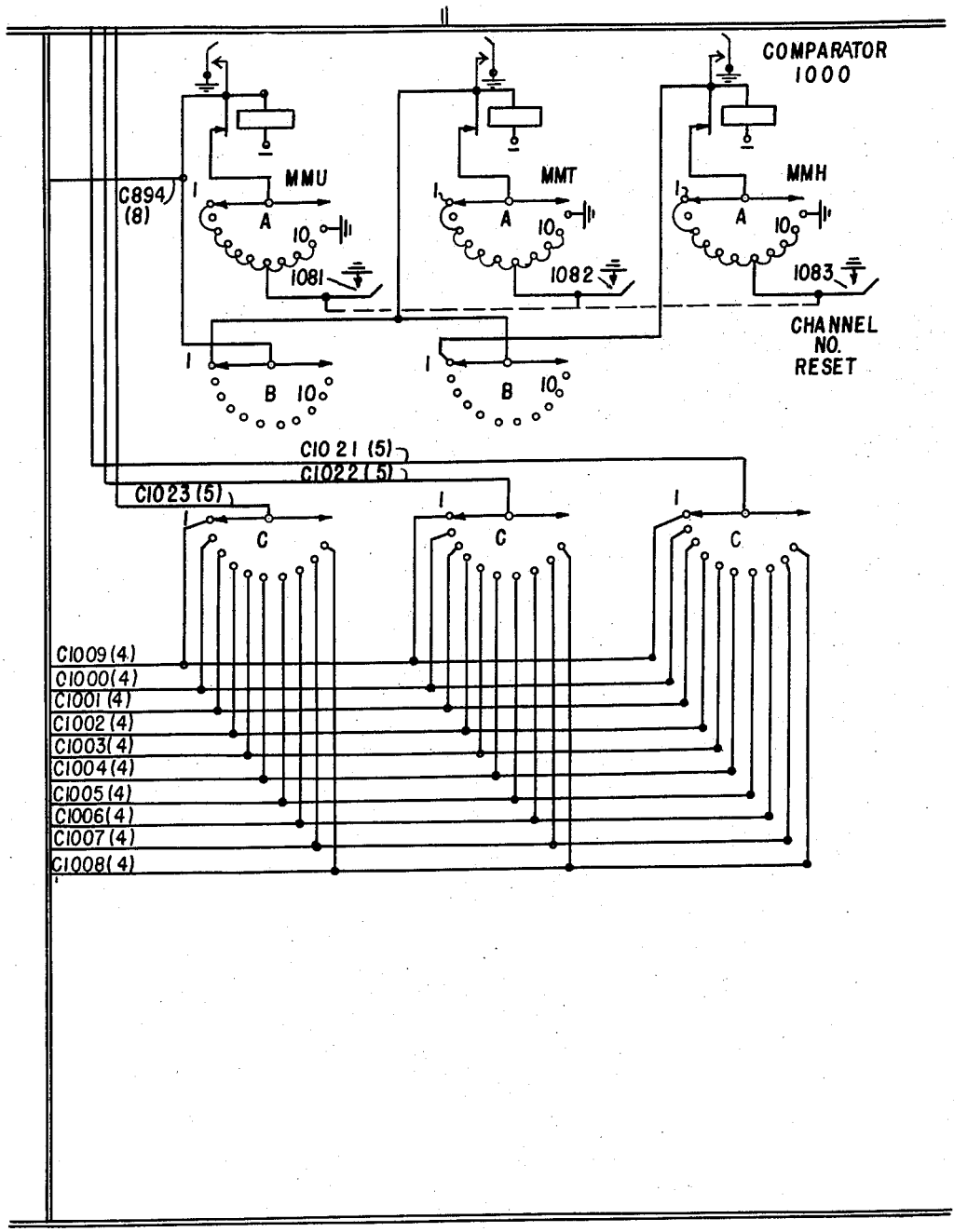

As the message is received, the perforator magnet M is operated to perforate a tape. The tape pulse contacts 379 close, in response to the tape feed out, to ground lead C898(8), which operates relay 830 (Fig. 8). It closes contacts 831 to connect relay 820 to lead C322(3). Lead 322 is grounded at contacts 314 periodically and momentarily as long as tape is fed out from the reperforator to hold relay 820 operated. If relay 820 should restore, it closes contacts 821 to operate relay 810. Relay 810 energizes its upper winding over contacts 815 and 998. At contacts 811, 812 and 814 it completes various signal circuits, and at contacts 813 energizes relay 860 to stop reader 300.

When the tape becomes slack between the perforator and the reader as a result of its being fed out by the reperforator, the reader slack tape contacts 342 close as previously mentioned. This extends the battery from one side of the reader clutch magnet MM1, over lead C899(8), contacts 861, 644, 612, 656 and 928 to ground to energize MM1. The reader now begins to pull the tape. With the reader operating, slack tape soon becomes available to the transmitter, and the transmitter slack tape contacts 343 close to forward ground over lead C699(6), contacts 631, 691 and 651 and over lead C698(3) to battery through the transmitter clutch magnet MM2. The clutch magnet MM2 is operated to initiate the operation of the transmitter and pull the tape forward from the reader to the transmitter.

With the tape reader operating the tape is passed to the tape reader sensing pins, and a sensing or reading cycle takes place for each character perforated in the tape. The sensing pins control contacts 351–355, inclusive, during each sensing or reading cycle in accordance with the perforations appearing on the tape to ground their respective leads 1–5 in code combination corresponding to the different characters and in the same order as the perforations of each character are indicated by the perforation illustrated in the tape section shown in Fig. 11. Leads 6, 7 and C896(8) are grounded as a result of particular combinations of sensing pins passing through the tape perforations to actuate the respective contacts 356, 357 and 358. Contacts 359 close to ground lead 8 slightly after the beginning of each sensing cycle and open before the end of each sensing cycle to then remove the ground on lead 8. Lead 8 is grounded during the reading of each character such as letter, number, space, carriage return, line feed, figure shift, letter shift or blank sensed by the tape reader. Due to the foregoing it will be appreciated that the relay 470 (Fig. 4) with certain exceptions, is operated over lead 8(4) after the remaining contacts 351—358 or any combination thereof are closed, in accordance with a sensed character and that the relay 470 restores to normal shortly before the character sensing operation is completed by the tape reader. Leads 1, 2, 3, 4 and 5 are connected to and control an individually corresponding one of the sensing relays 420—460 respectively, in accordance with the characters of the perforated code, and leads 1–5 and 8 are each connected through cable C302(16) to a contact individual to the incoming line 4 on C—H levels, respectively, of switch MM1F (Fig. 16) in each register having access to Line Circuit 400.

Each message received over the incoming line, first controls the perforator magnet to perforate various machine function characters for controlling a page printer typewriter but they are of little significance as far as the relay switching apparatus is concerned. It will be noted that during this period that contacts 413—418 are open so that relays 420—470 do not operate from ground on leads 1–5 and 8, and as ground does not then appear on leads 6 or 7, relay 480 and 530 remain unoperated.

Lead C896(8) is grounded, however as contacts 358 close during each sensing cycle except when letter shift characters or blanks are sensed. The ground is forwarded over contacts 857' and 711 to energize motor magnet MM4. At the end of the sensing cycle it restores to step its wipers. In this manner it steps its wipers once for each character. Switch MMCTG is set so that when it is stepped 16 times and a usable SOM does not appear, the wiper of level B extends a circuit over its sixth contact from the lower winding of relay 910 through contacts 926, the B wiper of switch MMCTG, through contacts 848' to ground at 718'. Relay 910 operates and extends alarm circuit over contacts 913, 915 and 916 in any well-known manner. At contacts 912 it extends ground for operating the lower winding of relay 860 which opens the reader clutch magnet circuit at contacts 861.

The next item of information appearing on the perforated tape is the first character of the SOM or start of message. The SOM comprises the four characters ZCZC. The first SOM character Z is sensed by the tape reader pins, to close contacts 351 and 355 and ground leads 1 and 5 for no purpose as contacts 413 and 414 are open. Contacts 356 also close to extend ground over lead 6, through contacts 412, 523 and 513 to battery through relay 480, which operates. Relay 480 closes contacts 481 to complete its own locking circuit from contacts 471 and the upper winding of relay 490. The upper winding of relay 490 remains shunted by the ground at contacts 513. Lead 8, which is grounded shortly after the beginning of the sensing cycle remains ineffective as it is still disconnected from relay 470 at contacts 418.

After the Z sensing cycle, ground is removed from lead 6 and the upper winding of relay 490, which previously had ground applied to both sides thereof. It is now energized in series with relay 480 over the latter's locking circuit. At contacts 491 it completes a circuit for relay 410, which operates to connect leads 1–5 and 8 to their respective relays 420—470 at contacts 413—418 respectively.

If the next character sensed by the reader is C, contacts 352, 353, and 354 at the tape reader close to ground leads 2, 3 and 4, respectively, and operate relays 460, 450 and 440, respectively. These relays complete a circuit from ground at contacts 421 through contacts 451, 461, 441, 431, 512 and 492 to the lower winding of relay 490. Relay 470 operating from ground on lead 8, shortly after the beginning of the sensing cycle, opens the locking circuit for relay 480 and the upper winding of relay 490 at contacts 471. Relay 480 restores, and the upper winding of relay 490 is deenergized. The lower winding of relay 490 remains energized as just described however, and its contacts are held operated. As contacts 482 close, a locking circuit is prepared for the upper winding of relay 510. Relay 470 restoring before relays 440, 450 and 460 completes a locking circuit from contacts 471 and through the upper winding of relay 510 for the lower winding of relay 490. When relays 440, 450 and 460 restore at the end of the sensing cycle to remove the ground from contacts 492, the upper winding of relay 510 energizes in series with the lower winding of relay 490 over the locking circuit.

The third character Z of the SOM is sensed next, and lead 6 is grounded as before, however relay 410, being operated, prevents the ground from being forwarded past contacts 412. Relays 420 and 430 now operate from ground on leads 1 and 5 forwarded over contacts 413 and 414, respectively. These relays extend ground from contacts 422, 434, 445, 455 and 466 to the lead Z, contacts 523 and operated contacts 514 to the lower winding of relay 510 to energize that winding. Relay 470 now operating opens the locking circuit for the lower and upper windings of relays 490 and 510 respectively to deenergize those windings. When relay 490 restores, it prepares a locking circuit at contacts 494 for the lower windings of relays 510 and 520, respectively. Relays 420 and 430 restoring after the release of relay 470 remove ground from contacts 523 to effectuate the locking circuit extending from contacts 471, 494, and 515 and through the lower winding of relay 520 for energizing the lower winding of relay 520 in series with the lower winding of relay 510.

Relays 440, 450 and 460 again operate when the sensing leads are grounded by the last character C of the SOM. They extend ground as before, but the ground instead of being passed over contacts 512 is now passed over contacts 522 and 495 to energize the upper winding of relay 520. Relay 470 operates as before to remove the holding ground for the respective lower windings of relays 510 and 520, and these windings deenergize. Relay 510 therefore opens contacts 515 to prevent the holding ground at contacts 471 from energizing the lower winding of relays 510 and 520, when relay 470 restores. Contacts 516 also close to prepare a circuit for relay 710 in series with the upper winding of relay 520. This circuit is effective to energize the lower winding of relay 710 from battery through the upper winding of relay 520 in series with the lower winding of relay 710 and over contacts 524, 516, 671 and 636 to ground on release key contacts 999 as soon as relays 440, 450 and 460 restore to remove the ground from contacts 522. At contacts 523 relay 520 opens a circuit extending from the Z detection chain.

Contacts 713 therefore close to energize the upper winding of relay 710 over contacts 844 and 854 and the aforementioned key contacts 999. At contacts 718' ground is removed from contact 6 on MMCGT switch level B to prevent the completion of a circuit to relay 910, while at contacts 717' ground is forwarded through contacts 889, off-normal contacts 901 on switch MMCGT, and the motor magnet self-interrupting contacts to energize the motor magnet MM4. It now operates in a self-interrupting manner to step its wipers to their home position. At contacts 711 the original operating circuit for stepping switch MMCGT from pulses over lead C896(3) is opened, and at contacts 715 the detection chain lead Figs is connected to relay 660 to detect the figure shift character which precedes the channel number. Relay 520 remains operated over the lower winding of relay 710, and it maintains relay 410 operated at contacts 521.

A channel or trunk designation, which is now sensed has no effect, as the operation of the various sensing relays therefrom, provide no detection chain grounds for operating the line circuit relays.

The figure shift character is sensed next, and leads 1, 2, 4 and 5 are grounded in response thereto to operate the corresponding sensing relays 420, 460, 440 and 430, respectively. Ground is therefore extended from contacts 422, 434, 444, 453 and 464 to the detection chain lead Figs. over previously operated contacts 715, through contacts 638 and 674 to battery through the winding of relay 660. Relay 660 operates and locks itself up over contacts 663 and contacts 751 in shunt with contacts 634 to ground on lead RL1 from release key contacts 999. The ground operating relay 660 is also extended from the right side of relay 660 over contacts 478 on operation of relay 470, the N contact and wiper of level A of switch MMCN and over contacts 475 to energize the motor magnet MM3 of switch MMCN. Simultaneously the same ground is forwarded over contacts 477 to the left side of relay 620 and would operate relay 620 due to the resistance battery connected to its right side, however ground is also forwarded over contact N and the wiper of level B of switch MMCN through contacts 625 to the resistance battery to shunt relay 620. At contacts 662 relay 660 opens a point in an incomplete circuit for energizing the magnet MM3 self-interruptedly over contacts 502 of the off-normal contacts 501. Relay 470 restores shortly before the sensing relays 420, 430, 440 and 460 to restore the motor magnet MM3 of switch MMCN at contacts 475 and 478, and it steps its wipers to their first contacts. With magnet MM3 deenergized and the wiper of level A of switch MMCN on any of its first seven contacts a circuit is completed, during the periods relay 470 is deenergized, from ground at self-interrupting contacts 502, contacts 1—7 of level A of switch MMCN, contacts 476, 644 and 861 to lead C899(3) to maintain the reader motor magnet MM1 energized.

The message number is read by the tape reader with the hundredths digit being read first, followed by the tens and units digits of the message number received on the channel. Relay 620 will have ground maintained on its left side from contacts 477 and on its right side from the wiper of level B of switch MMCN during each digit sensing cycle, if the digits of the channel number represent the anticipated message number.

During the first message number sensing cycle, the hundredths digit of the channel number sensed, causing the sensing relays 420—460 to ground one of the leads C1000(10)—C1009(10). If the digit is the same as that previously registered for this channel in the Comparator 1000, the ground which is extended from one of the leads C1000—C1009 to a corresponding contact on level C of the hundredths switch MMH, is then transmitted over lead C1021(5) to the first contact of level B of switch MMCN. With the wiper of level B on its first contact ground on lead C1021(5) is forwarded over contacts 625 to the resistance battery connected to the right terminal of relay 620. This maintains that relay unoperated as previously explained, when relay 470 operates during this sensing cycle to forward ground over contacts 477 to the left side of relay 620. Relay 470 on operating completes an operating circuit for the motor magnet MM3 of switch MMCN from both ground at contacts 474 and 502, contacts 1—7 in multiple on level A of switch MMCN, the associated wiper and contacts 475. The energizing circuit from ground at contacts 474 opens when relay 470 releases before the end of the sensing cycle and thus switch MMCN takes another step. Self-interrupting contacts 502 open as soon as MM3 energizes but the switch magnet does not deenergize until relay 470 restores. On its second contact the wiper of level B connects lead C1022(10) extending from the wiper of level C of the tens digit switch MMT in the Comparator 1000 to the resistance battery and contacts 625, as previously described for lead C1021, ground is returned over lead C1022(5), if the proper conductor of the group C1000—C1009 is grounded by the sensing relays on reading the tens digit of the channel number to maintain relay 620 unoperated during the operation of relay 470. On release of relay 470 magnet MM3 steps its wipers to their third contacts as described. Thus the Comparator 1000 continues to sense the incoming message number on its units switch MMU in proper sequence when the sensing relays are operated in response to the reading of the third digit. If the units digit corresponds to the position of switch MMU, ground forwarded over lead C1023(10) maintains relay 620 unoperated and on release of relay 470 switch MMCN is stepped to its fourth position, all in a manner similar to that previously explained.

When the EOM is read at the end of the message, relay 840 operates in a manner to be explained to ground lead C894(10). This ground energizes the motor magnet of switch MMU. If its B wiper is standing on contact 1 corresponding to the digit 9, the ground is forwarded to energize the motor magnet of switch MMT, and likewise if MMT, wiper B is on contact one, the ground is forwarded to energize the motor magnet of switch MMH. When ground is removed from lead C894(10) by operation of relay 850 as will be explained, each energized motor magnet deenergizes to step its wipers one position. To reset the switches to contact 1 corresponding to the digit zero, the switches 1081, 1082 or 1083 respectively are closed to cause the respective motor magnets to step their wipers self-interruptedly over their respective A wipers.

If the channel number indicator 1000 should fail to return ground over one of the leads C1021, C1022 or C1023 to the wiper of level B of switch MMCN for shunting relay 620 it will operate during one of the sensing cycles. This indicates the receipt of an improper channel number. At its X contacts it closes a holding circuit to resistance battery from ground through the key contacts on lead 998. At contacts 624 it opens a point in an incomplete circuit to the upper winding of relay 650. At contacts 623 it closes a circuit for an alarm as it does at contacts 621 and 622.

After sensing the last channel number, the sensing leads 1—5 are next grounded in accordance with a letter shift character to operate the sensing relays 420—460. The ground for the detection chain lead LTR is extended over contacts 422, 434, 444, 452 and 463. This ground is extended to the fourth contact on level B of switch MMCN, where it prevents the ground placed on the left side of relay 620 in a manner explained, from operating relay 620. After the release of relay 470, magnet MM3 steps its wipers to contact 5 in a manner explained. On level B, contacts 5—8 being permanently grounded to maintain relay 620 shunted during subsequent operations of relay 470.

Since the channel number has been checked, a Register could be associated with the incoming line, however this is delayed until the carriage return following the channel number is sensed and the incoming Transmitter 390 is about to transmit the first Z of the SOM. This prevents holding the Register uselessly in the event other channel designations and numbers succeed the last letter shift character.

If a single channel number is transmitted, a carriage return character is now sensed, to ground lead 4 and operate relay 440. A detection chain ground is extended from contacts 469', 459, 437, 448', 428 over the carriage return detection chain lead CR to contacts 664 and relay 610. Relay 610 energizes and locks operated over contacts 611 and contacts 636 to ground over lead RL1 and the release key contacts 999. At contacts 612 it disconnects one ground from lead C899(3) and the reader clutch magnet MM1. The reader clutch magnet remains operated by ground extended from the interrupting contacts 502 of motor magnet MM3 through contacts 1—7 and the wiper of level A of switch MMCN, contacts 476, 644 and 861 to lead C899(3) as before mentioned. Relay 470 operating shortly thereafter opens this circuit at contacts 476 and closes the aforedescribed circuit for energizing motor magnet MM3. The reader clutch magnet MM1 is therefore deenergized to stop the reader until relay 470 restores. This arrangement insures the reader can be stopped as soon as the line feed sensing cycle, which follows later, is over.

Thus relay 470 falls back near the end of the carriage return sensing cycle and motor magnet MM3 steps its wipers to their sixth contacts. A second carriage return character is now sensed with the MMCN wipers set to their sixth contacts and the switch MMCN is stepped to its seventh contacts and reader clutch magnet is also controlled in a manner similar to that just described.

During the line feed sensing cycle, relay 460 is operated to extend ground from contacts 469, 435, 447, 458 and 426, over lead LF, contacts 552 and 542 to operate relay 530. It prepares its locking circuit through the upper winding of relay 540 and contacts 531, which is completed to operate relay 540 also, when contacts 472 close on release of relay 470.

The line feed is sensed with the wipers of switch MMCN on their seventh contacts. Relay 470 operates during this line feed sensing cycle to open the reader magnet clutch circuit and operate the motor magnet MM3 as already described. When relay 470 releases, it opens the circuit of motor magnet MM3 which then steps its wipers to their eighth contacts. At this time the reader clutch magnet MM1 is connected via lead C899, contacts 861, 644 and 476, through the wiper of level A of switch MMCN to ground through the upper winding of relay 595. This winding is a high resistance winding, and it stops the reader clutch magnet MM1.

Relay 595 operates in the reader clutch magnet circuit. It energizes its lower winding over contacts 596 and 636, lead RL1 and key contacts 999, and connects the winding of relay 690 to lead C397(3) through contacts 598. At contacts 597 it extends ground to contacts 631, 691 and 651 to lead C698(3) for maintaining the transmitter clutch magnet MM2 operated.

The transmitter clutch magnet MM2 has in the meantime been operating over lead C698(6), contacts 651, contacts 691, contacts 631, lead C699(3), and contacts 343 to pull the tape across the transmitter sensing pins. The transmitter sensing pins close contacts 367 to ground lead C397(6) during the sensing of the first character before the Z of the SOM. Ground is therefore forwarded over contacts 636' and 598 to battery through the winding of relay 690 to operate relay 690. Relay 690 completes its own holding circuit over contacts 693 and 636 to ground on lead RL1 from release key contacts 999. At contacts 691 it opens the circuit for applying ground to lead C698(3) to deenergize the transmitter clutch magnet MM2, and stop the transmitter 390. At contacts 694 it forwards ground over contacts 639' and 624 and previously operated contacts 613 to battery through the upper winding of relay 650, which operates. Relay 650 energizes its lower winding through contacts 657 and 633 to ground on lead RL1. At contacts 651 it opens another point in the circuit for furnishing ground to lead C698(3). At contacts 655 the Register hold lead C696(16) is connected through contacts 638, 655 and 775 to the winding of relay 640 to mark the incoming line on an individually corresponding contact of level A of each finder switch such as MMIF (Fig. 16) in the Registers A and B having access to Line Circuit 400. At contacts 652 ground is forwarded from contacts 641 to contacts 771 to the register start lead C799(12) in the Register Unit Assigner 1200. It is common to the two Registers A and B serving the 25 incoming channels or line circuits which Line Circuit 400 is grouped. The ground on lead C799(12) initiates the assignment of one of the two registers to the Line Circuit 400.

If the message has more than one channel number the letter shift character following the first channel number is followed by a second station designation or channel letter. While sensing the second station designation which consists of three letters the reader clutch magnet is maintained energized from ground forwarded from contacts 928 through contacts 656, 612, 644 and 861 to lead C899(3). The switch MMCN which was standing on its fifth contact when the letter shift character was sensed is stepped to its eighth contact in a manner similar to that described, as relay 470 is operated during each sensing cycle. A figure shift which now proceeds the second message number is read by the tape reader but relay 470 operates during this sensing cycle and at contacts 475 it connects ground from the upper winding of relay 595 through the switch wiper of level A of switch MMCN, to the motor magnet MM3. Only relay 595 can operate with the aforedescribed results. With the reader operating the remaining channel numbers are sensed, but the switch wipers of switch MMCN remain on contacts 8. Sometime after relay 595 is operated and before the first carriage return character previously described which follows the last channel number is sensed by the reader, the first Z of the SOM is presensed in a manner just described and the transmitter is halted. The ground resulting from the presensing of Z at the transmitter is forwarded over lead C397(3) and contacts 598 to operate relay 690. When the carriage return character is sensed by the reader, relay 610 is operated as before described, and at contacts 612 terminates the operation of the reader clutch magnet MM1.

*Register seizure*

The ground on lead C799(12) is forwarded over the wiper of level B of switch MMFA in the Register Unit Assigner 1200, and the multipled contact with which the switch wiper is associated. Ground is then forwarded either over the lead connected in multiple to the odd numbered contacts or the lead connected in multiple to the even numbered contacts, depending upon which set of multipled contacts the wiper of level B is associated with. The lead associated with the odd contact is extended to break contacts 1327 in Register A of the Register Unit, while the lead associated with the even bank contacts is connected to contacts similar to 1327 in Register B.

In this example it will be assumed that the wipers of switch MMFA are associated with their odd contacts, and are therefore associated with Register A. The ground is passed over contacts 1327, if the register is idle, off-normal springs 1353, lead C1391(17) to battery through the winding of relay 1720.

Relay 1720 operates to close contacts 1721, 1722 and 1723. Contacts 1723 complete a circuit over lead C1791(14) to the lower winding of relay 1410. Relay 1410 energizes and opens contacts 1411 to open the circuit to normally operated relay 1420, which does not restore until the condenser 1401A connected in parallel with relay 1420 is discharged through resistor 1401B. With this circuit arrangement the holding time of relay 1420 is about three and one-half seconds.

During this period contacts 1722 forward ground from contacts 1721, the upper winding of relay 1730 and contacts 1732 to the motor magnet MM6 of switch MMIF through its self-interrupting contacts to energize it. The upper winding of relay 1730 fails to energize, as its right side is also connected to ground over contacts 1751, wiper A of switch MMIF standing on a contact associated with an idle line circuit and over a test lead such as C696(6) extending to contacts such as 638 and 654. Motor magnet MM6 steps the wipers of switch MMIF in a self-interrupted manner to search for the Line Circuit 400 in the group of 25 lines to which it has access.

Figure 6:
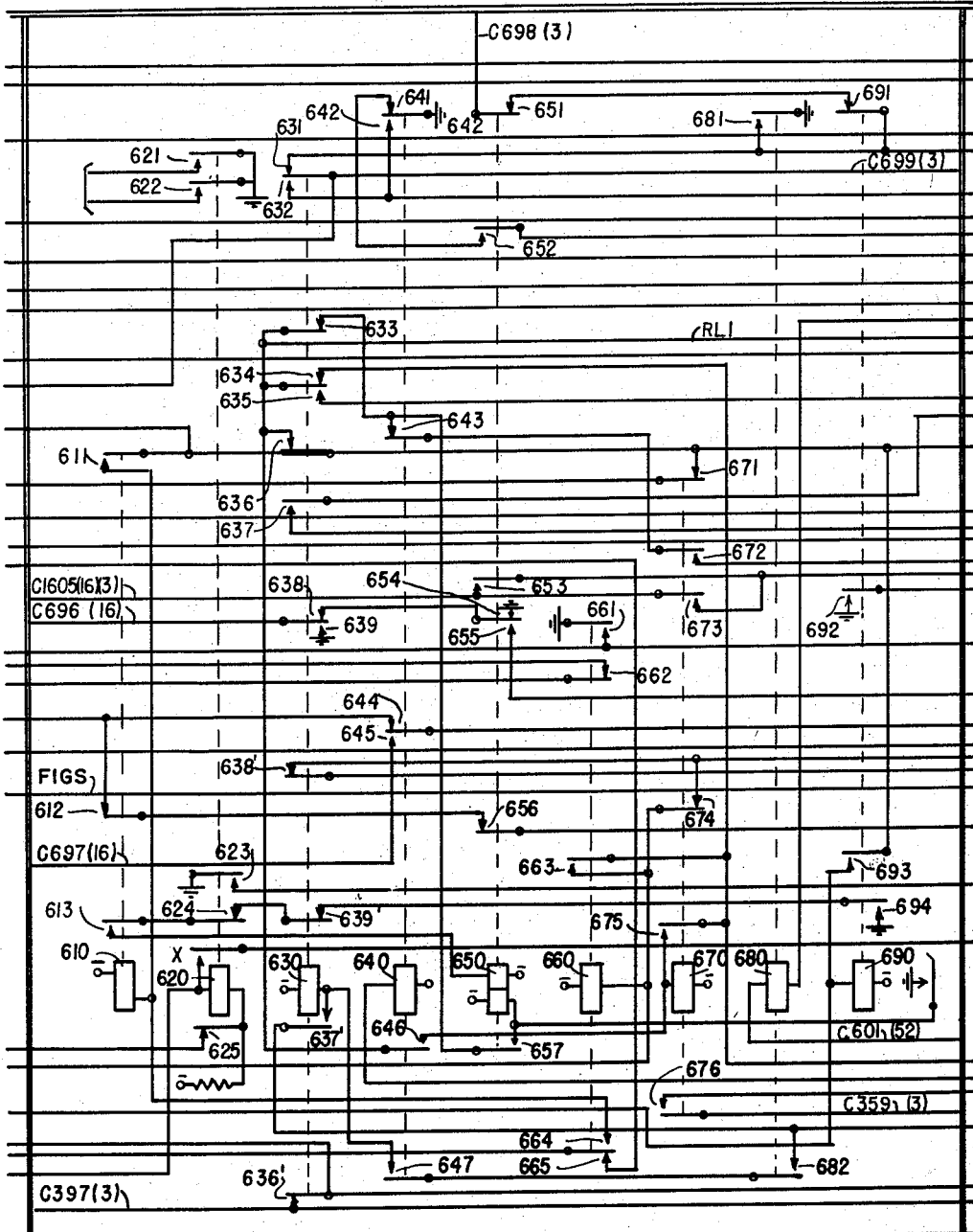
Figure 7:
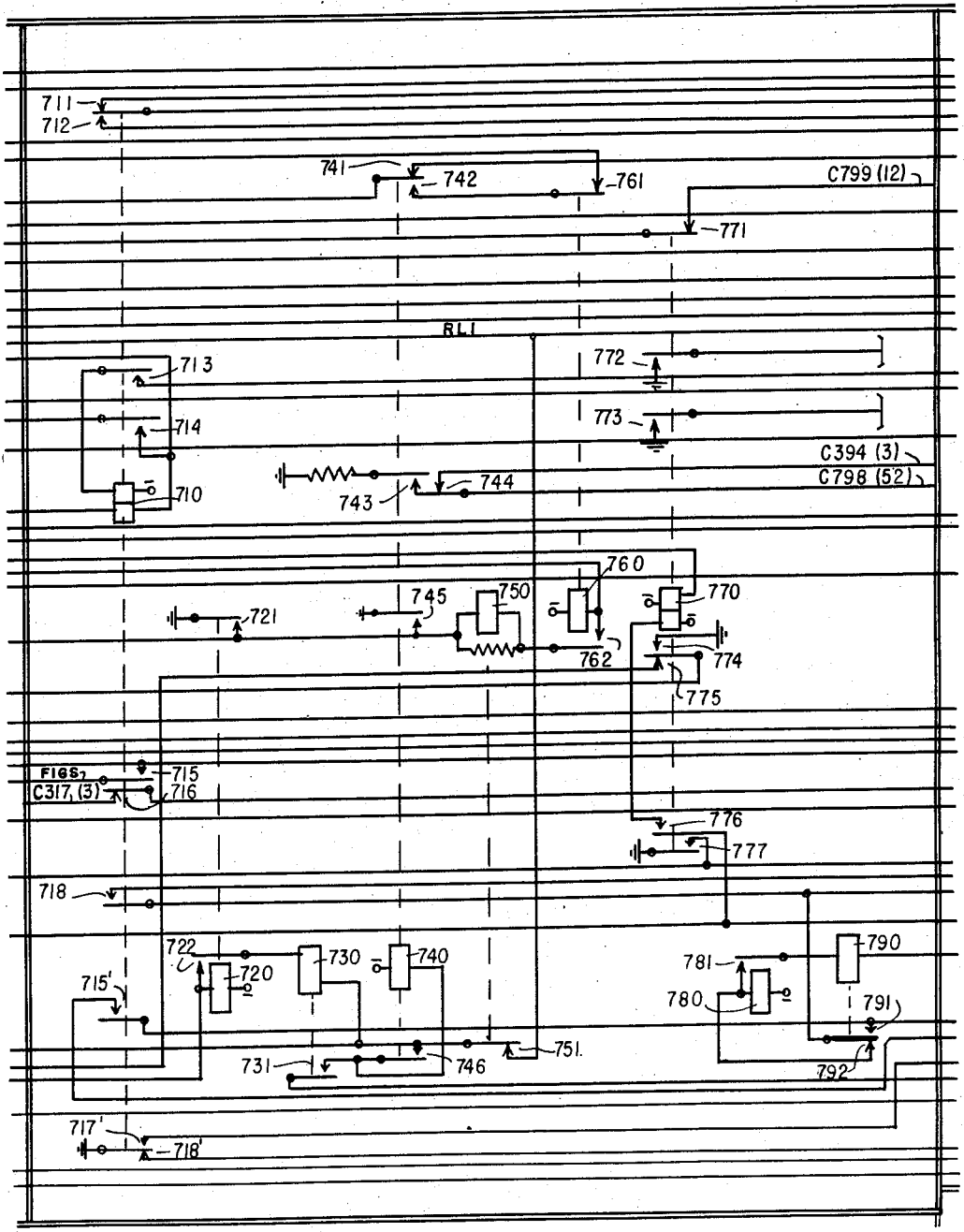

On finding the battery on lead C696(6), the A level wiper of switch MMIF forwards this battery to the upper winding of relay 1730 so that this relay operates in series with the relay 640 in Fig. 6 which in turn is in shunt with MM6. Relay 640 does not energize in the comparatively high resistance circuit through 1730. Relay 1730 operates to open contacts 1732 to prevent the motor magnet MM6 from again operating and extends the battery from lead C696(6) over contacts 1731 to ground through its comparatively low resistance lower winding so that relay 640 operates.

Switch MMIF should take no longer than one second to search the twenty-five associated line circuits. If it takes more than the 3½ seconds required for previously mentioned relay 1420 to restore, a ground transmitted from contacts 1424 lights the incoming seizure delay lamp 1491. Relay 1420 also closes contacts 1425 to provide a locking circuit for relay 1410 over contacts 1412 and 1425 to ground at the alarm release key contacts 1487.

Relay 1730, on operating, energizes relay 1710 at contacts 1733. Relay 1710 closes contacts 1711 to energize relay 1310 over lead C1799(13); connects the wipers of levels C—H of switch MMIF to the precedence character sensing relays 1910—1960 in the Precedence Register 1900, at contacts 1714—1719, and at contacts 1713 extends lead C697(6) to the Supervisory Unit 1300 over lead C1792(15) to enable the Register A to control the reader clutch magnet MM1 through the Line Circuit 400.

Relay 1310 places ground from contacts 1315 on the wiper of switch MMPA, and over contacts 1513 and 1514, respectively, to the wipers of levels A and B, respectively, of switch MMPA. Switch MMPA is used to detect an incorrect precedence designation, while switch MMAA is used to detect an incorrect routing indicator, all in a manner which will be explained. At contacts 1311, 1312, 1319 and 1319' it grounds leads C1301—C1305, respectively. Ground on lead C1301(34) is forwarded to the Terminal Register 3300 and over contact N of the A level of switch MMOGS (Fig. 36) to operate slow-to-release relay 3650. Ground on lead C1302(33) and C1303(33) is also forwarded to the Terminal Register 3300 to respectively operate slow-to-operate relay 3330 over contacts 3323 and to provide a holding ground for various operated ones of the terminal register relays. The ground on lead C1302(33) is also forwarded over the Terminal Register contacts 3314 and 3379 in shunt and over lead C3306(24) to operate relay 2440. Lead C1302 (29) is used only when the register is used with a multiple call cross office unit. Ground on lead C1304(22) is provided to the Precedence Register 1900 to provide a holding ground for the precedence register relays, when operated. Ground on lead C1305(27) is forwarded to the Sequence Control Unit 2700 to provide a holding ground for relays therein, and to operate the slow-to-release relay 3060 over contact N of the A level of switch MMIGS.

At contacts 1316 relay 1310 completes a circuit through the upper winding of relay 1320, which energizes. Relay 1320 opens contacts 1327 to open the circuit extended from lead C799(7) over level B of switch MMPA to relay 1720. Relay 1720 restores to open the already incomplete circuit to motor magnet MM6 at contacts 1721 and 1722, and at contacts 1723 it opens the previously described circuit to relay 1410 before it has locked operated over its upper winding. Relay 1410 restores to recomplete the circuit to relay 1420 at contacts 1411 and opens its prepared holding circuit at contacts 1412.

At contacts 1318 relay 1310 forwards ground over normally operated contacts 1477 and contacts 1534 to operate relay 1570. Relay 1570 closes contacts 1571 to ground lead C1503(31) extending to each Cross Office Finder Unit such as 3100 associated with the Register to operate a bar relay such as 3130 in each of these units and prepare holding circuits at contacts such as 3131 for the register relays L1—L25 of the cross office finder unit.

The Register A is now held by battery furnished over lead C696(6) from the Line Circuit 400 to relay 1730, until released for use with an incoming line. Contacts 1327 are open, as mentioned before, to prevent the completion of a circuit to relay 1720 by another line circuit demanding a register. At contacts 1325, relay 1320 connects a register unit chain circuit lead to the multipled odd contacts of level A of switch MMFA in the Register Assigner 1200. The chain circuit lead is connected through key contacts 1289 (Fig. 12) of the register locking type busy key 1290, over a lead to a similar key contact on a busy key associated with Register B and a similar chain circuit lead to ground at contacts such as 1324 in the other register, if that register is idle. A ground therefore returned from the other register, if it is idle, over contacts 1325, through the multipled odd contacts and the wiper of level A of switch MMFA and the self-interrupting contacts of magnet MM5, to energize MM5. It now steps its wipers to the multipled even contacts associated with the other register of the unit. If Register B is in use, ground is not forwarded from contacts such as 1324 therein to step switch MMFA until Register B becomes idle. If Register A finishes its function first, it recloses contacts 1324, to forward ground over the chain circuit lead, through contacts such as 1289 on each Register busy key and contacts such as 1325 in the other busy Register, but no circuit is completed to MM5 as the wipers of MMFA are on the odd contacts. Register A will therefore be seized by the next demanding Line Circuit. In the event Register B had been seized last so that the wipers of MMFA are on their even contacts when Register A becomes idle, the ground energizes MM5 to step MMFA to its odd contacts as explained for stepping MMFA to its even contacts. Of course, if Register B finished its function first when the wipers are on the even contacts, they remain there and if on the odd contacts they are stepped to the even contacts. If both registers are idle, ground forwarded from contacts such as 1324 in each register, and the associated chain circuit lead maintains switch MMFA stepping continuously in a self-interrupted manner as has been explained, until one register is seized and the switch MMFA then halts on the contacts associated with the idle register.

Relay 640 operating as before described, when the Register found Line Circuit 400, removes the ground from the lead C799(12) at contacts 641, and extends the ground at contacts 642 over contacts 741 and 931 through the winding of relay 680 to prepare the line circuit for a connection to a cross office unit. At contacts 646 it forwards ground from key contacts 999, lead RL1 and contacts 646 to battery through the winding of relay 670. At contacts 645, it connects battery through the reader clutch magnet MM1 over lead C899(8), contacts 861 and 645 to lead C697(16), the contact corresponding to this line on level B of switch MMIF, contacts 1713, lead C1792(15) to ground at contacts 1511. This energizes MM1 and initiates operation of the Tape Reader 300.

Relay 670 operates to open contacts 671 to deenergize the lower winding of relay 710 and the upper winding of relay 520. It also locks operated over contacts 675 and 634 to ground on lead RL1. Relay 710 remains operated over its upper winding, but relay 520 restores to open contacts 521 and restore relay 410. Relay 410 disconnects the sensing lead 1—5 and 8 from relays 420—470 to prevent their operation during following precedence and routing indicator sensing cycles.

*Precedence registration*

The sensing leads 1(16)—5(16) and 8(16) are extended by means of cable C302(3), over the wipers of levels C, D, E, F, G and H, respectively, of switch MMIF, through contacts 1714—1719, respectively, over leads C1701(23), C1702(23), C1703(23), C1704(23), C1705(23) and C1706(23), respectively, through contacts 2319', 2317', 2319, 2317, 2315 and 2313, respectively, in the Routing Register 2300, over leads C2301(19), C2302(19), C2303(19), C2304(19), C2305(19) and C2306(19), respectively, to the precedence character sensing relays 1910, 1920, 1930, 1940, 1950 and 1960, respectively, in the Precedence Register 1900, when the reader clutch magnet MM1 again started operation.

If the first precedence character, sensed by the reader, is M, indicating a deferred message, leads 3(16), 4(16) and 5(16) are grounded to extend ground to leads C2303, C2304, and C2305, respectively, the just traced connections therefrom, and relays 1930, 1940 and 1950 are operated. A detection chain ground is therefore extended from contacts 1928', 1959, 1947', 1919, 1939, 1976 and 2042 to battery through the winding of relay 2050. Relay 2050 closes contacts 2051 to temporarily complete a locking circuit for itself through the upper winding of relay 2040 to ground at contacts 1963. At contacts 2052 it opens a point in an incomplete circuit to relay 2060. Relay 1960 operating from the ground pulse extended to lead C2306(19) from lead 8(16), shortly after the beginning of the sensing cycle, opens this locking circuit, but on release of relay 1960 this circuit is recompleted. The upper winding of relay 2040 energizes in series with relay 2050, after the release of the sensing relays removes the ground which shunts relay 2040 at contacts 2042. Relay 2040 prepares a circuit for its lower winding at contacts 2041; opens the detection chain operating circuit for relay 2050 at contacts 2042 and prepares an operating circuit for relay 2060 at contacts 2043.

The next precedence character of a deferred message is also M, and the same sensing relays 1930, 1940 and 1950, as above, are operated to extend the detection chain ground. Only the lower winding of relay 2040 is energized thereby as contacts 2041 are closed and contacts 2042 are open. Relay 1960 on operating from the ground on lead C2306(19) opens the locking circuit for the upper winding of relays 2040 and 2050. Relay 2050 restores to open contacts 2051. This prevents the recompletion of the just-mentioned locking circuit on release of relay 1960. It also prepares a circuit to relay 2060 at contacts 2052. At the end of the sensing cycle ground is removed from the detection chain, as relays 1930, 1940 and 1950 restore. Ground on the left side of relay 2060 is therefore removed, and battery through the lower winding of relay 2040 is extended over contacts 2043 and 2052 through the winding of relay 2060 to ground on lead C1304(13).

Relay 2060 operates relay 1970 at contacts 2064. Contacts 2064 also prepare a good precedence indication circuit to be completed over lead C1997(23) or C1998(23) by the precedence sensing relays on receipt of the first character R of the routing indicator. At contacts 2061 lead C2290(27) is connected to the low precedence message lead C2293(29) to prepare an operating circuit for low precedence relay 2920 in the Sequence Control Unit 2700, and at contacts 2062 the precedence register lead C2090(27) is extended to the deferred message indication lead C2091(49).

Relay 1970 disconnects all the precedence sensing detection chain leads for the six degrees of precedence at contacts 1976, 1977, 1978, 1979, 1977' and 1978', respectively, to prevent following characters from being registered in the precedence register. It completes the precedence received and set lamp circuits by extending ground at contacts 1972 to light lamp 1977 and over contacts 2261 to light lamp 2229. It also opens the precedence alarm lead C1999(13) at contacts 1973. At contacts 1971 it extends lead C1348(13) to contacts of the precedence sensing relays to enable the characters of the first routing indicator to be counted by switch MMAA (Fig. 13). It also extends ground from contacts 1974 to operate slow-to-release relay 2260 via the contact N and the associated wiper on level A of switch MMPS. Relay 2260 operates to open the circuit to the precedence set lamp 1197 at contacts 2261.

If a routine message is being handled, an RR precedence designation is received instead of the MM precedence designation previously described. Relay 2080 operates from ground over contacts 1937, 1928, 1916, 1956, 1947, 1977 and 2072 on receipt of the first R. Relays 2080, 2070 and 2110 are then controlled in a manner and sequence similar to that described for relays 2050, 2040 and 2060, respectively, in response to the further operation of the various sensing relays reacting to the received routine precedence designation.

On receipt of a priority message indicated by the characters PP, relay 2130 is operated from ground forwarded over contacts 1919', 1929', 1937', 1949', 1959', 1978 and 2122. Relays 2130, 2120 and 2140 are then controlled in a manner and sequence similar to that described for relays 2050, 2040 and 2060, respectively, in response to the further operation of the sensing relays reacting to the received priority precedence designation. Relay 2140 in addition grounds to night intercept lead C2296(25) at contacts 2142 to signal the translator 3700 that the message is other than deferred or routine.

On receipt of an operational message indicated by the precedence designation OO, relay 2160 is operated from ground at contacts 1928', 1959, 1947', 1919, 1936, 1979 and 2152. Relays 2160, 2150 and 2170 are then controlled in a manner and sequence similar to that described for relays 2050, 2040 and 2060, respectively, in response to the further operation of the various sensing relays reacting to the received operational precedence designation. Relay 2170 connects lead C2290(27) to high precedence lead C2291(29) at contacts 2171 rather than to the low precedence lead C2293(29) as is done on the operation of relays 2060, 2110 or 2140, respectively, and it also grounds the night intercept lead C2296(25) at contacts 2172.

Receipt of an emergency message is indicated by the characters YY. Certain characters, which precede the characters YY of an emergency message and the characters ZZ of a flash message do not affect the functioning of the equipment. Relay 2190 operates on receipt of the first Y, from ground at contacts 1928', 1959, 1948', 1918', 1938', 1977' and 2182. Relays 2190, 2180 and 2210 are then controlled in a manner and sequence similar to that described for relays 2050, 2040 and 2060 on succeeding operations of the sensing relays when they respond to the received emergency precedence designation. Relay 2210 also connects lead C2290(27) to high precedence lead C2291(29) at contacts 2211, and grounds the night intercept lead at contacts 2212. It also connects at contacts 2216 the intercept high precedence lead C2297(30) to lead C2298(32) extending to the Cross Office Finder 3100.

Receipt of a flash message is indicated by the precedence characters ZZ. Relay 2230 is operated from ground at contacts 1928', 1959, 1948', 1918', 1939', 1978' and 2222. Relays 2230, 2220 and 2240 are then controlled in a manner and sequence similar to that described for relays 2050, 2040 and 2060 on the succeeding operations of the sensing relays in response to the receipt of the flash precedence designation. Relay 2240 prepares the high precedence lead C2291(29) at contacts 2241; prepares the night intercept lead C2296(25) at contacts 2242 and connects lead C2297(30) to lead C2298(32) to switch PSS at contacts 2246.

As in the case of the operation of relay 2060, relays 2110, 2140, 2170, 2210 and 2240, each operates relay 1970 in a similar manner and for a similar purpose over contacts 2114, 2144, 2174, 2214 or 2244, respectively. Relay 2260 is then operated by relay 1970 in a described manner.

During each sensing operation except that resulting from the reading of the characters S and J and certain machine functions, which precede the YY and ZZ designations, ground is forwarded from contacts 1961 on operation of relay 1960, over the detection chain contacts 1913, 1944 or 1952 and over one of several obvious paths to contacts 1973 and lead C1999(13). The motor magnet MM7 of switch MMPA is pulsed thereby, and it steps its wiper correspondingly. If a usable precedence is not registered by the time switch MMPA is stepped to its fourth position, an alarm is effected by lighting lamp 1361. Normally switch MMPA takes only two steps before a usable precedence is registered and lead C1999(13) is disconnected at contacts 1973 by operation of relay 1970. The ground from contacts 1315 is also forwarded over contacts 1545 to lead C1501, contacts 2713 to operate relay 2740. Relay 2740 will provide for interception in a manner similar to that which will be explained. If key contacts 1539 were operated relay 1540 is operated. The ground therefore extended from switch MMPA operates relay 1550 instead of relay 2740 as just described. At contacts 1554 relay 1550 locks operated over contacts 1543, and at contacts 1551 and 1552, respectively, it lights the unit alarm and out of service lamps, respectively, not shown. At contacts 1555 it energizes the lower winding of relay 1510 which disconnects the ground for operating the reader clutch magnet MM1 at contacts 1511. The just mentioned characters preceding the YY and ZZ precedence designations are not registered as no detection chain ground results from their being sensed.

If the addressed channel is closed for the night the Translator 3700 uses the ground on lead C2296(25) to effect the routing of the message to intercept instead of to storage at the outgoing channel. This allows a night operator to forward high priority messages by telephone, etc.

*Routing indicator registration*

The next character to operate the precedence sensing relays for completing a circuit is one of the routing indicators R or U. The precedence sensing relays 1920 and 1940 or 1910, 1920 and 1930, respectively, operate in response to the reader sensing an R or U, respectively. The ground for operating relay 1970 is also extended through contacts 1951, 1942, 1932, 1922 and 1912 to lead C1998(23) or over contacts 1951, 1941, 1931, 1921 and 1911 to lead C1997(23), which is commoned to lead C1998(23), and then to battery through the motor magnet MM10 of switch MMTR. This circuit is opened, when the sensing relays of the precedence register are restored. Magnet MM10 then steps its wipers to their first contact to connect the wipers of levels B—F to the first group of route register relays RR1. In addition the controlled precedence sensing relays extend a momentary ground from contacts 1961 to lead C1348(13) to step switch MMAA one step.

At the first contact of level A of switch MMTR a circuit is completed from contacts 2442 (closed by already operated relay 2440), over contacts 2432 and the switch wiper to relay 2310. Relay 2310 operates to complete its own holding circuit over contacts 2311 and 2441. It also operates to disconnect the reader sensing leads 1(16)—5(16) and 8(16), which are respectively connected via leads C1701(17)—C1706(17) to leads C2301(19)—C2306(19) from the precedence sensing relays at contacts 2319', 2317', 2319, 2317, 2315 and 2313, respectively, and connects the sensing leads 1(16)—5(16) and 8(16) via leads C1701(17)—C1706(17) and contacts 2318', 2316', 2318, 2316, 2314 and 2312, respectively, to the routing register sensing relays 2320—2370, respectively.

Since the first character of the routing indicator is the same for nearly all stations, it is of no help in determining what channel receives the message. For this reason it is not applied to the routing register sensing relays for registration. Therefore, it is not subsequently analyzed by the translator. The second character of the routing indication is registered to identify the network Army, Navy, Air Force, etc.; the third character is registered to registered to identify the geographical area of the network; the fourth character is registered to identify the particular relay center in an area of a particular network; and fifth and sixth characters are registered to identify tributary stations of the relay center if a message is to be transmitted thereto.

The second character of the routing indicator, when read by the reader, therefore operates the corresponding combination of the routing register sensing relays 2320—2360, and sensing relay 2370 from ground on lead C1706(17) via lead 8(16). Make springs, such as 2323, 2335, 2344, 2355 and 2363 on the operated sensing relays 2320—2360, extend ground only to individually corresponding wiper of levels B—F of switch MMTR. They in turn each extend the individually corresponding ground over the associated first contact to operate a corresponding register relay of relays 2510—2550 comprising the first route register group RR1. Simultaneously the motor magnet of MMTR is energized from at least one of the contacts 2322, 2334, 2343, 2354 or 2362. The operated register relays 2510—2550 in the first register group RR1, lock operated over individually corresponding contacts 2512, 2522, 2532 and 2552 to ground at contacts 2441.

Relay 2370 which operates during the sensing period extends ground from contacts 2374 directly over lead C1348(13) to the motor magnet MM9 of switch MMAA. Relay 2370 restores shortly before the end of the sensing cycle in a manner that has been explained, and it opens contacts 2374 to deenergize motor magnet MM9. The magnet then steps its respective wipers for a purpose which will be explained.

At the end of the sensing period the sensing relays 2320—2360 restore to deenergize the motor magnet MM10 of switch MMTR, and it steps each of its wipers to a respective succeeding contact thereby connecting the register relays of the next register group RR2 to the respective upper springs of contacts 2323, 2335, 2344, 2355 and 2363. When the sensing relays 2320—2360 operate on the reading of the third character of the routing indicator, the corresponding relays of group RR2 are operated by the routing register sensing relays in a manner similar to that just explained for group RR1. The relays of group RR2 thus register the third routing indicator character, and the operated ones thereof also lock to ground at contacts 2441 in a manner explained for group RR1. The remaining characters of the routing indication are registered in a similar manner in succeeding groups RR3, RR4 and RR5, as switch MMTR steps its wipers to succeeding contacts in a manner explained. Likewise the motor magnet MM9 is controlled by relay 2370 during each routing indicator sensing cycle to step its wipers.

The longest routing indicator has six characters including the character R or U, and after the last character is sensed switch MMAA steps its wipers to a succeeding contact. Thus with a six character routing indicator the wipers of levels A and B of switch MMAA are standing on their fifth contacts when the last character is sensed. The wipers are then stepped to their sixth contacts. If a usable first character is not sensed within eight characters or if a space or carriage return does not follow a usable routing indicator the ground extended to the wipers of levels A and B of switch MMAA in a manner already explained is forwarded over the eighth contact of level B to operate relay 1330, and over the eighth contact of level A to operate lamp 1361, respectively. Relay 1330 operates and locks to ground over contacts 1321 and 1332 and at contacts 1331 lights lamp 1362 to provide an indication that an improper address was received. The ground extended to light lamp 1361 is also extended to operate relay 2740 as already explained. This will result in an intercept operation as will be described. As previously explained, if key contacts 1549 are closed and relay 1540 is operated at the time switch MMAA has forwarded ground, relay 1550 is operated. Relay 1540 prevents the operation of relay 2740 by opening contacts 1545 and closing contacts 1544 to operate relay 1550. The call will therefore be routed to intercept and an out of service alarm is provided.

During sensing of machine functions, namely, space, carriage return, or line feed, which follow the receipt of the routing indicator, a respective detection chain circuit is completed to the upper winding of relay 2430 over the following contacts: 2351, 2341, 2331, 2321, 2361 and 2373, or 2342, 2353 2332, etc. or 2342, 2353, and 2333, etc. Relay 2430 operates, and its lower winding is energized over contacts 2434 and switch MMTR off-normal springs 2402. As switch MMTR will be stepped home to open this circuit another ground from such contacts as 2511, 2521, 2531, 2541 and 2551, which are under control of the operated register relays is also provided to contacts 2434 to hold the lower winding of relay 2430 energized. At contacts 2435, relay 2430 prepares a self-interrupted homing circuit for switch MMTR over off-normal springs 2401. The homing circuit is completed at the end of the sensing period, when MM10 deenergizes, as it then closes its self-interrupting contacts.

If only three routing indicator characters were registered in groups RR1, RR2 and RR3, respectively, before the machine function was sensed, that machine function was registered in the fourth relay register group RR4, but is not used by the translator due to the operation of relay 2430. If a machine function is not sensed by relays 2320—2360 to operate relay 2430 after the registration of the three characters, the wipers of switch MMTR are merely stepped to their fourth contacts in the described manner and the operated sensing relays forward ground to operate the relays of group RR4 in accordance with the corresponding routing indicator. Switch MMTR is then stepped to its fifth contacts at the end of the sensing period to complete a circuit from contacts 2442 and 2432 and the wiper of level A of switch MMTR to relay 2410 to energize it. Relay 2410 then completes a locking circuit for itself over contacts 2443, 2422 and 2411, and it prepares a connection between lead C3303(33) to lead C2498(37) at contacts 2412 to enable the translator to utilize the registration in relay group RR5. The sensing of a machine function after registration of four routing characters operates relay 2430, as explained above, and it opens the original operating circuit for relay 2410 at contacts 2432 and completes the connection between lead C3303(33) and lead C2498(37) at contacts 2436. Switch MMTR is then stepped home as described. If another routing character is sensed by relays 2320—2360, instead of a machine function, when the switch wipers of MMTR are on their fifth contacts, that routing indicator is registered in register relay group RR5 in a manner described, and switch MMTR is stepped only to its sixth contacts at the end of the sensing cycle in a manner similar to that already described. The switch wiper of level A of switch MMTR forwards ground over its sixth contacts from contacts 2442 and unoperated contacts 2432 to relay 2420. It operates to open the locking circuit to relay 2410, which restores. It completes its own locking circuit over contacts 2443 and 2421. It prepares a connection between lead C3303(33) and C2499(37) at contacts 2423 to enable the translator to utilize the registration of the fifth register relay group RR5. Relay 2430 operating, when the machine function following the sixth routing indicator or the fifth identifying character is registered, opens the original operating circuit for relay 2420 at contacts 2432 and completes the connection between leads C3303(33) and C2499(37) at contacts 2436. It also enables switch MMTR to be stepped home at the end of the sensing cycle in a manner described.

The detection chain ground resulting from the machine function following the last routing indicator, is also forwarded over contacts 2372 and the address received lead C2399(33) to operate register relay 3340 in the Terminal Register 3300. It locks operated over contacts 3345 and 3376 to ground on lead C1303(13) and also demands the Translator 3700. The machine function detection chain ground is also extended over contacts 2371, lead C2398(15) to energize the upper winding of register supervisory relay 1510. It opens the circuit to the reader clutch magnet MM1 at contacts 1511. Another ground is also furnished to lead C2398, by operated relay 2430 at contacts 2431 to maintain relay 1510 operated and the reader clutch magnet deenergized, after the machine function ground is removed from lead C2398.

Relay 1510 on energizing opens contacts 1513 and 1516 to prevent the forwarding of ground over the wipers of levels A and B of switch MMAA. Thus if switch MMAA were on its sixth contact and stepped to its seventh on the reading of the machine function following the routing indicator no circuits would be completed thereby. At contacts 1515 ground is forwarded over off-normal springs 1337 and the self-interrupting springs of the motor magnet MM9 to cause switch MMAA to be stepped home in its self-interrupted manner. Ground from off-normal springs 1354 is forwarded over contacts 1328 to maintain the lower winding of relay 1320 energized. This circuit is open when switch MMAA is stepped home, however ground from off-normal springs 1338 forwarded over contacts 1475 and 1328 also maintains the lower winding of relay 1320 energized after switch MMAA is home.

*Translator seizure*

Relay 3340 on operating extends ground from contacts 3365 via contacts 3346, lead C3301(37) common to all the registers through the manually closed contacts 3702 on the gang switch 3701 to operate the translator start relay 3750. Relay 3750 closes contacts 3751 to connect the motor magnet MM11 of switch MMDF to its three switch wipers, and over contacts 3741 to ground through the lower winding of relay 3740 at contacts 3703. Each wiper is provided with ten contacts individually connected to ten different registers whereby thirty registers are accessible to the translator. If fewer registers are provided such as in the system described herein, ground is connected to the unused contacts so that the switch is automatically stepped past those contacts when a register demands the translator. In addition one contact having ground connected thereto is associated with each wiper in its last position to enable the switch to be stepped past that contact and bring another switch wiper into association with its contacts.

One of the wipers is therefore associated with a register, and if that register no longer requires a translator, ground is forwarded therefrom, as will be apparent, over contacts 3741 and 3751. Magnet MM11 steps in a self-interrupted manner from ground furnished by the respective idle registers to its switch wipers, until it finds battery over one of the wipers standing on a contact corresponding to the Register A, lead C3360(33) individual to the register, contacts 3375, 3344 and the lower winding of relay 3360. Normally ground at contacts 3343 is being supplied over lead C3360(37) to prevent the translator from stopping on this register. With battery through the lower winding of 3360 on lead C3360(33) magnet MM11 is in shunt with relay 3360 as both find ground over the lower winding of relay 3740 and contacts 3703. Magnet MM11 cannot energize in series with the lower winding of relay 3740. Relay 3740 operates, however, and opens the circuit to magnet MM11 at contacts 3741. It completes an energizing circuit for its upper winding in shunt with its lower winding over contacts 3742. This causes relay 3360 to operate.

Relay 3360 opens the circuit for the translator start relay 3750 at contacts 3365; completes a circuit to relays 3410 and 3510 over contacts 3361 and 3371, and it also operates slow-to-operate relay 3350 at contacts 3362. At contacts 3368 relay 3360 forwards ground from contacts 3379', over lead C3309(18) to operate the bar relay 1850 in the Finder Relay Unit 1600. It operates to connect leads individual to each of the incoming lines, to which the register has access, to the translator for the purpose of preparing an incoming outgoing channel comparison test. The lower winding of relay 3320 is also energized over contacts 3377' and 3366. In addition relay 3360 at contacts 3364 forwards ground over contacts 3377, contacts 3456, lead C3499(44), manually closed contacts 4403 on gang switch 4400 in the Translator 3700 and lead C3499(44) to bar relay 4410. Relay 4410 operates and connects the code relay controlled leads TG1—TG10 and TT1—TT25 of the translator to their individually corresponding group and terminal relays RG1—RG10 and RT1—RT25, respectively, over make contacts of operated relay 3410. At contacts 3367 relay 3360 forwards ground from contacts 3378' over lead C3308(25) to operate bar relay 2560. It connects the register relay group leads 2A—6E all from respective contacts of the operated Translator Gang Switch 3701 to respective contacts of the register relays in groups RR1—RR5. It also connects the translator night intercept lead C2599(37) from the Translator Gang Switch 3701 to the register night intercept lead C2296(22), and connects leads C2497(37) and C2498(37) to the translator gang switch 3701.

Relay 3350 extends ground via contacts 3372 and 3351, lead C3303(26), through operated make contacts such as 2513, 2523, 2533, 2543 and 2553 of the operated register relays in the register relay groups RR1, RR2, RR3, RR4 and RR5 to the respective register relay group leads 2A—6E. It also extends ground over lead C3303(26), contacts 2436 and over either contacts 2412 or 2423, if relay 2410 or 2420, respectively, is operated.

The ground extended over lead C3303 and the operated contacts of the register relays and relay 2560 is extended over leads 2A—2E, 3A—3E, 4A—4E, 5A—5E and 6A—6E through corresponding contacts on the gang switch 3701, leads 2A'—2E', 3A'—3E', 4A'—4E', 5A'—5E' and 6A'—6E', respectively, to individually corresponding relays in each group of character decoding relays RD1—RD5 of the translator. The night intercept lead C2296(22) is now extended over lead C2599(37) through contacts 3704 on the gang switch 3701, into the translator. It provides an indication from the Precedence Register 1900 that the message is other than deferred or routine so that it can be routed to night intercept and handled immediately by the night attendant, if that be necessary. The ground on lead C3303, as made clear before, is extended to either leads C2498(37) or C2499(37), if either a fifth or a sixth routing indicator, respectively, was received. Leads C2498(37) and C2499(37) are extended through contacts 3705 and 3706, respectively, on gang switch 3701 and then directly over leads C3707(40) and C3708(40), respectively, to relays 4040 and 4050, respectively. Relay 4040 or 4050, respectively, is therefore operated, if ground had been placed on either lead C2498(37) or C2499(37), respectively. Relay 4040 operates to open contacts 4041 and close contacts 4042. It also operates relay 4060 over contacts 4043 and 4053. These operations permit a translation to be made of a character registered in relay register group RR4. Relay 4050, if operated opens contacts 4053 and 4052 and closes contacts 4051 to enable a translation to be made of a character registered in relay groups RR4 and RR5.

*Translator operation*

It will be recalled that each relay station is identified by a four, five or six letter routing indicator code. The first letter is an R or U, and is treated in the same manner for all stations. It is, therefore, not used by the translator. The second letter or character is one of eight used to designate the eight different tape relay networks such as Army, Navy, etc. The third character, which is the second character used by the translator, may be one of fifteen different letters designating the fifteen different areas which each network serves. The fourth character of the routing indicator may be any one of twenty-six different letters designating any one of twenty-six different relay switching centers of each network in each area. Thus provision is made for a total of 8×15×26 or 3120 different relay switching centers, and this number may be enlarged by providing additional network identifying characters and/or additional area identifying characters, and if necessary other networks may be added to the system. Following this, stations tributary to the different switching centers are identified by a fifth and if necessary, a sixth character. Twenty-six different letters are used to indicate twenty-six different tributary stations and if more tributary stations are provided, a sixth character is added to the code. The sixth character may be any one of twenty-six different letters thereby enabling another 676 tributary stations to be identified.

In the present system it is assumed that the instant center is identified by the letters RUWP, and that its tributary stations may be identified by the letters RUWP followed by any one of the twenty-six alphabetical letters or any two of twenty-six alphabetical letters.

Each one of the characters in the routing indicator was registered in an individually corresponding relay register group RR1—RR5. It will be recalled that a ground was transmitted over leads corresponding to each character registered in the various register relay groups RR1—RR5 and over corresponding contacts of gang switch 3701. These leads are connected to individually corresponding relays in each group of character decoding relays RD1—RD5. The first register relay group RR1 controls leads 2A—2E which are connected to individually corresponding relays 3810—3850 of the first group of decoding relays RD1. They decode the second character of the routing indicator. The second relay register group RR2 connects leads 3A—3E in a similar manner to the third character decoding relay group RD2. Likewise the third register relay group RR3 controls connections to the fourth character decoding relay group RD3 over conductors 4A—4E. The fifth register relay group RR4 controls connections to individual corresponding ones of the fifth decoding relay group RD4 over conductors 5A—5E, and the fifth register relay group RR5 controls connections to individually corresponding ones of the sixth character decoding relay group RD5 over conductors 6A—6E.

Each character decoding relay group such as RD1 is arranged to complete a detection chain individual to each letter of the alphabet on the operation of individually corresponding ones of the various relays of the five relays such as 3810–3850. Thus a detection chain corresponding to the various letters is completed, when the decoding relays shown in the following chart are operated:

| Letters: | Relays |
|---|---|
| A | 3810, 3820 |
| B | 3810, 3840, 3850 |
| C | 3820, 3830, 3840 |
| D | 3810, 3840 |
| E | 3810 |
| F | 3810, 3830, 3840 |
| G | 3820, 3840, 3850 |
| H | 3830, 3850 |
| I | 3820, 3830 |
| J | 3810, 3820, 3840 |
| K | 3810, 3820, 3830, 3840 |
| L | 3820, 3850 |
| M | 3830, 3840, 3850 |
| N | 3830, 3840 |
| O | 3840, 3850 |
| P | 3820, 3830, 3850 |
| Q | 3810, 3820, 3830, 3850 |
| R | 3820, 3840 |
| S | 3810, 3830 |
| T | 3850 |
| U | 3810, 3820, 3830 |
| V | 3820, 3830, 3840, 3850 |
| W | 3810, 3820, 3850 |
| X | 3810, 3830, 3840, 3850 |
| Y | 3810, 3830, 3850 |
| Z | 3810, 3850 |

The third, fourth, fifth and sixth character decoding relay groups are each provided with a ground wired to the lower spring of contacts thereof corresponding to 3811 and to the upper spring of contacts thereof corresponding to 3851, whereas the second character decoding relays RD1 have ground furnished for its letter detection chain arrangement through contacts of a group of detecting relays associated with the fourth character decoding relays.

Each group of decoding relays RD1—RD5 has an individually corresponding group RF1—RF5 of detecting relays associated therewith. Each detecting relay corresponds to one letter and is controlled accordingly when the detecting chain corresponding to that letter is completed by its associated decoding relay group. As only the fourth, fifth and sixth character decoding relay groups RR3, RR4 and RR5 need complete detection chains for all twenty-six letters each of these groups must have at least twenty-six detecting relays such as A1–Z1 associated therewith. In the case of the third character decoding relays only fifteen letters need be decoded and therefore only fifteen detecting relays L–Z are provided in the detecting relay group RF2 associated with decoding relay group RD2. Lastly, in the case of the second character only eight letters need be decoded, and therefore only eight relays 3860—3895 individually corresponding to the eight different letters, designating the different tape relay networks, are used with the first decoding relay group RD1.

As each fourth character detecting relay must enable a circuit to be extended from any one of eight (RF1 detecting relay contacts) times fifteen (RF2 detecting relay contacts) possible contacts, each must control at least 120 make contacts. To reduce the number of make contacts operated by any one of these relays each fourth character detecting such as the A1 relay is provided with three auxiliary detecting relays A2–A4 of which only A4 is shown. Thus each of the four relays A1–A4 need only make a total of 30 contacts beside certain control contacts to enable relay A1 to control the additional three relays A2–A4 and to extend a detection chain ground to the second character detection chain of relay group RD1.

The circuits extended by contacts of the fourth character detection relays RF3 terminate in the patch panel 4100 shown in Fig. 41. From there they are extended by cords to the translator outgoing terminal patch panel 4200. As any one of a total of 3120 different circuits may be extended from the fourth character detection relay contacts, and as of the 100 outgoing lines provided for this relay center only some are extended to other relay switching centers such as USRN, etc., all stations accessible over the same outgoing line from this station such as USRN and RSQT, have common terminals on patch panel 4200 whereby corresponding circuits extended over the fourth character cables C3900A(41)—C3900Z(41) are tied together in the patch panel 4200. In addition certain stations having heavy traffic are provided with two or more outgoing channels or lines known as multi-channel circuits extending from the present station RUWP to stations such as RURD and RUWN for example. All such multi-channel circuits use the same terminal in panel 4200. The present switching center and its tributaries all have the same first routing characters, and when these characters are translated, a ground is extended through contacts of the fourth character detecting relays to a jack 4119 bearing the legend local on patch panel 4100. Fifth and sixth characters are only translated when the message is to be extended to a station tributary to the present switching center, as such translations for the tributary stations are useless.

The ground extended to the jack 4119, when routing characters corresponding to the present switching center are detected, is extended over conductor C4105(40) through contacts 4042 or 4051 of relays 4040 or 4050, respectively, depending on which if either is operated. This ground is then forwarded over the operated contacts of the operated fifth character detecting relay A'—Z', and if only five characters were received over one set of operated make contacts 4061A—4061Z of relay 4060 to one of the twenty-six conductors of the fifth character cable C4099(41) to a terminal in the panel 4100. As five character tributary stations need only be identified by any one of twenty-six fifth character letters only one set of make contacts is provided for each fifth character detection relay.

If a sixth character was received relay 4060 was not energized. The sixth character detection relays are each provided with twenty-six make contacts thereby extending the ground which is forwarded over contacts 4051 and the operated make contacts of the fifth character detecting relay group RF4 to one of the twenty-six conductors available to each of the operated sixth character detecting relay of the group A''—Z''. Ground from lead C4105(41) and contacts 4051 may thus be forwarded over any one of twenty-six times twenty-six outlets to 676 different terminals of the panel 4100. From panel 4100 the respective fifth and sixth character terminals are jacked to corresponding terminals of the outgoing terminal patch panel 4200, and in a manner similar to the switching center terminals, those utilizing the same outgoing line or a multi-channel circuit are strapped together. Thus as only twenty-six outgoing lines are provided to tributary stations of this relay center certain tributary stations are reached over the same outgoing line and one more of the tributary stations may serve as subswitching centers in a manner similar to this relay center.

If the message having the routing indication of the present switching center did not have a fifth and sixth character, the ground on lead C4105(41) is forwarded over contacts 4041 and 4052 to lead C4098(42) to operate relay 4210.

In detail a message routed to the present switching center or one of its tributary stations contains the routing indication RUWP. The first routing indicator character R is ignored as far as registration is concerned, as already explained, while the letters UWP are registered in the corresponding register relay group RR1—RR3. From there a corresponding marking is forwarded to the second, third and fourth character decoding relay groups RD1—RD3, respectively, over leads 2A'—4E' in a manner explained. Fifth and sixth routing characters are registered in decoding relay groups RD4 and RD5, respectively, over leads 5A'—5E' and 6A'—6E', respectively, in a similar manner to that above. In the case of the second character decoding relay group RD1 the registration of the letter U results in operating decoding relays corresponding to the operated register relays 3810. Thus relays 3820 and 3830 are operated, when the registered U is transferred to the decoding relays. In the third character decoding relay group RD2 the registration of the letter W operates relays coresponding to 3810, 3820 and 3850. The fourth character decoding relays corresponding to 3820, 3830 and 3850 are operated when the registered fourth character P is transferred thereto.

The operated fourth character decoding relays complete a detection chain circuit corresponding to the letter P to extend ground for operating relay P1 (not shown). It closes 30 sets of make contacts in addition to three sets of make contacts to prepare circuits to its auxiliary detecting relays P2—P4 (not shown), and it forwards ground from contacts corresponding to A1A to the detection chain contacts of the second character decoding relay RD1. This arrangement delays the operation of the second character detection relay such as 3880 until the fourth character detection relay P1, which is a bar relay and therefore relatively slow to operate, has operated.

The operated decoding relays 3810, 3820 and 3830 forward this ground over contacts 3851, 3821, 3831, 3849 and 3819 to operate the relay 3880, corresponding to U in the second character detection relay group RF1. It in turn forwards ground over contacts 3881, 3882 and 3883 to respective contacts P1B, P1C, and P1D (not shown) respectively and respectively coresponding to contacts such as A1D, A1C and A1B on relay A1. Relay P1 operates the auxiliary bar relays P2, P3 and P4 (not shown) in a manner similar to that described for operating relay A4 on closure of contacts A1B. These relays are operated by the second character detecting relays rather than relay P1, as it is undesirable to have the bar relay contacts absorb the heavy current surges necessary to the operation of bar relays P2, P3 and P4. Contacts 3884 individually coresponding to the operated second character detection relay 3880 forwards ground over one of the eight operated make contacts of the operated third character detection relay W (not shown), and over one of the total of 120 detection make contacts closed by relays P1, P2, P3 or P4 through a conductor in cable 3900P(41) (not shown) to a corresponding terminal of panel 4100. From there it is transmitted over local lead C4105(40) to contacts 4041, 4052 and over lead C4098 (42) to relay 4210, if a fifth or sixth character routing indicator was not registered. Relay 4210 operates to close contacts 4211.

Contacts 4211 extend ground through manually closed contacts 4401 on gang switch 4400, over lead C4499(35), previously operated make contacts 3514 to battery through relay 3560, which operates. It completes a circuit over contacts 3522 and 3562 to operate relay 3370, which controls the termination of the translator operation in a manner that will be explained. At contacts 3563 ground is forwarded over lead C3304(15), contacts 1545, lead C1501(27) and contacts 2713 to operate relay 2740, which initiates interception by an operator in a manner that will be explained.

In the event that relays 4040 and 4060 were operated indicating receipt of a five character routing indicator at the time ground appeared on local lead C4105(41), that ground is forwarded over the operated make contacts of one of the detection relays instead of to lead C4098 (42). A detection relay A'—Z' of group RF4 is operated in a manner similar to that explained on control of a corresponding relay in group RF4. The operated one of the relays A'—Z' operates only one set of make contacts of the group 1A'—26Z'. Ground is therefore forwarded only through the operated contacts such as 4061Z of the group 4061A—4061Z, and over an individually corresponding conductor of cable C4099(41) to a terminal individual thereto in panel 4100. From there the ground is cord connected through a translator outgoing switch panel terminal such as 4203, cabled over cable C4209 (44A) to an individually corresponding terminal such as T1' in the A row of terminals on terminal block 4480, terminal such as T1" in the B row of terminals, cabled over cable C4481(43) to battery through one of the code relays T1—T100 individual to the outgoing line over which the message is to be transmitted. The corresponding code relay then operates. If the desired station is accessible over two or more channels (multi-channel), the ground from terminal 4203 is connected for example from terminal T2' to the B wiper of switch MC1, over the contact upon which the wiper is standing, an individually corresponding terminal such as T2" in the B row of terminals of block 4480, cabled over C4481(43) to operate the code relay T1—T100 individual to the outgoing channel. Thus, one of the several lines or channels available, is selected for use in transmitting the message. The selection of an outgoing line of a multi-channel circuit will be explained in more detail.

In the event a sixth character was registered the relay 4050 is operated instead of relays 4040 and 4060. The ground from lead C4105(41) is therefore transmitted over contacts 4151, then through the one set of operated detection relay contacts 1A'—26Z' of the fifth character detection relays A'—Z'. The ground is then transmitted over only one set of the twenty-six operated detection relay contacts of the operated sixth character detection relay A"—Z" in the group RF5 instead of one conductor of cable C4099(41). The ground is then passed over an individually corresponding conductor of the sixth character cables C4097A(41)—C4097Z(41) to a terminal of the panel 4100 and from there to patch panel 4200, through terminal block 4480 and over level B of a switch such as MC1, if the desired station is on a multi-channel circuit, to operate one of the relays T1—T100 individual to an outgoing line of a multi-channel circuit over which the message is to be transmitted.

Likewise, it will be recalled that other relay switching centers or their tributary stations are identified by the ground transmitted over make contacts of the first three groups of character detection relays RF1, RF2 and RF3. The identifying ground is transmitted in a manner explained on a message to be transmitted to the present station, but instead of being passed to local lead C4105(40) it is passed to an individual terminal of panel 4100 and from there through a terminal in panel 4200 in a manner similar to that explained to one of the code relays T1—T100 individual to the outgoing line over which the message is to be transmitted.

Operation of any one of the relays T1—T100 completes a circuit from contacts such as T1A, over correspondingly operated make contacts 4411A—4411J of the bar relay 4410, through manually closed contacts such as 4407, etc. of gang switch 4400 and over one of the ten leads TG1(34)-TG10(34) to a corresponding one of the ten route group relays RG1-RG10. It also completes a circuit at contacts such as T1C, over correspondingly operated make contacts 4412A—4412Y of the bar relay 4410, through manually closed contacts such as 4408, etc. on switch 4400 and over one of the 25 leads TT1(34)–TT25(34) to one of the twenty-five route terminal relays RT1–RT25. In addition, from contacts such as T1G, ground is forwarded over one of the three speed control leads indicative of the speed at which transmission takes place at the selected outgoing channel through one set of manually closed contacts such as 4251 on gang switch 4250 and over a corresponding one of the leads C4283(35), C4284(35) or C4285(35), contacts 3518, 3517 or 3516, respectively, and contacts 3459', 3458' or 3459, respectively, to relays 3595, 3590 or 3580 to operate the corresponding one of these relays to provide a speed test. The operated one of the speed control relays 3580, 3590 or 3595, respectively, locks operated over its respective contacts 3581, 3591 or 3596 to ground on lead C1301(13). At contacts such as T1H, the operated code relay extends ground over contacts 4241 to operate relay 4250 for no purpose on a first translation.

To insure that any one of the operated outgoing channel code relays T1—T100 does not correspond to the incoming channel, ground from the wiper of the K level of switch MMIF is forwarded over a contact and conductor individual to the incoming line with which it is associated. The conductor is cabled through cable C1690(18) to an individually corresponding set of make contacts on operated bar relay 1850 so that the ground is forwarded over one of the leads 1L1(41)—1L25(41) through individually corresponding manually closed contacts such as 4194 on gang switch 4190 and over the corresponding one of the leads R1—R100 individually corresponding to the different incoming lines, through terminals individual thereto in the translator auxiliary patch panel 4201. From there the ground is forwarded to the make contacts such as T1E of the code relay T1—T100 corresponding to the incoming line. If that code relay is operated the ground is then forwarded over contacts 4401 and lead C4499(35) to operate relay 3560 as before described. This will result in interception by an operator as will be explained.

For night intercept an operator manually closes night intercept switch contacts such as 4299 individually corresponding to an outgoing line which is to receive night intercept service. It will be recalled that ground was extended by the register over lead C2296(25) on operation of any one of the four highest precedence registration relays 2140, 2170, 2210 or 2240 and through contacts of relay 2560 to lead C2599(37). This ground is extended through contacts 3704 on gang switch 3701, over lead C3799(42) to operate relay 4230, which closes contacts 4231. Any operated code relay T1—T100 corresponding to an outgoing channel or line now extends ground from contacts such as T1D to the night intercept switch contacts such as 4299, and if they are closed as mentioned above, the ground is forwarded through operated make contacts 4231, contacts 4413 of bar relay 4410, manually closed contacts 4404 on switch 4400, lead C4498(35), contacts 3512 and 3457 to operate relay 3540. This will route the call to an intercept position as will be explained, while at contacts 3544 a circuit is completed to relay 3370 over contacts 3541 to initiate register translator disconnection.

In addition, if traffic on a channel or outgoing line is to be interrupted to permit repairs, a cord such as 4209 connects the corresponding terminal on panel 4200 to the intercept jack 4205 on panel 4200 so that the ground from the detecting relay contacts corresponding to any station using the outgoing line is forwarded directly over operated contacts 4413 on bar relay 4410 to operate relay 3540 in a manner similar to that described and for the same purpose. The ground from jack 4205 is also extended to operate relay 4220 for no purpose on a first translation.

It will be recalled that each relay corresponding to a channel or line of a multi-channel circuit is connected through contacts of a switch such as MC1 and the wiper to the detecting chain ground of the translator. Assuming for instance that the multi-channel circuit comprises four channels as shown for switch MC1. The contact individually corresponding to the coding relay and therefore one channel of switch MC1 is multipled to every fourth contact. As only eleven contacts are provided on the switch the channel appears at two places on the switch. Contacts are multipled to save time in finding the desired channel. On the A level the contacts corresponding to those on the B level, which are not multipled, are multipled to self-interrupting break contacts of the motor magnet of switch MC1. The wiper of level A forwards ground and when on any one of the multipled contacts energizes the motor magnet of switch MC1 over the self-interrupting break contacts of the motor magnet. The motor magnet energizes and opens the break contacts to deenergize itself and step to the succeeding contacts. In this fashion it is stepped past the unused contacts to the first contact corresponding to a channel of the multi-channel circuit. When decoding relays corresponding to a channel of the multichannel circuit operates it closes contacts such as T2F to forward ground to a contact of terminal block 4459. The contact on terminal block 4459 corresponding to each channel of the multi-channel circuit having access to the same station is multipled together on the terminal block and from there extended to self-interrupting make contacts of the motor magnet of a multi-channel switch such as MC1. When contacts T2F are opened the switch is stepped to a contact corresponding to another channel of the multi-channel group. When the motor magnet is energized by ground pulse over a lead such as C5001(50) during the time a register conducts a cross office test in a manner which will be explained, the make contacts are closed and the motor magnet is held energized until the coding ground and the cross office test ground are both removed if the coding ground is also provided. This prevents the switch from being stepped during the translation and disturbing the same. In any event the switch will be stepped as a result of ground over lead C5001(50) on a cross office test to cause the motor magnet of the switch to advance the wipers one position and thereby select a coding relay corresponding to another channel of the outgoing multichannel circuit. This distributes traffic evenly over the channels of the multi-channel circuit.

For a multi-channel circuit comprising eleven or more outgoing channels additional levels are provided. Thus for example switch MC2 comprises an A level for selecting which group of circuits of the multi-channel circuits should be used, while the B level extends the detecting chain translator ground over contacts corresponding to either levels D or F, and the wiper of that level forwards ground over the contact that it is on to the corresponding coding relay. Thus contacts on levels A and B of switch MC2 are multipled to respective alternative contacts so that levels C and D are controlled in one position and levels E and F controlled in the alternate position. If more than twenty channels are provided additional levels are provided and the contacts of levels A and B of switch MC2 are multipled in every third position to distribute the traffic accordingly.

*Register translator disconnect*

Relay 3370 in the register operates under control of either relays 3540 or 3560, as previously explained. It also operates from ground over contacts such as RG1C and RT1C controlled by the operated route register relays such as RT1 and RG1. Relays RG1—RG10 correspond to different groups of outgoing channels and relays RT1—RT25 correspond to the various different channels or terminals in any group of outgoing channels. Thus a total of 250 outgoing terminals may be selected, but as only 100 outgoing channels are provided only one of the first four of the group relays RG1—RG4 are operated on operation of a code relay T1—T100. Leads such as TG5—TG10 are either not used or are cord connected in a suitable manner to leads such as TG1—TG4 to operate the desired ones of the relays RG1—RG4. The operated terminal register relays initially lock operated over contacts such as 3452A and RT1A to ground over contacts 3351 and 3372, while the operated group register relay initially locks operated over contacts such as 3453A and RG1A to ground over contacts 3351 and 3372. These relays also find ground over such contacts as RT1B and RG1B, respectively, through relays 3530 and 3520, respectively, and lead C1303(13). In the event relays 3540 or 3560 are operated the translator ground for operating the same is also extended over contacts 3543 or 3561, respectively, and the B contacts of the operated route register relays to hold the same operated. Relay 3540 or 3560, if either is operated, in turn also receives ground over contacts 3543 or 3561, respectively, relay 3520 and lead C1303(13).

Relay 3370 on operating opens the circuits to relays 3410 and 3510 at contacts 3371; opens the initial holding circuit for the operated route register relays RG1—RG10 and RT1—RT25 at contacts 3372, completes its own holding circuit at contacts 3373 from ground on lead C2699(26) and opens the holding circuit of relay 3340 at contacts 3376 to restore relay 3340. Contacts 3372 opening also remove a ground for the translator decoding relays RD1—RD5, which was forwarded through contacts of the operated register relays RR1—RR5. At contacts 3375, the lower winding of relay 3360 is disconnected from lead C3360(37) extending through the translator switch MMDF to relay 3740, and at contacts 3378 it connects ground to lead C3307(24) to hold relay 2430 operated by energizing its upper winding over contacts 2433. At contacts 3377, it removes the holding ground for the bar relay 4410 of the translator, which restores to disconnect any ground forwarded from the contacts of the code relays T1—T100 to the route register relays RG1—RG10 and RT1—RT25; relays 3540 and operated one of the speed control relays 3580, 3590 or 3595. At contacts 3379, it disconnects lead C3306(24) from lead C1302(13) thereby restoring relay 2440. At contacts 3378' it disconnects ground from lead C3308(25) to restore bar relay 2560, which disconnects the contacts of register relays RR1—RR5 from gang switch 3701 and the translator decoding relays RD1—RD5. At contacts 3377' it deenergizes the lower winding of relay 3320, and at contacts 3379' it deenergizes relay 1850 by removing ground from lead C3309(18).

Relay 3320 which operated initially from ground over contacts 3377' and 3366 opens the circuit to slow-to-operate relay 3330. Relay 3330 had completed a circuit over contacts 3331 from slow-to-release relay 3310 from ground on lead C1302(13). Relay 3310 at contacts 3314 had disconnected one source for furnishing ground to lead C3306(24). At contacts 3314 it lights lamp 3327. At contacts 3313 it opened a possible circuit for operating relay 3370. At contacts 3311 and 3312 it opened a possible circuit to the lamp 3359 and at contacts 3315 it opened a possible holding circuit for the upper winding of relay 3320. If the translator operation is not completed within a predetermined time to restore relay 3320, relay 3330 will restore, and open contacts 3331. This will restore relay 3310 thereby causing the completion of a locking circuit over contacts 3315 and 3325 to the upper winding of relay 3320. At contacts 3322 it will then forward ground from contacts 3313 to operate relay 3370, and at contacts 3331 extend ground for lighting lamp 3359 and over lead C3304(15) for a purpose already mentioned.

Translator decoding relays RD1—RD5 restore to restore any operated detecting relays of groups RF1—RF5, and they in turn remove the detection chain ground for maintaining operated a code relay of the group T1—T100 or relay 4210 so that the operated relay restores. Likewise relay 4230, if operated, restores. Relay 3740 restores when contacts 3375 open to remove the battery extended thereto from the lower winding of relay store the upper winding of relay 3360, and as that relay's 3360. Relay 3340 in the Terminal Register 3300 on restoring in a manner explained opens contacts 3342 to relower winding is restored, relay 3360 restores its contacts. Relay 3360 restoring, opens contacts 3362 to restore relay 3350. Lead C3360(37) now forwards ground from contacts 3352 and 3374 to enable translator switch MMDF to be stepped, if relay 2750 in the translator is operated by ground on lead C3301(37) from another register. At contacts 3346 lead C3301(37) in this register is disconnected from ground before it can be applied thereto at contacts 3365.

Relay 1850 on restoring in a manner explained, opens contacts 1851A—1851Y to disconnect the translator incoming-outgoing channel check leads IL1—IL25 extending to the translator from level K of switch MMIF. Relay 2440 restoring due to the removal of ground from lead C3306(24), opens the circuit to relay 2310 at contacts 2441 and relay 2310 restores to reconnect the reader sensing leads 1—5 and 8 through leads 1701—1706 and contacts 2319', 2317', 2319, 2317, 2315 and 2313, respectively, back to the precedence sensing relays 1910—1960, respectively, over leads C2301(19)—C2306(19), respectively. It disconnects the routing register sensing relays 2320—2370, respectively, at contacts 2318', 2316', 2316, 2314, and 2312. At contacts 2443 the holding circuits to relays 2420 or 2410, respectively, if operated, is opened. They restore to open another point in the already incomplete original operating circuit for the translator relays 4040 or 4050, respectively, over leads C2498(37) or C2499(37), respectively. If relay 4040 was operated, its restoration opens the circuit to relay 4060, which restores. At contacts 2441 relay 2440 also restores the operated route register relays of groups RR1—RR5. These in turn open contacts such as 2511—2691 to remove ground from lead C2699(33) and thereby remove the holding ground for relay 3370. At contacts such as 2513 another point in the original operating circuit for the translator decoding relay is opened. Also at contacts such as 2511—2691 a ground for operating the lower winding of relay 2430 is removed, however that relay remains operated by the ground furnished through contacts 2433, lead C3307(33) and contacts 3378 to its upper winding.

With bar relay 4410 restored as explained, one ground if on either leads C4498(44) or C4499(44) is removed from the left side of relay 3520, while with contacts 3372 open, another ground shunting both relays 3520 and 3530 is removed. Relay 3520 now operates from battery through the operated route group relay such as RG1 and contacts RG1B to ground on lead C1303(13). Relay 3530 operates from battery through the operated route terminal relay such as RT1 and contacts RT1B to ground on lead C1303(13). Relays 3520 and 3530 complete a circuit for the transfer relay 3450 from ground over contacts 3521 and 3531. If either relay 3540 or 3560 is operated, it remains operated in series with relay 3520 over a holding circuit including ground on lead C1303(13) as previously explained. If a route terminal register relay was not operated under the latter circumstances relay 3520 operates, while relay 3530 does not. Relay 3540 prepares an alternate circuit to the transfer relay 3450 at contacts 3542, and this circuit is completed over contacts 3521 on operation of relay 3520. Without the operation of a route group and terminal relay or operation of relay 3540, the transfer relay 3450 is therefore not operated. In addition operated relay 3520 opens a circuit for operating relay 3370 over 3562 at contacts 3522 and if relay 3370 is operated in this manner alone, it restores.

Operation of the transfer relay 3450 opens a circuit to relay 3370 at contacts 3451 and as soon as the aforementioned holding ground is removed from lead C2699 (26). Relay 3370 on restoring opens contacts 3378 to remove ground from lead C3307(24) to restore relay 2430. At contacts 3379 it again forwards ground from lead C1302(13) to lead C3306(24) to reoperate relay 2440 for no purpose now. At contacts 3375 it now forwards ground from contacts 3343 to the bank contact of switch MMDF corresponding to this register. On restoration of relay 2430 ground is removed from lead C2398(15) at contacts 2431 to restore relay 1510. This recompletes the reader clutch magnet circuit at contacts 1511 to operate the reader clutch magnet MM1. The reader now begins to again read the tape. In the discussion immediately following it will be assumed that a line feed D sequence of characters is now read to indicate that the last routing indicator has been processed. If more than one routing indicator is included in the message further operations take place which are discussed in the following portions of the specification pertaining to multiple route or multiple call messages.

*Routing indicator termination indication*

When the reader sensing leads are reconnected to relays 1910—1960, and the reader again operating, the line feed character next sensed operates relay 1920. It completes a detection chain circuit over contacts 1937, 1928, 1916, 1956, 1948, 1975 and 2021 to the winding of relay 2010, and it operates. At contacts 2911 it prepares a holding circuit for itself through the upper winding of relay 2020 which circuit is effective, on release of relay 1960 as contacts 1962 then close. At the end of the sensing cycle the detection chain ground is removed and the upper winding of relay 2020 energizes in series with relay 2010 to open the original circuit for relay 2010 at contacts 2021. Following the line feed sensing cycle, a D is next sensed by the reader, and relays 1910 and 1940 operate accordingly. A detection chain circuit is now completed over contacts 1937, 1929, 1917, 1945', 1957 and 2022 to energize the lower winding of relay 2020. Relay 2010 and the upper winding of relay 2020 restore when relay 1960 opens contacts 1962, and they remain restored on release of relay 1960 as contacts 2011 are now open. At the end of the sensing cycle ground is removed from contacts 2022 and relay 2030 energizes in series with the lower winding of relay 2020 from ground on lead C1304(13) forwarded over contacts 2012 and 2024. If a letter shift character precedes the D, the letter shift detection chain ground from contacts 1918, 1927', 1938, 1946', 1958 and 2011 hold relays 2010 and 2020 operated during the sensing of that character.

Relay 2030 closes contacts 2031 and 2032 to ground leads C2098(15) and C2099(27), respectively. Ground on lead C2098(15) energizes the lower winding of relay 1510, which opens contacts 1511 to stop the reader clutch magnet MM1 as previously described. Ground on lead C2099(27) is extended over contacts 2711 to operate relay 2720.

Relay 2720 locks to ground over contacts 2723 and lead C1305(13). At contacts 2721 it connects ground to relay 2710, which operates. At contacts 2722, it provides another holding ground for relay 1510 over lead C2098(15). After relay 2710 operates the original operating circuit for relay 2720 is opened at contacts 2711, however relay 2720 remains operated over contacts 2723. Ground is also extended from contacts 3049, 2815, 2772 and 2764, through contacts 2714 and 2724 over lead C2799(35), contacts 3532 (with relay 3530 operated) and 3546 (with relay 3540 unoperated, lead C2290(22), over any operated set of make contacts such as 2061 of the low precedence register relays such as 2060, 2110 or 2140 to the low precedence lead C2293(29), or over contacts such as 2171, 2211 or 2241 if any one of the high precedence register relays 2170, 2210 or 2240 was operated and then to high precedence lead C2291(29). Ground on lead C2293(29) operates relay 2920 over contacts 2934 to control the search for a preset cross office unit, and ground on lead C2291(29) operates relay 2940 over contacts 2954 to control the search for an empty cross office unit.

With relay 3540 operated ground on lead C2799(27) is forwarded from contacts 3532 and 3545 to lead C3599(27), contacts 3034 to operate relay 3020 to control the search intercept position. If relay 3530 is not operated at the time relay 3540 is operated, the ground on lead C2799(27) is forwarded directly over contacts 3533 to lead C3599(27) to operate relay 3020, while contacts 3546 are open to prevent ground being passed over lead C2290(24) and then to a precedence lead. With relay 3560 operated instead of relay 3540, at the time ground is forwarded from lead C2799(27), it is passed over contacts 3533 as before, to operate relay 3020 or with relay 3530 also operated, the ground on lead C2799(27) is passed over contacts 3532 and 3546 and lead C2290(22) to either the high or low precedence leads C2291(22) or C2293(22), respectively, to operate either relay 2920 or 2940, respectively, depending on the precedence, all in a similar manner to that explained above. At this time it will also be noted that relay 2740, if operated in one of the manners already described, operates relay 2710 at contacts 2741. Ground instead of being forwarded from contacts 3049 over lead C2799(35) in a manner explained, is now forwarded over contacts 2725, 2744 and 3034 to operate relay 3020 which controls the search for an intercept position.

*Preset cross office test*

If the message has one of the three low priority designations and relay 3540 is not operated, relay 2920 in the Sequence Control Unit 2700 is operated, as explained. It will be recalled that relay 3560 on operating operated relay 2740 immediately. Relay 2740 in turn operates relay 2710, which in turn prevents the completion of a circuit to relay 2720 and therefore relay 2920. In the event relay 2920 is operated, it controls a test for a preset cross office unit, that is a cross office unit having the desired degree of precedence and having an outgoing selector switch set to the desired outgoing channel. At contacts 2921 it lights the present cross office test lamp 2919. At contacts 2923 it completes a locking circuit for itself through the upper winding of relay 2933 and contacts 2943 to ground on lead C1305(13). It extends ground from contacts 2926, through contacts 2934' to relay 2820, which operates. Relay 2820 grounds lead C2796(45) over contacts 2825 and 2753 to demand that the Common Control Register Assigner 4500 allow this register to test for a cross office unit. Lead C2899(46) is switched from ground through contacts 2823 and 2813 to battery through contacts 2824 and relay 2750 to mark this register to a searching common control register assigner switch MMDA1 or MMDA2. Lead C3172(31) extending to ground at contacts 3121 in each Cross Office Finder Unit 3100 associated with this register is now connected over contacts 2822 and 2812 to resistance battery at the right side of relay 2810. Relay 2810 is thus prevented from operating from any ground extended over contacts 2762 and lead C2792(31) to contacts such as 3122 in the cross office finder units. At contacts 2821, relay 2820 prepares an operating circuit for the register supervisory relay 1560 in the Register Supervisory Unit 1300.

The gound on lead C2796(45) is forwarded over the wiper of level B of switch MMA1 in the Common Control Register Assigner 4500, through the multipled odd or even contacts, respectively, depending on which type of contact the switch wipers are associated with, to either relay 4620 or 4650, respectively.

Relay 4620 controls switch MMDA1, while relay 4650 controls switch MMDA2. Each is a three level switch having contacts terminating leads such as C2899(28) individual to each register. Each switch can search ten registers per level and with each level and each contact tested successively a total capacity of 30 registers is provided although less, for example, are used in the present arrangement. One contact on the last level, as is any unused contact, is grounded to enable the switch to step to its first or another position, respectively. Thus with relay 4620 operated contacts 4622 open and relay 4630 starts to restore, but is held operated for a time by its associated A.C. circuit. Contacts 4621 close to extend battery from the motor magnet of switch MMDA1, through the motor magnet self-interrupting contacts, contacts 4621 and 4612 and through the wiper of switch MMDA1 standing on a contact individual to one of the registers or connected directly to ground, respectively. The battery is forwarded over the contact and over a lead such as C2899(28) to ground over contacts such as 2823 and 2813 in a register not demanding the assigner. The battery is also forwarded from contacts 4612 through the upper winding of relay 4610, contacts 4666 and the odd multipled contacts and wiper of level C of switch MMA1 to ground. The motor magnet of switch MMDA1 therefore steps its wipers in a self-interrupted manner. Relay 4610 remains shunted by the ground at the switch wiper.

In this case the register individual to lead C2899(28) had demanded the assignment of a cross office unit, and therefore battery was connected to lead C2899(28) from contacts 2824 through the winding of relay 2750, as before explained. When the motor magnet of switch MMDA1 finds the battery on lead C2899(28), it remains unoperated. The battery energizes the upper winding of relay 4610 from ground on its other side, but relay 2750 through which battery is furnished for this circuit operates only in series with the low resistance lower winding of relay 4610, which is now connected at contacts 4611. At contact 4615, relay 4610 opens the incomplete circuit extending from the even multipled contacts of switch MMA1 level B to the upper winding of its counter part relay 4660. This prevents another register, which may shortly use the switch MMDA2, from allowing the assigner to operate a relay such as 2750 in the other register or relay 4660. The circuit to normally operated relay 4640 is opened at contacts 4614, however it does not release immediately due to the effect of the A.C. circuit connected thereto. At contacts 4613 relay 4630 is held operated, before it can restore. At contacts 4616 ground is forwarded over key contacts 4521, the multipled odd contacts of switch MMA1 level A to the switch motor magnet through its self-interrupting contacts. The magnet steps the switch one position to its multipled even contacts in a self-interrupting manner. By stepping off its odd multipled contacts the circuit to relay 4620 is opened at the B switch level and it restores to recomplete the original circuit for relay 4630 and open another point in the circuit to the motor magnet switch MMDA1.

If relay 4640 should restore, it closes contacts 4641 to energize relay 2760 over lead C46699(27) and contacts 2752. At contacts 2761 it extends ground over lead C1569(15) to operate relay 1530. At contacts 2762, it opens a possible circuit to relay 2810, and also opens contacts 2764 used to operate relay 2920. Relay 1530 operates relay 1520 at contacts 1531. At contacts 1532 it restores relay 1560, and at contacts 1534 restores relay 1570. At contacts 1533 it maintains relay 1320 operated. Relay 1520 locks operated over contacts 1524 and 1487, and extends various signal circuits at contacts 1521, 1522 and 1523.

Another register may now initiate a search by switch MMDA2 in a manner explained for switch MMDA1 on forwarding ground over lead C2796 which is multipled to odd registers. The ground is forwarded over the even multipled contacts of level MMA1 to operate relay 4650 in a manner similar to that just described for operating relay 4620. Relay 4650 operates for the same purpose as relay 4620 and opens the original circuit for relay 4630 at contacts 4652, which remains energized over contacts 4613. Switch MMDA2 cannot stop on the register holding switch MMDA1, as the low resistance ground from the lower winding of relay 4610 provides an idle marking therefor on the switch bank contact. It can stop on the contact of another demanding register, as battery is furnished thereby. As before explained the relay corresponding to 2750 in the other register cannot operate nor can relay 4660, until the present register has completed certain functions. This prevents the other register from interfering with a cross office test by this register.

If relay 4610 or 4660, depending on which switch is searching, fails to operate within the time required for the restoration of relay 4630, that relay restores. It closes contacts 4631 to complete a circuit for energizing the right winding of relay 4510. That relay completes a circuit to its left winding over contacts 4511 and key contacts 4519. At contacts 4512 it operates various alarms.

Relay 2750 operates through the low resistance lower winding of relay 4610, and it prepares leads C2794(34), C2793(34) and C2090(20) for a ground connection. At contacts 2752 it prepares a circuit to relay 2760, which will only be completed, if the register does not complete its test, before relay 4640 restores to close contacts 4641 and extend ground over lead C4699(27). At contacts 2753 it opens a point in the operating circuit for relay 4620.

At contacts 2751, ground from contacts 3121 and lead C3172(28) is extended from contacts 2821, over lead C2795(15), through the winding of relay 1560 and contacts 1532 to battery, thereby energizing relay 1560. It closes contacts 1563 to forward ground over lead C1599(31) to operate the bar relay 3110 in each of the Cross Office Finder Units such as 3100 associated with this register. The number of cross office finder units provided in this system for use with the registers is dependent on the number of units such as cross office units and cross office intercept positions in the system to which a message may be routed at this time. Each cross office finder unit serves a total of twenty-five such cross office units or cross office intercept positions and therefore each bar relay such as 3110 controls 25 register relays L1–L25 individually corresponding to one cross office unit or cross office intercept unit. Each relay such as 3110 connects the 25 register relays such as L1–L25 to leads such as C3174–C3199, respectively, extending to the individually corresponding Cross Office Units and Cross Office Intercept Units. It also energizes an associated slow-to-operate relay such as 3120 for a purpose to be described.

In the meantime relay 1560 closes ground to lead C1598(28) at contacts 1562. This ground is forwarded over contacts 2816 to contacts 2935, 2936 and 2937, respectively, and over previously operated contacts 2928, 2929 and 2929', respectively, through unoperated contacts 2738' to previously operated contacts 2758 and lead C2793(34); through unoperated contacts 2737' to previously operated contacts 2757 and lead C2794(34) and through previously operated contacts 2757' to lead C2090(20), respectively.

The ground on lead C2794(34) is forwarded through the operated make contacts such as RG1F of the operated one of the route group of relays RG1—RG10 in the Terminal Register 3300, over the individually corresponding lead GP1(47) of leads GP1(47)—GP10(47). These leads are multipled to similar route group relay contacts in other register Terminal Register Units. The ground on lead C2793(34) is simultaneously forwarded through make contacts such as RT2E of the operated one of the route terminal relays RT1—RT25 in the Terminal Register 3300 over the corresponding lead of the leads S1(47)—S25(47). These leads are also multipled to similar route terminal relay contacts in other register Terminal Register Units. The ground on the GP lead is forwarded to a relay such as 4720 in a Terminal Test Access Unit such as 4700 individual to the GP lead such as GP1. Ground on other leads are forwarded to other Terminal Test Access Units such as 4710 which individually correspond to groups of terminals or outgoing channels. As each controls 25 terminals, four such Terminal Test Access Units are provided in the present 100 line system, although ten are indicated herein. Each relay such as 4720 in each Terminal Test Access Unit controls a total of 25 make contacts individually corresponding to individual terminals. The ground on one of the leads S1(47)—S25(47) is forward to individual corresponding make contacts of each Terminal Test Access Unit where it is controlled only by the operated relay such 4720 of the selected Terminal Test Access Unit such as 4700. On operation of the terminal test access relay 4720 the ground from the one of the leads S1—S25 is connected through a corresponding make contact such as 4721 to a corresponding terminal such as 4781 on terminal block 4780. If the selected terminal corresponds to a single channel circuit, it is extended from terminal 4781 to terminal 4782, over lead C4751(48) to a bank contact corresponding to the outgoing channel on each Outgoing Selector Switch such as 4800 having access to the group of outgoing channels with which the desired outgoing channel is associated.

If the grounded terminal test access contact, for example, 4722 corresponds to a multi-channel outlet, it is extended to terminal 4783 on block 4780, strapped to terminal 4784, extended to the translator over lead C4752(50), break contacts such as 5071 to break contacts such as 5012 on the multi-channel busy relay 5010, lead C5001(44A) through manually closed contacts 4491A and through a terminal on terminal block 4495 to energize the motor magnet of switch MC1. When the ground is removed the motormagnet deenergizes to step its wipers.

In the case of a multi-channel circuit, therefore, the register will not receive an indication from an available preset cross office unit set to one of the channels that it is available. An empty cross office unit is then seized in a manner to be explained. Thus instead of piling up messages in one cross office unit, which is preset to a desired multi-channel circuit, all empty cross office units having access to the desired channel are tested first in a manner to be explained. If the multi-channel busy relay such as C5010 is operated indicating all the desired outgoing channels are busy, the ground on lead C4752(50) is forwarded through contacts 5013, through straps on terminal block 5090 to leads such as C5002(48) and C5002A extending to respective bank contacts of each outgoing selector switch set to a channel of the multi-channel circuit. The ground is then forwarded over conductor C4801(59) to enable the register to conduct a test for a preset cross office unit set to a channel of a multi-channel circuit.

The ground on lead C2090(20) extending to the Precedence Register 1900 is forwarded over the operated make contacts such as 2062 of the operated one of the low precedence designation register relays such as 2060, 2110 or 2140 and then over either leads C2091(49), C2191(49) or C2192(49) respectively, extending to the Cross Office Test Unit 4900 in the Common Control. Whichever lead has the ground thereon extends that ground to a corresponding precedence relay such as 4950, 4960 or 4970 respectively, and individually corresponding to the low precedence designations MM, RR and PP, respectively. One of these relays, which is indicative of the precedence designation of the message, therefore operates. To reduce the current over any one set of contacts, each of these relays, when operated, extends ground from four sets of make contacts, over four individually corresponding leads, which are in turn multipled to a total of ten Cross Office Units. Therefore as many Cross Office Test Units such as 4900 having each type of the aforementioned precedence designation relays multipled to the respective leads C2192, C2191 and C2090 is provided, as necessary to serve all Cross Office Units provided in the system.

The operated relay of the three precedence designation Cross Office Test Unit relays 4950, 4960 or 4970 closes ground at contacts such as 4952—4955, 4962—4965, or 4972—4975 to four leads such as C4991(57), 4992(57) or C4993(57), respectively. The ground is extended to an individually corresponding contact on level B of each switch such as MMPR1 (Fig. 57) in each of the Cross Office Units such as 5400. With the wiper of level B of that switch on the contact having ground forwarded thereto, that ground is forwarded over lead C5799(59), contacts 5953 and 6057 to operate relay 5960.

In the meantime ground was forwarded over leads such as C4751(48) in the case of a single channel, or over leads such as C5002(48) in the case of a multichannel circuit (with all outgoing channels busy) to a contact individually corresponding to the outgoing channel on each outgoing selector switch having access to a group of channels associated with the desired channel. If an outgoing selector such as 4800 is associated with the desired outgoing channel its wipers are connected to the individually corresponding contacts. The ground is therefore forwarded over a lead such as C4801(59) of such outgoing selector switch set to the desired channel to the lower spring of contacts such as 5961 in the unit. If relay 5960 in the cross office unit has operated as explained, contacts 5961 are closed to forward the ground through contacts 6032, through the operator's toggle switch contacts 6001, individual to the cross office unit and over a lead such as C3174(31) individual to each Cross Office Unit such as 5400. Lead C3174(31) forwards the ground past corresponding make contacts on one of bar relays 3110 in a Cross Office Finder Unit such as 3100 to an individually corresponding register relay such as L1. A ground from a number of preset cross office units may thus be extended to individually corresponding relays in the group L1—L25 in each Cross Office Finder. The register relays L1—L25 having ground extended thereto energize from the resistance battery on their respective right sides.

Each operated L relay locks to ground over its make contacts such as L1C and ground at the operated make contacts of its associated bar relay 3130. At contacts such as L1A, it extends ground over lead C3173(28) to prepare a circuit for relay 2770 in the register Sequence Control Unit 2700. At contacts such as L1B it operates relay 3210. At contacts L1D it extends resistance battery to its corresponding contact on level B of switch MMCO2.

After a delay long enough to ensure that its associated register relays have operated as described, slow-to-operate relay 3120 operates to remove ground from lead C3172-(28), and extends it to lead C2792(27) at contacts 3122, whence it is forwarded to the left side of relay 2810 through contacts 2762. When all Cross Office Finder Relays such as 3120 are operated and all grounds on lead C3172(31) have been removed, thereby removing the shunt ground on relay 2810, the ground on lead C2792(31) operates relay 2810 from resistance battery on its right side. At contacts 2812 relay 2810 prevents the re-application of the shunt ground from lead C3172(31) to itself. The removal of this ground from lead C3172(31) also removes ground from lead C2795(15) to restore relay 1560. It opens the circuit to relays such as 3110, which in turn restores relays such as 3120. It completes a circuit from ground on lead C3173(31) to relay 2770 at contacts 2811. At contacts 2815, relay 2810 opens a point in the original operating circuit for relay 2920. Relay 2920 remains energized over its holding circuit through the upper winding of relay 2930, which also energizes now. It opens the circuit to relay 2820 at contacts 2943, which in turn opens the circuit to relays 2750 and 4610. Relay 2770 locks operated over contacts 2771 to ground on lead C3173(31), and opens another point in the original operating circuit to relay 2920 at contacts 2772. This ensures that the original circuit to relay 2920 is not completed when relay 2810 restores to close contacts 2815. At contacts 2813 a point in the circuit for furnishing ground to the Common Control Register Assigner 4500 is maintained open, until both relays 2810 and 2820 restore to close contacts 2813 and 2823, respectively. At contacts 2814 battery is maintained on lead C2899(46) to the corresponding respective bank contacts of assigner switches MMDA1 and MMDA2. This is done to ensure that the assigner circuit does not allow another register to test until all the cross office finder bar relays have released. At contacts 2816 the cross office test ground forwarded from lead C1598(15) is removed to release the operated terminal test access relay such as 4720 in Terminal Access Unit 4700, and the operated precedence designation relay such as 4950, 4960 or 4970 in the Cross Office Test Unit 4900. If the outgoing channel was a multichannel circuit the release of relay 4720 deenergizes the motor magnet of the corresponding translator multichannel switch such as MC1 to step it one position and cause the coding relay of another channel of the circuit to be operated on a succeeding translation.

Ground removed from lead C3172(28) by relay 3120, which was extended over contacts 2822, 2821 and 2751 to lead C2795(15), causes relay 1560 to be deenergized. It in turn releases the cross office finder bar relays such as 3110, which in turn releases the associated relays such as 3120. When all relays such as 3120 have restored the ground from contacts 3122 and lead C2792(27) is removed from relay 2810 and it restores.

Operated relay 3210 in each Cross Office Finder Unit 3100 completes a self-interrupted stepping circuit for the motor magnet of its associated switch MMCO2 over contacts 3211 and the level B switch wiper, if it is connected to ground at contacts such as L1E on one of the unoperated register relays L1—L25. At contacts 3213 it disconnects ground from lead C3202(18) extending to bank contacts on switch MMCO1. The bank contacts of switch MMCO1 individually correspond to the different Cross Office Finders. Relay 3210 connects battery thereto through relay 3220 at contact 3212 to permit switch MMCO1 in the Finder Relay Unit 1600 to halt when it finds a Cross Office Finder having an operated L register relay. At contacts 3214 it connects ground to lead C3201(17) to operate relay 1740, which initiates the operation of switch MMCO1. Switch MMCO1, as mentioned above, is stepped in a self-interrupted manner until the wiper of level B finds resistance battery over the contacts such as L1D corresponding to an operated one of the register relays L1—L25. Battery then extended through the wiper of level B to shunt the motor magnet of switch MMCO2 and prevent its further operation.

In the meantime ground at contacts 3214 is extended over lead C3201(17) to operate relay 1740. Relay 1740 closes contacts 1741 to extend ground from contacts 1822, the switch MMCO1 wiper and associated contact connected to a lead such as C3202(32) which in turn may have ground connected thereto at contacts 3213 in the corresponding Cross Office Finder Unit to the self-interrupting contacts of the motor magnet of switch MMCO to battery. Ground is also furnished to the motor magnet from the upper winding of relay 1820 which is now connected to the motor magnet over contacts 1822 and 1741. The motor magnet of switch MMCO1 therefore energizes to step the switch each time it finds ground from a Cross Office Finder Unit. Contacts on switch MMCO1 corresponding to unused finder units and its last contact are strapped to ground so that the switch steps self-interrupted past these contacts. On finding battery over lead C3202-(32), contacts 3212 through the winding of relay 3220, the motor magnet of switch MMCO1 fails to energize, and no longer steps its wipers. The battery now on the switch wiper energizes the upper winding of relay 1820, which is connected to ground.

It opens the stepping circuit for the motor magnet of MMCO2 at contacts 1822 and at contacts 1821 completed an energizing circuit for its lower winding from battery over the switch wiper, lead C3202(32) and through the winding of relay 3220. Relay 3220 energizes in series with this low resistance lower winding. At contacts 3222, relay 3220 completes a circuit for relay 3230 through the wiper of level B of switch MMCO2 connected to resistance battery over contacts such as L1D of the operated L register relay Relay 3230 now opens the motor magnet circuit of switch MMCO2 at contacts 3237, and connects at contacts 3232—3236 various register leads through corresponding levels C—G of switch MMCO2 to the Cross Office Unit corresponding to operated register relay selected by switch MMCO2. At contacts 3231 it extends lead C3291(14), multipled to other Register Cross Office Finder Units having access to the same group of cross office units, through level A of switch MMCO2 to the resistance battery at the right of the selected register relay L1—L25.

If, in the meantime the selected Cross Office Unit has been seized by another register, a low resistance ground is extended from the winding of relay 1760 and the lower winding of relay 1770 in that register, contacts 1771, lead C2999(29), to lead C3292(32), contacts 3232 and level C of switch MMCO2 in the cross office finder of that register, lead C3229(60) commoned to the corresponding contact of level C of switch MMCO2 of this director and contacts 3232, leads C3292(28) and C2999(29), contacts 1772, lead C1793(14), contacts 1473, lead C3291(32) of this register, contacts 3231, through the switch wiper of the A level of switch MMCO2 to shunt down the operated register relay such as L1 of this register's cross office finder unit. Relay L1 in this cross office finder unit then releases its contacts to restore relay 3210 at contacts L1B, if no other register relay in this cross office finder is operated. It also restores relay 3230 when contacts L1D open regardless if any other L register relay is operated. If relay 3210 remains energized indicating other operated L relays, the energizing circuit for the motor magnet of switch MMCO2 is recompleted and it steps to find the operated register relay corresponding to another cross office unit and that unit is selected by switch MMCO2 as described.

If no other operated register relays were available in this cross office unit, relay 3210 restores as explained. Contacts 3212 open to restore relay 1820 and ground at the contacts 3213 enables switch MMCO1 to step as before explained. Switch MMCO1 in the Finder Relay Unit 1600 steps in search of another Cross Office Finder Unit having an operated register relay corresponding to a desired Cross Office Unit in a manner explained.

When contacts 3232 close, battery is forwarded from the winding of relay 5950 (Fig. 59) in the selected cross office unit, contacts 5945, lead C3229(32) over level C of switch MMCO2, contacts 3232, lead C3292(28), lead C2999(17) to ground through the upper winding of relay 1770.

Relay 1770 operates to connect the battery on lead C2999(29) through its low resistance lower winding at contacts 1771 to ground through relay 1760. The resistance ground therefore on lead C2999(29) shunts the corresponding register relay in another Cross Office Finder Unit as explained above, if another register attempts to seize the Cross Office Unit. Relay 5950 in the cross office unit now operates to open contacts 5953 and disconnect lead C5799(57) from relay 5960 and prevent another register from establishing a connection to this unit until it is prepared to receive the same. In the event two registers attempt to seize the Cross Office Unit 5400 simultaneously, relays 1770 in each register may operate, but the low resistance ground shunts both relays such as 1770 in each register. As the release time thereof varies, one relay will release before the other which then remains energized to seize the Cross Office Unit. Relay 1760 operates to connect ground over contacts 1742 and 1761 to relay 1810, which energizes to complete its own locking circuit over contacts 1742 and 1812. Relay 1810 allows the register to set up the seized position by extending lead C1898(30) to relay 1830 at contacts 1813, and by grounding lead C1899(30) at contacts 1811.

*Setting preset cross office unit*

The ground on lead C1899(30) is extended to relay 3040 in Fig. 30. It operates, and at contacts 3043 grounds lead C1304(22) to provide another holding ground from the precedence register relays and relay 2030 in the Precedence Register 1900. At contacts 3044 it extends ground over lead C3095(22), the self-interrupting springs of the switch MMPS1 motor magnet, lead C3094(30), now closed contacts 3046, lead C3093(22) to energize relay 2250. At contacts 3049 it removes the original ground for energizing relay 2920. At contacts 3041, relay 3040 removes ground from lead C3088(14) to open the circuit to relay 1490, which does not restore immediately due to the action of A.C. circuit connected thereo. Before it does restore, the register has time to perform its function. At contacts 3049' relay 3040 extends ground over previously operated contacts 3062, the self-interrupting springs of the motor magnet of switch MMIGS, contacts 3045' to operate relay 3050. Relay 3050 closes contacts 3051 and 3052 to also extend the ground from contacts 3052 and contact N and the switch MMIGS level B wiper through contacts 3052 and 3051, respectively, over previously operated contacts 3063 to lead C3099(32) and to the switch MMIGS motor magnet, respectively. The motor magnet on energizing opens its self-interrupting contacts to release relay 3050, which in turn opens contacts 3051 to deenergize the motor magnet. The motor magnet steps its wipers one step. The ground on lead C3099(32) was forwarded over contacts 3233 and the wiper of level D of switch MMCO2 associated with the selected cross office unit, lead C3203(59) extending through operated contacts 5911 to the motor magnet of switch MMIG in the selected cross office unit to energize that magnet. When the ground is removed at contacts 3052 on release of relay 3050, switch MMIG steps in synchronization with switch MMIGS. When the wiper of level A of switch MMIGS takes its first step the circuit to previously operated slow-to-release relay 3060 is opened and it starts to restore.

If this register serves the first group of twenty-five incoming lines, the first bank contact on each level of switch MMIGS has no potential thereon. This prevents re-energization of relay 3060 or the motor magnet of switch MMIGS from ground forwarded over the level A and B wipers, respectively, on their first contacts. The original energizing circuit for the motor magnet is opened at level B, despite reoperation of relay 3050 when the self-interrupting springs of switch MMIGS close. If the register serves another group of incoming lines the first contact of each level of switch MMIGS is connected to ground. The ground forwarded over the wiper of level A on its first contact therefore operates relay 3060. The energizing ground for the motor magnets of switches MMIGS, MMIG is now secured from the grounded contact on the B level of switch MMIGS. The motor magnet of MMIGS re-energizes and the aforedescribed sequence of operations for stepping MMIGS and switch MMIG in the selected cross office unit take place. Thus switch MMIG in the selected cross office unit will be stepped to a position corresponding to the incoming group of lines with which Line Circuit 400 is associated. It thereby selects an incoming selector switch of a group associated therewith. This switch has access to the incoming group of lines with which Line Circuit 400 is associated. When wipers of switch MMIGS fails to find ground on their contacts, the motor magnets of switches MMIGS and MMIG remain deenergized and after a period of time relay 3060 restores. Relay 3060 opens the original circuit to relay 3050 at contacts 3062, however off-normal springs 3053 maintain relay 3050 energized over the switch self-interrupting contacts and contacts 3045'.

In the selected cross office unit, slow-to-release relay 5910 was first energized from switch MMIG off-normal springs 5904. When switch MMIG takes its first step the circuit is opened by the springs. If ground is not forwarded to the switch motor magnet, before 5910 restores the switch is stepped no further and contacts 5912 close to extend lead C3203(32) to the selected incoming selector switch. If the switch motor magnet is energized before relay 5910 restores it provides another energizing circuit for relay 5910 at its self-interrupting make contacts and the procedure is repeated until ground is removed from lead C3203 to terminate the switch stepping.

Ground from contacts 3049' is now forwarded over contacts 3061 and lead C1898(18), the self-interrupting contacts of the motor magnet of switch MMITS, contacts 1813 to operate relay 1830. Simultaneously lead C3099(32) is switched to lead C3098(18) at contacts 3064 to prepare a stepping circuit for the motor magnet of the selected incoming selector switch. At contacts 1832 ground is connected from contacts 1841 to the motor magnet of switch MMITS and also from contacts 1841, over contacts 1831, lead C3098(30) and over contacts 3064 to lead C3099(32), respectively. Lead 3099(32) is extended through level D of the cross office finder switch MMCO2 to lead C3203(59), contacts 5912 to the switch wiper and associated contacts of switch MMIG in a manner explained. The ground is therefore extended over a lead such as C5209(52) to energize the motor magnet MM15 of an incoming selector switch having access to the incoming Line Circuit 400.

Switch MMITS motor magnet energizes and opens its self-interrupting springs to restore relay 1830. Relay 1830 on restoring removes the ground from the motor magnet at contacts 1832 and removes ground from lead C3099(32) at contacts 1831. The motor magnet of switch MMITS and the motor magnet MM15 therefore deenergize to step their respective wipers. The off-normal springs 1833 close to complete an auxiliary circuit for relay 1830 over switch MMITS motor magnet interrupting springs and contacts 1813. The self-interrupting springs of motor magnet MMITS on re-closing recomplete the circuit to relay 1830 and the aforedescribed sequence of operation is repeated, if the incoming line is not found by switch MMITS. Bank contacts of levels A or B of switch MMITS are strapped to respective contacts of switch level K of switch MMIF over cable C1690(16). It will be recalled that the wiper of level K of switch MMIF is extending ground over the contact thereon corresponding to the selected incoming line to the contact on levels A or B corresponding to the incoming line of switch MMITS. If this register serves incoming positions accessed over the first twenty-five contacts of the fifty point incoming selector switch, the wiper of level A of switch MMITS is connected through a strap to relay 1840 or if the register serves the last twenty-five lines accessible to the fifty point incoming selector switch, the wiper of level B is strapped to relay 1840. Likewise the connections from the bank contacts of level K of switch MMIF are extended to the respective contacts of the level of switch MMITS, which corresponds to the particular group of lines served. Therefore, if the desired incoming line is in the second group of twenty-five lines accessible to the Incoming Selector Switch 5200, wiper A is stepped past its contacts without finding ground, and when wiper B encounters its bank contacts the incoming selector switch is in a position to be associated with one line of the last group of twenty-five lines accessible thereto. When the wiper which has access to the ground forwarded from level K of switch MMIF forwards that ground to relay 1840 to operate relay 1840, contacts 1841 open. This permanently removes the stepping ground for switch MMITS and from leads C3098(30), C3099(32), and C5209(52) and MM15 of Incoming Selector Switch 5200. Relay 1830 reoperates in a described manner after the desired incoming channel is found but for no purpose.

Operated relay 1840 extends ground at contacts 1842, over lead C1897(29), contacts 2925 and over lead C2791(14), through normally operated make contacts 1473 to relay 1480. At contacts 1843 it lights lamp 1847 to signify the completion of this operation. Relay 1480 operates to enable release of the register in a manner which will be explained.

If a relay 1490 had in the meantime restored it opens contacts 1491 to restore relay 1470. Relay 1470 opens contacts 1473 to prevent the operation of relay 1480. At contacts 1474 it closes a circuit to relay 1460, which operates to close contacts 1461. For lighting a signal lamp, and 1462 for holding itself energized at contacts 1487. At contacts 1463 it lights lamp 1467 to indicate the set-up has failed. At contacts 1477 the circuit to relay 1570 is opened and it restores. At contacts 1471 ground is extended to lead C3173(28) to hold relay 2770 operated. It will be recalled that the operation of relay 1750 in the register, as a result of the failure to find a cross office unit or a cross office intercept, opens contacts 1751 to restore relay 1730. It places high resistance ground through its upper winding and contacts 1752 on lead C696(6) to restore relay 640. It opens the tape reader circuit at contacts 645, and at contacts 643 extends a circuit to the upper winding of relay 770 through contacts 672 to ground on lead RL1 over contacts 633. Relay 770 extends a circuit for its lower winding over contacts 776 to ground at key contacts 998. At contacts 77 it provides a signal. At contacts 771 it opens a circuit extending to the B wiper of the register assigner switch 1200. At contacts 772 and 773 it extends signal circuits. At contacts 774 it extends ground over contacts 655 and 638 to lead C696(16) to enable the register finder switch MMIF to step past this circuit. The supervisor on noting the alarm signals will now take appropriate action.

*Register preset cross office test termination*

In the event that a preset cross office unit is not available an indication thereof is rendered by the failure of the register relays L1—L25 in any of the associated cross office finder units to ground lead C3173(28) or if initially grounded to hold the lead grounded. Thus relay 2810, operated when each relay such as 3120 in each associated finder unit may fail to energize relay 2770 or if relay 2770 has operated it fails to remain operated due to the removal of ground from lead C3173(31). Also relays such as 3210 in the cross office finder unit are either unoperated or if operated restore. Relay 1740 in the finder relay unit is therefore unoperated or if operated, it is restored. This prevents switch MMCO1 from being stepped to search for a cross office unit having an operated registered relay, as its motor magnet is disconnected at contacts 1741.

Relay 2810 on operating opens the original operating circuit for relay 2920 at contacts 2815 as explained. Relay 2920 and the upper winding of relay 2930 are energized over the previously described holding circuit including contacts 2923 and 2943 to ground on lead C1305(13). At contacts 2931 relay 2930 maintains the preset cross office lamp 2919 lighted. Relay 2930 opens another point in the original circuit to relay 2920 at contacts 2934 and connects the low precedence lead C2293(22) to the winding of relay 2940 through contacts 2933 and 2954. At contacts 2932, it completes an energizing circuit for its lower winding to ground on lead C1305(13). At contacts 2935, 2936 and 2937, it opens the circuit for supplying the aforedescribed test grounds to select a preset cross office unit and at contacts 2934 it opens the circuit to relay 2820, which restores.

When relay 3120 in each cross office finder relay unit restores as previously described to remove the ground from lead C2792(27) and to place ground on lead C3172(28) relay 2810 restores as previously described. It connects the original operating ground for relay 2920 extending from contacts 3049 through contacts 2815 and the previously described circuit connections to the low precedence lead C2293(22), only if relay 2770 is unoperated and contacts 2772 closed. That ground is now extended over contacts 2933 and 2954 to energize relay 2940. Relay 2940 completes a holding circuit for itself through the upper winding of relay 2950, contacts 2942 and 3025 to ground on lead C1305(13). At contacts 2943 relay 2940 opens the circuit to relay 2920 through the upper winding of relay 2930, but the already energized lower winding of relay 2930 holds its contacts operated. At contacts 2945, relay 2940 extends ground to the upper spring of contacts 2948'.

In the event relay 2770 is operated indicating the availability of a preset cross office unit, contacts 2772 remain open to prevent relay 2940 from operating on restoration of relay 2810. Relay 2930 does operate, however, as explained and it opens the circuit to relay 2820. Relay 2820 on restoring opens the circuit to relay 2750 at contacts 2824, if relay 2810 has restored to open contacts 2814. This also opens the circuit to relay 4610 in the register assigner unit by disconnecting lead C2899(46) from battery through relay 2750. Relay 4610 removes ground at contacts 4616 to prevent switch MMA1 from stepping past its odd contacts. It reconnects the motor magnet of MMDA1 at contacts 4612 so that another register may use that switch. At contacts 4615 it connects the upper winding of relay 4660 to ground through the C wiper of switch MMA1, if another register were waiting to operate relay 4660.

*Empty cross office unit test and setting*

Relay 2940, if as a result of the failure to find a preset cross office unit, closes contacts 2947 and with relay 2920 released to close contacts 2927, ground is forwarded over contacts 2955 to reoperate relay 2820. Relay 2820 demands the assigner circuit as before explained. When one of the assigner switches MMDA1 or MMDA2 again finds the register in a similar manner to that explained, relay 2750 is operated as before, and at contacts 2751 forwards the ground from lead C3172(31) to lead C2795(15) to operate relay 1560. It operates the bar relay such as 3110 in the cross office finders and extends ground over lead C1598(15) in a manner explained.

On a message having a high precedence designation, relays 2020, 2010 and 2030 are operated as previously described for a message having a low precedence designation. Leads C2099(27) and C2098(15) are grounded as previously described for the purpose of operating relays 2720 and 2710 and 1510 as previously described. The latter stops the tape reader, while the first two relays enable ground to be forwarded over contacts 3049, 2815, 2772, 2764, 2714 and 2724 to lead C2799(35) from whence it is forwarded to lead C2290(22) under control of operated relay 3530 of the Terminal Register 3300. On handling a message having a high precedence designation the Precedence Register 1900 connects lead C2290(22) directly to the high precedence lead C2291(29) at one of the set of make contacts such as 2171, 2211 or 2241 corresponding to the operated high precedence designation register relay 2170, 2210 or 2240 respectively, as explained. This ground is forwarded over lead C2291(29) and over contacts 2954 to operate relay 2940. At contacts 2941 relay 2940 lights the empty cross office lamp 2959. Relay 2940 completes its own locking circuit from contacts 2942 through the upper winding of relay 2950, contacts 3025 to ground on lead C1305(13). Ground is forwarded over contacts 2927 to relay 2820, which operates to initiate operation of the Register Assigner 4500 as previously explained. When the register assigned finds the present register, relay 2750 operates as already explained, to in turn operate relay 1560. It extends ground over leads C1598(28) and C1599(31) as explained. The ground on lead C1599(31) operates the cross office finder circuit bar relays such as 3110 and the associated relays such as 3120 as previously explained.

Thus for both a high precedence message and a low precedence message needing an empty cross office unit relay 2940 is operated. Ground on lead C1598(28) and contacts 2816 is therefore forwarded from contacts 2957, 2949 and 2758' to lead C2701(49) and from contacts 2949, over contacts 2756 and 2739 to lead C2703(34). The ground from contacts 2816 is also forwarded over contacts 2956, 2738' and 2758 to lead C2793(34).

The ground on lead C2703(34) is forwarded through the operated make contacts such as RG1D of the operated one of the group register relays RG1—RG10 in the Terminal Register, and over the lead corresponding thereto such as GE1(47), to operate the relay such as 4730 in the Terminal Test Access Unit such as 4700 corresponding to the group of outgoing channels with which the desired channel is associated. The ground on lead C2793(34) is forwarded as described through the make contacts on an operated one of the terminal relays RT1—RT25 to a corresponding one of the terminal leads S1(47)—S25(47). This ground is now forwarded over the make contacts such as 4731 or 4732 corresponding to a particular outgoing channel. If the selected channel is one of a multichannel circuit the ground is extended over a lead such as C4733(50). If the corresponding channel busy relay such as 5010 is operated by that time indicating that all channels are in use the ground is forwarded over contacts such as 5011 and over a lead such as C5001(44A) to energize the motor magnet of the corresponding translator multichannel switch such as MC1 as before explained. The switch will then be stepped to another position so that another channel of the multichannel circuit is selected on the next message intended for the multichannel station.

The ground on lead C2701(49) is extended to operate an empty bin relay such as 4930 in each Cross Office Test Access Unit such as 4900. Ground is then forwarded from contacts 4931—4934 to each of the respective make contacts of the speed relays 4920A, 4920B and 4920C of the same cross office test access unit. In the meantime the ground on lead C2702(35) is forwarded over either contacts 3582, 3592 or 3597 depending on which one of relays 3580, 3590 or 3595 was operated by the Translator, when it grounded one of the leads C4285, C4284 or C4283, respectively, and corresponding to speed of the transmission of the cross office unit transmitter to be used with the outgoing channel. The ground forwarded over either contacts 3582, 3592 or 3597 is therefore extended over an individually corresponding one of leads C3501(49), C3502(49) or C3503(49) to operate an individually corresponding speed relay 4920A, 4920B or 4920C, respectively, in each Cross Office Test Access Unit.

The ground extended by relay 4930 is therefore forwarded over the operated make contacts such as 4921A of the operated speed relay 4920A to the empty cross office units having transmission of a comparable speed. The ground is forwarded, for example, over lead C4999(57) to contact N on level B of switch MMPR1, and the associated wiper to lead C5799(59). As previously described, on a low precedence test the ground is forwarded to operate relay 5960 in the cross office units having comparable speed transmission. Relay 5960 in this case extends a ground from contacts 5955, 5962, 5918' and key contacts 6001 to lead C3174(31) to operate a corresponding register relay L1—L25 in a cross office finder unit in a manner similar to that previously explained.

Switches MMCO1 and MMCO2, in the Finder Relay Unit 1600 and in the Cross Office Finder Unit 3100, respectively, operate as before described, to this time select an empty cross office unit which has operated its corresponding register relay L1—L25. If an empty cross office unit is located by the switches, relay 1770, 1760 and 1810 in the Finder Relay Unit 1600 and relay 5950 in, for example, the selected Cross Office Unit 5400 are operated as previously described. Relay 1810 operates relay 3040 as previously described, and it prepares to set the cross office incoming and outgoing selector switches and the precedence switch MMPR1.

Relay 2810 is operated in the meantime as before explained to remove the test ground from leads C2701(49), C2702(35), C2703(34) and C2793(34) at contacts 2816. The removal of ground from lead C2795(15) restores only 1560 as before described to in turn restore the cross office finder relays 3110 and 3120, as described. Relay 4730 restores, when contacts 2816 open to remove ground from lead C2703(34), and if a motor magnet of a multichannel switch were energized, it is now deenergized to step its wipers. Relay 4930 and the operated one of the relays 4920A, 4920B and 4920C are also restored. At contacts 2811 relay 2810 completes an operating circuit for relay 2770 as already explained, and at contacts 2815 it opens the operating circuit for relay 2940 as previously explained for relay 2920. Relay 2940 remains operated over its holding circuit through the upper winding of relay 2950, which now also energizes. At contacts 2952 it completes a circuit to its lower winding from ground on lead C1305(13) and at contacts 2951 it maintains lamp 2959 lighted. At contacts 2954 it opens a point in the original operating circuit for relay 2940. At contacts 2955 it opens the circuit to relay 2820, which restores. At contacts 2825 relay 2820 removes ground from lead C2796(45) to the Common Control Register Assigner 4500 and at contacts 2824 opens one point in one circuit between relay 2750 and either relays 4610 or 4660. Relay 2810 restoring due to all grounds being removed from lead C2792(31) as explained, opens the circuit between those relays at contacts 2814 and they restore. At contacts 2815 it prepares the previously described connection over lead C2799(35) to one of the precedence leads. If relay 2770 has locked operated indicating that a cross office unit is available this connection remains incomplete at contacts 2772. Relay 3040 is also then operated in a manner explained.

Relay 3040 on operating extends ground from contacts 3047 through contacts 2944 to the set precedence lead C2292(22) to set the precedence switch of the selected cross office unit in a manner to be explained. At contacts 3049' it initiates the aforedescribed procedure for stepping switch MMIGS in the register and switch MMIG in the cross office unit to select a cross office incoming selector switch such as 5200 having access to the same incoming line that this register has access to. Switch MMITS and the selected incoming selector switch 5200 are then stepped in a manner previously explained to set an incoming selector switch of the cross office unit to the incoming line and operate relay 1840.

In the meantime an outgoing selector switch of the cross office unit must be selected and stepped to a position corresponding to the outgoing channel. At contacts 3047' ground is extended over lead C3097(36) to operate relay 3620. At contacts 3048' ground is extended from contacts 2736 and 2945 over lead C3096(36), contacts 3654, through the self-interrupting springs of the motor magnet of switch MMOGS, contacts 3624, to battery through the motor magnet of MMOGS. However, relay 3620 operates to open contacts 3624, before the motor magnet of MMOGS can energize, and at contacts 3623 extends the ground to relay 3610, which energizes. The ground at contacts 3654 is also extended through contact N and wiper B of switch MMOGS, and as relay 3610 is operated, through contacts 3611 and 3612, respectively, to the motor magnet of MMOGS and to contacts 3652 and lead C3601(32), respectively. The motor magnet of MMOGS energizes from the ground to open its self-interrupting springs and deenergize relay 3610, which in turn opens the circuit to the magnet of switch MMOGS at contacts 3611. It restores to step its wipers to a succeeding contact thereby opening the original operating circuit for relay 3650 at the N contacts of switch MMOGS level A, but if the wiper of level A finds ground on the next contact slow-to-release relay 3650 is maintained operated. The ground on lead C3601(32) is forwarded past contacts 3236, the wiper of level G of switch MMCO2, lead C3206(59) individual to the selected cross office unit, operated contacts 5921 to energize the motor magnet of switch MMOG1. When the ground on lead C3601(32) is removed by relay 3610 at contacts 3612, the motor magnet of switch MMOG1 deenergizes to step its wipers one step.

Ground on lead C1301(13) is normally forwarded past unoperated contacts such as RG2E of the terminal register route group relays RG1—RG10 to individually corresponding bank contacts of levels A and B of switch MMOGS. An operated route group relay opens the associated just-described contacts such as RG1E to prevent the ground from being forwarded to the corresponding bank contacts of switch MMOGS to thereby mark the bank contacts of switch MMOGS accordingly. The switch wiper of level A of switch MMOGS encountering ground on its first contact maintains slow-to-release relay 3650 operated. The ground on lead C3096 then reoperates relay 3610 as the self-interrupting springs of MMOGS are now closed. Ground on the first contact associated with level C of switch MMOGS is then forwarded over both contacts 3611 and 3612 to energize the motor magnet of switch MMOGS and the motor magnet of switch MMOG1 in the selected cross office unit all in a manner just explained. Both switches are stepped as described until switch MMOGS fails to encounter ground on its bank contacts indicating an operated group relay has removed this ground. The failure to find ground by the wiper of level B of switch MMOGS prevents the magnets of switch MMOGS and switch MMOG1 from reenergizing. The wiper of level A of switch MMOGS failing to find ground enables relay 3650 to restore. Relay 3610 then fails to reoperate as contacts 3654 are open, and the switches MMOGS and MMOG1 are no longer stepped.

Switch MMOG1, which was stepped in synchronism with switch MMOGS is thus stepped to select an outgoing selector switch having access to the desired outgoing channel. Ground from off-normal springs 5901A, which originally operated slow-to-release relay 5920 open on the first step of switch MMOG1. Relay 5920 is thereafter maintained energized by contacts 5902A of the motor magnet of switch MMOG1. When the motor of switch MMOG1 fails to reenergize after its last step, relay 5920 restores to open contacts 5921 and close contacts 5922. This connects lead C3206(32) through the wiper of level A of switch MMOG1 to the motor magnet of the selected outgoing selector switch such as 4800.

With relay 3650 restored the ground on lead C3096(30) is forwarded over contacts 3653, the self-interrupting springs of the motor magnet of switch MMOTS and contacts 3621 through the winding of relay 3630 and contacts 3642 to battery. Relay 3630 energizes to extend ground at contacts 3643 and 3631 to the motor magnet of switch MMOTS, which energizes. At contacts 3632 the ground at contacts 3643 is forwarded over contacts 3651, lead C3601(32), through contacts 3236, the wiper of level G of switch MMOC2, lead C3206(59), contacts 5922 in the selected cross office unit, the terminal on which the wiper of level A of swtich MMOG1 is standing, lead C5902(48) to energize the motor magnet of the selected outgoing selector switch 4800.

Ground is also extended from operated make contacts such as RT1D of the operated one of the route register terminal relays RT1—RT25 to an individually corresponding bank contact on switch MMOTS. The motor magnet of the switch MMOTS on energizing opens its self-interrupting contacts to deenergize relay 3630, which opens the stepping circuit for the motor magnet of switch MMOTS at contacts 3631 and the motor magnet MM15 of the outgoing selected selector switch 4800 at contacts 3632. Both step their wipers to a succeeding contact. The motor magnet of switch MMOTS on reclosing its self-interrupting contacts recompletes the circuit to relay 3630 and the aforedescribed operation is repeated. When the wiper of switch MMOTS encounters ground corresponding to the operated route register terminal relay, relay 3640 is energized, and it locks to ground over contacts 3645 and 3625. At contacts 3642 it opens the circuit for relay 3630 to maintain it restored. Switch MMOTS and the selected outgoing selector switch 4800 are now set to the desired outgoing channel.

Returning now to relay 3040, it will be recalled that on its operation ground was extended at contacts 3043 to lead C1304(22), and at contacts 3044 to lead C3095(22). The ground on lead C3095(22) is extended past the self-interrupting contacts of the motor magnet of switch MMPS1 over lead C3094(30), contacts 3046 to lead C3093(22). This ground operates relay 2250 to control the stepping of a cross office unit precedence switch. The ground previously mentioned on lead C2292(22) is forwarded past the unoperated break contacts such as 2065, etc. of the unoperated precedence designation register relays 2060, etc. The ground is then forwarded to individually corresponding contacts on levels A and B of switch MMPS1 to mark the bank contacts corresponding to the unoperated precedence relays with ground, and those bank contacts corresponding to an operated precedence register relay are marked by no potential. The ground on lead C2292(22) is also forwarded to contact N and the wiper of level B of switch MMPS1, past contacts 2251 and 2252, respectively, to lead C2298(32) and to energize the motor magnet of switch MMPS1 respectively. From lead C2298(32) the ground is forwarded past contacts 3234, the wiper of level E of switch MMCO2 associated with the selected cross office unit, lead C3204(60), contacts 6051, lead C6002(57) to energize the motor magnet of switch MMPR1. The energized motor magnet of switch MMPS1 opens its self-interrupting contacts to restore relay 2250 by removing ground from lead C3094(30). Relay 2250 in turn opens the circuits at contacts 2252 and 2251 to the motor magnets of switches MMPS1 and MMPR1, respectively, to deenergize them, and they step their wipers once. The original operating circuit to relay 2260 is opened at the A level of switch MMPS1, but when the A wiper finds ground on a succeeding contact, it maintains slow-to-release relay 2260 energized. The motor magnet of MMPS1 on deenergizing recloses its self-interrupting contacts to reoperate relay 2250 over its original circuit and from ground at off-normal springs 2204. The wiper B of switch MMPS1 finding ground on its bank contact from an unoperated precedence register relay break contact such as 2065, reenergizes the motor magnets of switch MMPS1 and MMPR1, respectively, over contacts 2252 and 2251, respectively, and they are stepped again as explained. The wiper A of switch MMPS1 maintains slow-to-release relay 2260 energized as explained, if ground is found on the succeeding contact. When switch wiper A fails to find ground, slow-to-release relay 2260 starts to restore, while switch wiper B on failing to find ground allows the motor magnets of switches MMPS1 and MMPR1 to remain deenergized despite the reoperation of relay 2250. Thus the precedence switch MMPR1 in the selected cross office unit is set to a position corresponding to the operated one of the precedence relays 2060, 2110, 2140, 2170, 2210 or 2240.

Relay 2260 on restoring connects ground from contacts 1842, as soon as relay 1840 operates, over lead C1897(18), contacts 2262 to lead C2289(36), and if relay 3640 has or as soon as it does operate it connects that ground to lead C2791(14) at contacts 3641. The ground on lead C2791(14) is forwarded over contacts 1473 as previously explained to energize relay 1480. Relay 1480 enables the release of the director in a manner which will be explained.

*Cross office intercept*

The message must be intercepted under one or more of the following conditions: an alarm condition resulting in the operation of relay 2740 as explained; night intercept; channel closed or being repaired; message intended for the present station or both the incoming and outgoing channel are the same. The night intercept or channel closed conditions result in the operation of relay 3540 by the Translator 3700 as explained and either of the last two conditions result in the operation of relay 3560 by the Translator 3700. Lastly, cross office interception takes place if an empty cross office unit has not been found by the register. This condition is indicated by the failure of relay 2770 to operate or remain operated, as before explained and hold contacts 2772 open. In this case the sequence of operations is somewhat similar to that when a preset cross office unit was not available. That is, when relay 2810 restores as a result of the cross office finder bar relays 3110 and 3120 restores, it restores relay 2770 as relay 2820 is also restored by them. Ground is therefore once again connected to lead C2799(35) and depending on whether the message is high or low precedence the ground is extended over lead C2291(22) or C2293(22) in a manner explained. As relays 2930 and 2950 are operated at this time if the message is low precedence, the ground is extended from lead C2293(22) over contacts 2933, 2953 and 3034 to operate relay 3020. If the message is high precedence, relay 2950 extends the ground on lead C2291(22) directly over contacts 2953 and 3034 to operate relay 3020.

Relay 3540, if operated connects lead C2799(27) to lead C3599(27) at contacts 3545 to extend the ground placed on lead C2799(35) by operation in a manner explained of relays 2720 and 2710 in the Sequence Control Unit 2700, directly over contacts 3034 to operate relay 3020.

Relay 3560, when operated, extends ground at contacts 3563 before the Sequence Control Unit is seized, over lead C3304(15), contacts 1545, lead C1501(17), contacts 1712, over the wiper of level J of switch MMIF set to the incoming line, lead C1605(6), and through contacts 653 or 673 to energize relay 760. This ground was also extended to lead C1501(17) and the incoming line circuit on various alarm conditions already mentioned. Ground on lead C1501(27) is forwarded past contacts 2713 to operate relay 2740 for seizing the Sequence Control Unit 2700. Relay 2740, which was also operated on previously mentioned alarm conditions, closes ground to relay 2710 at contacts 2741 to operate that relay. It also grounds lead C2098(15) at contacts 2742 to operate the lower winding of relay 1510. This keeps the Tape Reader 300 stopped. Sensing relays 1910—1960 are not used in this case to sense a line feed, etc. following the translation as is done in the other cases for operating relay 2030 and relay 2720 in turn. At contacts 2743 relay 2740 completes its own holding circuit to ground on lead C1305(13). With relay 2710 operated ground is forwarded from contacts 3049, 3815, 2772, 2764, 2714, 2725, 2735, 2744, 2965 and 3034 to operate relay 3020.

Relay 3020 completes a locking circuit for itself through the upper winding of relay 3030 and contacts 3022 to ground on lead C1305(13). Relay 3030 does not energize due to the ground on the left side of its upper winding. At contacts 3023 a circuit is prepared to the lower winding of relay 3030. Relay 3020 opens the locking circuit for relay 2940 and the upper winding of relay 2950, at contacts 3025 to deenergize them; however, the lower winding of relay 2950 remains energized and holds the relay contacts operated. At contacts 3021 it lights the intercept lamp 3019.

At contacts 3028 ground is now forwarded from contacts 2946, over contacts 3036 to operate relay 2820. Relay 2820 initiates operation of the Common Control Register Assigner 4500 as previously explained, and relay 2750 is operated when it finds this register all in a manner described. Relay 1560 which is operated as described operated the cross office finder bar relays 3110 and 3120 as described and extends ground to lead C1598(15) and to contacts 2816. That ground is now extended over contacts 3029, 3037 and contacts 2755, lead C2788(49) to operate relay 4940 in each Cross Office Test Unit 4900. At contacts 4941 relay 4940 extends ground over lead C4994(49) to the cross office intercept positions such as Cross Office Intercept 6800. The ground is forwarded over contacts N and the wiper of level B of a switch such as MMIGY in the tested cross office intercept position, over contacts 6857 to operate relay 6960. The B wiper of switch MMIGY is on its N contact when the associated position is available to receive messages. Relay 6960 extends ground from contacts 6922, over contacts 6962, through the closed toggle switch 6979, over lead C3199(31) to operate an individually corresponding one of the cross office finder register relays L1—L25.

When relay 2810 operates, it operates relay 2770 and removes ground from lead C1598(15) at contacts 2816. Relay 4940 is deenergized therefore to remove ground from the lead C4994(68), and all operated relays such as 6960 restore. Relay 1560 also restores when the cross office bar relays remove ground from lead C3172(31). Ground for originally operating relay 3020 over lead C3599(35) is removed at contacts 2815 to enable relay 3030 to operate over the locking circuit for relay 3020. At contacts 3023 it completes a circuit for energizing its lower winding over contacts 3022. At contacts 3034 it opens another point in the original circuit to relay 3020 and at contacts 3033 it prepares a circuit in the event an idle intercept position is not found. At contacts 3036 it opens the circuit to relay 2820 which restores to release relay 2750 and the connected register assigner relay such as 4610 in a manner explained. At contacts 3037 relay 3030 opens a point in the circuit for extending the intercept test ground.

Switches MMCO1 and MMCO2 are controlled as previously explained in the cross office test to search for an operated finder register relay L1—L25 corresponding to one of the available intercept units. Relay 1770 and 1760 are operated over a circuit similar to that as previously described for operating them. If they remain operated over leads C2999(29), C3292(22), contacts 3232, level C of switch MMCO and a lead such as C3207(68) and contacts 6931 the cross office intercept position is seized as relay 6920 operates which supplies battery thereto also operates. The ground on lead C2999 busies the position to other registers in a manner similar to that explained on the cross office unit test.

Relay 6920 on operating closes contacts 6921 to prepare a locking circuit to relays 6820 and 6850. At contacts 6922, it removes the original ground from lead C3199(31) for operating the register relay L25. At contacts 6923 it removes a ground from the associated incoming selector switch and at contacts 6924 disconnects relay 6930 from off normal springs 6801 to prevent the completion of a circuit thereto. At contacts 6925 it opens a point in a stepping circuit for MMIGY and at contacts 6926, 6927 and 6928 it lights a position receive lamp 6929 starts the reperforator motor and signals the supervisors position respectively.

Relay 1760 operates relay 1810, and it operates relay 3040 all as previously explained. Relay 2770 remains operated as long as one of the register relays L1—L25 remains operated to hold open contacts 2772 to prevent ground from being returned over lead C3599(35). Relay 3040 extends ground from contacts 3047 over contacts 3026 to lead C2297(22), and if either the precedence register relay 2210 or the precedence register relay 2240 is operated, the ground is forwarded over contacts 2216 or 2246, respectively, to lead C2298(32) and from there through the corresponding level E of the cross office finder switch MMCO2 over a lead such as C3209(69) to operate relay 6970 in the cross office position. Relay 6970 closes contacts 6971 to light lamp 6979, which indicates to an operator that the message is flash or emergency and should be handled immediately. It locks operated over contacts 6974 and key contacts 6978 and at contacts 6972 and 6973 it provides high precedence signals. Relay 3040 also controls switch MMIGS in conjunction with switch MMIGY over lead C3277(68) and contacts 6811 to select an incoming selector associated with the intercept position which has access to the incoming line in a manner similar to that explained for the cross office unit. Relay 6810 is normally operated from off normal contacts 6802 which open after the first step by switch MMIGY. Contacts 6803 close each time the motor magnet energizes, however, to keep relay 6810 energized. Likewise switch MMITS is stepped to position the incoming selector on the incoming line over lead C3277(68), contacts 6812 and the A level of switch MMIGY in a manner similar to that explained for the cross office unit incoming selector.

Relay 1840 is then operated to ground lead C1897(29) and this ground is forwarded through contacts 3027, over lead C2791(14) to operate relay 1480 in a manner explained. At contacts 3048 relay 3040 forwards ground over contacts 3035 to lead C1501(15). This ground is extended over level J of switch MMIF to operate relay 760 in Line Circuit 400 in a manner explained. Its previous operation under control of relay 3560 or otherwise is not affected thereby.

*Cross office intercept unavailable*

In the event that the Cross Office Finder 3100 fails to find an available cross office position, none of the register relays L1—L25 are or remain operated for this register to seize the position. In addition ground is not furnished to lead 3173(31) so that relay 2770 fails either to operate or to hold operated after relay 2810 restores. Ground is therefore forwarded from contacts 3049, 2815, 2772, 2764, 2714 and 2725 to lead C3599(35), either through the Terminal Register 3300 or directly over contacts 2744 in one of the respective manners explained. Ground now on lead C3599 is forwarded over contacts 3033 to lead C3092(15), contacts 1546, lead C1502(17) to energize the lower winding of relay 1750. It results in a series of operations already described. The lower winding of relay 1440 is operated from ground on lead C3092(15) and it energizes its upper winding from ground at contacts 1487 and 1443. At contacts 1441 and 1442 it controls alarm circuits. Relay 1750 opens contacts 1751 to restore relay 1730 and completes a circuit for its upper winding from battery on lead C696(6) and relay 640 in the line circuit to ground at contacts 1752. This is a high resistance ground and relay 640 restores. Relay 770 in the line circuit then operates as previously described. The register is released in a manner to be explained, while at contacts 1753 ground is extended over lead C1709(13) to provide a register ground until the register is released.

*Finish cross office seizure*

It will be recalled that when a register established a connection to a selected cross office unit, that relay 5960 in Cross Office Unit 5400, for example, was operated. It in turn returned ground for operating a corresponding one of the register relays L1—L25 in the Cross Office Finder 3100, and, therefore, the register extended ground over a lead such as C3229(61) to operate relay 5950. At contacts 5953 relay 5950 opens a point in the circuit to relay 5960, which restores, and at contacts 5954 it provides a ground on lead MC to control the starting of the cross office unit repreforator and reader-transmitter motors (not shown) in any well known manner. At contacts 5951 it opens a point in a possible circuit to the upper winding of relay 5930. At contacts 5952 it prepares a holding circuit for itself through the lower winding of relay 5940 to both the open off-normal springs 5903 of switch MMIG, and over contacts 6018 to off-normal springs 5901B. Switch MMIG was stepped, as explained, to select an incoming switch having access to the desired line circuit such as 400 and completed the holding circuit at springs 5903. The lower winding of relay 5940 does not energize due to the ground on its right side, which originally operated relay 5950. Switch MMOG1 was stepped in the case of an empty cross office unit to select an outgoing selector switch having access to the desired outgoing channel in a manner explained. It completes the other holding circuit to relay 5950 at off-normal springs 5901B. Both the incoming selector switch 5200 and the outgoing selector switch 4800 (in the case of an empty cross office unit) are stepped in a manner described to select the line circuit 400 and the desired outgoing channel 7000, respectively. Switch MMPR1 was also stepped in a described manner in the case of an empty cross office unit, so that it is set to the precedence designation of the incoming message. When switch MMPR1 steps, its off-normal springs 5799 are closed, and when the outgoing selector switch 4800 is stepped its off-normal springs 4817 are closed, thereby extending ground over lead C4849(61), contacts 6122, lead C6101(57), off-normal springs 5799 and lead C6101A(57) to energize relay 6120. Relay 6120 closes its X contacts to complete its own locking circuit to ground on lead C4849. It opens its original operating circuit at contacts 6122 and prepares an auxiliary locking circuit for itself from contacts 6123 and lead C6101(57), off-normal springs 5799 and lead C6101A(57). At contacts 6124 it prepares a circuit to relay 6060. In the case of a preset cross office unit relay 6120 is of course already operated as switches MMPR1 and the outgoing selector switch 4800 are in their operated positions. When the incoming selector 5200 is stepped it operates its off-normal springs 5299 to close ground to lead C5298(59) for providing an additional holding ground for relay 5950 through the lower winding of relay 5940.

In the case of seizure of a cross office intercept such as 6800, switch MMIGY is stepped by the register to select an associated incoming selector switch having access to the incoming Line Circuit 400 in a manner similar to that explained for switch MMIG. Off-normal springs 6802 on opening allows slow-to-release relay 6810 to restore, when the motor magnet of the switch remains deenergized to open contacts 6803, after its last step in a manner previously explained. Restored relay 6810 at contacts 6812 extends lead C3277(32) to the incoming selector switch associated with this position, and which has access to the incoming line. That switch is stepped in a manner already explained for the incoming selector switch associated with the Cross Office Unit 5400. The incoming selector switch extends ground over a lead such as C5298(68) on operation of its off-normal springs in a manner explained for extending ground over lead C5298(59). This ground does not operate relay 6930, as contacts 6924 are open at this time.

In the Register Supervisory Unit 1200, relay 1480 is operated, when the various switches associated with a selected cross office unit or cross office intercept have been set as previously explained. At contacts 1483 it places ground on relay 1490 to hold it operated. At contacts 1481 it removes ground from relay 1450, but relay 1450 does not restore immediately due to the condenser resistor circuit connected in shunt therewith. At contacts 1482, relay 1480 lights the associated lamp to indicate the condition of the register. At contacts 1485 it connects a resistance ground to lead C1708(32), contacts 3235, wiper of level F of switch MMCO2 to lead C3285(61) or lead C3286(68) depending upon which contact switch wiper F is associated with. Lead C3285 extends, for example, to the Cross Office Unit 5400, while lead C3286 extends to the Cross Office Intercept 6800. Lead C3285 extends the resistance ground through the lower winding of relay 6110 to relay 6070, but only relay 6110 operates, while lead C3286 extends the ground through the lower winding of relay 6820 to relay 6830, but only relay 6820 operates.

At contacts 6112 relay 6110 places ground on lead C3229(32). This ground holds relay 5950 operated over contacts 5945 and shunts down the operated test relays 1760 and 1770 in the Finder Relay Unit 1600. These relays restore without affecting relay 1810, which remains operated over its previously described holding circuit. At contacts 6116 a point in a self-interrupting circuit for the motor magnet of switch 5200 over lead C5221(52) is opened. At contacts 6117 relay 6110 forwards the battery from the winding of relay 6060 through previously operated make contacts 6124 over lead C5202(52), the wiper of level C of the incoming selector switch 5200 on the contact corresponding to the incoming Line Circuit 400, lead C5201(9), contacts 923 to ground on release key contacts 999. Relay 6060 operates in this circuit and operates relay 6010 over contacts 6061 and key contacts 6069. A circuit prepared for relay 6040, at contacts 6115, is completed on operation of relay 6060 from ground on lead C601(52), level D of switch 5200, lead C5203(61) and contacts 6115 and 6064. Relay 6060 completes an energizing circuit for the upper winding of relay 6110 from key contacts 6069, over contacts 6063 and 6113. It will be recalled that relay 640 in the Line Circuit 400 had operated and extended ground from contacts 642 over contacts 741, 931, through the winding of relay 680. This ground was extended over lead C5203(61) to energize relay 6040 as just explained.

At contacts 6066 relay 6060 connects the reperforator magnet 5349 associated with the cross office unit to the transmitter of the incoming line over the following connection: —60 volt battery and the right windings of the reperforator line magnet 5349, lead C5322(60), rectifier 6029, the winding of alarm relay 6020, rectifier 6028, contacts 6066, lead C5204(52), the wiper of level E of the incoming selector switch 5200, conductor C798(7) corresponding to the incoming line, contacts 744 and conductor C394(3) to resistance ground through the stop contacts 374 on the transmitter 390. Relay 6020 was normally held operated, before operation of relay 6060, by current of the same direction extended from resistance ground through contacts 6065 and through rectifier 6028, etc.

Relay 6040 operating as before mentioned, at contacts 6041 removes ground extended from key contacts 6069 and lead RS1 to relay 6150. Relay 6150 does not restore immediately due to the condenser resistor circuit connected thereto for maintaining it operated for a period of time. As the message is received cross office, the reperforator periodically grounds lead C5399(60) momentarily at contacts 5391 to provide energizing spurts to relay 6150 and maintain it operated. In the event it should release due to a fault condition, it closes ground from key contacts 6069, over contacts 6151 to energize the upper winding of relay 6160. At contacts 6164, 6165 and 6166, it extends various signal circuits. Relay 6160 energizes its lower winding at contacts 6163 from ground at contacts 6179. At contacts 6162 it extends ground over contacts 6111, lead C5211(32), level B of switch 5200, lead C5212(51) and key contacts 5111 individual to the line circuit at the supervisor's position, lead C5201(9) to operate relay 930. Relay 930 energizes the lower winding of relay 860, which stops the reader 300 at contacts 861. At contacts 931 it opens the circuit extending through relays 680 and 6040. At contacts 934 and 935 it extends several signal circuits. Relay 6010 closes contacts 6017 to extend ground to the wiper of level F of switch MMPR1. At contacts 6019 ground is also extended from contacts 5954 through contacts 6218' to the F wiper of switch MMPR1. If the wiper is standing on its fourth, fifth, or sixth contact, indicating a high precedence message is waiting, the ground is forwarded over one of these contacts in multiple to the upper winding of relay 6310 to energize that relay. The ground is also forwarded over lead C5189 (51) to light high precedence lamp 5188 at a position individual to the cross office unit. At contacts 6312 relay 6310 forwards the ground from contacts 6019 or 6218' or from 6017 to energize its lower winding. At contacts 6311 it forwards battery from the winding of relay 6220 over contacts 6329 to lead C4886(48) and the wiper of level D of the outgoing selector switch 4800 to a conductor such as 4888(70), which corresponds to the selected outgoing channel. Relay 6310 was operated immediately, if the message is high precedence, to avoid delay in transmitting the same. In the meantime other operations are proceeding as described below.

At contacts 6015 a circuit is prepared to the upper winding of relay 5930, but which is not completed as contacts 5951 and the tight tape contacts 5388 connected over lead C5398(60) are both open at this time. At contacts 6014 a point is opened in a stepping circuit for switch MMOG1, and at contacts 6013 a circuit is prepared to the lower winding of relay 6250, while at contacts 6012 a point in an incomplete circuit to the upper winding of relay 6130 is opened.

At the incoming line circuit relay 680, which was connected in series with relay 6040 also operated. It forwards the ground on lead C5201(52) past contacts 682 and previously operated contacts 647 to relay 630, which operates. At contacts 681 relay 680 prepares a circuit for the transmitter clutch magnet MM2. Relay 630 at contacts 637' locks directly to ground on lead C5201(52). At contacts 634 a holding circuit to both relays 660 and 670 is opened, however they remain operated over their respective locking contacts to ground over contacts 751 and lead RL1. At contacts 639' it opens the circuit for energizing the upper winding of relay 650. At contacts 632 it connects ground from the slack tape contacts 343 of transmitter 390 and lead C699(6) through contacts 741 and 931 to the winding of relay 680, and at contacts 638 opens the circuit to relay 640 by disconnecting lead C696(16) therefrom. This also restores relay 1730 in the Finder Relay Unit 1600. At contacts 633 it opens the circuit to the lower winding of relay 650 so that 650 is now restored. At contacts 636 it opens the circuit to relay 690; the lower winding of relay 595 and to relay 610 so that they restore, and at contacts 636' it opens the original circuit for operating relay 690 by disconnecting lead C397(3) therefrom. Release of relays 650 and 690 now completes the circuit for the transmitter clutch magnet MM2 over contacts 681, 691 and 651 and lead C698(3). As long as the transmitter slack tape contacts 343 remain closed relay 680 continues to receive ground over lead C699(6) and remains operated. At contacts 639 relay 630 grounds lead C696(16) to enable the register switch MMIF to step past the contact thereon, associated with this circuit. Ground is also now forwarded from contacts 928, 656, 612 and 644, over contacts 861 and lead C899(3) to operate the reader clutch magnet MM1 over contacts 342. The message is now processed by the reader 300 and transmitter 390. Signals from the transmitter are now sent in sequence for each character over leads C394(6), C798(52), level of switch 5200, lead C5204(60), winding of relay 6020 and lead C5222(53) to the winding of magnet 5349 to cause it to perforate the tape at the cross office unit in accordance with the message characters.

In the event the message was routed to intercept, operation of relay 1480 in the Supervisory Unit 1300 extended ground from contacts 1485 over lead C1708(32), as previously described. This ground is extended over level F of the Cross Office Finder switch MMCO2 and lead C3286(68) to operate the lower winding of relay 6820 in a manner described for the operation of relay 6110. At contacts 6821 it prepares a circuit to forward ground from the reperforator tape feed contacts such as 5391 and lead C5399(68) to relay 6940. It also holds alarm relay 6940 operated from ground at contacts 6861. At contacts 6823 it grounds lead C3207(32) to restore relays 1760 and 1770 in the register. It institutes a corresponding series of operations for the Cross Office Intercept 6800, as described for Cross Office Unit 5400. Thus it extends ground from key contacts 999 in the selected incoming line circuit over lead C5201(52) and the incoming selector switch associated with the line circuit in a manner similar to that previously explained, and from there over lead C5202(68), contacts 6824 to operate relay 6840 for a similar purpose as relay 6040. At contacts 6842 it completes a circuit to the upper winding of relay 6820 over contacts 6825 from ground at contacts 6921. At contacts 6846 it disconnects the Cross Office Intercept resistance ground extended through relay 6910 to the cross office reperforator magnet and extends the line circuit ground from the leads C394(3), C798(52), and C5204(68) through relay 6910 and the associated rectifiers to the reperforator magnet over lead C5322(53). Relay 6910 serves the same purpose as previously described relay 6020 and its associated rectifier bridge acts in the same manner as the bridge associated with relay 6020.

Relay 680 has ground extended therethrough over lead C601(52) through the wiper of the level D of the incoming selector switch, lead C5203(68), contacts 6834, 6855 and 6844 to operate relay 6860. Relay 6860 opens contacts 6861 to permit the tape feed to control relay 6940 in a manner explained for relay 6150. Operated relay 680 in the incoming Line Circuit 400 completes an already described sequence of operations for operating relay 630 which in turn restores relays 610, 595, 640, 650, and 690. The reader clutch magnet and transmitter clutch magnet operate to process the message, while the register relay 1730 is restored, as described. The message is now transmitted from the transmitter 390 to a reperforator magnet such as 5349 at the intercept position and recorded on a tape thereat.

It will be recalled that on an intercept routing, ground is extended from the register, over lead C1605(6) to operate relay 760, as described. It prepares a circuit for relay 750, and a holding circuit for itself at contacts 762 from ground at both contacts 661 and off-normal springs 503. When the register releases ground is removed from lead C1605(6) to permit relay 750 to operate. It opens the holding circuit for relays 660 and 670 at contacts 751. Relays 660 and 670 therefore restore, when relay 630 operates, as their holding circuits are ineffective. On restoring relay 660 closes a circuit at contacts 662 for the motor magnet MM3 which steps its wipers home self-interruptedly over springs 502 and 501. Relays 760 and 750 now restore. The release of relay 670 disconnects lead C359(3) from relay 720 to prevent a channel number discard which occurs on operation of relay 720 during the transmission of a message to a Cross Office Unit as will be explained.

*Register release*

Relay 1730 in the Register Finder Relay Unit 1600 restores as described, either on operation of relay 630 in the Line Circuit 400 or on operation of relay 1750 in the event a cross office position was not available. At contacts 1733 it opens the circuit to relay 1710, which restores. Relay 1710 at contacts 1711 opens the circuit to relay 1310 and disconnects the various leads from switch MMIF at contacts 1712–1719'. Relay 1310 on restoring, disconnects ground from lead C1301(34), lead C1302(33) and lead C1303(33). At contacts 1316, it opens the circuit for the upper winding of relay 1320.

At contacts 1319 it removes ground from lead C1304(22) and at contacts 1319' it removes ground from lead C1305(27). Ground restored at contacts 1314 is forwarded over off-normal springs 1339 and the self-interrupting contacts of motor magnet MM7 to energize it. It steps its wipers home in a self-interrupted manner at which time its off-normal springs open. This removes one ground for operating the lower winding of relay 1320 from off-normal springs 1338 and contacts 1475.

Ground removed from lead C1301(34) enables slow-to-release relay 3650 to restore in the event the register did not step switch MMOGS. The removal of this ground also opens the locking circuit for relay 3450 over contacts 3454. Ground removed from lead C1303(33) causes relays 3520 and 3530 to restore in addition to any operated one of the register group relays RG1—RG10 or one of the register terminal relays RT1—RT25. Likewise removal of this ground causes either operated one of the relays 3540 or 3560 to restore, if they were operated. The restoration of these relays removes the original operating ground from relay 3450. Removal of ground from lead 1302(33) restores relays 3330 and 3310. It also removes ground from lead 3306(24) to restore relay 2440.

Removal of ground at lead C1304(22) causes the restoration of any operated one of the precedence register relays 2060, 2110, 2140, 2170, 2210, or 2240 and restoration of relay 2030, if relay 3040 is unoperated. Their restoration causes release of relay 1970 at contacts such as 2064, and it in turn opens the original circuit for operating relay 2260 to contacts 1974. Restoration of relay 2030 opens a circuit to the lower winding of relay 1510 at contacts 2031, and at contacts 2032 the original circuit to relay 2720 is opened.

The removal of ground from lead C1305(27) causes the restoration of relays 2720 and 2740, if operated. This enables relay 2710 to restore in turn at contacts 2721 and 2741. Restoration of relays 2720 and 2740 opens a circuit to the lower winding of relay 1510 at either contacts 2722 or 2742. Likewise removal of ground from lead C1305(27) causes the restoration of relays 2930, 2950, 3020 and 3030, if they are operated.

Relay 1310 on restoring removes ground from contacts 1318, thereby restoring relay 1570. Relay 1570 removes ground at contacts 1571 from lead C1503(31) to restore relays such as 3130 in each Cross Office Finder 3100. Relay 3130 opens its contacts to remove the holding ground from any operated register relays L1—L25. The restored register relay opens its contacts to remove ground from lead C3173(28) to restore relay 2770. It also replaces ground from contacts such as L1E over the B level of switch MMCO2 to restore relay 3230. At contacts such as L1B relay 3210 is restored. Ground is therefore placed upon leads C3202(18) and C3201(17). Ground on lead C3202(18) restores relay 1820, while removal of ground from lead C3201(17) restores relay 1740. Restoration of relay 1740 opens the circuit to relay 1810, which in turn opens the circuit to relay 1830 at contacts 1813. At contacts 1814 a self-interrupting stepping circuit is completed for switch MMITS from off-normal springs 1833. It steps to open the circuit to relay 1840, which restores to open the circuit to relay 1480. At off-normal springs 1834 one holding ground over lead C1709(13) for the lower winding of relay 1320. At contacts 1811 the circuit to relay 3040 is opened and it restores.

At contacts 3043 relay 3040 removes another ground for holding the precedence register 2060, etc. and relay 2030. They now restore as described to accomplish already described results. At contacts 3044 and 3046 ground is removed from lead C3093(30) to restore relay 2250. Ground is now forwarded from off-normal springs 2204, the self-interrupting springs of switch MMPS1 over lead C3094(30), contacts 3045, lead C3009(22) to energize the motor magnet of switch MMPS1. It steps its wipers home in a self-interrupted manner. At off-normal springs 2205 it opens another point for furnishing ground to lead C1709(13) and the lower winding of relay 1320.

At contacts 3046' a self-interrupted stepping circuit is completed to the motor magnet of switch MMIGS from off-normal springs 3053. Switch MMIGS steps home and removes one ground at off-normal springs 3054 from lead C1709(13). Relay 3050 which is held operated over springs 3053 and switch MMIGS self-interrupting springs and contacts 3045' restores, when relay 3040 opens contacts 3045'. At contacts 3047' ground is removed from lead C3079(36) to restore relay 3620. Relay 3620 opens contacts 3625 to restore relay 3640. It restores contacts 3642, but as ground is already removed from lead C3096(30) relay 3630 does not operate. A self-interrupting circuit is completed to the motor magnet of switch MMOGS from ground at off-normal springs 3615 through contacts 3624, and a circuit is completed to the motormagnet of switch MMOTS through its self-interrupting contacts, contacts 3622 and off-normal springs 3647. Both switches MMOGS and MMOTS step their respective wipers home in a self-interrupted manner, and open off-normal springs 3616 and 3648 to remove ground from lead C1709(13).

The motor magnet MM8 is stepped by a periodic pulse, provided in any well known manner, over lead 1379, contacts 1556 and 1329. Thus if the register is not released before switch MMTM is stepped to its third contact, a circuit is completed over contacts 1326, and the switch wiper to relay 1430. It energizes its upper winding at contacts 1433 and operates signal circuits at contacts 1421 and 1422. If in an additional period the register is not released, relay 1440 is operated over the fourth contact of switch MMTM to provide additional signals. This also extends ground to lead C1502(17) to operate relay 1750 for initiating the register release as explained. If the register is not released in several additional periods, a ground is extended over the sixth contact of switch MMTM to operate relay 1550. It opens contacts 1556 to prevent further timing and provides the appropriate signals. When all the switches except MMTM have been stepped home to remove ground from lead C1709(13), the lower winding of relay 1320 is deenergized. The relay now restores its contacts to permit the register to again be seized for use with an incoming line, and at contacts 1329' completes a homing circuit for switch MMTM over off-normal springs 1388.

*SOM cross office transmission*

It will be recalled that the incoming line reader and transmitter clutch magnets MM1 and MM2 respectively operated, when the cross office unit signalled the line circuit that it was ready to receive the message. The incoming line reader and the transmitter therefore process the message, which is transmitted cross office, as signals over leads C394(7), C798(52), and C5204(60), through relay 6028 and over lead C5322(53) to the perforator magnet 5349 in the cross office unit. It reperforates a tape which is then transmitted past the sensing pins of the cross office reader. The cross office reader and the transmitter operate as one unit and are both referred to by the reference characters 5390. A slack tape switch arm normally rides the tape between the perforator and the reader to close contacts 5387 when the tape is slack. A ground is therefore extended over lead C5387(59), contacts 5932, contacts 6141, 6212, 6251, 6324 and lead C5308(53) to energize the reader transmitter clutch magnet MM21. The clutch magnet operates the reader transmitter as one with about ten characters of tape between their sensing pins. Thus with slack tape available and the clutch magnet MM21 operated, the reader will shortly begin to sense the perforations in the tape in a manner described. The perforations of the tape are converted into ground pulses on leads 1', 2', 3', 4', 5', 6', 7', C5378(55) and 8' in a manner similar to that described for leads 1, 2, 3, 4, 5, 6, 7, C896(8) and 8 respectively.

The transmitter 390 in the incoming unit opens a stop contact 374 before each sensing cycle to remove the resistance ground connected to lead C394(7), and closes the start contacts 361 to temporarily place negative 120 volt resistance battery over lead C394(7), etc. to the windings of the perforator line magnet 5349 as a start signal. As the code perforations of the character are sent this battery is successively applied or replaced by resistance ground over either contacts 336—340 or 331—335 respectively. Contacts 362—366 close in sequence after the start signal is sent at the beginning of each sensing cycle and contacts 331—335 are closed in accordance with the tape perforations. Contacts 331—335 are controlled in succession during each five unit cycle as are contacts 336—340, which are controlled during the same period as their respective associated contacts 331—335. Thus the initial negative 120 volt battery indicates a space as a start of a five unit character cycle to the reperforator magnet 5349, and each of the five cycles that follow provide a sequence of mark and space conditions depending on the particular character being sent. Finally a mark is sent at a stop signal when contacts 374 close at the end of each cycle. In addition a numbering pulse is provided to lead C316(8) during each cycle from ground through presensing contacts 376. The ground at contacts 376 is also applied to contacts 367, 368 and 377, and if any of them are closed in response to the characters Z, carriage return or line feed respectively, the ground is transmitted on the next transmitter sensing cycle to leads C397(6), C1605(6) or C359(6) respectively. The bridge rectifier associated with relay 6020 allows the current to flow in only one direction through the relay, as when the —120 volt battery is applied thereto over lead C5204(60), rectifiers 6027 and 6026 pass current instead of 6028 and 6029 as during the time ground is applied to lead C5204(60). If the signal circuit opens, relay 6020 restores to close contacts 6021 and forward ground from contact 5944 to the upper winding of relay 6160.

Relay 6160 energizes its lower winding from ground over contacts 6163 and key contacts 6179. At contacts 6165 and 6166 it operates signal circuits. At contacts 6164 it forwards ground over leads C5177(51) to light lamp 5190 at a position individual to the cross office unit. At contacts 6162 ground is forwarded over contacts 6111, lead C5211(52), conductor C5212(51), key contacts 5111 individual to the line circuit, lead C5101(9) to operate relay 930. Relay 930 at contacts 931 opens the circuit extending between relays 680 and 6040 so that they release. Relay 680 opens contacts 681 to stop the clutch magnet MM2. At contacts 933, 934 and 935 various signal circuits are operated. At contacts 932, ground is extended to lower winding of relay 860 which operates. It opens the circuit to the reader clutch magnet at contacts 861.

The transmitted signals operate reperforator line magnet 5349 in a manner corresponding to the signal being sent and it perforates the tape, which is then fed to the reader transmitter unit 5390. The reader senses the first character of the SOM, which is Z. It extends ground, to lead 6' in a manner explained for lead 6 at the incoming unit, over contacts 5412 and 5535 to operate relay 5510. Relay 5510 prepares a holding circuit for itself through the upper winding of relay 5520, contacts 5511, and 5472 to ground at key contacts 6179. At the end of the sensing cycle the upper winding of relay 5520 is energized in the holding circuit and the relay closes its contacts to prepare a circuit for relay 5530 at contacts 5521. At contacts 5523 it operates relay 5410 which opens lead 6' and 7' at contacts 5412 and 5411 respectively, and connects leads 1'—5' and 8' to their respective cross office sensing relays 5420—5470. When the first C of the SOM is sensed, relays 5430, 5440 and 5450 are operated in a manner previously described for the sensing relays of the incoming unit. A completed detection chain circuit furnishes ground to the lower winding of relay 5520 over contacts 5431, 5421, 5441, 5451, 5461, 5522 and 5533. Relay 5470 operating during the sensing cycle from ground on lead 8' opens the holding circuit for the upper winding of relay 5520 and the winding of relay 5510. Relay 5510 therefore restores and prevents the recompletion of this holding circuit. At the end of the sensing cycle the lower winding of relay 5530 energizes in series with the lower winding of relay 5520 over contacts 5521 and 5512 to ground through contacts 5472 and the aforementioned key contacts. As soon as the detection chain ground which shunts the lower winding of relay 5530 is removed the lower winding of relay 5530 energizes over the just mentioned circuit. A detection chain circuit is now completed and prepared at contacts 5534 to the upper winding of relay 5530.

Z is next sensed by the cross office reader and leads 1' and 5' are grounded to operate relays 5420 and 5460. They complete a detection chain circuit from contacts 5444, 5453, 5463, 5432, 5434 and 5542 to energize the upper winding of relay 5530. It preparts a holding circuit for itself through the upper winding of relay 5540. Relay 5470 opens the holding circuit to the lower winding of relays 5520 and 5530 and relay 5520 restores. At the end of the sensing cycle, when relay 5470 is restored and the shunting ground from the detection chain is removed, the upper winding of relay 5540 energizes in series with the upper winding of relay 5530 over contacts 5531, 5521 and contacts already described. It prepares a circuit to its lower winding at contacts 5543 so that during the C sensing cycle, which follows, a circuit is completed in a manner similar to that already described for relay 5520 to the lower winding of relay 5540 with the exception that contacts 5543 are used instead of 5522 and 5533. Relay 5470 opens the holding circuit to the upper windings of relays 5530 and 5540 and relay 5530 restores. At the end of the sensing cycle the lower winding of relay 5550 energizes in series with the lower winding of relay 5540 over contacts 5541, 5532 and contacts 5572 to the release key contacts in the manner described, and the message continues to be transmitted cross office. The upper winding of relay 5550 operates over contacts 5557 5688 and 6253. The next character sensed results in the operation of relay 5470. It opens contacts 5472 to restore the lower windings of relays 5540 and 5550. Relay 5540 on restoring opens the circuit to relay 5410 at contacts 5544, and it restores.

In the meantime the lead C5378(55) extends ground, when each character except a line feed or blank is read, over contacts 5554, 5564 and 5585 to energize the motor magnet of switch MMCTG1. The first pulse does not occur on lead C5378(55), until a character other than a blank or line feed is read, to permit slack tape between the reperforator 5349 and the reader to be taken up until the SOM appears. Switch MMCTG1 steps its wipers each time the ground is removed. If eleven characters are read without relay 5550 operating to open contacts 5553, indicating the receipt of a usable SOM, ground from release key contacts 6179 is forwarded over contacts 5553, contacts 10 switch MMCTG1 and its wiper, over contacts 5683, 6256 to the upper winding of relay 6140. At contacts 6141 opens the circuit to the clutch magnet MM21 of the reader transmitter 5390, and at contacts 6142 provides an energizing circuit to its lower winding. Contacts 6143 and 6144 close to provide signal circuits and at contacts 6145 relay 6140 forwards ground over leads C5178(51) to light lamp 5179 individual to the cross office unit.

At contacts 5556 relay 5550 forwards ground, when operated, from key contacts 6179 and contacts 5562 over off-normal springs 5691 and the self-interrupting springs of switch MMCTG1 to step the switch home in a self-interrupted manner at which time springs 5691 open to break the homing circuit. At contacts 5558 the motor magnet of switch MMADV is connected to lead C5377(53). This lead provides a pulse for each operating cycle of the cross office reader transmitter unit 5390.

A new SOM is added by the outgoing equipment to the outgoing mesage. The old SOM, is sensed at the cross office unit as explained and is advanced through the transmitter of the reader transmitter unit 5390, before an outgoing channel is demanded in the case of a low precedence message. Lead C5377(56), which is pulsed once per cycle of the reader transmitter unit 5390, extends ground on the first cycle, after operation of relay 5550, over contacts 5558 and contacts 6214 to the motor magnet of switch MMADV. At the end of each ground pulse on lead C5377(56) the motor magnet of switch MMADV deenergizes and steps its wiper once. On the eleventh pulse its wiper is standing on contact number 10 so that the ground from lead C5377(53) is also extended directly to the lower winding of relay 6210, which operates. As there are about ten characters between the reader and transmitter, counting the same enables the SOM to reach the transmitter before relay 6210 is operated. The upper winding of relay 6210 energizes over contacts 6215 to ground at off-normal springs 5692 and also to ground at contacts 6242 and 6252. The motor magnet takes a step on cessation of the pulse to deenergize the lower winding of relay 6210. At contacts 6211 a self-interrupted stepping circuit for the motor magnet of MMADV is completed through contacts 5686, the off-normal springs 5693 and the magnet self-interrupting springs. The magnet now steps its wiper home, although lead C5377(53) has been disconnected therefrom at contacts 6214. At contacts 6218 a circuit is prepared for relay 6270, which circuit is completed if the message is high precedence and the channel is busy. At contacts 6219 ground is extended from previously operated contacts 6017 to the lower winding of relay 6310, which now energizes in the case of a low precedence message. At contacts 6212 it disconnects lead C5308(53) from lead C5387(53) to deenergize the motor magnet MM21 of the reader transmitter unit 5390, and at contacts 6213 prepares a circuit for relay 6260.

Transmission to a cross office intercept position proceeds in much the same manner with the exception that sensing apparatus for providing an SOM indication is not provided. The message is simply reperforated by the cross office intercept line magnet and processing by an associated reader transmitter and cross office unit does not begin, until the operator takes the appropriate steps.

*Outgoing channel seizure*

Operated relay 6310, which operates immediately as explained on seizure of the cross office unit in the event of a high precedence message or after the SOM is transmitted cross office on a low precedence message, connects lead C488(48) to relay 6220 in a manner already described. At contacts 6312 it provides a locking circuit for its lower winding to ground at contacts 6017 and after relay 6110 operates a circuit thereto is also extended over contacts 6119 as explained. Lead C4886(48) is extended to the wiper of level D of the outgoing selector switch 4800 and from there it is extended over a contact corresponding to the selected outgoing channel to lead C4888(70), through the high resistance winding of relay 7040 to ground at contacts 7037. Relay 6220 does not operate in series with relay 7040 due to the high resistance of the latter. Actually other cross office units may simultaneously extend battery from a relay such as 6220 to lead C4888(48). Relay 7040 in the Outgoing Channel Unit 7000 operates, and at contacts 7041 prepares a circuit for the lower winding of relay 7030, which is completed, when the outgoing channel is idle or about to become idle. At contacts 7042 it extends lead CH1 which is grounded by the first Outgoing Channel Unit of a multichannel group, when it becomes busy, to lead C5029(50) for operating the outgoing channel busy relay 5010 to indicate that all channels of the multichannel group are busy. Of course if other channels are provided in the multichannel group lead CH1 is first extended to contacts such as 7042 in the preceeding outgoing units associated with the channel group, and if the channel is a single channel instead of multichannel no chain such as just described need be provided.

Thus with the channel idle or about to become so, ground is connected from contacts 7073, 7112, 7151, 7113 and 7041 to energize the lower winding of relay 7030. Relay 7030 operates and disconnects the ground at contacts 7037 from relay 7040 to restore it. However, relay 7030 has energized its upper winding over contacts 7038, lead C6401(64) to ground at contacts 6518 in the Outgoing Finder Link 6400 common to this and 24 other outgoing channels. At contacts 7039' ground is extended over lead C6601(66) to energize relay 6620 in the Outgoing Finder Link 6400 associated with twenty five outgoing units such as 7000. At contacts 7032 relay 7030 initiates operation of the motors of the monitor typing reperforator and the markable transmitter indicated by box as 7302 and 7301 respectively and individually associated with the outgoing channel unit. At contacts 7033 ground is removed from lead C6602(66) and resistance battery is placed thereon to mark this outgoing channel on level A of the Outgoing Finder Link switch MMFD1. At contacts 7038' the multi-channel busy relay maintained operated or the chain circuit thereto maintained prepared.

Relay 6620 in the Outugoing Finder Link 6400 operates to close contacts 6621 and extend ground from contacts 6513, through the winding of relay 6630, the self-interrupting springs the motor magnet of switch MMFD1, contacts 6631, 6621 and 6511 to the motor magnet of switch MMFD1, while ground is also forwarded thereto from contacts such as 7033, and a lead such as C6602(66) of an outgoing channel unit which is not using the link and the A wiper of switch MMFD1. The motor magnet therefore energizes, and steps its wipers in a self-interrupted manner. On finding resistance battery over level A, lead C6602(70) and contacts 7034, it terminates the stepping of its wipers. The battery is forwarded through the winding of relay 6630 to ground at contacts 6513 and relay 6630 operates. It opens the stepping circuit to the motor magnet of switch MMFD1 at contacts 6631. At contacts 6632 it extends ground from contacts 6641, through contacts 6516, the wiper of level B of switch MMFD1, C6603(70) extending to the selected Outgoing Channel Unit 7000, contacts 7036 over lead C4888(48) the wiper of level D of each outgoing selector switch 4800 associated with the channel, lead C4886(63), contacts 6329 and 6311 energize relay 6220. A similar relay is energized in each cross office unit attempting to seize the outgoing channel and a precedence comparison test must now be performed. In the meantime relay 6520 opens the circuit to relay 6450 at contacts 6622, but it does not drop back immediately so as to provide sufficient time for the test to be performed.

At contacts 6225 resistance battery is extended to the wiper of level C of switch MMPR1 over lead C5745, and at contacts 6224 ground is extended to level D of switch MMPR1 over lead C5746. Bank contacts 1, 3 and 5 of level C of switch MMPR1 are connected to different respective precedence designation leads C4804(48), C4803(48) and C4802(48), each corresponding to two different message precedences, and which extend to the wipers of levels F, G and H respectively of the outgoing selector switch 4800. Likewise contacts 2, 4 and 6, level D of switch MMPR1 are respectively connected to leads C4804(48), C4803(48) and C4802(48). Thus either ground or −120 volt resistance battery is provided to one lead such as C4802, C4803, or C4804 which are individual to two precedence designations for forwarding a precedence designation marking, individual to the message being handled by each cross office unit having a selector switch set to the outgoing channel. From levels F, G and H of each outgoing selector switch set to the outgoing channel, the leads are connected respectively over leads C4811(66), C4812(66) and C4813(66) to levels D, C and E of switch MMFD1 in the Outgoing Finder Link 6400, which has set itself as previously explained to the outgoing channels and therefore to the same contacts as each outgoing selector switch set to the outgoing channel. The respective selector switch wipers standing on the contact corresponding to the outgoing channel extends the potential provided by its associated cross office unit to one of the levels and to contacts 6633, 6634 or 6635 respectively and from there to the left side of relays 6610, 6550 and 6530 respectively and to the right sides of relays 6560, 6540 and 6520 respectively. The other side of each of the above relays is connected to −60 volt resistance battery through a rectifier individual to the relay. Assuming −120 volt battery had been forwarded over lead C4802(48) from the C wiper of switch MMPR1 on its fifth contact, over wiper H of the outgoing selector switch 4800, lead C4813(66), level E of switch MMFD1, contacts 6635, through the winding of relay 6520 and the rectifier associated therewith to −60 volt battery, relay 6520 operates. If ground was forwarded from lead C4802(48) as a result of switch MMPR1 in another cross office unit standing on its sixth contact, relay 6530 is operated instead. In a similar fashion ground or battery is extended over leads C4803(48) and from lead C4804(48) to leads C4812(66) ad C4811(66) respectively to relays 6540 and 6550 and relays 6560 and 6610 respectively. Ground on lead C4812 operates relay 6550 and ground on lead C4805 operates relay 6610, while battery on leads C4812 and C4811 respectively operates relays 6540 and 6560 respectively. Because the ground applied to lead C4813, C4812 or C4811 is direct, the higher precedence relay 6530, 6550 or 6610 of any pair, respectively is operated in preference to the associated lower precedence relay 6520, 6540 or 6560 respectively when ground and resistance battery are simultaneously applied to one lead by different cross office units.

Each one of the precedence designation register relays 6520—6560 and 6610 in the Outgoing Finger Link 6400 is arranged to extend a corresponding precedence designation lead at make contacts such as 6521, 6531, 6541, 6551, 6561 or 6611 respectively, over contacts 6637, the wiper of level F of switch MMFD1, lead C6608(70) individual to the outgoing channel, to battery to relay 7010. Each one of the aforementioned precedence designation make contacts is extended to contacts 6637 and the wiper of level F of switch MMFD1 through break contacts of each pair of higher precedence register relays. Thus with one of the low precedence relays 6520 or 6530 respectively, operated the corresponding precedence designation lead is extended through break contacts such as 6542, 6552, 6562 and 6612 to contacts 6637. Likewise the make contacts 6541 or 6551 are extended through break contacts 6552 and 6612. Therefore the operated relay representing the highest precedence nullifies the other operated precedence relays 6520, etc. The precedence designation leads 6740(67)—6745(67) of each Outgoing Finder Link extends from the respective make contacts of the precedence relays 6520—6560 and 6610 towards respective levels B, C, D, E, F and G of each Cross Office Assigner Switch 6700 associated with the Outgoing Finder Link. As each Cross Office Assigner serves 25 cross office units, as many of them as necessary to serve all the cross office units are provided with each Outgoing Finder Link. Thus the battery to relay 7010 is extended over only one of the just mentioned precedence leads C6740(67)—6745(67) from the Outgoing Finder Link to an individually corresponding wiper B—G of each associated Cross Office Assigner Switch.

In the meantime relay 6220 at contacts 6221 and 6223 respectively extends ground from contacts 6218 to the wipers of levels B and C respectively of switch MMOG1. In the event that relay 6210 has not been operated, as in the case high precedence message, although relay 6310 is operated to enable participation in the precedence test, while the SOM resulting in the operation of relay 6210 has not yet been received, the ground is not extended from contacts 6218 until relay 6210 operates. Participation in the test prevents another unit from seizing the channel if it has lower precedence. The ground on the B wiper of switch MMOG1 is forwarded over the lead such as C6701(67) to the cross office assigner switch such as 6700 having access to this cross office unit and associated with the Outgoing Finder Link having access to the desired outgoing channel. On switch MMOG1 each cross office unit has access to a number of cross office assigner switches such as 6700 associated with respective Outgoing Finder Links, and which serve 25 cross office units. Thus as switch MMOG1 has been set to select an outgoing selector switch having access to the outgoing channel, it has also been set to the cross office assigner switch associated with the Outgoing Finder Link having access to the same outgoing channel. A cross office assigner switch 6700 of different Outgoing Finder Links is therefore multiplied to an individually corresponding contact on level B of each switch such as MMOG1 in each cross office unit, which it serves. The ground on lead C6701(67) from each cross office unit desiring to seize Outgoing Channel Unit 7000 is therefore forwarded to operate a relay such as 6710 in the cross office assigner switches associated with the Outgoing Finder Link 6400, which serves the outgoing unit. A number of cross office assigner switches associated with Outgoing Finder Link 6400 may thus begin operation simultaneously.

Relay 6710 closes contacts 6712 to ground lead C6702(64), and connects the motor magnet of the Cross Office Assigner Switch 6700 through its self-interrupting contacts, contacts 6711 and 6722 to ground to energize it. It steps its wipers in a self-interrupted manner until it finds ground over contacts 6721, slow-to-operate relay 6730, the wiper of level A, lead C6705(59) individual to Cross Office Unit 5400, to the wiper of level C of switch MMOG1. This ground holds the motor magnet operated to prevent it from stepping the switch, and also operates relay 6730.

The ground over lead C6702(64) in the meantime operates relay 6420. Relay 6420 extends ground at contacts 6421 to prepare a holding circuit for relay 6510, and at contacts 6422 extends another ground over lead C6401(70) to hold relay 7030 operated.

Relay 6730, operates sometime after the cross office unit is found, and it extends another ground over lead C6703(64) at contacts 6731. At contacts 6733 ground from contacts 6413 and lead C6704(67) individual to Cross Office Assigner Switch 6700 is extended to slow-to-operate relay 6720. At contacts 6732 and 6734—6738, relay 6730 connects, the respective wipers of levels B—G to leads C6740(65), C6741(65), C6742(65), C6743(65), C6744(65) and C6745(65) respectively. One of these precedence leads is marked by battery from relay 7010 in a manner explained when the highest precedence relay of the group 6520—6560 and 6610 was operated by the appropriate cross office unit. The wipers of levels B—G are connected at this time over leads C6751(57)—C6756(57) associated with the selected cross office unit to respective bank contacts on level E of switch MMPR1 in that cross office unit. The wiper of level E of switch MMPR1 is connected over lead C5747 to ground through relay 6350, and it extends the battery on the lead with which it is associated to ground through relay 6350. Of course if the precedence designation selected by relays 6520—6560 and 6610 was different than that corresponding to the position of switch MMPR1, the battery is not extended to relay 6350 in that cross office unit, but is extended to a similar relay in another cross office unit. Relay 6350 operates from the battery to extend the battery through its upper winding to the low resistance ground through relay 6360 at contacts 6351. Relay 6350 and 6360 operate in a manner explained for relays 1760 and 1770 in the register, if another cross office unit with the same selected precedence is attempting to seize the outgoing channel.

Relay 6720 operates after a period of time and opens contacts 6721 to cause the Cross Office Assigner Switch motor magnet to deenergize and step its wipers to succeeding contacts. As contacts 6721 and 6722 are held open the motor magnet does not reenergize. At contacts 6723 an additional holding ground is applied to lead C6703-(64). Relay 6730 also restores when its circuit is opened at contacts 6721 to disconnect the precedence leads C6740—C6745 and to open the circuit to relay 6720 at contacts 6733. The circuit to relay 6720 is opened before this in a manner, which will be explained.

Before the assigner switch is stepped, relay 6360 forwards ground from contacts 6259 over contacts 6361, through the winding of relay 6370, lead C4885(48), wiper of level A of the outgoing Selector Switch 4800, lead C4889(70), the windings of relay 7020 to battery. In the meantime, when the winding of relay 6360 was connected to relay 7010 in the Outgoing Channel Unit 7000, relay 7010 operated. At contacts 7011 it returns ground over leads C6605(66), the wiper of level G of switch MMFD1, contacts 6639 to energize relay 6410. Relay 6410 opens contacts 6411 to prevent the completion of a circuit to the upper winding of alarm relay 6430. At contacts 6412 it completes a self-interrupted homing circuit for switch MMALM through off-normal springs 6409 in the event it was stepped, and at contacts 6413 it removes ground from leads such as C6704(67) extending to each of the respective associated Cross Office Assigner Switches. This restores relays such as 6720 in each of the associated cross office assigner switches. At contacts 6414, it operates slow-to-release relay 6510, which holds operated from ground extended over contacts 6517 from lead C6703(67), until each one of the aforementioned relays 6720, 6730 and 6420 have restored. At contacts 6415 it completes its own holding circuit from off-normal springs 6408, if switch MMALM is operated, and when switch MMALM is stepped home these off-normal springs open to restore relay 6410.

Relay 7010 is restored, when the Cross Office Assigner Switch 6700 is stepped as a result of the operation of relays 6730 and 6720 as explained. It opens the original circuit for relay 6410, so that relay can restore when switch MMALM is stepped home or immediately, if the switch was not operated. Relay 6510 operating in the meantime completes a circuit at contacts 6515 to alarm relay 6450, before it restores due to the opening of contacts 6622. At contacts 6511 it opens the original circuit for stepping the motor magnet of switch MMFD1, and completes a circuit for energizing it at contacts 6512. At contacts 6513 it opens the circuit to relay 6630 and that relay restores. At contacts 6516, it opens a point in the circuit for extending ground over level B of switch MMFD1 and lead C6603(70), lead C4888(48), and lead C4886(63) to relay 6220. Relay 6220 therefore restores, to remove ground from switch MMOG1 wipers B and C at contacts 6221 and 6223 respective. Relay 6710 therefore restores, to release relay 6420. At contacts 6418 a point is opened in the circuit to the upper winding of relay 7030, and when relays 6420 and 6630 are restored to open contacts 6422 and 6638 respectively, relay 7030 is restored.

When relays 6730, 6720, 6420 and 6630 are restored the holding circuits to slow-to-release relay 6510 is opened at contacts 6731, 6723, 6421 and 6636 respectively, relay 6510 starts to restore. When it is restored the Outgoing Finder Link 6400 can be used with another outgoing channel, and switch MMFD1 is stepped to succeeding contacts as the energizing circuit therefore is opened at contacts 6511. At contacts 6514, relay 6510 recompletes the circuit to alarm relay 6440 before that relay can restore to complete a circuit for energizing the upper winding of relay 6430 at contacts 6441.

Relay 7030 restores its contacts to open the circuit to relay 6620 at contacts 7039'. At contacts 7033 it restores ground to the bank contact of switch MMFD1 level A over lead C6602(70). At contacts 7037 it connects relay 7040 back to lead C4888(48). Relay 7020 which holds operated in series with relay 6370, at contacts 7024 extends ground over contacts 7153 to operate relay 7070.

Relay 7070 at contacts 7073 prevents the reoperation of relay 7030 despite reoperation of relay 7040 when relay 7030 restored its contacts. Relay 6220 in the cross office unit does not reoperate because it receives ground through relay 7040 instead of directly. At contacts 7076, relay 7070 extends ground over contacts 7142, 7233 and 7215 to operate slow-to-release relay 7180. At contacts 7077' the windings of the monitor reperforator 7302 are connected through relay 7240 and the associated rectifier bridge, contacts 7229, resistance R4, contacts 7176 to lead C4881(48), switch 4800 level C to lead C4882(63), and resistance ground as will be explained. The resistance ground at contacts 7077' for the reperforator 7302 is removed. At contacts 7074 relay 7070 maintains the driving motor of the transmitter 7301 and the reperforator 7302 operated. Relay 7180 on operating removes ground from relay 7060, but it remains operated due to the condenser resistor network connected thereto. At contacts 7181 it extends ground from contacts 7231 and 7271 over contacts 7221 and lead MCL to operate the clutch magnet of transmitter 7301. At contacts 7182 it opens a possible stepping circuit for the motor magnet switch MMSDR. At contacts 7185 it connects lead C4887(48) through contacts 7168' to relay 7260. At contacts 7188 it extends ground through contacts 7219' and 7055 to lead C4883(48).

In the meantime relay 6370 in the Cross Office Unit having the highest precedence message, and which was first found by the cross office assigner switch has operated in series with relay 7020 in a manner explained. At contacts 6374 it completes its own holding circuit from ground at contacts 6259 to battery on lead C4885(48) through relay 7020 as explained. The release of relay 6360 when the circuit to it and relay 6350 is opened at the assigner switch therefore has no effect on relay 6370. At contacts 6373 it opens a possible circuit through the upper windings of relay 6320. At contacts 6377 it maintains ground on lead MC to operate the motors of the cross office reperforator and reader transmitter. At contacts 6378 and 6379' ground and resistance battery are extended to levels D and C respectively, to enable the Cross Office Unit to participate in a precedence test in the event a cancel transmission attempt takes place. At contacts 6372 it extends the ground forwarded to lead C4883(48), level B of switch 4800, lead C4884(63) to contacts 6344 and the upper winding of relay 6330, which operates. That is it operates as soon as relay 7180 in the Outgoing Channel Unit 7000 operates to extend ground to lead C4883(48). The cross office unit will now send an identifying number to a monitor reperforator associated with the outgoing channel so that the particular cross office unit sending the message may later be identified. It must therefore secure a markable transmitter for the purpose of sending this number to the monitor reperforator and therefore a Cross Office Selector Switch associated with this cross office unit and 24 others is used to search for a markable transmitter in a manner that will be explained. At contacts 6371 the lead C4881(48) extending through relay 7240 to the reperforator 7302 is connected through wiper C of switch 4800, lead C4882(63) to contacts 6342, 5816 and resistance ground at cinch plug terminal 5717.

If the registered precedence of the message which resulted in seizure of the Unit 7000 was higher than that of a waiting cross office unit, a circuit was not completed to relay 6350 or 6360 in that unit or if completed was not held. Relay 6370 in the lower precedence cross office unit therefore does not operate while relay 6220 therein restores as explained for the unit seizing the outgoing unit. The unsuccessful cross office unit remains connected to the Outgoing Unit 7000 via its Outgoing Selector Switch 4800, and as soon as the Unit 7000 becomes idle it will attempt to seize the same under control relays 7030 and 6220 as explained.

If a channel is to be locked out for the night key contacts 7049 are closed to extend ground over contacts 7035 and operate relay 7110. It opens contacts 7113 and 7112 to prevent operation of relay 7030. At contacts 7111 it forwards ground from contacts 7211, through contacts 7072 to operate a lamp for indicating the channel is locked out. As relay 7030 is prevented from operating the outgoing channel cannot be seized. In the event relay 7030 was already operated indicating that the outgoing unit 7000 has been seized contacts 7035 are opened to prevent the operation of relay 7110, when key contacts 7049 are closed. As soon as relay 7030 restores relay 7110 operates to prevent another message from being transmitted by the outgoing unit 7000. Relay 7070 operating when the channel is seized opens contacts 7072 to prevent the light from operating until the message is transmitted.

Under certain circumstances an outgoing channel unit may have to be taken out of service. In this case another channel unit is used to provide an alternate route for the messages intended to be passed through the first channel unit. In this case leads such as C4811, C4812 and C4813 extending to the contacts of the outgoing selector switch corresponding to the out-of-service channel unit are also connected to contacts on switch MMFD1 corresponding to the alternate channel unit. If the alternate channel unit is served by another outgoing finder link, the leads are of course connected to contacts corresponding to the position of the alternate channel on the switch MMFD1 in the other link. Lead C6608(70) extending to relay 7010 in the out-of-service channel unit is disconnected from relay 7010 and extended to the corresponding relay in the alternate channel unit. Leads such as C6605(66), C6603, C4881, C4889, C4883 and C4887 extending to each channel unit are connected together, while leads C4889, C4887, C4883 and C4881 are disconnected from the out-of-service channel unit. Ground is disconnected from the upper spring of contacts 7073 and the upper spring of contacts 7073 is connected to the lower spring of contacts corresponding to 7151 in the alternate channel unit. When relay 7070 in the alternate channel is restored, it closes ground to its contacts 7073 and that ground is now extended over contacts corresponding to 7112 and 7151 in the alternate channel and over the already described circuit to operate relay 7030 in the other channel unit, if relay 7040 in its respective channel unit has been operated by a cross office unit seeking to seize the channel. Relay 7030 initiates operation of relay 6620 in the outgoing finder link serving it, and it starts to search for the outgoing channel unit. If relay 7030 in both channels are operated ground is extended to relay 6220 in each cross office unit, and if relay 7030 in only one unit is operated it also permits relay 6220 in a cross office unit seeking access to either channel to operate, as soon as it connects thereto.

If the outgoing channels are served by different outgoing finder links a toggle switch associated with each link is operated to close contacts 6685 in each link and operate a relay 6640 individual to each link. Relay 6640 in each link opens contacts 6641 to prevent ground from being returned over switch MMFD1 level B and lead C6603 to relay 6220 in the cross office units directly under control of relay 6630. At contacts 6642 a circuit is prepared over lead C4558(45) to energize the motor magnet of switch MMOFA which is normally standing on contacts N. At contacts 6643 one ground is removed from lead C4550(45) to enable the outgoing finder link to be marked on the bank of level A of switch MMOFA when relay 6630 operates to remove the other ground at contacts 6639'. When the channel requests a finder link and is found by the outgoing finder link, relay 6630 is operated as described, and it opens contacts 6639' to remove ground from lead C4550(45). Lead C4558(45) is now marked by ground at contacts 6638', which is extended over contacts 6642 commoned to all the outgoing finder links to energize the motor magnet of switch MMOFA through its self-interrupting contacts. It steps its wipers in search of the lead such as C4550(66) having ground removed therefrom at which time it fails to reenergize. On finding the same, level B of switch MMOFA extends ground over lead C4559(65) corresponding to the selected outgoing finder link and over contacts 6516 and 6632, through level B of switch MMFD1, and lead C6603(70) extending to each channel and over an already described circuit to operate relay 6220 in the cross office unit seeking access to either channel. This arrangement prevents more than one of the two outgoing finder links from operating relay 6220 in the cross office units as one of the links may be set to an outgoing unit not involved in the patching, while the other link is set to a patched outgoing unit. If both links were permitted to ground lead C6603(70) the cross office assigner associated with the link not set to a patched unit might stop at a cross office unit waiting to seize an alternate channel unit.

The precedence comparison test is now performed as described, and if an outgoing finder link is set to the alternate and out-of-service channels respectively, a precedence comparison test is performed by both finder links. Battery from relay 7010 in the alternate channel unit only is extended over level F of switch MMFD1 in each link to operate relay 6350 in the cross office unit having the highest precedence as described. If the alternate channel is served by another link and it has been found by that link, while the first link finds the out-of-service channel, the battery from relay 7010 in the alternate channel is extended over the precedence comparison circuit of each link. When it operates it extends ground over lead C6605(70) to operate relay 6410 in each link and both links restore. If only one link is involved, relay 7010 in the alternate channel unit only is operated to extend battery over the precedence comparison circuit of the link, and when operated extends ground over lead C6605(66) to operate relay 6410. Relay 7020 in the alternate channel unit only is operated in series with relay 6370 in a manner described for the operation of relay 7020.

A corresponding series of operation now takes place for establishing seizure of the alternate channel unit in a manner described previously for channel unit 7000, while relays 7030 in each channel unit is restored as the link having access to the unit removes ground from lead C6401 to restore the upper winding. Relay 7070 in the alternate channel unit operating in a described manner removes ground contacts 7073 to prevent the energization of relay 7030 in either unit until the alternate unit is ready to receive the message. The alternate unit will now be controlled in a manner described for unit 7000.

When relay 6630 in a link restores due to the operation of relay 6510 as described it restores contacts 6639'. This places ground on lead C4550(45) to energize the motor magnet of switch MMOFA. The switch now steps in a self-interrupted manner. If two links were involved, relay 6630 in each must restore to remove ground from lead C4558(45) and the switch MMOFA stops on contact N.

Alarm relay 6450 restores, if relay 6510 fails to operate within a predetermined time. At contacts 6451 it energizes the motor magnet of switch MMALM and at contacts 6452 it energizes relay 6510. That relay deenergizes relay 7030 in the outgoing channel unit as soon as all grounds are removed from lead C6401(70), as described, and deenergizes relay 6630 as already described. It also reoperates relay 6450, which opens the circuit to the motor magnet of switch MMALM at contacts 6451 and the switch takes a step. If this succession of events should occur a predetermined number of times ground from contacts 6451 is then extended over the wiper of switch MMALM and contacts 6411 to energize the upper winding of relay 6430. It energizes its lower winding over contacts 6431 and key contacts 6449. At contacts 6432 it completes various signal circuits. If relay 6510 remains operated beyond a predetermined period, relay 6440 restores, as its circuit is open at contacts 6514. It closes contacts 6441 to energize the upper winding of relay 6430 and an already described sequence of operations take place.

*Cross office unit identification*

It will be recalled that ground extended from lead C4883(48) is returned over lead C4884(48) as described, to energize the upper winding of relay 6330. At contacts 6331 it removes ground from lead C7501(75) to mark the cross office unit in the banks of the Cross Office Selector Switch 7500. At contacts 6332 it extends lead C7501(75) over contacts 6343 and 6371 and C5801 to battery through relay 5810 to mark the cross office unit in the switch bank. Contacts 6333 close to complete a circuit to the lower winding of relay 6330 over contacts 6349 to ground at key contacts 6069. At contacts 6334 relay 6330 extends ground over the numbering start lead C7502(75) to operate relay 7510 in the Cross Office Selector Switch 7500 associated with this cross office unit and twenty four others.

Contacts 7511 operated by relay 7510, extend ground to the motor magnet of switch 7500 through its self-interrupting contacts from contacts 5121 and the switch wiper associated with a lead such as C7501(63) extended to ground at contacts such as 6331 in a cross office unit, which is not demanding this selector, and also from contacts 7521 and the lower winding of relay 7520. Relay 7510 also opens contacts 7512 to open the circuit to relay 7530, which starts to restore. It is held operated for a period of time by the condenser resistor network connected thereto.

In the event the cross office selector fails to find the demanding cross office unit before relay 7530 restores, it closes contacts 7531 to complete a circuit to the lower winding of relay 7540. Relay 7540 completes an energizing circuit for its upper winding over contacts 7541 and key contacts 7547. At contacts 7542—7544 it completes various signal circuits.

The motor magnet energizes and steps the wiper in a self-interrupted manner over its contacts. On finding the demanding cross office unit, ground is extended from the lower winding of relay 7520, over the wiper of switch 7500 to lead C7501(63), contacts 6332 and 6343 to battery through relay 5810. Relay 7520 operates to disconnect the motor magnet at contacts 7521 and connect the upper winding of relay 7520 to relay 5810 over contacts 7522. Relay 5810 now operates. At contacts 7523, relay 7520 reenergizes relay 7530 before it can restore.

At contacts 5811, 5814 and 5815, relay 5810 extends leads NCL, NNP and NS from the markable transmitter 5820, associated with the group of twenty-five cross office units served by switch 7500, into the Cross Office Unit 5400. At contacts 5813 a self-interrupted stepping circuit is completed to the motor magnet of switch MMUN over the self-interrupting contacts 5808 and the off-normal contacts 5809. This circuit is opened when the switch takes its first step as the off-normal springs 5809 open. Off-normal springs 5807 close on the first step. Ground from level A of switch MMUN is now extended over contacts 5811 to lead NCL to energize the markable transmitter clutch magnet, which allows the shaft of the transmitter to rotate a complete cycle. During this rotation a resistance ground connected to the first bank contact and each of the wipers of levels B, C, E, and F of switch MMUN and the negative 120 volt resistance battery on the first contact and wiper of level D are extended to the transmitter, and placed on lead NS in sequence by the sensing pins of the transmitter as they go through their 5 unit sequential cycle in a known manner. These potentials are extended in sequence from lead NS over contacts 5815, lead C5831, contacts 6342 and 6371 to lead C4882(48), level C of Switch 4800, lead C4881(70), contacts 7077', 7176, resistance R4, contacts 7229', relay 7240 and the rectifier network associated therewith to the monitor reperforator 7302 to cause it to perforate a figure shift character on the associated tape in a known manner. Relay 7240 and its associated network react in the same manner as relay 6020 and its associated network.

During each cycle or shaft rotation of the transmitter 5820 a ground pulse is applied to lead NNP in a known manner and is forwarded over contacts 5814 to energize the motor magnet of switch MMUN. It energizes and on removal of the pulse deenergizes to step its wipers to a succeeding contact. In this manner it will step its wipers from contacts 1 to 5. The respective wipers of levels D—F forward ground or battery respectively from the associated bank contacts in each position in accordance with the number the monitor reperforator is to record on the tape. Thus on the second bank contact each wiper forwards resistance ground or resistance battery respectively through the sensing pins of the transmitter and over lead NS to the monitor reperforator. At the end of each cycle of course switch MMUN is stepped to a succeeding contact and the procedure repeated so that the monitor reperforator records a number corresponding to the cross office unit used for transmission. Ground forwarded from level A when the wiper is on any one of its first four contacts energizes the clutch magnet of the transmitter 5820 in each position to allow the transmitter and sensing pins to pass ground or resistance battery in sequence from each level of switch MMUN.

The straps connecting the terminals of cinch plug 5830 are arranged to forward resistance ground and resistance —120 volt battery to respective bank contacts of levels B—F of switch MMUN to that the monitor reperforator perforates a character in its tape corresponding to each digit assigned to the cross office unit and as the cinch plug terminals may be changed to correspond to different numbers the cross office unit identifying number may be changed.

Contacts number 5 of levels B—F of switch MMUN are grounded through resistance ground at terminal 5817 on Cinch Plug 5830 to provide a letter shift character. When the MMUN switch wipers are stepped to contacts number 5, lead NCL is extended to ground over level A, through self-interrupting contacts 5808. This insures that a pulse long enough to operate the markable transmitter clutch magnet and short enough to release the clutch before the ensuing transmission cycle occurs, thereby insuring stoppage of the transmitter shaft at the end of the cycle.

The rotary switch wipers are stepped to contacts number 6, when the ground on lead NNP is removed by the transmitter. The clutch magnet lead NCL is then extended over level A, contacts 6347, through the winding of relay 6340 to ground at contacts 6252. The clutch magnet can not operate in this circuit, however relay 6340 does.

At contacts 6346 it extends resistance battery through its winding to ground at contacts 6252 to provide its own holding circuit and opens its original operating circuit at contacts 6347. At contacts 6343 it opens the circuit to relay 5810, which restores. At contacts 6349 it opens a circuit to the lower winding of relay 6330, and at contacts 6344 it opens the circuit to the upper winding of relay 6330. At contacts 6345 ground from the slack tape cross office reader transmitter contacts 5387 and lead C5387(53) is extended through contacts 5930, 6141, 6231 and 6213 to the winding of relay 6260 and over contacts 6372 to lead C4884(48) extending over level B of the Outgoing Selector Switch 4800 to lead C4883(70) to prepare a circuit for restarting the unit reader transmitter 5390 by operating relay 6260. At contacts 6348' ground is extended over contacts 6244 and 6375 for signalling the Outgoing Channel Unit 7000 that the cross office unit number is transmitted. At contacts 6342 relay 6340 disconnects lead NS from lead C4882(48) and connects lead C4882(48) to resistance ground over lead C5351(53) and the stop contacts 5352 of the cross office transmitter to maintain relay 7240 energized.

Contacts 5812 close when relay 5810 restores, and a self-interrupted homing circuit is completed for the motor magnet of switch MMUN over off-normal springs 5807. It steps its wipers home and opens its off-normal springs. At contacts 5811, 5814 and 5815 it disconnects lead NCL, NNP and NS from the cross office unit.

Relay 6330 which restores when the circuits thereto were opened by relay 6340 recloses contacts 6331 to mark the bank contact corresponding to this cross office unit at the cross office selector switch 7500 with ground. At contacts 6334 it removes ground lead C7502(75) to restore relay 7510. Relay 7510 closes contacts 7512 to provide an energizing circuit for relay 7530. The ground on the bank contact restores relay 7520 and it opens contacts 7522 and 7523. The cross office selector switch 7500 is now prepared to be used with another cross office unit.

*Transmission of an outgoing SOM and message number*

Simultaneously with the sending of an identifying number from the Cross Office Unit 5400 to the Monitor Reperforator 7302 by means of the markable transmitter 5820 as explained, an SOM, if required by the receiving station, or blanks are sent to the receiving station. After this, the message number is transmitted to the receiving station. It will be recalled that slow-to-release relay 7180 operated on seizure of the outgoing line 7000. At contacts 7181 it extends ground from contacts 7231, 7271 to contacts 7221 and the clutch magnet of the markable monitor transmitter indicated at box 7301. At contacts 7184 is disconnects ground from relay 7060 which is held operated for a period of time by the condenser resistor network connected thereto. If it should restore before the SOM sequence of the outgoing channel is completed, it closes contacts 7061, 7062 and 7063 to complete signal circuits. The monitor transmitter clutch magnet releases its shaft and allows it to rotate. Cams on the shaft actuate five contacts thereon in sequence in a known manner and numbering contacts close to ground lead NU once per cycle. Ground via lead NU is extended to energize the motor magnets of switch MMSDR via its C level wiper on its third contact. Switch MMSDR is normally positioned with its wipers on their third contacts. At the end of the cycle when ground is removed from lead NU the motor magnet deenergizes and steps its wipers one step. As contacts 2—23 of switch MMSDR level C are multipled, a pulse from lead NU may be used to control the motor magnet to step its wipers in the same manner when wiper C is associated with over these contacts. The bank contacts of each of the levels F—K of switch MMSDR has a resistance ground marking or a resistance battery marking respectively thereon, which is extended through its respective wiper to the respective ones of the five sensing contacts of the monitor markable transmitter 7301, and as these contacts close in sequence the marking is extended to lead MTD, contacts 7237', and 7178, the outgoing channel polar signal relay 7280, contacts 7228 to resistance —60 volt battery. These markings, resistance ground for mark and resistance —120 volts for space are extended one at a time to the markable transmitter signal lead MTD from the transmitter sensing contacts to operate the polar relay accordingly. Thus this relay is operated to signal the outgoing line such as 6 in accordance with the markings which appear on each bank contact of the various levels F, G, H, J, and K respectively of switch MMSDR. The contacts of the polar relay 7280 are of course arranged with potentials thereon to provide either neutral or polar signalling to the receiving station such as USRN depending on the type of equipment thereat. The ground pulse on lead NU is terminated each time the transmitter goes through a cycle and the motor magnet of switch MMSDR deenergizes to step its wipers so that a marking for each bank contact on level F—K is transmitted.

The first character transmitted occurs when the wipers of switch MMSDR are on their third bank contacts. Each of contacts 3—7 of switch levels F—K is connected to —120 volt resistance battery, if the receiving station does not require an SOM. This causes the markable transmitter to control the polar relay 7280 to send a series of 5 blanks to the reperforator at the receiving station. If the receiving station is of the same type at the present station RUWP, it receives an SOM comprising the characters ZCZC from relay 7280 under control of transmitter 7301 and the bank markings of switch MMSDR, levels F—K and contacts 4—7 MMSDR instead of four blanks from contacts 4—7. This maybe preceded by the character X. If using an XZXZX type SOM, bank contacts 3—7 of levels F—K of switch MMSDR are marked accordingly so that these characters are transmitted by the signal relay 7280 in a manner similar to that described for transmitting other characters.

When the wiper of level E of switch MMSDR is on its seventh contact, it extends ground from lead NU to operate relay 7270, which opens the circuit, at contacts 7271, to the clutch magnet of the transmitter 7301. After thus transmitting five blanks or an SOM, the wipers of switch MMSDR are stepped from their seventh contacts to their eighth contacts, in a manner explained. On stepping to its eighth contact, the wiper of level E opens the original circuit for relay 7270 but completes a new one therefor at contacts 7225. Operation of relay 7270 ensures that the clutch magnet and transmitter 7301 remain unoperated.

As previously described, after the cross office identifying number has been transmitted to the monitor reperforator and recorded, relay 7260 is operated. It locks operated at off-normal springs 7499 and contacts 7262, and also over contacts 7272 and 7234 if relay 7270 is operated. At contacts 7263 it connects relay 7220 to the eighth bank contact of level D of switch MMSDR. When switch MMSDR reaches its eighth contact, which may be before or after the cross office identification number has been transmitted to the monitor reperforator, it extends ground from wiper D. This operates relay 7220, if or when, relay 7260 operates. At contacts 7225 relay 7220 opens the circuit for relay 7270, which now restores. Relay 7220 opens the original operating circuit for the monitor markable transmitter clutch magnet at contacts 7221 and closes a new circuit therefor at contacts 7222 and extending from contacts 7231 and 7271. Transmitter 7301 is now reoperated. Thus the Outgoing Channel Unit does not begin to transmit a message number until the cross office unit has sent its identification number to the monitor reperforator 7302. Relay 7220 locks operated over contacts 7239, 7226 and 7187 to ground. Relay 7220 on operating also connects the battery from the winding of the reperforator 7302 extended through relay 7240 and the associated rectifier bridge over contacts 7227, through the winding of signal relay 7280, contacts 7178 and 7237' to resistance ground over lead MTD through the stop contacts of the markable transmitter 7301. The transmitter now operates the signal relay 7280 in series with the monitor reperforator line magnet. The markings are transmitted thereto from the eighth contacts of levels F—K of switch MMSDR in a manner explained.

The message number actually consists of a channel designation and a message number. For a given channel, the designation is always the same three characters and therefore contacts 8, 9 and 10 of switch MMSDR levels F—K respectively are marked accordingly with either resistance ground or resistance battery. As the switch is advanced in the manner previously described by pulses over lead NU, code markings are transmitted to reperforator 7302 and relay 7280 and each performs its respective function. A figure shift character marking is permanently strapped directly to contacts number 11 of switch MMSDR levels F—K so that it is also both transmitted and recorded.

Contacts 12, 13 and 14 of levels F—K are permanently wired to the leads H1—H5, T1—T5 and U1—U5 respectively extending over cable C7499(81) to the respective wipers of Outgoing Message Number Assigner switches MH1', MT1' and MU1' respectively, corresponding to the hundreds, tens and units digits of the message number respectively. For the first message of the day the hundreds switch MH1' is set to its second contacts as is the tens switch MT1', while the units MU1' is set to its third contacts. Code markings are therefore transmitted from the bank contacts of each level of switch MH1' over leads H1—H5 to respective levels F—K contacts 12 of switch MMSDR, and from the respective contacts of transmitter 7301 to the relay 7280 and the monitor reperforator 7302 so that a digit corresponding to zero is both transmitted and recorded. Similarly code markings on contacts 2 of the wipers of switch MT1' connected to leads T1—T5 provide zero markings to contacts 13 of levels F—K of switch MMSDR so that a zero is both recorded and transmitted while the wipers connected to leads U1—U5 of switch MU1' transmit code markings corresponding to 1 over contacts 14 of levels F—K of switch MMSDR. Just before the EOM is sent at the end of the message the Outgoing Message Number Assigner 8100 is advanced by the associated outgoing channel unit so that a succeeding number is assigned to the next message.

Switch MMSDR is standing on contacts 14 when the last digit of the channel number is transmitted, and it then steps to contacts 15 in a manner explained. A letter shift code marking is permanently strapped to contacts 15 of levels F—K, and that character is transmitted through the contacts of the markable Transmitter 7301 to the Monitor Reperforator 7302 and the signal relay 7280 in a manner similar to that described.

With the wiper of level E of switch MMSDR standing on contacts 15 a pulse from lead NU is transmitted over the wiper of level E to operate relay 7270. It opens the clutch magnet circuit to the markable Transmitter 7301 at contacts 7271. Switch MMSDR is simultaneously stepped to contacts 16 and the circuit to relay 7270 is opened at contacts 15 of level E of switch MMSDR, but another circuit is completed thereto over contacts 7157 and 7169 and the wiper of level E on its sixteenth contact. The wiper of level D of switch MMSDR on contacts 16 extends ground over contacts 7236, 7077 and 7143 to operate relay 7210.

Relay 7210 completes another locking circuit for relay 7220 over contacts 7239 and 7218. At contacts 7212 it maintains the motors of the monitor transmitter and reperforator operated. At contacts 7213 it opens another point in the self-interrupted stepping circuit for switch MMSDR. At contacts 7217 it operates relay 7170 over contacts 7168 and 7157. At contacts 7218' it connects relay 7120 over contacts 7218' and 7055 to lead C4883(48). This enables control of the transmitter in the cross office unit as will be explained. Relay 7120 on operating will open contacts 7121 to enable relay 7130 to be controlled by pulse contacts of reperforator 7302. If that relay restores it closes ground at contacts 7131 to the lower winding of relay 7050, which will open contacts 7055 to restore relays 7120 and 6060. Restoration of relay 6060 will terminate operation of the cross office reader. At contacts 7215 the circuit to slow-to-release relay 7180 is opened and that relay starts to restore. When it restores it closes contacts 7184 to maintain relay 7060 operated. With relays 7170 and 7220 operated, battery through the windings of monitor reperforator 7302 is forwarded through the relay 7240 and the associated rectifier bridge, over contacts 7227, through the signal relay 7280, contacts 7175, contacts 7077', lead C4881(48), the wiper of level C of the outgoing selector switch 4800, lead C4882(63), contacts 6341 over lead C5351(53) to resistance ground through the stop contacts 5352 of the transmitter associated with the Cross Office Unit 5400. At contacts 7178 the markable transmitter 7301 is disconnected from the monitor reperforator 7302 and the signal relay 7280.

Relay 7120 operates in series with relay 6260 in the Cross Office Unit, 5400 over lead C4883(48), level B of Switch 4800, lead C4884(63), contacts 6372 and 6345, relay 6260, contacts 6213, 6231, 6141 and 5932 to ground at the reader transmitter slack tape switch contacts 5387 over lead C5387(53). Relay 6260 operates and grounds the reader transmitter clutch magnet MM21 over contacts 6261, 6251 and 6324 and lead C5308(53) to start message transmission from the transmitter of the cross office unit to the Outgoing Channel Unit relay 7280 and the Reperforator 7302. Start contacts 5331 close first to forward resistance —120 volt battery over lead C5351(63) and the already described circuit to the monitor Reperforator 7302 and the signalling 7280, as a start signal. Contacts 5332—5335 of the transmitter close in sequence to forward either resistance ground or resistance —120 volt battery from the associated pairs of contacts 5340—5349 in a manner explained and in accordance with the perforations of the tape so that the monitor reperforator records the message and the signal relay transmits the same to the receiving station.

Slow-to-release relay 7180 in the Outgoing Channel Unit 7000 on restoring prepares a self-interrupted homing circuit for the switch MMSDR at contacts 7182 and the wiper level A of switch MMSDR. At contacts 7184 it maintains relay 7060 operated. If relay 7060 should have restored it closes contacts 7061, 7062 and 7063 to complete signal circuits. Relay 7120 on operating opened the circuit to relay 7130 at contacts 7121 so that it may now be operated from pulses extended during each cycle of the monitor Reperforator 7302. If it should restore, it closes contacts 7131 to energize the lower winding of relay 7050. Relay 7050 closes contacts 7053 to energize its upper winding from ground at key contacts 7057. At contacts 7051, 7052 and 7054 it completes various signal circuits. In this connection it will be noted that if the circuit to the monitor reperforator and relay 7280 is opened the circuit relay 7240 restores. At contacts 7241, it also completes a circuit to the lower winding of relay 7050 and the afore-described sequence of operations takes place.

*Elimination of excess channel numbers*

Each time a message is relayed from a station, a channel number may have been added to it. Since a message may be relayed many times before reaching its destination, it has been decided to eliminate all but the number checked by the message number Comparator 1000. This is accomplished by allowing the incoming channel transmitter 390 to run, but preventing it from transmitting after the first channel number following the SOM is sent cross office, until the carriage return at the end of the line is presensed by that transmitter. Thus the transmitter 390 on presensing the first letter shift following the first channel number, closes lead C359(6) to ground at contacts 377 through presensing contacts 376 to energize the winding of relay 720 over contacts 676. Relay 720 completes a locking circuit for itself through contacts 722, and the winding of relay 730 and over contacts 751 to ground at key contacts 999. After the presensing ground is removed relay 730 operates in series with relay 720. At contacts 731 it connects lead C316(3) to the winding of relay 740. Relay 740 operates during the sensing of the letter shift character, when the transmitter numbering contacts 375 close to extend ground over lead C316(8). At contacts 744 it disconnects lead C394(3) from lead C798(52) thereby preventing transmission of signals from the transmitter 390 to the cross office reperforator line magnet 5349. At contacts 743 it connects resistance ground to the reperforator line magnet over lead C798(52). At contacts 742 the transmitter clutch magnet control lead C698(3) is extended from contacts 651 and 691, through contacts 761, 742 and 632 to lead C699(3) extending to ground at the reader slack tape contacts 343 so that the transmitter 390 continues to operate despite the release of relay 680 shortly. At contacts 746 it completes its holding circuit over contacts 751 and 999. At contacts 741 it opens the circuit to relay 680 and the connected cross office control relay 6040. Both restore, however the letter shift character which is transmitted as a continuous mark is not mutilated. This is due to fact that contacts 743 close resistance ground to lead C798(52) during the period when the resistance ground from any one of the five transmitter contacts 362, 363, 364, 365 and 366 is also being sent in sequence.

When the first carriage return character at the end of the channel number line is presensed at the transmitter a ground pulse from contacts 368 and 376 is transmitted over lead C1605(6) and contacts 673 to energize relay 760. It opens contacts 761 to deenergize the transmitter clutch magnet MM2 and the transmitter stops at the end of the cycle, as relay 680 is restored before then. At contacts 762, relay 750 is also energized at the end of the cycle in series with relay 760 from ground at contacts 745, 721, 661 or off-normal springs 503. At contacts 751, it restores relays 740, 730, 720, 670 and 660. Holding grounds for relays 750 and 760 are removed at contacts 721, 745 and 661, however they are still held operated from off-normal springs 503. Relay 660 on restoring closes contacts 662 to complete a self-interrupted homing circuit for the motor magnet of switch MMCN from ground over the self-interrupting contacts 502 and through the off-normal springs 501. When the switch MMCN reaches home, ground for operating relays 750 and 760 is removed at off-normal springs 503, and they restore. Relays 680 and 6040 are reoperated on release of relay 760. At this time the incoming line circuit relay 630, 710, 680, 820 and 830 are operated and the transmitter 390 is again transmitting the message to the reperforator 5349 in the cross office unit.

If a message is routed to intercept, channel numbers are not removed to enable an operator to determine the originating station. A register in setting up a connection to intercept, grounds lead C1605(16) as previously explained to operate relay 760. When the register is released and ground is removed from lead C1605(16) relay 750 operates in series with relay 760 as just explained. It releases relay 670 at contacts 751 as just described which in turn disconnects lead C359(3) from relay 720 and lead C1605(16) from relay 760 so that the channel number discard arrangement can not function. Relay 750 also releases relay 660 to reset switch MMCN in the manner explained. Relays 750 and 760 then release, as switch MMCN returns to normal to open springs 503. Thus the message in its original form is transmitted to the reperforator at an intercept position.

*EOM transmission*

At the end of the body of the message, the tape reader 300 senses two carriage return characters, 3—8 line feed characters followed by the characters NNNN. This indicates the end of the particular message and is called the EOM. When the line feed character is read by the reader, lead 7 is grounded by the reader sensing contacts 357 to extend that ground over contacts 411, 552 and 542 to energize the winding of relay 530. At the end of the sensing cycle, relay 530 locks operated through the upper winding of relay 540, contacts 531 to ground at contacts 472. Relay 540 operates in this circuit and closes ground to relay 410 at contacts 541 to operate relay 410. At contacts 542 it opens the circuit for originally energizing relay 530 and at contacts 543 prepares a circuit to the upper winding of relay 550.

Although line feeds may be sensed during the body of the message only one line feed at a time will be sensed. When relay 410 operates, it connects the sensing leads 1—5 and 8 to relays 420—470 respectively, and when the following character is read relay 470 operates to open the holding circuit to relays 530 and 540. During this period a detection chain ground is not provided to contacts 543 and the lower winding of relay 540, thereby allowing both relays to restore.

On the second line feed character lead 7 is grounded as before. As relay 410 is operated, the ground on lead 7 is not extended past contacts 411, but relay 460, operated by ground from reader contacts 352 and lead 2, extends ground over contacts 469, 435, 447, 458, 426, 552 and 543 to energize the lower winding of relay 540. Relay 470 on operating opens the holding circuit to relay 530 and the upper winding of relay 540, and relay 530 only restores. At the end of the sensing cycle the lower winding of relay 540 locks operated through the upper winding of relay 550, contacts 544 and contacts 532 to ground at contacts 472. Relay 550 opens the original energizing circuit for the lower winding of relay 540 at contacts 552 and prepares a circuit at contacts 553 to its lower winding. On the next reader sensing cycle the third line feed character is sensed and the lower winding of relay 540 is deenergized as explained and it restores, but the line feed detection chain ground from relay 460 energizes the lower winding of relay 550. It locks in series with the upper winding of relay 560 at the end of the sensing cycle in a manner similar to that explained for relays 540 and 550 at the end of the sensing cycle. Succeeding line feed sensing cycles merely result in repetitious energizing spurts to the lower winding of relay 550, and therefore relays 550 and 560 remain operated as before after each of the line feed characters are sensed. In the event a line feed is not sensed during this period both relays restore as the holding circuit thereto is opened by relay 470 without a detection chain ground being supplied to the lower winding of relay 550.

The first N of the EOM causes the tape reader to ground leads 3 and 4 to in turn energize relays 440 and 450. Ground is therefore extended from contacts 421, 451, 462, 433, and 443 over lead INT to contacts 851, 572 and 562 to energize the lower winding of relay 560. It prepares a holding circuit for its lower winding through the upper winding of relay 570 at contacts 563. At contacts 472, relay 470 restores relay 550. At the end of the sensing cycle, when relay 470 is restored and the detection chain ground is removed from contacts 562 the upper winding of relay 570 energizes over contacts 563 and 555 to ground at contacts 472. It opens the original detection chain operating circuit for the lower winding of relay 560 at contacts 572, and prepares a circuit to the upper winding of relay 580 at contacts 574. The lower winding of relay 570 and the upper winding of relay 580 are energized in a manner similar to that described for the lower winding of relay 560 and the upper winding of relay 570 after the reader senses the second N, while relay 560 restores under control of relay 470. On reading of the third N, the lower winding of relay 580 and the upper winding of relay 590 are energized in a similar manner. When the fourth N is read the lower winding of relay 590 is energized from a detection chain ground extended over contacts 593. This same ground is extended from contacts 593 through the winding of relay 840, contacts 841 and 852 to battery through the upper winding of relay 860. As relay 580 restores during the sensing cycle the winding of relay 840 is also connected over contacts 585, 594 and 921 to ground on release key contacts 999. The upper winding of relay 860 is energized. Ground for operating relay 410 is now furnished from contacts 859, 848 and 591. Relay 860 operates to open contacts 861 for deenergizing the reader clutch magnet MM1 to stop the reader 300.

When the detection chain ground is removed, the lower winding of relay 590 energizes in series with the winding of relay 840 over contacts 585, 594 and 921 to ground at contacts 999. At contacts 842 relay 840 connects direct ground to the upper winding of relay 860, and at contacts 848, it removes ground for operating relay 410, which restores to allow an SOM of a following message to be detected. The upper winding of relay 710 is restored at contacts 844. At contacts 847, relay 840 extends ground from contacts 859 over lead C894(10) to energize the motor magnet of the units message number comparison switch MMU so that the switch is advanced one position when relay 850 operates. If switch MMU is on contact 1 corresponding to the registration of digit 9, it extends the ground over level B to energize the motor magnet of switch MMT. Likewise switch MMT if on contact 1, corresponding to the registration of the digit 9 extends the ground over its level B to energize the motor magnet of switch MMH. At contacts 849 relay 840 extends relay 880 to a pulse lead SC. Contacts 846 connect the wiper of level A of switch MMCGT, over contacts 716 to the transmitter tight tape switch contacts 344 over lead 317(3).

With the reader stopped the tape for the transmitter soon becomes tight, and the tape arm actuates the switch to open contacts 343 and close contacts 344 thereby extending ground over lead C317(7), contacts 716 and 846, the wiper of level A switch MMCTG and contact N to energize relay 850. Relay 850 opens the circuit to the upper winding of relay 860 at contacts 852. Relay 860 at contacts 861 closes the circuit to the reader clutch magnet MM1 to start the reader 300. At contacts 851 relay 850 opens a point in the circuit for supplying the detection chain ground for the character N to relay 590. At contacts 854 it opens another point in the already open holding circuit for relay 710. With ground removed from lead C699(6), due to the opening of contacts 343, relays 680 and 6040 restore. At contacts 681, relay 680 opens the circuit for energizing the motor magnet of the transmitter clutch magnet MM2. It stops the transmitter. Any loop in the tape between the reader and transmitter has now been taken up thus insuring that the first Z presensed at the transmitter is part of a following SOM and not part of the first message. This is important since this Z is used as a finish of transmission indication for the first message, if another message follows immediately behind the first. Ground at contacts 859 is removed from lead C894(10) to cause the units message comparison switch MMU to step one position. If switch MMU was on contact 1 before it was stepped the ground was also attached to switch MMT and its removal also causes the tens comparison switch to step one position, and if that switch were on contact 1, the hundreds comparison switch MMH is stepped one position by the removal of ground. Thus the Comparator 1000 is set to a new position, and a new message number must check with the setting of Comparator 1000 in a manner explained. At contacts 853 relay 850 completes a holding circuit for itself to contacts 842. At contacts 859' it connects lead C397(3) to contacts 598 of relay 595. With the reader 300 operating tape to the transmitter becomes slack and relays 680 and 6040 reoperate, when slack tape switch contacts 343 reclose to ground lead C699(6). This causes transmitter 390 to reoperate. Contacts 344 on opening remove ground from lead C317(7) to open the circuit for relay 850 but it remains operated.

Relay 710 reoperates in a manner described when SOM of an immediately succeeding message is detected. It prepares a circuit for relay 660 at contacts 715. If a carriage return is sensed before a figure shift indicating a trouble condition, ground over contacts 469', 459, 437, 448, 428, 665 and 525 energizes the lower winding of relay 910. Relay 910 at contacts 911 opens a circuit for enabling blank tape feed out; energizes its upper winding over contacts 914 and 998; energizes relay 860 at contacts 912 to prevent further operation of the reader and at contacts 913, 915 and 916 completes signal circuits. When the figure shift character preceding the first channel number is sensed properly a detection chain ground extended in a manner described, from the sensing relay contacts to lead Figs contacts 715, 858 and 674 to operate a relay 660. It initiates the channel number check at Comparator 1000 in a manner similar to that described while at contacts 665 it opens a point in the circuit to relay 910. Switch MMCN, which is in the meantime stepped in the manner described, steps its wipers to their eighth contacts at the end of the channel number check to energize the upper winding of relay 595 as before described. It energizes its other winding over contacts 596 and 845 and extends the ground forwarded from lead C397(3) and contacts 859' over contacts 598 to operate relay 690 as soon as the first Z of the SOM reaches the transmitter to ground lead C397(3) as mentioned previously. Relay 690 closes contacts 693 to complete its own holding circuit to ground at contacts 845. At contacts 691 it opens the transmitter clutch magnet lead C698(3) to stop the transmitter. At contacts 692 it extends ground over contacts 857 to energize to relay 920.

In the event the message does not have an EOM, and a second message follows immediately the last C of the second message SOM is used to provide a trouble condition. Relay 850 does not operate without receipt of an EOM and therefore the C detection chain ground is extended through contacts 714 (a relay 710 is up), 637 and 856 to operate relay 910 and completes a described sequence of operations.

Relay 920 extends a holding circuit for itself over contacts 925 from ground at contacts 855 and from ground over contacts 635 over lead RL1 to release key contacts. At contacts 924 it extends the ground from the release key contacts 999 to relay 690 and over contacts 596 to the lower winding of relay 595. At contacts 923 it removes the ground from lead C5201(52) and from relay 630, which restores. The ground removed from lead C5201(52) is of course removed from lead C5205(61) to restore relay 6060 in the cross office unit. At the contacts 921 relay 920 restores relay 840 and the lower winding of relay 590, and both release their contacts. Relay 840 on restoring opens contacts 842 to restore relay 850 as the holding circuit thereto has already been opened. Restored relay 630 closes contacts 636 to provide another holding ground from the release key contacts 999 for relay 690. At contacts 639' it prepares or completes a circuit to the upper winding of relay 650 in a manner described depending on whether the first carriage return of the new message has been read yet as relay 610 is then operated, while relay 660 was also operated as described. At contacts 635 it restores one of the holding grounds for relay 920.

Relay 6060 is the cross office unit on restoring opens the holding circuit to relay 6110 at contacts 6063, and opens a holding circuit to relay 6010 at contacts 6061. At contacts 6064 it opens the leads extending between relays 6040 and 680, and at contacts 6065 it connects resistance ground through relay 6020 to magnet 5349. Relay 6110 removes an operating ground from relay 5950 so that relay 5940 can operate in series therewith. Its operation enables the EOM to be advanced at the cross office unit and to enable a director to establish a connection to the cross office unit all in a manner which will be explained.

Restored relay 850 at contacts 855 removes the other holding ground from relay 920, and relay 920 now restores. If the first carriage return of the new message has not been read the reader continues to operate until the carriage return is read. Relay 610 then operates in a manner described to stop the reader complete a circuit to relay 650 so that the register is called for. Thus the first message is completely transmitted before a register is demanded for the second message.

When one message is not followed immediately by another, and the transmitting station does not have equipment similar to that at this station, the reperforator M must be made to feed out sufficient blank tape to advance the EOM to the reader 300 and the transmitter 390. Equipment such as in the present station transmits blanks at the end of the message to accomplish this in a manner which will be explained, but other equipment may not be arranged therefor. Where incoming transmission is stopped, the tape pulse contacts 379 remain open to remove ground from lead C898(8) and release relay 830 after a time period. A periodic momentary pulse provided in any well known manner at the lead SC connected to contacts 833 from a pulser, is therefore effective to operate relay 780 over contacts 718 and 792. It is assumed that a delay of a predetermined time, after an SOM is detected without a pulse on lead C898(8) is an indication that the end of the message has reached the reperforator and that the transmitting station has stopped sending. Relay 830 restoring due to contacts 379 failing to make their periodic closure, is an indication of this condition. At contacts 832 it extends ground from lead C221(3) to maintain relay 820 operated. After the pulse on lead SC, relay 780 locks operated in series with relay 790 over contacts 781, 834 and 929 to ground at key contacts 998. At contacts 791 relay 790 extends the pulse lead SC from contacts 833 and 718 over contacts 715' to the upper winding of relay 870 while opening the original circuit for relay 780 at contacts 792. The next pulse on lead SC operates relay 870, which energizes its lower winding over contacts 872 and 929 to ground at contacts 998. Relay 870 operates and with the reader tape switch in the tight position, as it has continued to operate, a circuit is completed from ground at contacts 928, over contacts 656, 612, 644 and 861 to lead C899(3), reader tight tape contacts 399, lead C329(9), contacts 911, 871 and 886 to energize the upper winding of relay 950. The reader clutch magnet MM1 deenergizes to stop the reader, when contacts 342 open. Relay 950 at contacts 951 extends its operating ground over contacts 884 to relay 880, which operates to open the original operating circuit for relay 950 and itself at contacts 886 and 884 respectively. It closes a new one for itself from its original operating ground extended to contacts 883 and 885. At contacts 952 relay 950 opens one of the short-circuits around its lower winding, and at contacts 953 extends ground to lead C387(3) and the reperforator magnet M bias windings. Relay 880 opens contacts 887 to open the other short-circuit to the lower winding of relay 950 so that the lower winding of relay 950 can energize in series with the line conductors —L and lead C301(3) extending through the line winding of magnet M to the +L conductor of the incoming channel 4. This winding on energizing maintains the relay contacts operated once they have been operated but cannot operate them itself. Thus although the upper winding restores the relay contacts now remain operated. At contacts 888 ground is extended over contacts 911 and 871 to contacts 883 and 885 to maintain relays 880 operated, as slack tape will shortly become available to the reader 300 so that contacts 342 reclose and contacts 399 opens to remove the original ground extended over lead C329(9). Ground on lead C387(3) allows enough current to flow through the reperforator magnet bias winding to cause the overpowering of the operating windings. The result is a spacing condition that causes blank tape feed out. When the distant station again starts transmitting, the loop through the lower winding of relay 950 is open or polarity is reversed on the line, and its contacts restore to remove ground from lead C387(3) and stop the reperforator magnet M from feeding out blank tape. Relay 950 restores its contacts on reverse polarity due to the fact that the flux therein must drop through zero before building up in the other direction. The SOM of the new message is then used for a finish transmission signal as described. If transmission is stopped a second time the upper winding of relay 950 is again operated by a pulse from lead SC, through contacts 833 and 887' to again initiate blank tape feed out. When tape is fed pulses are provided to lead C898(8) for maintaining relay 830 operated. It opens contacts 834 to restore relays 780 and 790 so that they must be reoperated by release of relay 830.

When the end of message has been detected at the reader due to the blank tape feed out, relays 590, 840 and 860 operate as before described. The reader 300 is stopped at contacts 861, as previously described and relay 710 is restored as described. It connects lead C317(3) to relay 850 at contacts 716, as before described, and when the tape to the transmitter becomes tight, lead C317(3) is grounded to operate relay 850 as described. Relay 680 restores to restore the transmitter clutch magnet MM2 at contacts 681 as described. Relay 850 operates and connects the transmitter numbering pulse lead C316(8), at contacts 856' over contacts 711 to the motor magnet of switch MMCTG. It also restores relay 860 to start the reader clutch magnet MM1 at contacts 861. When tape to the transmitter becomes slack lead C699(6) is grounded to operate relay 680 which starts the transmitter 390 as described. Since there is no following SOM to be used as an end of transmission signal, a transmitter cycle count is used instead.

With the tape tight between the reader and transmitter it is known, within a few characters just how far the EOM is from the transmitter after the reader has read the same. Thus pulses on lead C316(8) extended from the transmitter numbering pulse contacts 375 pulse the motor magnet of switch MMCTG once for each transmitter cycle. Twenty-seven cycles are counted before it is assumed that the EOM has been transmitted. Thus switch MMCTG steps its wipers through twenty-seven positions, when the wiper of level C engages its seventh contact to extend ground from contacts 718' and 858' to relay 920.

To provide a trouble indication in the event of blank tape feedout without receipt of an EOM, blanks are counted by switch MMCTG. Thus with relay 880 operated in a manner explained, ground from contacts 859 and 848 is forwarded over contacts 881 to operate relay 410. Blanks sensed by the reader now result in operation of the relays 420—470 and the grounding of lead blank. This ground is forwarded over contacts 882 and 712 to step switch MMCTG each time a blank is read. When wiper B of switch MMCTG is advanced 16 times it extends ground from contacts 859, 848 and 886'; through its sixth contact and contacts 926 to energize relay 910 for an already described purpose. In the event that the distant station provides blanks to feed out tape at the present station, and contacts 871 are disconnected from relay 950 and connected to the lower winding of relay 810. Thus if feedout from the distant station stops after the EOM is read, but before relay 920 is operated the circuit for relay 780 is completed through contacts 883, 849 and 792. If relay 710 is still operated relay 780 is operated as before. Relay 810 is therefore operated in place of relay 950 as a result of the operation of relays 780, 790 and 870. It closes contacts 815 to energize its upper winding at contacts 998. At contacts 811, 812 and 814 it completes signal circuit and at contacts 813 it operates relay 860 to stop the reader. In the event the message is processed correctly, the release of relay 830 after relay 840 is restored merely completes a circuit for relay 820.

Relay 920 operates as explained and locks operated as previously described, and over the off-normal springs 902 of switch MMCTG. It releases relay 870 at contacts 929, which in turn releases relay 880 at contacts 871. Relay 880 in turn releases relay 950 by closing contacts 887. Relay 950 opens contacts 953 to remove ground from lead C387(3) and stop blank tape feedout. At contacts 992 a self-interrupted homing circuit is completed for switch MMCTG through off-normal springs 901 to ground at contacts 999. At contacts 932 it removes ground from lead C5201(52) to restore relay 6060 in the Cross Office Unit 5400 as described. This also restores relay 630 which in turn restores relay 680 and relay 6040 in the Cross Office Unit 5400. Relays 840 and 590 are restored as described at contacts 921, and relay 840 in turn restores relay 850. With relays 630 and 850 and switch MMCTG in its home position relay 920 restores and the Line Circuit 400 is ready to handle another message.

*EOM cross office and outgoing transmission*

Relay 6060 on restoring opens another point in the already open circuit to the relay 6040 at contacts 6064. At contacts 6063 it opens the holding circuit to the upper winding of relay 6110 and that relay restores. At contacts 6061 it opens a point in a holding circuit for relay 6010, however that relay remains operated over contacts 6016, 5939 and 6069. At contacts 6065 it extends resistance ground through the signal relay 6020 in a manner described to lead C5322(53) and the perforator line magnet 5349. Relay 6110 on restoring opens contacts 6113 to open another point in the circuit to its upper winding and at contacts 6112 removes the direct ground from lead C3229(32). At contacts 6114, 6115 and 6117 it disconnects leads 5213(52), and C5203(52) and C5202 extending to the incoming selector from the cross office unit. Also at contacts 6112 the removal of ground causes the shunt around the lower winding of relay 5940 to be removed and it now operates in series with 5950 over contacts 5952 the lower winding of relay 5940 to ground at off-normal springs 5903 and also over lead C5298(52) to ground at off-normal springs 5299. At contacts 5948 it provides a shunt for contacts 5952. At contacts 5946 it places ground on lead C3229 (32) to prevent register from now establishing a connection to this cross office unit. At contacts 5949 it extends ground over now closed contacts 6116 and lead C5221(52) to the off-normal springs 5245 of the incoming selector 5200 and the self-interrupting contacts of its motor magnet. The motor magnet now steps its wipers home in a self-interrupted manner and off-normal springs 5245 open when the switch is home. At contacts 5947' a self-interrupted homing circuit for the motor magnet of MMIG is completed through off-normal springs 5905, and the switch steps its wipers home in a self-interrupted manner. Off-normal springs 5904 then close in complete a circuit to slow-to-release relay 5910 while off-normal spring 5905 open. At contacts 5948 relay 5940 prepares a stepping circuit to the motor magnet of the Outgoing Selector Switch 4800, however as contacts 6379' or 6019' respectively are open at this time this circuit is not completed. When off-normal springs 5903 open and off-normal springs 5299 in the incoming selector switch open to remove ground from lead C5298(52) both relays 5940 and 5950 restore.

Relay 5950 on restoring closes contacts 5953 to enable the completion of a circuit by a register to relay 5960, while contacts 5945 and 5946 resume their respective restored positions to enable the completion of a circuit to relay 5950 and remove ground from lead C3229(32) respectively. Thus a register may establish a connection to the cross office unit, if it has not seized an outgoing channel or if it is still transmitting to the outgoing channel all in a manner described. The incoming line circuit having the second message then transmits to the present preset cross office unit to operate reperforator 5349, which provides slack tape to the reader. In the event another message is stored in the preset cross office unit, slack tape is available to the reader, and when the cross office unit seizes the outgoing line or if has not yet fully transmitted its message, the cross office reader operates under control of relay 6260 as explained to advance the EOM.

Each time the cross office reader senses a line feed character, lead 7' forwards ground over contacts 5411, 5631 and 5621 to energize relay 5610. Relay 5610 completes a locking circuit for itself through the upper winding of relay 5620 and contacts 5611 to ground at contacts 5471. At the end of the sensing cycle relay 5610 and the upper winding of relay 5620 are energized over this locking circuit. Relay 5620 opens contacts 5621 to prevent relay 5610 from energizing on the sensing of another line feed character. Relay 5620 closes contacts 5622 to prepare a circuit for its lower winding so that if a line feed is sensed again, its lower winding is energized. At contacts 5625 it energizes relay 5510, which opens the original circuit for energized relay 5610 at contacts 5411. It connects the sensing leads 1'—5' and 8' to the sensing relays 5420—5470.

If the line feed character were sensed, during the body of the message, succeeding characters will not be line feeds, and therefore no detection chain ground is forwarded to operate the lower winding of relay 5620 or corresponding relay 540, while the operation of relay 5470 opens the holding circuit to relay 5610 and 5620 or if 5620 and 5630 are operated, their holding circuit is opened. Both relays then restore. If a line feed character follows the first line feed character, the upper winding of relay 5620 is energized by a detection chain ground in a manner explained for relay 540 in the incoming Line Circuit 400. The operation of relay 5630, 5640, 5650, 5660, 5670 and 5680 parallel that explained for relays 540, 550, 570, 580 and 590 respectively on sensing the succeeding characters of the EOM by the cross office reader. After the reader senses the last character of the EOM, relay 5680 is energized and energizes its lower winding over contacts 5689, lead C5601 and contacts 6241 and 6252.

Lead C5377(56) is grounded during each cycle of the cross office transmitter in a manner already explained. That ground is now forwarded over contacts 5684 to energize the motor magnet of switch MMADV. At the end of each pulse the motor magnet deenergizes to move its wiper one step. There are approximately ten characters between the reader and the transmitter on the third pulse over lead C5377(53) the motor magnet of switch MMADV steps its wipers to its second contact. It extends the ground on lead C5377(53) over its second bank contact and contact 5681 to energize relay 6230. Relay 6230 operates to close contacts 6233 and complete its own holding circuit through the winding of relay 6240, contacts 6258 to ground at contacts 6348'. The circuit to relay 6260 and relay 7120 in the Outgoing Channel Unit 7000 is opened at contacts 6231 and both restore. Relay 7120 places ground at contacts 7121 to relay 7130 so that it no longer is under control of the reperforator pulse contacts. Relay 6260 removes the ground for operating the clutch magnet MM21 of the reader transmitter unit 5390 at contacts 6261. Thus the cross office unit transmission ends a few characters after the EOM is read by the cross office reader.

When ground is removed from lead C5377(53) at the end of the cycle relay 6240 energizes, as the ground on lead C5377(53) had shunted it. At contacts 6241 it opens the circuit to the lower winding of relay 5680, which restores as relay 5470 operating during the sensing cycle following operation of relay 5680 had restored relay 5670 to in turn open the circuit for the upper winding of relay 5680. Relay 6240 opens contacts 6244 and closes contacts 6243 to switch lead C4899(48) from ground to battery through the lower winding of relay 6250. This signals the outgoing unit that the message transmission is completed. At contacts 6242 it opens one circuit to the upper winding of relay 6210, which remains operated over off-normal springs 5692 and lead C5602, until switch MMADV homes to open its off-normal contacts 5692. A self-interrupted stepping circuit for switch MMADV is completed on release of relay 5680 from ground at contacts 6211 forwarded over lead C5603, contacts 5686 and off-normal springs 5693.

Relay 6250 is now connected over contacts 6243 and 6375 to lead C4899(48), level E of the Outgoing Selector Switch 4800, lead C4887(71), contacts 7168' and 7186, the winding of relay 7150, to ground at contacts 7024. It does not operate in series with relay 7150. Relay 7150 does operate from the battery extended through the lower winding of relay 6250 and ground at contacts 7024. At contacts 7155 it completes its own holding circuit from the ground at contacts 7024. At contacts 7154 it forwards ground over contacts 7214 and 7143 to an additional holding circuit for relay 7210. At contacts 7153 it restores relay 7070. Restoration of relay 7070 permits a cross office unit to establish a connection to this channel unit by operating relay 7040 to in turn operate relay 7030 and perform a precedence comparison test, and as soon as the outgoing channel is ready to receive relay 7070 may be reoperated. At contacts 7157, relay 7150 restores relay 7170. Relay 7170 disconnects the transmitting lead C4881(48) extending from the cross office unit and its outgoing selector switch from the relay 7280 at contacts 7175 and extends one side of the disconnected signal relay 7280 over contacts 7178 and 7237' to resistance ground in lead MTD through the stop contacts of the Monitor Transmitter 7301, while its other side remains connected to battery over contacts 7227, relay 7240 and reperforator 7302. At contacts 7077' relay 7070 further disconnects lead C4881(48). Ground at contacts 7152 is forwarded over contacts 7075 and 7023, lead C8160(81) to energize the motor magnet of the units message number switch MU1'. When the outgoing unit message number switch magnet operates, its interrupter springs return the operating ground to lead C8161(71) to operate relay 7160 over contacts 7156.

At contacts 7164 it provides an additional holding ground for relay 7210 over contacts 7214 and 7165. At contacts 7167' it extends ground from contacts 7145 directly to lead C4887(48) to operate relay 6250 in the cross office unit. At contacts 7168 it opens another point in a circuit to relay 7170. At contacts 7166 is energizes its upper winding from ground at contacts 7239'. At contacts 7169 it opens the operating circuit to relay 7270 to restore that relay.

Relay 6250 in a cross office unit on operating opens contacts 6259 to remove ground from lead C4885(48) and C4886(48) in turn, to restore relay 7020. Relay 7020 in turn opens contacts 7024 to restore relay 7150. At contacts 7156 relay 7150 opens the circuit to the lower winding of relay 7160, which remains operated over the circuit to its upper winding. At contacts 7023, relay 7020 opens the circuit for energizing the motor magnet of the units message number switch MU1', over lead C8160(81). That switch magnet on releasing steps its wipers to advance the message number switch.

It the units switch MU1' is on contact 1 indicating that nine message numbers have been assigned, ground when forwarded over lead C8160(70) to energize the motor magnet of switch MU1' also is forwarded through off-normal springs 7701 to energize the motor magnet of switch MT1'. When the ground is removed to open the energizing circuit for both magnets, they step their wipers. The wipers of switch MU1' is then advanced to its second contact and the wipers of switch MT1' are advanced to a succeeding contact so that another tens digit will be assigned to the message, while the unit switch assigns the digit zero to the next message. Off-normal springs 7701 open. To reset the switch MU1', switch 7702 is closed to energize the motor magnet of switch MU1' which then steps in a self-interrupted manner from ground at forwarded over the wiper of its A level. The self-interrupted stepping of switch MU1' continues until the wiper of the A level reaches its third contact. This switch will now assign the unit digit one to a succeeding message. In a similar fashion MT1', if energized, when stepped on contact 1 forwards ground through off-normal springs 7703 to energize itself and the motor magnet of the hundreds switch MH1'. Switch MT1' is then stepped to its second contact and switch MH1' stepped to a succeeding contact. Each switch may be stepped in a self-interrupted manner from ground at key contacts 7704 on 7705 respectively forwarded over the wiper of level A of the respective switch. Each switch then steps to its second contact from which it will assign the digit zero to the next message number.

Relay 7270 on restoring closes a circuit at contacts 7271 to the clutch magnet of the markable transmitter 7301 over lead MCL. It again controls the transmitter to enable it to forward the markings from bank contacts of switch MMSDR levels F—K to the polar relay 7280 and monitor reperforator over lead MTD, contacts 7237' and 7178, relay 7280, contacts 7227, relay 7240 and the associated rectifier bridge to reperforator 7302 in a manner explained. Switch MMSDR levels F—K, contacts 16 through 24 are marked to cause the transmission and recording of the following characters: line feed, line feed, line feed, line feed, N, N, N, N, and letter shift. The switch MMSDR is stepped from contacts 16 through eight contacts to contacts 24 by pulses over lead NU as explained. When contacts number 24 are reached a pulse from the markable transmitter over lead NU operates switch magnet MMU'' via switch MMSDR level C and contact 24 and the strapping between terminals HT5 and HT6 instead of the motor magnet of switch MMSDR. The letter shift characters found on contacts number 24, levels F—K is sent to the signal relay 7280 and monitor reperforator 7302 in a manner explained. Numbering pulses from the markable transmitter 7301 therefore steps switch MMU'' and after its B wiper reaches its 9th contact, the ground from lead NU and terminals HT5 and HT6 is forwarded to energize the motor magnet of switch MMT''. At the end of the pulse both switches MMU'' and MMT'' therefore step their wipers once. The circuit for MMT'' is then opened but switch MMU'' continues step and on reaching its N contacts forwards the ground from terminal HT6 over its A wiper, switch MMT'' wiper A on contacts 1, over terminal SRL strapped to terminal HT8 and to contact 24 on level E of switch MMSDR to operate relay 7270. It opens the circuit to the clutch magnet of transmitter 7301 at contacts 7271. In this manner a series of twelve letter shift characters are sent and counted by the switches MMU'' and MMT''. Relay 7270 locks operated over contacts 7273 and 7163 through the winding of relay 7250 to ground strapped at terminal HT2. When the numbering pulse which operates relay 7270 is removed relay 7250 operates in series with relay 7270.

Relay 7250 on operating closes contacts 7251 to energize the upper winding of relay 7230. Relay 7230 closes contacts 7237 to hold its upper winding energized over contacts 7216, and also from the off-normal springs 7386 of switch MMU'', and also over off-normal springs 7387 of switch MMT''. It energizes its lower winding over contacts 7238 and wiper B of switch MMSDR connected over its bank contacts to ground. At contacts 7235 it completes a self-interrupted homing circuit for the motor magnet of switch MMU" over off-normal springs 7388, and at contacts 7238' it completes a self-interrupted homing circuit for the motor magnet of switch MMT" over off-normal springs 7289. At contacts 7239 it opens the circuit to relay 7220, which restores to reestablish the original connections for signal relay 7280 and the Monitor Reperforator 7302 respectively. At contacts 7239' relay 7230 opens a circuit to the upper winding of relay 7160, which restores as its lower winding was deenergized previously at contacts 7156. Relay 7160 on restoring opens contacts 7164 and 7165 to restore relay 7210. At contacts 7167' the circuit for the lower winding of relay 6250 is opened. At contacts 7212 the circuit for maintaining the motors of the reperforator and transmitter operated are opened. Relay 7210 on restoring closes contacts 7213 to complete a self-interrupted stepping circuit for the motor magnet of switch MMSDR over contacts 7182 and its level A wiper to ground. The switch now steps its wipers home in a self-interrupted manner to contacts number 3 since level A contacts 1 and 2 are grounded. In the case of a certain type of receiving station, level A contact one is not grounded, switch MMSDR homes to contact number 1.

When passing through position 25, switch MMSDR opens off-normal springs 7499 to restore relay 7260.

For stations requiring that the twelve letter shift characters at the end of each message be followed by blanks, if another message does not follow immediately switch MMSDR is halted on contacts number 25 after the twelve letters are sent. Terminal HT4 is strapped via terminal SRL and switch MMT" wiper A, etc. to the numbering lead NU so that the ground pulse from the transmitter 7301, over lead NU, MMSDR wiper of level A and contact 24 is forwarded over terminals HT5 and HT6 through the A wipers of switches MMU" and MMT" respectively to energize the motor magnet of switch MMSDR which steps its wipers to contacts 25 after the pulse. Relay 7270 energizes as before described, but as ground is not provided at terminal HT2 in this case, relay 7270 cannot remain operated when switch MMSDR steps to contacts 25. It reoperates the clutch magnet of Transmitter 7301 at contacts 7271. Switch MMSDR, off-normal springs 7499 open in position 25 to release relay 7260 thereby closing contacts 7261 but relay 7270 has already released to prevent operation of relay 7250. The blank coded on switch MMSDR levels F—K contacts number 25 is sent and is counted by switches MMU" and MMT", as the pulses from the transmitter 7301 are now forwarded over level A contact 25 to step switch MMU".

Switch MMU" is now standing on its first bank contacts, and is stepped thereafter to each succeeding contact for every pulse on lead NU in a manner described. In the meantime the transmitter continues to operate and forwards the blanks coded on switch MMSDR levels F—K contacts 25 to relay 7280 and the Monitor Reperforator 7302 in a manner described. Each time switch MMU" passes its 9th contact the motor magnet of switch MMT" is energized and then deenergized as the pulse on lead NU is terminated it therefore steps its wipers once every time switch MMU" encounters contact 9 in a manner described. Switch MMT" is stepped in this manner to its seventh contact and two pulses thereafter, when switch MMU" wiper A is on its contact N the ground on lead NU is forwarded in a manner already described over the A wiper of switch MMT". This time the ground is forwarded over contacts number seven to terminal FRL which is strapped to terminal HT1 so that the ground is extended over contacts 25 on switch MMSDR level E to operate relay 7270. Relay 7270 operates and completes a holding circuit for itself over contacts 7273, 7163 the winding of relay 7250 to ground at contacts 7261, as relay 7260 has been restored. At the end of the pulse relay 7250 operates in series with relay 7270 and the aforedescribed procedure for releasing relay 7210, 7160 and 7220 while energizing relay 7230 and stepping switches MMU", MMT" and MMSDR home to release relay 7230 is repeated as described.

If relays 7030 or 7070 are operated at the end of the letter shift character transmission, indicating that another message is waiting to be sent, blank transmission is not required in the case of those stations otherwise requiring it. The pulse on lead NU from the markable Transmitter 7301 operates relay 7270 as before described, and after the pulse it operates in series with relay 7250 from ground extended over contacts 7039 or 7079 respectively and the strap between terminal NM and HT2. Similarly if relays 7030 and 7070 are operated at any time during the transmission of the blanks, the ground on lead NU is extended through contacts 7031 or 7071 respectively to contact 25 of switch MMSDR level E to operate relay 7270. It now holds operated over the just described holding circuit to enable relay 7050 to operate and complete the aforedescribed operations at the end of the pulse on lead NU.

For certain receiving stations whereat the letter shift character found on switch MMSDR levels F—K contacts 24 is not required, terminal HT3 is strapped to HT7. Therefore when switch MMSDR is on contacts 23 the pulse over lead NU is extended over level E of switch MMFDR to energize relay 7270. After the pulse relay 7270 operates in series with relay 7250 from the ground strapped at terminal HT2 and the aforedescribed series of operations takes place to step switches MMU", MMT" and MMSDR to their home positions. In the event of the receiving station is of the same type as the station RUWP being described, the closing information includes one letter shift character after the EOM. This is then followed by a number of blanks in the event another message does not follow immediately. In this case terminal HT5 is strapped to terminal HT4 so that the pulse on lead NU is forwarded over contacts 24 of level C of switch MMSDR, while the letter shift character is being sent. The pulse over contacts 24 of level C is forwarded over terminal HT5 and HT4 to energize the motor magnet of switch MMSDR. At the end of the pulse the motor magnet steps its wipers in a manner described. This prevents more than one letter character from being sent after the EOM. Also terminal HT7 is strapped to terminal HT8 so that the pulse on lead NU is forwarded over contacts 24 of level E of switch MMSDR to operate relay 7270.

If another cross office unit is waiting to seize this outgoing line circuit relay 7050 operates in series with relay 7270 over the strap between terminal NM and HT2 in a manner explained, at the end of the pulse on lead NU to initiate an aforedescribed series of operations. This maintains relay 7270 operated of course and holds the clutch magnet circuit of the transmitter 7301 open at contacts 7271. If another message is not waiting, when switch MMSDR steps its wipers to contacts number 25, relays 7270 and 7250 restore as described. Blank transmission is now initiated from coded markings on contacts 25 of levels F—K of switch MMSDR and the switch remains on contacts 25, until switches MMU" and MMT" have counted the required number of blanks in a manner already described. After this relays 7270 and 7250 are operated in a manner described to initiate an aforedescribed series of operations. In the event that relays 7030 and 7070 are operated indicating that another message is to be sent to the outgoing station, while blank transmission is taking place, ground from lead NU is forwarded over either contacts 7031 or 7071 as previously described and contacts 25 of level E of switch MMSDR to operate relay 7270. It can now lock operated in series with relay 7250 over contacts 7261 at the termination of the pulse on lead NU in a manner described. The blank transmission is then halted.

Cross office release

It will be recalled, that the outgoing channel unit signals the cross office unit, that it has received the EOM by operating relay 6250. Relay 6250 on operating opens the holding circuit to relays 6230 and 6240 at contacts 6258. In the meantime it completes a circuit for its upper winding over contacts 6257 and 6232, and also to contacts 6348 and 6217 respectively. Its lower winding is restored when relay 7160 in the outgoing channel restores to open contacts 7167'. At contacts 6252 relay 6250 restores relays 6340 and 5680 and at contacts 6259 it restores relay 6370 and connected relay 7020. At contacts 6251 it opens the circuit to MM21 to stop the reader transmitter. Relay 6340 on restoring opens one of the holding grounds at contacts 6348 for the upper winding of relay 6250. Relay 6370 on restoring prepares a circuit for the Outgoing Selector Switch motor magnet at contacts 6379 however this circuit is not completed as contacts 6019' are held open by operated relay 6010. Relay 6250 also locks energized over off-normal springs 5694, lead C5695 and contacts 6257 to maintain its upper winding energized. At contacts 6254 it extends a homing circuit over off-normal springs 5691 and the self-interrupting springs of the motor MMCTG1 to step that switch home to remove the holding ground at springs 5694. When relay 6230 restores it removes one of the holding grounds for relay 6250 at contacts 6232. Switch MMADV is stepped home over off-normal springs 5693, contacts 5686 and 6211 to remove the last holding ground for relay 6210 at springs 5692. Relay 6210 opens the last holding circuit for the upper winding of relay 6250 at contacts 6217 and it restores to enable the completion of a circuit to the reader transmitter clutch magnet MM21 as soon as relay 6260 is reoperated following seizure of the outgoing channel. Relay 6310 has remained operated over its holding circuit permitting the seizure of the outgoing channel unit 7000, if the message in storage has the proper precedence.

In the event another message was not in storage tape to the cross office reader becomes tight, if the message is being transmitted to an outgoing channel, as the reperforator 5349 stops feeding tape to the reader. The reperforator 5349 no longer feeds out tape as the line circuit has transmitted the EOM thereto and then stopped transmission. Reader transmitter 5390 continuing to operate causing the tape between the reperforator and the reader to become tight. Slack tape contacts 5387 open to remove ground from lead C5387(59) and release relay 6260, which stops the reader at contacts 6261. Relay 7120 in the unit 7000 also restores to maintain ground on relay 7130. Tight tape contacts 5388 closed to place ground from contacts 5389 on lead C5398(60). Relay 6060 restores under control of the incoming line circuit and relay 5940 is operated in series with relay 5950 as described. Switch 5200 and switch MM1G are restored to in turn restore relays 5950 and 5940 as described. Ground on lead C5398(60) is now forwarded over contacts 6015 and 5951 to energize the upper winding of relay 5930.

Relay 5930 energizes its lower winding from ground at contacts 5942, 5934 and 6323. At contacts 5931 it extends ground over contacts 6141, 6231, 6212, 6251 and 6324, over lead C5308(53) to energize magnet MM21 for starting the cross office reader transmitter. The ground is also forwarded from contacts 6324 to contacts 5938 and 5948 and lead C5379(53) to cause the reperforator magnet 5349 to feed out tape. At contacts 5939 the holding circuit for relay 6010 is opened, and it restores. Relay 5930 extends ground from contacts 6258' over contacts 5936 to lead C3229(32) to maintain the cross office unit busy to any register. This ground is also forwarded over contacts 5945 to energize relay 5950, which now has a holding circuit through contacts 5952, the lower winding of relay 5940 to ground at contacts 5937. At contacts 5951 it opens the original operating circuit for the upper winding of relay 5930. Operation of relay 6010 opens contacts 6017 and 6019 to restore relay 6310 and prevent the unit from again demanding an outgoing channel. At contacts 6018 a holding circuit for relays 5940 and 5950 is extended from ground at contacts 6121. A homing circuit for switch MMPR1 is now completed through contacts 6011 and 5941 and off-normal springs 5771. The switch steps its wipers home. At contacts 5935 relay 5930 operates slave relay 5560 over lead C5569.

It operates relay 5410 at contacts 5563. Relay 5410 connects the sensing leads 1'—5' and 8' to the sensing relays 5420—5470. With blank tape being fed out by the reperforator and the reader transmitter operating, the EOM is soon sensed at the reader. Normally ground on lead 7' is forwarded, when the first line feed character is read by the reader to operate relay 5610. In this case, however the relay 5610 operates directly under control of the sensing relays. The remainder of the EOM detection relays 5620—5680 are then operated in a manner described, when the rest of the EOM is read. Relay 5550 also prepares a blank stepping circuit for switch MMCTG1 extending from the detection chain contacts of the sensing relays, lead Blank; contacts 5555, 5565 and 5685. When the EOM is read relay 5680 is operated as before described. It opens the stepping circuit to switch MMCTG1, at contacts 5685, and completes a self interrupted homing circuit therefore over contacts 6253 and 5687 and off-normal springs 5691. When blanks are read the stepping circuit for switch MMCTG1 is completed through contacts 5444, 5453, 5464, 5424, 5434 and 5473 to lead Blank etc. Relay 5470 restores to open the circuit to the motor magnet and it steps its wipers one position in this manner for each blank read. Switch MMCTG1 is therefore stepped each time a blank is read by the reader, and if the relay 5680 is not operated by the time switch MMCTG1 is in its sixth position, battery from the upper winding of relay 6140 forwarded over contacts 6256 and contacts 5683 to the wiper of switch MMCTG1 is extended over contact six and contacts 5561 to ground at key contacts 6179. Relay 6140 then operates to open contacts 6141. As the tape is continuing to be fed out the tape between the reperforator 5349 and the reader becomes slack so that contacts 5388 open and contacts 5387 close to ground lead C5387(59), contacts 5932 and 6323 to maintain the lower winding of relay 5930 energized. Contacts 6141 on opening restores ground from leads C5308(53) and C5379(53) so that, the reader stops and blank tape feed out is stopped respectively. Contacts 6142 complete an energizing circuit for the lower winding of relay 6140 to key contacts 6179 and at contacts 6143, 6144 and 6145 it completes various signal circuits. If relay 5680 is operated in the course of reading a EOM, it opens the just described circuit to relay 6140, before it is completed, at contacts 5683, and the circuit for energizing the motor magnet of switch MMCTG1 at contacts 5685.

If a good EOM is detected, relay 5680 is operated and the EOM is advanced towards the transmitter in a manner described and an already described sequence of operations takes place for signalling the outgoing channel that the EOM is advanced. Relay 6250 in the cross office unit operates as before described under control of the outgoing channel unit. It opens contacts 6258' to remove the shunting ground from relay 5940, which then operates to open another point in the operating circuit for relay 5950 at contacts 5945. Relays 5940 and 5950 remain operated from the ground at contacts 5937. Relay 5940 at contacts 5948 opens the circuit for extending ground to lead C5379(53) to stop blank type feed out. Relay 5930 therefore restores as soon as the tape between the reperforator and reader becomes tight and opens contacts 5387 to remove ground from lead C5387(59). The ground for operating the reader during this period comes from contacts 5931, 6141, 6231, 6212 and 6251 as soon as relay 6250 restores as before described. In the meantime relay 6370 restores as before described completes a self interrupted homing circuit for the outgoing selector switch 4800 over contacts 6379, 5949′, 6019′, lead C4805(48) and springs 4822. Springs 4817 then open to remove ground from lead C4849(48), and restore relay 6120. When relay 5930 restores it opens contacts 5935 to restore relay 5560. At contacts 5937 it opens one circuit to relays, 5940 and 5950, however they do not restore until relay 6120 restores the last holding circuit thereto extending over contacts 6121, 6018, the lower winding of relay 5940 and contacts 5948 and 5952 in shunt.

When a register again seizes the cross office unit to transmit another message the cross office unit relay 6010 is reoperated in a manner already described. The tight tape switch contacts 5388 are closed and ground is forwarded to lead C5398(60) and contacts 6015, however as relay 5950 is operated to open contacts 5951 the circuit to energize the upper winding of relay 5930 is not completed. The reperforator is operated under control of the incoming line transmitter and it feeds out tape all in a manner described. When slack tape becomes available to the reader transmitter unit 5390, contacts 5387 close to ground lead C5387 and an already described circuit for operating the reader clutch magnet MM21 is completed to start the reader, processing the message in a described manner. It will be recalled that for every character except a letter shift or blank the reader supplies a pulse to lead C5378(55), contacts 5554, 5564 and 5685 to step switch MMCTG1. If it steps ten positions without relay 5550 operating in response to an SOM, a circuit is completed from contacts 6179, 5553, switch wiper MMCTG1, contacts 5683 and 6256 to energize relay 6140. It completes an already described sequence of operations.

*Cross office cancel transmission*

When a cross office unit starts receiving a high precedence message, the switch MMPR1 is set to contacts 4, 5 or 6 respectively, and relay 6010 is operated all as described. It operates relay 6310 as previously described, which immediately connects relay 6220 to lead C4886(48) at contacts 6311. This prevents a low precedence message from seizing the desired outgoing channel while the high precedence unit is advancing the SOM of its message. This is due to the fact that the high precedence unit participates in the comparison test on operation of relay 6310 as described.

When the SOM of a high precedence message is advanced through the transmitter and relay 6210 is operated as described, a circuit is prepared to relay 6270 as described. If the desired outgoing channel is busy, relays 6220 and 6270 remain unoperated. Relay 6270 operates from ground extended over contacts 6218, 6222 and 6376 to energize the upper winding of relay 6270 over wiper A of switch MMPR1. It grounds lead C7602(76) at contacts 6273 to energize relay 7610. This starts a cancel transmission cross office selector switch 7600 in a manner similar to that explained for operating switch 7500. This switch has access to twenty-five cross office units and as many are provided as necessary to serve all the cross office units. In this case relay 6270 at contacts 6272 connects battery from the winding of relay 5710 to the corresponding bank contact in the cancel transmission cross office selector switch 7600 to mark the corresponding bank contact, while removing ground therefrom at contacts 6271. The switch motor magnet steps in search of the unit over contacts 7611 and 7631, the level A wiper of switch 7600, lead C7605(62) to ground at contacts such as 6271 in cross office units not demanding the switch in a manner similar to that previously explained for other switches. On finding the battery through relay 5710 extended over wiper A of switch 7600 to the lower winding of relay 7630 energizes and only that relay operates.

At contacts 7633 it closes ground to lead C7603(77) to operate relay 7710 in the Cancel Transmission Unit 7700, and at contacts 7634, it closes battery through the winding relay 7620 to lead C7604(77) to mark this cross office cancel transmission selector switch 7700 in a banks of the cancel transmission unit switch MMSF. At contacts 7631 the circuit to the motor magnet of switch 7600 is opened. At contacts 7636, it prepares a circuit through level B of the cancel transmission switch to a lead such as S1. At contacts 7637 it places ground on relay 7640 before it can restore due to the opening of contacts 7612. If it does restore, it operates the upper winding of relay 7650 at contacts 7641. Relay 7650 energizes its lower winding at contacts 7651 and 7654, and closes a signal circuit at contacts 7652.

Energized relay 7710 opens contacts 7711 to deenergize slow-to-operate relay 7880. At contacts 7612 it starts the motors of the markable transmitters associated with the Cancel Transmission Unit 7700. At contacts 7713 it extends ground from contacts such as 7635 and a lead such as 7604, the wiper level A on switch MMSF standing of the bank contact corresponding to an idle cancel transmission switch or from its last contact respectively, through contacts 7829, the self-interrupting springs of the switch MMSF magnet to energize the magnet. It steps in a self-interrupted manner, and on finding battery from the operated cancel transmissions selector switch contacts 7634 and relay 7620 forwarded over lead C7604(77), the motor magnet of switch MMSF is shunted. The upper winding of relay 7820 is energized from the battery extended over lead C7604(77) to ground over contacts 7881 and 7922, as soon as relay 7880 restores. It opens the original operating circuit for the motor magnet of switch MMSF at contacts 7829, and energizes its lower winding from battery through the switch MMSF wiper A at contacts 7828 to ground at contacts 7912. At contacts 7829′ it forwards ground from contacts 7922 and 7956 to lead C7801(57).

Operation of relay 7620 in the selector now occurs, as it is connected through the low resistance winding of relay 7820. It connects the low resistance winding of relay 7630 to the wiper of level A of selector switch 7600 over contacts 7621 and 7632 to cause relay 5710 in the cross office unit to operate. At contacts 5712 it connects the ground on lead C7801(78) to relay 6270. At contacts 5714—5719, relay 5710 connects the contacts of levels C, D and E to the Cancel Transmission Unit 7700 to enable that circuit to perform the precedence test utilizing relays 7720—7760 in a manner similar to that explained for the precedence test of the Outgoing Finder Link 6400.

Resistance ground is now extended from contacts 7827 in the Cancel Transmission Unit 7700 through relay 7840, contacts 7914, lead C7901(57), contacts 5713 in the cross office units, lead C5748, lead C4885(48) over level A of the Outgoing Selector Switch 4800 associated with the demanding cross office unit and over lead C4889(70) to the upper winding of relay 7020. Resistance battery is also extended over the same circuit to relay 7020 and both the resistance ground and the resistance battery are extended from the multipled outgoing selector switch contact of the outgoing unit 7000 to ground through relay 6370 in the transmitting cross office unit. If relay 7210 in the outgoing channel unit 7000 has not operated yet, indicating the unit having seized the outgoing line, is still sending an SOM and channel number, contacts 7219 are closed to maintain the upper winding of relay 7020 shunted so that relay 7840 in the cancel transmission unit does not operate. Operating relay 7210 indicates that the opening information of the unit has been sent and the outgoing unit may be seized as both windings of relay 7020 are in series. Likewise operation of relay 7150 closes contacts 7158 to maintain the windings of relay 7020 in shunt during the transmission of an EOM and prevent seizure of the channel during that period. If both contacts 7219 and 7158 are open indicating the body of the message is being transmitted both windings of relay 7020 are in series, and relay 7840 operates.

At contacts 7841 relay 7840 prepares a circuit for relay 7850. Leads C7701(57), C7702(57) and C7703(57) connected to respective pairs of the cancel transmission comparison precedence test relays 7720—7770 in a manner already described for the outgoing finder link as these leads are now extended over contacts 5716, 5715 and 5714 respectively to leads C4804(48), C4803(48) and C4802-(48) respectively and respective multipled contacts of the outgoing selector switch bank F, G and H respectively so that the unit which has seized the channel forwards a marking either from contacts such as 6379' or 6378 over its MMPR1 switch to the lead corresponding to its precedence to operate one of the relays 7720—7770, corresponding to its precedence. Therefore either ground or resistance battery is extended to one of the leads depending on the position to which the wipers of switch MMPR1 in the cross office unit having seized the outgoing unit is stepped. This ground or battery respectively is extended over one of the leads 7701(77), 7702(77) or 7703(77) to operate one of the relays 7720—7770 in a manner explained. In the meantime the lower winding of relay 6350 is connected over lead C5747 to the wiper of level E switch MMPR1 in the unit seeking to seize the channel and from there over one of the leads C7704(77), C7705-(77) or C7706(77) respectively to the contacts of relay 7620 and from there lead C7704 is connected to contacts 7732 and 7742 of relay 7730 and 7740 respectively. Leads C7705 and C7706 are respectively connected through contacts 7722 to contacts 7732 and through contacts 7733 to contacts 7742. Thus with relay 7720 operated indicating that the highest precedence message is being transmitted contacts 7721, 7722 and 7723 are open to prevent any of the leads C7704, C7705 or C7706, one of which has relay 6350 connected thereto, from being connected to battery through the lower winding of relay 7780. Likewise relay 7730 at contacts 7732 and 7733 prevents any but the highest precedence message from resulting in the operation of relay 7780 from ground at relay 6350 in the cross office unit having that message. Relay 7740, if operated, closes contacts 7742 to allow relay 6350 in the cross office unit to be operated over contacts 7721 or 7722 and 7732, if it is connected over either lead C7704(57) or over lead C7705(57) respectively. Operation of any of the relays 7750, 7760 or 7770 indicates that the outgoing channel has been seized by a unit having a low precedence message and enables relay 7780 to be operated by the present cross office unit over one of the contacts 7751, 7761 or 7771 and the lead over which it is connected to relay 6350.

Any operated one of the comparison precedence test relays 7720—7770 also closes the contacts such as 7724 or 7734 to operate slow-to-operate relay 7810. As relay 7810 is slow-to-operate relay 7780 can operate in series with relay 6350 before relay 7810 operates. If relay 7780 is not operated by the time relay 7810 operates, ground is extended from contacts 7815, over contacts 7783 to operate relay 7920. Relay 7920 completes a holding circuit over contacts 7921 and 7811. At contacts 7922, it removes ground from the winding of relay 7820 and wiper A of switch MMSF to restore relay 7620 also. Relay 7620 on restoring opens contacts 7621 to restore relay 5710. Relay 7820 on restoring opens the circuit to relays 7840 and 7020. At contacts 7622 the motor magnet of switch 7600 is deenergized to step its wipers once and release relay 7630. Relay 7630 on restoring opens the circuit at contacts 7633 to relay 7710, while at contacts 7634 it opens a point in the already open circuit to relay 7620. Release of relay 7710 closes contacts 7711 to reoperate slow-to-operate relay 7880. With relay 5710 restored the circuit to any operated precedence register relay 7720—7770 is opened and it restores to open the circuit to relay 7810. Relay 7810 opens contacts 7811 and 7815 to restore relay 7920.

If relay 7780 operates before relay 7810, the circuit to relay 7920 remains incomplete as contacts 7783 open, however a circuit is completed over contacts 7815, 7782 and previously operated contacts 7841 is completed to relay 7850. At contacts 7781, relay 7780 energizes its upper winding from ground at contacts 7814.

A marking comparable to the speed of the transmitter associated with the cross office unit is provided at leads such as S1 on level B of switch 7600 and that marking is forwarded over contacts 7636, lead C7607(77) to level B of switch MMSF. That marking is forwarded over contacts 7828' to operate none, one or both of relays 7960 and 7970. For low speed transmission lead S1 has no potential so that neither relay operates. For intermediate speeds it is marked with resistance ground so that relay 7970 operates and for high speed transmission direct ground is provided to operate both relays. At contacts 5721, lead C4882(48), which extends to lead C4881(70) and the monitor reperforator and signal relay in the outgoing channel is now connected over lead C7803(57), contacts 7854 and 7913, through the appropriate contacts 7963 and 7974, 7964 and 7975 or 7964 respectively to the stop contacts of one of the three transmitters associated with the cancel transmission unit. This transmitter has the same speed as the transmitter used with the outgoing channel and has been selected by control of relays 7960 and 7970.

Relay 7850 operating as just explained locks to ground over contacts 7856 and 7826, and at contacts 7857 extends direct ground over contacts 7914, lead C7901(57), contacts 5713, lead C5748, lead C4885(48) over the outgoing selector switch level A contact multipled to the contact of the corresponding selector switch of the cross office unit having seized this channel and over a lead such as C4885(48) thereto to shunt down the relay such as 6370 in that unit. When released that relay disconnects ground from contacts 6378 and —120 volt resistance battery from contacts 6379' to disconnect the precedence marking from one of the leads C4802(48)— C4804(48) and through the outgoing selector switch bank contacts to the operated one of the precedence relays 7720—7770 and it restores. At contacts such as 7734 relay 7810 is restored. It opens a possible circuit for relay 7920 at contacts 7815. It opens the circuit for the upper winding of relay 7780, at contacts 7814, which restores, as the released precedence relay 7720—7770 has opened the circuit to its lower winding. At contacts 7812, ground from the self-interrupting contacts of the motor magnet of switch MMCT1 is forwarded over now operated contacts 7851 and off-normal springs 8802 to energize the motor magnet.

Switch MMCT1 operates in a self-interrupted manner. The original operating circuit for motor magnet opens as the off-normal springs 8002 of switch MMCT1 open on the first step and a new circuit is prepared therefor at the off-normal springs 8001. The selected markable transmitter clutch magnet is now operated from ground extended from the wiper of level A of switch MMCT1 and contacts 7823 and over either contacts 7961 and 7971, contacts 7962 and 7972 or contacts 7962 and 7973 respectively, depending on the speed marking control extended to relays 7960 and 7970. The motor magnet of switch MMCT1 is now stepped once for every cycle of the selected markable transmitter by a pulse over the numbering lead CNP. Character code markings from the bank contacts of levels C, E, G, J and L of switch MMCT1 are forwarded by their respective wipers through the sequentially closed contacts of the transmitter and returned over either leads SG1, SG2 or SG3 respectively and the already described circuit extending to the monitor reperforator and signal relay of the outgoing channel unit.

The cancel transmission information comprises the following sequence of characters: letter shift, two carriage returns, line feed, eight spaces, AR, two carriage returns, eight line feeds and four N characters.

At its multipled contact 25, wiper A extends ground for operating the clutch magnet of the transmitter from the MMCT1 self-interrupting springs and when these open, as a result of ground on lead CNP energizing the motor magnet, the clutch magnet is deenergized. When the switch MMCT1 wipers pass contacts number 25, wipers B, D, F, H, K and M are associated with their contacts. Wiper B extends direct ground to the transmitter clutch magnet from its first contact. The transmitter goes through another cycle and switch MMCT1 stepped again. At contact 2, wiper B extends ground from the magnet self-interrupting springs to energize the transmitter clutch magnet and at contacts 3 finds ground from contacts 7826 extended through relay 7860 and contacts 7864. The clutch magnet of the markable transmitter does not get enough current to operate in this circuit, but relay 7860 does. The motor magnet of switch MMCT therefore remains deenergized. The markings found on contacts 1 and 2 levels D, F, H, K and M conform to the last two above noted characters and are transmitted accordingly.

Transmission of signals from the Cancel Transmission 7700 is therefore stopped. Relay 7860 locks operated over contacts 7863 and 7826 and connects battery at contacts 7861 from relay 7910 to lead C7805(57), contacts 5711, lead C4899(48), level E of the outgoing selector switch 4800, lead C4887(71) to operate relay 7150 from ground at contacts 7024. This is a signal to the outgoing channel unit that an EOM is required. Relay 7910 in the Cancel Transmission 7700 does not operate in the circuit to relay 7150. Relay 7150 operates, and prepares the channel number switch 8100 as explained. When the outgoing channel number switch 8100 operates it returns ground over lead 8161(71), and contacts 7156 to operate relay 7160. Relay 7160 closes direct ground to lead C4887(48) at contacts 7167' and 7145 to operate 7910 in the cancel transmission unit. Switch MMSDR now sends its EOM sequence as explained. Relay 7910 operates and extends battery from contacts 7911, through the resistance and over contacts 7831 and 7813 to precedence leads C7704—C7706(57) and level E of switch MMPR1 to operate the cross office unit relay 6350 and 6360 in turn. It removes ground from lead C7901(57) at contacts 7914 to allow relay 6370 in the high precedence cross office unit to operate and releases relay 7020 in the channel unit. At contacts 6376 it opens the original operating circuit for relay 6270, which remains operated from ground on lead C7801. Relay 7040 operates in series with relay 8220 and aforedescribed procedure for seizing the outgoing channel takes place. Operated relay 6370 extends the precedence marking of this cross office unit over switch MMPR1 level C or D in a manner explained to one of the relays 7720, 7730 or 7740 respectively and it operates. The operated precedence register relay completes a circuit for slow acting relay 7810 from ground on one of the leads C7704, C7705 or C7706 respectively and it operates.

It completes a circuit to relay 7920 as explained. Relay 7920 locks to ground from switch MMCT1 off-normal springs 8003 and contacts 7921. It also locks to contacts 7821 and 7811 respectively. It removes ground from lead C7801(57) at contacts 7922 to release cross office unit relay 6270. It opens the access circuit that has been holding the associated cross office selector. It restores in a manner explained. The operated precedence relay restores to open the circuit to relay 7810. It opens another holding circuit to relay 7920 at contacts 7811. Relay 7820 restores as explained to open one holding circuit to relay 7920. Released relay 7820 completes a self-interrupting homing circuit for switch MMCT1 at contacts 7822 and off-normal springs 8001. It opens the circuit for relays 7850 and 7860 at contacts 7826 and relay 7860 disconnects relay 7910 from lead C7805(57) at contacts 7861. When switch MMCT1 steps its wipers to normal the off-normal springs 8001 open the homing circuit, and springs 8003 release relay 7920.

When relay 7820 operated it opened a circuit extending over contacts 7923, at contacts 7824 to relay 7940. When relay 7850 operated, it closed another circuit for relay 7940 over contacts 7931 and 7852, while completing a circuit for slow-to-operate relay 7930. It finally operates to open contacts 7931. If relays 7850 should fail to restore in time, relay 7940 restores to energize relay 7950. Relay 7950 closes contacts 7955 to energize its upper winding from the key contacts. It closes signal circuits at contacts 7951—7954. At contacts 7956 it opens the holding circuit to relay 6270 and at contacts 7957 maintains the motor magnet of MMSF energized. Likewise if relay 7920 should fail to restore and close contacts 7923 in time relay 7940 energizes for the purposes just described.

If another unit or position demands the canceling equipment, while it is busy, the cross office selector such as 7600 associated with that unit or position finds the demanding unit or position and closes ground to lead C7603(76). Therefore when relay 7820 releases at the end of the canceling sequence it recloses an operating circuit for switch MMSF, which immediately starts stepping to the next cross office selector with battery connected to a lead such as 7604(76). Relay 7820 cannot reoperate however until relay 7920 releases and completes its operating circuit at contacts 7922. Therefore this assembly must be completely released before it can be used again.

In the unit released from the channel restoration of relay 6370 thereat completes a circuit to relay 6320 over contacts 6373, 6349' and 6255. It operates and energizes its lower winding to ground over contacts 6328 and contacts 6179. It extends ground at contacts 6321 and 6322 to provide various signals. At contacts 6324 it opens lead C5398(53) stop the reader transmitter, and opens the circuit to relay 6220 at contacts 6329 to prevent this unit from testing again for the channel. It releases relay 5930, if operated at contacts 6323 to permit normal operation, when an operator subsequently backs up the interrupted message tape. It extends ground at contacts 6327 to maintain relay 5950 operated, while preventing operation of relay 5940. Relay 5930 restores and prepares a circuit to relay 6130 and 6250.

If this is not the last message in storage or if it is and blank tape feed out has not started, relay 6010 is still operated, and a circuit is completed through contact 6013 to operate relay 6250. Relay 6250 releases relays 6210, 6340 and 5550 at contacts 6252, 6255 and 6253 respectively. It remains operated under control of relay 6320, until an operator releases relay 6320, after first backing up the tape so that the SOM can be sensed again.

If this is the last message in storage and blank feed out has started relay, 5930 has operated, and released relay 6010. Relay 6230 then completes a circuit from contacts 6325 through break contacts 6012 to the upper winding of relay 6130. Relay 6130 prepares circuit normally provided by relay 6010 prior to tape feed out. Therefore when the operator releases 6320 and backs up the SOM so that the message can be sensed again relay 6130 energizes its lower winding over contacts 6131 and contacts 6253. A circuit from lead C5398(53) is prepared to the upper winding of relay 5930 at contacts 6131. Relay 5950 operates over contacts 6258' and 6134 so that it in turn provides ground on lead MC to keep the motors running until the channel is seized after which relay 6370 provides ground for lead MC at contacts 6377. Relay 6130 operates relay 6250 over contacts 6135, 6219' and 6329'. Relay 6250 releases relays 6110, 6330 and 5550, etc. as explained, and in turn the circuit to relay 6250 is opened. It recloses the operating circuit for the lower winding of relay 6130 at contacts 6253.

To cancel an outgoing message, the operator closes key contacts 6317 individual to the cross office unit using the outgoing channel. As relay 6340 is operated, the ground from contacts 6317 is forwarded over contacts 6347' to energize the lower winding of relay 6270. It initiates the operation of the cancel transmission cross office selector 7600 and the Cancel Transmission Unit 7700. When relay 5710 is energized as described, the ground energizing the lower winding of relay 6270 is forwarded over lead C5784, contacts 5721 and lead C7809(57) to energize relay 7830. It closes contacts 7833 to provide ground from contacts 7855 to energize relay 7780. At contacts 7834 it locks to ground over contacts 7826 and at contacts 7831 prevents the operation of relay 6350 in the cross office unit on the operation of relay 7910 in a manner explained. Ground is provided on lead C7901(57) to shunt down operated relay 6370 in the cross office unit. Relay 7860 operating as before completes a circuit for relay 7910, and it operates as already described after the channel message number is advanced.

It completes a circuit for relay 7920 over contacts 7832 and 7912 and the aforedescribed release procedure takes place. At the cross office unit relay 6320 operates on restoration of relay 6370. The operator opens key contacts 6317 at any time after the canceling equipment is associated with the cross office unit, as relay 6270 is held operated by a holding ground over lead C7801(57) as explained.

*Manual forwarding*

A manual forwarding unit has three positions such as 8200 from which an operator can send a message to outgoing channels either on interception or after removing a tape from a faulty unit. The operator places the perforated message tape, which has been received at the unit reperforator associated with Cross Office Intercept 6800 or a tape removed from another unit. She sets the precedence and outgoing terminal selection switches 8210, 8220, 8222 and 8222A, B, or C respectively and presses the start button 8201. From this point the operation is automatic.

To save the time required for the position cross office unit reader transmitter unit to read an SOM and advance it through the transmitter the position relays are arranged to simulate the signals of the cross office unit that are ordinarily available only when the SOM is read thereat in a normal manner. This allows the operator to place a message tape in the reader transmitter with the SOM beyond the transmitter. She sets the control knob on switch 8210 to a position corresponding to the message precedences and the knobs 8221, 8222 and 8223A, B or D of the hundreds, tens and units digits respectively of the number assigned the outgoing line. Finally she presses the non-locking start button 8201 which momentarily connects lead C8302(82) extending to ground over contacts 8325, lead C8301(59) and contacts 5942 in the cross office unit associated with the position to lead C8303(83) extending through contacts 8332 to battery through relay 8350. Relay 8350 completes its locking circuit over contacts 8332 and 8353, lead C8304(82) to ground at key contacts 8205. It grounds lead C3229(61) at contacts 8352 to operate relay 5950 to seize the associated cross office unit in a manner similar to that described on the regular handling of a message by a cross office unit. It connects relay 8340 to lead B1 at contacts 8354 to mark this position on the bank contact of level A of switch MMPF. It connects the motor magnet of switch MMPF through its self-interrupting contacts, contact N on switch MMSP2 level B, through off-normal springs 8501, and 8502, lead COM1, contacts 8356, lead COM2 to ground through contacts 8411, and relay 8410 to ground at wiper A of start switch MMPF. The reader transmitter motor is started by the ground on lead MC at the cross office unit in a manner explained. If switch MMPF is already set to a manual forwarding position, the B lead to which its level A wiper is connected is marked by battery through contacts 8354 and relay 8430 at that position. Assuming that it is set to another position that it is not marked by battery, ground from a break contact such as 8355 at the position appears on the B lead and shunts relay 8410, while operating the motor magnet of switch MMPF. It steps its wipers in a self-interrupted manner until it finds the battery marking this position from relay 8340, and relay 8410 and operates. Relay 8410 breaks the motor magnet circuit at contacts 8411 and operates relay 8420 over contacts 8413, the self-interrupting springs of switch MMSP2 and contacts 8414. At contacts 8415 relay 8410 completes a slow-to-release relay 8510 over contacts 8472.

In the position circuit relay 8340 ground leads C8399, C8399(82) and C8397(82) at contacts 8341, 8342 and 8343 respectively. Ground on lead C8398(82) is extended through the control panel precedence switch 8210 to the one of the six precedence leads to which the switch was set. The ground on the precedence lead marks a bank contact on switch MMSP2 level C as the lead is cabled over C8299(85) to a corresponding contact on that switch.

Ground on lead C8398(82) is forwarded over the hundreds marking switch 8220 and over one of the leads H1—H0 to which it is set, and in turn cabled over C8298(85) to mark a corresponding bank contact on level A of switch MMSG2. Ground on lead C8397(83) is forwarded over the contact on switch 8222 to which the switch was set to select one of the units groups switches 8223A, 8223B or 8223C and from the selected switch over the contact to which it is set to mark one of the conductors U1—U25. The conductors are cabled over C8297(85) to the bank contacts of switch MMST level A to mark one of those bank contacts.

Relay 8420 completes a circuit for the magnet of switch MMSP2 over contacts 8421 and 8432. It also extends the ground over contacts 8422 and 8418 to switch MMPF wiper E and the associated lead C3204(60) to energize the motor magnet of switch MMPR1 in the cross office unit associated with the selected position. The switch magnets of MMSP2 and MMPR1 are therefore energized simultaneously. Operated magnet MMSP2 at its interrupter contacts opens the circuit to relay 8420. In releasing relay 8420 opens the circuit of both switch magnets, allowing them to release and step the respective switch wipers to contacts number 1. With switch MMSP2 wiper A now set to contacts number 1 operating ground for relay 8420 is provided therefor through the switch interrupter springs and both switches MMSP2 and MMPR1 continue to step as described under control of relay 8420. When wiper C of switch MMSP2 encounters ground on one of the leads cabled over C8299(82) from the position precedence switch 8210 relay 8430 operates, and opens the stepping ground for switches MMPS2 and MMPR1 at contacts 8431. In this manner switch MMSP2 selects the precedence of the message to be forwarded while the associated cross office precedence switch MMPR1 is also set to that precedence.

Relay 8510 operated by relay 8410 initially, in turn operates relay 8440, over contacts 8473, 8511, the interrupting contacts of switch MMSG2 motor magnet, and contacts 8416. Relay 8440 initiates stepping of switch MMSG2 and the cross office unit switch MMOG1 by way of lead C3206(59) in the manner described for switches MMSG2 and MMPR2. That is it forwards ground from contacts 8452 and 8441 to energize magnet MMSG2 and also forwards the ground over contacts 8442, 8475 and 8419 to wiper F of switch MMPF, lead C3206(59), contacts 5921 in the cross office unit to energize magnet MMOG1. Magnet MMSG2 opens the circuit to relay 8440 at its interrupting contacts, and it releases to deenergize both magnets, which then step their wipers. The two switches step in synchronism, until a marking corresponding the desired group of outgoing terminals forwarded from the market lead H1—HO of cable C8298(80) is found by switch MMSG2 level C, wiper to operate relay 8450. It removes the operating ground from the motor magnets of switches MMSG2 and MMOG1 at contacts 8452. Switch MMOG1 thus selects an outgoing selector switch having access to the groups of channels in which the desired channel is located. Relay 8450 at contacts 8451 operates relay 8470, which locks under control of relay 8410 over contacts 8471 and 8412. Relay 8470 opens the circuit of slow-to-release relay 8510 and opens the circuit for relay 8440 at contacts 8473. It switches lead C3206(59) extended over switch MMPF wiper F and contacts 8419 from contacts 8475 to contacts 8474. Relay 8510 releases after delay long enough to allow the cross office relay 5920 to release in a manner described and switch lead C3206(84) to the selected outgoing selector switch in a manner described. Released relay 8510 completes a circuit for relay 8520 over contacts 8476, 8512, the self-interrupting springs of switch MMST motor magnet and 8418′ although it opens the circuit for relay 8440 at contacts 8511. That relay remains operated from ground through the level A wiper of switch MMSG2.

Relay 8520 controls the stepping of switch MMST and the outgoing selector switch in a manner described above for switches MMSP2 and switch MMPR. That is it forwards ground from contacts 8532 over contacts 8522 to energize the motor magnet of switch MMST and it also forwards the ground over contacts 8521, 8474 and 8419 to switch MMPF wiper F to lead C3206(59) to energize the outgoing selector switch motor magnet in a manner described. Magnet MMST opens the circuit to relay 8520 at its interrupting springs and the relay 8520 restores to cause switch MMST and the outgoing selector switch to step. When switch MMST wiper A finds the ground forwarded over one of the leads U1—U25 and cable C8297(82), relay 8530 operates. It removes the operating ground for switch MMST and the outgoing selector switch at contacts 8532. The outgoing selector switch of the cross office unit is now set to the outgoing channel. Relay 8460 is also operated over contacts 8415, 8531 and 8431 when relay 8530 operates. It holds relay 8430 operated at contacts 8461 and relay 8530 operated at contacts 8462.

Since the position reader transmitter has a fixed speed, it is important not to connect for instance a 60 word per minute position to a 100 word per minute channel. To guard against this, switch MMST has a bank contact on levels B—L for each outgoing channel. Those channels having the same speed are strapped to the same wipers of switch MMPF which has a level B, C and D for each of the three speeds. The bank contacts of switch MMPF levels B, C and D are marked by battery over lead CA1 through relay 8330 in the Manual Forwarding Position being used, so that the marking is forwarded over the wipers of switch MMPF to the corresponding bank contacts of switch MMST levels B—L. The wipers of switch MMST levels B—L are connected to individually corresponding terminals of switch MMSG2 lever B so that the selection is made of one of the levels B—L of switch MMST. The wiper of that level therefore forwards a marking from whichever level of switch MMPF the terminal it is standing on is connected to, through the wiper of switch MMSG2 level B to ground over contacts 8431, 8531 and 8415. Relay 8330 is operated therefore, only if the outgoing terminal selected by switch MMST matches the level of MMPF which is connected via its level A bank contacts to relay 8330. If the speeds do not match switch MMST extends ground not to relay 8330 but over either levels B or C to the control panel speed lamp 8260 via either leads CB1 or CC1.

The operator noticing the lighted lamp realizes the position of transmitter speed if the position does not correspond with the selected outgoing terminal. She then presses the position reset button to remove ground at contacts 8205 from lead C8304(83) and release relay 8350.

Relay 8350 on releasing opens contacts 8354 and closes contacts 8355. This removes the marking from level A of switch MMPF and the ground now thereon causes relay 8410 to restore. Relay 8340 also restores to remove ground at contacts 8341, 8342, and 8343 from leads C8399, C8398 and C8397 respectively. Relay 8410 on restoring fails to recomplete the motor magnet stepping circuit as relay 8350 had opened contacts 8356. At contacts 8412 it restores the holding circuit for relay 8470. This relay restores as relay 8450 has restored to open the operating circuit therefore at contacts 8451 due to the removal of ground from lead C8398. The removal of ground at contacts 8415 restores relay 8460 and it restores relay 8430 in turn at contacts 8461 as the ground on wiper C of switch MMSP2 had already been removed, when contacts 8341 opened to remove ground from C8399(82). At contacts 8416 the circuit to relay 8440 is opened and it restores. Removal of ground from lead C8397 restores the ground from wiper A of switch MMST to cause relay 8530 to restore as soon as relay 8460 restores to remove ground at contacts 8462 therefrom. Relay 8520 restores as soon as contacts 8418′ open. The stepping circuit for the motor magnet of switch MMSP2 is now completed from ground over wiper A of the switch, the motor magnet self-interrupting springs and contacts 8414′ so that the switch steps home. At contacts 8417 a self-interrupted stepping circuit is completed for the motor magnet of switch MMSG2 from ground over its A wiper and it steps its wipers home. A self-interrupting stepping circuit is completed for the motor magnet of switch MMST over contacts 8419′ and the off-normal springs 8503 so that switch steps its wipers home and opens the off-normal spring 8503. Switch MMSG2, when stepped home, closes the off-normal springs 8501, while switch MMST when stepped home closes the off-normal springs 8502 to enable the completion of a circuit to the motor of switch MMPF and to relay 8410 in a manner already described.

Relay 8350 on restoring also opens contacts 8352 to remove ground from lead C3229(61). This removes one operating ground for relay 5950. In addition when the operator operated reset key she closed contacts 8206 to forward ground over lead C8209(59) and energized the upper winding of relay 5940. Relay 5940 can now operate in series with relay 5950 over one of the circuits described therefore. At contacts 5947 it extends the ground on lead C8209(82) to energize the upper winding of relay 6250. Relay 6250 now initiates the release of the cross office unit in a manner described.

Assume the speed of the selected outgoing channel transmitter matches the speed of the position transmitter so that relay 8330 operates. It locks to ground over contacts 8334, lead C8396(61) and contacts 6258′ in the cross office unit. It releases relay 8350 at contacts 8332 and extends the ground to lead C3229(61) at contacts 8331. When relay 8350 restores the ground at contacts 8331 is forwarded over contacts 8351 and 8321 to lead C8395(82) to light the set up lamp 8258. It grounds lead C8394(55) from contacts 8327 and 8337, to operate cross office relay 5550 to simulate receipt of an SOM at the cross office unit. At contacts 8335 it completes a circuit to slow-to-operate relay 8320, and at contacts 8336 and 8326 a circuit is completed to relay 8310. In releasing relay 8350 breaks the circuit to position relay 8340 and 8410 as described. In releasing relay 8340 and 8410, in turn release relays 8430, 8450 and 8530 as described. In releasing relay 8410 completes a self-interrupted homing circuit for switches MMSP2, MMSG2 and MMST as described and as contacts 8418 and 8419 are open the pulses do not feed into the cross office unit.

Relay 8470 releases and when contacts 8415 open and the switches are stepped relay 8460 restores.

Operated relay 8310 operates the reader transmitter clutch magnet of the cross office unit over lead C5308(53) and contact 8311, and at contacts 8312 grounds lead C8393 to operate the upper winding of relay 6210. It signals advance of the SOM through the transmitter in a manner explained. At contacts 8313, relay 8310 opens a short circuit on its lower winding to insure fast release. Relay 8310 remains operated long enough to cause the cross office reader transmitter to clear out the last character of the previous message if any. Relay 8320 then operates and opens the circuit to relay 8310 at contacts 8326.

Relay 8320 operates after a delay and locks to ground over contacts 8324 and lead C8301(59). Relay 8320 extends ground from the reader transmitter tight tape switch lead C5398(83) and contacts 5388, over contacts 8323 to lead C5387(57) to permit the cross office unit to start the associated position reader-transmitter when the outgoing channel is seized. It maintains set up lamp 8298 lighted at contacts 8321, and opens the original circuit therefor at contacts 8322.

When the channel is seized in a manner explained the SOM is transmitted to the outgoing channel by a markable transmitter associated therewith, while simultaneously a number identifying the forwarding position is sent to the monitor reperforator by a markable transmitter associated with the position, as explained on sending a message through the cross office unit in the normal manner. Next a channel number is sent to both the receiving station and the monitor reperforator as explained. Then the cross office unit grounds lead C5308(53) to start the reader transmitter. The message is now transmitted through the outgoing channel unit and to the monitor reperforator.

When an EOM is sensed by the reader and advanced towards the transmitter as explained, the cross office unit stops transmission by opening lead C5308(53). And EOM is now sent by markable transmitter in the outgoing channel unit and the cross office relay 6250 operates all as explained.

It opens contacts 6258' to remove ground from lead C8396(83). Relay 8330 therefore releases to remove ground from the lead C3229(61) at contacts 8331 to allow the cross office relay 5940 to operate as described. Relay 5940 removes ground from lead C8301(82) at contacts 5942 to release position relay 8320, as its original operating is now open at contacts 8335. At contacts 5946 relay 5940 recloses ground to lead C3229(83) to keep the set up lamp lighted. Relay 5940 remains operated until all the equipment is reset to normal in a manner explained. It then releases and removes ground from lead C3229(83) to extinguishing the set up lamp as a signal to the operator that the position can be set up again.

A string of messages all for the same terminal and on the same tape, if withdrawn from a monitor reperforator reel to be forwarded manually, lack an SOM and have superfluous numbers for identifying the transmitting cross office unit. To permit use of the identifying numbers as on SOM, each forwarding position has a relay 8360 and a pull back repeat toggle switch 8289. Operation of the switch extends ground from contacts 5551 of the SOM relay in the cross office unit over lead C8215(82), contacts 8288, lead C8216(83) to operate relay 8360. Relay 8360 at contacts 8361 connects lead C8325(54) to relay 8370. At contacts 8364 it extends ground over lead C8341(54) to operate relay 5410.

The operator places the identifying number of the first message of the string past the transmitter of the position and then presses the start key so that the manual forwarding unit 8400 connects the cross office unit associated with the position to the position in a manner already explained. For the first message in the string relay 8360 serves no purpose since, relays 5550 and 6210 are operated on the first message as explained above. The toggle switch 8289 may therefore be operated after the start key. Relay 5550 opens the circuit to relay 8360 at contact 5551, but when it releases it recloses this circuit to reoperate relay 8360. When the EOM of the first message is read relay 5550 restores to operate relay 8360. It will also be noted that the operator on operating switch 8289 closes ground at contacts 8287 to lead C8396(82) so that relay 8330 remains operated instead of releasing on operation of relay 6250 when the first message is sent. With relay 5410 operated as explained, and the tape advanced through the reader transmitter in the usual fashion, the sensing relays 5420—5470 sense the figure shift character preceding the first identifying number that heads the second message. They extend ground over contacts 5431, 5422, 5462, 5452 and 5443 to lead C8325(83) and over contacts 8361 to operate relay 8370. Relay 8370 locks up over contacts 8371 and 8362. At contacts 8372 it connects lead C8394(55) over contacts 8372 and 8363 to lead C8330(54).

The identifying numbers of the second message are then processed without being transmitted by the position cross office transmitter, as the outgoing channel has not been seized again. When the sensing relays 5420 and 5450 are controlled in accordance with a letter shift character ground is extended from contacts 5431, 5422, 5462, 5452 and 5442 to lead C8330(83). From there it is extended over contacts 8363 and 8372 to lead C8394(55) to operate relay 5550. The outgoing channel is therefore seized again and the message transmitted in a manner described.

*Multiple route translation*

It will be recalled that the previous description did not concern itself with a message containing more than one routing indicator. Therefore the succeeding portions of the description will describe the manner in which a multiple route or call message is processed. The Register A registers the precedence designation of the message in the Precedence Register 1900, after which it responds to the sensing of an R or U for registering the identifying characters of the first routing indicator in the Routing Register 2300 all in a manner described for a single route message. The Translator 3700 is then called for. When the translator is associated with the register, the Routing Register 2300 extends markings corresponding to the routing indicator registered therein to the translator for operating one of the translator coding relays T1—T100 corresponding to an outgoing terminal or channel over which the desired station can be reached. The operated code relay extends ground from contacts such as T1H to operate relay 4250 over contacts 4241. Relay 4250 closes contacts 4251 for no purpose at that time. The operated code relay also operates a route group register relay such as RG1 and a route terminal relay such as RT1 in the Terminal Register 3300 over contacts such as T1A and T1C respectively. The operated terminal register relays then operate finish translation relay 3370 for restoring relay 2440. It causes the release of the routing register relays RR1—RR5 and causes the reader sensing leads to be connected back to the precedence sensing relays all in a manner described. The translator is released in a manner described. If a line feed D character sequence is then sensed in a manner described, the register proceeds to handle the message on a single call or route basis as described.

If the precedence sensing relays again sense an R or U indicative of the first character of a second routing indicator, instead of a line feed D character sequence, the sensing leads are again transferred to the routing register sensing relays. The second routing indicator is then registered in the routing register relays RR1—RR5 and the Translator 3700 again associated with Register A in a described manner. A coding relay T1—T100 therein is operated in accordance with the registered routing indicator in a described manner. This time however the transfer relay 3450 is operated, and it has closed contacts 3455 and opened contacts 3456. Therefore ground is extended from contacts 3364, 3377 and 3455 to lead C3499'(44), switch contacts 4409 to operate bar relay 4420 in the translator, instead of bar relay 4410, as has been done on the first translation. At contacts 3452A—3452Y and 3453A—3453J relay 3450 has disconnected the Terminal Register relays RT1—RT25 and RG1—RG10 from the translator coding relay contacts to prevent additional ones thereof from operating. Ground is now returned through contacts such as RT1A and RG1A of the route terminal and route register relay respectively, operated as a result of the first translation. This ground is returned over leads TT1(44) and TG1(44) respectively to the translator. The ground on lead TG1 is extended through contacts such as 4421A of the translator bar relay 4420 to operate a corresponding group decoding relay such as 4430 in the translator. Ground, if on another TG lead instead, is extended through corresponding contacts such as 4421E of relay 4420 to a corresponding one of group decoding relays 4440, 4450 or 4460, respectively to operate that relay. Ground on lead TT1 is extended through contacts such as 4422A on the bar relay 4420, and through contacts such as 4431 corresponding to the operated translator group decoding relay to contacts such as T1B of the code relay operated on the first translation. If that code relay is now operated, indicating that the previously registered routing indicator utilizes the same channel as the second routing indicator, the ground is forwarded through the operated contacts such as T1B to operate relay 4240.

Relay 4240 operates, before relay 4250, and opens contacts 4241, before relay 4450 can close contacts 4451. At contacts 4242 relay 4240 forwards ground over gang switch contacts 4254, lead C4209(35) and contacts 3511 to operate the finish translation relay 3370. The routing register relays RR1—RR5 are restored and the precedence sensing relays are reconnected to the reader sensing leads. If another routing indicator is sensed the aforedescribed test is again performed. If a line feed D sequence is sensed instead of another routing indicator the message is handled on a single route basis, as described.

In the event the routing indicator corresponded to a terminal or outgoing channel which is part of a multichannel circuit, lead TT1, etc., after being extended through the contacts of relay 4430, 4440, 4450 or 4460 respectively is extended to terminal block 4470, at which the terminals of any one multichannel circuit are multipled and from there the multipled connection is extended to the contacts such as T2B of all coding relays corresponding to the multichannel circuit. Therefore if a code relay corresponding to any one of the channels of a multichannel circuit is operated on the second translation, relay 4240 is operated on the second translation, if the first translation corresponded to the multichannel circuit. It operates relay 3370 as just described. Operated relay 3370 of the Route Terminal Register 3300 causes the release of the routing indicator register relays RR1—RR5 and the translator in a manner described. The precedence relays are again connected to the sensing leads and the aforedescribed procedure is repeated, if another routing indicator is read. If another routing indicator is not read the register proceeds to handle the message as a single route message in a manner described.

In the event the operated code relay on a second or later translation does not correspond to the registration made in the route group register relays RG1—RG10 and route terminal register relays RT1—RT25, relay 4240 remains unoperated when the comparison test described above is made. Relay 4250 therefore operates to close contacts 4251. It now extends ground from contacts 4251, through the manually closed contacts 4258 of switch 4250 and over lead C4211(35), contacts 3513 and 3458 to operate relay 3550. Relay 3550 opens contacts 3553 to prevent the later forwarding of a speed indication by an operated speed register relays 3580, 3590 or 3595. It will be noted that operation of any speed register relay, after the first translation is prevented by operation of relay 3450, which maintain contacts 3459, 3458' and 3459' open. At contacts 3551 relay 3550 completes a locking circuit for itself through relay 3520 to ground on lead C1303(13) as described for relay 3540. At contacts 3552 it prepares a circuit from contacts 3522 to operate relay 3370 for a purpose already described. At contacts 3554 it extends ground over lead C3579(27) and contacts 2712 to operate the multiple call relay 2730 in the Sequence Control Unit 2700.

If a message is to be routed to an intercept position, the terminal corresponding thereto in the translator patch panel 4200 is connected to relay 4220 through the intercept patch panel terminal 4205. If the first translation resulted in the operation of relay 3540 indicating an intercept routing, relay 3540 extends ground from contacts 3372 and 3351 through contacts 3541 and 3512 to lead C4998(44), manually closed contacts 4404 to contacts 4423 and 4221 on the second translation. Relay 4220 operates from the translator detecting chain ground extended to the patch panel terminal 4205. It extends the ground at contacts 4221 to relay 4240 to operate relay 4240, before relay 4250 and results in an aforedescribed sequence of operations for operating relay 3370. If relay 3540 had been operated, and a subsequent translation results in ground being extended from contacts T1D, switch 4299 and contacts 4231, indicating the channel is closed for the night, relay 4220 is operated to extend the ground forwarded over lead C4498(44) to contacts 4221 for operating relay 4240. Thus multiple intercept routings are treated as though the message is single route. Of course if an intercept translation were received to operate relay 3540 and a subsequent translation does not result in an intercept routing relay 4250 is operated as described to operate relay 3550. Likewise if an intercept translation is received after a non-intercept translation, relay 4250 operates to operate relay 3550, as relay 4240 remains unoperated. Relay 3550 in turn operates relay 2730 as described.

*Multiple call cross office unit seizure*

Relay 2730 on operating closes contacts 2731 to operate relay 2710, which opens lead C3579(35) at contacts 2712 and also closes contacts 2714. At contacts 2732, relay 2730 operates a relay 1510 in a described manner for terminating operation of the reader in a manner described. At contacts 2733 a locking circuit is provided for relay 2730 from ground on lead C1305(13). At contacts 2739, 2737' and 2738, various cross office unit test leads are disconnected. Ground is forwarded to contacts 2714 from contacts 3049 in a manner described and through the contacts 2725 of the unoperated single route relay 2720, over contacts 2734 to lead C2290(22) and over contacts such as 2061 or 2171, etc. of an operated one of the precedence register relays 2060, etc. to either lead C2293(29) or C2291(22), respectively, to operate relay 2920 or 2940, respectively, depending on whether the message is of low or high precedence respectively.

As described previously relay 2920 controls a test for a preset cross office unit while relay 2940 controls a test for an empty cross office unit. In this case a test for a cross office unit is prevented by operation of relay 2730 as mentioned before, but a test for a respective preset or empty multiple call cross office unit may proceed instead.

It will be appreciated that the test for a multiple call cross office is carried out in a manner similar to that described for the test of a cross office unit except that in the test for a preset multiple call cross office unit no test is made to determine the position of a multiple call outgoing selector switch as these are not used. In the case of a low precedence message, a test is made for a preset multiple call cross office unit and in the case of a high precedence message a test is made for an empty multiple call cross office unit. If a preset multiple call cross office unit is not found a test is also made for an empty multiple call cross office unit and in the event an empty multiple call cross office unit is not found on either a high or low precedence message, the call is routed to intercept in a manner described. If no intercept position is found Register A locks out the incoming line circuit and releases itself in a manner described previously.

To begin with, operation of relay 2920 or 2940 results in operation of relay 2820 and a search by the common control Register Assigner 4500 for Register A, as described. When the register is found relay 2750 is operated in a manner described. In this case relay 2750 extends the ground provided by relay 1560 in Supervisory Unit 1300 to lead C1598(28) and contacts 2816, over contacts 2754 and previously operated contacts 2738 to lead C4901(49) extending to relay 4980 in the Cross Office Test Units such as 4900. Relay 4980 operates to close contacts 4981 and 4986 and open contacts 4982—4985. Opening contacts 4982—4985 prevents ground from being extended to the cross office precedence switches MMPR1 on operation of any one of relays 4950—4970. In a test for a preset multiple call cross office unit the ground on lead C1598(28) is extended to lead C2090(20) in a manner described, and from there through operated contacts of one of the low precedence register relays 2060, 2110 or 3140, respectively, to lead C2098(49), C2791(49) or C2192(49) in a manner described to operate a corresponding precedence register relay 4970, 4960 or 4950, respectively, in the Cross Office Test Unit 4900. As all the multiple call cross office units transmit at the same speed, a speed test need not be performed in the event of a test for an empty multiple call cross office unit. When testing for an empty multiple call cross office unit the ground forwarded over lead C2702(35) is ineffective as relay 3550 has opened contacts 3553 to disconnected the speed test lead C2702(27) from the Cross Office Test Unit 4900. The ground from lead C1598(28) is extended over contacts 2957, 2949 and 2758′ in the case of an empty multiple call cross office unit test, to lead C2701(49) for operating relay 4930 in the Cross Office Test Unit 4900.

On a preset multiple call cross office unit test the ground extended from the contacts 4986 is extended over either contacts such as 4971, 4961 or 4951 individually corresponding to the operated cross office test precedence designation relays 4970, 4960 or 4950, respectively, and over either leads C4905(89), C4906(89) or C4905(89) to a corresponding contact at each preset multiple call cross office precedence switch MMPR2 level A. If the switch MMPR2 is set to the proper precedence the ground is extended over the A wiper, contacts 9333 and 9352 to operate relay 9270. In the case of an empty multiple call cross office unit the ground placed on contacts 4981 is extended through the contacts 4935, lead C4942(89) to the relay 9270 in the empty multiple call cross office unit over the home contact of level A of the precedence switch MMPR2 in each empty multiple call cross office unit. Operated relay 9270 returns ground from contacts 9331, 9271 and 9281 to a lead such as C3174(31) for operating one of the register relays L1—L25 corresponding to the Multiple Call Cross Office Unit in the Cross Office Finder Unit 3100 in a similar manner to that explained for other units. The cross office finder unit then tests for an available multiple cross office unit under control of the Finder Relay Unit 1600 and it signals the Sequence Control Unit 2700 that it has found the same by holding relay 2770 operated in a manner described. Relays 1770 and 1760 in the Cross Office Finder Unit 1600 operate in a described manner, and the ground therefrom is forwarded over a lead such as C3229(44) and contacts 9323 to operate relay 9330.

With relays 1770 and 1760 operated, relay 1810 operates, and one of the multiple call cross office incoming selector switches is set to the incoming line. In the case of an empty multiple call cross office unit the precedence switch MMPR2 is also set. Relay 9330 on operating opens contacts 9331 to prevent another register from testing for this unit; opens the test lead extended from the A wiper of switch MMPR2 at contacts 9333; opens the associated cross office transmitter tight tape lead RTT at contacts 9335; locks operated through the winding of relay 9320 to ground on lead C5298(52) extending to the incoming selector switch off-normal springs as soon as it operates and also to off-normal springs 8983, when operated, and it starts the motors associated with the cross office unit at contacts 9332. If relay 2770 fails to operate on a test for a preset multiple call cross office unit, ground is again sent out over contacts 2714 and 2725 and 2734 to lead C2290(22) to operate relay 2940 in a manner similar to that previously explained on failure to find a preset cross office unit. That relay then causes a test to be conducted for an empty multiple call cross office unit as explained, and if that test fails the message is routed to an intercept position under control of relays 3020 and 3030 as before explained. If no idle intercept position is found the register locks out the incoming line circuit as before explained.

When an operated cross office finder register relay corresponding to the multiple call cross office unit is selected, an incoming selector switch 5200 at the Multiple Call Cross Office Unit 8600 is selected under control of switch MMIGS in the Sequence Control Unit 2700 and switch MMIG2 of the Unit 8600 as explained for the setting of switch MMIG. The selector switch is then set to the incoming line in a manner explained under control of switch MMITS, which receives the incoming line marking from switch MMIF. If an empty multiple call cross office unit is selected the precedence switch MMPR2 is also set to the precedence registration of the message in a manner explained. Pulses over a lead such as C3203(44) and contacts 9311 step switch MMIG under control switch MMIG and when the selector switch is selected, relay 9310 restores as off-normal springs 8931 are open and interrupting springs 8932 remain open. Pulses are then forwarded under control of switch MMITS over lead C3203(94), contacts 9312 and the wiper of switch MMIGS2 set to the incoming selector to step the switch to the incoming line. Switch MMPR2, if stepped, is controlled by switch MMPS and pulses over a lead such as C3204(94) and contacts 9351. When switch stepping is completed ground is returned as explained over lead C1897(29) and contacts 2925 in the case of a preset test to operate relay 1480 over lead C2791(14). If the test is for an empty cross office unit ground is sent over lead C1897(22), contacts 2262, lead C2289(27) and operated contacts 2737 of multiple call relay 2730 to lead C2791(14) for operating relay 1480. Relay 1480 extends resistance ground over lead C1708(32) and a lead such as C3285(94) to operate relay 9380 in the selected Multiple Call Cross Office Unit 8600.

Relay 9380 operates in response to the signal received from the register on the setting of the associated multiple call cross office unit switches. Relay 9380 locks operated through its holding contacts 9385 and through contacts 9346 and key contacts 9313, as soon as relay 9340 operates. It operates through contacts 9376, 9389′ and lead C5202(52) extending through the incoming selector switch 5200 level C, to ground at the incoming line circuit over lead C5201(9) as explained. At contacts 9389 relay 9380 opens a point in the circuit for enabling tape feed out, and at contacts 9387 opens the incomplete circuit for homing the operated incoming selector switch associated with the multiple call cross office unit. At contacts 9384 it grounds lead C3229(32) shunt down relays 1760 and 1770 as explained, and hold relay 9330 operated. At contacts 9382 it opens a point for extending an intermittent ground from the reperforator tape pulse contacts associated with the unit. At contacts 9383 it operates relay 9320.

Relay 9340 on operating extends ground through relay 680 in the incoming line circuit, level D of switch 5200 and lead C5203(93) in a manner explained, through contacts 9388, 9374, 9347 and 9358 to operate relay 9360. At contacts 9343 it disconnects resistance ground at contacts 9371 from relay 9260 and extending to the reperforator magnet associated with the unit and connects resistance ground thereto through contacts 9342, lead C5204(52), level E of switch 5200 to the stop contacts of the incoming line transmitter 390 over lead C798(7) in a manner explained. At contacts 9344 it extends ground from contacts 9313 to operate relay 9250.

Relay 9360 disconnects ground at contacts 9361 from relay 9240. Relay 9240 does not restore immediately, and will receive pulses from lead TIM extending to the reperforator tape pulse contacts to maintain it operated, each time the reperforator operates. If it should restore, it closes contacts 9241 to energize the lower winding of relay 9230. It closes contacts 9232, 9234, 9235 and 9236 to complete signal circuits and energize its upper winding over contacts 9233 and 9099.

Relay 9220 maintains ground on lead C3229(32) at contacts 9224. At contacts 9221, it removes ground from the off-normal springs 8801 of switch MMTFO. At contacts 9222 it prepares a stepping circuit for switch MMTFO from the reperforator tape pulse contacts. At contacts 9223 it locks to ground over contacts 9183.

Relay 9250 at contacts 9251 maintains the associated motors operated; opens a point in a holding circuit for relay 9330 extending from off-normal springs 8935 at contacts 9252, and opens a point in an incomplete homing circuit for switch MMPR2 at contacts 9253. At contacts 9254 it provides a holding circuit for itself over contacts 9217 and key contacts 9313. At contacts 9256 it prepares a circuit for relay 9210. At contacts 9255 it forwards ground from contacts 9014 and 9045, over level B of switch MMPR2 to one of the leads C1011″(101)—C1016″(101) depending of the setting of switch MMPR2, through chain contacts of any higher precedence relay 1010—1050 to operate one of the precedence relays 1010—1060 corresponding to the precedence setting of switch MMPR2. If any one of the precedence relays 1010—1050 of precedence comparison circuit 101 is operated precedence relay 1060 corresponding to the lowest precedence cannot operate, and likewise each precedence relay controls precedence relays corresponding to a lower precedence, through its chain contacts. Thus if no other multiple call unit with a high precedence message is waiting to seize the associated register C a precedence relay such as 1060 operates. It returns ground from contacts 1061 over lead C1017″(89) to the wiper of switch MMPR2 level C on its first contact to the lower spring of contacts 9142. Any other operated one of the precedence relays 1050—1010 returns ground over leads C1018″(101)—C1022″(101) respectively. If any one of the precedence relays corresponding to a higher precedence should operate under control of another cross office unit it restores the lower precedence relay to in turn remove the ground from one of the leads C1017″(101)—C1021″(101) respectively.

*Receipt of message at multiple cross office unit*

The incoming Line Circuit 400 is signalled that the Multiple Call Cross Office Unit is associated therewith by operation of relay 680 therein in a manner described, and it initiates release of the Register A on operation of relay 630 in a manner already described. It also starts the operation of the transmitter 390. Signals are transmitted over the lead C798(7) extending to the incoming selector switch 5200 and a lead such as C5204(93), contacts 9342, relay 9260 and its associated rectifier bridge, to lead RP to operate the reperforator magnet at the multiple call cross office unit accordingly.

Relay 9260 and its associated rectifier bridge act in the same manner as described for relay 6020. If it should restore due to an open circuit, it closes contacts 9261 to energize relay 9230, which energizes its upper winding over contacts 9233 and key contacts 9099. At contacts 9232, 9234, 9235 and 9236 it completes various signal circuits.

The reperforator perforates a tape in accordance with the received signals and feeds the tape to the associated reader. With the tape between the multiple call cross office unit reperforator and the multiple call cross office unit reader slack, slack tape switch contacts such as described for the reader in the incoming line circuit are closed to enable ground to be extended from contacts 9251, 8746, 8754, 9011, 9151, 9172 and over lead RCL and the associated slack tape contacts to operate the clutch magnet of the reader. The reader is now operated to sense the characters perforated in the tape by the reperforator associated with the Multiple Call Cross Office Unit 8600.

The first Z of the SOM sensed by the reader sensing pins is forwarded over lead 6″ in a manner explained for lead 6, contacts 8618 and 8735 to operate relay 8710. Relay 8720 energizes at the end of the sensing cycle in series with relay 8710 over contacts 8712 and 8672. Relay 8720 at contacts 8721 energizes relay 8610, and it opens the contacts 8618 to disconnect lead 6″. At contacts 8611—8616 it connects the reader sensing leads 1″—5″ and 8″ to sensing relays 8620—8670 and they operate in a manner explained for relays 420—470 on subsequent reader sensing cycles. During the succeeding SOM sensing cycle, a detection chain ground is extended over lead C, as the letter C is sensed by the reader. This ground is extended over contacts 8724 and 8736 to energize the lower winding of relay 8770. During the sensing cycle relay 8670 is operated by a pulse on lead 8″ in a manner explained for relay 470, and it opens contacts 8672 to deenergize relay 8710 and the upper winding of relay 8720. After the sensing cycle the lower winding of relay 8720, energizes in series with the upper winding of relay 8730 over contacts 8723, 8711 and 8672. The next sensing cycle results in a detection chain ground being extended over the lead Z to operate the lower winding of relay 8730. At the end of the sensing cycle relay 8730 energizes in series with the upper winding of relay 8740 in a manner similar to that explained for other relays. The reader clutch magnet circuit is now completed through contacts 8736 and 8745 instead of 8745. This ensures that the reader is stopped at the end of the next sensing cycle as relay 8730 then restores, while relay 8740 holds contacts 8746 open. This prevents the loss of any characters in the channel designation that follows the SOM. Relay 8740 now prepares a circuit from lead C to its lower winding so that when the last C of the SOM is sensed the lower winding of relay 8740 is energized. During the next sensing cycle ground on lead C shunts the lower winding of relay 8750, while before the cycle contacts 8732 are open to prevent the completion of a circuit thereto. During the sensing cycle, the holding circuit for the lower winding of relay 8730 and the upper winding of relay 8740 is opened at contacts 8672 and these windings deenergize. At the end of the sensing cycle the lower winding of relay 8740 energizes in series with the lower winding of relay 8750 over contacts 9141, 8742, 8732 and 8672. Relay 8750 energizes its upper winding over contacts 8751, 8884 and 9182. At contacts 8756 it opens a stepping circuit for the motor magnet of MMCTG2. At contacts 8754 it opens the circuit to the reader clutch magnet and the magnet restores to stop the reader. The reader operating at a later period operates relay 8670 to open contacts 8672 and restore relay 8740. The reperforator continues to operate in response to signals received from the incoming line circuit transmitter 390 to perforate the tape accordingly. At contacts 8757 relay 8750 extends lead TT from the transmitter tight tape switch contacts to relay 9140 to prepare a circuit therefor. At contacts 8759 it extends ground from contacts 9213 to off-normal springs 8701 to complete a self-interrupted homing circuit for switch MMCTG2.

With the reader operating, as previously described, and sensing characters, other than letter shifts or blanks, lead NLB is grounded once per character by the reader, and extends that ground over contacts 8756, 8886, 9191 to pulse the motor magnet of switch MMCTG2. If switch MMCTG2 level B is stepped to a predetermined position before relay 8750 operates to open contacts 8756, it extends battery from the upper winding of relay 9170 over contacts 8752 to the contact and wiper B in that position to ground over contacts 9193 and 9184. Relay 9170 then energizes its lower winding over contacts 9173 to ground at key contacts 9099. At contacts 9071 it provides a self-interrupted stepping circuit for the motor magnet of switch MMCTG2 so that the switch steps home over off-normal springs 8701. At contacts 9172 it opens the reader clutch magnet circuit to stop the reader, and at contacts 9175 and 9176 it completes respective signal circuits. Relay 8750 on operating of course opens the circuit to relay 9170 to prevent it from operating.

With the reader operating tape between the reader and transmitter becomes slack to close the slack tape switch contacts (not shown) and extend ground over lead TTS, contacts 9056 and contacts 9112, through contacts 9128 and 9134 in shunt to energize the transmitter clutch magnet over lead TCL. With the reader stopped the tape between the reader and transmitter becomes tight to close the tight tape switch contacts (not shown) and ground lead TTT, while the ground is removed from lead TTS extending to lead TCL to stop the transmitter.

Relay 9140 operates after receipt of the SOM, as the tape between the reader and transmitter tightens so to extend ground over lead TTT and contacts 8757. At contacts 9141, relay 9040 opens the circuit to the lower windings of relays 8740 and 8750 to restore relay 8740. It in turn releases relay 8610 at contacts 8741. Relay 9140 closes contacts 9142 to forward the ground provided thereto by one of the precedence register relays 1010—1060 in the Precedence Comparison 101 in a manner explained. This ground energizes the upper winding of relay 9020.

The reperforator continues to operate under control of the message being received from the incoming Line Circuit 400. When the EOM is read at the line circuit, ground is removed from leads C5201(52) and C601(52) extending to leads C5202(93) and C5203(93) respectively, in a manner explained to restore relays 9340 and 9360, respectively. Relay 9340 connects the multiple call unit reperforator to resistance ground at contacts 9343 and 9371. At contacts 9346 it opens the energizing circuit for the lower winding of relay 9380, which restores. At contacts 9345 it opens one circuit for relay 9250, which remains operated over its holding circuit.

Relay 9380 on restoring closes contacts 9389 to extend ground from contacts 9225 over lead BW to cause the reperforator windings to feed out blank tape. The reperforator shaft pulse contacts ground lead RSP once for each blank feed out. This ground is extended over contacts 9382 and 9222 to pulse the motor magnet of switch MMTFO. When it takes twenty steps, ground is extended from the wiper of the switch to shunt relay 9220, which restores its contacts. This prevents further pulsing of switch MMTFO, and it steps home over contacts 9221 and off-normal springs 8801. At contacts 9225 the circuit for causing blank tape feed out is opened. At contacts 9224 the last ground shunting relay 9320 is removed and it operates in series with relay 9330 over contacts 9334 to ground over lead C5298(52) extending to off-normal springs 5299 and also to ground at off-normal springs 8983. At contacts 9325 ground is extended over contacts 9387 and lead C5221(52) to step the incoming selector switch home. At contacts 9321 a self-interrupted stepping circuit is completed for switch MMIG2 from off-normal springs 8934. At contacts 9322 ground is maintained on lead C3229(32) to prevent seizure of this unit, while at contacts 9323 this ground is prevented from shunting relay 9320. When switch MMIG2 and the incoming selector switch are stepped home the circuit for relays 9320 and 9330 are opened and they restore. The unit may now be seized as a preset unit from a register such as A or from a register such as C in a manner which will be explained. It has a terminal on its incoming selector switch banks corresponding to itself, so that it may seize itself, after a predetermined number of routing indicators are processed. Seizure from a register such as A proceeds in the manner described except that relay 9250 is already operated. Switch MMPR2 remains set to its position so that a preset test may be conducted.

*Multiple call register operation*

Relay 9020 energizes its lower winding over contacts 9022, 9044 and 9188. At contacts 9021 it connects the Z presensing lead of the transmitter associated with the multiple call cross office unit to relay 9110. At contacts 9024 it removes ground extended through contacts 9047 to lead C1611(16) connected to a contact individually corresponding to this multiple call cross office unit at switch MMIF level A in the Registers C and D having access to multiple call cross office units. It connects battery through relay 9010 to lead C1611(16) over contacts 9023 to enable the register switch MMIF to stop when it finds this multiple call cross orifice unit. At contacts 9025 ground is extended from contacts 9018 to lead C797(12) to initiate operation of the register assigner such as 1200. It selects one register such as C having an access to this multiple call unit in a manner explained for Assigner 1200 and register A.

Switch MMIF in the selected register hunts for the present multiple call cross office unit in a manner described in the search for Line Circuit 400. When it finds the unit, ground is extended from a relay such as 1730 in the register Finder Relay Unit 1600, over lead C1611(90) to operate relay 9010 in a manner similar to that described for relay 640. Relay 9010 closes contacts 9013 and 9017 to forward ground for completing signal circuits. At contacts 9011 it opens another point in the reader clutch magnet circuit. At contacts 9012 extends the battery from the reader clutch magnet over lead RCL, contacts 9192, 9172 and 9151, as previously described for the line circuit 400, to lead C1612(16) and switch MMIF level B to enable the Register C to control the reader clutch magnet.

Relay 1710 in the register operating from the battery through relay 9010, when the switch MMIF finds the cross office unit, extends ground at contacts 1719' over lead C9601(96), contacts 9621 and 9631 to energize the motor magnet of switch MMSEL2 in the Miscellaneous Relay Unit 9400. The motor magnet energizes and closes its interrupting contacts to energize relay 9630, which in turn opens the energizing circuit for the motor magnet at contacts 9631. The motor magnet deenergizes and takes its first step. Switch MMIF when stepped to the contact corresponding to the multiple call cross office unit extends ground from the wiper of level K thereat, over the conductor of cable C9602(96) corresponding to the cross office unit 8600 to a corresponding contact of level A of switch MMSEL2. When the wiper of level A of switch MMSEL2 finds the contact having ground thereon, relay 9620 is energized to maintain the energizing circuit for the motor magnet of switch MMSEL2 open at contacts 9621 so that both the MMSEL2 motor magnet and relay 9630 remain deenergized. At contacts 9622 relay 9620 extends the ground on lead C9601(17) to relay 9610 to energize relay 9610.

At contacts 9611 relay 9610 extends lead C1792(17) from contacts 1713 and level B of switch MMIF connected to the reader clutch magnet over lead C1612(90), over lead C9609(15) to ground at contacts 1511 to operate the reader clutch magnet. At contacts 9612 relay 9610 extends ground over lead C9603(17) and contacts 1711 to operate relay 1310. This ground is also used to start the motor of a markable transmitter (not shown) and associated with the multiple call register. At contacts 9613 relay 9610 extends ground over lead C9604(105) to operate relays 520' and 540'. Relay 9610 grounds contacts 9619' to operate relay 9810. At contacts 9811 and 9812—9824 relay 9810 opens respective incomplete stepping circuits for each of the motor magnets of switches MMT1 and MMT2—MMT24, respectively. At contacts 9618, relay 9610 connects relays 9590 and 9480 through contacts 9575 to the wiper of level E of switch MMSEL2. At contacts 9619 it extends ground through contacts 9454 to lead C9497(111) for providing a relay holding ground for the relays of the Transmitter Control Relay Unit 106.

Relay 1310 on operating does not extend leads C1301, C1303 and C1305 directly to the various units of Register C as was done in Register A, but extends them first to the contacts of relay 9450 in the Miscellaneous Relay Unit 9400. It does extend lead C1304(22) as previously described for Register A and also extends lead C1303(29) directly to the Sequence Control Unit 2700 to provide a holding ground for relays 2860 and 2960, which are used with the multiple call register only. Lead C1303(94) is extended through contacts 9451, 9452 and 9453, respectively, to lead C9401(24), C9402(24) and C9403(33), respectively, to operate relay 2440; extend a ground toward relay 2430 and operate relay 3650, respectively. In addition ground on lead C1303(44) is extended past contacts 9461, 9462 and 9463, respectively, over leads 9409(114), 9408(113) and 9415(3) to provide holding grounds for register relays in the Counter Converter 113, Terminal Converter 114 and for operating relay 1570 over contacts 1318, 1477 and 1534. Relay 1570 in turn operates the bar relay 3130 in the Cross Office Finder 3100 as already explained. Lead C1301(94) is extended past contacts 9455 to lead C9405(34) to operate slow-to-release relay 3650. Lead C1305(94) is extended past contacts 9456 to lead C9406(27) to provide a holding ground for the sequence control unit relays. Lead C1302(33) is disconnected and lead C1304(22) is extended from the contacts of relay 1310 as before to the Precedence Register 1900 in a manner previously described.

When relay 1710 in the Finder Relay Unit 1600 operated in response to the operation of relay 1730 on finding the multiple call cross office unit, it extends the reader sensing leads from levels C—H of switch MMIF, through contacts 1714—1719, respectively, over leads C1701(104)—C1706(104), respectively, to contacts 463'—467' and 461', respectively, to contacts 445', 447', 449', 447'', 449'' and 443', respectively, and from there to the wipers of levels B—F and A, respectively, of switch MMTR3 in the Channel Number Register Relay Unit 102. From contacts 461', lead C1706(17) is also connected to relay 450'. Relay 520' on operating as explained, disconnects ground at contacts 521'—525' from the multipled second to tenth contact of level A of switches MMAPU, MMAPT, MMAPH, MMDPU, MMDPT and MMDPH, respectively. Relay 540' on operating as explained, closes contacts 541' to provide a holding ground for each set of register relays comprising groups RG1A—RG1E, RG2A—RG2E, RG3A—RG3E, RG4A—RG4E, RG5A—RG5E, RG6A—RG6E, RG7A—RG7E, RG8A—RG8E and RG9A—RG9E. At contacts 543' it energizes the motor magnet of switch MMTR3 through off-normal springs 1051 and the motor magnet self-interrupting contacts. The motor magnet opens its self-interrupting springs and deenergizes to take one step, at which time the off-normal springs 1051 open to prevent further energization of the motor magnet of switch MMTR3 over that circuit at this time.

At contacts 1711 relay 1710 also extends ground to operate relay 1850. That relay now connects the bank conductors of level J of Switch MMIF over cable C9602(96) to respective contacts of level A of switch MMSEL2. These leads are not connected to the Translator in this case.

With the reader operating the sensing leads 1"—5" are grounded in accordance with the character being read, while lead 8" is grounded once per cycle as explained for its corresponding lead 8. The ground on any sensing lead is extended through a respective one of levels C—G of switch MMIF and over leads C1701—C1706(104), respectively, to the wipers of levels B—F, respectively, of switch MMTR3. The ground on lead 8" is extended through level H of switch MMIF to lead C1706(104) and from there to level A of switch MMTR3, and also energizes relay 450' once per cycle. Wiper A of switch MMTR3 extends the ground over its multipled contacts to energize the motor magnet of switch MMTR3 and at the end of the pulse on lead C1706(17) the motor magnet deenergizes to step its wipers one position. In this manner switch MMTR3 is stepped once per each character read by the reader. The wipers of levels B—F of switch MMTR3, when standing on their first contact, forward ground in accordance with the character read to lead RG1A'—RG1E', respectively, to operate corresponding relays in the first register group of relays RG1A—RG1E. Any operated one of these relays locks to ground over its holding contacts and contacts 541'. As switch MMTR3 levels B—F wipers steps to each contact ground is forwarded in accordance with each character read to operate corresponding relays in successive groups of register relays RG2A—RG2E to RG9A—RG9E at which time switch MMTR3 is on its ninth contacts.

Relay 450' operates from each pulse on lead C1706(17) during each reader operating cycle. It extends ground over contacts 451' and 462' to pulse the motor magnet of switch MMDPU. This switch therefore takes one step for each reader sensing cycle. At off-normal springs 1032, it opens a possible circuit extending through off-normal springs 1034 and 1036 to the upper winding of relay 510'. When switch MMDPU is standing on its tenth contact the energizing ground therefor is also extended to wiper D of switch MMDPU to energize the motor magnet of switch MMDPT, which deenergizes when relay 450' restores to step its wipers to their respective first contacts. Similarly when switch MMDPT is stepped to its tenth contact it extends the ground from the wiper of level B of switch MMDPU when on its tenth contact over its level B wiper to energize the motor magnet of switch MMDPH. That motor magnet deenergizes when relay 450' restores in a manner described for switches MMDPU and MMDPT to step its wipers one position. In this manner switch MMDPT is stepped once for every ten steps of switch MMDPU and switch MMDPH is stepped one step for each 10 steps of switch MMDPT. Switch MMDPT is on its tenth contact therefore when a hundred characters have been read, and switch MMDPH is on its tenth contact when the thousand characters have been read. If necessary other switches may be added to the arrangement to count additional characters.

In connection with level B of switch MMDPU it will be noted that four switches SW1—SW4 are provided for the first four contacts thereof respectively. One or more of these switches are closed in accordance with the multiple call cross office transmitter speed to bring switch MMAPU in synchronism with switch MMDPU. This is done to provide character count adjustment between the cross office transmitter and the markable transmitter of the register for a purpose which will become apparent. Thus if switch SW1 is closed, level B of switch MMDPU forwards the energizing ground therefor over switch SW1, when on its first contact. This ground is forwarded over contacts 312′ to energize the motor magnet of switch MMAPU, which restores to step its wipers one position, when relay 450′ restores to open contacts 451′. In this manner switch MMAPU is advanced a number of steps depending on how many of switches SW1—SW4 are closed. When switch MMDPU reaches contact 5, the energizing ground therefor is forwarded over level B to energize the lower winding of relay 310′. It opens the just described circuit for stepping switch MMAPU at contacts 312′ to prevent further stepping of switch MMAPU on subsequent revolutions of switch MMDPU. At contacts 311′ it energizes its upper winding from ground at contacts 541′.

It will be recalled that relays RG1A—RG1E to RG9A—RG9E are controlled in accordance with the various characters sensed by the reader, as it continues to operate. The characters of the channel designation are read immediately after the SOM. As these often comprise three characters they are registered in the first three groups of register relays RG1A—RG1E, RG2A—RG2E and RG3A—RG3E respectively. Each operated relay such as RG1A in each group extends ground over a conductor such as C102A(107) to mark an individually corresponding contact on levels B—F of switch MMCN4 in Fig. 107. The fourth character sensed is a figure shift and it is registered in relay group RG4A—RG4E. Relays RG4A, RG4B, RG4D and RG4E ground appropriate leads such as C103A(107) etc., to mark the fourth bank contact accordingly on levels B, C, D, E and F, respectively, of switch MMCN4. The channel number is then registered in relay groups RG5A—RG5E to RG7A—RG7E and each operated relay therein extends ground over conductors similar to those just mentioned to corresponding bank contacts on levels B—F of switch MMCN4 to mark those bank contacts accordingly. A letter shift character is then sensed by the reader and transmitted over switch MMTR3 in a manner explained to operate all five relays of relay group RG8A—RG8E. These relays extend ground over conductors similar to those just explained to mark the eighth bank contact of switch MMCN4 levels B—F, accordingly. Following the letter shift character registered in relay group RG8A—RG8E, a carriage return is sensed by the reader and registered in relay group RG9A—RG9E. This relay group in turn controls a marking extended over a conductor such as C109A(107) to mark the ninth bank contacts of levels B—F of switch MMCN4 accordingly.

Each relay group RG1A—RG1E to RG9A—RG9E has carriage return detection chain contacts such as RG1A1—RG1E1 so that if this character is registered in any group ground is extended to lead 104A to energize the upper winding of relay 440′. Letter shift detection chain contacts RG1A2—RG1E2 are shown for relay group RG1A—RG1E, however it should be understood that these detection chain contacts are provided only for relay groups RG6A—RG6E to RG9A—RG9E. Relay groups RG6A—RG6E to RG8A—RG8E have their letter shift detection chain contacts connected to relays 410′, 420′ and 430′ respectively instead of lead 104A. If a letter shift character is registered in any one of the last four groups, the upper winding of relay 440′ is thus energized either over contacts 411′, 421′, 431′, or directly over lead 104A. The carriage return detection chain contacts and the letter shift detection chain contacts associated with the various relay groups in addition to the group in which these characters are normally registered are provided to ensure the operation of relay 440′ in the event the message does not contain one of these characters or contains it in the wrong sequence. Likewise if switch MMTR3 reaches contact 10 without relay 440′ operating, the next character read results in ground being forwarded over wiper A in a manner explained to energize the lower winding of relay 440′. Relay 440′ energizes its lower winding over contacts 441′ to ground on lead C9608(96).

At contacts 445′, 447′, 449′, 447″, 449″ and 443′, relay 440 disconnects the sensing leads 1701(17)—1706(17), respectively, from levels B—F and A, respectively, of switch MMTR3 and connects the leads through contacts 444′, 446′, 448′, 446″, 448″ and 442′ to leads C401′(23)—C406′(23), respectively. These leads extend to contacts 2319′, 2317′, 2319, 2317, 2315, and 2313, respectively, and from there over leads C2301(19)—C2306(19) to the precedence sensing relays 1910—1960 in the Precedence Register 1900. Thus as soon as a letter shift character or a carriage return is sensed in one of the relay groups RG1A—RG1E to RG9A—RG9E the reader sensing leads are transferred from switch MMTR3 to the precedence sensing leads in the Precedence Register 1900.

The reader continues to operate and senses succeeding characters of the message. If the transfer to the precedence register occurred on the reading of a letter shift character, a carriage return was not read and therefore this character is sensed next by the reader and extended to the precedence register relays for no purpose. Succeeding characters however comprise the precedence designation and operate the precedence sensing relays 1910—1960 accordingly to register the precedence designation in a manner explained.

The precedence sensing relays 1910—1960 are operated in accordance with the received precedence designation of the message. As before one of the relays 2060, 2110, 2140, 2170, 2210 or 2140 is operated in accordance with the received precedence designation. In this case, the operated precedence designation register relay extends ground from contacts such as 2063 over one of the leads C1121′(112)—C1126′(112), respectively, to operate a corresponding one of the precedence register relays 1260′—1210′ in the Transmitter Control Relay Unit 106. The operated one of these relays extends ground over certain ones of conductors such as C1208A(108)—1208E(108) and C1209A(108)—1209E(108) to mark the fourth and fifth bank contacts respectively of levels B—F of switch MMPR4 in accordance with the precedence designation of the message.

When the first routing indicator such as R or U is sensed by the precedence sensing relays 1910—1950, ground is extended in a manner explained before, from contacts such as 2064 or 2114 of the operated precedence designation register relay through the detection chain contacts of relays 1910—1950, over either leads C1191′(111) or C1192′(111), respectively, to the upper or lower winding of relay 1170′ respectively, to the battery through the upper winding of relay 1150′ or to battery through the upper winding of relay 1160′. Relay 1170′ energizes in series with either relay 1160′ or 1150′, respectively, and it closes contacts 1171′ to extend ground over either contacts 1151′ or 1161′ respectively, depending on whether relay 1150′ or 1160′ was operated, to lead C1193′(23) to energize the motor magnet MM10 of switch MMTR in the Routing Register 2300. At the end of the sensing cycle the precedence sensing relays restore to remove the ground from either leads C1191′(111) or C1192′(111), respectively, and deenergize relay 1170′. It opens contacts 1171′ to deenergize the motor magnet of switch MMTR which then steps its wipers to their first contacts.

Relay 2310 is then operated to disconnect the reader sensing leads extended to the precedence sensing relays at contacts 2319′, 2317′, 2319, 2317, 2315, and 2313 and connect the reader sensing leads at contacts 2318′, 2316′, 2318, 2316, 2314 and 2312 to relays 2320—2370, respectively. These relays may now sense the identifying characters of the routing indicator to register the routing indicator in register relay groups RR1—RR5 in a manner explained.

Relay 1150' on operating extends an energizing circuit for its lower winding over contacts 1152' and 1111' to ground on lead C9497(94), while relay 1160', if operated, extends an energizing circuit for its lower winding over contacts 1162' and 1111' to ground on lead C9497(94). At contacts 1153'—1155' relay 1150' extends ground over conductors 1A', 1B' and 1C' to mark the second bank contacts of levels B, C and D of switch MMR1 with ground, while relay 1160' on operating extends ground over contacts 1163' and 1164' to conductors 1B' and 1D', respectively, to mark the second contact of levels C and F, respectively, of switch MMR1 with ground.

The identifying characters of the routing indicator are now received to operate relays 2320—2370 accordingly and these routing indicators are registered to relay groups RR1—RR5. A space or other machine function character received after the first routing indicator operates relay 2340 for example so that ground is extended from contacts 2351, 2341, 2331 2321, 2361, and 2373 to energize the upper winding of relay 2430. At contacts 2431 it extends ground over lead C2398(15) to energize relay 1510 as already explained. Relay 1510 opens the circuit to the reader clutch magnet at contacts 1511 and the reader stops.

The upper winding of relay 2430 locks to ground over contacts 2433 and ground on lead C9402(94).

When the routing register sensing relays 2320—2370 were controlled in accordance with the machine function or a carriage return as described, they extend ground from the detection chain contacts just described and contacts 2372 to lead C2399(33) to operate relay 3340. This results in the association of the translator with the Register C in a manner previously described for Register A.

When the translator finds Register C, it operates relay 3360 in a manner previously explained. Relay 3360 closes ground at contacts 3366 to lead C9901(99) to operate relay 9920 in the Miscellaneous Relay Unit 9400. At contacts 3368 relay 3360 extends ground over leads C3309(99) instead of lead C3309(18) to operate relay 9910 instead of relay 1850, as previously described on a single route translation. Leads 2A(99)—2E(99) to 6A(99)—6E(99) and leads C2599(99), C2499(99) and C2498(99), instead of being extended directly to the translator as on a translation from Register A, are extended to contacts 9911A—9911E to 9916A—9916E and to contacts 9917, 9918 and 9919, respectively, of relay 9910 in Fig. 99. From contacts 9911A—9911E to 9916A—9916E and 9917, 9918 and 9919, the leads 2A(99)—2E(99), etc., are extended to the translator decoding relays in a manner similar to that previously described for Translator 3700. The translator then translates the registration in a manner already described, and it controls the operation of one of the relays in group RT1—RT25 and in group RG1—RG10, respectively, in the Terminal Register 3300 as described.

Relay 9920 on operating closes contacts 9921 and 9922 to extend ground over lead C9902(114) and lead C9903(113), respectively, for operating relays 1410' and 1310', respectively. Relay 1310' connects relays RGG1—RGG10 and RGT1—RGT25 to leads TG1'—TG10' and leads TT1'—TT25', respectively. Relay 1410' connects relays RGT1'—RGT25' and RGG1'—RGG10' to leads TT1'—TT25' and to leads TG1'—TG10', respectively. Leads TG1'—TG10' and TT1'—TT25' are multipled to respective TG1—TG10 and TT1—TT25 leads extending from the translator to the terminal register and are therefore marked in accordance with the outgoing channel by one of the code relays T1—T100 of the translator in the same manner as leads TT1—TT25 and TG1—TG10. The ground furnished by the operated code relay of the translator therefore operates a route group relay such as RG1 and a route terminal relay such as RT1 in the Terminal Register 3300 and also operates corresponding relays such as RGG1 and RGT1 and RGG1' and RGT1'. This registers the outgoing channel or terminal in the Counter Converter 113 and in the Terminal Converter 114, respectively. The operated Terminal Converter register relays lock operated over their respective holding contacts and contacts 1421' to ground extended over lead C9409(94) as explained. The operated register relays of the Counter Converter 113 lock operated over their respective holding contacts to ground extended over lead C9408(94) as explained.

Relay 3370 in the terminal register operates after the registration to open contacts 3377' and 3379' to release relays 9910 and 9920, respectively. Relay 9920 restores to open contacts 9921 and 9922 and restore relays 1410' and 1310', respectively. The associated operated route register relays RGG1—RGG10, RGT1—RGT25 and RGT1'—RGT25' and RGG1'—RGG10' remain operated over their locking circuits. When relay 3370, operates it does not restore relay 2440 at this time, as that relay is held operated by ground on lead C9401(94). It therefore maintains contacts 2441 closed to hold relay 2310 operated and to provide a locking ground for the operated register relays of groups RR1—RR5. With relay 3370 operated and relay 9910 restored the translator is disconnected from the Register C. Also when relay 3370 operates it extends ground over lead C3307(94) instead of lead C3307(24) as is done in the single route message. The ground on lead C3307(94) energizes relay 9410.

Relay 9410 at contacts 9411 extends an energizing circuit through contacts 9445 for relay 9430, which energizes to close contacts 9431 and prepare a circuit for relay 9440. At contacts 9413 relay 9410 extends ground over lead C2099(27) to energize relay 2720 over contacts 2711. Relay 2720 locks operated as previously described and prepares a circuit to forward ground over lead C2799(35), which is done, as soon as relay 2710 operates in a manner described. Ground is forwarded to lead C2799(35) in a manner described and from there over lead C2290(22) to either lead C2291(94) or C2293(94) depending on the precedence of the message, as described. Ground on lead C2291(95) is forwarded past contacts 9443 to lead C9498(29), while ground on lead C2293(94) is forwarded past contacts 9941 to lead C9499(29) to operate relay 2940 or 2920, respectively.

On an intercept translation due to the channel being closed for the night, etc. the ground from lead C2799(35) is extended to lead C3599(27) and from there over contacts 2965 and 3034 to operate relay 3020 in a manner described. Thus either relays 2920, 2940 or 3020 may be operated initially depending on the precedence designation of the message or whether it is to be routed to intercept respectively.

Relay 2920, if operated, grounds lead C2901(100) at contacts 2921 to operate relay 165'. Relay 165' opens contacts 166' for no purpose at this time. At contacts 167', it extends ground from contacts 176' and 182' over lead C199'(113) for a purpose to be explained. Relay 2940, if operated, closes contacts 2941 to ground lead C2902(100) and operate relay 170'. It opens contacts 171' for no purpose at this time and closes contacts 172' to extend ground over lead C199'(113) for a purpose to be explained. Relay 3020, if operated, grounds lead C3019(100) to operate relay 180', which opens contacts 182 and grounds lead C183'(114) to energize relay 1420'. Relay 1420' opens contacts 1421' to deenergize any operated Terminal Converter register relay of the groups RGT1'—RGT25' and RGG1'—RGG10'. At contacts 1422' it grounds lead C9817(98) to energize the motor magnet of switch MMT24 corresponding to an intercept routing. Relay 165' or relay 170' at contacts 167' or contacts 172' respectively extends ground from contacts 182' to lead C199'(113) and through operated contacts of the Counter Converter register relays RG1—RG10 and RGT1—RGT25 to corresponding terminals on terminal blocks 1320'. Those terminals representing the same trunk distinction are strapped together at this terminal block and the leads therefrom are cabled over cable C1321'(98). In this example a total of 23 trunk destinations are chosen for the purpose of illustrating the arrangement. Tributary stations are not included as trunk destinations. Certain limited trunk destinations do not handle more than nine routing indicators in any one message and therefore switches MMT1—MMT23 are provided to count the routing indicators in one message destined for these stations. The ground on one of the cable conductors is therefore extended over the cable to energize one of the motor magnets of switches MMT1—MMT23 individually corresponding to the various limited trunk destinations.

The Sequence Control Unit 2700 calls for a Common Control Register Assigner such as 4500 and when the same finds this register, a test is initiated for a preset cross office unit; an empty cross office unit or an intercept position respectively in a manner already described. If the test for a preset office unit should fail, the Sequence Control Unit 2700 attempts to seize an empty cross office unit, and if that fails it attempts to seize an intercept position all as explained. On a test for a preset cross office unit relay 2930 is operated at the end of the test to maintain ground on lead C2901(100) at contacts 2931 and thereby maintain relay 165' operated. On a test for an empty cross office unit relay 2950 is operated at the end of the test to close contacts 2951 and maintain ground on lead C2902(100) for maintaining relay 170' operated, while at the end of an intercept test relay 3030 is operated to maintain contacts 3031 closed and hold ground on lead C3019(100) for maintaining relay 180' operated. In this case the ground for energizing the upper winding of relay 3030 in series with relay 3020 is extended from lead C9501(95), contacts 9542 and 9456 and lead C1305(13) instead of directly from lead C1305(13) as was done in the single route Register A.

If the test for a cross office position is successful, relay 3040 is operated in a manner described and it controls the setting of the incoming selector switch at the cross office unit in a manner explained. If the test was for an empty cross office unit, it controls the setting of the incoming selector switch and the outgoing selector switch and precedence switch at the cross office unit all in a manner explained, while if the test for an intercept position was successful it controls the setting of an incoming selector switch thereat in a manner described. On a successful test relays 1770 and 1760 in the Finder Relay Unit are operated as is relay 5950 in the cross office unit to permit an already described sequence of operations to occur. In the case of a high precedence message routed to intercept relay 3040 on operating extends ground over lead C2297(22) and contacts 2216 or 2246 respectively of the operated precedence register relay 2210 or 2240 respectively to lead C2298(95) instead of 2298(32).

In the event the test is for a preset or empty cross office unit, and is successful, relay 1420' in Terminal Converter 114 remains unoperated. Ground furnished from the contacts of the operated register relay in the group RGT1'—RGT25' corresponding to one of twenty-five terminals in each group is extended to Terminal Block 1502'. The contacts such as RGT1A'—RGT1H' of each relay such as RGT1' are separated into two groups of four each, and are strapped at Terminal Block 1502' to mark leads U1'(109)—U5'(109) and T1'(109)—T5'(109) in accordance with the units digit and tens digit represented by the terminals corresponding to relay RGT1'. The contacts such as RGG1A'—RGG1D' of the operated group register relay such as RGG1' are extended to Terminal Block 1502' and are strapped to mark leads H1'(109)—H5'(109) in accordance with the hundredths digit represented by terminals registered by relay RGG1'. If relay 1420' is operated as on intercept routing the markings from relays RGT1'—RGT25' and RGG1'—RGG10' are discarded these relays are released. Instead at contacts 1425A'—1425L' relay 1420' extends ground to terminals of Block 1502' and these grounds are strapped to mark leads U1'(109)—U5'(109), T1'(109)—T5'(109) and H1'(109)—H5'(109) in accordance with digits representing an intercept routing. These markings on these leads are extended to the fifth, fourth and third contacts respectively on levels B—F of switch MMLN to mark the contacts of these levels in accordance with the hundredths, tens and units digit of the outgoing channel or with an intercept route number.

Ground on lead C2298(95) is then extended over contacts 9521 to lead C2298A(32), which extends through the cross office finder switch in the same manner that lead C2298(32) was extended therethrough from the Precedence Register 1900 in the single route Register A. It furnishes an indication to the operator at the cross office intercept such as 6800 that a high precedence message is being transmitted thereto.

When relay 3030 operates during the intercept test resulting from a failure to find a cross office unit such as 5400, it extends lead C9498(94) from contacts 2953 and 2965, over contacts 3033 to lead C3092(95), and also extends leads C2293(22), if the message was a low precedence message over contacts 2933, 2953 and 2965 through contacts 3033 to lead C3092(95). Lead C3599 is now also extended through contacts 2965 and 3033 to lead C3092(95). Lead C3092(95) extends to the upper winding of relay 9550 Fig. 95, instead of through Fig. 15 to relay 1750, as in the single route register. Thus if an intercept position is not found, on the first test, ground is again forwarded over either leads C3599, C9499 or C9498 to lead C3092(95), when relays 2770 and 2810 restore. The ground on lead C3092(95) energizes the upper winding of relay 9550, which energizes its lower winding over contacts 9552, 9542 and 9456 to ground on lead C1305(13). At contacts 9553 it opens the energizing circuit for relay 9540 which starts to restore. At contacts 9554 and 9555 it closes signal circuits. Relay 9540 restores after a period of time to open contacts 9542 and restore the lower winding of relay 9550. This also removes ground from lead C9501(30) to restore the upper winding of relay 3030 and also relay 3020. Relay 2920 restores the lower winding of relay 3030 and it restores relay 9550. In the meantime at contacts 9541 ground is forwarded from lead C1305(13) and contacts 9456 to lead C3599(27) to reoperate relay 3020, as soon as relay 3030 restores to close contacts 3034. The intercept test is therefore repeated until an intercept position is found.

When the intercept position test is successful, relay 3040 operates and extends ground over contacts 3048 and 3035 to energize the upper winding of relay 2960. Relay 2960 at contacts 2961 energizes its lower winding from ground on leads C1303(13). At contacts 2965 it opens the incomplete circuit extending from lead C3599 to operate relay 3020. It also prepares circuits to enable the same intercept position to be seized in the event subsequent routings are required.

When the multiple route Register C has set the switches at the cross office unit or cross office intercept position in a manner already explained relay 6120 is operated as explained. Relay 1480 in the register Supervisory Unit 1300 is operated in a manner explained and it closes contacts 1485. In this case instead of extending ground over leads C1708(32), direct ground is extended thereto. The direct ground now operates relay 6070 in series with relay 6110 in the seized Cross Office Unit 5400 or operates relay 6830 in series with relay 6820 in a seized Cross Office Intercept 6800. The incoming selector switch at the seized cross office unit or seized cross office intercept is set to the Multiple Call Cross Office Unit 8600 in the same manner that it is set to an incoming Line Circuit 400 so that the leads from the cross office unit or cross office intercept are extended through the associated incoming selector switch to the Multiple Call Cross Office Unit. Relay 6070 at contacts 6072 energizes relay 6050 from ground on lead C5203(52) extended through level D of switch 5200 to lead C601(90) and contacts 9053. Relay 6850 in a cross office intercept 6800 is operated in a manner similar to that described for relay 6050. From the cross office unit a resistance ground is now extended over contacts 6059' and 6075 through contacts 6017' to lead C5202(52) extending through level C of the cross office incoming selector switch to lead C5201(90) over contacts 9059, 9033 to operate relay 9160. A similar arrangement extends resistance ground directly from contacts 6851, 6832 and 6824 to lead C5202(52) in the case of seizure of cross office intercept and that ground operates relay 9160 as just described. At contacts 6074 the cross office unit reperforator magnet is connected through the relay 6020 and contacts 6065 to lead C5204(52) extending over level E of the incoming selector switch to a conductor such as C798(90), contacts 9063, 9061 and 9041 to lead C9001(96); the level D contact of switch MMSEL2 with which the wiper is associated with, contacts 9617, lead C9699(111), contacts 1141', lead C9507(95), contacts 9561 and 9582 to resistance ground. Likewise relay 6830 in the cross office intercept extends the associated reperforator magnet line windings through relay 6910 and contacts 6846 to contacts 6835 and a lead such as C5204(52) and over a similar circuit to that just described to resistance ground.

At contacts 6055 relay 6050 extends a locking circuit for itself over contacts 6062 to ground at key contacts 6969. At contacts 6053 it extends a holding circuit including contacts 6069 and 6113 to the upper winding of relay 6110. At contacts 6057 it opens the original incomplete operating circuit for relay 5960. Likewise if an intercept unit 6800 is used relay 6850 therein extends a holding circuit for the upper winding of relay 6820 over contacts 6852, and at contacts 6857 opens an incomplete circuit to relay 6960.

*Transmission of message information*

In the multiple call cross office unit relay 9160 operates when ground is extended thereto, and it extends ground at contacts 9161, over contacts 9066 to lead C9002(90) extending through the level E contact of switch MMSEL2 with which the wiper is associated, contacts 9575, 9618 and 9472 to energize relay 9480. Relay 9480 locks operated in series with relay 9470 over contacts 9483 and 9615, but relay 9470 does not operate in the circuit due to the ground shunting it. The ground on lead C9002(90) is also extended from contacts 9575 to relay 9590 to operate that relay. Relay 9590 at contacts 9593 extends ground over lead C9504(14) to prevent release of relay 1450 in Supervisory Unit 1300, while relay 1480 is operated.

Relay 9480 on operating extends ground from contacts 9576 and 9512, through contacts 9484 and 9473 to lead C9495(106) and contacts 612' to operate relay 620'. Relay 620' connects the respective wipers of levels A—F of switch MMFM to the clutch magnet and the five sequentially closed contacts respectively of a markable transmitter (not shown). This transmitter operates in a manner similar to that explained for other markable transmitters. At contacts 621' the motor magnet of switch MMFM is extended to the numbering pulse contacts of the markable transmitter, which contacts close once per cycle to ground the lead NUM.

At contacts 629" relay 620 extends ground to operate relay 1140'. Relay 1140' opens contacts 1141' after closing contacts 1142'. Opening contacts 1141' disconnects lead C9501(95), extending to resistance ground at contacts 9582, from the reperforator of the cross office unit connected over lead C9699(96), etc. and at contacts 1142' connects resistance ground to lead C9699(96), etc. and the reperforator magnet of the cross office unit in a manner already described. This is done to prevent the transmission of certain signals to the cross office unit reperforator, while these signals are transmitted to the page printer associated with Register C.

At contacts 623' relay 620' extends a self-interrupted energizing circuit over off-normal springs 601' to the motor magnet of switch MMFM. The switch opens the self-interrupting contacts and takes its first step to open off-normal springs 601' and close off-normal springs 602'. With switch wiper A on its first contact ground is extended over contacts 624' to energize the clutch magnet of the markable transmitter (not shown) and the transmitter now operates to pulse lead NUM and energize the motor magnet of switch MMFM over contacts 621' during each transmitter cycle. When the pulse is removed the motor magnet of switch MMFM deenergizes to step its wiper to a succeeding position. On contacts 1 levels B—F of switch MMFM extend markings to the markable transmitter sensing contacts, which close in sequence. When the fourth contact of the transmitter is closed, ground is extended from the wiper of level E over contacts 628' and through the corresponding transmitter sensing contact to lead MTD' in Fig. 95 and the lower winding of polar relay 9580 to —120 volt battery. Relay 9580 then operates to close contacts 9582 to extend the mark condition to the monitor page printer over contacts 9561. Initially the start contacts of the markable transmitter close before any of the five sequentially closed contacts connected to levels B—F of switch MMFM close. However this contact has no potential on it and relay 9580 restores to close contacts 9581. This extends —120 volt resistance battery over contacts 9561 to the monitor page printer to signal the printer accordingly and when the contacts connected to levels B, C and D, respectively, of the markable transmitter close to forward no potential from the wipers connected to those levels, relay 120 remains restored and resistance —120 volt battery is forwarded to the page printer. The page printer therefore receives three spacing conditions, before the mark condition, and this is followed by a space condition transmitted from switch MMFM wiper F. The printer therefore prints a carriage return. After the first cycle of the markable transmitter switch MMFM is stepped to its second contact in a manner explained, and a second carriage return character is transmitted by relay 9580 to the page printer to be printed thereby under control of switch MMFM. Switch MMFM is then stepped to its third contact in a manner explained and this time ground is extended from level C of the switch to the appropriate contact of the markable transmitter to operate polar relay 9580 accordingly. This results in the page printer printing a line feed character. Switch MMFM is stepped in this manner to its seventh contact and controls the markable transmitter and relay 9580 to cause the page printer to print four additional line feed characters. Thus two carriage returns and five line feed characters are printed. The switch is then stepped to contacts 8 and the markable transmitter clutch magnet circuit is extended over contacts 624', level A of switch MMFM to ground through the upper winding of relay 610'. The clutch magnet fails to operate in this circuit, however relay 610' does. It closes contacts 611' to complete an energizing circuit for its lower winding over C9497(94). At contacts 612' it opens a circuit to relay 620' which restores. At contacts 622' relay 620' completes a self-interrupted stepping circuit for the motor magnet of switch MMFM over off-normal springs 602' and the switch is now stepped home to restore its springs. At contacts 620" the circuit to relay 1140' is opened and that relay restores to reconnect the already described circuit for the cross office unit reperforator magnet. Relay 620' also disconnects switch MMFM from the markable transmitter at contacts 621', 624'—629'.

With relay 610' operated and relay 620' restored, a circuit is completed from battery through relay 640' over contacts 633', contacts 613' and 628' over lead C9494(94)

to ground over contacts 9512 and 9576. Relay 640' operates to close contacts 648" and extend ground over lead C9493(94) to energize the motor magnet of switch MMCTG4. It opens its self-interrupting contacts. At contacts 643', relay 640 completes a self-interrupted stepping circuit for the motor magnet of switch MMSOM, over off-normal springs 603 and the switch steps to its first contact. Switch wipers A—F are now respectively connected over contacts 644'—649' to the clutch magnet and sequentially closed contacts of the markable transmitter respectively. At contacts 641' the motor magnet of switch MMSOM is connected to the numbering pulse lead NUM of the markable transmitter so that it receives a pulse for each cycle of the markable transmitter and steps its wipers one step for each cycle. Switch wiper A extends ground over contacts 644' to energize the clutch magnet of the markable transmitter and the transmitter goes through a cycle. Switch wipers B—F extend markings from their respective contacts over contacts 645'—649', respectively, to respective sequentially closed contacts of the markable transmitter to operate polar relay 9580 in accordance with the markings on the level B—F bank contacts. From the first contact of levels B—F, switch MMSOM controls the polar relay 9580 to transmit an X to the monitor page printer and to the reperforator at the seized cross office unit. Contacts 2, 3, 4 and 5 of switch MMSOM are marked in accordance with characters Z, C, Z and C, respectively, and these are sent by the polar relay under control of switch MMSOM in a manner explained so that the cross office unit reperforator perforates an SOM and the page printer prints the same. When the wiper of level A of switch MMSOM reaches its fifth contact the energizing circuit for the clutch magnet is completed from the self-interrupting springs of the motor magnet of switch MMSOM and contacts 644' to ensure that the clutch magnet is stopped at the end of the cycle. The motor magnet of switch MMSOM is energized by the pulse over lead NUM and steps its wipers to contacts 6 at the end of the pulse to connect the clutch magnet of the markable transmitter over contacts 644' and wiper A to the upper winding of relay 630'. Relay 630' operates in this circuit, but the clutch magnet does not.

Relay 630' energizes its lower winding from resistance battery through contacts 631' to ground on lead C9497(94). At contacts 633' it opens the circuit to relay 640' which restores. Relay 640' opens the circuit at contacts 648" to the motor magnet of switch MMCTG4 and the switch takes a step. With relay 640' restored and relay 630' operated, a circuit is completed for relay 720' over contacts 712', 632' and 647" to ground on lead 9494(94). With relay 640' restored, a self-interrupted stepping circuit is completed for the motor magnet of switch MMSOM over contacts 642' and off-normal springs 604'. The switch steps home to restore its off-normal spring.

Relay 720' operates to close contacts 721' and 723'—729" and open contacts 722' and 729'. At contacts 723' a self-interrupted stepping circuit is completed for the motor magnet of switch MMCN4, over off-normal springs 701', and the switch steps in a self-interrupted manner to its first contact. Ground from wiper A is now forwarded over contacts 724' to energize the clutch magnet of the markable transmitter. Switch wipers B—F of switch MMCN4 forward markings from their repective bank contacts through contacts 725'—729' and the sequentially closed transmitter contacts in a manner already explained for other switches to the polar relay 9580 to control that relay in accordance with the bank markings. At contacts 721' the pulse per cycle ground on the lead NUM from the markable transmitter, pulses the motor magnet of switch MMCN4 so that it steps once per cycle of the markable transmitter. The markings on the bank contacts of levels B—F are furnished from conductors C102A(102)—C102E(102) to C109A (103)—C109E(103) under control of the register relay groups RG1A—RG1E to RG9A—RG9E. These relay groups have registered therein a channel designation, figure shift character, channel number and a letter shift character or a character return in a manner explained. Thus a channel designation, figure shift character, channel number, letter shift character or carriage return are transmitted to the page printer and to the cross office unit reperforator. It will be recalled that if a letter shift character is registered in relay group RG6A—RG6E, relay 410' is operated, if a letter shift character is registered in relay group RG7A—RG7E, relay 420' is operated and if a letter shift character is registered in relay group RG8A—RG8E, relay 430' is operated. If relay 410' is unoperated, ground is extended from contacts 413' to lead C405'(107), over switch MMCN4 wiper A and contacts 724' to maintain the clutch magnet of the markable transmitter energized. If relay 410' has operated in response to a letter shift character being registered in relay group RG6A—RG6E, it has opened contacts 413'. At contacts 411' it has connected lead C493'(107) to lead C492'(107) and at contacts 412' has disconnected lead C493'(107) from lead C494'(107). At contacts 413' it disconnects the ground from lead C495'(107) and at contacts 414' connects lead C496' (107) to lead C495'(107). Lead C496'(107) is connected to ground at the self-interrupting springs of switch MMCN4, and this ground is now forwarded to the clutch magnet of the markable transmitter over contacts 414', lead C495'(107) and wiper A of switch MMCN4. When the motor magnet energizes it opens this circuit to ensure that the clutch magnet is deenergized at the end of the cycle. Switch MMCN4 then steps to contacts 7 and ground from the upper winding of relay 710' forwarded over lead C493'(104) is extended to contacts 411' and lead C492'(107), which is connected to the seventh contact of level A of switch MMCN4, over contacts 729" to battery through the transmitter clutch magnet. Relay 710' energizes in a circuit but the markable transmitter clutch magnet does not.

If relay 420' was operated by a letter shift detection chain ground extended from relay group RG7—RG7E, switch MMCN4 steps from contacts 6 to contacts 7 under control of ground at contacts 413'. The clutch magnet of the markable transmitter then receives an operating ground from the self-interrupting contacts of the motor magnet of switch MMCN4, over lead C496'(104), contacts 415' and 423', lead C492'(107) and the seventh contact of level A switch MMCN4. When the switch steps to contact 8, the upper winding of relay 710' is connected over lead C493'(104), contacts 412' and 421' to lead C491'(107) extending to the eighth contact of switch level A so that the clutch magnet remains deenergized, while relay 710' operates.

Likewise if relay group RG8A—RG8E is controlled in accordance with a letter shift character, relay 430' instead of relays 410' or 420' is operated. Switch MMCN4 transmits ground at contacts 413' to energize the clutch magnet when it is standing on contacts 6. When standing on contacts 7 it transmits ground from contacts 416' and 425' to lead C492'(107) to energize the clutch magnet, and the switch is then stepped to contacts 8 in a manner explained. Ground is then extended from the self-interrupting springs of the motor magnet over lead C496'(104), contacts 415' and 424' to contacts 433' and lead C491'(107) and the eighth contact of level A of switch MMCN4 to maintain the reader clutch magnet energized for the cycle. When the switch steps to its ninth contact the ground through the upper winding of relay 710 is extended over lead C493'(104), contacts 412', 422' and 431' to lead C407'(107) so that the transmitter clutch magnet remains deenergized, while relay 710' operates. If relay 430' had also not been operated, switch MMCN4 transmits a clutch magnet energizing ground from contacts 426' and 435' and lead C491'(107) so that switch MMCN4 is stepped from contacts 8 to contacts 9 at the end of the transmitter cycle. The switch self-interrupting ground is then transmitted over lead C496'(104), contacts 415', 424' and 434' to lead C407'(107) and switch wiper A on contacts 9 to energize the clutch magnet. Switch MMCN4 then steps to contacts 10 and relay 710' is connected over lead C493'(104), contacts 412', 422', and 432' to lead C494'(107) and the clutch magnet so that relay 710' energizes and the magnet remains deenergized.

Thus switch MMCN4 causes the relay 9580 to transmit to the reperforator at the cross office unit and to the page printer, the channel designation, figure shift character, channel number and a letter shift character or any other registered character in accordance with their respective registrations in the relay groups RG1A—RG1E to RG9A—RG9E and relay 170' operated. Relay 710' energizes its lower winding from battery over contacts 711' to ground on lead C9497(94). At contacts 712' it opens the circuit to relay 720' which restores to close contacts 722' and disconnect switch MMCN4 from the markable transmitter at contacts 721' and 724'—729'. Contacts 722' completes a self-interrupted stepping circuit for switch MMCN4 over off-normal springs 702', and the switch steps home to restore its off-normal springs.

With relay 710' operated and relay 720' restored a circuit is completed from ground on lead C9494(94), over contacts 729'' and 714', through contacts 842' and 813' to energize relay 820'. At contacts 821' relay 820 connects the motor magnet switch MMPR4 to the numbering lead NUM of the markable transmitter, and at contacts 824' connects wiper A of switch MMPR4 to the markable transmitter clutch magnet. At contacts 825'—829' relay 820' connects the various leads extended to wipers B—F of switch MMPR4 to the sequentiallly closed contacts of the markable transmitter. The motor magnet of switch MMPR4 energizes over its self-interrupting springs and contacts 823' and off-normal springs 801'. It takes its first step to open the off-normal springs 801' and close off-normal springs 802'. The clutch magnet of the transmitter is then energized from ground over contact 1 of the level A switch wiper. The motor magnet of switch MMPR4 is pulsed from lead NUM under control of the markable transmitter to step its wipers once for each cycle of the transmitter. When stepping from contact 1 to contact 3, switch MMPR4 levels B—F transmit respective markings to the polar relay 9580 in a manner explained so that relay 9580 controls the page printer and the reperforator at the cross office unit in accordance with two carriage returns and a line feed character, respectively.

The fourth and fifth contacts of levels B—F of switch MMPR4 are marked in accordance with the precedence designation of the message over such leads as C-1208A(112)—C1208E(112) and C1209A(112)—C1209-E(112), respectively, which in turn are marked by an operated precedence designation relay of the relays 1210'—1260' in a manner already explained. If relays 1210' or 1220' were operated indicating that the message has one of the two highest precedences, contacts 1211' or 1220', respectively, were closed, to ground lead C1201'(108). The ground is extended through contacts 913' to operate relay 830'. Relay 830' opens contacts 831', 832', 833' and 835'. At contacts 833' ground is furnished from the self-interrupting contacts of switch MMPR4, over wiper A of switch MMPR4 and contacts 824' to energize the clutch magnet of the markable transmitter, when switch MMPR4 reaches its third contact. If relay 830' is unoperated the ground for energizing the clutch magnet when switch MMPR4 reaches contact 3 is furnished from contacts 831'.

When the motor magnet energizes from the pulse extended from lead NUM, it opens its self-interrupting contacts to ensure that the clutch magnet remains deenergized at the end of the cycle in the event relay 830' had been operated. The switch MMPR4 then steps its wipers to their fourth contact and the clutch magnet of the markable transmitter is connected up over contacts 824', the A wiper standing on its fourth contact through contacts 835' to the lower winding of relay 840', which energizes in this circuit and prevents the clutch magnet from energizing. Relay 840' closes contacts 841' to complete an energizing circuit for its upper winding to ground at contacts 912'. At contacts 842' it opens the circuit to relay 820' which restores. Relay 820' disconnects switch MMPR4 from the markable transmitter so that the markings on the fourth bank contacts of switch MMPR4 are not transmitted. At contacts 843' a circuit is now completed from ground on lead C9494(94) through contacts 829'' and 915' to relay 920'. Relay 920' connects levels A—F of switch MMSJ2 to the clutch magnet and sequentially close contacts of the markable transmitter. It also closes lead NUM at contacts 921' to the motor magnet of switch MMSJ82 so that the switch can be stepped once per cycle of the markable transmitter. At contacts 924' an additional ground is provided to the upper winding of relay 840'. With contacts 923' closed, ground is forwarded from the self-interrupting contacts of the motor magnet of switch MMSJ2, through the off-normal springs 901' to energize the motor magnet. It opens the circuit to step its wipers to their first contacts, and opens springs 901' and closes springs 902'. Ground is extended from switch MMSJ2 wiper A and contacts 925' to energize the clutch magnet of the markable transmitter. It now transmits the marking placed on the bank contacts of switch MMSJ2 levels B—F to the polar relay 9580, which in turn transmits corresponding characters to the page printer and to the cross office unit reperforator. The motor magnet switch MMSJ2 steps its wipers once for each transmitter cycle and the clutch magnet of the transmitter is energized during each cycle from ground on contacts 1—11 of level A of switch MMSJ2. When switch MMSJ2 reaches contact 12, ground is forwarded over level A from the self-interrupting springs of the switch magnet to maintain the transmitter clutch magnet energized, until the motor magnet energizes in response to a pulse over lead NUM. This insures that the clutch magnet is deenergized at the end of the cycle. When switch MMSJ2 steps its wipers to contact 13, the clutch magnet of the transmitter is connected to the upper winding of relay 910' and therefore cannot energize, while relay 910' does. Relay 910' at contacts 912' opens one locking circuit for relay 840', however relay 840' remains energized over contacts 841' and 924'. Relay 910' energizes its lower winding over contacts 914' and lead C9497(94). Contacts 915' open to disconnect the circuit to relay 920', which restores to complete a self-interrupted stepping circuit for the motor magnet of switch MMSJ2 over contacts 923' and off-normal springs 902'. Switch MMSJ2 then steps home to restore its off-normal springs. At contacts 924' relay 920' removes the last energizing ground for the upper winding of relay 840'. Relay 920' also disconnects the markable transmitter and the lead NUM from the wipers of the switch MMSJ2 and from the motor magnet respectively. At contacts 913' relay 910 opens the circuit to relay 830', which restores to open the circuit to the lower winding of relay 840' at contacts 835. Relay 840' now restores to close contacts 842', and reoperate relay 820' to reconnect switch MMPR4 to the markable transmitter. A circuit is now completed over contacts 834, the fourth contact of wiper A of switch MMPR4 and contacts 824' to energize the clutch magnet of the markable transmitter. The markable transmitter now goes through another cycle to transmit the precedence designation marked on the fourth contact of levels B—F of switch MMPR4 to the polar relay 9580.

Relay 9580 was operated in accordance with the markings on switch MMSJ2 levels B—F to transmit a number of characters transmitted before high precedence designations. These characters comprise a figure shift, five S characters and five J characters followed by a letter shift character, and are transmitted from the first twelve contacts of switch MMSJ2. The first character of the high precedence designation is then transmitted from the fourth contacts of levels B—F of switch MMPR4. Switch MMPR4 is stepped from its fourth contact to its fifth contact at the end of the pulse on lead NUM and it then transmits the second character of the precedence designation. At this time the transmitter clutch magnet is energized from ground at the self-interrupting contacts, switch MMPR4 extending over contacts 833′, the fifth contact of level A and contacts 824′. Switch MMPR4 is energized by the pulse on lead NUM and then deenergized when the pulse ends at the end of the cycle. It steps its wipers to contact 6 and connects the clutch magnet to the upper winding of relay 810′ over the sixth contact of level A and contacts 824′. The clutch magnet remains deenergized, while relay 810′ operates to complete an energizing circuit for its lower winding over contacts 812 to ground on lead C9497(94). Contacts 813′ open to disconnect the circuit to relay 820′ which restores. A self-interrupting stepping circuit is now completed for switch MMPR4 from contacts 822′ and 811′, through off-normal springs 802′ and the switch steps home to reset its off-normal springs.

If the message was not one of the two highest precedences, lead C1201(112) remains ungrounded, and relay 830′ does not operate. When switch MMPR4 steps to its third contact the transmitter clutch magnet is operated from ground over contacts 831′ forwarded over the third contact of level A of switch MMPR4 and through contacts 824′. Switch MMPR4 is then stepped to its fourth contact when the pulse on lead NUM ends. The clutch magnet is then energized. Contacts 834′ then forwards ground for operating the clutch magnet, and the switch is stepped to its fifth contact at the end of the transmitter cycle. On the fifth contact the self-interrupting contacts of switch MMPR4 forward ground over contacts 833′ to level A to energize the clutch magnet and the switch is stepped to contact 6 at the end of the transmitter cycle. Precedence designation markings are transmitted accordingly from the fourth and fifth contacts of levels B—F of switch MMPR4 to the polar relay 9580. Switch MMPR4 on its sixth contact connects the upper winding of relay 810′ to the transmitter clutch magnet. Relay 810′ operates, while the transmitter clutch magnet remains deenergized.

With relay 810′ operated, relay 820′ is restored as contacts 813′ open. Switch MMPR4 is stepped home to reset its springs over contacts 822′ and 811′ and off-normal springs 802′. Ground from lead C9494(94) is extended over contacts 829″ and 814′ to contacts 935′ to operate relay 940′. At contacts 947″, relay 940′ operates relay 1140′ to disconnect the cross office reperforator from the signal contacts of relay 9580 in a manner explained. Relay 940′ at contacts 943′ completes a self-interrupting circuit for the motor magnet switch MMLN. This switch steps its wipers to their first contacts. It will thereafter be stepped in a manner already described by pulses over lead NUM from the markable transmitter. It energizes the clutch magnet of the markable transmitter from ground multipled to the first five contacts of level A. Relay 940′ having connected the wipers of levels B—F of switch MMLN to the markable transmitter enables a marking to be forwarded from each bank contact in sequence through the markable transmitter contacts to relay 9580 in a manner explained. Relay 9580 is operated according to the bank markings therefore, to transmit a space character, figure shift character, and characters conforming to the hundreds, tens and units digits respectively of the number assigned to the selected outgoing channel or intercept routing. The markings conforming to the various digits are derived from Terminal Block 1502′ in the Terminal Converter 114′. It will be recalled that an operated one of relays RGT1′—RGT25′ and RG1′—RGG10′ or relay 1420′ of the Terminal Converter 114 were operated in accordance with the translation or an intercept routing respectively to mark leads U1′(109)—U5′(109), T1′(109)—T5′(109) and H1′(109)—H5′(109). Therefore switch MMLN transmits to the polar relay a numerical designation corresponding to the selected outgoing terminal and which corresponds to the routing indicator processed by the Register C. In the meantime relay 940′ on operating extends ground from contacts 947″ to energize relay 1140′. On its sixth contact, switch MMLN causes a letter shift character to be transmitted to the signal relay 9580 and to be printed by the page printer. On its sixth contact ground for operating the transmitter clutch magnet is furnished from the switch self-interrupting contact and level A. The switch then steps to its seventh contact where the upper winding of relay 930 is connected in series over wiper A and contacts 944′ to the markable transmitter clutch magnet. The transmitter clutch magnet remains deenergized and relay 930 energizes. At contacts 931′ it provides an energizing circuit for its lower winding to ground on lead C9497(94). At contacts 935′ it deenergizes relay 940′ and that relay now completes a self-interrupted homing circuit for switch MMLN over contacts 942′ and off-normal springs 904′. At contacts 947″ relay 940 restores relay 1140′ so that the cross office unit reperforator magnet signal circuit is reconnected to the contacts of relay 9580.

With relay 930′ operated and relay 940′ restored, ground is extended from lead C9494(94) over contacts 946″ and 933′ and through contacts 1012′ to energize 1020′. Relay 1020′ connects the wipers of levels A—F of switch MMR1 to the markable transmitter and connects the lead NUM thereto in a manner already explained for other switches. In addition, relay 930′ extends ground at contacts 932′ to lead C1001′(25) to operate bar relay 2560 in the Routing Register 2300. It operates to connect the routing register leads 2A(99)—2E(99) to 6A(99)—6E(99) and lead C2498(99) to the respective lower springs of contacts 9932A—9932E to 9936A—9936E and 9937, respectively, of relay 9930. At contacts 934′ relay 930′ extends ground over lead C1002′(99) to energize relay 9930. Relay 9930 at contacts 9931 extends ground over lead C3393(26), through operated contacts such as 2513 or 2533, etc. of the operated route register relays in groups RR1—RR5 in a manner already explained, and through the operated contacts of the relay 2560, and over the corresponding leads 2A—6E in a manner already explained. If relay 2410 is operated the ground from lead C3303(26) is also extended over contacts 2412 to lead C2498(99). The ground on any of these leads is now extended through the respective operated contacts of relay 9930 and over leads R2A(110)—R2E(110) to R6A(110)—R6E(110) to mark the third to seventh contacts respectively of levels B—F of switch MMR1 accordingly so that these levels are marked in accordance with the registered routing indicator. Ground on lead C2498(99) is forwarded through contacts 9937 to lead C5(110) for operating relay 1030′.

Switch MMR1 is stepped, in a manner similar to that already explained for other switches, to its first contacts where the markings on its bank contacts control relay 9580 through the transmitter contacts to transmit a space character. Relay 9580 transmits this character to the cross office unit reperforator and to the page printer. When stepped to its second contact at the end of the pulse on lead NUM, switch MMR1 levels B—F controls relay 9580 to transmit and R or U respectively depending whether relay 1150′ or 1160′ has been operated to forward markings over leads 1A′—1D′ to the second contact of levels B—F in a manner already explained. The various identifying characters of the routing indicator are then transmitted from contacts 3, 4, and 5 of switch MMR1 levels B—F in accordance with the markings forwarded over leads R2A(110)—R2E(110), R3A(110)—R3E(110) and R4A(110)—R4E(110), respectively. Switch MMR1 is then stepped to contact 6. Ground is then extended from contacts 1031' over the sixth contact to wiper A to energize the clutch magnet of the transmitter. If a machine function was registered in the fifth register relay group RR5 that function is marked on the sixth bank contacts of switch MMR1, levels B—F and transmitted through the markable transmitter accordingly and the switch steps to contact 7. If nothing is registered in the sixth register relay group RR6 a blank is transmitted from the seventh contact of switch MMR1 levels B—F. On its seventh contact switch MMR1 level A forwards ground from the switch self-interrupting contacts through contacts 1032' to energize the transmitter clutch magnet. When the switch is stepped to its eighth contacts the upper winding of relay 1010' is connected over contacts 1034' to the clutch magnet. The upper winding of relay 1010' energizes, while the clutch magnet remains deenergized. Relay 1010' energizes its lower winding over contacts 1011' and ground on lead C9497(94).

If a routing indicator was registered in the fourth register relay routing group RR4 a ground was transmitted as explained over lead C2498(99) through contacts 9937 of relay 9930 to lead C5(99) to energize relay 1030'. Relay 1030' disconnects ground at the contacts 1031' from the sixth contact of switch MMR1 level A, and instead connects the switch self-interrupting ground thereto through contacts 1032' to ensure that the clutch magnet of the transmitter is deenergized at the end of its cycle, when switch MMR1 steps from contacts 6 to contacts 7. The fourth identifying character of the routing indicator is transmitted from the sixth bank contacts of switch MMR1 levels B—F in a manner explained and a switch steps to its seventh contacts. At this time the upper winding of relay 1010' is connected over contacts 1033' to the seventh contacts to ensure that the clutch magnet is deenergized while relay 1010' operates.

If the routing indicator contains five identifying characters, relay 1030' remains unoperated as ground is not forwarded over lead C2498(99) to lead C5(110). The sixth contacts of switch MMR1 levels B—F are marked in accordance with the routing indicator registered relay group RR4 and the seventh bank contacts of levels B—F are marked in accordance with the routing indicator contained in registered relay group RR5. Those marking are transmitted accordingly to polar relay 9580 so that the six character routing indicator is transmitted to the cross office unit reperforator and to the page printer. Switch MMR1 steps over its contacts to contacts 8 in a manner explained to energize relay 1010'.

With relay 1010' operated the operating circuits for relays 9930 and 2560, respectively, are opened at contacts 1014' and 1013', respectively, and they release. At contacts 1012' relay 1010' opens the circuit to relay 1020', and that relay restores so that switch MMR steps home in a manner similar to that already explained. With relay 9930 restored, relay 1030', if operated, restores as ground is removed lead C5(110). With 1020' restored and relay 1010' operated, ground is extended from contacts 1021' and 1015' to operate relay 1110'. An SOM, channel designation, channel number, precedence designation and routing indicator have now been transmitted to the cross office reperforator.

*Partial release of multiple call register*

Relay 1110' on operating opens contacts 1111' to disconnect the ground on lead C9497(94) from the lower winding of relay 1150' or 1160', whichever was operated, to restore the operated relay. At contacts 1112' relay 1110' extends ground over lead C9492(94) to energize relays 9450 and 9460. Relay 9450 opens contacts 9451, 9452, 9453, 9454, 9455 and 9456 and ground is therefore disconnected from leads C9401(24), C9402(24), C9403(33), C9405(34), C9406(27) and C9501(30). Ground for lead C9497(111) is disconnected at contacts 9454 however ground is still furnished thereto over contacts 9592. At contacts 9461 and 9462, relay 9460 disconnects ground furnished by lead C1303(13) from leads C9409(114) and C9408(113) respectively to restore any operated one of the Terminal Converter and Counter Converter register relays in groups RGT1'—RGT25' and RGG1'—RGG10' and RGG1—RGG10 and RGT1—RGT25, respectively. At contacts 9464 it disconnects the ground on lead C1301(13) from lead C9415(13) and at contacts 9464, it connects the ground to lead C9491(15) to operate the lower winding of relay 1510 and maintain the multiple call cross office unit reader halted.

The ground removed from lead C9515(13) restores relay 1570 in Supervisory Unit 1300. It opens contacts 1571 to restore the Cross Office Finder Bar Relays 3130 and a series of operations are then instituted to release each Cross Officer Finder 3100 as described. Relays 1740 and 1810 in the Finder Relay Unit are then released in a described manner. Relay 1810 opens contacts 1811 to restore relay 3040 as described. Switches MMIGS, MMITS, MMOGS and MMOTS, etc. and other described register release operations take place. Ground is removed from lead C2791(36) by restoration of relay 1840, etc. to restore relay 1480. Relay 1310 remains operated to maintain the upper winding of relay 1320 energized and the operated precedence register relay 2060, for example remains operated as ground remains on lead C1304(22).

Ground removed from lead C9401(24) removes ground from relay 2440. Relay 2440 restores to open contacts 2441, and restore relay 2310, which reconnects the reader sensing leads from Routing Register 2300 to the precedence sensing relay 1910—1960 in Precedence Register 1900. Contacts 2441 also restore any operated register relay in the groups RR1—RR5. The operated register relay on restoring remove ground at contacts such as 2511 from lead C2699(33) to restore the finish relay 3370 in the Terminal Register 3300. Relay 3370 opens contacts 3378 to remove ground from lead C3307(94) and restore relay 9410. It opens contacts 9411 to remove the shunting ground for relay 9440, which now operates in series with relay 9430 over contacts 9431 and 9615. At contacts 9445 it opens the original operating circuit for relay 9430. At contacts 9413 the original operating circuit for relay 2720 is opened. Ground removed from lead C2699(33) also restores the lower winding of relay 2430. Its upper winding is restored when ground is removed from lead C9402(24). Relay 2430 on restoring opens contacts 2431 to remove ground from lead C2398(15) and restore the upper winding of relay 1510. That relay remains operated from ground on lead C9491(94) in a manner explained so that the reader clutch magnet of the multiple call cross office unit remains deenergized. Ground removed from lead C9405(34) restores the transfer relay 3450 and also opens the circuit to relay 3650, if switch MMOGS was not stepped. Ground removed from lead C9403(33) restores relays 3520, 3530 and 3540 together with any operated terminal register relay RT1—RT25 and RG1—RG10. Relay 3330 also restores when ground is removed from lead C9403(33).

Ground removed from lead C9406(27) restores relays 2720 and 2730 or 2740 and 2750, if operated, and ground removed from lead C9501(30) restores relays 3020 and 3030, if operated. Relay 2720 also restores to restore relay 2710. When relays 2920 and 2930 or 2940 and 2950 restore, ground is removed from leads C2901(100) or C2902(100) respectively, to deenergize relays 165' or 170' respectively. These open contacts 167' or 172' respectively. This removes ground from lead C199(113) extending to the contacts of the register relays RGG1—

RGT25. If the operated ones of these relays are restored by now or not the ground extended through their contacts to the corresponding conductor of cable C1321'(98) and the motor magnet of one of the switches MMT1—MMT23 corresponding to a trunk destination is removed, and that switch steps to take its first step. It will be understood that, if the register relays RGG1—RGG10 and RGT1—RGT25 are already restored due to the removal of ground on lead C9408(94) and therefore have restored the ground extended over the conductor of cable C1321'(98) one of the switches MMT1—MMT23 then takes its first step. Removal of ground from lead C3019(100) on restoration of relays 3020 and 3030 restores relay 180'. Relay 180' opens contacts 181' to remove ground from lead C183'(114) and restore 1420'. It opens contacts 1422' to remove ground from lead C9817(98). This deenergizes the motor magnet of switch MMT24 corresponding to an intercept routing and the switch takes its first step.

With relay 1480 restored, ground is removed from lead C3285(51) to restore relay 6070 in the cross office unit. If the connection was made to an intercept position the corresponding relay 6830 in the intercept position is restored. Relay 6110 remains operated over its described holding circuit. When relay 6070 restores it opens contacts 6772 to open the original operating circuit for relay 6050 however that relay remains operated over through the described holding circuit. At contacts 6077 it reconnects resistance ground to the cross office unit reperforator. At contacts 6075 is disconnects resistance ground from lead C5202(52), and it connects battery from the winding of relay 6060 over contacts 6124, through contacts 6017 to lead C5202(52). Relay 6120 which controls the contacts 6124 is operated in a manner already described. The battery on lead C5202(52) is extended over level C of the incoming selector switch 5200 to conductor C5201(90) and from there over contacts 9059 and contacts 9033 towards relay 9160 which therefore restores.

Relay 9160 on restoring opens contacts 9161 to remove ground from lead C9002(96) extending through level E of switch MMSEL2 and contacts 9575 and 9618 to relay 9590. The removal of this ground also enables relay 9470 to operate in series with relay 9480 over contacts 9483 and 9615. Relay 9590 restores to open contacts 9593 and remove ground from lead C9504(14) to enable relay 1450 to be controlled by Supervisory Unit 1300. At contacts 9592 it removes ground from lead C9497(111) to restore relays 610', 630', 710', 810', 910' if operated, 930', and 1010'. Relay 1010' on restoring opens the circuit to relay 1110' at contacts 1015' and relay 1110' restores. At contacts 1111' it prepares a holding circuit for either relay 1150' or 1160'. At contacts 1112' it removes ground from lead C9492(94) to restore relays 9450 and 9460. Relays 9450 and 9460 now extend ground as previously described to the various out register circuits. At contacts 9464 ground is removed from lead C9491(15) to restore the lower winding of relay 1510. A circuit is now completed for the multiple call cross office unit reader and the reader now begins to operate to transmit signals to the register precedence sensing relay 1910—1960 in a manner already described.

Relay 9470 at contacts 9472 opens the incomplete original operating circuit for relay 9480; opens the circuit for extending ground to lead C9494(111) at contacts 9473 and prepares a circuit to forward ground over lead C9418(111) at contacts 9471.

*Pretest*

The routing indicator is now processed in a manner already described. The first R or U of the routing indicator is read by the sensing relays and relay 1150' or 1160' is operated thereby. The Routing Register 2300 is then connected to the reader sensing leads, and the routing indicator, registered in relay groups RR1—RR5 in a manner already described. When the machine function following the routing indicator is sensed by the routing register sensing relays, relay 3340 in the Terminal Register 3300 is operated and the translator demanded. Register relays in the Terminal Converter 114 and Counter Converter 113, respectively, are then operated as a result of the operation of a coding relay in the translator as described. The coding relay in the translator also operates register relays in the Terminal Register 3300 in a manner described.

Relay 3370 operates after the translation and extends ground over lead C3307(94) to operate relay 9410. Relay 9410 does not complete a circuit to already operated relay 9430 as contacts 9445 are opened at this time. At contacts 9413 it extends ground over lead C2099(27) to operate relay 2720, which in turn operates relay 2710. Ground is now extended in a manner already explained to lead C2799(35) and as already explained to either lead C2290(22) or lead C3599(27). Ground on lead C3599(27) results in an intercept operation. Ground on lead C2290(22) is extended to the contacts such as 2061 of any operated precedence register relay to either lead C2291(94) or lead C2293(94) depending upon the precedence of the message. With relay 9440 operated ground on lead C2291(22) is extended through contacts 9444 to lead C9407(28) and likewise ground on lead C2293(22) is extended through contacts 9442 to lead C9407(28). Ground on lead C9407(28) is extended through contacts 2844 to operate relay 2830.

At contacts 2836 relay 2830 forwards ground through contacts 2845 to operate relay 2820 which now calls for the common control register assigner 4500 in a manner already explained. At contacts 2831 ground is extended over lead C2805(100) to operate relay 155'. Relay 155' closes contacts 156' to extend ground through contacts 182', 176', 171', 166', and 162' for operating relay 150'. At contacts 157' ground is extended from contacts 182' and 176' to lead C199'(113) and through the operated contacts of the respective operated register relays in groups RGG1—RGG10 and RGT1—RGT25 to a conductor cable C1321'(98) corresponding to the trunk destination to energize one of the motor magnet switches MMT1—MMT23 corresponding to the trunk destination indicated by the routing indicator. Relay 150' on operating opens contacts 152' and closes contacts 151' to prepare a circuit over lead C106'(109) to relay 940'.

At contacts 2834 relay 2830 connects lead C3292(32) to relay 2850. At contacts 2833 it completes a holding circuit for itself through the lower winding of relay 2840, contacts 2862, contacts 2924, and 2943 to ground on lead C9406(94). Relay 2750 operates when the common control register assigner 4500 finds this circuit in a manner explained, and it completes at contacts 2751 a circuit over lead C2795(15) to operate relay 1560. Relay 1560 returns ground over lead C1598(28) to contacts 2816 and also operates the cross office finder bar relay 3110 to connect the register relays L1—L25 to the respective cross office units.

Ground at contacts 2816 is extended past contacts 2846, 2847 and 2848 respectively; through contacts 2838, 2839 and 2839', respectively, and from there over contacts 2757 to lead C2794(34), to contacts 2758 and lead C2793(34) and to contacts 2759 and lead C9608(96), respectively.

Ground on lead C9608(96) operates relay 9610, which closes contacts 9611 to forward the ground from lead C9608(27) over contacts 9614 through level B of switch MMSEL2 standing on the contact associated with the multiple call cross office unit having seized this register. At contacts 9612 it also forwards the ground to lead C9615(50) to operate a number of relays such as 5070, which each control the circuits to the respective lower windings of a number of multi-channel busy relays such as 5010. The ground extended over level B of switch MMSEL2 is extended over a lead such as C9614(90) and through contacts 9616 to lead C5214(52) extending to level A of each incoming selector switch associated with the multiple call cross office unit 8600, and from there over each conductor such as 5213(61) associated with each incoming selector switch standing on the multiple call cross office unit bank terminals, over contacts 6114 and 6056 to operate relay 5960 in each of those cross office units. The ground on lead C2794(34) is extended through contacts such as RG1F of an operated route group terminal register relay in the Terminal Register 3300, over a lead such as GP1(47) to operate a relay such as 4720 in the terminal test access unit 4700 corresponding thereto. Ground on lead C2793(34) is extended through contacts such as RT1E corresponding to the operated route terminal relay in Terminal Register 3300 to lead S1(47) and through the operated contacts of the terminal test access relay 4720, if the selected outgoing channel is a single channel to a lead such as C4751(48) extending to the terminal of the outgoing channel associated with the outgoing selector switches. If an outgoing selector switch, associated with the cross office unit having the relay 5960 operated, is associated with this outgoing channel, the ground on lead C4751(48) is forwarded in a manner explained through the cross office unit to operate a correspondingly register relay in a group L1—L25 in a Cross Office Finder 3100. If the selected outgoing channel one of a multi-channel circuit, the ground on the lead such as S2(34) is extended through operated contacts of the terminal test access relay 4720 to terminal block 4780 and over lead such as C4752(50) to operate the lower winding of the multichannel busy relay 5010 through such contacts as 5072 controlled by one of the operated relays 5070 as explained. This prevents ground on lead C4752(47) from being forwarded past contacts 5071 to a lead such as C5001(44A) for stepping the multi-channel switch in the translator. At contacts 5013 relay 5010 extends the ground on lead C4752(47) to lead C5002(48) and the terminal of the selected channel on the outgoing selector switch banks, so that the ground is forwarded over the wiper of any outgoing selector switch standing on the terminal and through the cross office unit in a manner explained, to operate a register relay of groups L1—L25 corresponding to the cross office unit.

With a cross office register relay L1—L25 operated, switch MMCO2 steps in search of that register relay and switch MMCO1 steps in search of the Cross Office Finder Unit 3100 in a manner already explained. Thereafter relay 2770 is operated in a manner explained and it maintains contacts 2772 open to prevent the forwarding of ground over lead C2799(35) in a manner already explained. Relay 2810 operates before relay 2770 in a manner explained and it opens contacts 2815 and 2816. Contacts 2816 opening removes ground from lead C9608(96) to restore relay 9610, which in turn restores relays such as 5070 and any operated cross office unit relay corresponding to 5960. Ground is also removed from leads C2794(34) and C2793(34) to restore the relays operated thereby. At contacts 2815 ground is removed from lead C2799(35) to remove the shunting ground for the lower winding of relay 2840, and it operates in series with relay 2830. It energizes its upper winding at contacts 2842, and at contacts 2841 maintains ground on lead C2805(100) to maintain relay 155' operated. At contacts 2844 it opens another point in the original operating circuit for relay 2830 and at contacts 2845 opens the circuit to relay 2820 which restores.

Ground, which is maintained on lead C3229(32) from contacts 6112 in the selected pretested cross office unit, is extended through level C of switch MMCO2 to lead C3292(28) and over contacts 2834 to operate relay 2850. At contacts 2851 relay 2850 extends ground over lead C2791(14) to operate relay 1480. It places ground on lead C1708(32) extending through level F of switch MMCO2 to lead C3285(60) to energize relay 6070 in a manner explained. Relay 6070 operates relay 9160 as before explained and that relay extends ground over lead C9002(96) to operate relay 9590 in the Miscellaneous Relay Unit 9400. Ground which operates relay 9590 is now also extended past contracts 9471 to lead C9418(111) and contacts 1042' to operate relay 1050'.

In the event the pretest is unsuccessful, a register relay in the group L1—L25 fails to operate and therefore relay 2770 fails to operate or remain operated, after relay 2810 operates in a manner already explained. Ground is therefore again forwarded to lead C2799(35) and over an already described circuit arrangement to lead C9407(28). As relay 2840 is operated at this time, the ground on lead C9407(28) is then forwarded over contacts 2843, 2864 and 2934 to operate relay 2920. A preset cross office unit test is now conducted in a manner previously described and if the preset cross office unit is found the switches thereat are set in a manner described. Relay 1480 is operated as described to operate relay 6070 in the preset cross office unit and an already described procedure takes place for operating relay 9590 and relay 165'. Relay 165' opens the circuit at contacts 166' to relay 150', and relay 150' restores its contacts to close contacts 152' and open contacts 151'. Relay 1050' is operated as described on a successful pretest. If the preset test is unsuccessful, ground is again extended to lead C9407(28) and is now extended over contacts 2843, 2864, 2933 and 2954 to operate relay 2940. A test is now made for an empty cross office unit in a manner already described and an afore-described series of operations take place. In this case relay 170' is operated in addition to relay 165', and on a successful empty cross office test relays 9590 and 1050' are operated as described. A high precedence message results in failure of a test for a preset cross office unit as switch MMPR1 in the cross office unit has no means for forwarding high precedence ground. If the test for an empty cross office unit should fail a test for an intercept position is started under control of relay 3020 all in a manner described. Relay 3020 is operated from ground forwarded, after the empty cross office test, to lead C9407(28), contacts 2843, 2864, 2933, 2953, 2965 and 3034. Relay 180' is operated, and when the test is successfully completed, relays 9590 and 1050' are operated.

If an intercept position has been seized previously relay 2960 has been operated in a manner described. Ground extended over lead C9407(94) in a manner described in the event of failure of an empty office unit test or over lead C3599(35) in the event of a translation resulting in an intercept routing. This ground is forwarded over contacts 2964 and 3414 to operate relay 2970 instead of over contacts 2965 and 3034 to operate relay 3020. Relay 2960 operated on the first intercept routing makes this possible, as it opens contacts 2965 and closes contacts 2964. It energizes its lower winding at contacts 2961 to ground at lead C1303(13), and therefore is not affected by operation of relays 9450 and 9460 after each routing indicator is transmitted. In addition it extends the locking circuit for relays 2940 and 2950 through contacts 2962 and 2973 instead of 2963 and 3025, if those relays are operated.

At contacts 2972 relay 2970 completes a holding circuit for itself through the upper winding of relay 3010 and contacts 3024 to ground on lead C9406(94). At contacts 2971 it extends ground over lead C3077(100) to operate relay 175' which opens contacts 176' and closes contacts 177' to energize relay 150'. It also closes contacts 178' to extend ground over lead C183'(114) to operate relay 1420' in the Terminal Converter 114. At contacts 2973 relay 2970 restores relay 2940 if operated. Ground is therefore extended from contacts 2946 to contacts 2976 and 3015 to operate relay 2820, which initiates a search by the common controls register assigner 4500 for this circuit.

When ground is extended to lead C1598(28) in a manner already described it is now forwarded over contacts 3016 and 3017 respectively, through contacts 2978 and 2979 respectively. Ground through contacts 2978 is extended over C9608(96) to operate relay 9610. It extends the ground on lead C9608(96) to the incoming selector switch of all cross office units and intercept positions associated with the multiple call cross office unit as explained. This ground is extended over lead C5213(68) in a manner described for extending the ground to the cross office unit. This ground is extended over contacts 6829 and 6856 to operate relay 6960 in the intercept position. Ground from contacts 2979 is forwarded over lead C2909(49) to energize relay 4910, which closes contacts 4911. At contacts 4911 ground is extended over lead C4912(69), contacts 6961 and 6962, through key contacts 6979 to lead C3199(31) to operate a register relay in group L1—L25 corresponding to the intercept position which passes this ground through the aforementioned contacts. Switch MMCO2 is stepped in search of the operated register relay, and switch MMCO1 is stepped in search of the cross office finder unit all in a manner explained previously. Relay 2810 operates and if relay 2770 remains operated in response to a successful intercept position test, ground is permanently removed from lead C9407(94) or from lead C3599 (27).

When relay 2810 operated initially to remove the ground from either of these leads relay 3010 operates in series with relay 2970 over the aforementioned holding circuit. At contacts 3011 it maintains ground on lead C3077(100), and at contacts 3012 completes an energizing circuit for its lower winding to ground on lead C9406(94). At contacts 9414 it opens a point in the original operating circuit relay 2970. At contacts 3013 it prepares a circuit over lead C3092(95) to operate relay 9550 for a purpose already explained in the event the intercept position test initially fails. At contacts 3015 it opens the circuit to relay 2820, which restores to provide an already described sequence of operations.

If the cross office finder is set to a cross office intercept position at this time, ground returned from contacts 6823 is extended over lead C3207(32) to the cross office finder switch MMCO2 and to lead C3292(28) and over contacts 2835, 2875 and 2974 to operate relay 2850. If relay 2830 had been operated before in response to a protest the ground on lead C3292(28) is extended past contacts 2834 to operate relay 2850 directly. Relay 2850 extends ground at contacts 2851 to lead C2791(14) to operate relay 1480, which in turn extends direct ground for reoperating relay 6830 in a manner described.

Relay 6830 returns ground for operating relay 9160 in the multiple call cross office unit in a manner explained, and that relay returns ground over lead C9002(96) to operate relay 9590 and 1050' in a manner already described.

If the intercept position test is unsuccessful, ground is extended over lead C3092(95) in a manner already explained to operate relay 9550. Ground is then returned over lead C3599(27) in a manner already explained and through contacts 2964, 3013 and 3034 to operate relay 3020. This gives rise to an already described sequence of operations for again conducting an intercept test. Relay 3020 in addition opens contacts 3024 for restoring relay 2970. Succeeding routings to an intercept position again result in operation of relay 2970 to repeat the aforedescribed procedure.

Relay 1050' on operating closes contacts 1051' to extend ground past contacts 1131' for operating relay 1140'. This disconnects the cross office unit reperforator or intercept position reperforator as the case may be from lead C9507(95), and connects resistance ground thereto at contacts 1142'. Relay 1050' connects the wipers of level B—F of switch MMFC to the markable transmitter and connects the wiper of level A to the markable transmitter clutch magnet in a manner described for other switches. It also completes a self-interrupted stepping circuit for the motor magnet of switch MMFC in a manner described for other switches and that switch now steps to its first contact where the off-normal springs open to disconnect the just described stepping circuit. Ground is extended from contact 1 of level A of the switch to the transmitter clutch magnet to energize that magnet so that the transmitter goes through a cycle for transmitting the markings on levels B—F of switch MMFC to the polar relay 9580 in a manner already described for the other switches. A pulse for each cycle is returned over lead NUM to energize the motor magnet of switch MMFC and the switch steps once per cycle. On reaching its third contact the switch extends the switch self-interrupting ground through contacts 1121' to the markable transmitter clutch magnet so that the clutch is deenergized at the end of the cycle. The switch then steps to contact 4 where the markable transmitter clutch magnet is connected over level A of switch MMFC through contacts 1123' to the upper winding of relay 1040'. Relay 1040' energizes in the circuit, but the transmitter clutch magnet does not. At contacts 1042' relay 1040' opens the circuit to relay 1050', which restores to open the circuit to relay 1140'. Relay 1140' reestablishes the circuit to the cross office unit reperforator under control of relay 9580. Relay 9580 has in the meantime transmitted two carriage returns and one line feed from the three contacts of levels B—F of switch MMFC to the page printer. With relay 1050' restored and relay 1040' operated, ground is extended from contacts 1059' through contacts 1041' and 1128' to lead C1102'(100). Relay 1040' also energizes its lower winding through contacts 1043' to ground on lead C9497(94).

Ground on lead C1102'(100) is extended to the contacts of relay 150'. If relay 150' is operated as in a successful pretest condition, the ground on lead C1102' (100) is extended past contacts 151' to lead C109'(109) and through contacts 935' to energize relay 940'. Relay 940' connects switch MMLN to the markable transmitter and an already described sequence of operations now takes place for transmitting a terminal registration to the page printer only, as relay 1140' is operated in response to the operation of relay 940'. On termination of the operation of switch MMLN in a manner already described relay 930' is operated and relay 940' restored to operated relay 1020'. Relay 1140' is also restored. Relay 1020' connects switch MMR1 to the markable transmitter and the polar relay 9580 is now controlled in a manner already explained to transmit to the page printer and to the cross office unit or intercept position reperforator the second registered routing indicator. Relay 1010' is then operated to restore relay 1020' and in turn operate relay 1110'. Ground is now extended over lead C9492 to operate relays 9450 and 9460. These relays operate to complete an already described sequence of operation. In response to their operation relay 1040' which is also operated at this time is restored due to the removal of ground from lead C9497(94). Relays 2830, 2840, 2970 and 3010, if operated, restore together with other relays when ground is removed from lead C9406(94).

In the event relay 150' had not been operated indicating that a pretest was unsuccessful and that a new cross office unit or intercept position is seized, the ground on lead C1102'(100) is returned over contacts 152', after switch MMFC has operated, to lead C609'(100) and contacts 633' to operate relay 640'. Switches MMSOM is then operated in a manner already described to transmit to the unit reperforator in a manner already described. Switches MMCN4, MMPR4 and MMSJ2, if necessary, MMLN and MMR1 are then operated all in a manner described to transmit the SOM, channel designation, channel number, precedence and second routing indicator information to the reperforator of the new unit or intercept position. This information with the exception of the routing indicator is the same as was transmitted to the reperforator of the first seized cross office unit or intercept position. Relays 9450 and 9460 are then operated in a manner described.

On operation of relays 9450 and 9460 ground is removed from lead C9406(94) as already explained. In addition to the other functions performed by these relays the ground removed from lead C9406(94) restores relays 2830 and 2840 and if relays 2970 and 3010 have been operated these relays are restored by the removal of ground from this lead. Therefore subsequent routing indicators may be handled in the manner just described.

*Multiple call cross office unit test*

It will be noted in this connection that each time a new SOM is sent, under control of the control switch MMSOM, the motor magnet of switch MMCTG4 is energized, and after SOM is sent the motor magnet is deenergized to step the switch one position. When stepped to contacts 10 the wiper of level B of the switch energizes relay 9490, and that relay locks operated over contacts 9491 and 9482. The switch continues to step whenever an SOM is sent. When reaching contacts 8 the second time, the ground from wiper B is extended over contacts 9492 to lead C2806(28) to operate relay 2860.

Relay 2860 locks energized over contacts 2867 to ground on lead C1303(13). At contacts 2862 is opened the described holding circuit for relay 2830 through the lower winding of relay 2840 and extends it through contacts 2861 and 2873. At contacts 2863 it prepares a circuit for relay 2870. At contacts 2865 it prepares a circuit for relay 2730.

On the processing of the subsequent routing indicator, relays 2830 and 2840 are operated as described, and in the event of failure of the pretest ground is extended over lead C9407(94) to contacts 2843, as explained. This ground instead of being extended over contacts 2864 to relay 2920 is extended over contacts 2863 and 2914 to operate relay 2870. At contacts 2871 relay 2870 grounds lead C2903(100) to operate relay 160'. Relay 160' at contacts 161' operates relay 150' over contacts 166', 171' 176' and 182'. At contacts 163', it extends ground over lead C199'(113) from contacts 176' and 182' to energize a motor magnet of one of the switches MMT1—MMT23, in a manner explained. At contacts 2872 relay 2870 completes a holding circuit for itself through the upper winding of relay 2910 and contacts 2922 to ground on lead C9406(94). At contacts 2873 it restores relays 2830, and at contacts 2876 extends ground from contacts 2837, through contacts 2916 to operate relay 2820 for a purpose already described. Ground is then extended from lead C1558(15) in a manner already described through contacts 2816.

This ground is now extended through contacts 2917 and 2918, respectively, to contacts 2878 and 2879. The ground from contacts 2878 is extended to lead C9603(96) to operate relay 9610 for extending this ground through the multiple call cross office unit in a manner already described. Ground from contacts 2879 is extended to lead C2809(49) to operate relay 4915 which closes contacts 4916 to extend ground over conductor C4917(92) extending to each multiple call cross office unit. As the ground extended by relay 9610 to lead 9614(90) extends to the bank contacts terminating this multiple call cross office unit on the incoming selector switch bank, the ground may operate a relay such as 5960 in the units, which are associated with the multiple call cross office unit. These relays extend no ground to operate a register relay in the group L1—L25 as ground extended over lead C4917(92) is not extended to any cross office unit such as 5400. Therefore, relay 2810, which operates after a period of time, restores. Ground is extended to lead C9407(28) in a manner described. During the interval when relay 2810 was operated, the ground removed from lead C9407(28) enabled relay 2910 to energize in series with relay 2870. It maintains the ground on lead C2903(100) at contacts 2911 and at contacts 2912 energizes its lower winding to ground on lead C9406(94). At contacts 2913 it extends the ground on lead C9407(94) to contacts 2943 to operate relay 2920. At contacts 2915, it extends ground from lead C9406(94), through contacts 2865 to operate relay 2730. It operates relay 2710 as before.

Relay 2920 opens the circuit through the winding of relay 2870 at contacts 2922 to restore that relay. Relay 2820 is now operated in a manner already described to call for the common control register assigner 4500. Ground is again extended over lead C1598(15) through contacts 2816 and over already described contacts to lead C2090(20). As contacts 2738' and 2737' are opened, ground is not extended to leads C2793(34) and 2794-(34), respectively. The ground from lead C1598(15) is also extended over contacts 2754 and 2738 to lead C4901(49) to operate relay 4980 in a cross office test unit 4900. Ground on lead C2990(20) is extended as previously explained, past the operated contacts such as 2062 of one of the three low precedence register relays such as 2060 to operate either relays 4970, 4960 or 4950, respectively, in the cross office test unit 4900. If the message was high precedence the ground on lead C2090(20) is not extended to one of these relays and therefore they do not operate.

With relay 4980 operated and one of the precedence relays 4970, 4960 or 4950 operated, ground is extended from contacts such as 4986, through contacts 4971, 4961 or 4951, respectively to lead C4905(89), C4906(89) or C4907(89) respectively. These leads are extended to corresponding contacts on level A of the precedence switches such as MMPR2 in the multiple call cross office units only. When relay 4980 operated it opened contacts 4982, 4983, 4984 and 4985 to prevent extension of ground to the precedence switches in the cross office units.

With relays 9330 and 9350 in the available multiple call cross office units restored, the ground from level A of the precedence switch MMPR2 is extended past contacts 9333 and 9352 to operate relay 9270.

It extends ground from contacts 9331, through contacts 9271 and 9281 to lead C3174(31) to operate a register relay in group L1—L25 corresponding to the available multiple call cross office unit. This cross office unit may be the one now handling the message if it has received the present message at the reperforator and relays 9330 and 9350 are restored, as will be explained. In the event the register relay in group L1—L25 is operated, the test for a preset multiple call cross office unit is successfully completed in a manner similar to that already explained for the other preset tests. Seizure of the multiple call cross office unit now proceeds in a manner already explained to operate relay 9330 in the unit and relays 1770 and 1760 in the Finder Relay Unit 1600. An incoming selector switch at the multiple call cross office unit is set to the preset multiple call cross office unit in an explained manner. Ground is then returned over lead C1897(18) and contacts 2925 to lead C2791-(14) to operate relay 1480. It extends ground over lead C3285(93), as explained, to operate relays 9370 and 9380 in the preset multiple call cross office unit. In the event the seized multiple call cross office unit is the same as that, that is, now controlling the transmission of the message, an incoming selector switch thereat is set to respective contacts on the incoming selector switch banks corresponding to its associated multiple call cross office unit.

Relay 9370 operated on seizure of the preset multiple call cross office unit, extends ground from contacts 9053 in the transmitting multiple call unit extended over lead C601(52), level D of the incoming selector switch to lead C5203(93) through contacts 9388 and 9373 to operate relay 9350. Relay 9350 locks operated over contacts 9356, 9345 and 9313. At contacts 9355 it energizes the lower winding of relay 9380 from ground at contacts 9313. The preset multiple call cross office reperforator is now extended through relay 9260, contacts 9343 and 9372 to lead C5204(52), lead C798(90) and over an already described circuit to the contacts of the polar relay 9580 in Miscellaneous Relay Unit 9400 so that the reperforator may now receive the SOM, etc. of the message under the control of the markable transmitter associated with Register C and the switches such as MMSOM, etc. At contacts 9359, resistance ground is extended through contacts 9375 and 9389', lead C5202(52), lead C5201(90) and an already described circuit to operate relay 9160. It returns ground over lead C9002(96) to operate relays 9590 and 1050' in a manner explained. Transmission to the printer only takes place in a manner explained and as relay 165' is operated to restore relay 150', transmission of an SOM, etc. is made to the preset multiple call cross office unit reperforator in a described manner. When completed relays 9450 and 9460 are operated as before to effect partial release of Register C. Relay 2960 remains operated, but relays 2910 and 2840, etc. restore due to the removal of ground from lead C9406(27). Relay 1480 restores as before to remove ground from lead C3285(93) and restore relay 9370. It connects the cross office reperforator to resistance ground at contacts 9371, and opens the circuit to relay 9260 at contacts 9375. Relay 9260 restores for an already described purpose, and another routing indicator may be processed.

In the event the preset multiple call cross office unit test is a failure, ground is again forwarded in a manner already explained to lead C9407(28) and that ground is extended through already described contacts and contacts 2933 and 2954 to operate relay 2940. It initiates operation of relay 2820 in a manner already described, and ground is again returned over lead C1598(28) through contacts 2816. Ground is again extended over lead C4901(49) to operate relay 4980. Likewise ground is extended to lead C2701(49) in a manner already explained to operate relay 4930. On this test contacts 2866 are open so ground is not extended to lead C2702(35) as a speed test need not be performed in an empty multiple call cross office unit test. Nor is ground extended over lead C2793(34), as contacts 2738' are open. A test for an empty multiple call cross office unit now takes place from ground extended over lead C4942(89) through switch MMPR2, in a manner described, to operate a relay such as 9270 in each empty unit. If the test is unsuccessful an intercept position is sought, all in a manner described. With relay 9270 operated and relay 9330 restored, ground is returned over lead C3174(31) to give rise to an already described sequence of operations and relays 9330, 1770 and 1760 are operated. An incoming selector switch 5200 and switch MMPR2 are set to the transmitting multiple call cross office unit and to the proper precedence, respectively. When they are set ground is extended to lead C2298(27) in a manner explained, and then to lead C2791(14) to operate relay 1480. It gives rise to a described sequence of operations for operating relays 9370, 9380 and 9350, etc. Transmission to the empty multiple call cross office unit now takes place as described for the transmission to the preset unit and thereafter the unit and register are partially released.

When a routing indicator is to be transmitted to a preset or empty multiple call cross office unit, it will be noted that either relays 165' or 170' are operated. The operation of either of these relays releases relay 150' and connects lead C1102'(111) to lead C609'(100). Therefore, transmission of information from switch MMFC and then the transmission of the SOM and already described sequence of the information follows in a manner already described for the transmission of this information to an empty cross office unit such as 5400.

After the transmission of this information, the register partially releases the seized multiple call cross office unit by releasing relay 9370 and another routing indicator is processed by the Register C in a manner described. Relays 2830, 2840, 2910, etc. are restored due to the removal of ground from lead C9406(94) before the next routing indicator is processed.

Therefore when the translation is made of the succeeding routing indicator, and ground is extended as already described to lead C9407(94), relay 2830 is operated therefrom in a manner described. It now locks operated through the lower winding of relay 2840 and contacts 2861 and 2863 to ground in lead C9406(94). It initiates a pretest for a cross office unit in a manner described.

Ground is extended from contacts 2816, as described, through contacts 2848 and 2839' and through contacts 2759 to lead C9608(96) to operate relay 9610. That relay extends the ground in a manner already described to lead C9614(90). That ground is extended through the multiple call cross office unit to the corresponding terminals of the incoming selector switch bank and to the incoming selector switch wipers associated therewith in a manner explained for the cross office unit. This ground is therefore extended from lead C9614(90), through contacts 9016 to lead C5214(52) and over leads such as C5213(93), contacts 9353 to operate relay 9270. It is also extended over a lead such as C5213(61) to operate relay 5960 in the cross office units. Ground from contacts 2816 is also forwarded to leads C2794(34), and C2793(34) in a manner explained and a pretest for a cross office unit such as 5400 is conducted in a manner explained, and if that test is successful an already described sequence of operations take place. On this pretest a multiple call cross office unit cannot be seized as no means are provided for furnishing ground therefrom to lead C3174(31) for operating one of register relays L1—L25. If no cross office unit is found having the required outgoing selector switch setting the pretest is a failure and no ground is returned to operate a register relay at this time. Relay 2840 operates as before described. Ground returned over lead C9407(94) is therefore extended past contacts 2843 to operate relay 2870 in a manner already described.

It operates relay 2820 as described, and ground is again forwarded to lead C1598(28) after the register assigner finds this circuit. Ground is therefore extended past contacts 2917 to contacts 2878 and through contacts 2759 to lead C9608(96) to operate relay 9610, and a relay such as 9270 in each multiple call cross office unit that is connected to the transmitting unit in a manner described. Ground from lead C1598(15) is also extended over contacts 2918 and 2879 to lead C2809(49) to operate relay 4915. It closes lead C4917(92) extending to each multiple call cross office unit. If relay 9270 in a multiple call cross office unit is operated the ground on lead C4617(92) is extended over contacts 9272 and 9281 to lead C3174(31) to operate a register relay L1—L25 corresponding to the multiple call cross office unit in the cross office finders. Relay 2770 therefore operates, when the register relay is found and maintains contacts 2772 open to prevent the forwarding of ground to lead C9407(28). With switch MMCO2 associated with the multiple call unit ground on lead C3229(32) is extended to lead C3292(28) and contacts 2834 to operate relay 2850. It returns ground over lead C2791(14) to operate relay 1480, which in turn operates relay 9370 in the pretested multiple call cross office unit. An already described sequence of events now takes place for transmitting to the seized pretested multiple call unit. Relay 2910 operates in a manner described, when ground is removed from lead C9407(28). Relay 160' is maintained operated at contacts 2011 to maintain relay 150' operated. Therefore after switch MMFC has sent opening information to the page printer only, the routing indicator only is sent to the multiple call cross office unit, which was seized on the preset test in a manner explained. The circuits are thereafter restored in a manner described and the next routing indicator processed in a manner described.

In the event the pretest is a failure tests are conducted for a preset multiple call cross office unit and an empty multiple cross office unit in succession in a manner explained, and if those fail, a test is conducted for an intercept position as explained.

Certain trunk destinations have a limit on the number of routing indicators, which may be included in one message. Switches MMT1—MMT23 are provided with a connection from their respective eighth contacts of level B to lead C2807(28). When one of the switches has been stepped to its eighth position and is energized, as a result of a translation corresponding to the switch by the Counter Converter 113, ground is extended from the switch self-interrupting contacts through the eighth contact of level B of the switch to lead C2807(28). Relay 2830 operating during the pretest, extends the ground on leads C2807(28) through contacts 2832 to lead C2806(95) to operate relay 9520. Ground is therefore extended from contacts 9522 over lead C9523(32) to level E of the cross office finder switch MMCO2 set to a cross office unit which has operated its register relay L1—L25 on the pretest, and over a lead such as C3204(60), through contacts 6052 and 6071 to operate relay 6030. Relay 6030 closes contacts 6031 to complete a locking circuit for itself over contacts 6054. Although the pretest in this case is successful, the following pretest on the ninth routing indicator using the same cross office unit is unsuccessful, as contacts 6032 are open to prevent the return of ground over lead C3174(31) and the operation of the corresponding one of the register relays L1—L25. In this case a test must be made for either a preset office unit or an empty office unit in a manner explained.

If the switch such as MMT3 does not correspond to a limited trunk, the ground forwarded from the eighth contact thereof is extended to lead C9805(111) to operate relay 1130' in the Transmitter Control Relay Unit 106. It opens contacts 1131' to prevent the operation of relay 1140' so that two carriage returns and a line feed are transmitted to the cross office unit reperforator under control of switch MMFC, when that switch transmits to the page printer as explained.

Cancellation

If during processing, the multiple call cross office unit locking key 9029 is operated, it extends ground to operate relay 9030. It extends resistance ground over contacts 9031, a lead such as C1605(90), through level J of the switch MMIF in the Finder Relay Unit 1600, contacts 1712 to lead C9599(95) and through relay 9530 to operate relay 9510 only. Contacts 9512 open to remove ground from leads C9494(111) and C9495(106) to restore any operated relay such as 610', 630', 710', 810', 930', 1010', or 1040' in the Transmitter Control Relay Unit 106. At contacts 9511 it extends ground over contacts 9535 and 9485 and contacts 9713 to operate relay 9720. Relay 9720 is slow-to-operate to allow enough time for the transmitter control switches to be reset. At contacts 9724 it connects the markable transmitter clutch magnet to the wipers of levels A and B of switch MMCT5, and at contacts 9725, 9726, 9728 and 9729 and 9729', it connects wippers G and H, C, J and K, E and F and L, respectively, to respective sequentially closed contacts of the markable transmitter. The wiper of level C is connected to the first sequentially closed contact of the transmitter, the wipers of levels E and F are connected to the second transmitter contact; the wipers of levels G and H are connected to the third contact; the wipers of levels J and K are connected to the fourth contact and the wiper of level L is connected to the fifth contact. At contacts 9721 the lead NUM is extended to the motor magnet of switch MMCT5 so that the switch is energized once per cycle of the markable transmitter and steps when the energizing pulse is removed. Contacts 9723 completes a self-interrupting stepping circuit to the motor magnet of switch MMCT5 and it takes its first step. At that time it opens the self-interrupting stepping circuit at its off-normal springs and extends ground over switch level A, past contacts 9724 to energize the motor magnet of the transmitter. The transmitter now goes through its first cycle and energizes the motor magnet accordingly during this period. At the end of the cycle the ground is removed from lead NUM and the switch steps to contacts 2. In this fashion switch MMCTG5 is stepped until the wipers of levels B, H, K and F are associated with the marked bank contacts. In the meantime markings are transmitted only from levels C, E, G, J and L to the markable transmitter and from there to operate the polar relay 9580 accordingly. Switch MMCT5 controls the polar relay 9580 to send a cancellation sequence to all the units connected over the signal lead to the multiple call cross office unit. Switch MMCT5 transmits the following characters: letter shift, two carriage returns, line feed E, space, E, space, E, space, E, space, E, space, E, space, E, space, E, space, A, R, two carriage returns, 8 line feeds and four N's. At the time the wiper of level B is standing on its tenth contact, it forwards ground from contacts 9731 to energize the motor magnet of the transmitter. The switch steps to contacts 11, after the transmitter cycle, and forwards ground to energize the clutch magnet of the transmitter from contacts 9734. Thereafter the switch causes a number of blanks to be transmitted, until it reaches contacts 25. At that time the lower winding of relay 9730 is connected over wiper B and contacts 9724 to the transmitter clutch magnet.

The transmitter clutch magnet energizes, while the lower winding of relay 9730 also energizes. At contacts 9736 it disconnects ground from levels C, E, F, Z, G, H, J, K and L to prevent the ground marking thereat from being furnished to the polar relay 9580. At contacts 9733 it extends the ground from contacts 9485 through its upper winding to resistance battery and energizes its upper winding.

As the transmitter clutch magnet operates in series with the lower winding of relay 9730, ground is again extended over lead NUM to energize the motor magnet of switch MMCT5 and at the end of the cycle the ground is removed to cause switch MMCT5 to again step, so that the wipers of levels A, C, E, G, J, and L are again associated with the marked contacts. The switch continues to step, however, another cancellation sequence is not sent as relay 9730 is operated. In this fashion the switch continues to step, and when the wiper B of the switch comes in contact with its tenth contact the self-interrupting ground from motor magnet is extended over contacts 9732 to energize the transmitter clutch magnet so that the transmitter clutch magnet is deenergized at the end of the cycle. When the switch steps to contacts 11, wiper B extends the transmitter clutch magnet over contacts 9735 to the upper winding of relay 9710. Relay 9710 energizes in this circuit, but the transmitter clutch magnet does not.

Relay 9710 closes contacts 9711 to extend resistance battery to its lower winding and through contacts 9712 to ground at contacts 9485 to energize its lower winding. At contacts 9713 it opens the circuit to relay 9720 which restores the disconnect switch MMCT5 from the transmitter. At contacts 9722 a self-interrupted stepping is now completed for switch MMCT5, and it steps home in an understood manner.

When relay 9720 operated it closed contacts 9727 to extend ground over contacts 9714 and 9614 to level C of switch MMSEL2 and lead C9625(90), contacts 9034 to lead C5201(52). This lead is extended through the incoming selector switches associated with the multiple call cross office unit to leads C5202(61), C5202(68) and C5202(93) to operate relays such as 6840, 6060 and 9340 in those intercept positions cross office units, and multiple call units, respectively, which did not have their reperforator magnets connected over lead C5204(52) to the contacts of the polar relay 9580 in a described circuit. At contacts such as 6845, 6066 and 9042, respectively, the reperforator magnets of those units are connected over lead C5204(52) to the contacts of polar relay 9580 in a manner described so that those units receive signals from switch MMCTS.

When relay 9710 operates, it opens the circuit at contacts 9714 to relays 6840, 6060 and 9340 to restore those relays. The operator is informed of this condition in any well-known manner and she then restores key 9029. This restores relay 9030 to restore relay 9510. It in turn restores relays 9710 and 9730 at contacts 9711. The operator then manually releases the Register C.

In the event an operator must have a message in a mutiple call unit routed to intercept, she operates key 9578 at her position to extend direct ground to relays 5210 and 9530 so that they will both operate. At contacts 9535 prevents the operation of relay 9730 and the cancellation procedure. At contacts 9534 it extends ground over lead C9491(95) to operate relay 1510, which prevents operation of the multiple call unit reader. At contacts 9532 it extends ground from contacts 9526 to lead C2099(27) to operate relay 2720. This extends ground to lead C2799(95), contacts 9531 to operate relay 3020. This now results in a test for an intercept position.

When the multiple call unit is connected to the interrupt position, ground is extended from lead C9002(90) to operate relay 9590 as described. Relay 9520 is operated now over contacts 9591 and 9533. At contacts 9526 the original circuit from relay 2720 is opened and at contacts 9528 ground is extended over lead C9625(90) to operate both relays 9050 and 9120 in the multiple call cross office unit. This starts release of the register as will be apparent. At contacts 9527 relay 9450 and 9460 are operated for a purpose already described. Relay 9590 restores when ground is removed from lead C9002(90) and it restores the upper winding of relay 9520. When the register is restored ground removed from lead C1303(13) restores the holding circuit for relay 9520 extending over contacts 9529.

*Register release*

After the last routing indicator has been transmitted the precedence register sensing relays are again connected to the reader sensing leads in a manner described. A line feed D sequence of characters is now read to operate relays 2010 and 2020 and 2030 in a described manner. Contracts 2031 extend ground over lead C2098(15) to energize relay 1510 for maintaining the reader clutch magnet deenergized. At contacts 2032 ground is extended over lead C2092(111) instead of 2099(27), as in a Register A. Ground on leads C2092(111) and C2092(104) operates relays 1120' and 460', respectively. At contacts 1128" relay 1120' extends ground from lead C9494(94) through contacts 1042' to energize relay 1050'. Relay 1050' operates relay 1140' as described so that transmission will take place to the page printer. Relay 1050' connects switch MMFC to the markable transmitter in a manner already described. It completes a circuit to relay 1140' in a manner already described to prevent transmission to the unit reperforator.

Transmission now takes place under control of switch MMFC and polar relay 9580 to the page printer in a manner already described. Now, however, when switch MMFC reaches contacts 3, ground is extended from contacts 1122' to energize the markable transmitter clutch magnet. The transmitter then transmits the line feed character markings connected to switch MMFC bank contacts. Switch MMFC then steps to contacts 4, and the switch self-interrupting ground is now extended from contacts 1124' to energize the markable transmitter clutch magnet. The clutch magnet will therefore deenergize at the end of the cycle, while a line feed character marking on contacts 4 of switch MMFC level B—F is transmitted. In this case as ground is extended from contacts 1926' to contact 4 of level C of switch MMFC so that a second line feed character is transmitted. The switch is then stepped to contacts 5 and the markable transmitter clutch magnet is connected over contacts 1125' to the upper winding of relay 1040', Relay 1040' operates, while the clutch magnet remains deenergized. Relay 1040' operates to restore relay 1050' as already described, which in turn restores relay 1140'. Switch MMFC is stepped home on release of relay 1050'. Ground is now extended from contacts 1059' and 1041' through contacts 1127' to energize relay 1110'. At contacts 1112' it extends ground over lead C9492(94) to energize relays 9450 and 9460 for a purpose already described. At contacts 1113' it also extends ground over contacts 1129' to lead C1103'(95) to energize relay 9570.

Relay 460', which operated from ground on lead C2092(20) disconnnects the reader sensing leads at contacts 461', 464', 465' and 467', respectively. Relay 450' will therefore not be energized by pulses from lead C1706(17) to step switches MMDPU, MMDPT and MMDPH, as no further characters need be counted by these switches.

Relay 9570 locks operated over contacts 9572 and 9615. At contacts 9571 it energizes slow-to-operate relay 9560, which will open the signal lead C9507(111) extending to lead C9699(96) at contacts 9561. Relay 1040' restores, as explained, after ground is removed from lead C9497(94), to restore relay 1110'; however, relay 9570 has locked operated by this time. Relay 9450 and 9460 then restore. As relay 9650 is slow to operate, the resistance ground at contacts 9562 is forwarded over contacts 9573 and 9616 to lead C9625(90). At contacts 9575 relay 9570 opens a possible circuit to lead 9590, and at contacts 9574 connects lead C9002(90) extending from the multiple call cross office unit through level E of switch MMSEL2 to contacts 9641 and through contacts 9643 to relay 9650. At contacts 9576 ground is prevented from being forwarded over either leads C9494(111) or C9495(106).

Resistance ground extended over lead C9625(90) is extended through contacts 9035 and the upper winding of relay 9050, through contacts 9126 to battery through the winding of relay 9120. Only relay 9050 operates in this circuit and it energizes its lower winding and slow-to-operate relay 9060 over contacts 9055 and 9185. Relay 9560 operating thereafter, to open contacts 9562 therefore does not affect relay 9055.

At contacts 9059 the circuit to slow-to-release relay 9070 is opened. At contacts 9052 ground is extended to relay 9080 and to slow-to-release relay 9130. Relay 9130 operates to open an incomplete circuit to the transmitter clutch magnet at contacts 9125 and places resistance ground on lead C798(52) at contacts 9121. At contacts 9054 relay 9050 extends lead C601(52) to contacts 9081 and battery at the right side of relay 9080 so that the ground which is extended from contacts 9052 to the left side of relay 9080 does not operate that relay. This is because lead C601(52) is extended through level B of the incoming selector switches and over leads such as C5203(61), C5203(62) and C5203(93) to ground at contacts 6854, 6059 and 9357, respectively, in the intercept position, cross office units and multiple call units, respectively, associated with this multiple call unit. From contact 9189 ground is now extended over contacts 9058 to lead C5201(52), which extends through level C of each incoming selector switch standing on the bank contacts of the multiple call cross office unit to lead C5202(61) and contacts 6117, 6076, and 6124, to operate relay 6060 for example. In an intercept position relay 6830 is operated, and in a multiple call unit relay 9340 is operated.

Relay 6060 in the cross office unit opens the holding circuit at contacts 6062 to relay 6050, and that relay restores. At contacts 6063 a holding circuit is completed to relay 6110, while relay 6050 restores the first holding circuit thereto at contacts 6053. At contacts 6054 the holding circuit for relay 6030 is opened, and if operated it restores. The ground at contacts 6059 is now removed from lead C5203(52) extending to lead C601(90) to enable relay 9080 to operate. At contacts 6066 the unit perforator is connected to lead C5204(52) extending to lead C798(90). In the intercept position relay 6840 restores relay 6850 at contacts 6842. At contacts 6845 it connects the intercept reperforator to lead C798(90) over lead C5204(52). At contacts 6843 it provides a locking circuit for relay 6820. Relay 6830 at contacts 6854, disconnects ground from lead C5203(52) extending to lead C601(90) to enable relay 9080 to operate. In the multiple call unit relay 9340 connects the unit reperforator to lead C798(90) over contacts 9342 and lead C5204(52) and at contacts 9345 restores relay 9350. Relay 9350 at contacts 9357 removes ground from leads C5203(52) and C601(90) to enable relay 9080 to operate. At contacts 9344, relay 9250 is operated, and it locks over contacts 9254, 9217 and 9313. As soon as all relays such as 6050, 6850 and 9350 have restored to remove the shunting ground on lead C601(90), from relay 9080, it operates to control its contacts. Slow-to-operate relay 9060 operating after relay 9080 extends lead C798(90) to the contacts of relay 9130 at contacts 9164, and extends lead C9001(96) to the transmitter start contacts over lead US at contacts 9062. At contacts 9065 it extends ground over contacts 9151, 9172 and 9192 to lead RCL for energizing the reader clutch magnet so that the reader operates to read the body of the message and any information preceding this. At contacts 9067 relay 9060 extends lead TNM which receives a pulse for each transmitter cycle to lead C9002(96).

Relay 9080 on operating opens its shunting circuit at contacts 9081 and closes contacts 9083 to prepare a circuit for relay 9090. At contacts 9084 it recompletes a circuit for relay 9070 to prevent it from restoring its contacts. If relay 9070 should restore due to the failure of relay 9080 to operate in time, it closes contacts 9071 to energize relay 9150. This relay opens contacts 9154 to prevent completion of a circuit to relay 9090 and energizes its lower winding over contacts 9153 and 9099. At contacts 9151 it opens the reader circuit and at contacts 9155, etc. it extends various signal circuits.

Lead C798(90) is now connected over contacts 9064 and 9132 to resistance ground so that the reperforators of the apparatus connected to this multiple call cross office unit are connected thereto. Lead C9001(96) extending from level D a switch MMSEL2 in a manner already described and from lead C9699(111) to the contacts polar relay 9580 is now connected over contacts 9041 and 9062 to the start contacts of the multiple call cross office unit transmitter over lead US. The multiple call unit reader, which was operated during processing supplied enough slack tape to the transmitter so that the tight tape switch contacts opened and the slack tape contacts closed. Ground was therefore removed from lead TTT to restore relay 9140. It opens contacts 9142 to restore the original circuit for relay 9020 but that relay remains operated over its holding circuit. Ground on lead TTS operates the transmitter clutch magnet over described contacts and when the first Z of the SOM is presented at the transmitter, ground is extended to lead TZ1. This ground is forwarded over contacts 9021 to operate relay 9110. It opens contacts 9112 to restore the transmitter clutch magnet and stop the transmitter. It locks operated over contacts 9111, 8881 and 9185.

With the reader operating, slack tape becomes available to the transmitter and ground is extended from the transmitter slack tape switch contacts over lead TTS, through contacts 9056, 9083 and 9154 to operate relay 9090. It closes contacts 9091 and 9092. Contacts 9092 extend the ground for operating relay 9090 through contacts 9028 to operate the transmitter clutch magnet and the transmitter begins operation to transmit over lead US. This lead extends to contacts 9062 and 9041 to lead C9001(96) extending through level D of switch MMSEL2 to lead C9699(111) and the page printer. In the meantime the transmitter numbering contacts, which are closed on each cycle of the transmitter, extend ground over lead TNM and contacts 9667 to lead C9002(96), level E of switch MMSEL2 and contacts 9574 to energize relay 9650 over contacts 9643. This ground is also extended through contacts 9642 to lead C9698(105) and contacts 511' to energize the motor magnet of switch MMAPU.

Relay 9659 energizes to close contacts 9651 and this energizes relay 9640 from the ground extended over contacts 9574. Relay 9640 opens contacts 9641 and closes contacts 9642. Contacts 9643 open the circuit to relay 9650, which restores to open the circuit to relay 9640 at contacts 9651. Relay 9640 restores, and it recloses contacts 9643 to recomplete the circuit to relay 9650 as soon as another pulse is provided to lead C9002(96). In this manner relays 9640 and 9650 operate to control the timing of the pulses on lead C9698(105) and each time relay 9640 operates the pulse on lead C9698(105) is removed to allow switch MMAPU to step one position.

When switch MMAPU has stepped through ten positions, it forwards the ground on lead C9698(105) through level B thereof to energize the motor magnet of switch MMAPT. When the pulse is removed, both switches MMAPU and MMAPT are stepped one position. In this manner MMAPT is stepped once for every ten steps of switch MMAPU. It in turn forwards ground, when on its tenth position, to the motor magnet of switch MMAPH to energize that motor magnet and all three switches step when the ground from lead C9698(105) is removed. Thus switch MMAPH steps once for each ten steps of switch MMAPT, which in turn steps once for every ten steps of switch MMAPU.

When switches MMAPU, MMAPT, and MMAPH are aligned with switches MMDPU, MMDPT, and MMDPH, respectively, the ground from lead C9698(96) is extended through the off-normal springs such as 1031, 1033 or 1035 of any operated one of switches MMDPU, MMDPT or MMDPH, respectively, to level C of switch MMAPU; and over the contact upon which it is standing through the contact of level C of switch MMDPU, if it is standing on a corresponding contact, to level C of switch MMAPT and to a corresponding contact of level C of switch MMDPT. If that switch wiper is on the contact corresponding to MMAPT the ground is forwarded through level C of switch MMAPH to a corresponding contact on switch MMDPH and from there extended to operate relay 510'. This indicates that the transmitter has transmitted as many characters as were processed by the Register C and that the body of the message may now be transmitted to the units connected to the multiple call unit.

Relay 510' closes ground at contacts 512'—517' to individual conductors in cable 533' which extend to switches MMAPU, MMAPT, MMAPH, MMDPU, MMDPT and MMDPH levels A, respectively, where the first ten contacts are multipled to each of the respective motor magnets through the self-interrupting contacts of the motor magnet to energize those motor magnets. Each of the motor magnets now steps its switches home in a self-interrupted manner to restore any operated off-normal springs. At contacts 511' relay 510' disconnects lead C9698(96) from the just-described switch motor magnets. At contacts 519' it completes a locking circuit for itself to contacts 532' and also from the off-normal springs such as 224' of switches MMAPU, MMAPT and MMAPH so that it is held operated until those switches are stepped to the home position and relay 530' operated. At contacts 518' it energizes relay 530'.

Before relay 530' energizes, ground is extended from contacts 519' through contacts 531' to lead C961(96). This ground is extended over contacts 9616, through level C of switch MMSEL2 to lead C9625(90), contacts 9035, the upper winding of relay 9050 and contacts 9126 to relay 9120. Relay 9120 energizes. Relay 530' operating thereafter opens the contacts 531' to open this energizing circuit for relay 9120 and at contacts 532' opens the locking circuit for relay 510'. Relay 510' restores to restore its contacts.

Relay 9120 on operating opens contacts 9126 to open another point in its original operating circuit, and closes contacts 9125 to complete a holding circuit for itself from ground at contacts 9185. At contacts 9123 relay 9120 restores slow-to-release relay 9130. At contacts 9128 it opens the transmitter clutch magnet circuit before relay 9130 restores. At contacts 9064 and 9132, the cross office single and multiple call units intercept position reperforators are now connected over leads C798(52), in a manner explained, to the transmitter start contacts over lead US. The multiple call unit transmitter begins functioning as soon as contacts 9134 close to recomplete the clutch magnet circuit and transmission now takes place to the unit reperforators connected thereto over lead C798(52). Transmission also takes place therefrom to the page printer over lead US, contacts 9062 and 9041, lead C9001(96), contacts 9617, lead C9799(111), contacts 1411' and lead C9507(95). It will be noted that relay 9560 has disconnected the page printer from the polar relay contacts at contacts 9561. A multiple call unit receiving the message handles it in a similar fashion as the present unit.

Pulses are returned from lead TNM for each transmitter cycle, over lead C9002(90) in a manner explained, and through level E of switch MMSEL2 to pulse lead C9698(105) in a manner already explained. These pulses are extended to the motor magnet of switch MMAPU to step this switch once for each pulse. When the switch has been stepped to its tenth position, switch MMAPT is operated once, and thereafter switch MMAPT is operated once for every ten steps of switch MMAPU. When switch MMAPT has taken ten steps the motor magnet of switch MMAPH is energized from the pulse over lead C9698(96) in a manner described, and after the pulse, switch MMAPH steps to contacts 1. From level B of the switch MMAPH ground is forwarded through the closed off-normal springs 1032, 1034 and 1036 of switches MMDPU, MMDPT and MMDPH, respectively. This ground is extended to operate relay 510'.

It gives rise to a series of operations already explained and ground is extended over lead C9617(96), until relay 530' operates to reset relay 510', and remove this ground. The ground on lead C9617(96) is extended through level C of switch MMSEL2 to lead C9625(90), contacts 9035, the upper winding of relay 9050 and through contacts 9127 and 9133 to energize relay 9040.

Relay 9040 locks operated over contacts 9043 to ground at contacts 9187. At contacts 9041 it opens the circuit extending over lead C9001(96) to the page printer so that the page printer records no further characters. The information transmitted to the page printer consists primarily of the originating station designation and other information, which is not necessary to the function of the equipment but which is oftentimes included in the message portion which follows the routing indicators.

At contacts 9044 relay 9020 is restored, and at contacts 9045 a point in the circuit for forwarding ground to the precedence switch MMPR2 level C is opened. At contacts 9047, relay 9010 is restored, and at contacts 9046 ground is connected over lead C1611(16) to a level A of switch MNIF in the register Relay Finder Unit 1600. This ground restores relay 1730.

Relay 1710 is restored at contacts 1733 to disconnect the switch wipers of switch MMIF from the multiple call processing unit. At contacts 1711 ground is removed from lead C1799(13) to restore relay 1310. Relay 1310 opens the circut to the upper winding of relay 1320 at contacts 1316. When relay 1310 restores, it also opens contacts 1318 to remove ground from relay 1570 so that it restores to restore the cross office finder bar relays 3130. At contacts 1313 ground is removed from lead C1303(29) to restore any one of the operated relays 2960 or 2860, if operated. At contacts 1311, 1312, 1319 and 1319' ground is removed from leads C1301(94), C1302(33), C1304(22) and C1305(94), respectively.

Relay 1710 on restoring also opens contacts 1719' to remove ground from lead C9601(96). This restores relay 9610 which opens contacts 9611, 9612, 9613, 9614, 9615, 9616, 9617, 9618, 9619, and 9619'. At contacts 9619' relay 9810 is restored. It closes contacts 9811—9824 to complete a self-interrupted stepping circuit to any of the operated switches such as MMT1—MMT24 standing on its respective first to eighth contacts. When the switch is standing on its eighth contact, the self-interrupted ground energises the motor magnet and it steps to its ninth contacts. From there it steps self-interruptedly to its home position. Contacts 9615 on opening restore relays 9430, 9440, 9470, 9480 and 9570. At contacts 1613 ground is removed from lead C9604(105) to restore relays 520' and 540' and deenergize the lower winding of relay 440'. Relay 540' on restoring closes contacts 544 to complete a self-interrupted stepping circuit through off-normal springs 1052 to the motor magnet of switch MMTR3 and the switch steps home in a self-interrupted manner to open its stepping circuit. At contacts 541' ground is removed from relay 310', and it restores. With contacts 541' and 542' open the locking ground for relay RG1A—RG1E to RG9A—RG9E is removed and these relays restore to in turn release relays 410', 420' or 430', if operated. Relay 440' therefore restores. Relay 520' closes contacts 521'—525' to place a self-interrupted stepping ground through the respective level A wipers of switches MMAPU, MMAPT, MMAPH, MMPPU, MMDPT and MMDPH. In the event less than 100 characters were transmitted in the body of the message, relay 510' was not operated on the second count by switches MMAPU, MMAPT and MMAPH. Therefore the page printer was not disconnected and switches MMAPU and MMAPT are in their operated condition. This ground restores these switches in a self-interrupted manner. The manner in which the described operations result in the event of less than 100 character message will be described.

With relay 1310 restored ground is removed from lead C1304(22) to restore any operated relay in the precedence register 1900 as explained. Relay 2070 on restoring removes ground from leads C2098(15), C2092(111) and C2092(104) to restore relays 1510, 1120' and 460'. The multiple Call Register C together with the multiple call processing equipment is now ready to be seized by another unit. Relay 1850 is also restored to disconnect the conductors of cable C9602(96) from switch MMSEL2 so that relay 9620 restores.

*EOM multiple call cross office transmission*

With the multiple call cross office transmitter operating, the body of the message is transmitted to each cross office unit, intercept position or multiple call cross office unit that is associated with the transmitting multiple call cross office unit, and if the multiple call cross office seized itself, the message is being transmitted to its own reperforator. The multiple call units handle the message in the same fashion as the present unit, while a described procedure also takes place at the office units and intercept position.

Assuming another message is not in storage when the reader is operating, and the EOM of the message is still at the reperforator: Relay 9250 being operated extends ground from the reader tight tape contacts closed when the tape between the reperforator and reader becomes tight to lead RTT, contacts 9335 and 9256 to energize relay 9210. It locks operated at contacts 9218, and opens the holding circuit to relay 9250 at contacts 9217. Relay 9250 restores to open one now unused reader circuit at contacts 9251. At contacts 9215 ground is extended from contacts 9183 to maintain lead C3229(32) grounded and from contacts 9174 and 9219 ground is extended through contacts 9328 and 9389 to cause blank tape feed out, and on lead C3229 also operates relay 9330. At contacts 9211 relay 8610 is operated so that the sensing relays 8620—8670 are connected to the reader sensing leads. At contacts 9256 the circuit for originally operating relay 9210 is opened.

With the reader operating to read blanks, ground is extended periodically from contacts 8643, 8653, 8664, 8624, 8635, 8673, to contact 8614. If an EOM is not read to release relay 8750 as will be explained, the ground from contacts 8614 is extended through contacts 8755, 8886 and 9191 to pulse switch MMCTG2. If it takes 25 steps without an EOM being sensed, ground is extended from contacts 9183, 9193 wiper B on contact 5 and contacts 9212 to energize the upper winding of relay 9170. It energizes its lower winding at contacts 9173 and 9099. It closes contacts 9171 to step switch MMCTG2 home self-interruptedly. At contacts 9174 it opens the circuit for blank tape feed out, and at contacts 9175, 9176 and 9177, it completes signal circuits. At contacts 9172 it opens the reader circuit.

While tape is fed to the reader, any line feed sensed thereby is transmitted over lead 7" in a manner explained for a corresponding lead associated with the incoming line circuit, through contact 8617, 8835 and 8825 to energize relay 8810. It locks operated through the upper winding of relay 8820 and contacts 8811 and 8671. Relay 8820 operates at the end of the cycle, when ground is removed from lead 7". At contacts 8821, relay 8610 is energized. It opens contacts 8617 to prevent the forwarding of ground from lead 7". The multiple call cross office unit sensing relays 8620—8670 are now connected to the readers sensing leads, and if a line feed is next sensed, ground is extended from contacts 8643, 8653, 8664, 8624 and 8635 to contacts 8835 and 8824 to energize the lower winding of relay 8620. It completes a locking circuit through the upper winding of relay 8630, as soon as relay 8670 has restored at the end of the sensing cycle in a manner which has already been explained. If the character were not a line feed the ground would not be extended to contacts 8635 and 8824 to energize the lower winding of relay 8820. As the holding circuit for the upper winding of relay 8820 and the winding of relay 8810 is open at contacts 8671, during the sensing cycle, both relays would restore and their operation is then meaningless.

A third line feed sensed by the multiple call cross office unit sensing relays, extends ground in a manner explained to contacts 8834 to energize the lower winding of relay 8830. That winding is then locked operated through the upper winding of relay 8840 at the end of the sensing cycle in a manner already explained. Further line feed that are sensed results in a reptition of this operation. That is the ground extended to contacts 8834 shunts the upper winding of relay 8840 until the end of the sensing cycle. At that time the lower winding of relay 8830 locks operated in series with the upper winding of relay 8840, which also energizes.

When the first N of the EOM is sensed, ground is extended from contacts 8621, 8632, 8643, 8654, and 8665 to energize the lower winding of relay 8840 through contacts 8855 and 8854. At the end of the sensing cycle relay 8840 energizes in series with the upper winding of relay 8850 in a described manner. The following three N's of the EOM result in the operation of the lower winding and upper winding of relays 8850 and 8860 respectively, the lower winding and upper winding of relays 8860 and 8870 respectively and the lower winding and upper winding of relay 8870 and 8880 respectively. This is done in a manner similar to that described for corresponding relays in the other apparatus. On the next sensing cycle, contacts 8171 open to restore relay 8870 and the upper winding of relay 8880.

Relay 8880 on operating opens contacts 8881 to open the holding circuit to the winding of relay 9110 and it restores to close contacts 9112. At contacts 8882 relay 8880 extends ground from contacts 9185 to the fourth contact the switch MMCTG2 level A. At contacts 8884 it opens the circuit extending from contacts 9182 and 8751 to the upper winding of relay 8750 to restore that relay. At contacts 8883 it extends the ground from contacts 9182 to its lower winding to energize that winding.

The transmitter numbering contacts, which extend a pulse over lead TNM, during each transmitter cycle now extend ground over contacts 8885 and 9191 to the motor magnet of switch MMCTG2. This switch therefore takes one step for each transmitter cycle, and when switch MMCTG2 takes fifteen steps, battery through the lower winding of relay 9190 is extended through wiper A and contact 4, contacts 8882 to ground at contacts 9185. This advances the message through the transmitter so that the EOM is now transmitted to all connected positions. Relay 9190 locks operated through contacts 9194 and 9184. At contacts 9192 it opens the circuit to the reader clutch magnet to stop the reader. At contacts 9191 the circuit for stepping the motor magnet of switch MMCTG2 is opened. At contacts 9195 relay 9190 extends the transmitter tight tape switch contacts from lead TTT through contacts 8758 to the lower winding of relay 9180.

With the reader stopped the trnasmitter soon pulls the tape between the reader and the transmitter taut. Ground is then extended over contacts 8758 and 9195 to operate relay 9180.

Relay 9180 opens contacts 9182, 9183, 9184, 9185, 9187, 9188, 9189 and 9189'. Opening contacts 9184 restores relay 9190, however relay 9180 locks operated through contacts 9186 and off-normal springs 8702 on switch MMCTG2. Relays 9120, 9050 and 9060 restore due to the opening of contact 9185. Relay 9190 now completes a circuit for operating the reader clutch magnet from ground at contacts 9332, 8746, 8754, 9011, 9151, 9172 and 9192. With the reader operating ground is removed from lead TTT, and ground is placed on lead TTS to operate the transmitter over contacts 9112 and 9128 and lead TCL. At contacts 9182, relay 9180 opens the holding circuit for the lower winding of relay 8880, which restores. At contacts 9181 it completes its self-interrupted stepping circuit for the motor magnet of switch MMCTG2 through off-normal springs 8701 and the switch steps home to open off-normal springs 8702 for restoring relay 9180. Relay 9040 restores due to the opening of contacts 9187 and at contacts 9189 ground is removed from lead C5201(52) and leads C5202(61), C5202(63) and C5202(93) connected thereto over the incoming selector switchs to restore relay 6060, 6840 and 9340 in each associated cross office unit, intercept positions, or multiple call cross office unit respectively.

The release of relay 6060 in any operated cross office unit, the corresponding relay 6840 in the intercept position gives rise to an already described sequence of operations for releasing those positions. In the multiple call cross office unit relay 9340 restores to give use to an already described sequence of operations.

At contacts 9183 the shunting ground for relay 9320 was removed and it operates. It locks operated in series with relay 9330 over contacts 9252 and off-normal springs 8935. At contacts 9324 it now completes a self-interrupted homing circuit for switch MMPR2 including off-normal springs 8936 and contacts 9153. At contacts 9328 ground is prevented from being extended to lead BW for causing blank type feed out. When switch MMPR2 step home one holding circuit for relays 9320 and 9330 is opened at off-normal springs 8935.

When the reperforator stopped and the reader operating, the tape between the reader and reperforator becomes tight so that slack tape contacts (not shown) on lead RCC open to stop the reader. The transmitter is still operating and when the tape between the reader and transmitter becomes tight, ground is extended over lead TTS, contacts 8858, 9189′ and 9329 to shunt relay 9210 down. It restores its contacts to open the circuit to relays 9320 and 9330 at contacts 9216. At contacts 9211, relay 8610 is restored. The ground on lead C3229(32) is therefore restored at both contacts 9215 and 9322 so that the multiple call cross office unit may now be seized as an empty multiple call cross office unit.

In the event another message were in storage, lead RTT remains ungrounded when the reader is processing the tape between the reader and reperforator. Relay 9210 therefore remains unoperated, while relay 9250 remains operated and the SOM of the succeeding message is processed as described to give rise to an already described series of operations.

If the body of the message did not contain one hundred characters, relay 9040 is not operated in the described manner to cause release of Register C. When the EOM of the message is detected as described and relay 9180 operated, ground is removed from contacts 9188 to restore relay 9020. At contacts 9023 it restores relay 9010 in this unit and 1730 in the Register C. Relay 1730 on restoring restores relay 1710, which in turn gives rise to an already described release proceed use for the Register C and its associated multiple call processing equipment.

Identification

To determine which cross office unit is connected to an incoming position an operator operates an identification key individual to the cross office unit or individual to the incoming position. By closing contacts 5110 the operator grounds lead C5212(52) extending to the bank contacts of level B of all the incoming selector switches having access to the incoming line circuit. Ground is then extended over a lead such as C5211(61) or (68) if a cross office position unit or intercept position incoming selector switch respectively is associated with the incoming line. In the case of a cross office unit being connected to the position, the ground on lead C5211(52) is extended over contacts 6111 and 6166 to lead C5297(51) to light the line identification lamp individual to the cross office unit 5139 at the line circuit position. In the case of a intercept position being connected to the incoming line the ground on lead C5211(68) is forwarded over contacts 6827 and 6957 over a lead C5197(51) to light a similar lamp individual to the intercept position. Similarly a key associated with an outgoing position can be pressed to determine which cross office or manual forwarding unit position is set to the outgoing position. By pressing key 5140 individual to the outgoing channel contacts 5141 are closed to extend ground over lead C5142(48) to the corresponding bank contact on level J of the outgoing selector switches and from there over the wiper of the switch and lead C4809(51) and contacts 5151 to light an outgoing identification lamp individual to the cross office unit or manual forwarding unit. To determine the incoming and outgoing positions to which a cross office unit is connected or a manual forwarding position is connected to, the operator operates key 5150 to extend ground over lead C4809(51) at contacts 5156 and connects lead C5199(60) to lead C5198(60) at contacts 5152. The ground on lead C5198 from contacts 6067 is therefore forwarded over contacts 5152 to lead C5198(60) and over contacts 6114 to lead C5213(52) the level A wiper of the incoming selector switch 5200 and lead C5214(51) to light an appropriate cross office identification lamp at the incoming line circuit position. The ground forwarded over lead C4809(51) is forwarded over lead C4814(48) corresponding to the outgoing channel with which the cross office unit is connected and over lead contacts 5142 to light the cross office identification lamp 5143 at the outgoing channel position.

To determine which units are receiving from a multiple call unit, a key 9098 is operated to extend ground over lead C5212(52), through incoming selector switch levels B to lead C5211(61), C5211(63) and C5211(93). In the case of the cross office units and intercept positions this ground is returned in a manner explained to light a lamp individual thereto, and in the case of multiple call units this ground is extended over lead C5211(93), contacts 9381 and 9231 to light a lamp individual to the position. If the cross office unit key contacts 5152 are closed, ground from contacts 6067 is extended over lead C5198(51) to lead C5199(60), contacts 6114, lead C5213(52) and a lead such as C5214(90), contacts 9015 to light a lamp individual to the transmitting unit. Likewise to determine what line circuit is associated with the multiple call unit key contacts 9314 are operated to extend ground from contacts 9341, 9354 and 9386 to lead C5213(52) to light a lamp over incoming selector switch level A, individual to the line circuit.

The preceeding description has been intended to explain a preferred embodiment of the invention, however the true scope of the inventive concept is believed to be more fully covered in the accompanying claims.

What is claimed is:

1. In a telegraph switching center having an incoming line over which a message with one or more address codes each representing an individually corresponding destination may be received and a plurality of storage units, the improvement comprising a translator effective in response to the receipt of said message for interpreting said plurality of address codes to select only one route in case said destinations corresponding to said plurality of address codes may be reached over said one route and to select a plurality of routes in case said destinations corresponding to said plurality of address codes requires a plurality of routes to reach said corresponding destinations, and an arrangement controlled in one manner in response to said selection of only said one route for transmitting said message to only one of said storage units, and said arrangement controlled in another manner in response to said selection of said plurality of routes for transmitting said message to a corresponding plurality of said storage units.

2. An arrangement such as claimed in claim 1 in which said arrangement comprises a particular storage unit to which a message is transmitted in response to said translator selecting two routes, means effective thereafter for selecting a route individual to each address code and for selecting a storage unit for each different route, and last means for associating each selected storage unit with said particular storage unit and for transmitting a message from said particular storage unit to each of said selected storage units.

3. An arrangement such as claimed in claim 2 in which said last means comprises means operated after each route is selected for determining which of said selected storage units conforms to the last selected route, and means operated for selecting an additional storage unit only if the last selected route does not conform to any previously selected storage unit.

4. An arrangement such as claimed in claim 2 in which each of said storage units has a switch individual thereto, and means whereby said switch is controlled to enable a message to be transmitted to its associated storage unit.

5. In a telegraph switching system, an incoming line, outgoing lines extending to different destinations, a translator, a plurality of storage units common to said lines, means for selecting said translator responsive to the receipt over said incoming line of a telegraph message, said message having a plurality of address codes each identifying individually corresponding destinations to which said message is to be routed, said translator operated by each of said address codes for selecting an outgoing line having access to a destination corresponding to each address code, operated responsive to said translator selecting the same outgoing line for said plurality of address codes, means for selecting one of said storage units and operated responsive to said translator selecting a plurality of outgoing lines for said plurality of address codes, for selecting two of said storage units, and means thereafter operated for associating each selected storage unit with a corresponding line to determining that said message is to be routed to said destinations over two of said outgoing lines.

6. In a telegraph switching center having an incoming line over which a message with one or more address codes may be received and a plurality of outgoing lines having access to stations each represented by a different address code, the improvement comprising an arrangement for automatically interpreting a number of said address codes in a message to select an outgoing line in accordance with the station represented by each interpreted address code, a plurality of storage units of one type, a storage unit of another type, means effective for associating a storage unit of said first type with said incoming line if only one outgoing line is selected whereby a received message is routed thereto, means for associating said storage unit of said other type with said incoming line for routing a received message to said other type storage unit if more than one outgoing line is selected, and means thereafter effective for associating a number of said first storage units with said other type storage unit for routing to each of said number of first storage units a message corresponding to the received message, the number of said first storage units corresponding to the number of different outgoing lines having access to stations represented by the address codes in the message routed to said other type of storage unit.

7. In a telegraph relay switching center having an incoming line from which a first message with a plurality of routing indicators each corresponding to a different destination is received and having a plurality of outgoing lines extending towards respective destinations to which a message may be transmitted, the improvement comprising means arranged to automatically respond only to a plurality of the routing indicators in a received message for selecting a number of outgoing lines over which a message is to be transmitted, and means thereafter operated for automatically creating a number of messages corresponding in number to the number of said lines extending towards the destinations corresponding to said routing indicators.

8. In an arrangement such as claimed in claim 7, means for including in each created message a routing indicator for each destination of each message, and means for including no more than a predetermined number of routing indicators in one message.

9. In a telegraph switching center having an incoming line over which a message with a plurality of address codes may be received and a plurality of outgoing lines having access to stations each represented by a different address code, the improvement comprising an arrangement for automatically reacting to the received address codes only for routing said message to one outgoing line if said address codes represent stations accessible thereover and for routing said message to a plurality of outgoing lines if said address codes represent stations accessible thereover.

10. In a telegraph switching center having a plurality of outgoing lines extending to respective other stations, the improvement comprising register and translating means automatically operated responsive to the receipt of a telegraph message containing routing codes comprising only a plurality of address codes each individually corresponding to a different one of said stations, and determining means operated responsive to said operation of said register and translating means solely in accordance with only said plurality of address codes for determining the number of times said received message is to be reproduced to enable retransmission of said message to each of said stations over respective outgoing lines.

11. In a telegraph switching center having an incoming line from which a first message with a plurality of routing indicators each corresponding to a different destination is received and having a plurality of outgoing lines extending towards respective destinations to which a message may be transmitted, the improvement comprising means operated responsive only to the routing indicators in a received message for determining the minimum number of outgoing lines over which messages corresponding to said first message are to be transmitted, and means thereafter operated for automatically creating a number of corresponding messages the number of said messages corresponding to the number of lines extending towards the destinations corresponding to said routing indicators.

12. In an arrangement such as claimed in claim 11, means for including in each created message a routing indicator for each destination of each message, and means for including no more than a predetermined number of routing indicators in one message.

13. In an automatic telegraph system of the type having a station to which a plurality of incoming lines are extended and from which a plurality of outgoing lines extend to respective destinations and having means whereby a message having only one or more address codes therein for indicating respective destinations and received over any one of said incoming lines may be automatically stored and retransmitted for transmission over one or more of said outgoing lines in conformance with the number of address codes and the respective destinations indicated thereby, means effective in response to one or more of said address codes conforming to one outgoing line and received over one of said incoming lines for transmitting said message over said one outgoing line, and means effective in response to more than one address code conforming to different respective destinations for creating a plurality of messages from said one incoming message for transmission over respective outgoing lines.

14. In an automatic telegraph system of the type having a station to which a plurality of incoming lines are extended and from which a plurality of outgoing lines extend to respective destinations and having means whereby a message having only routing indicators therein for indicating respective destinations and received over any one of said incoming lines may be stored and retransmitted for transmission over one or more of said outgoing lines in conformance with the destinations indicated by each routing indicator, the improvement comprising means effective in the event a message received over one of said incoming lines has a plurality of routing indicators therein conforming to different respective destinations for automatically creating a plurality of messages from said one incoming message for transmission over respective outgoing lines.

15. In a telegraph switching center having an incoming line over which a message with a plurality of address codes is received and a plurality of outgoing lines having access to stations each represented by an individually corresponding address code, the improvement comprising a storage unit associated with said line when a message with a plurality of address codes therein is received, whereby said storage unit is controlled to store said message, a plurality of other storage units having means for transmitting messages stored therein, means associated with said first storage unit for selecting a number of said other storage units and for associating said other storage units with said first storage unit whereby address codes corresponding to stations accessible over the same outgoing line is stored in each of said selected other storage units, the number of said last selected storage units depending on the number of address codes in said message representing stations accessible over different outgoing lines, and means effective to prevent more then a predetermined number of said address codes corresponding to stations accessible over the same line from being stored in a selected one of said other storage units.

16. In a telegraph switching center having an incoming line over which a message with a plurality of address codes is received and a plurality of outgoing lines having access to stations each represented by a different address code, the improvement comprising an arrangement for interpreting each address code in a message to select an outgoing line in accordance with the station represented by each interpreted address code, a plurality of storage units of one type, a storage unit of another type, means for associating said storage unit of said other type with said incoming line for routing a received message to said other type storage unit whereby said received message is stored therein, said arrangement thereafter associated with said other type storage unit for interpreting each address code in said message, means effective for successively associating a storage unit of said first type with said other type storage unit for each interpreted address code representing a station accessible over a different outgoing line whereby a message corresponding to the received message is routed to each associated storage unit of said one type, and means effective in the event more than a predetermined number of said address codes representing stations accessible over different outgoing lines are interpreted for routing a message corresponding to said message to a storage unit of said other type.

17. In telegraph switching center having an incoming line over which a message with a plurality of address codes is received and a plurality of outgoing lines having access to stations each represented by an individually corresponding address code, the improvement comprising a first storage unit associated with said line when a message with a plurality of address codes therein is received, whereby said storage unit is controlled to store said received message, a plurality of other storage units, means associated with said first storage unit for selecting a number of said other storage units and for associating said other storage units with said first storage unit whereby a message corresponding to said received message is stored in each of said selected other storage units, the number of said last selected storage units depending on the number of address codes in said message representing stations accessible over different outgoing lines, said means also effective for associating each of said selected storage units with a different one of said outgoing lines whereby each message stored therein may be transmitted over the associated outgoing line, and means effective if more then a predetermined number of said address codes representing stations accessible over different outgoing lines are in said message for controlling said first storage unit to store a message corresponding to said received message.

18. In a telegraph switching center having an incoming line over which a message with a plurality of address codes is received and a plurality of outgoing lines having access to stations each represented by an individually corresponding address code, the improvement comprising a storage unit associated with said line when a message with a plurality of address codes therein is received, whereby said storage unit is controlled to store said message, a plurality of other storage units having means for transmitting messages stored therein, means associated with said first storage unit for selecting a number of said other storage units and for associating said other storage units with said first storage unit whereby a message corresponding to said received message is stored in each of said selected other storage units, the number of said last selected storage units depending on the number of address codes in said message representing stations accessible over different outgoing lines, said means also effective for associating each of said selected storage units with a different one of said outgoing lines whereby each message stored therein may be transmitted over the associated outgoing line, and means effective if more than a predetermined number of said address codes representing stations accessible over different outgoing lines are in said message for controlling a storage unit corresponding to said first storage unit to store a message corresponding to said received message.

19. In a telegraph switching center having an incoming line over which a message is received with one of several possible precedence designations and a plurality of address codes each representing a different station which may be accessible over different routes, the improvement comprising a plurality of storage units of one type, a plurality of storage units of another type, means for selecting and storing said received message in a storage unit of said other type, means thereafter operated for successively selecting a route corresponding to each address code and for associating a storage unit of said first type for each address code representing a station accessible over a different route with said last selected storage unit whereby an address code representing one station is stored in each of the selected storage units of said first type, and means operated whenever a predetermined number of different routes have been selected for selecting another storage unit of said other type having a message of the same precedence therein as said received message and associating said last selected unit with said unit having said message stored therein whereby the remaining address codes corresponding to different routes may be stored therein.

20. In a telegraph switching center having an incoming line over which a message with a plurality of address codes may be received each representing a different station some of which are accessible over different routes and some of which are accessible over the same route, the improvement comprising a translator for selecting a route conforming to each address code, a plurality of storage units of one type, a storage unit of another type, means for storing said received message in said storage unit of said other type, means controlled thereby for operating said translator to successively select a route conforming to each address code in said received message, means operated after each translator selection for associating in a manner corresponding to each route a different storage unit of said first type with said last selected storage unit whenever a route differing from previously selected routes is selected, and means operated after each translator selection for testing each associated storage unit of said first type to determine if it is associated with said other type storage unit in a manner conforming to the route last selected by said translator.

21. In a telegraph switching center having an incoming line over which a message with a plurality of address codes each representing an individually corresponding destination may be received and having a plurality of storage units, the improvement comprising a translator effective for successively interpreting said address codes to successively select a route corresponding to each destination, an arrangement for storing an address code representing one destination in one of said storage units after said translator has interpreted a first address code, means thereafter effective in response to each interpretation by said translator for testing said one storage unit to determine if said first selected route correspond to each successively interpreted address code and for storing each interpreted address code in said one storage unit if its route corresponds to said first route, and means effective in the event the route of a succeeding interpretation does not correspond to the route of said first address code for storing the corresponding address code in another of said storage units.

22. In a telegraph switching center having an incoming line over which a message with a plurality of address codes may be received some of which conform to different stations accessible over one outgoing line and others of which conform to stations accessible over respective other outgoing lines, the improvement comprising an arrangement for automatically interpreting each address code in a message to select an outgoing line in accordance with the station represented by each interpreted address code, a plurality of storage units of one type, a storage unit of another type, means for associating said storage unit of said other type with said incoming line for routing said received message to said storage unit of said other type, means effective for selecting a different storage unit of said first type for each address code conforming to a station accessible over a different line, and means effective for testing each selected storage unit before selecting another storage unit of said first type to determine if any selected storage unit corresponds to the outgoing line having access to the station conforming to an interpreted address code.

23. In an automatic telegraph system of the type having a relay switching center to which are extended a plurality of incoming lines and from which are extended a plurality of outgoing lines extending to respective stations, the improvement comprising means common to all of said lines and associated with one of said incoming lines on the receipt of a predetermined sequence of signals thereover for determining an outgoing line over which an incoming message is to be routed, and means effective in the event an incoming line and the determined outgoing line correspond to one of said respective stations for preventing said message from being routed over an outgoing line.

24. In an automatic telegraph system of the type wherein lines extending to one station are each arranged to have message signals transmitted thereover to said one station and wherein apparatus for storing and retransmitting messages is individually associated with and terminates each line, the improvement comprising a register common to said apparatus and arranged to find the apparatus terminating the line over which message signals are transmitted on the transmission of a predetermined sequence of message signals thereover, a plurality of storage units each having access to the apparatus terminating each line, and means in said register for controlling one of said storage units to find the apparatus to which said signals are transmitted whereby the message signals stored at said apparatus may be transmitted to said one storage unit.

25. A system such as described in claim 24, wherein each message has a precedence designation, and means are provided in said register for selecting a storage unit corresponding to the message precedence designation before controlling said storage unit.

26. In a system such as claimed in claim 25, means effective in the event a storage unit corresponding to said message precedence designation is not selected for selecting a predetermined type of storage unit.

27. In a system such as described in claim 24, means in said register for selecting a storage unit to be controlled, and means effective in the event none of said storage units are selected for disassociating said register from said apparatus.

28. A system such as claimed in claim 24, wherein a message may include a number of routing indicators each corresponding to a different outgoing routing, means in said register responsive to the inclusion of a plurality of said routing indicators in one message for selecting and controlling a particular storage unit to be associated with the apparatus terminating the line over which said message was received.

29. In a system such as claimed in claim 28, means effective on the transmission of said message to said particular storage unit for controlling other storage units to be associated with said particular storage unit whereby a message including only one of said indicators conforming to a different outgoing routing is transmitted to each of said storage units.

30. In a system such as claimed in claim 29, means effective after a predetermined number of said storage units are associated with said particular storage for selecting and controlling a particular storage unit to be associated with said particular storage unit in the event a predetermined number of routing indicators each conforming to a different outgoing routing are included in said message.

31. In a system such as claimed in claim 29, means effective in the event said message includes a particular number of routing indicators which correspond to one outgoing routing for preventing a message having more than said predetermined number of routing indicators corresponding to one outgoing routing from being transmitted to one storage unit.

32. In an automatic telegraph system of the type wherein lines extending to one station are each arranged to have message signals transmitted thereover to said one station and wherein apparatus for storing and retransmitting messages is individually associated with and terminates each line, the improvement comprising a register common to said apparatus and arranged to be associated with the apparatus terminating the line over which message signals are transmitted on the transmission of a predetermined sequence of message signals thereover, a plurality of storage units each having access to the apparatus terminating each line, means in said register for controlling one of said storage units to find the apparatus to which said signals are transmitted whereby the message signals stored at said apparatus may be transmitted to said one storage unit for storage thereat, said means effective when said register is associated with the apparatus terminating another of said lines for controlling said one storage unit to find the last apparatus whereby the message signals stored at said last apparatus may be transmitted to said one storage unit for storage thereat while the message signals first stored thereat are still stored.

33. In an automatic telegraph system having a station to which a plurality of incoming lines extend and over which signals are received at individually corresponding apparatus terminating each of said lines, a plurality of cross office units having access to the apparatus terminating each of said lines and to a number of outgoing lines, and means responsive to the receipt of certain signals at the apparatus terminating one of said incoming lines for operating one of said cross office units for associating it with said apparatus and with an outgoing line to which said signals are to be transmitted.

34. In an automatic telegraph system having a station to which a plurality of incoming lines extend and over which signals are received at individually corresponding apparatus terminating each of said lines, a register arrangement at said station responsive to the receipt of a predetermined series of signals at the apparatus terminating one of said lines over which the signals are received, a plurality of cross office units having access to the apparatus terminating each of said lines and to a number of outgoing lines, and means in said register thereafter responsive to the receipt of certain signals for operating one of said cross office units for associating it with said apparatus and with an outgoing line to which said signals are to be transmitted.

35. In a telegraph switching center having means for recording a received message containing a start of message indicator, a plurality of channel designations each having a message number, a precedence designation, one or more routing indicators, a body of a message and an end of message indicator, the improvement comprising a transmitter automatically operated after the recording of said received message to transmit said received message, means associated with said transmitter for recording said transmitted message and for subsequently processing said message for further transmission, and means automatically operated for controlling said transmitter to transmit to said storage means only a start of said message indicator, one channel designation only and one message number only, a precedence designation, one or more routing indicators, a body of the message and the end of message indicator.

36. In a telegraph system having a switching center from which respective outgoing lines extend to respective stations each adapted to receive telegraph signals transmitted over its respective outgoing line at one of a plurality of different transmission speeds respectively, corresponding thereto, the improvement comprising a plurality of transmitters each arranged to transmit telegraph signals at a different speed, and means operated responsive to a telegraph message intended for one of said stations, for automatically selecting a transmitter having a speed corresponding to the station to which said message is to be transmitted for transmitting telegraph signals corresponding to said message over the respective line.

37. In a telegraph system having a relay switching center with outgoing lines connected to respective stations which are each adapted to receive telegraph signals transmitted over its respective outgoing line from said switching center at one of a plurality of different speeds respectively corresponding thereto, the improvement comprising an arrangement at said switching center for transmitting respective messages to said respective outgoing lines at speeds corresponding to the respective stations connected to said outgoing lines, and means for automatically controlling said arrangement for transmitting respective messages over respective outgoing lines at a speed corresponding to the respective stations connected thereto.

38. In a telegraph switching center having a plurality of line circuits each of which has an associated line from which it receives and records messages, a register common to said line circuits, means in each of said line circuits responsive to the receipt of a predetermined sequence of signals over its associated line for signalling said register, means thereafter effective for associating said register with one of said signalling line circuits, a plurality of storage units to which a recorded message may be transmitted from any one of said line circuits, means thereafter effective for selecting one of said storage units and for associating said storage unit with said one line circuit, and means effective in the event said register is unable to select a storage unit for disassociating said register from said line circuit to prevent the transmission of a message therefrom.

39. In a telegraph switching system of the type having an automatic relay switching center, a plurality of incoming lines terminating said center, recording means for each line whereby a message received from an incoming line is recorded a plurality of storage units each having access to any one of a plurality of outgoing lines, a common register for associating any one of said storage units with any recording means for the purpose of storing a recorded message and for transmitting said message over one of said outgoing lines, and means for locking out said line circuit in the event none of said storage units can be associated with said incoming lines.

40. In a telegraph switching center having an incoming line over which a message is received and recorded, the improvement comprising plurality of storage units common to said line and each having means for recording and transmitting messages, means for selecting one of storage units and for associating said storage unit with said incoming line and with an outgoing line over which a received message is to be retransmitted, means for transmitting said received message to said storage unit whereby it is stored, and recording means effective when a message is to be retransmitted over an outgoing line from said storage unit for recording a number individual to said selected storage unit whereby said unit is identified.

41. In a telegraph relay switching center apparatus normally operated by a start of message indicator in one message containing a message number for reproducing a second message from said one message, and an arrangement effective in response to a message number in a first message for operating said apparatus for reproducing a second message therefrom in the event said first message which does not have a start-of-message indicator.

42. In a telegraph relay switching center having a plurality of outgoing channels extending to respective other stations a transmitting arrangement means for connecting said transmitting arrangement to any one of said outgoing channels for transmitting a message thereover, and means operated for controlling said transmitting arrangement in response to its being connected to said outgoing channel for transmission over a predetermined other outgoing channel.

43. In an automatic telegraph system wherein a relay switching center is provided having a plurality of incoming lines extending thereto and having a plurality of outgoing lines extended therefrom for the purpose of forwarding respective messages received over said incoming lines to respective receiving stations, improvement comprising a plurality of storage units each of which has access to said incoming lines and to said outgoing lines and which are arranged for receiving a message transmitted to said incoming lines and for storing the same for retransmission over an outgoing line, means effective on receipt of a message over one of said incoming lines for setting said storage unit on said incoming line and on an outgoing line over which the message is to be routed, and means effective under certain conditions for setting said storage unit on one of said outgoing lines and for transmitting a message in said storage unit over another of said outgoing lines.

44. In an automatic telegraph system of the type having a relay switching station to which is extended an incoming line and from which are extended a plurality of outgoing lines extending to respective other stations, the improvement comprising means common to all of said incoming lines and associated with one of said incoming lines on the receipt of message signals thereover for determining in accordance with a routing code an outgoing line over which an incoming message is to be routed, and means effective in the event said incoming line and a determined outgoing line correspond to one of said respective other stations for preventing said message from being routed over an outgoing line.

45. In a telegraph switching center an incoming line terminating thereat with means for recording a received message having a plurality of routing indicators each corresponding to respective destinations, a plurality of outgoing lines having access to certain destinations, first means operated responsive to said recording of said plurality of routing indicators only for selecting only one outgoing line in case said one selected outgoing line has access to said plurality of said destinations corresponding to said plurality of recorded routing indicators, said first means operated in response to said recording of said plurality of routing indicators for selecting a different one of said outgoing lines for each different one of said recorded routing indicators in case each of said destinations is accessible over a different one of said outgoing lines, a plurality of storage units, and means operated by said first means responsive to the selection of said one outgoing line for said plurality of indicators for transmitting said message to one storage unit and responsive to the selection of a plurality of different ones of said outgoing lines for said plurality of indicators for transmitting said message to a plurality of said storage units.

46. In a telegraph switching center a plurality of incoming lines, a plurality of outgoing lines, a plurality of storage units common to said plurality of outgoing lines and each unit having access to any one of said incoming lines, means for associating any one of said storage units with the one of said incoming lines receiving an incoming telegraph message responsive to certain message indicia included in said received telegraph message, and means individual to said line for identifying said one storage unit.

47. In an arrangement such as claimed in claim 46, means for associating said one associated storage unit with one of said outgoing lines responsive to certain message indicia included in said received telegraph message, and means individual to said one outgoing line for identifying said one storage unit.

48. In an arrangement such as claimed in claim 46, means individual to said one storage unit for identifying said incoming line.

49. In an arrangement such as claimed in claim 47, means individual to said one storage unit for identifying said one outgoing line.

References Cited in the file of this patent

UNITED STATES PATENTS

| | | |
|---|---|---|
| 2,416,699 | Kinkeed | Mar. 4, 1947 |
| 2,766,318 | Bacon | Oct. 9, 1956 |
| 2,871,286 | Bacon | Jan. 27, 1959 |